US012756695B2

(12) United States Patent
Daub et al.

(10) Patent No.: US 12,756,695 B2
(45) Date of Patent: Oct. 6, 2026

(54) PROCESSING TWO-DIMENSIONAL ARRAYS OF PIXELS EXTRACTED FROM DIGITALLY ENCODED DOCUMENT FILES BASED ON ALIGNMENT WITH SPATIAL ARRANGEMENT DATA

(71) Applicant: BorderPass Corp., Toronto (CA)

(72) Inventors: Sally Jean Daub, Toronto (CA); Joshua Aaron Green, Toronto (CA)

(73) Assignee: BorderPass Corp., Toronto (CA)

( * ) Notice: Subject to any disclaimer, the term of this patent is extended or adjusted under 35 U.S.C. 154(b) by 51 days.

(21) Appl. No.: 19/065,039

(22) Filed: Feb. 27, 2025

(65) Prior Publication Data

US 2026/0254799 A1 Aug. 27, 2026

(51) Int. Cl.

| | |
|---|---|
| ***H04L 9/40*** | (2022.01) |
| ***G06F 40/20*** | (2020.01) |
| ***G06V 30/414*** | (2022.01) |

(52) U.S. Cl.

CPC .......... *H04L 63/0435* (2013.01); *G06F 40/20* (2020.01); *G06V 30/414* (2022.01)

(58) Field of Classification Search

CPC ..... H04L 63/0428; H04L 9/14; H04L 9/0891; H04L 2209/60; H04L 9/0861; G06F 3/062; G06F 21/645; G06F 21/606; G06F 21/62

See application file for complete search history.

(56) References Cited

U.S. PATENT DOCUMENTS

| | | | | |
|---|---|---|---|---|
| 2015/0213224 | A1 | 7/2015 | Amarasingham | |
| 2019/0104128 | A1 * | 4/2019 | Carol | H04L 9/3226 |
| 2019/0259475 | A1 | 8/2019 | Dohrmann | |
| 2020/0389466 | A1 * | 12/2020 | Sankuratripati | H04L 63/123 |
| 2022/0343236 | A1 | 10/2022 | Daub | |
| 2024/0163264 | A1 * | 5/2024 | Kim | H04L 63/0428 |
| 2026/0134431 | A1 * | 5/2026 | Turgeman | G06Q 20/10 |

OTHER PUBLICATIONS

Canada Intellectual Property Office; Office Action; Application No. 3115954; Feb. 14, 2024; 5 pgs.

(Continued)

*Primary Examiner* — Wasika Nipa
*Assistant Examiner* — Edgar W Xie
(74) *Attorney, Agent, or Firm* — Katz Ruby & Carle LLP; Katherine C. Stuckman

(57) ABSTRACT

A computing system is operable to generate a plurality of sets of user data values based on processing a plurality of digitally encoded document files. A first set of user data values of the plurality of sets of user data values is extracted from the first digitally encoded document file via applying an image processing function to the first digital image data based on aligning positions of a first plurality of pixels of the first digital image data with predetermined spatial arrangement data based on, for each of a plurality of different user fields, identify a corresponding proper subset of adjacent pixels of a first plurality of proper subsets of adjacent pixels having a position in a two-dimensional arrangement of the first plurality of pixels, relative to positions of other ones of the first plurality of pixels in the two-dimensional arrangement of the first plurality of pixels.

20 Claims, 219 Drawing Sheets

(56) References Cited

OTHER PUBLICATIONS

Canada Intellectual Property Office; Office Action; Application No. 3115954; Nov. 22, 2024; 5 pgs.
Canadian Intellectual Property Office; Office Action; Application No. 3115954; May 18, 2023; 6 pgs.
Y Axis, "Canada Skilled Immigration Points Calculator", online tool, https://web.archive.org/web/20210307121610/https://www.y-axis.com/skilledimmigrationpointscalculator/canada/, Mar. 7, 2021 (Jul. 3, 2021).
Y Axis, "Canada Skilled Immigration Points Calculator", online tool,https://web.archive.org/web/20210307121610/ https://ww.wy-axis.com/skilledimmigrationpointscalculator/canada/7, Mar. 2021 (Jul. 3, 2021).

* cited by examiner

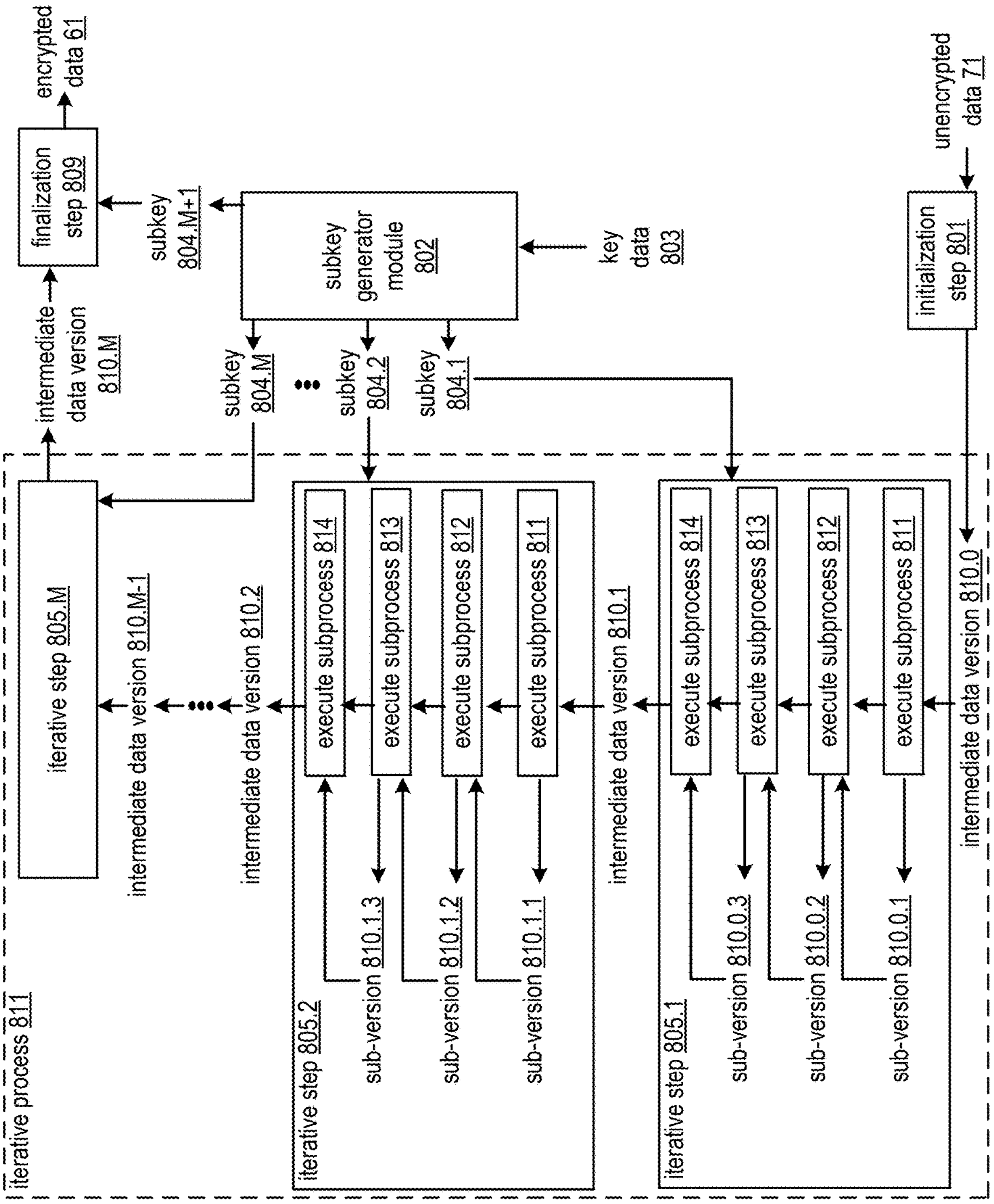
FIG. 1N data encryption module 62 data encryption module 62

Immigration Assistance System 100

Immigration Assistance System
100

Application Data 520

Application Data 520

Input Prompt Instruction Data 628

Client Device 130

Immigration Eligibility Risk Assessment System 102

Interactive User Interface 375

Interactive User Interface 375

Interactive User Interface 375

Interactive User Interface 375

Interactive User Interface 375

Interactive User Interface 375

Interactive User Interface 375

Interactive User Interface 375

Interactive User Interface 375

Interactive User Interface 375

Interactive User Interface 375

Interactive User Interface 375

Client Device 130

Immigration Application Requirement Identification System 104

Immigration Assistance System 100

Immigration Assistance System 100

Client Device 130

1010

375

375

375

375

375

375

375

Immigration Assistance System 100

Immigration Assistance System 100

Immigration Assistance System 100

Client Device 130

Immigration Assistance System 100

Immigration Assistance System 100

Immigration Assistance System 100

Immigration Digital Photograph Processing System 112

Client Device 130

Client Device 130

Immigration Application Letter Generator System 114

Client Device 130

Immigration Document Verification System 116

Client Device 130

Client Device 130

Client Device 130

Interactive User Interface 375

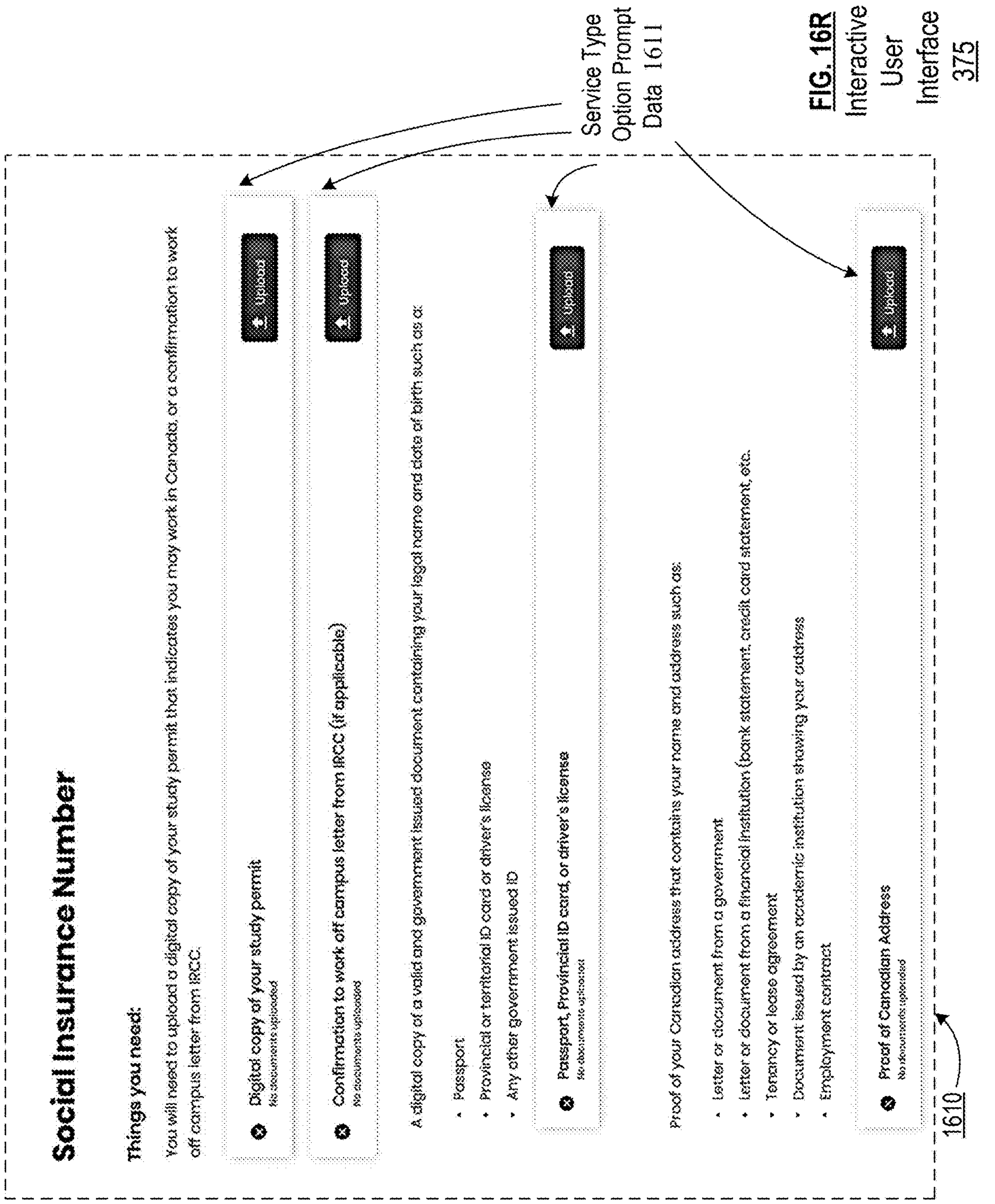
FIG. 16R Interactive User Interface 375

Interactive User Interface 375

Client Device 130

Client Device 130

Immigration Assistance System 100

Immigration Assistance System 100

PROCESSING TWO-DIMENSIONAL ARRAYS OF PIXELS EXTRACTED FROM DIGITALLY ENCODED DOCUMENT FILES BASED ON ALIGNMENT WITH SPATIAL ARRANGEMENT DATA

CROSS-REFERENCE TO RELATED APPLICATIONS

None

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer systems and computer technologies including secure and reliable storage of information extracted from streams of digitally encoded data packets received from multiple sources via symmetric key cryptography algorithms and/or fault tolerant information dispersal schemes, and/or computer vision technologies applying neural networks to trained to detect and/or measure various features and/or underlying text extracted from digitally encoded image files.

BRIEF DESCRIPTION OF THE SEVERAL VIEWS OF THE DRAWING(S)

FIGS. 1N-1O are schematic block diagrams illustrating embodiments of a data encryption module in accordance with various embodiments;

Figure 9A:
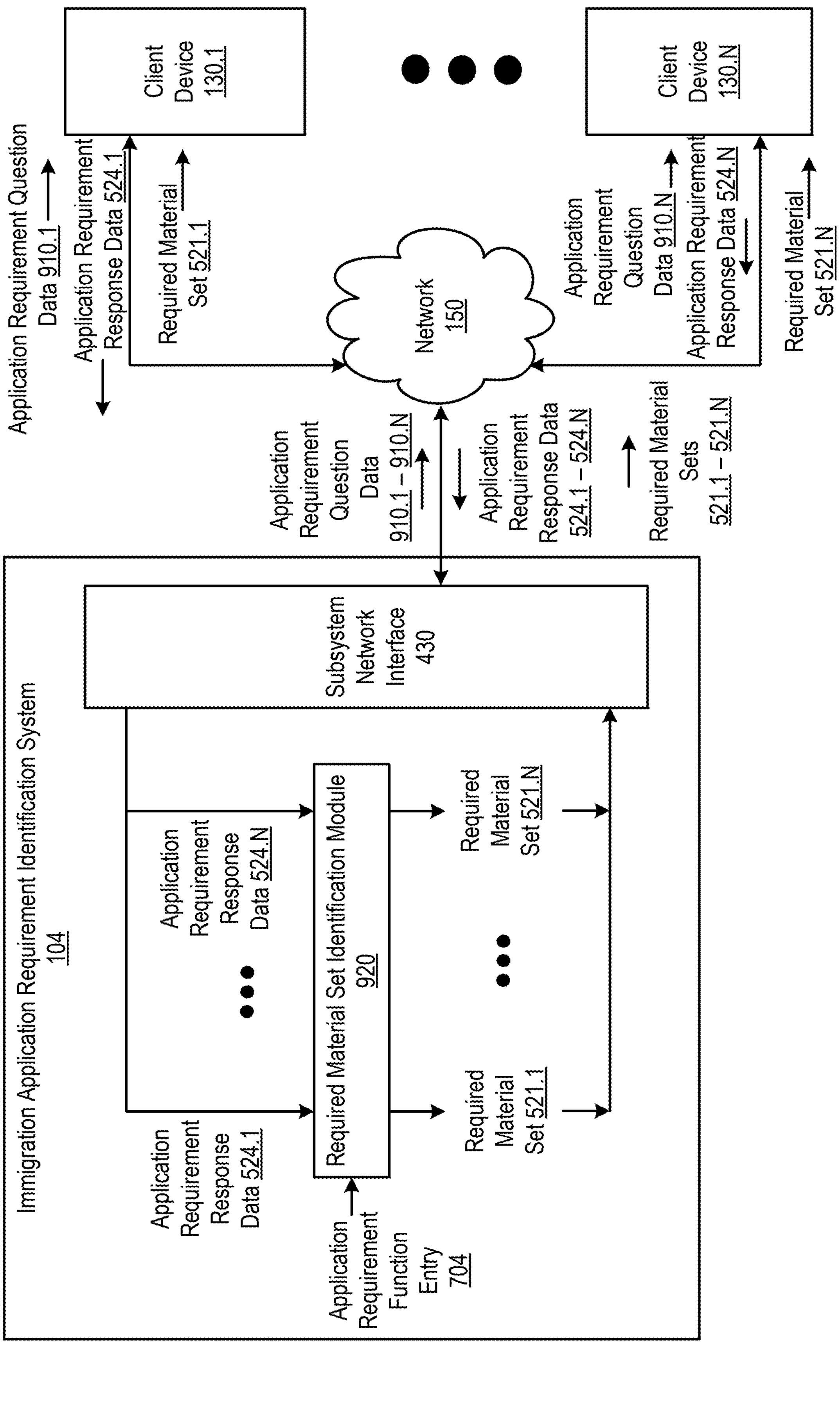
FIGS. 9A-9B are schematic block diagrams of an immigration application requirement identification system in accordance with various embodiments.
Figure 9B:
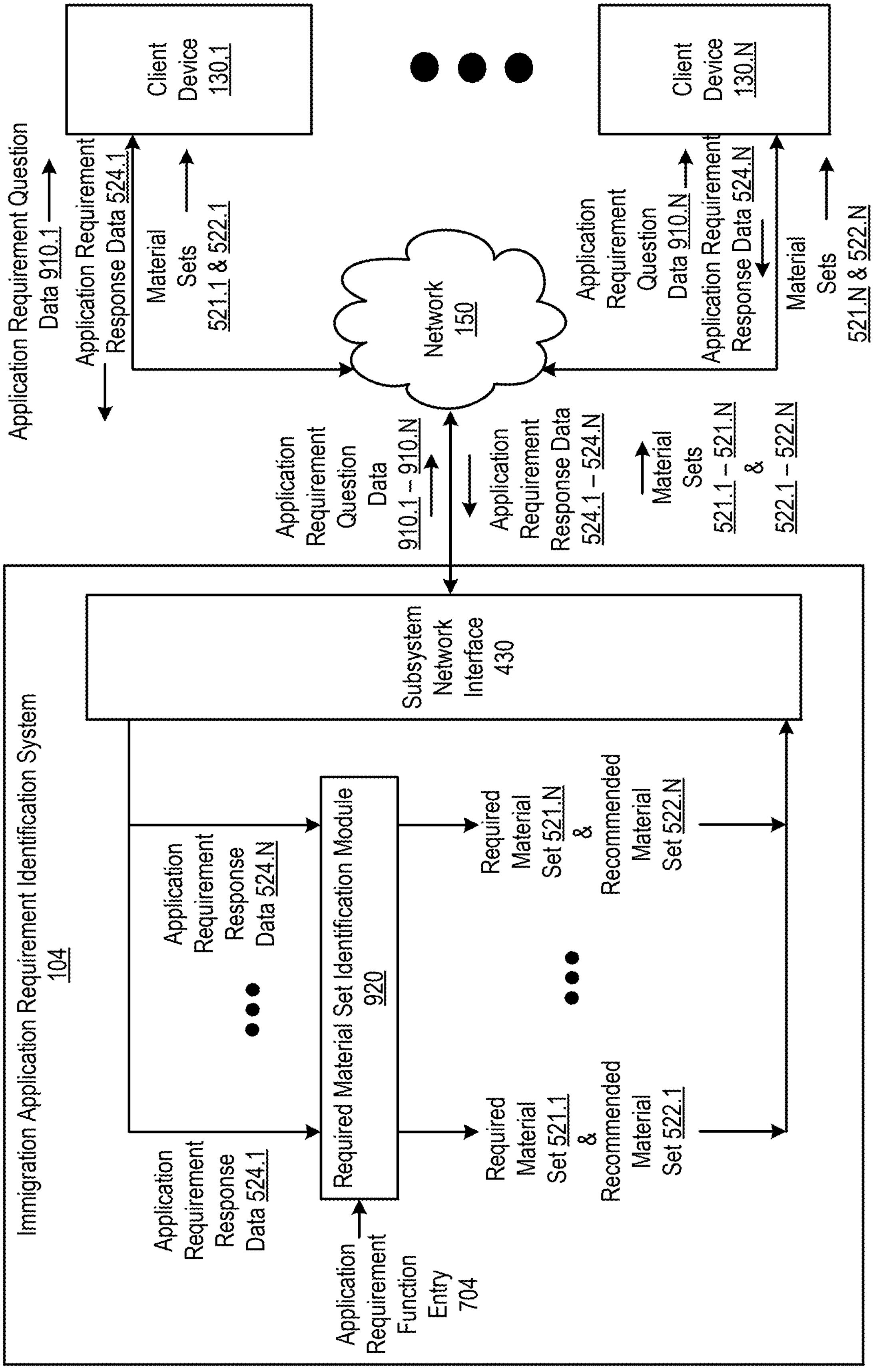
Figure 9C:
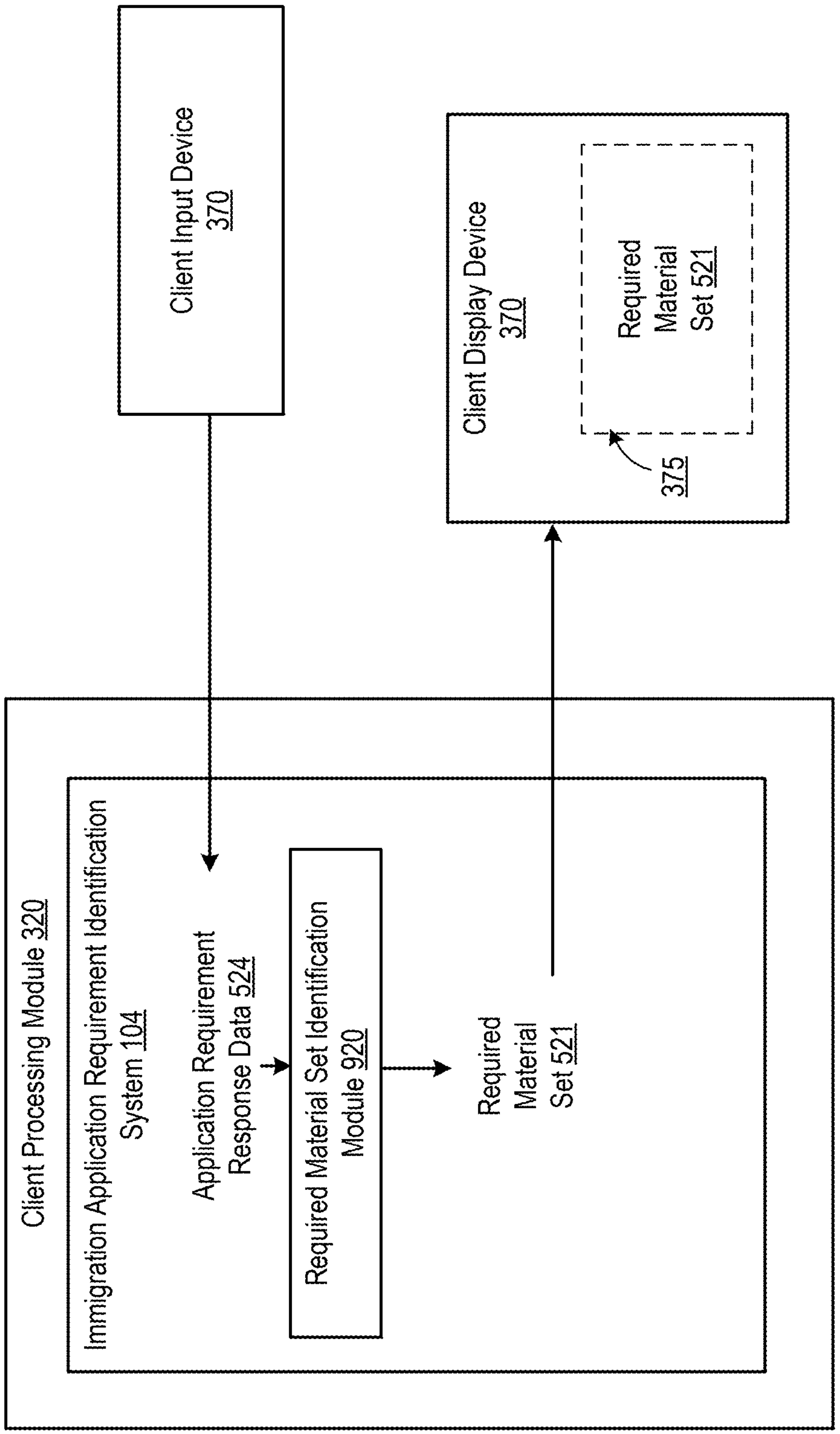
FIG. 9C is a schematic block diagram of a client device in accordance with various embodiments.
Figure 9D:
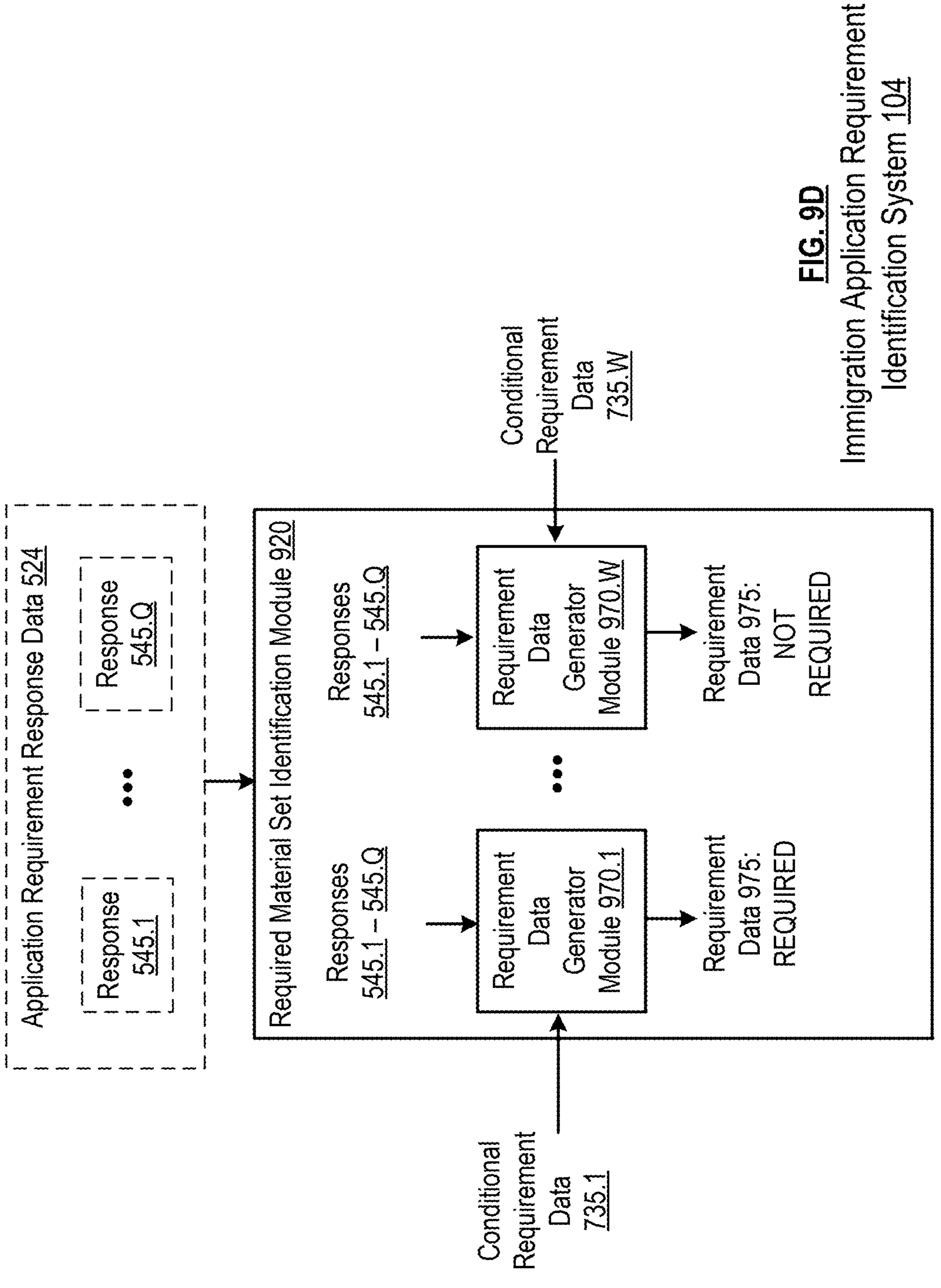
FIGS. 9D-9F are schematic block diagrams of an immigration application requirement identification system in accordance with various embodiments.
Figure 9E:
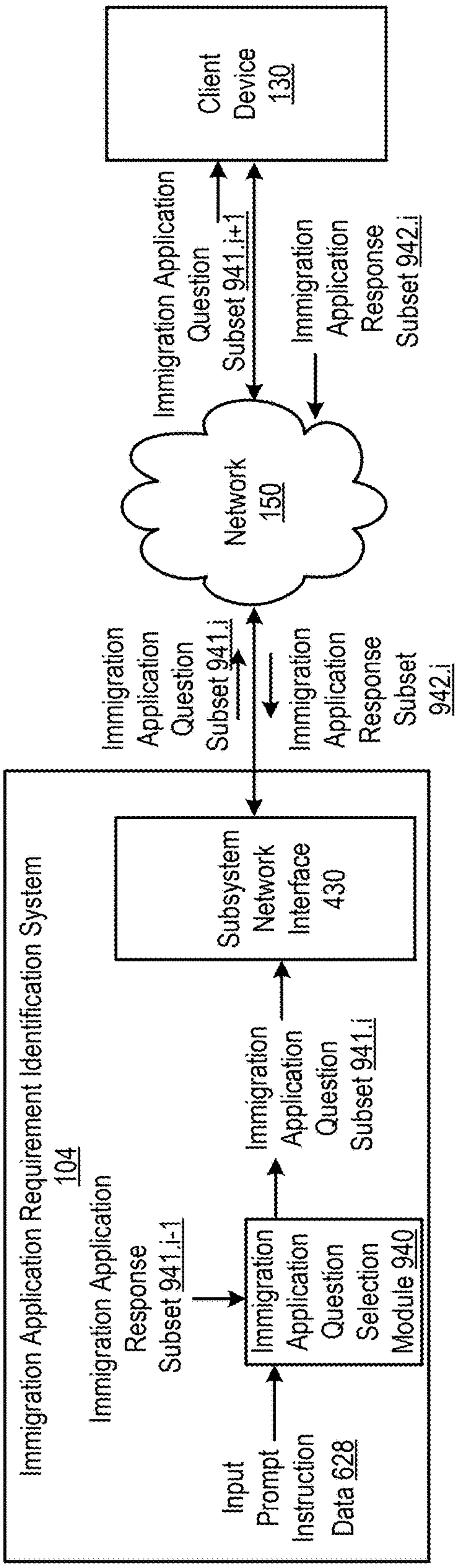
Figure 9F:
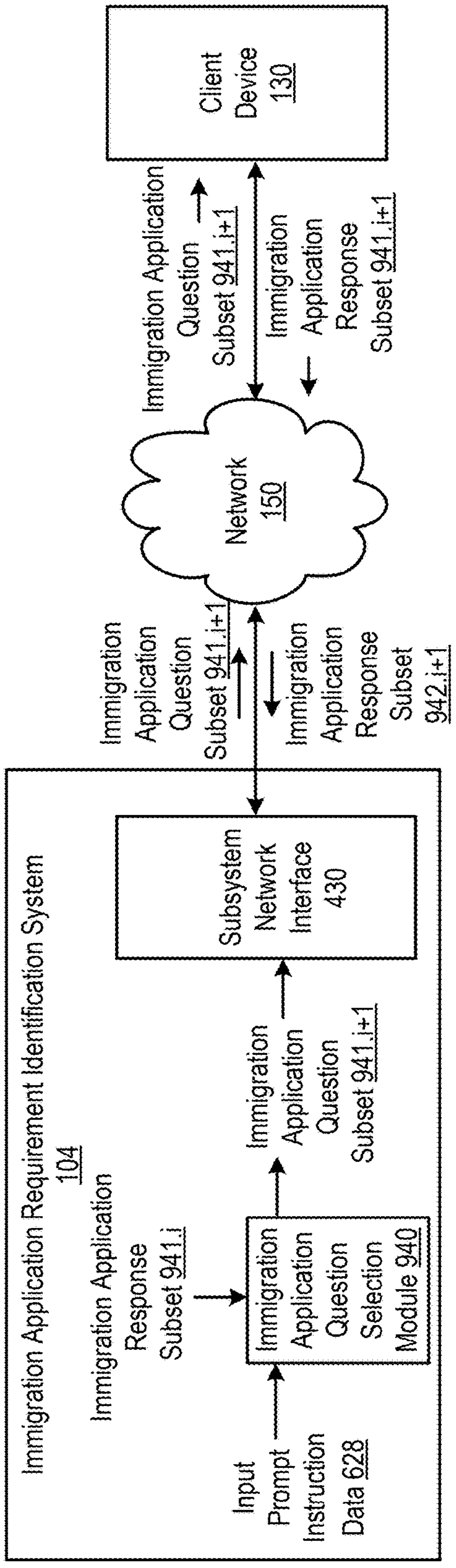
Figure 9G:
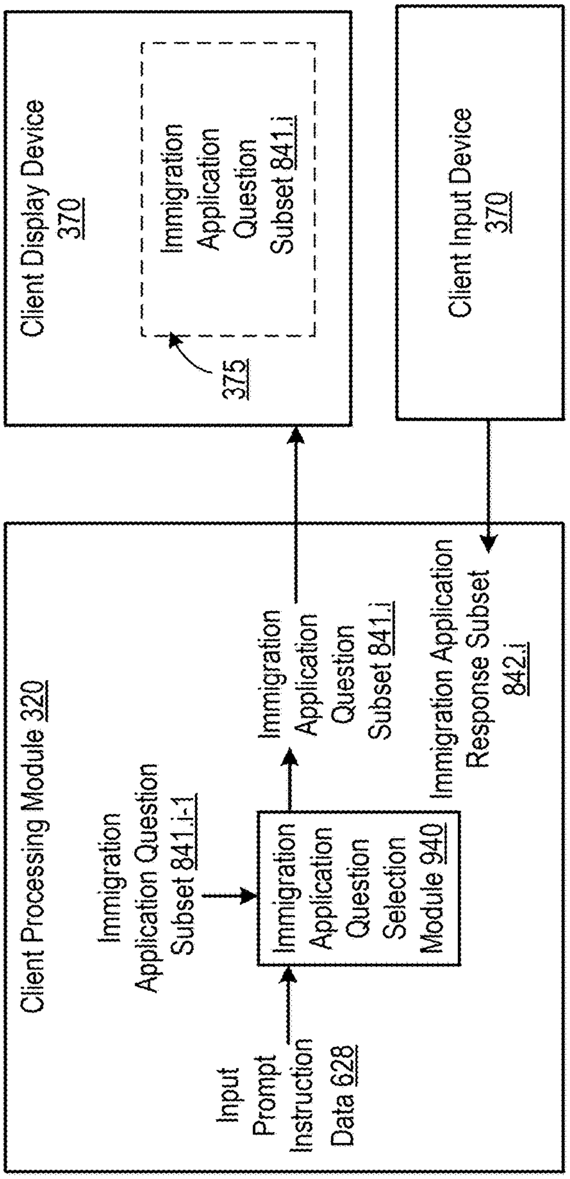
FIGS. 9G-9H are schematic block diagrams of a client device in accordance with various embodiments.
Figure 9H:
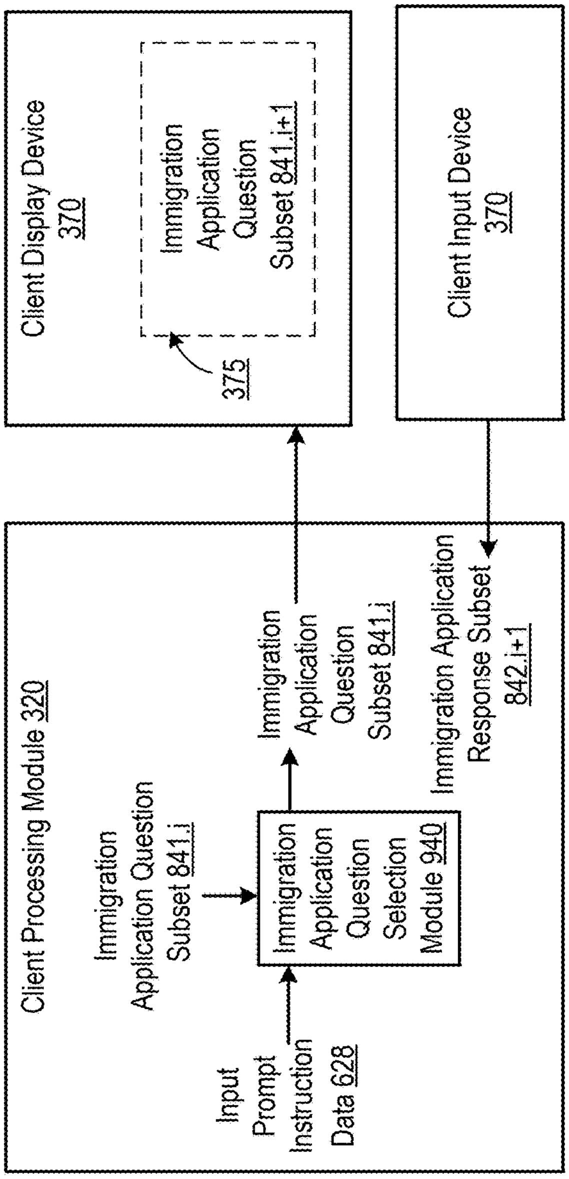
Figure 9I:
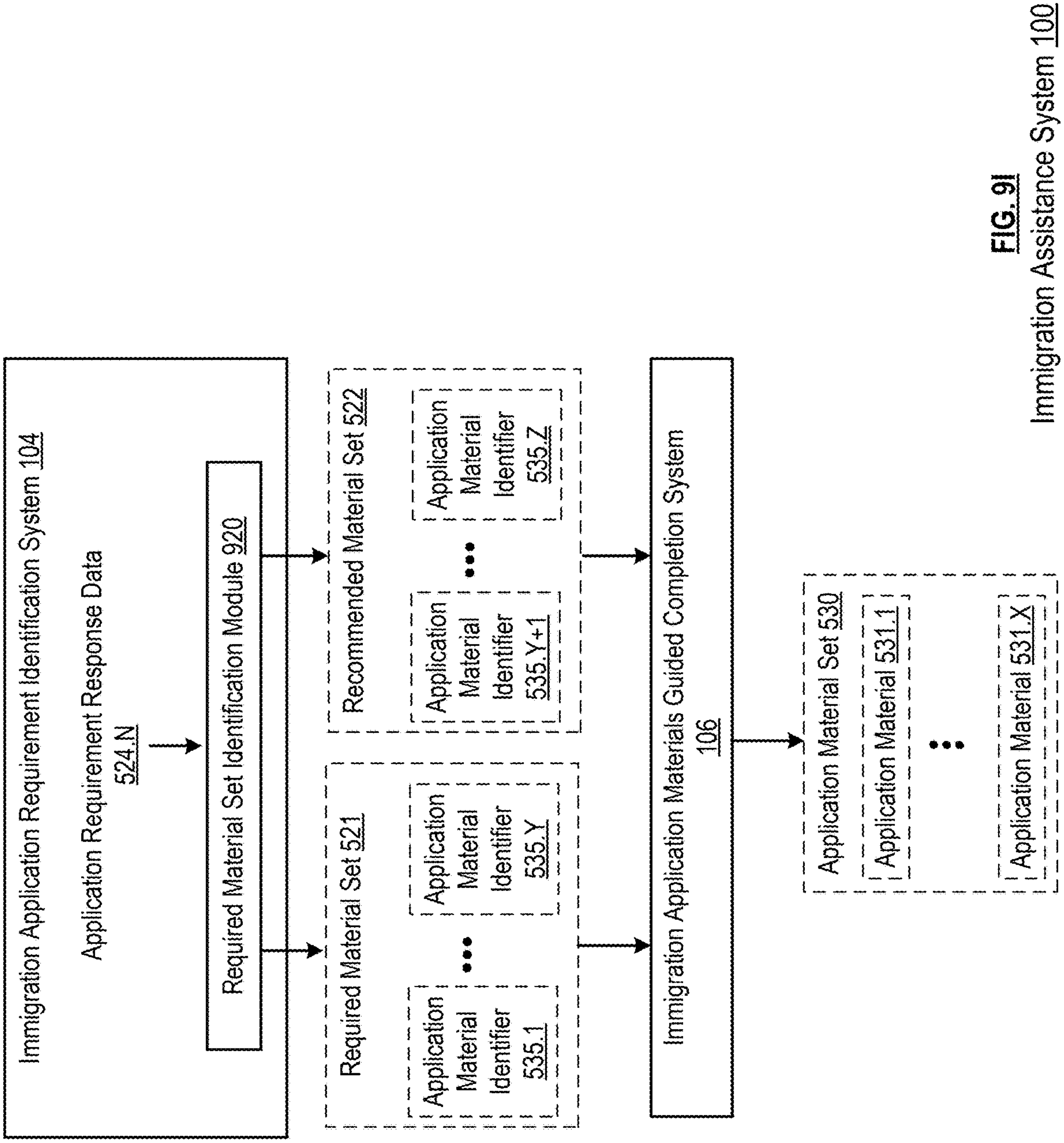
FIG. 9I is a schematic block diagram of an immigration assistance system in accordance with various embodiments.
Figure 9J:
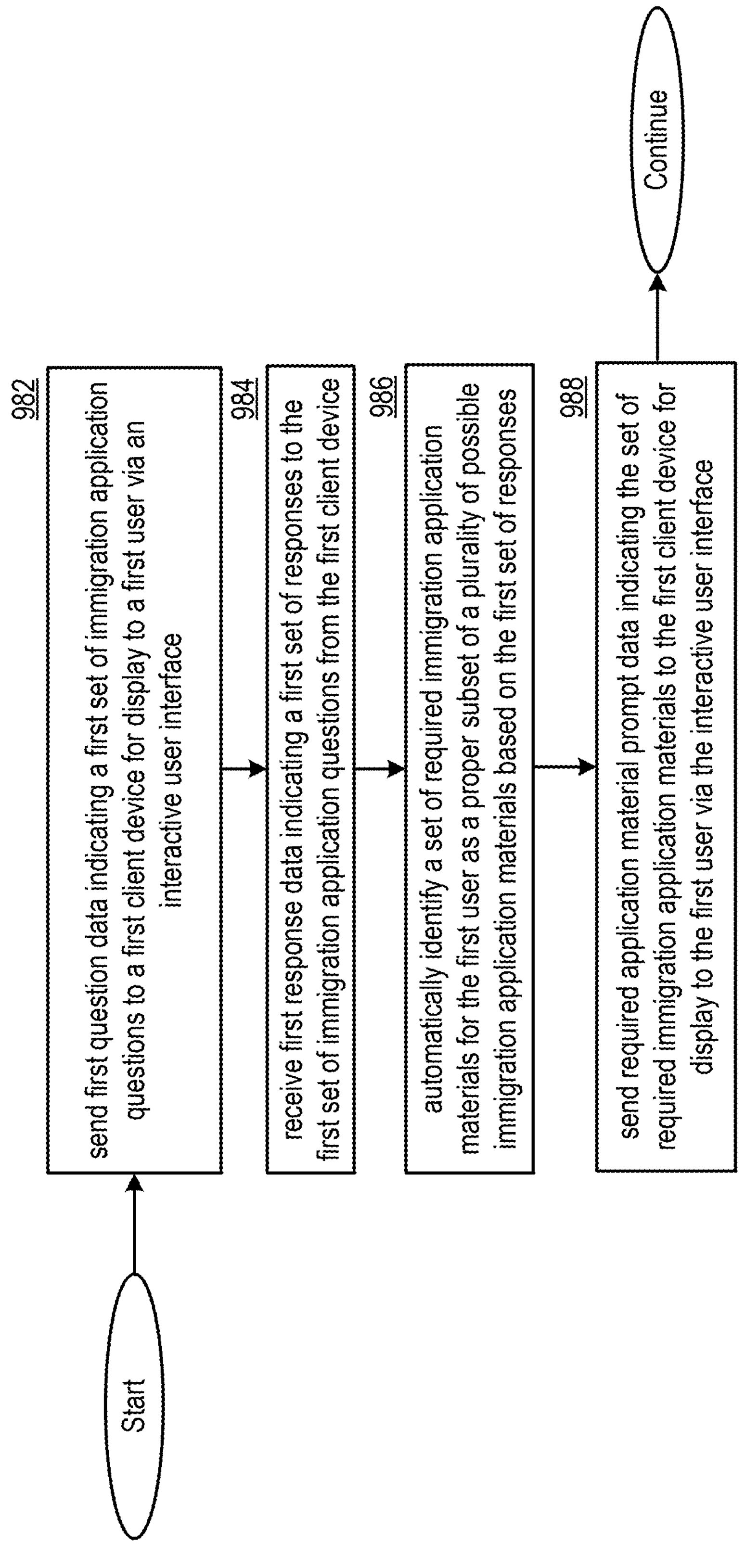
FIGS. 9J-9K are logic diagrams illustrating methods for execution in accordance with various embodiments.
Figure 9K:
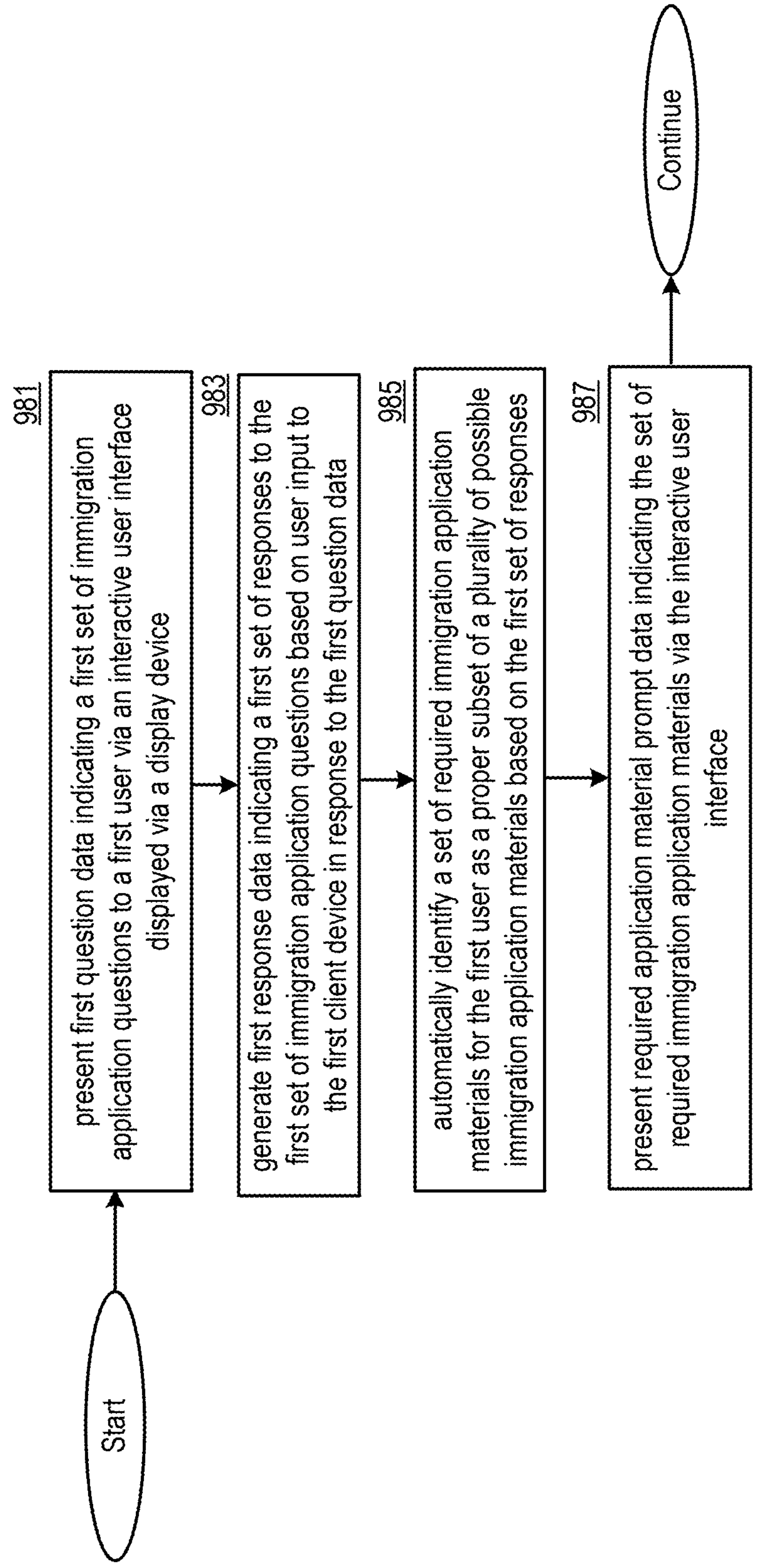
Figure 9L:
Figure 9M:
Figure 9N:
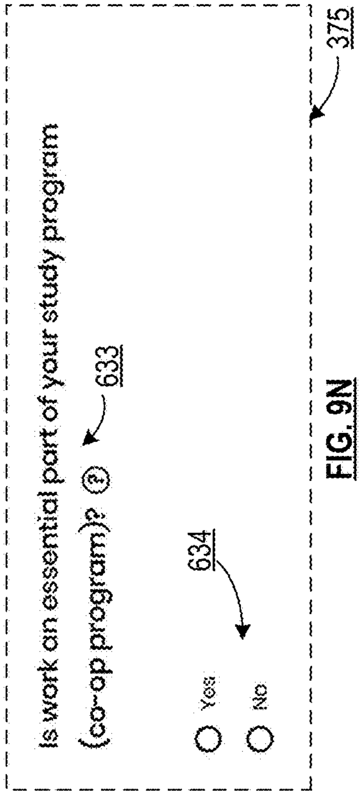
Figure 9O:
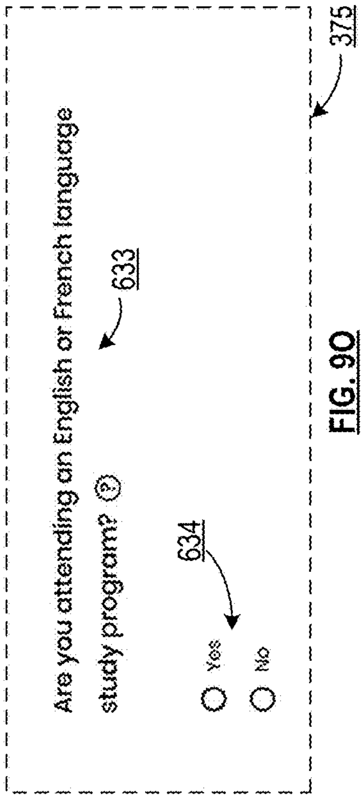
Figure 9P:
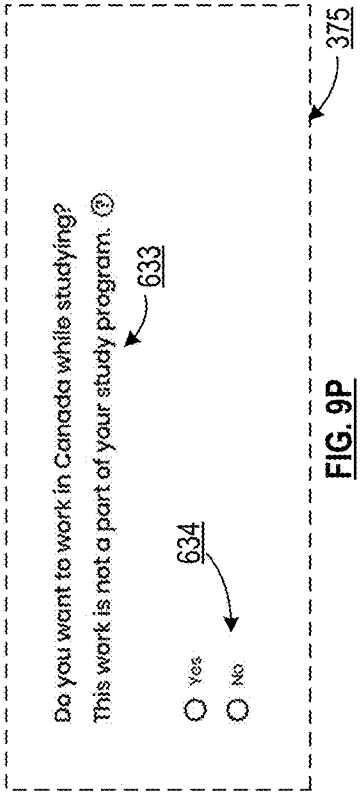
Figure 9Q:
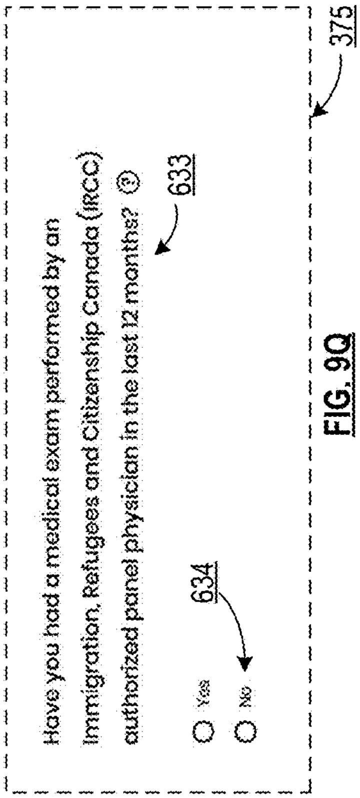
Figure 9R:
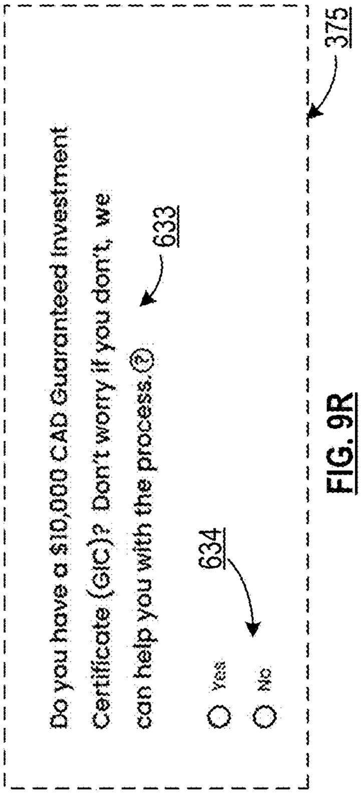
Figure 9S:
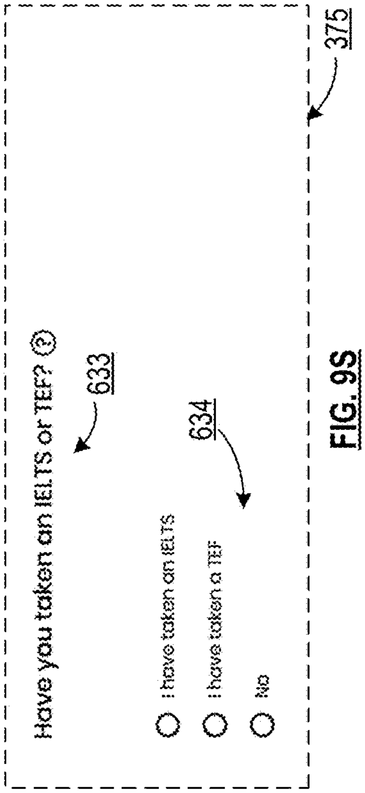
Figure 9T:
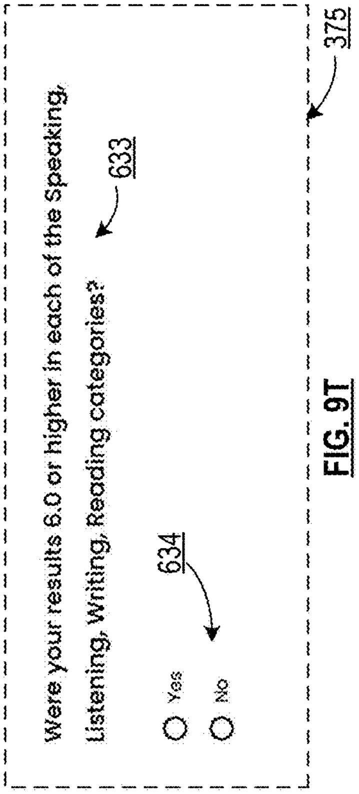
Figure 9U:
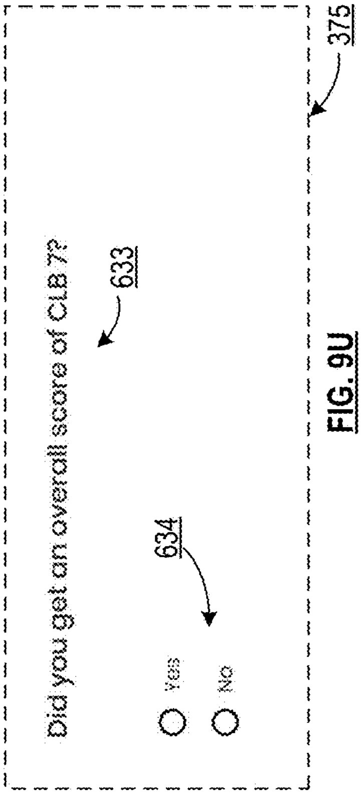
Figure 9V:
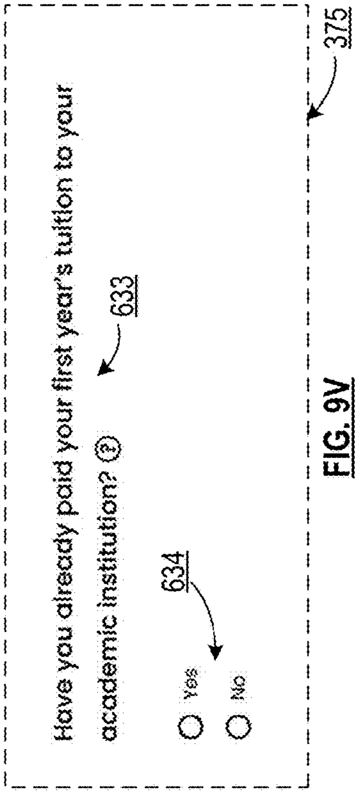
Figure 9W:
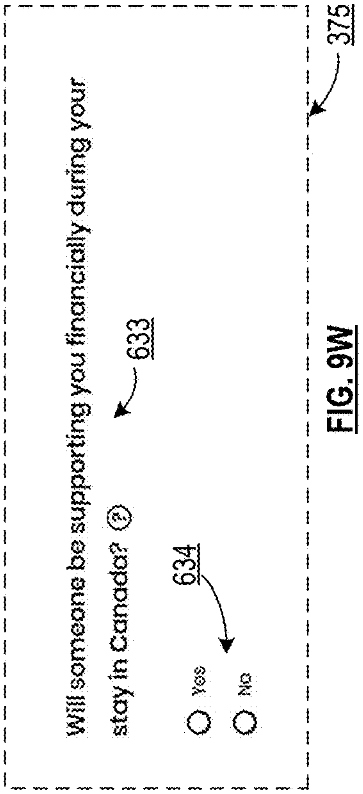
Figure 9X:
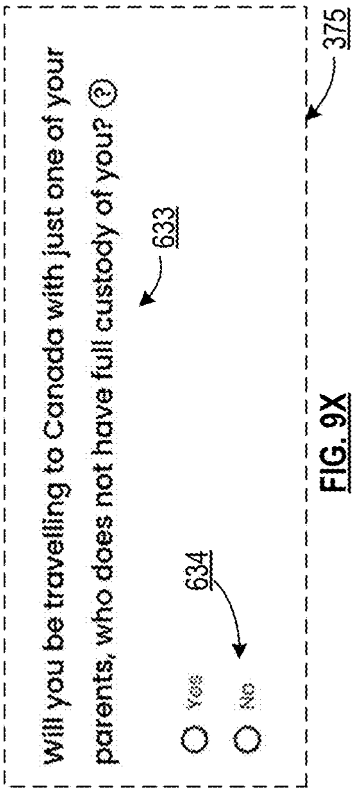
Figure 9Y:
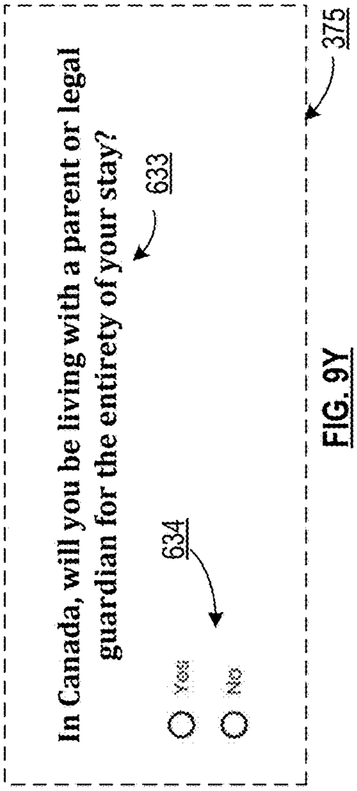
Figure 9Z:
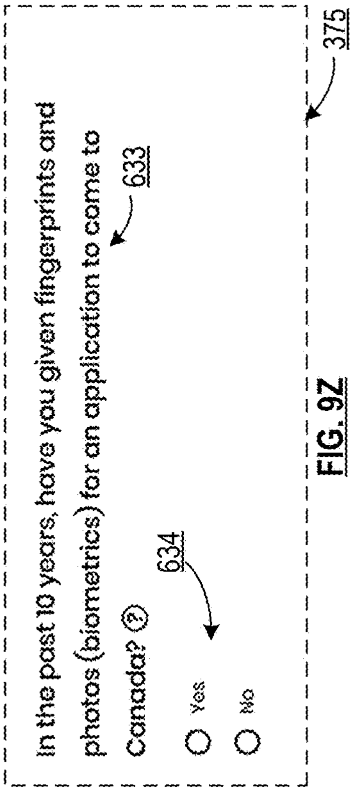
Figure 9A:
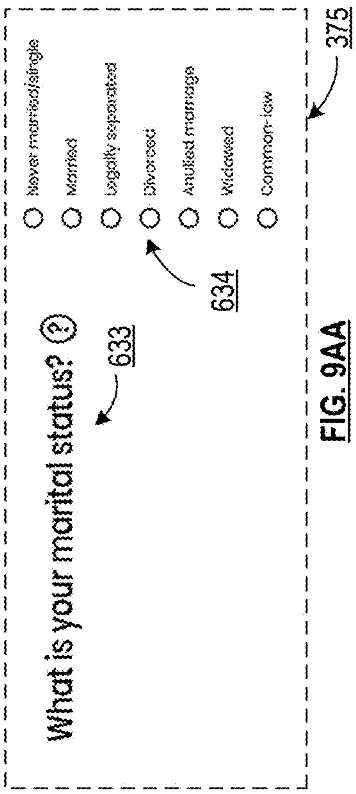
Figure 9A:
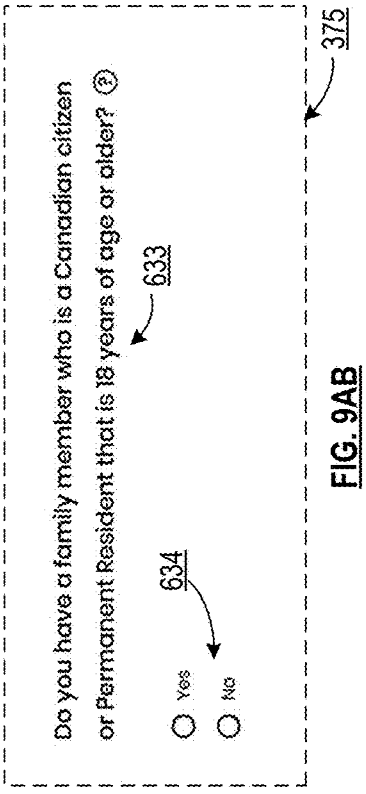
Figure 9A:
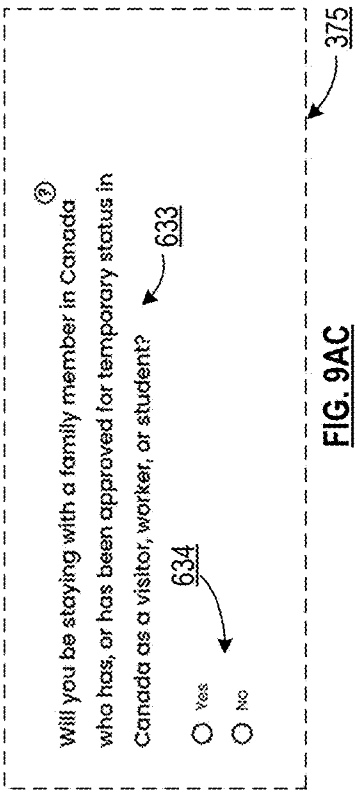
Figure 9A:
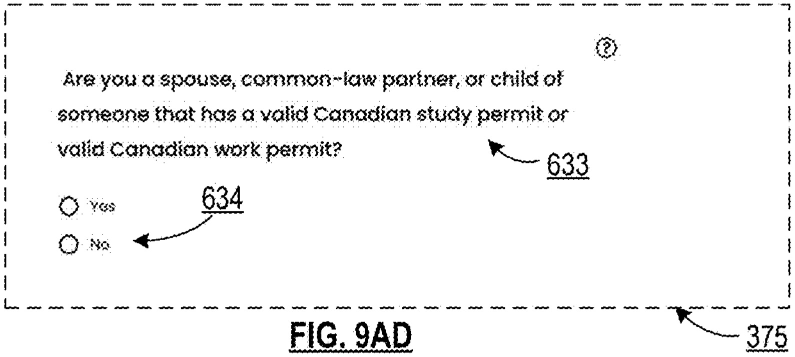
Figure 9A:
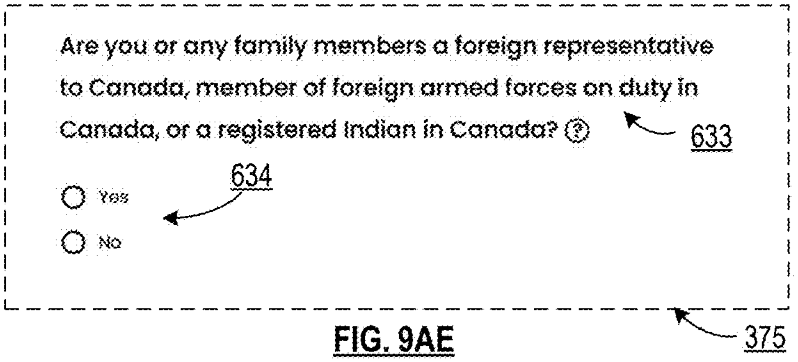
Figure 9A:
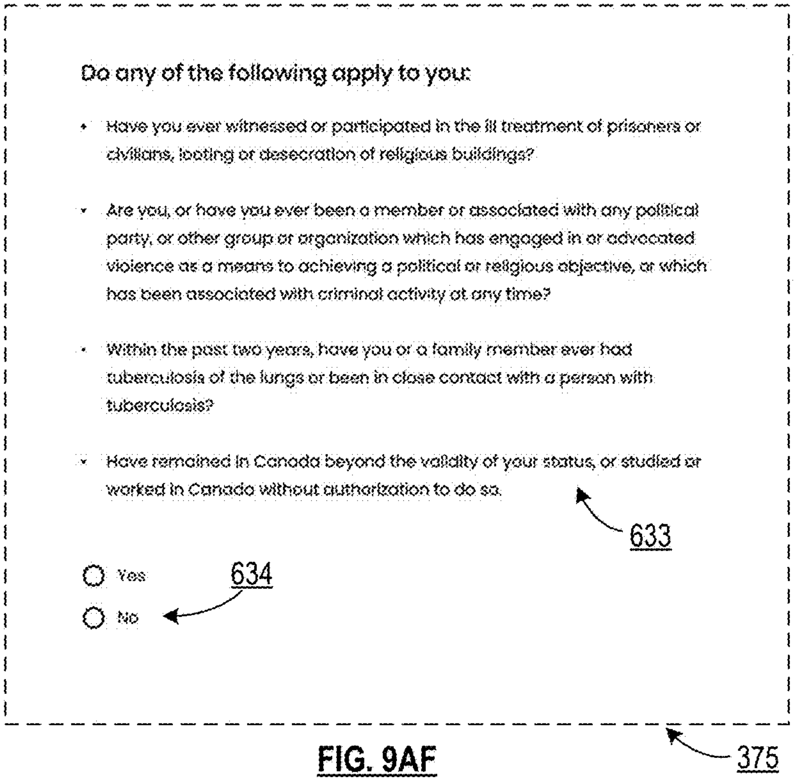
Figure 9A:
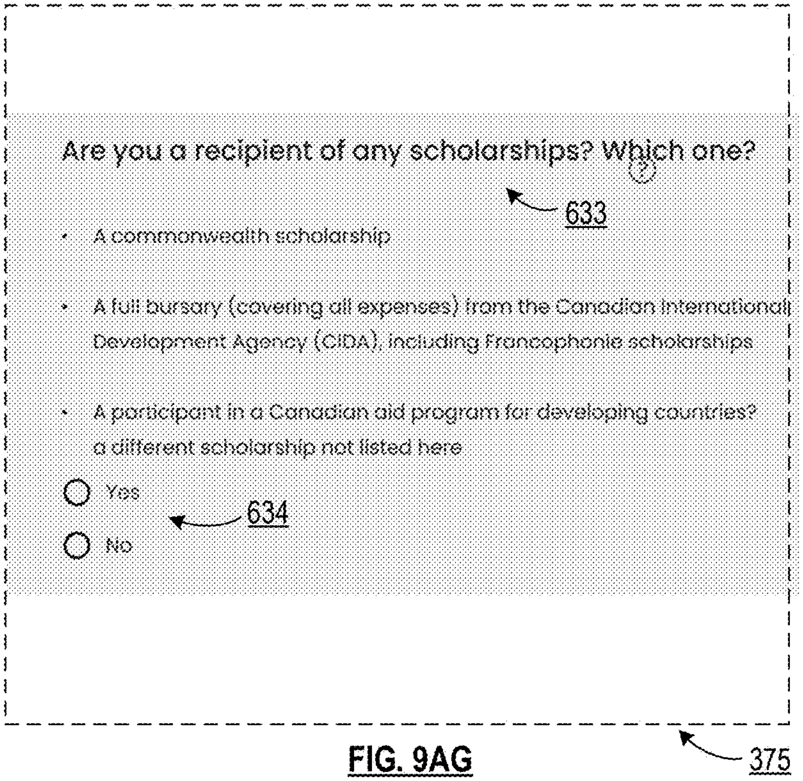
Figure 9A:
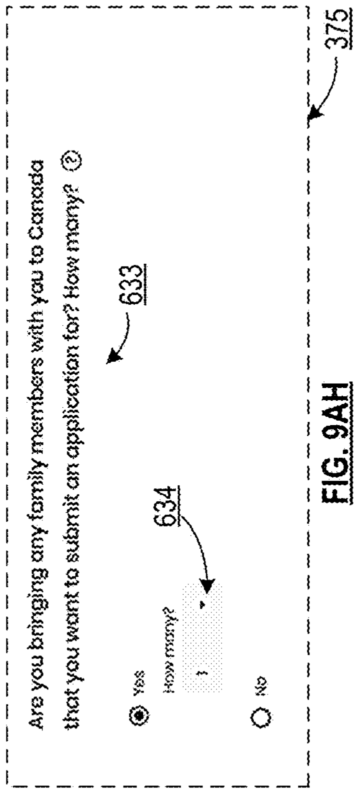
Figure 9A:
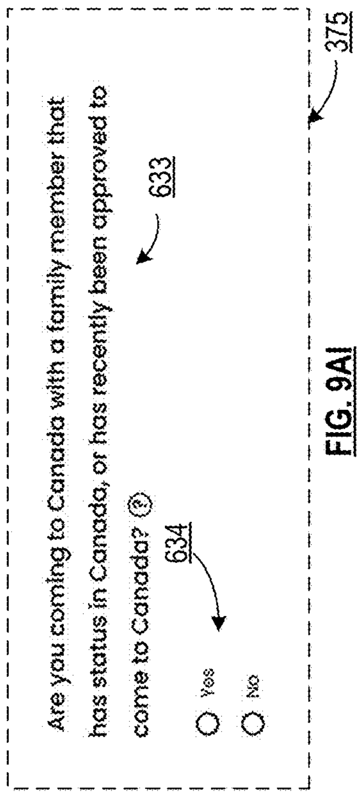
Figure 9A:
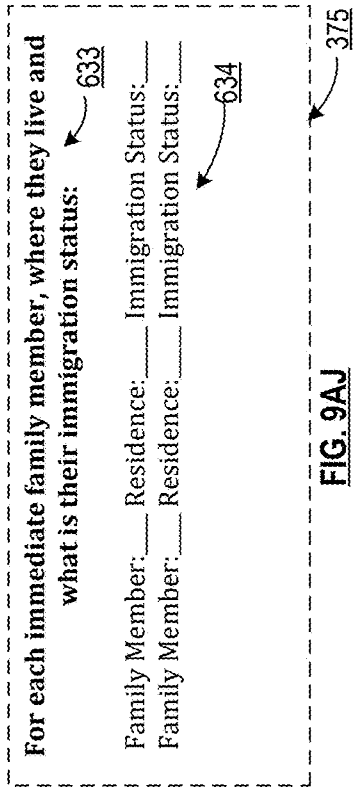
Figure 9A:
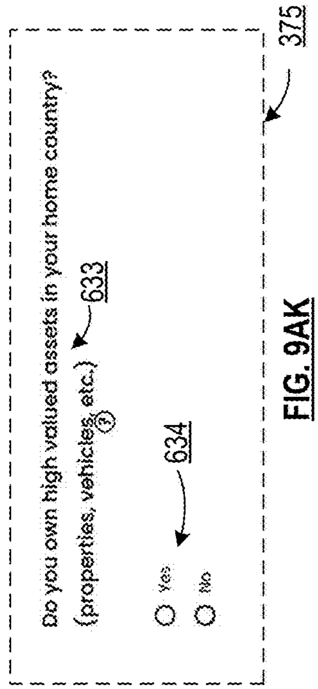
Figure 9A:
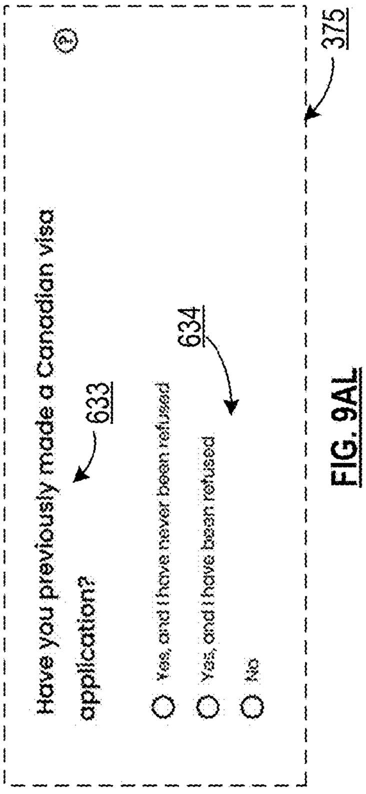
Figure 9A:
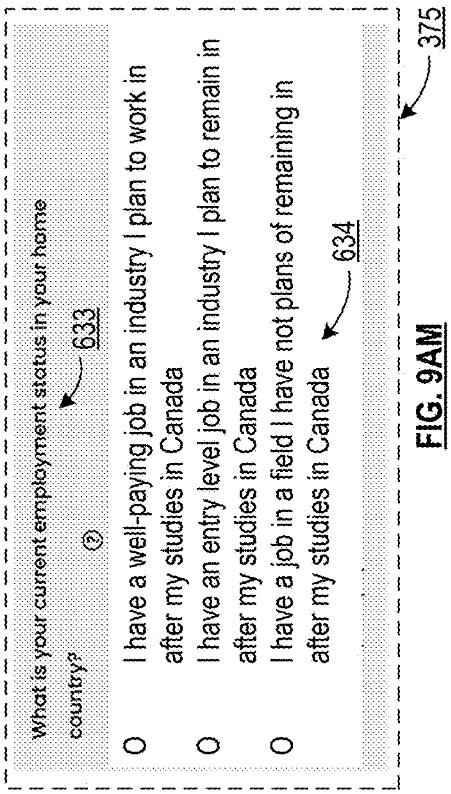
Figure 9A:
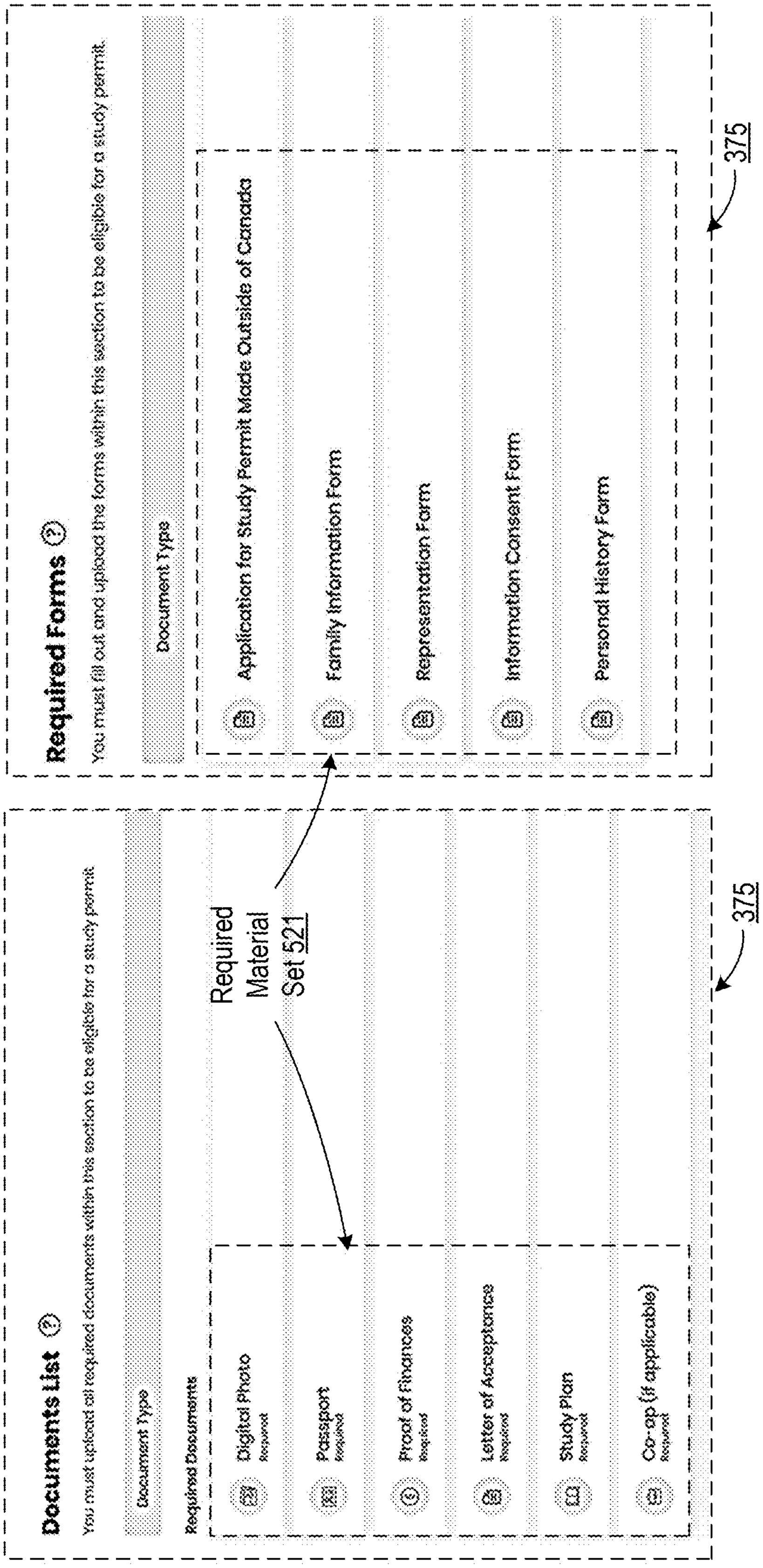
Figure 9A:
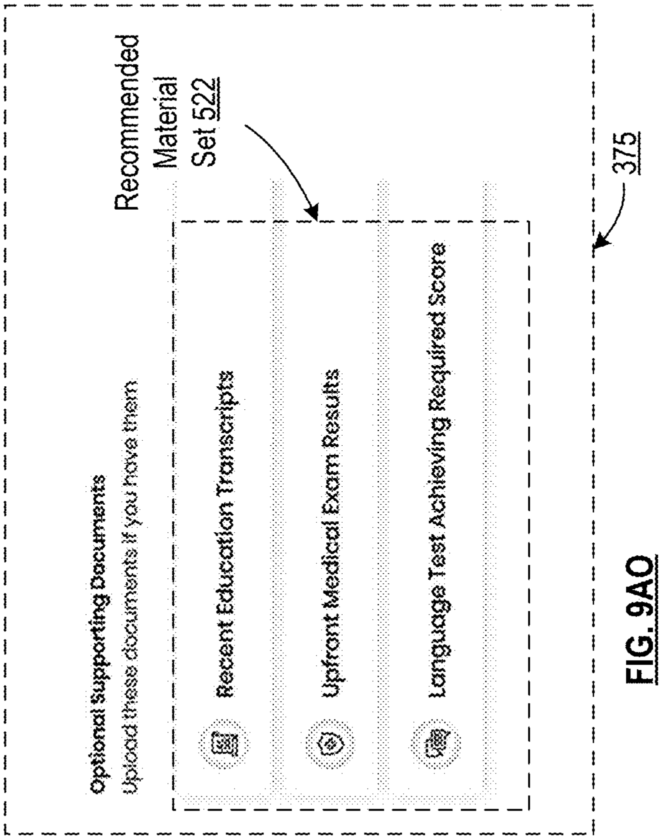
Figure 9A:
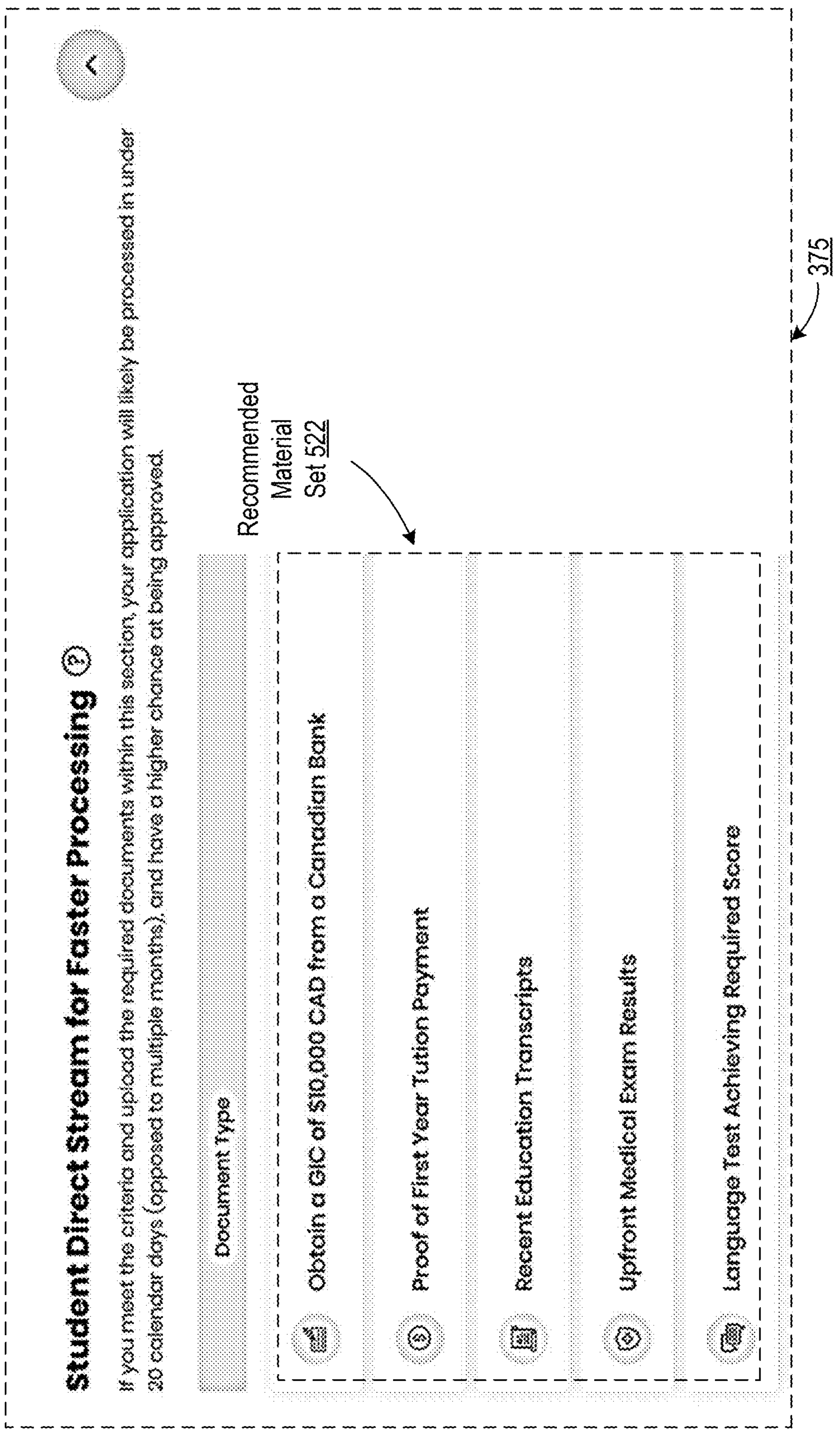
Figure 10A:
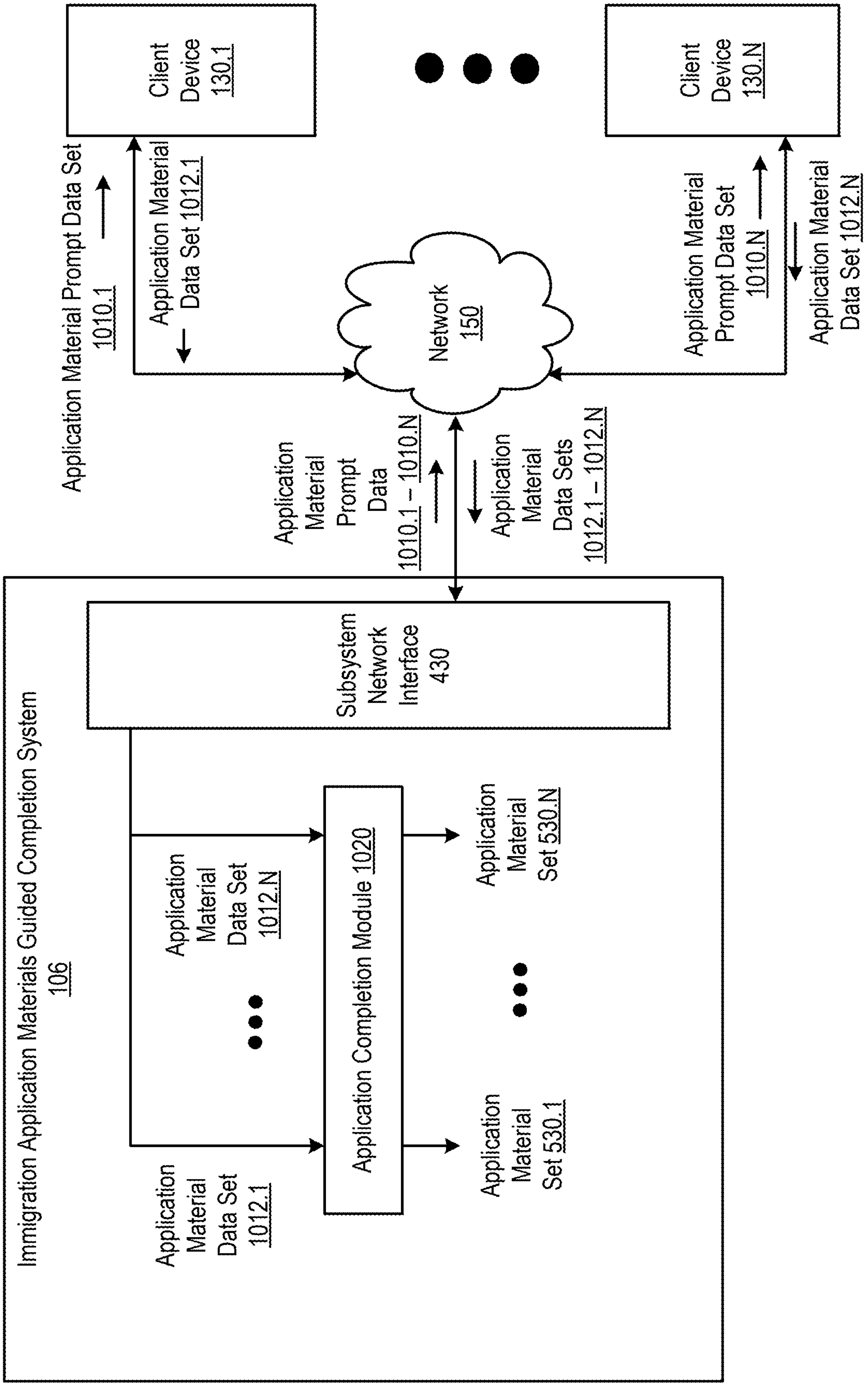
Figure 10B:
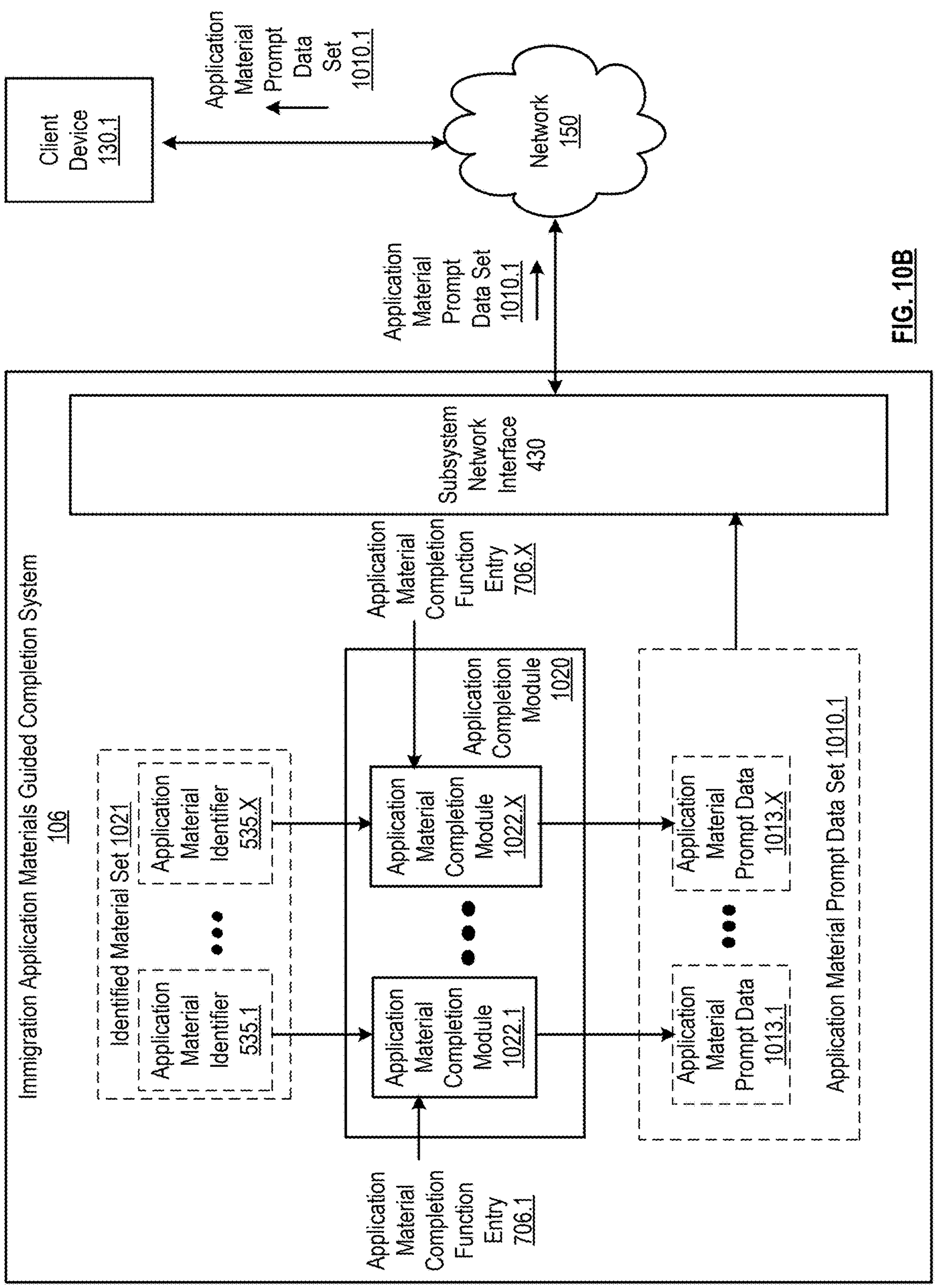
Figure 10C:
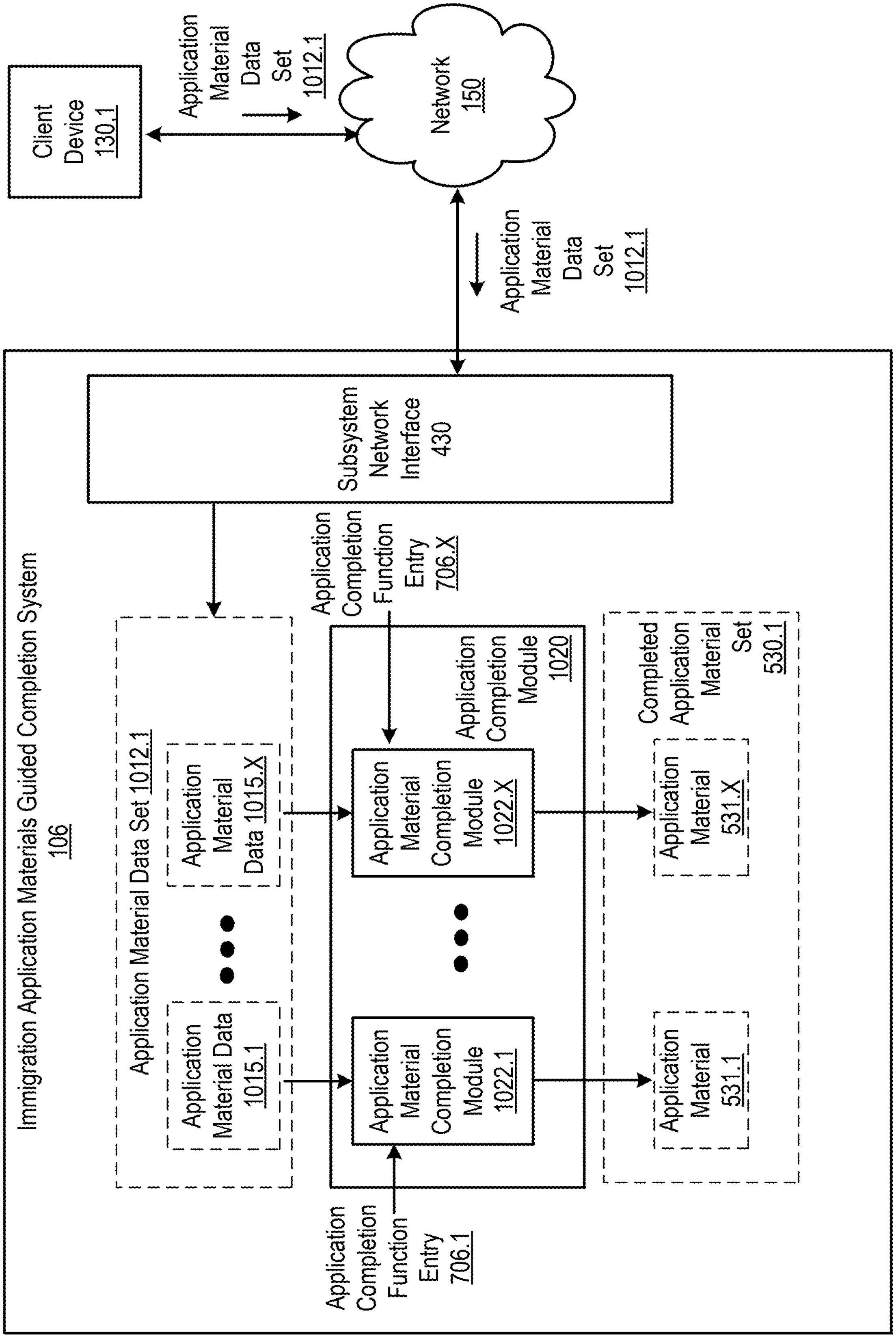
Figure 10D:
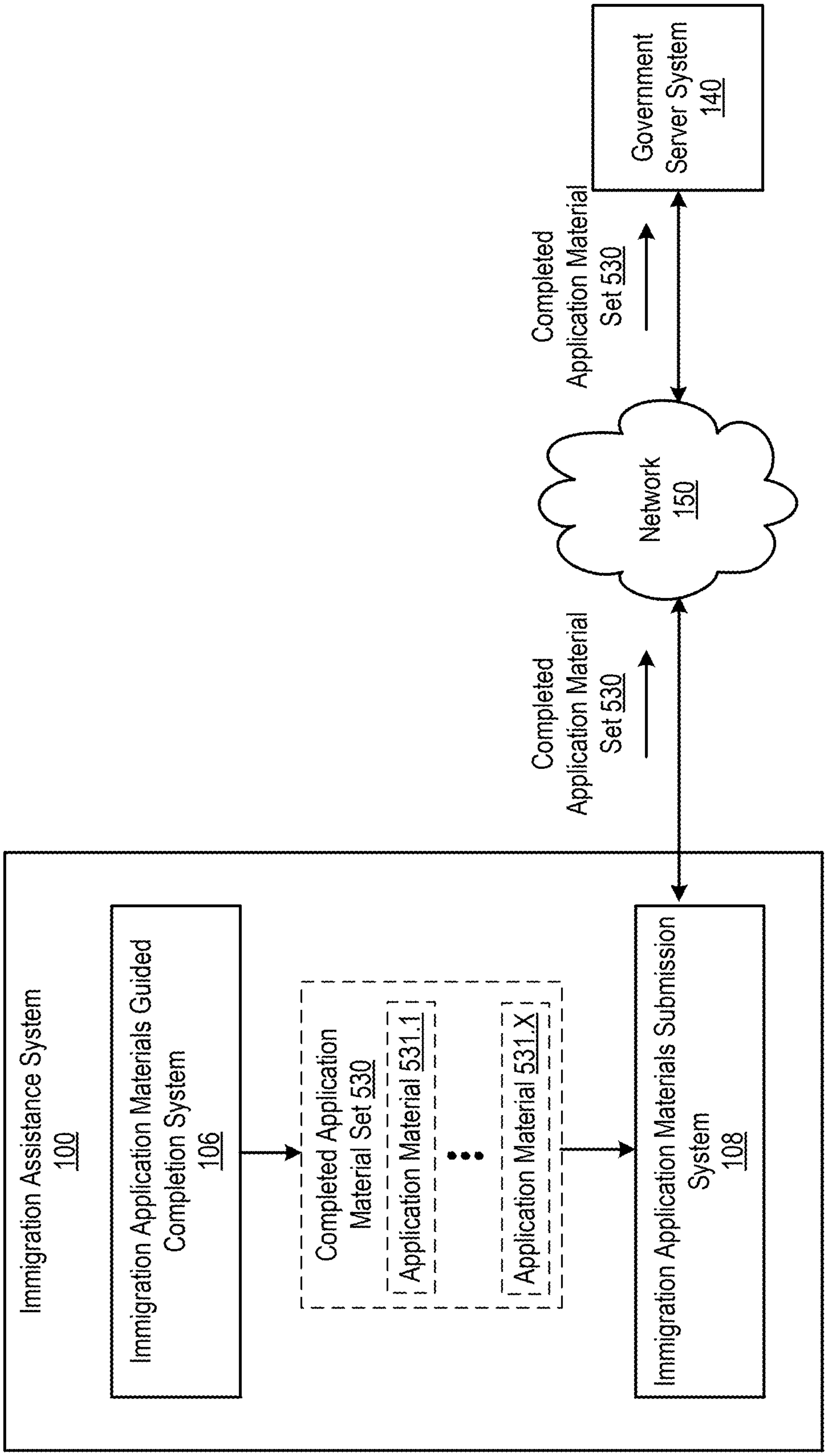
Figure 10E:
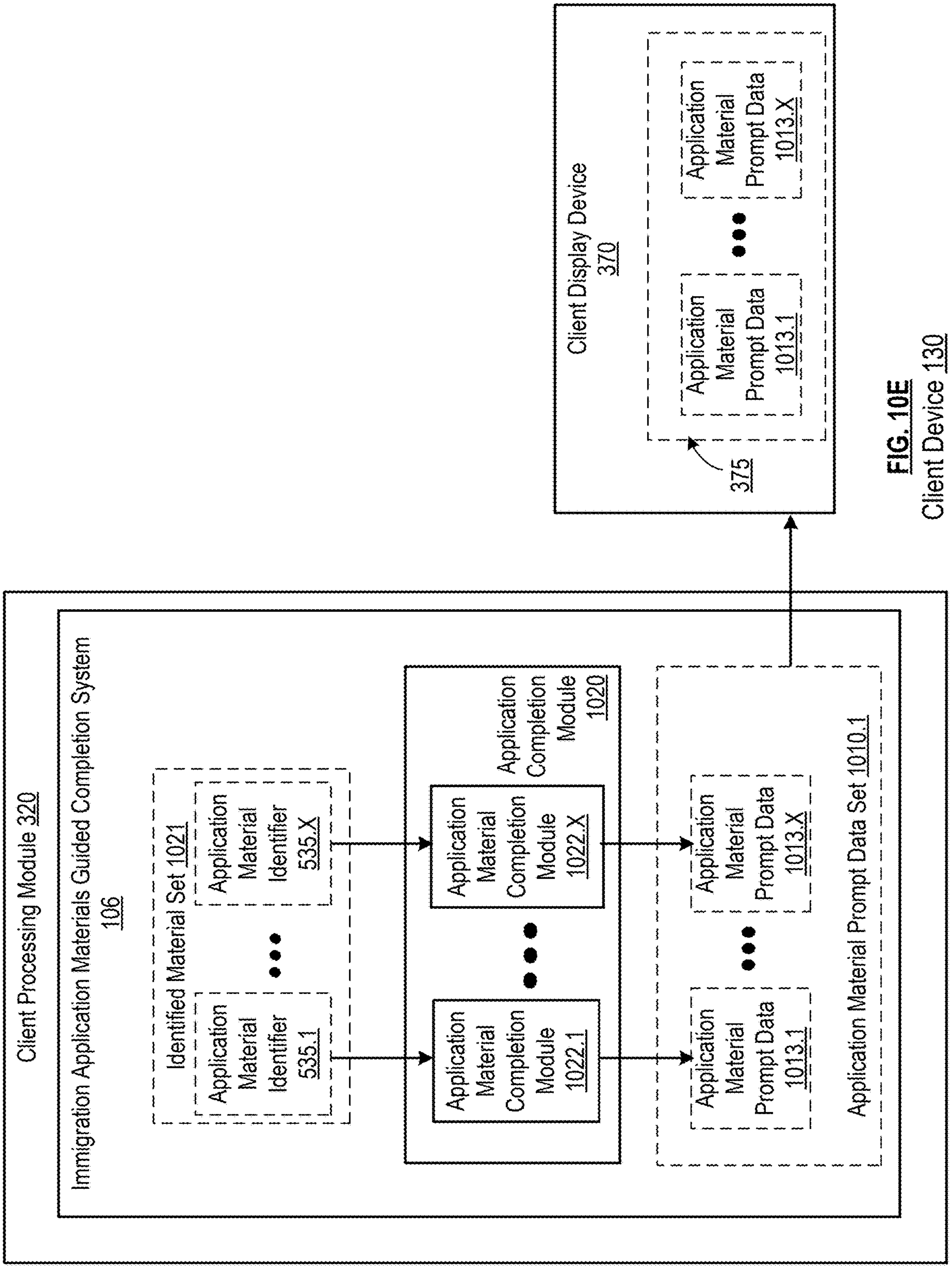
Figure 10F:
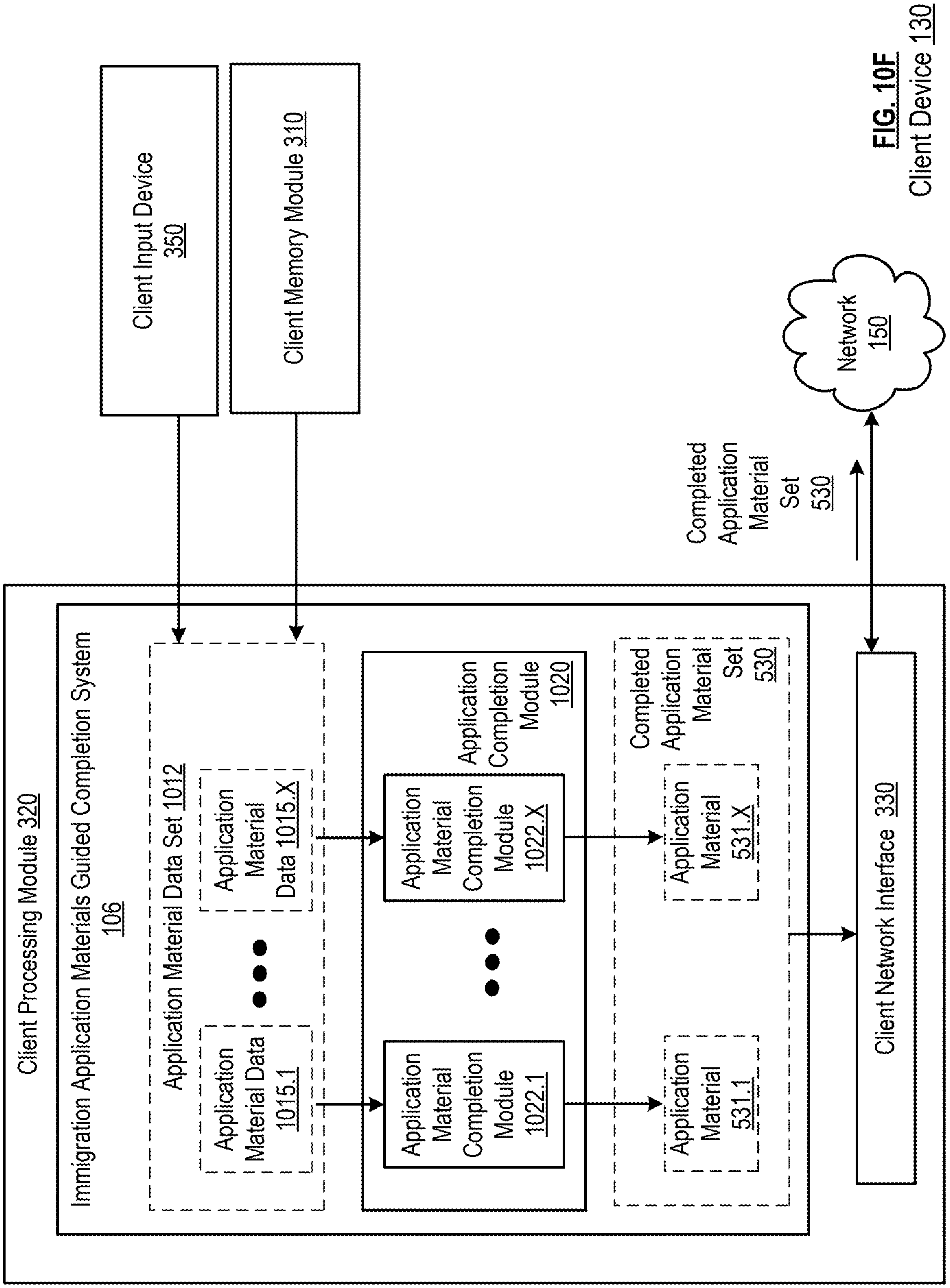
Figure 11A:
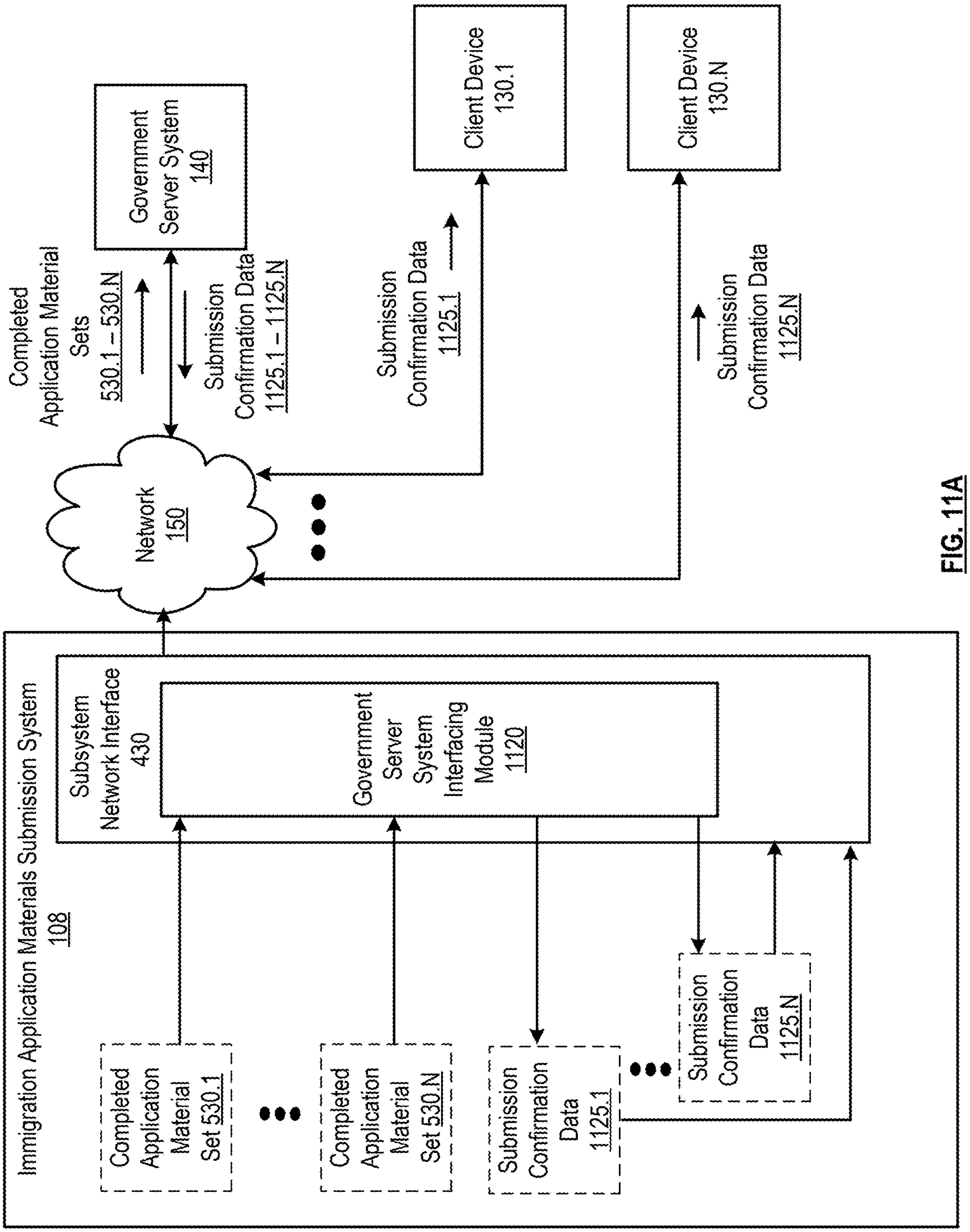
Figure 11B:
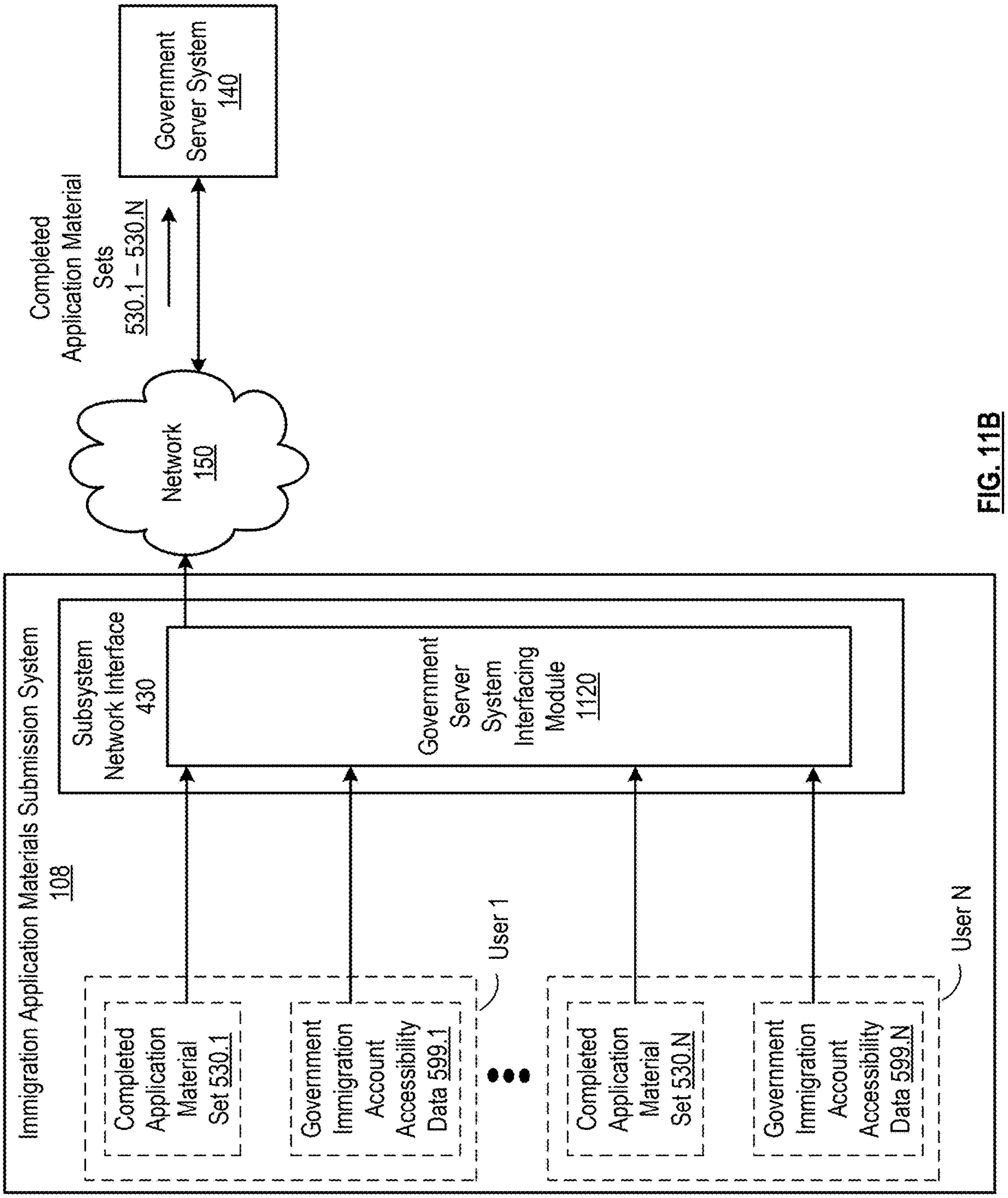
Figure 11C:
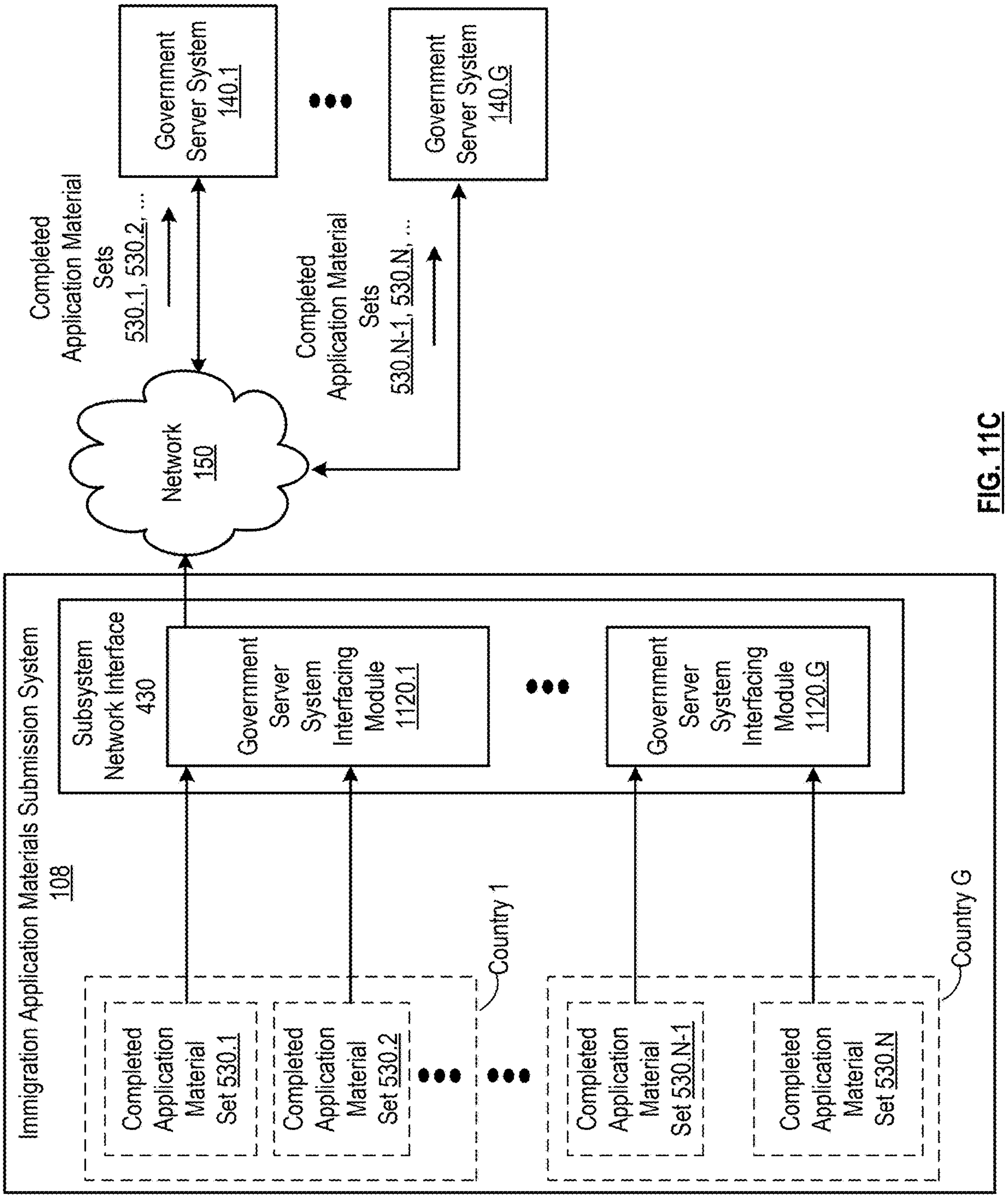
Figure 11D:
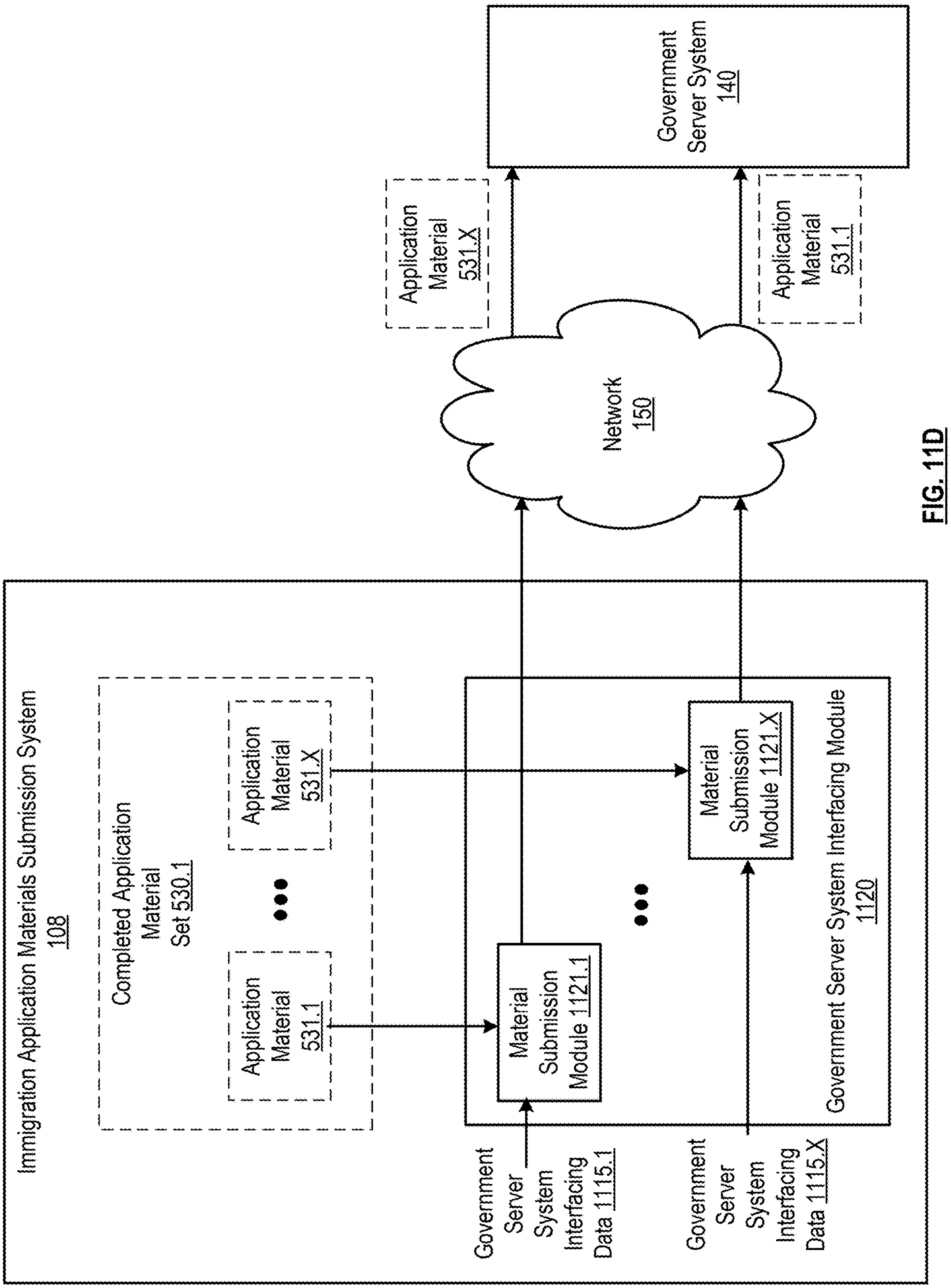
Figure 11E:
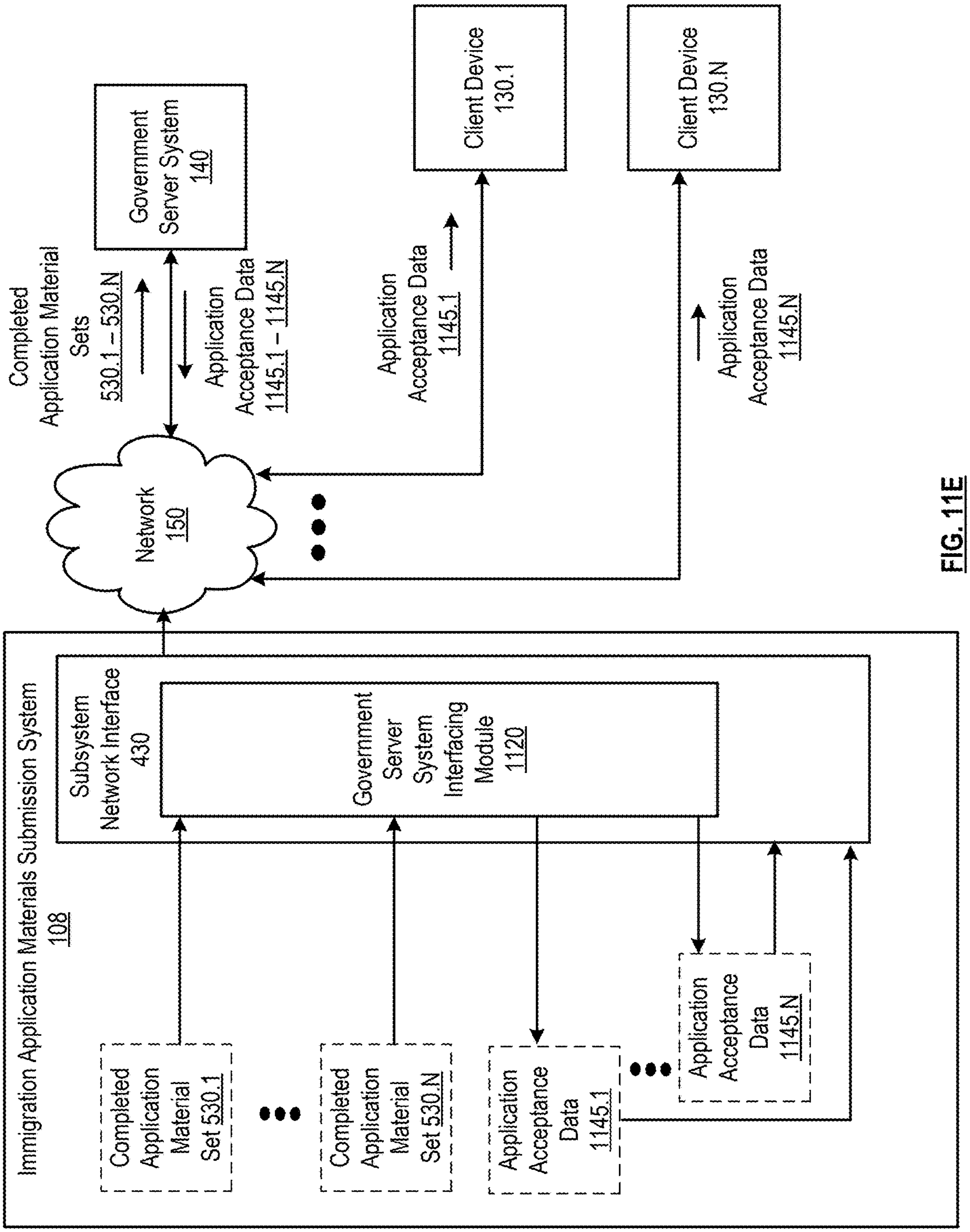
Figure 11F:
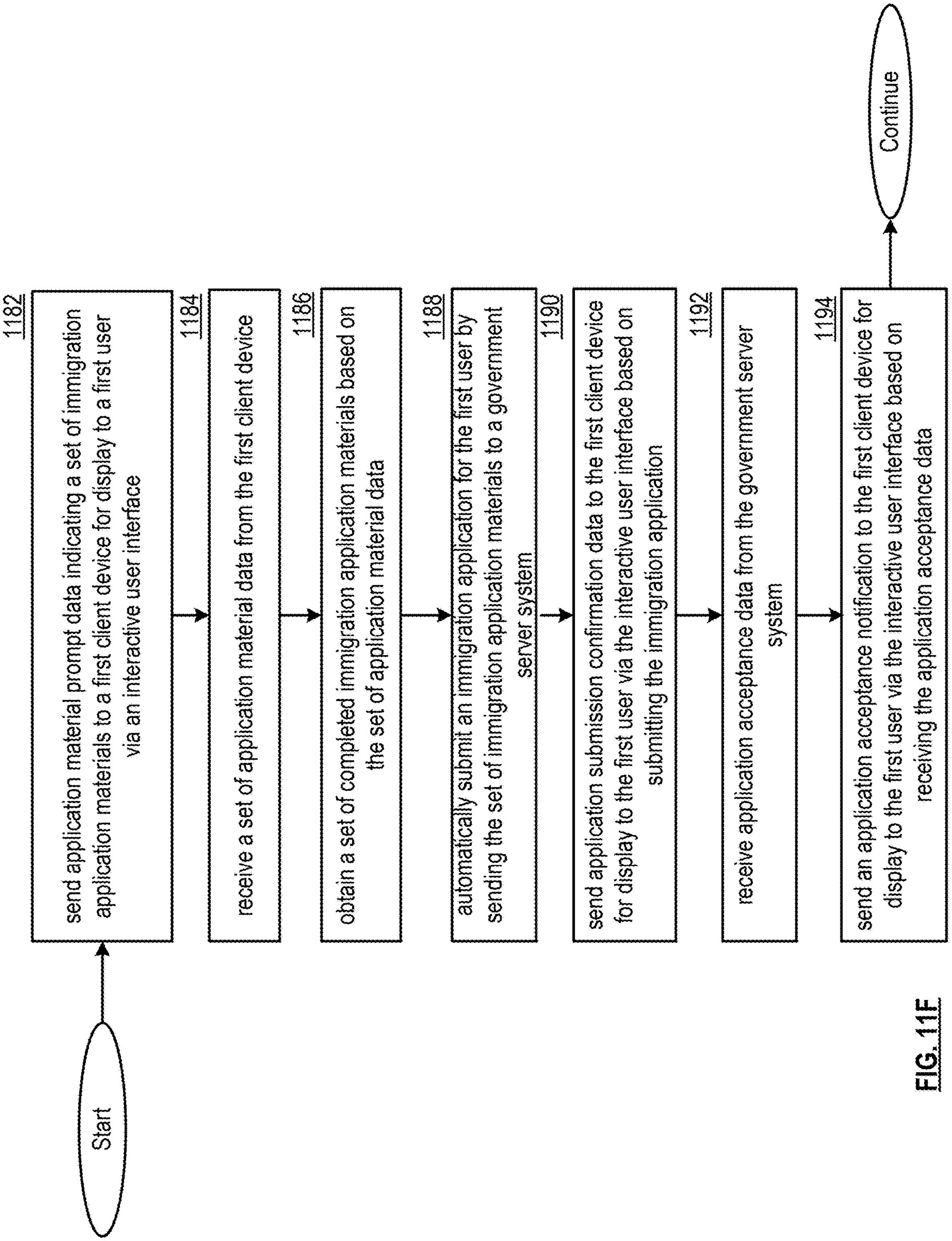
Figure 11G:
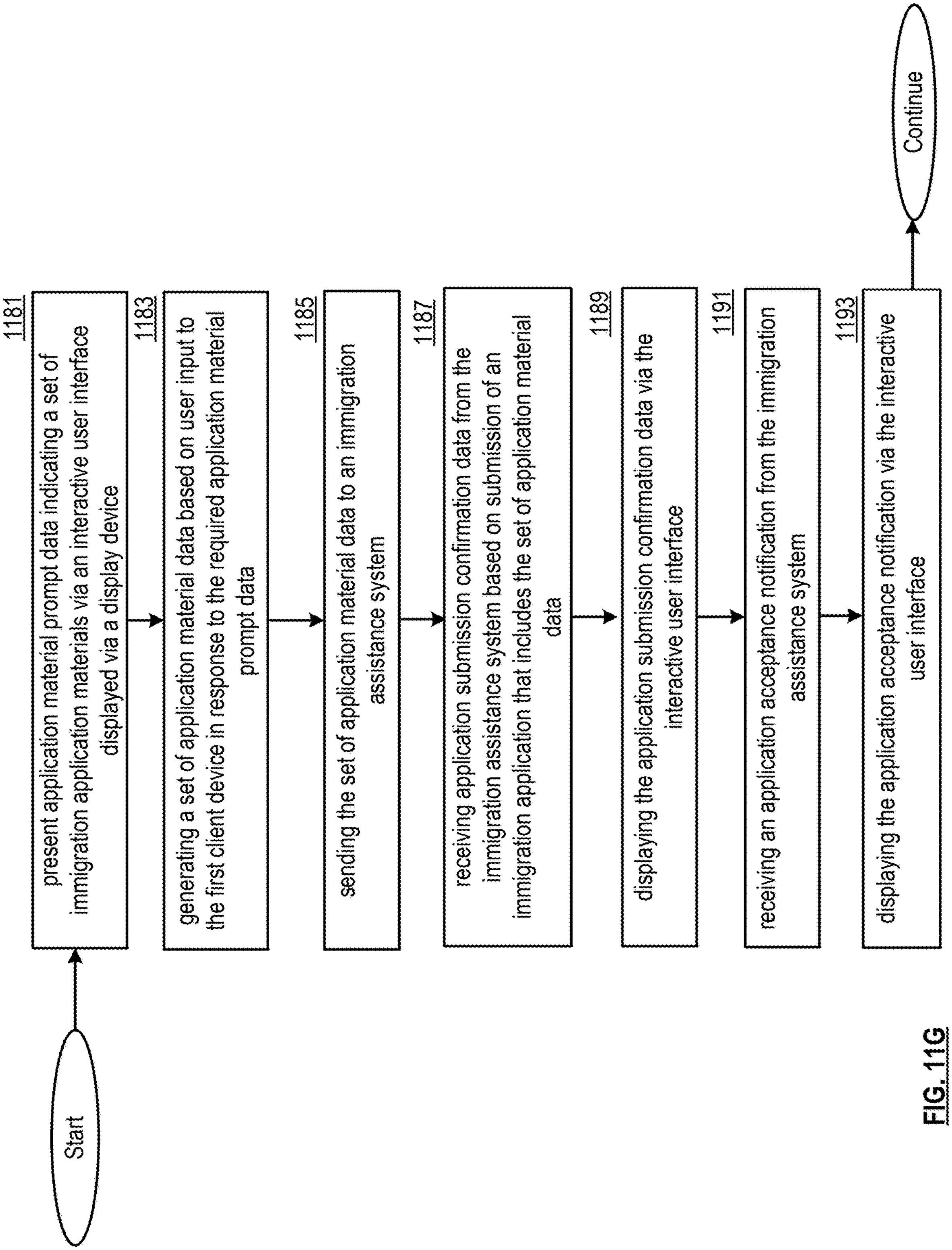
Figure 12A:
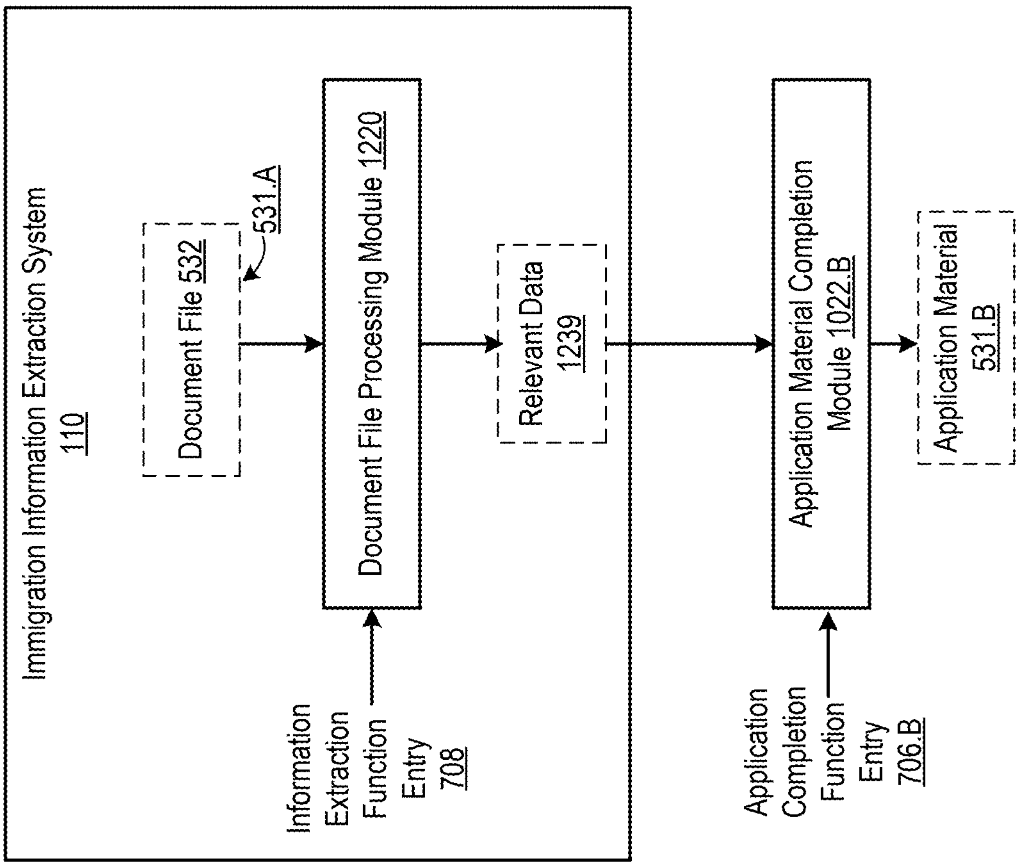
Figure 12B:
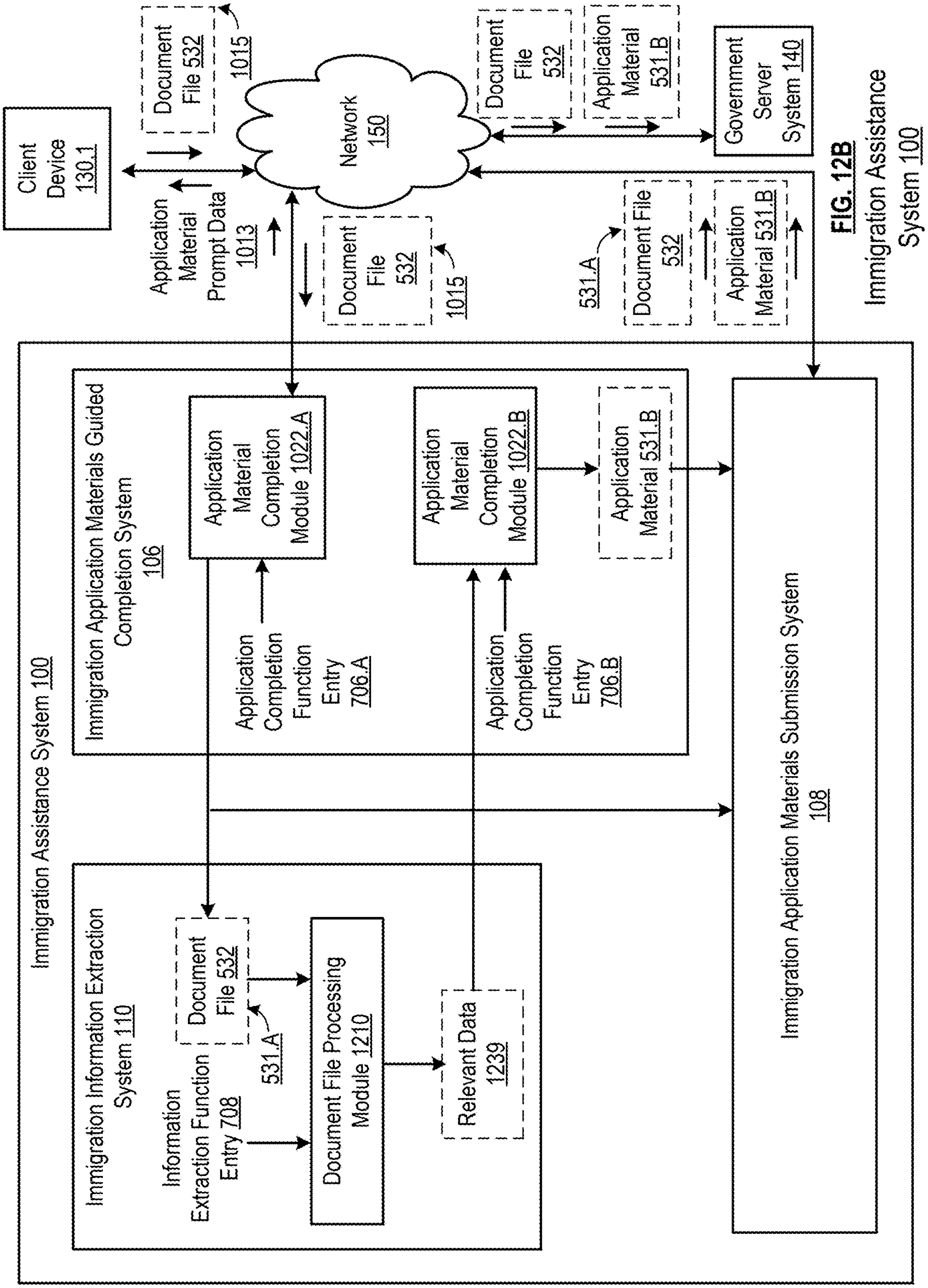
Figure 12C:
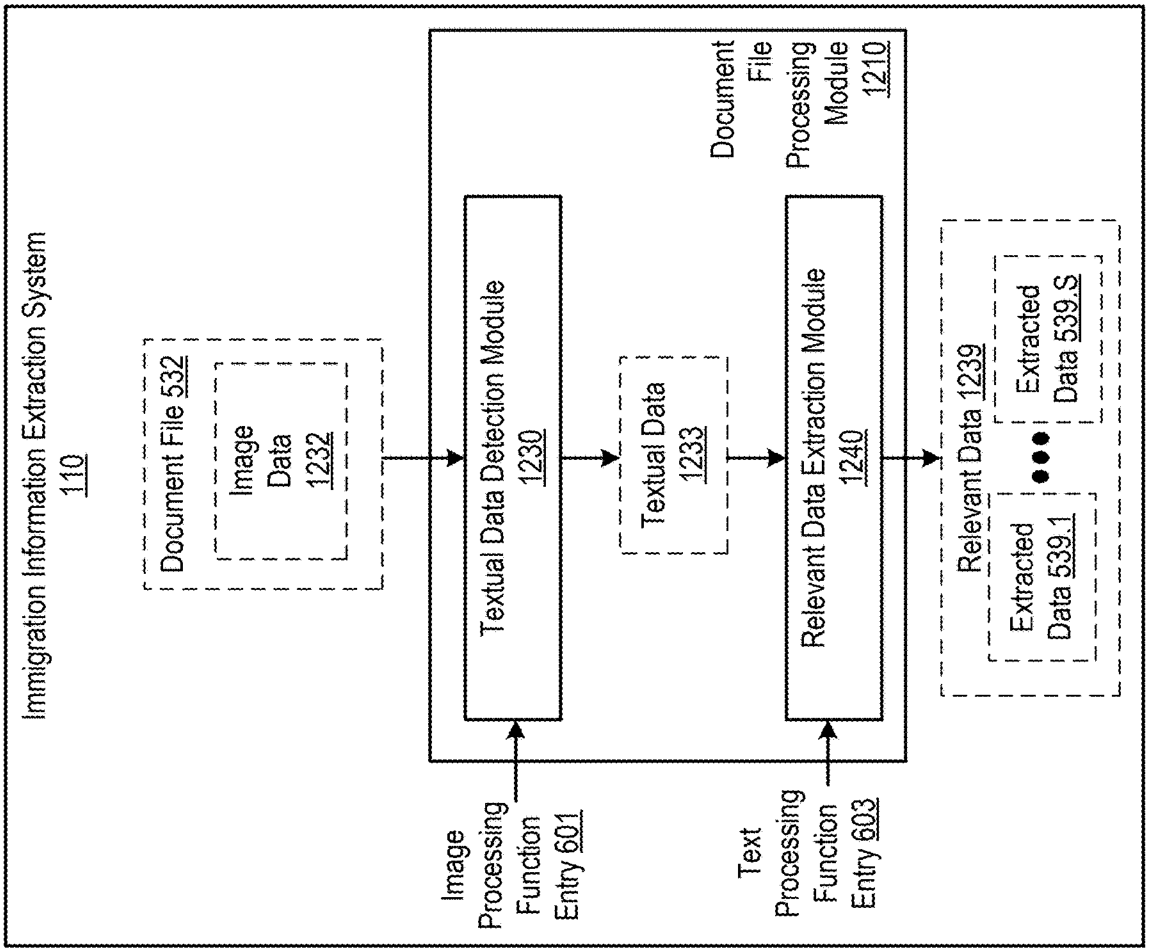
Figure 12D:
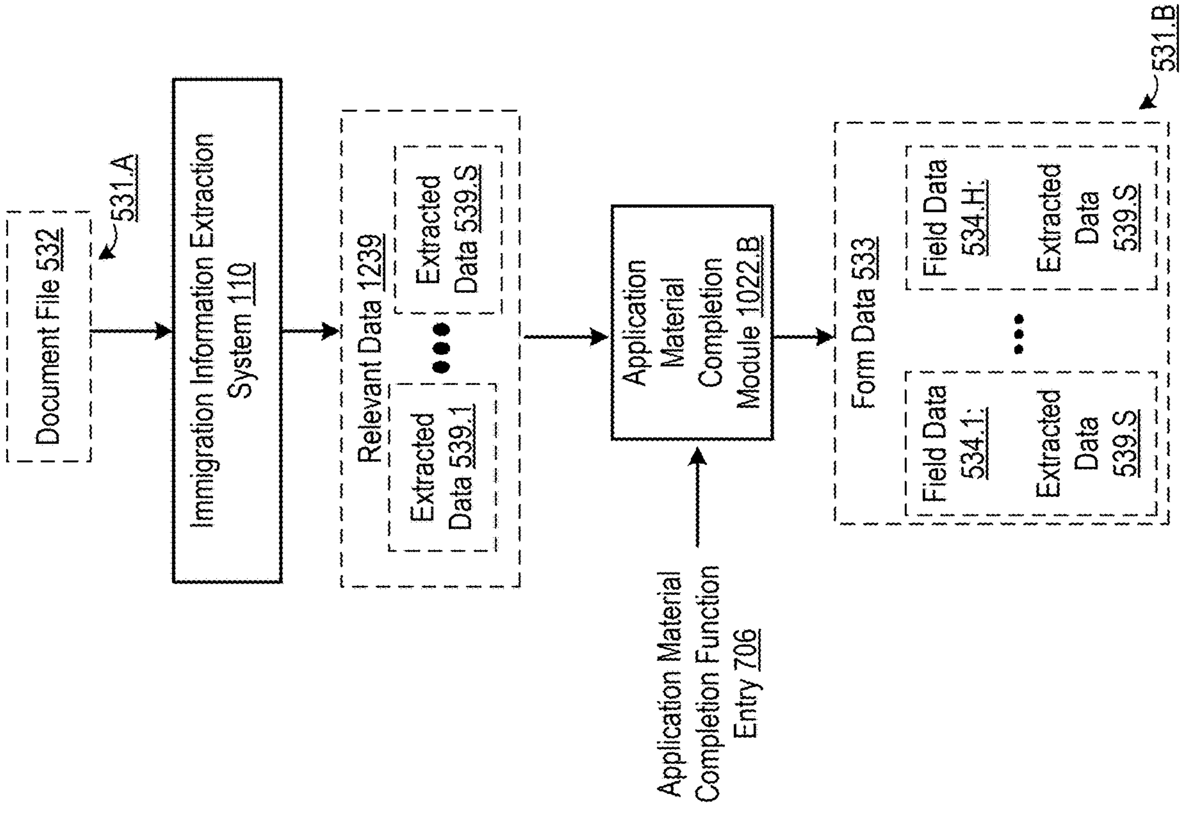
Figure 12E:
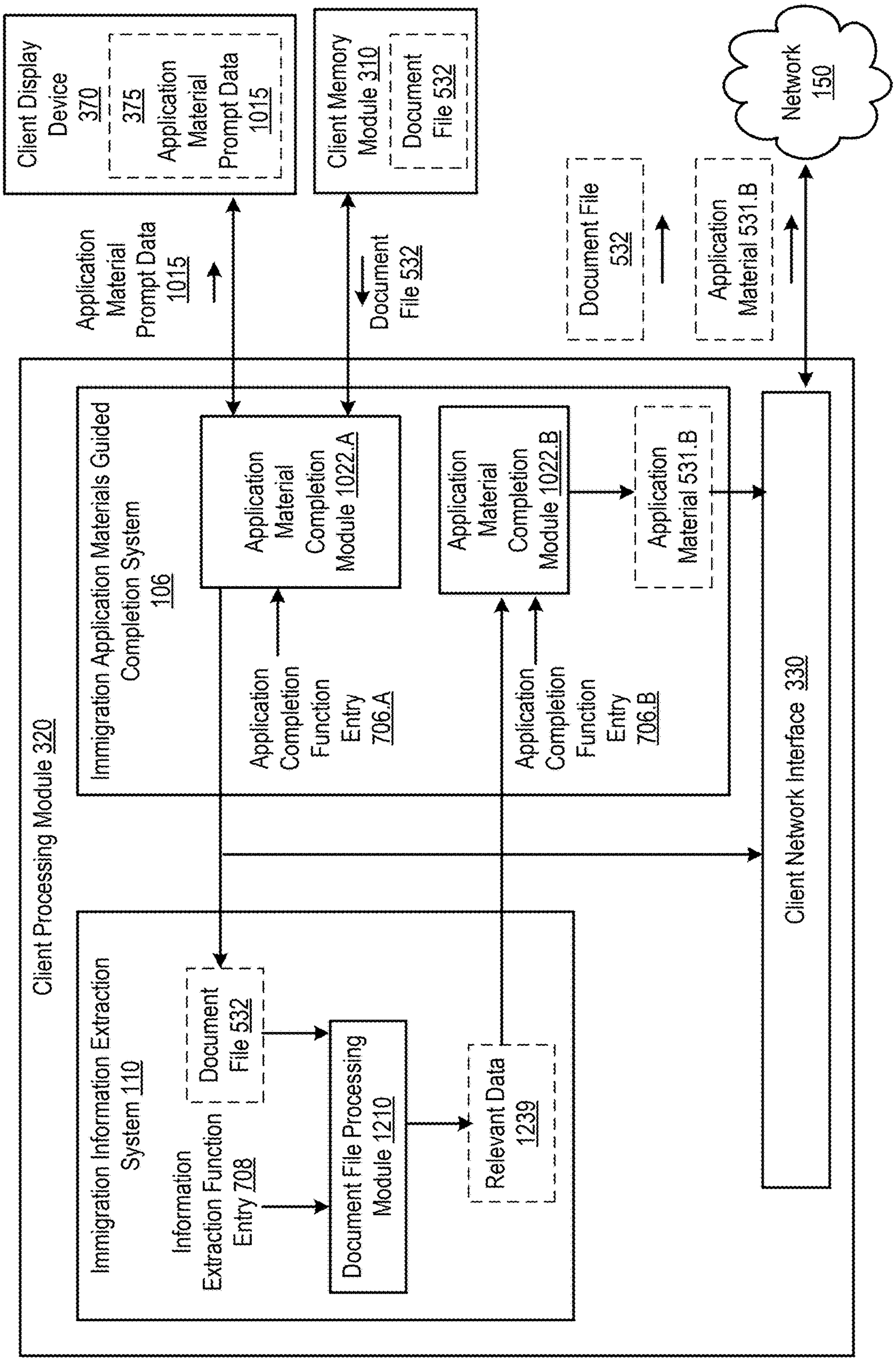
Figure 12F:
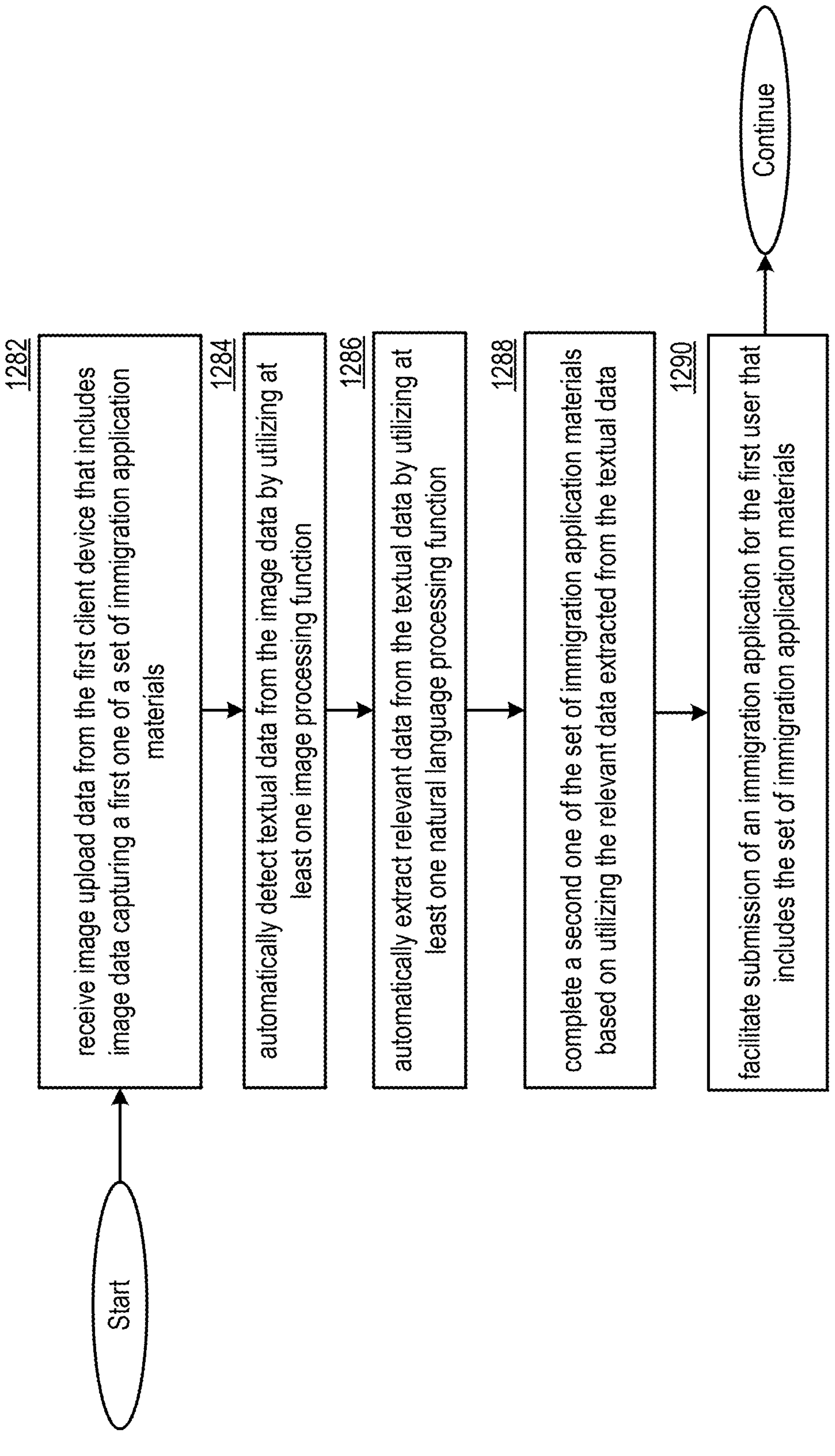
Figure 12G:
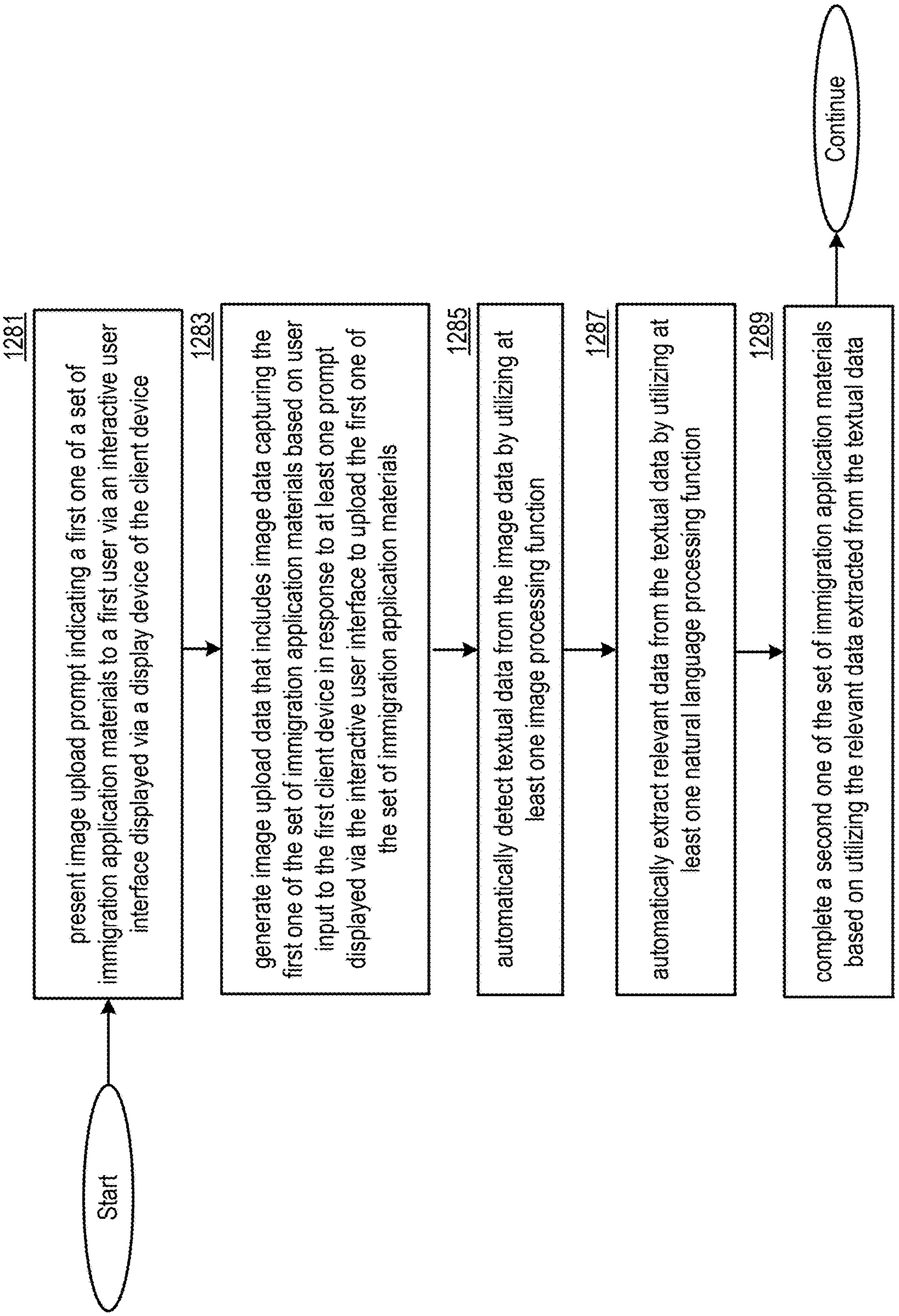
Figure 13A:
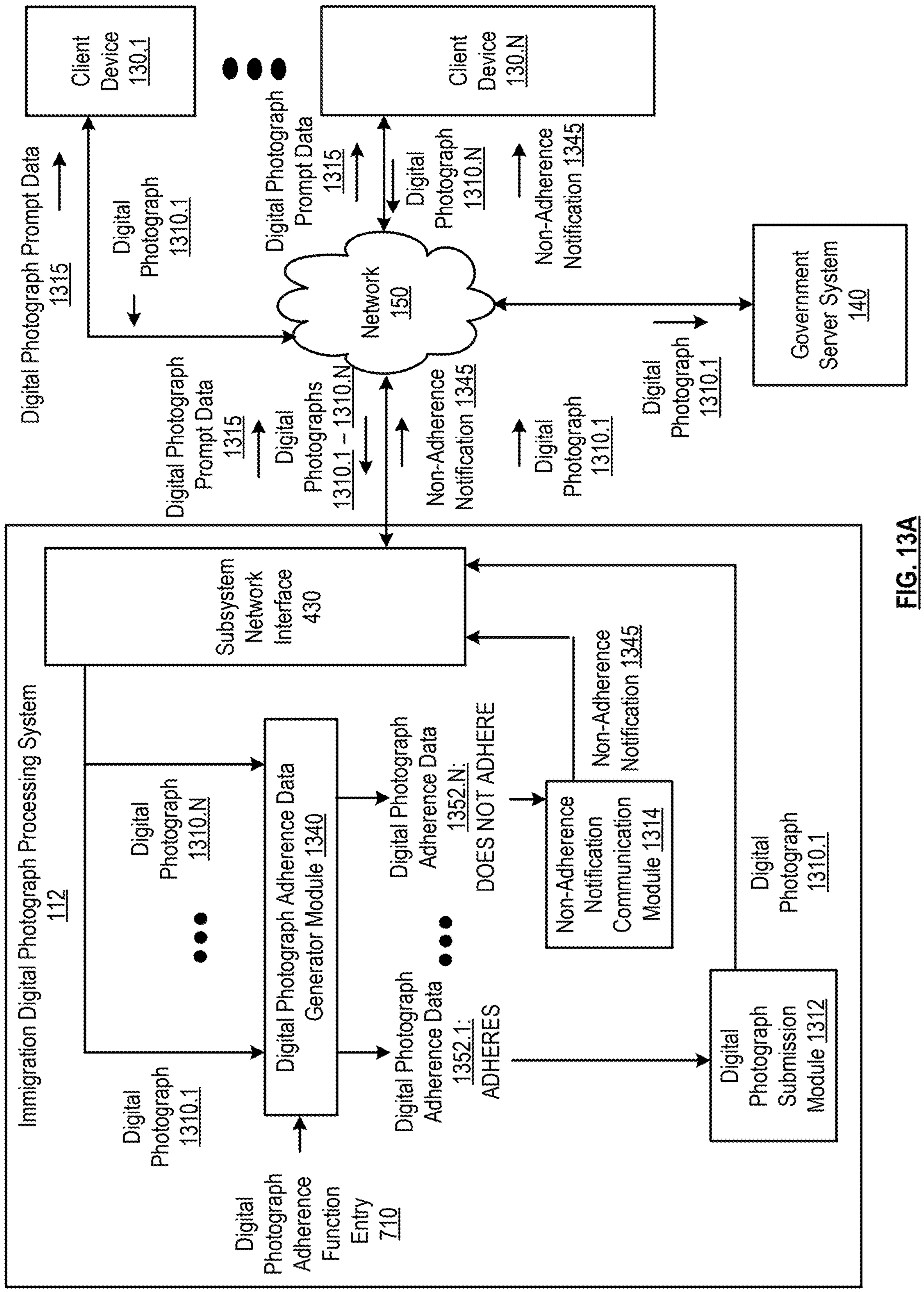
Figure 13B:
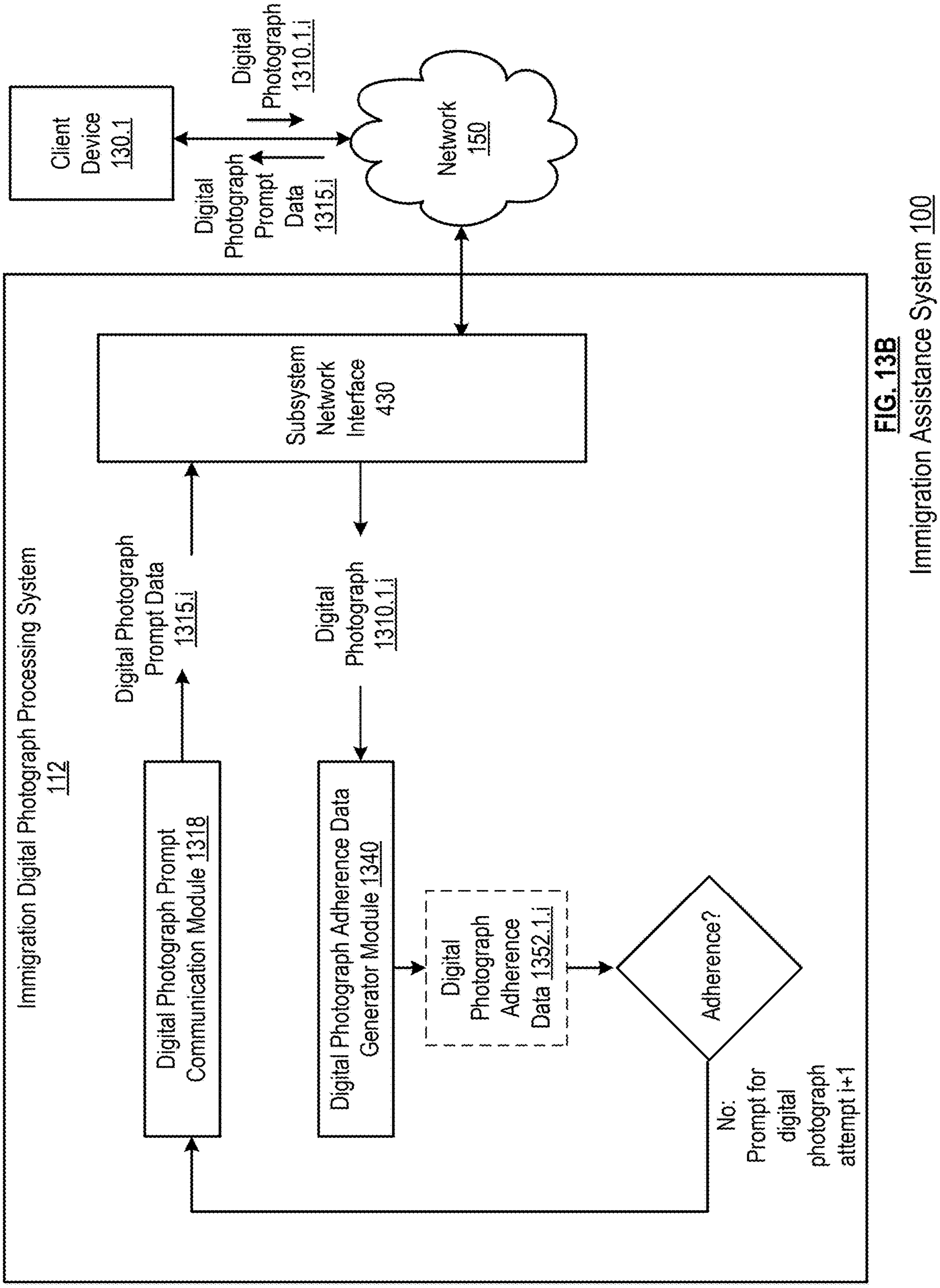
Figure 13C:
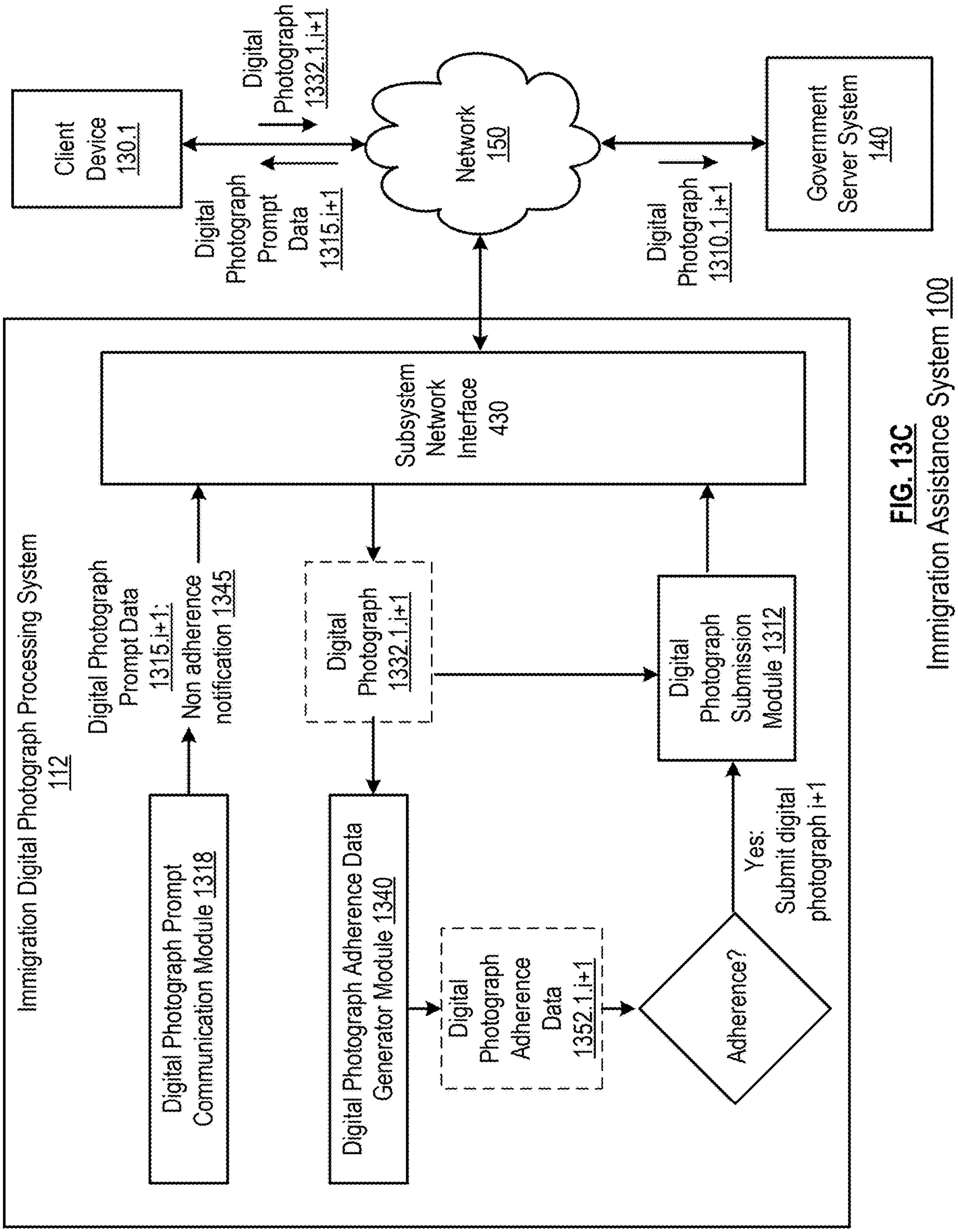
Figure 13D:
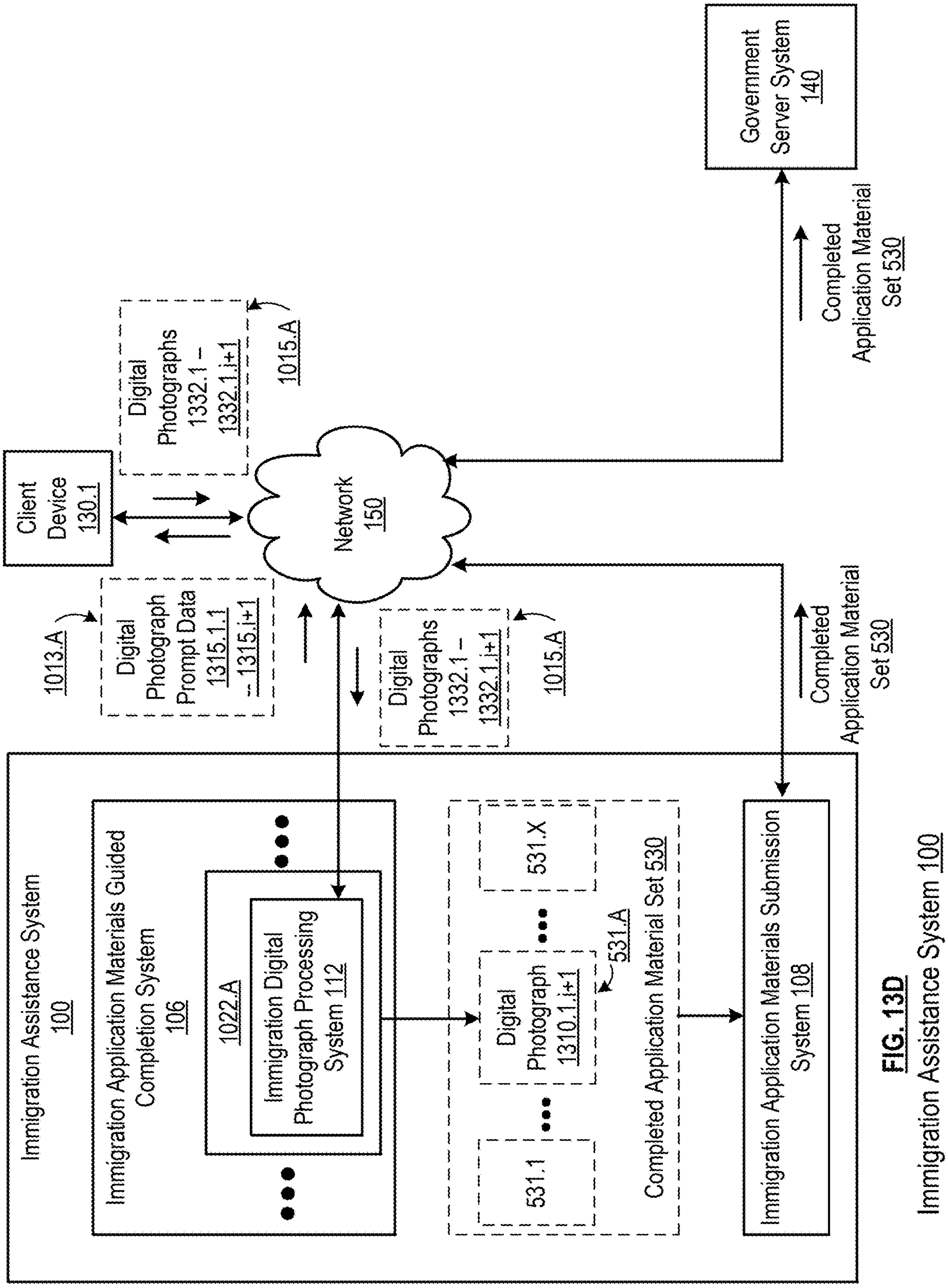
Figure 13E:
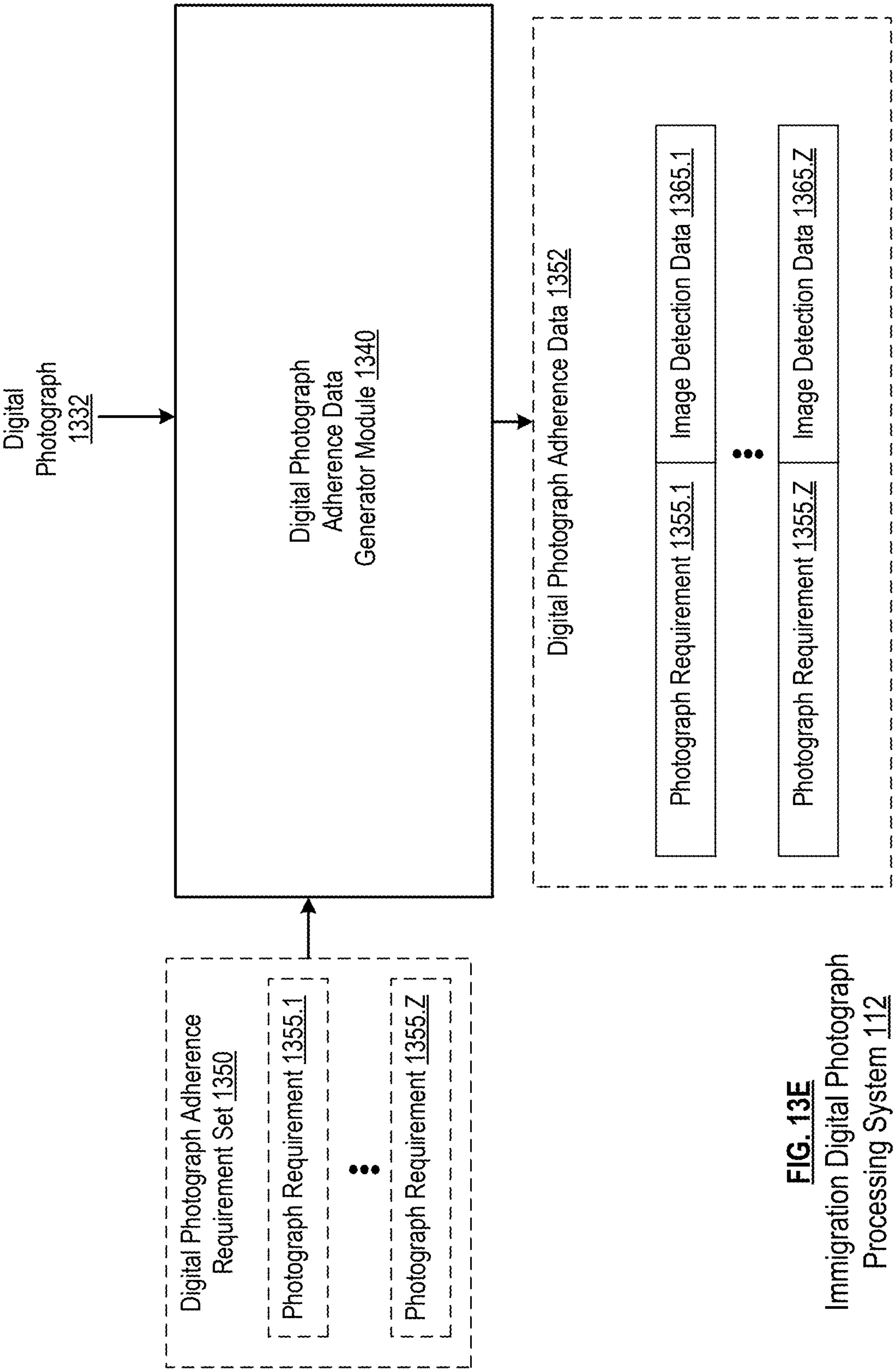
Figure 13F:
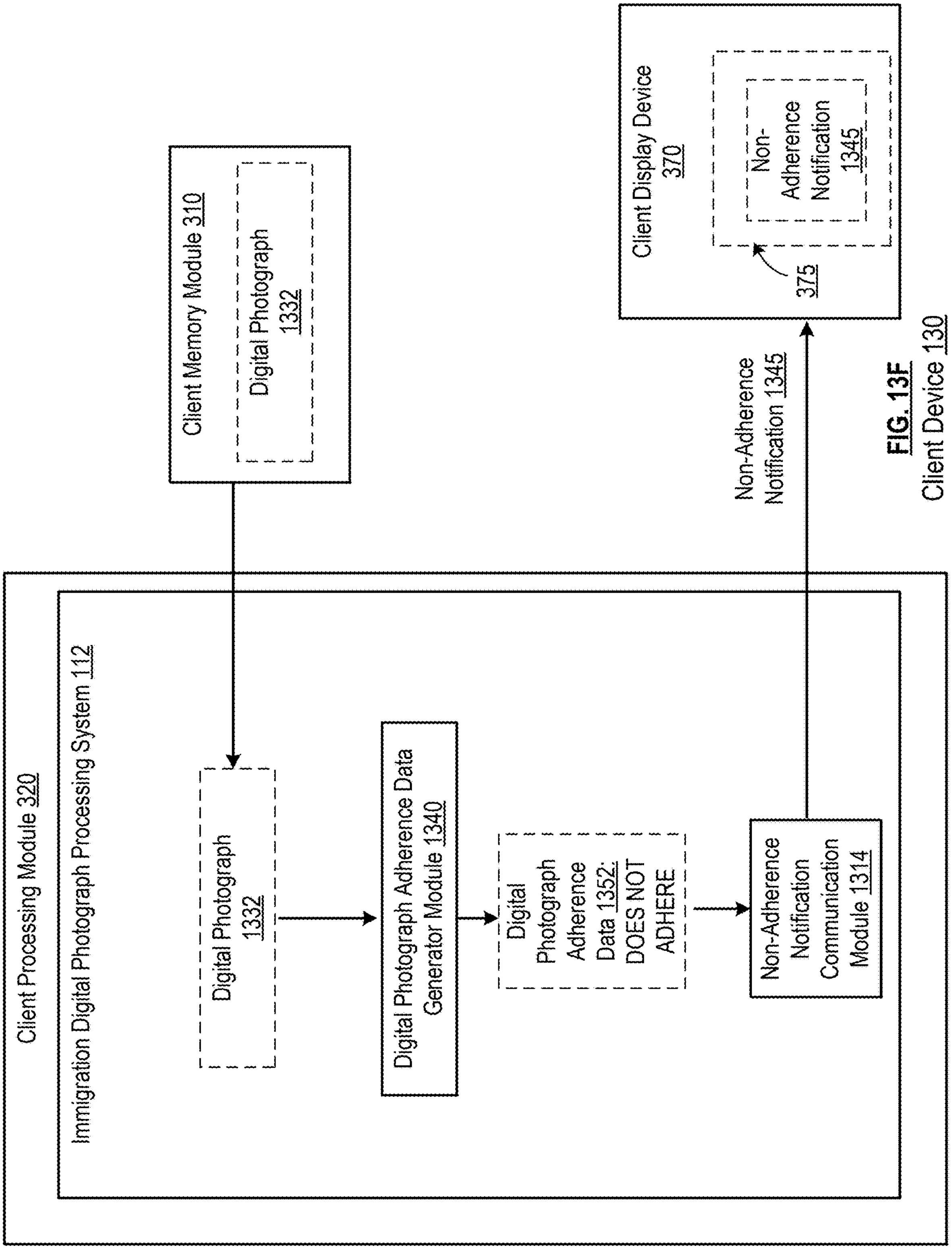
Figure 13G:
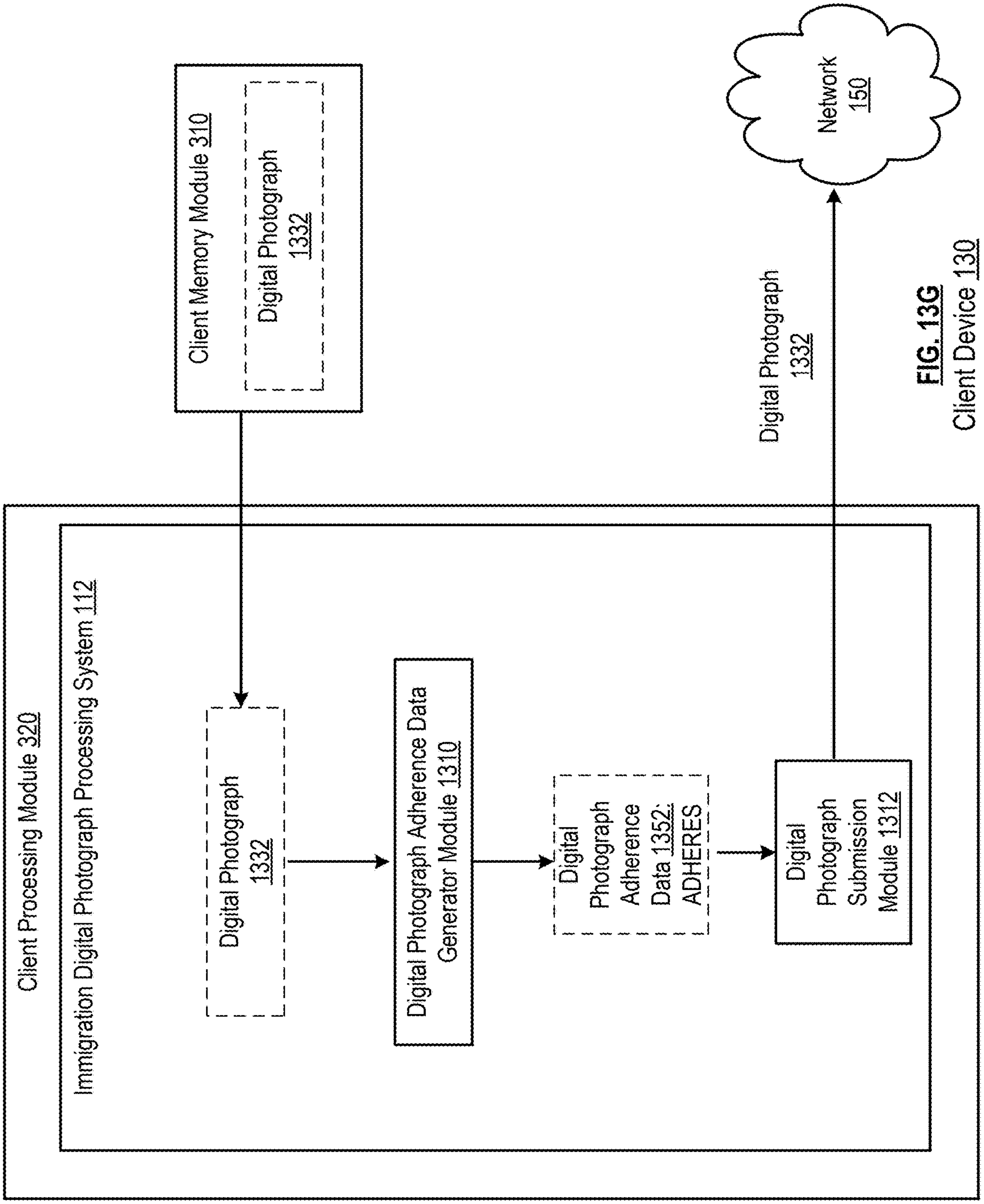
Figure 13H:
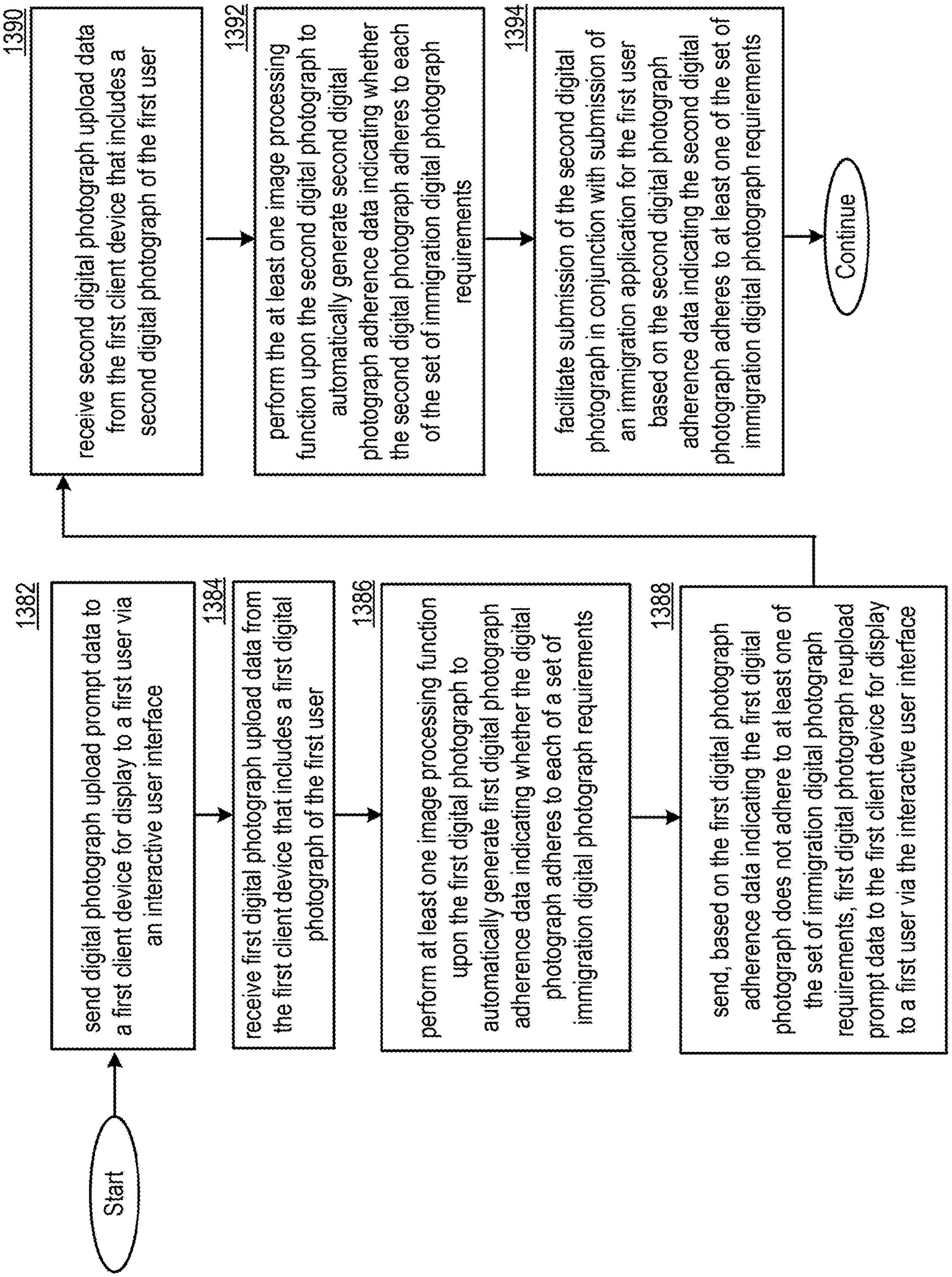
Figure 13I:
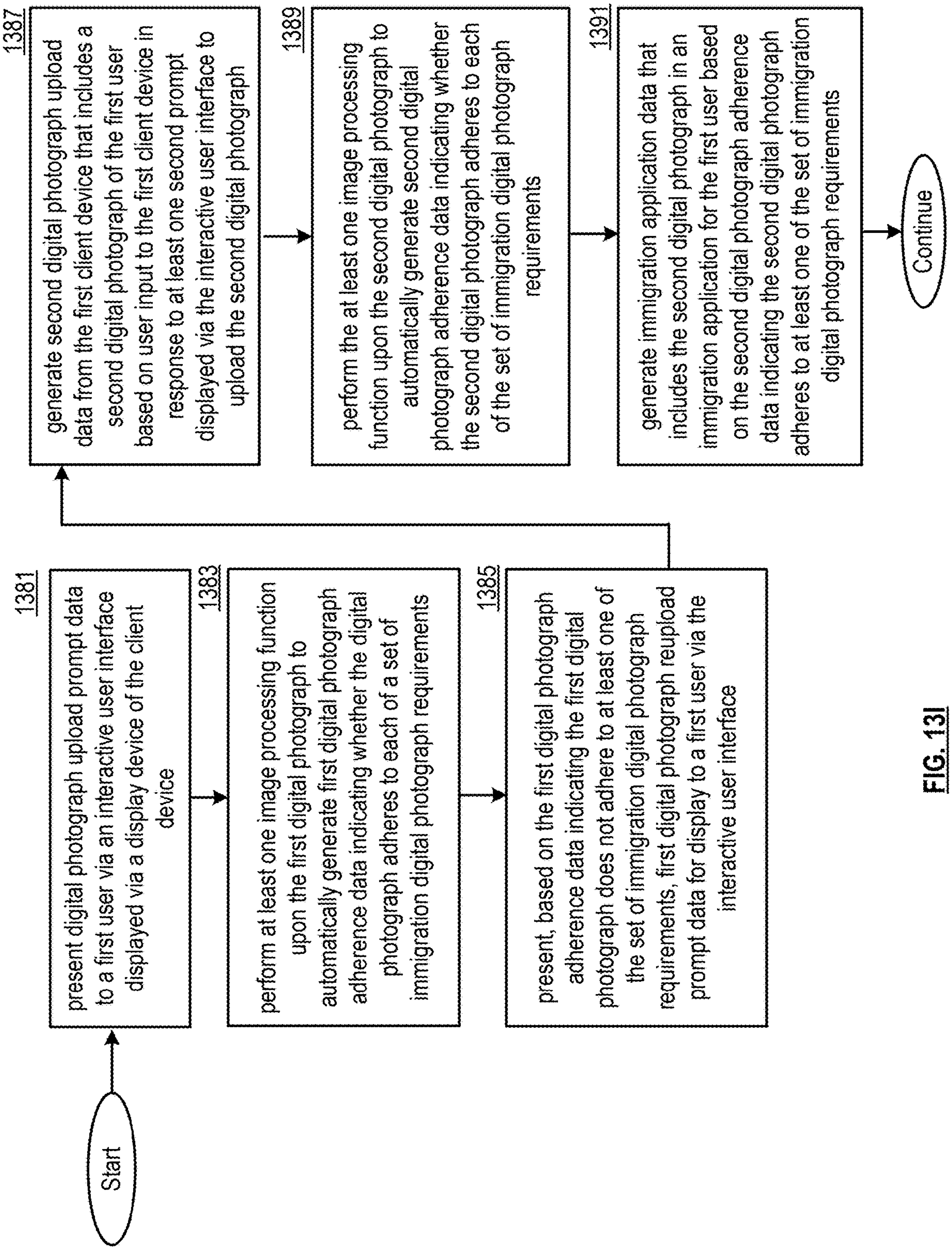
Figure 14A:
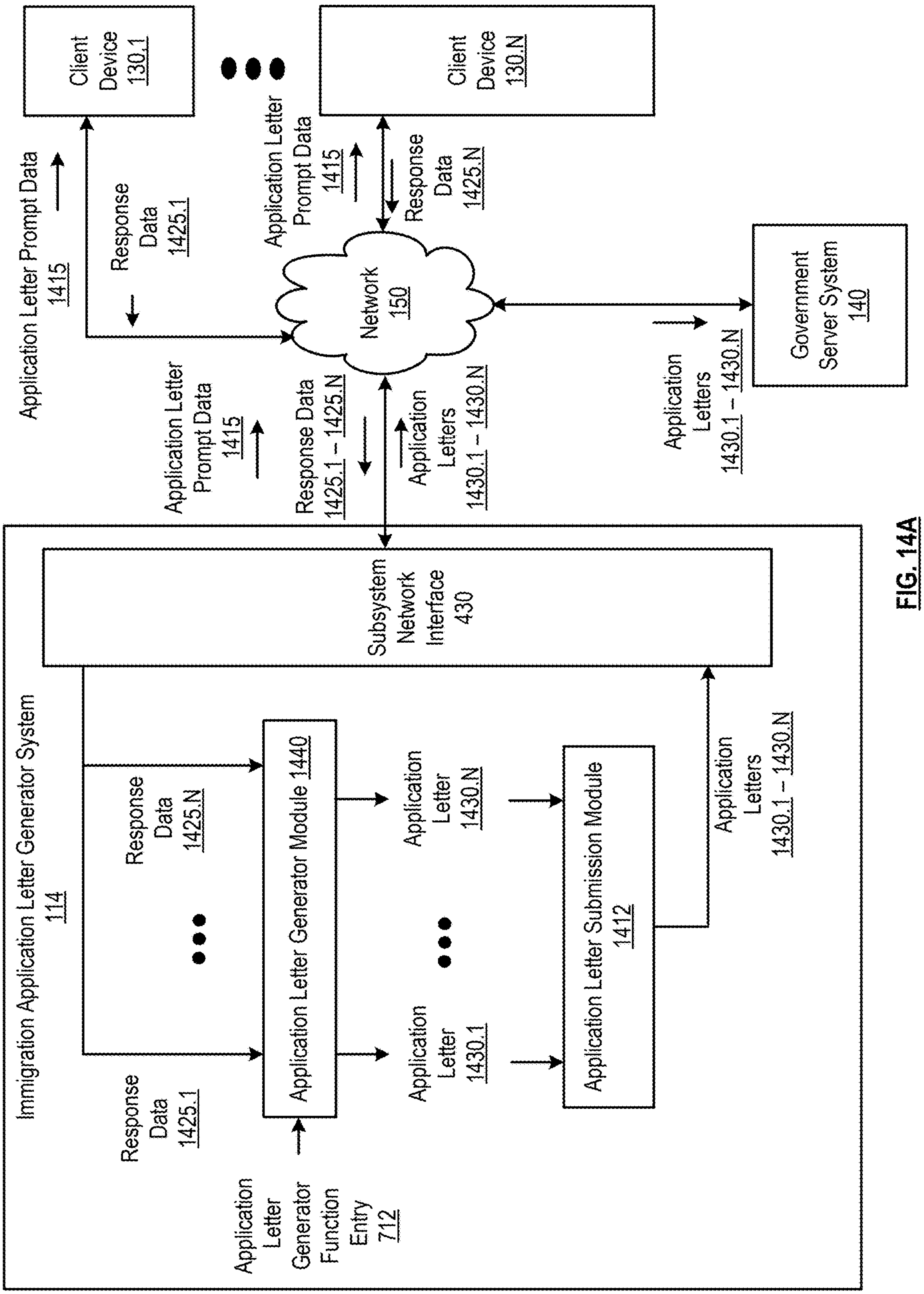
Figure 14B:
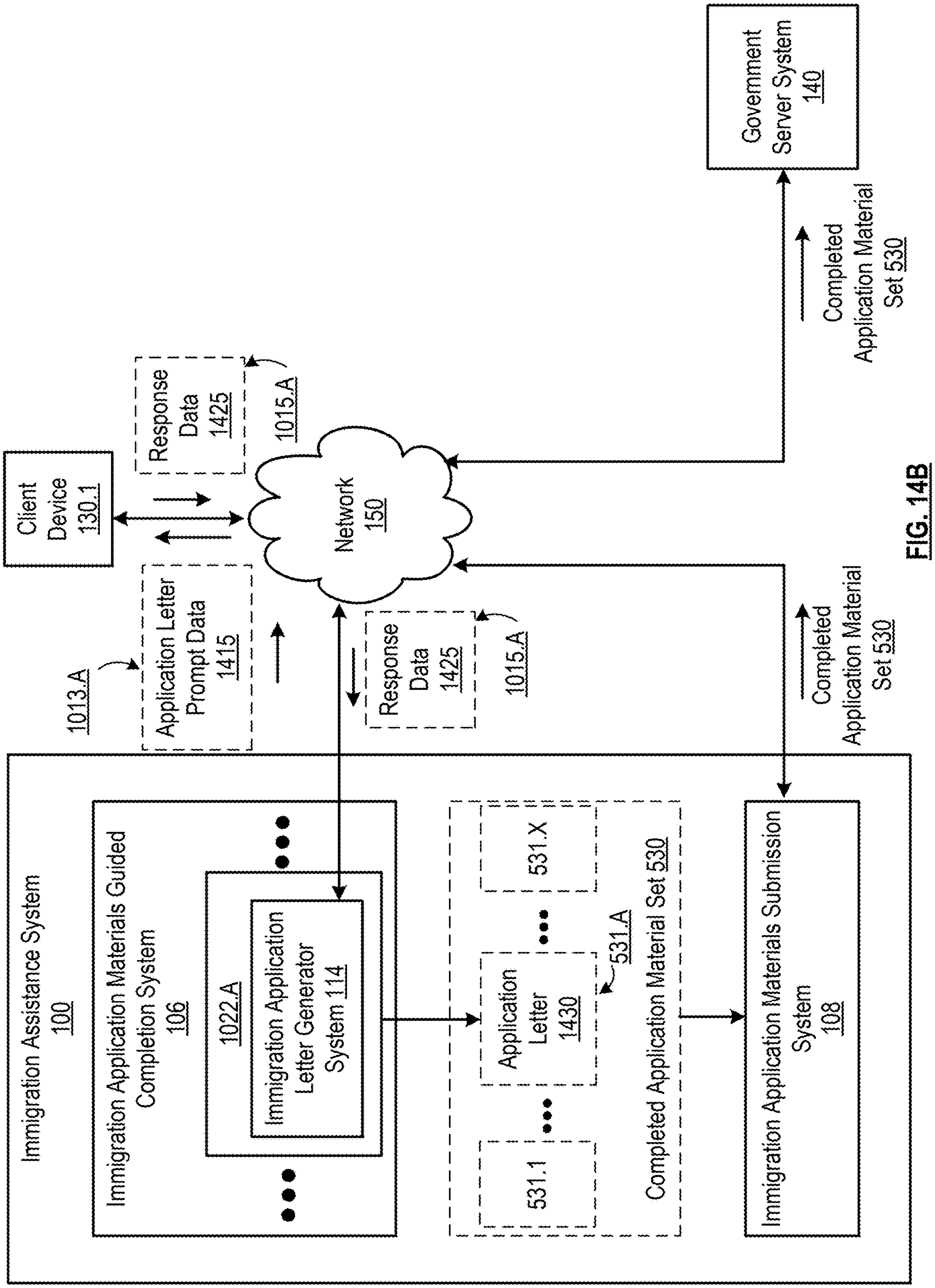
Figure 14C:
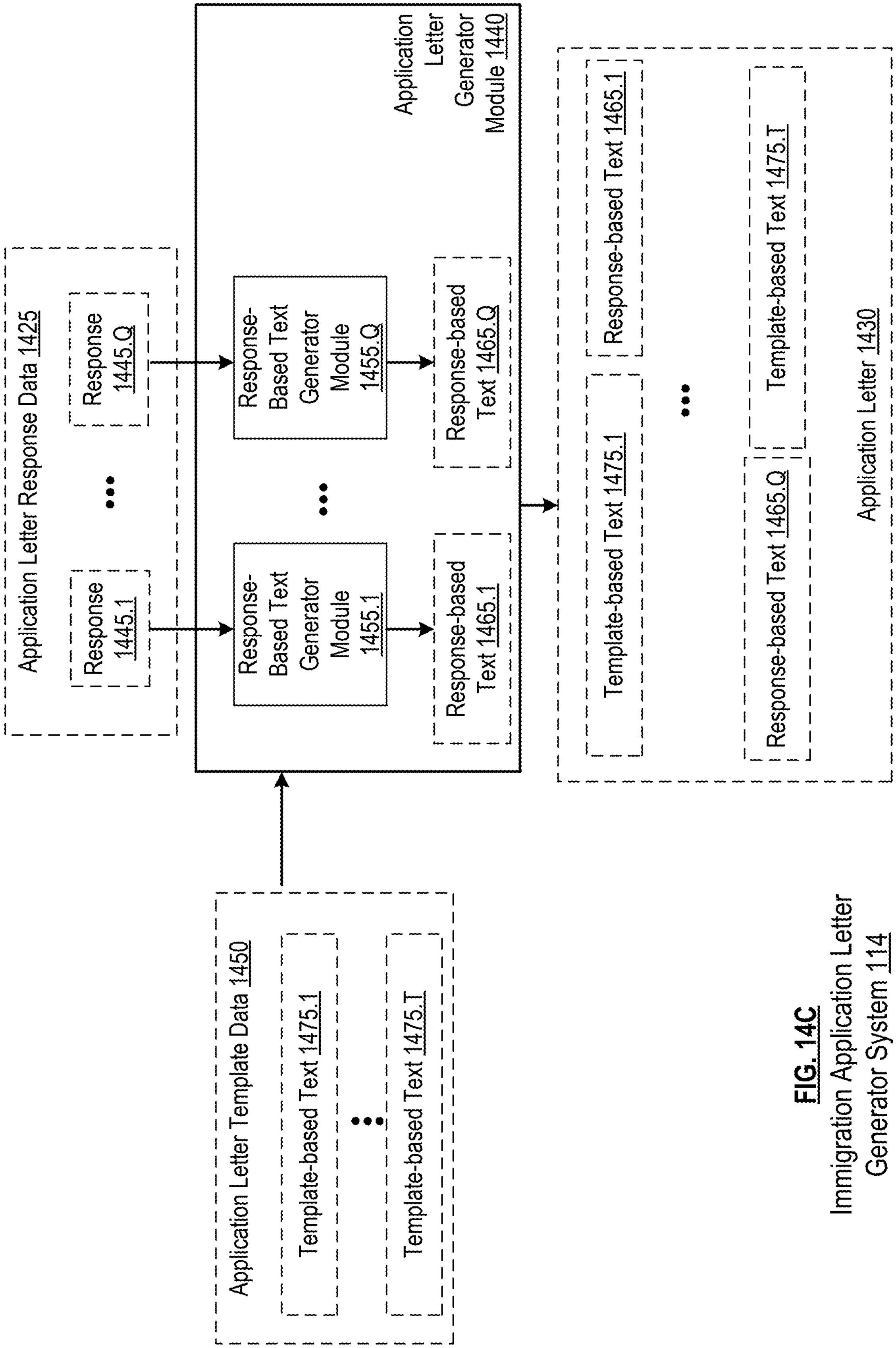
Figure 14D:
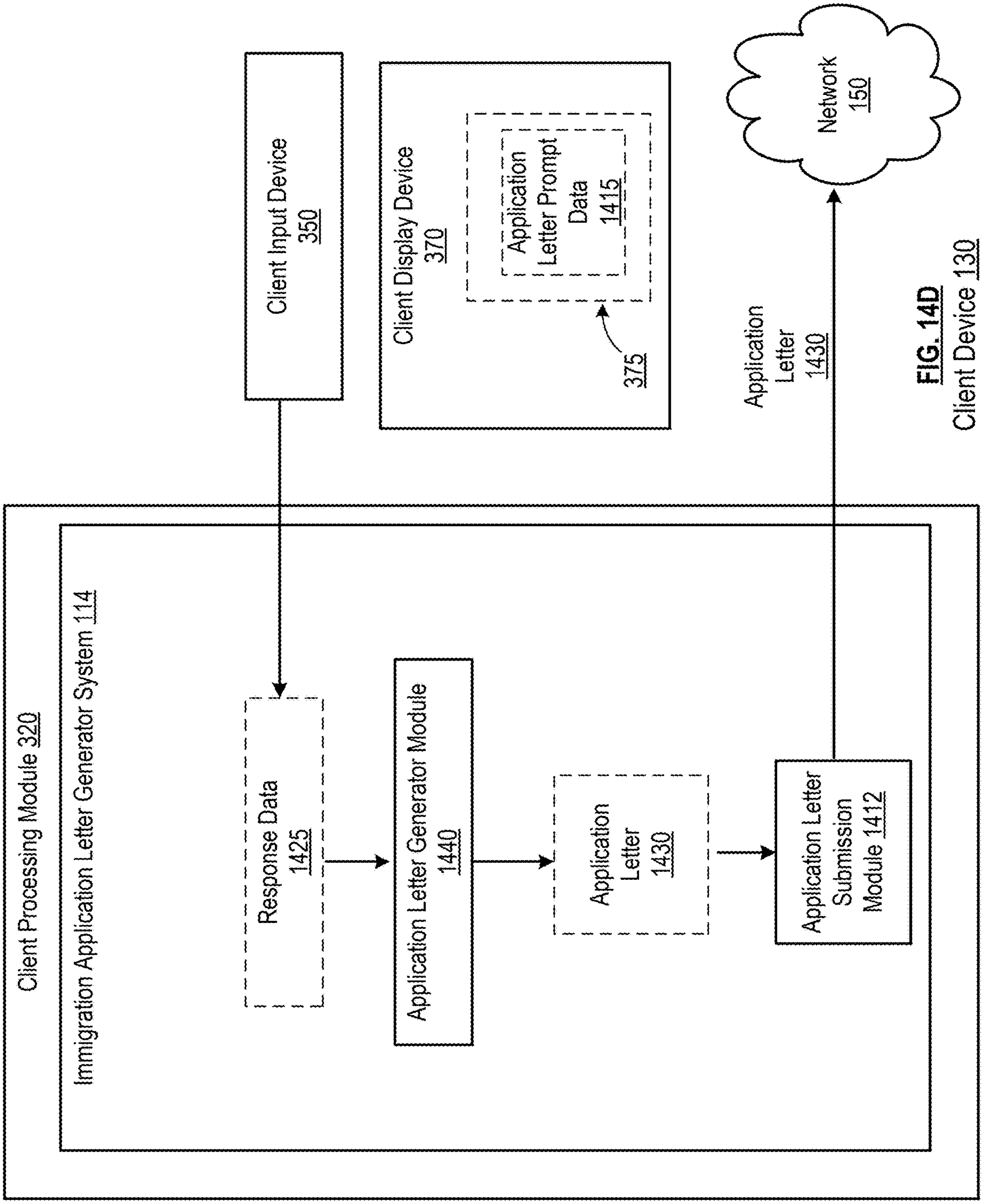
Figure 14E:
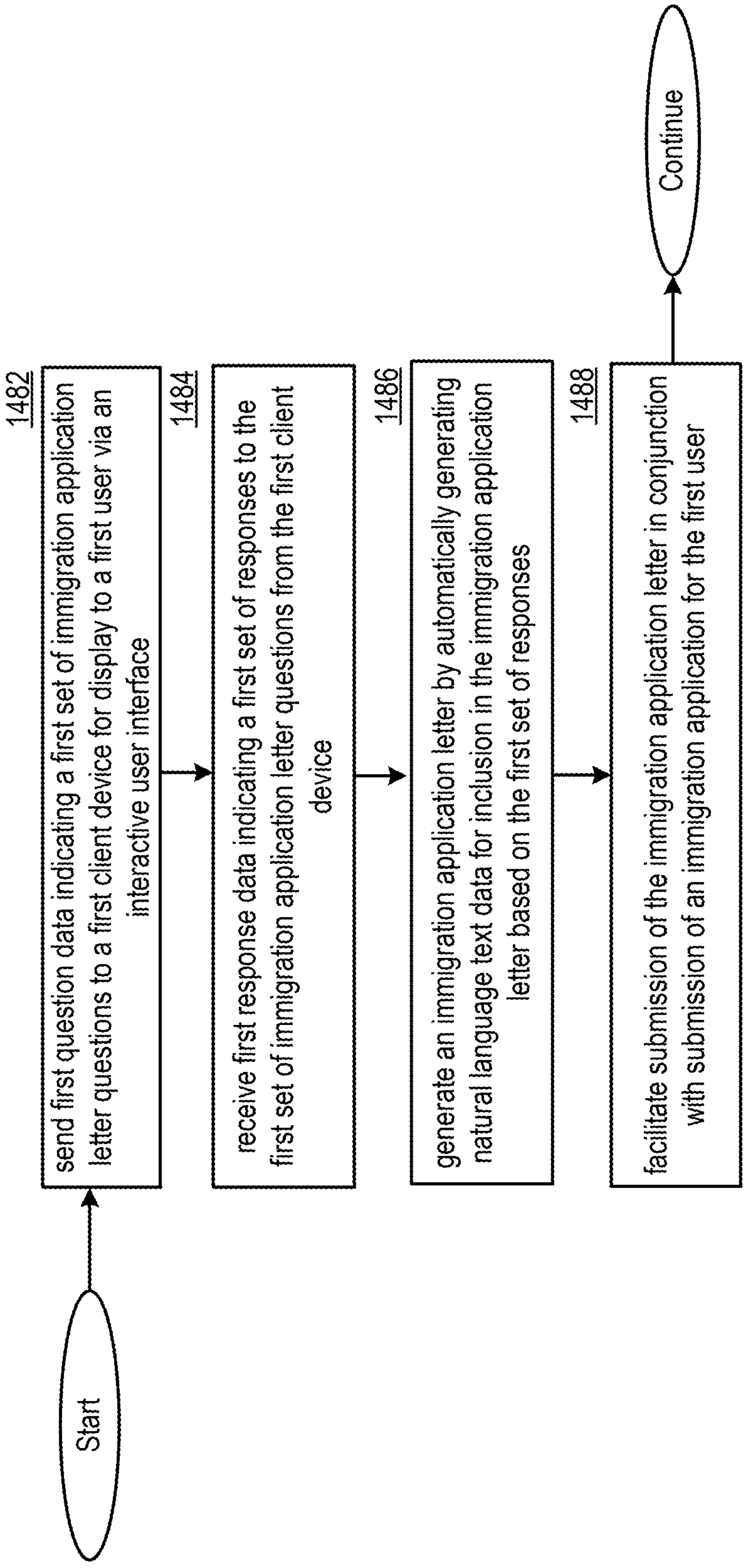
Figure 14F:
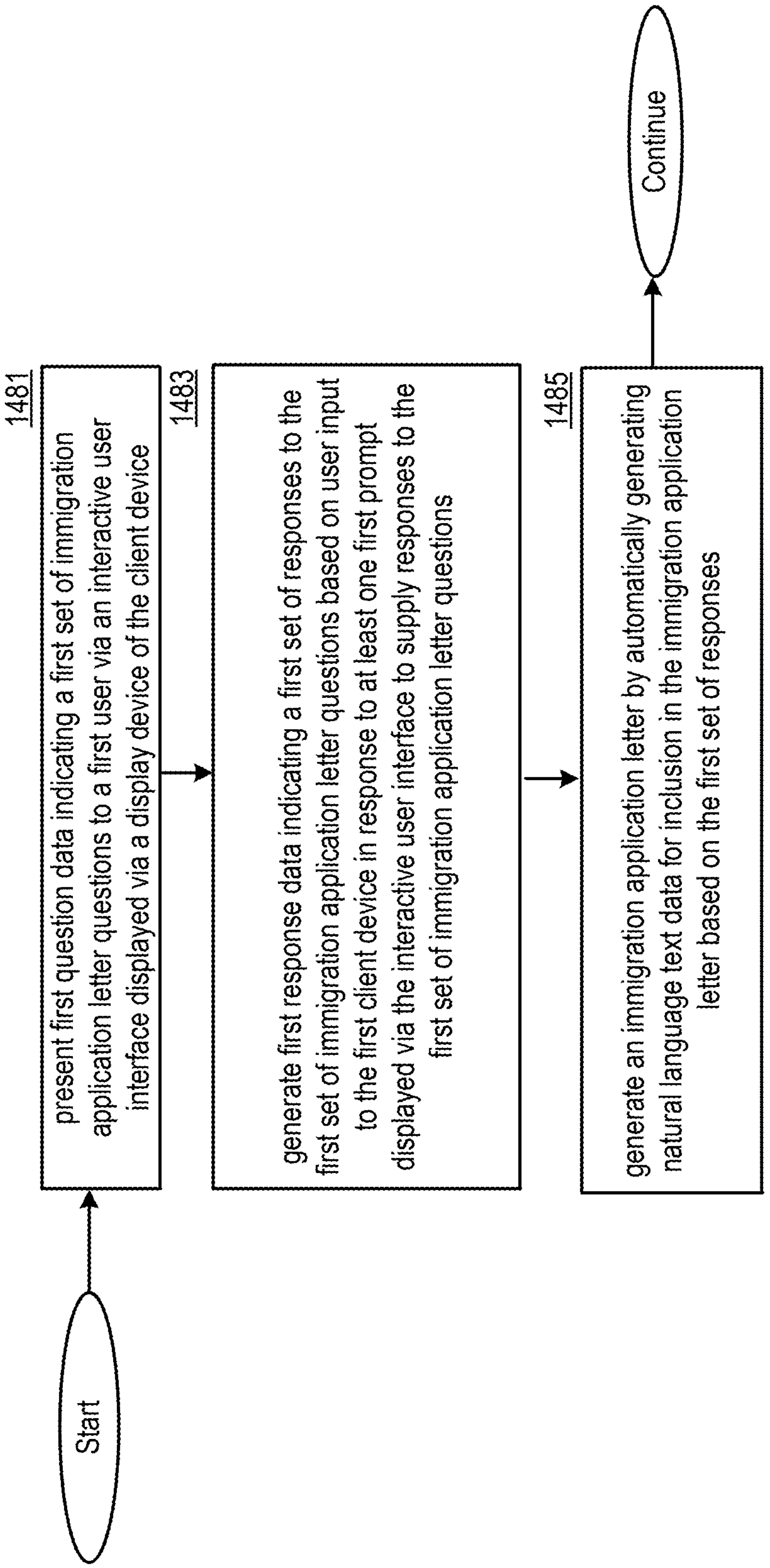
Figure 14G:
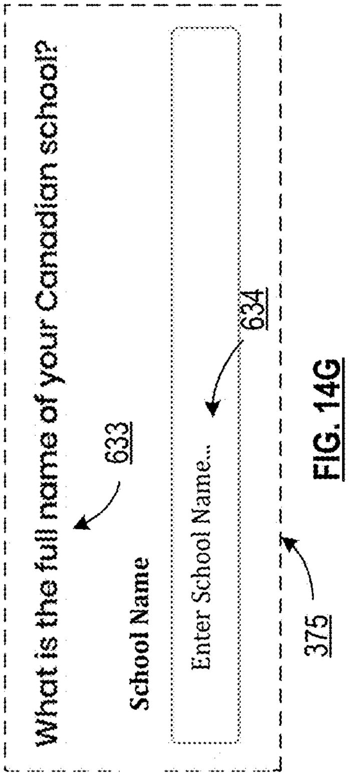
Figure 14H:
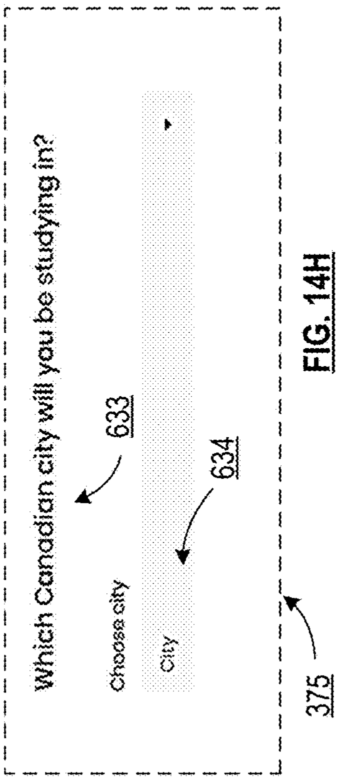
Figure 14I:
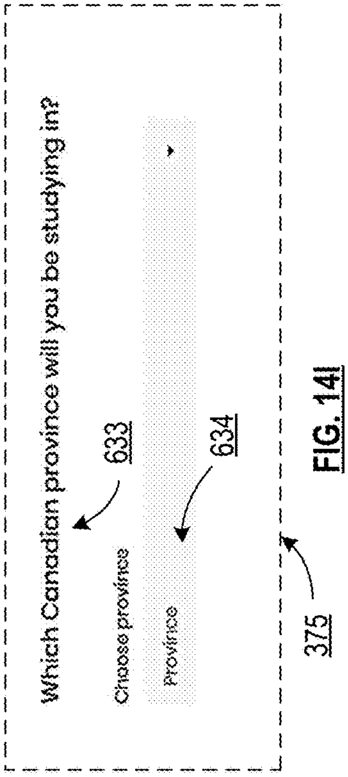
Figure 14J:
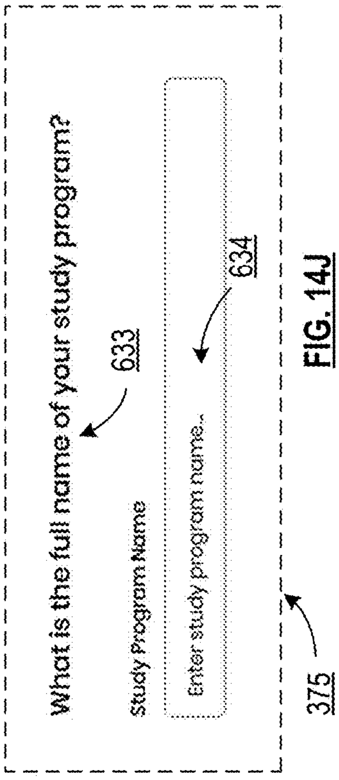
Figure 14K:
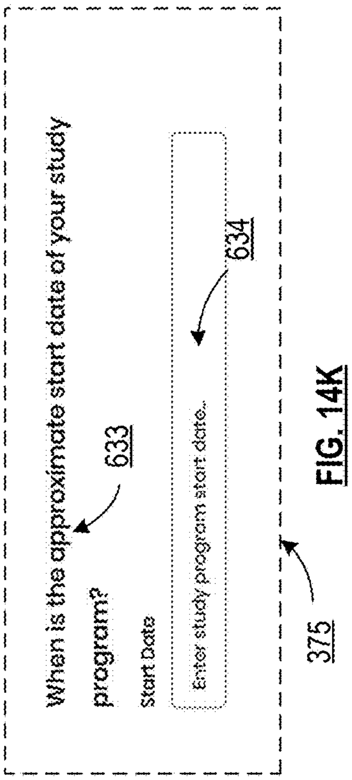
Figure 14L:
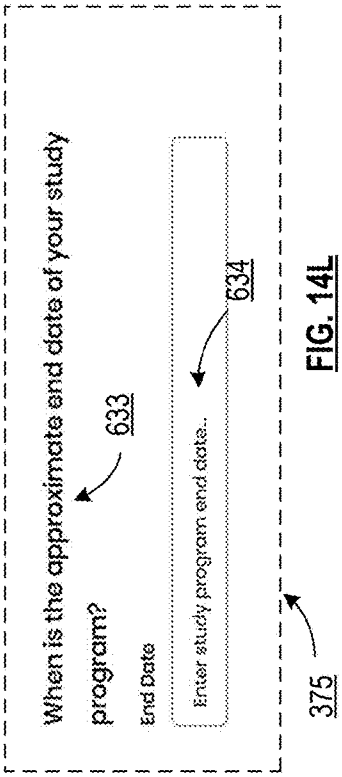
Figure 14M:
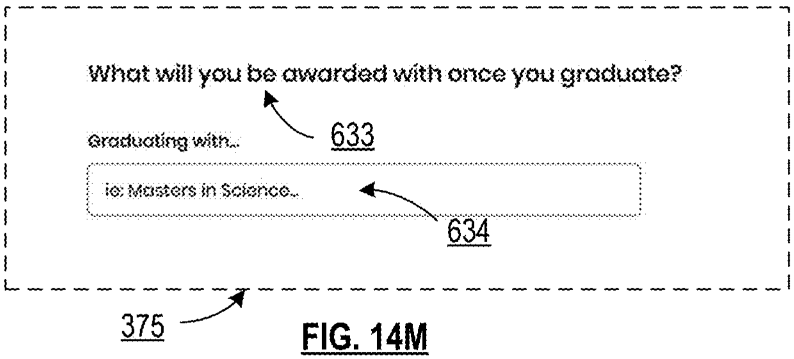
Figure 14N:
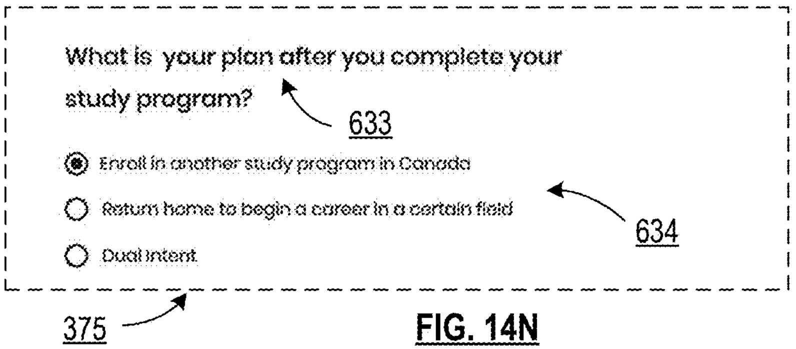
Figure 14O:
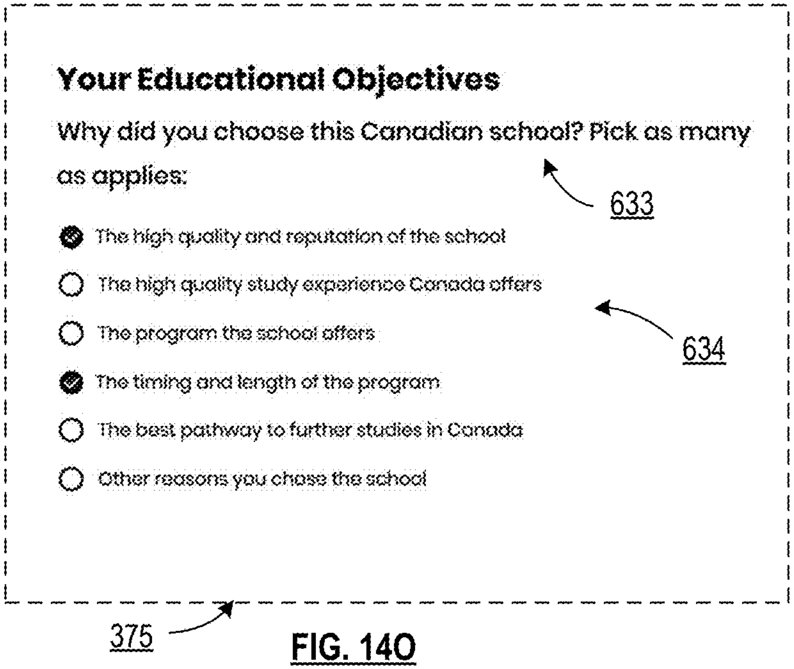
Figure 14P:
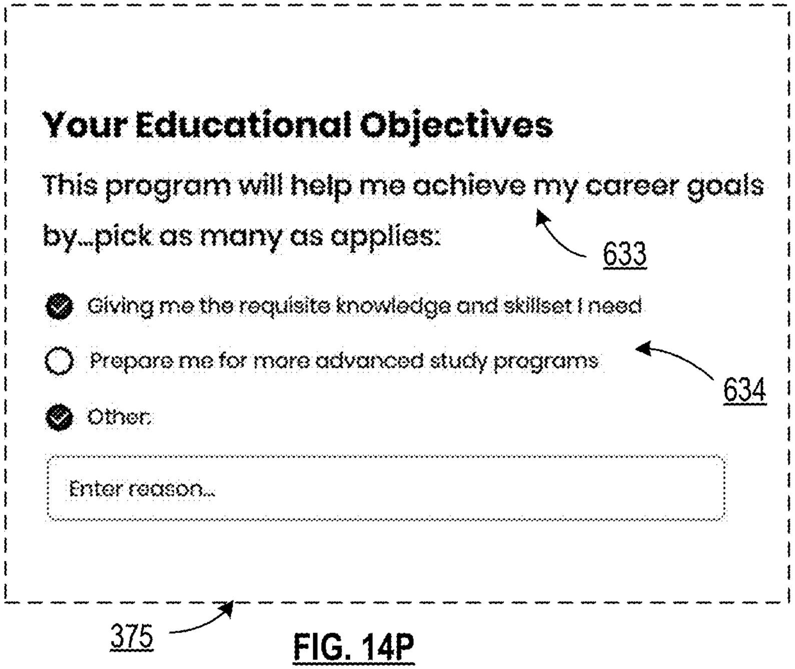
Figure 14Q:
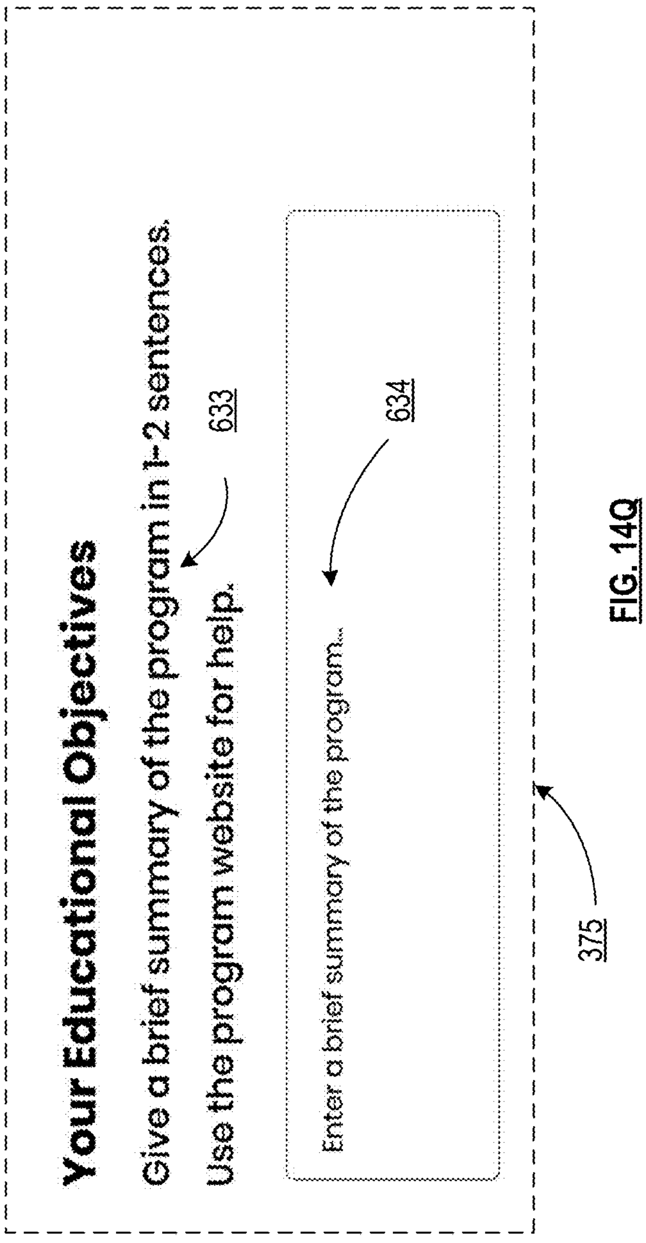
Figure 14R:
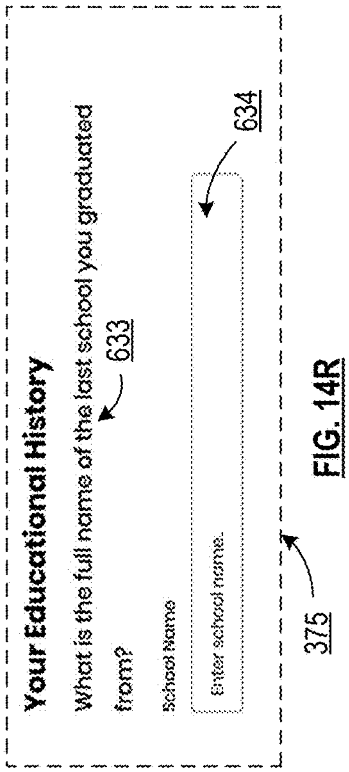
Figure 14S:
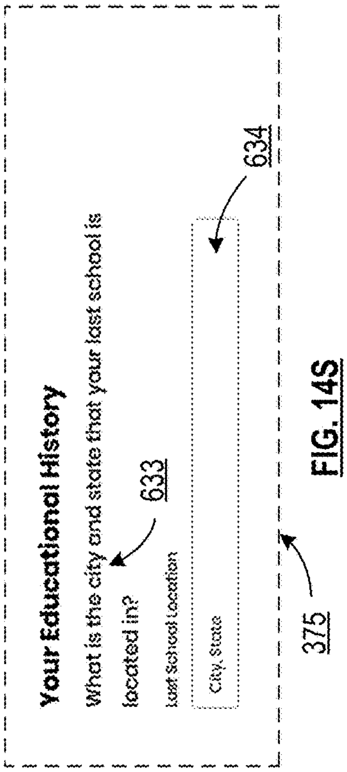
Figure 14T:
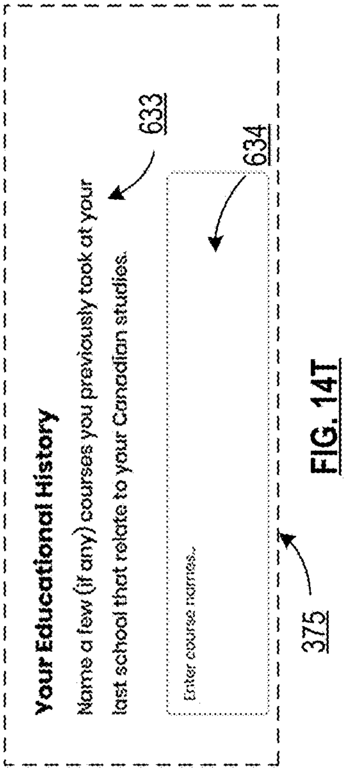
Figure 14U:
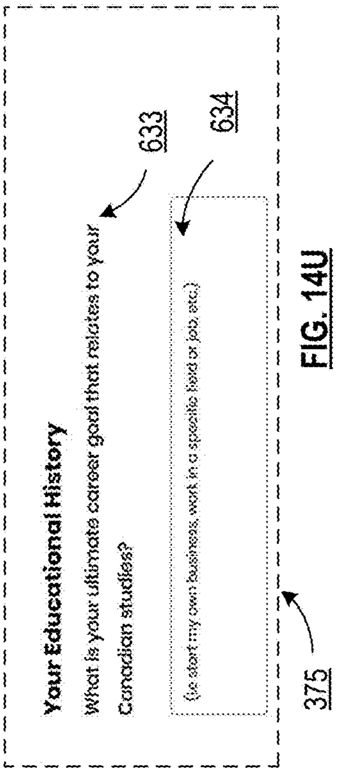
Figure 14V:
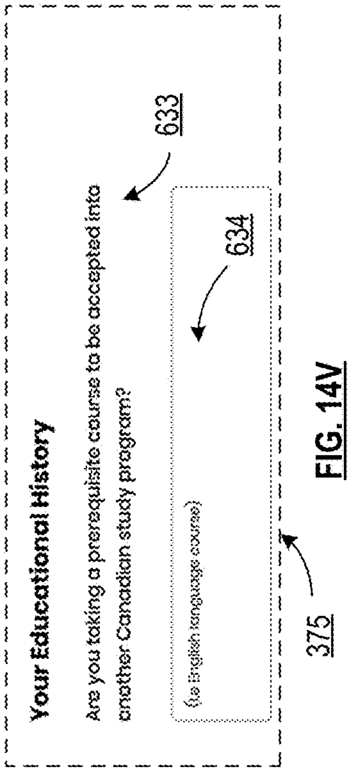
Figure 14W:
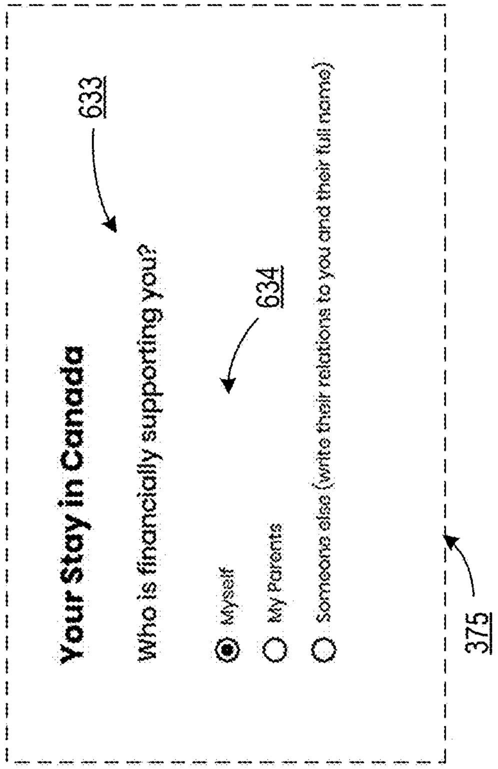
Figure 14X:
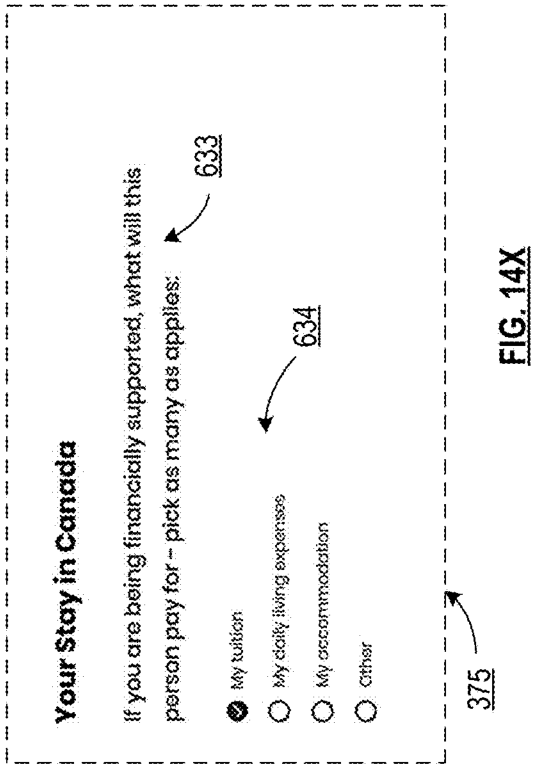
Figure 14Y:
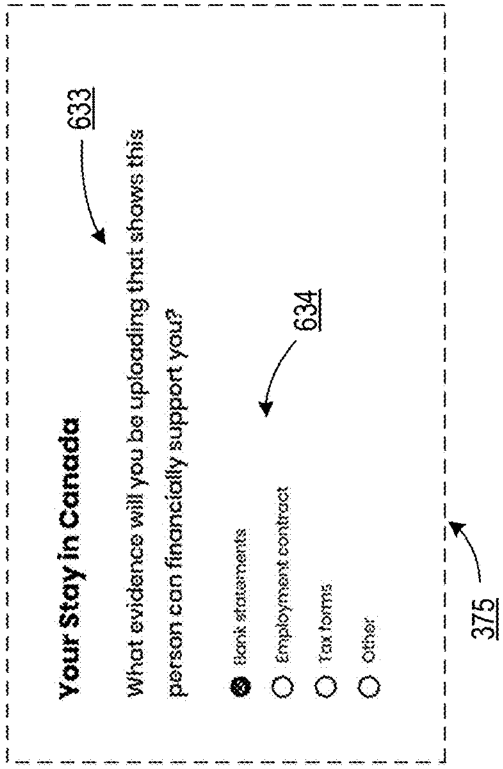
Figure 14Z:
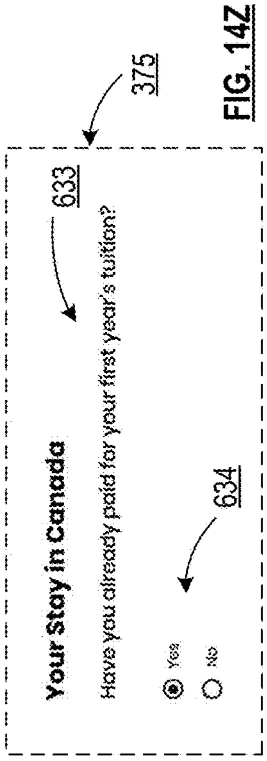
Figure 14A:
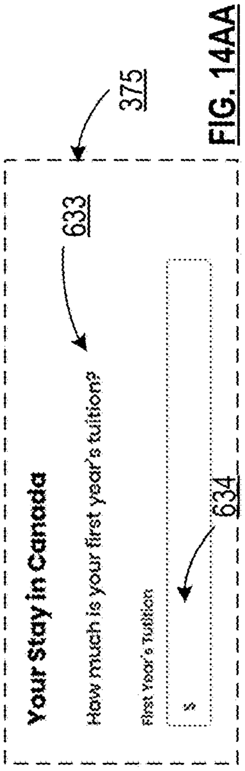
Figure 14A:
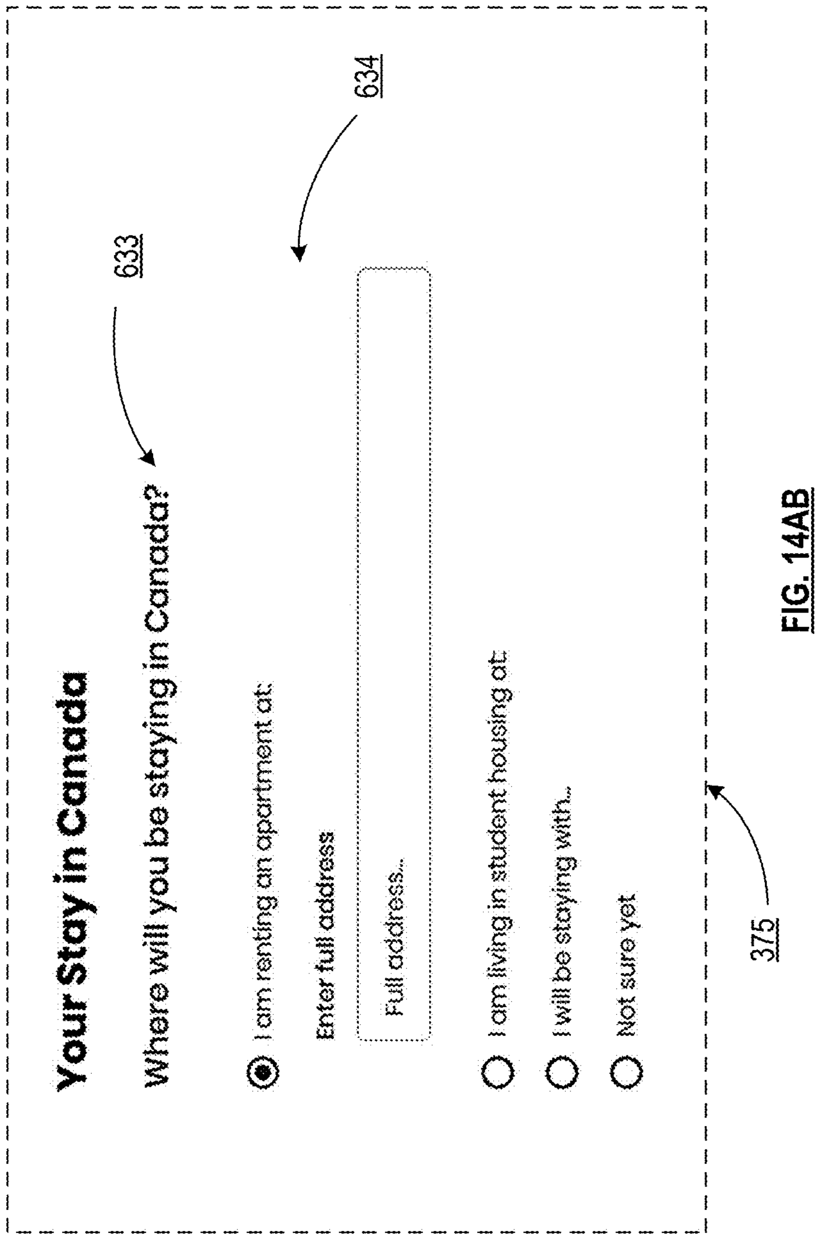
Figure 15A:
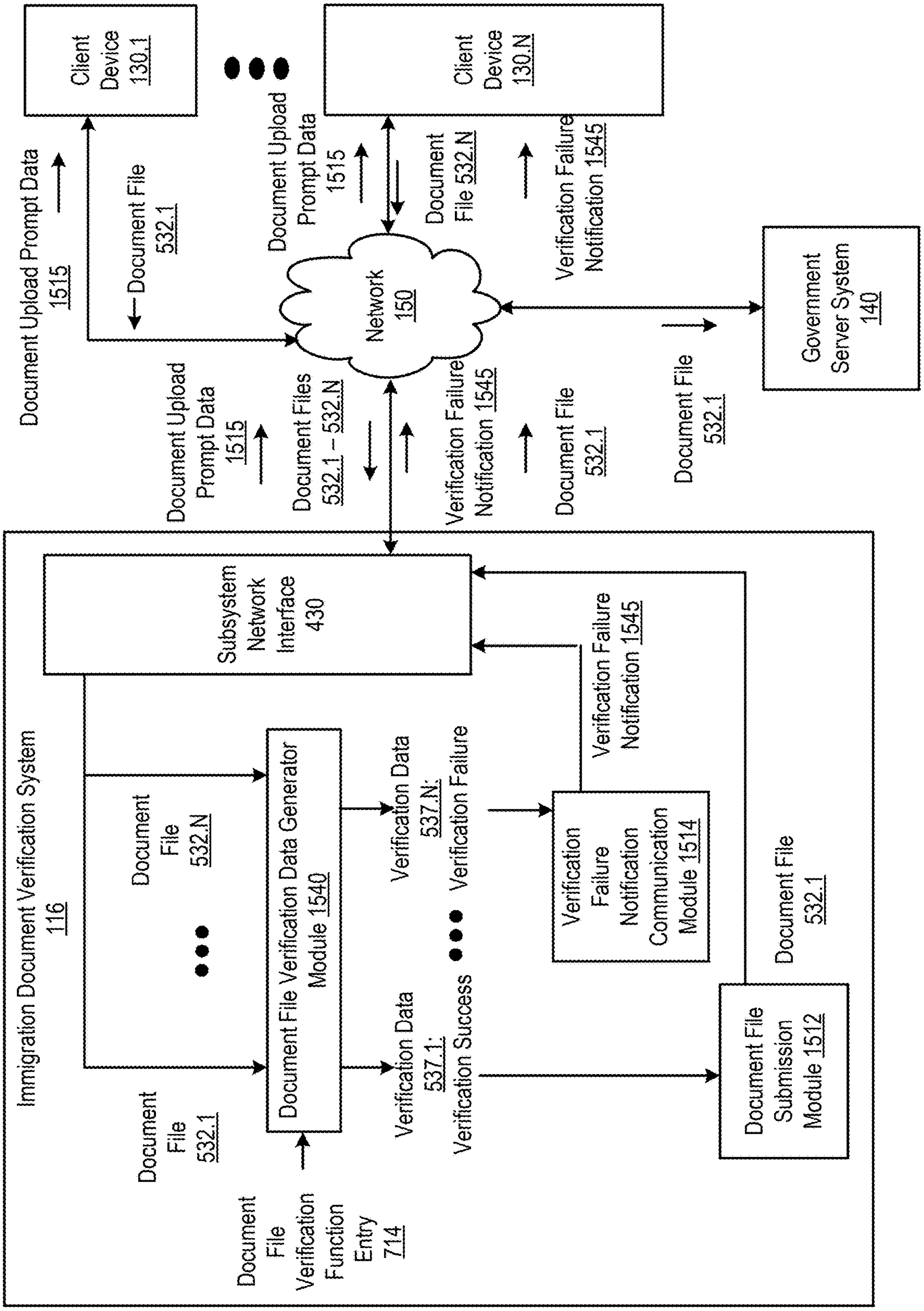
Figure 15B:
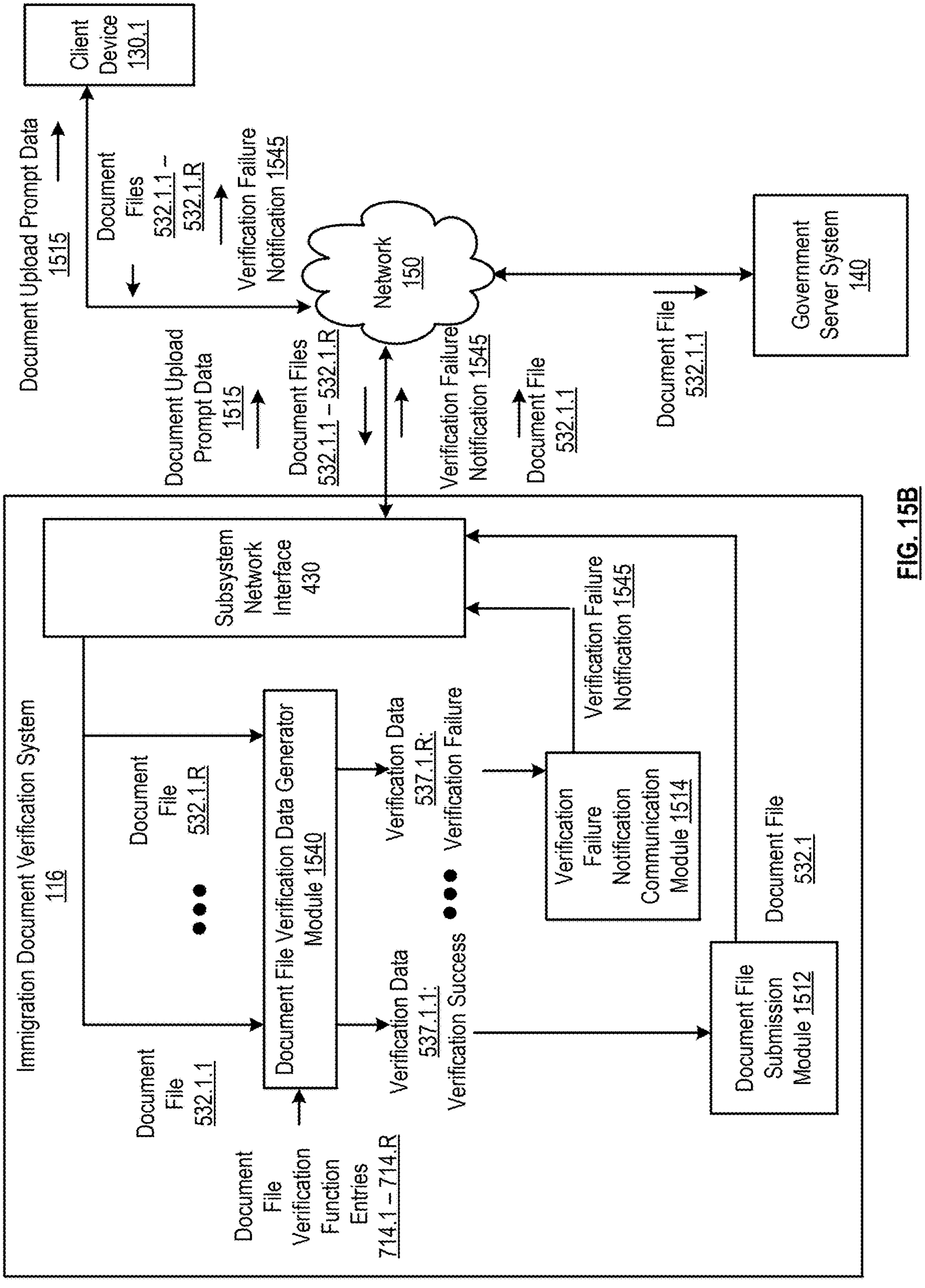
Figure 15C:
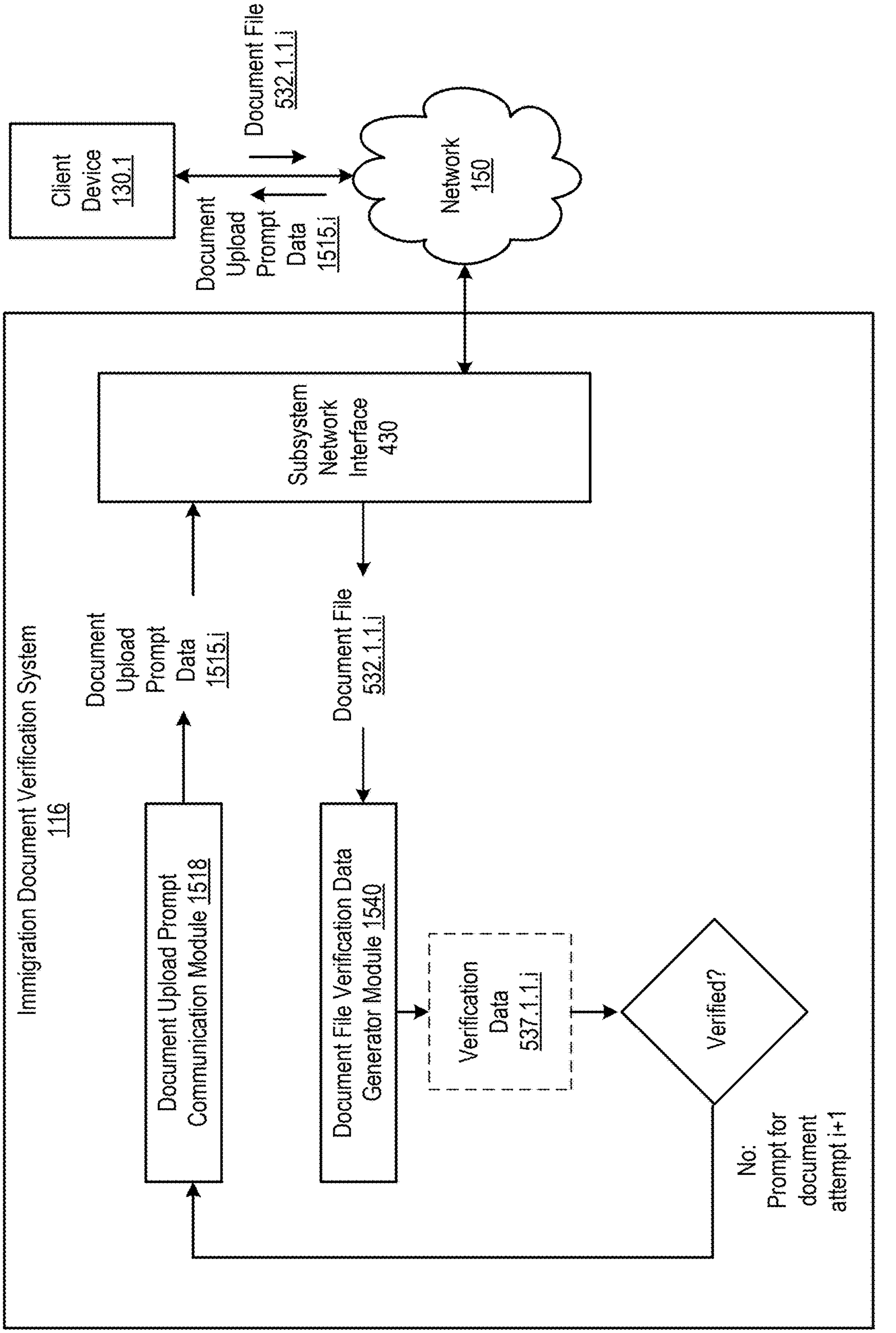
Figure 15D:
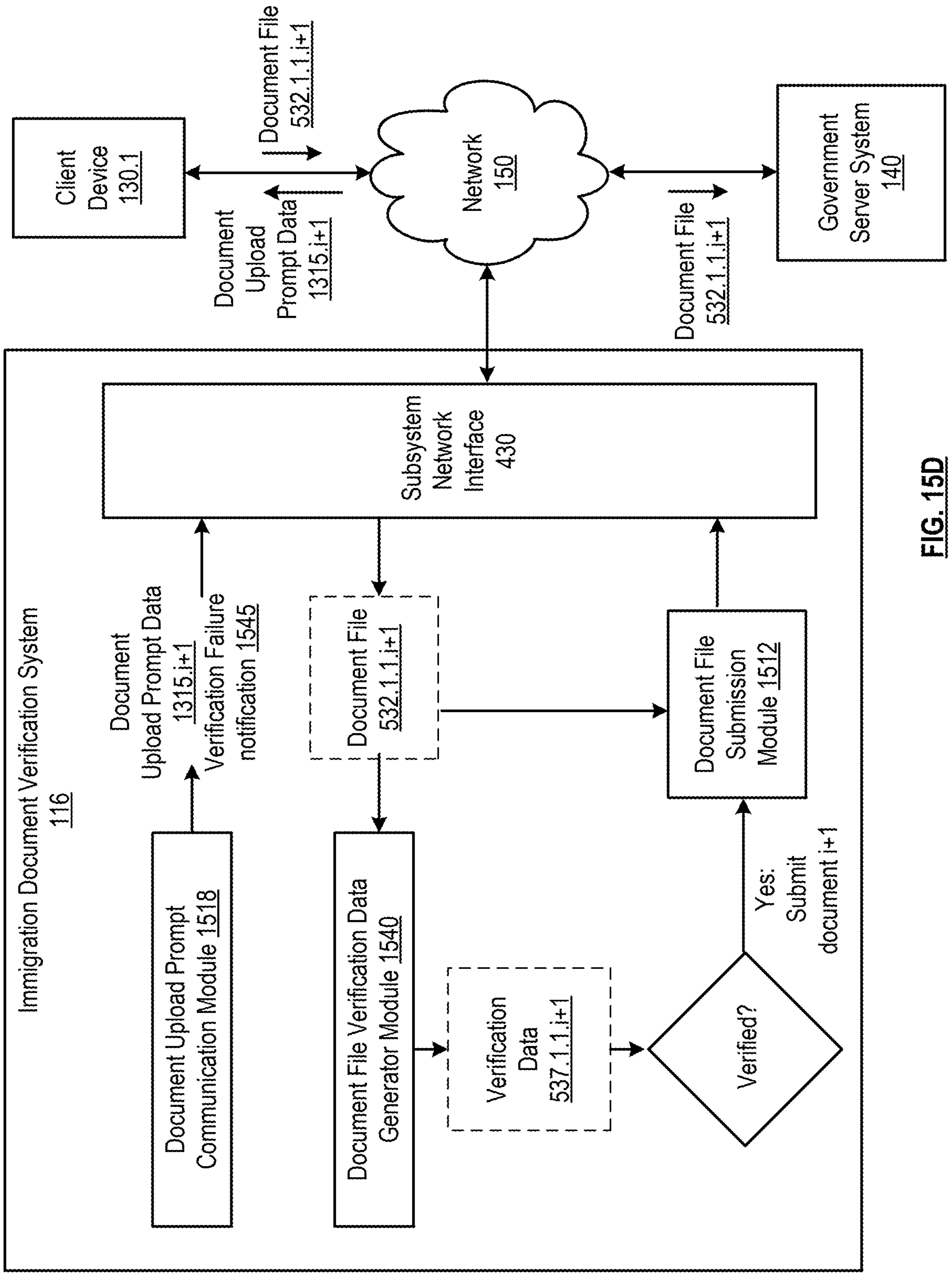
Figure 15E:
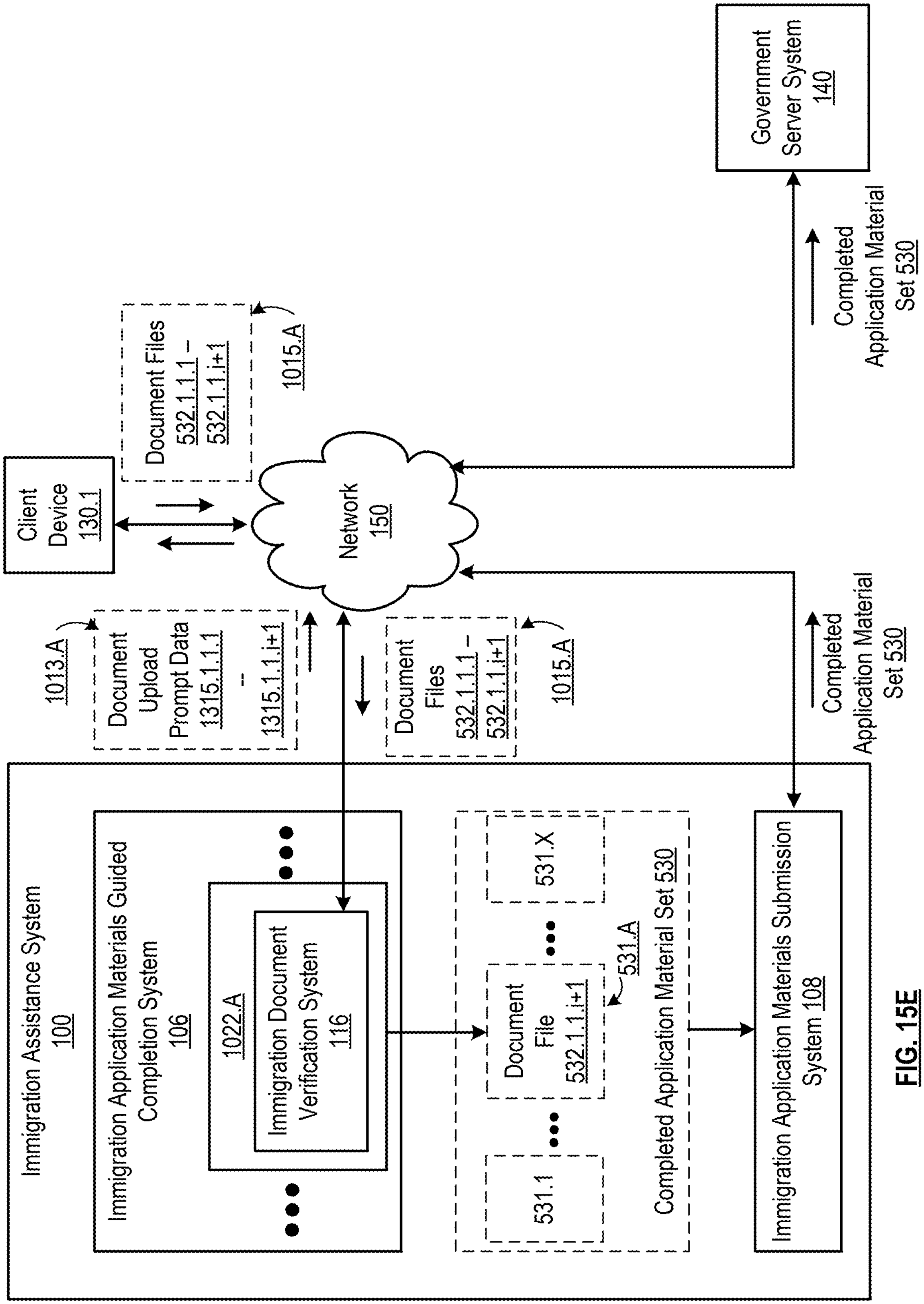
Figure 15F:
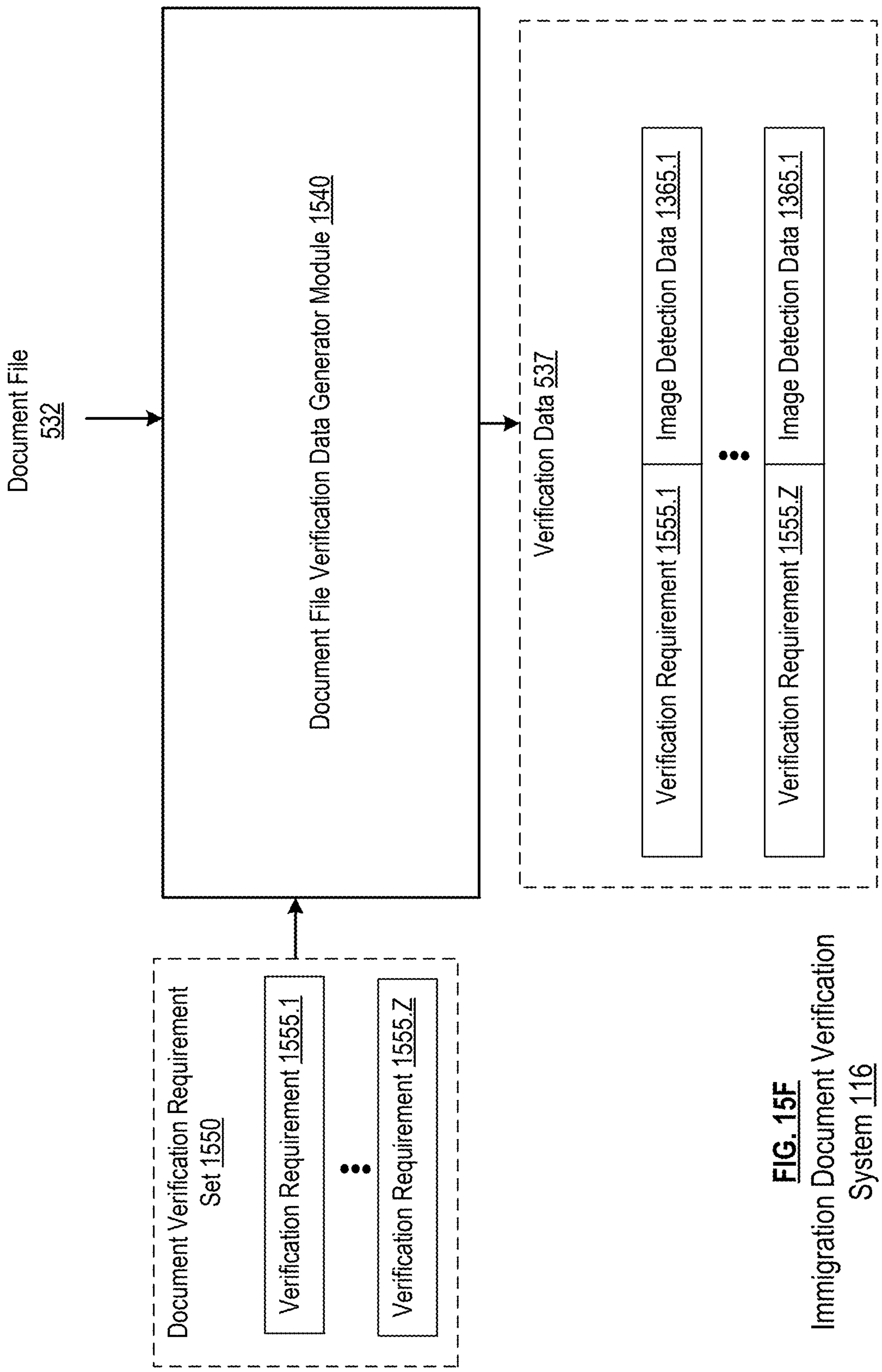
Figure 15G:
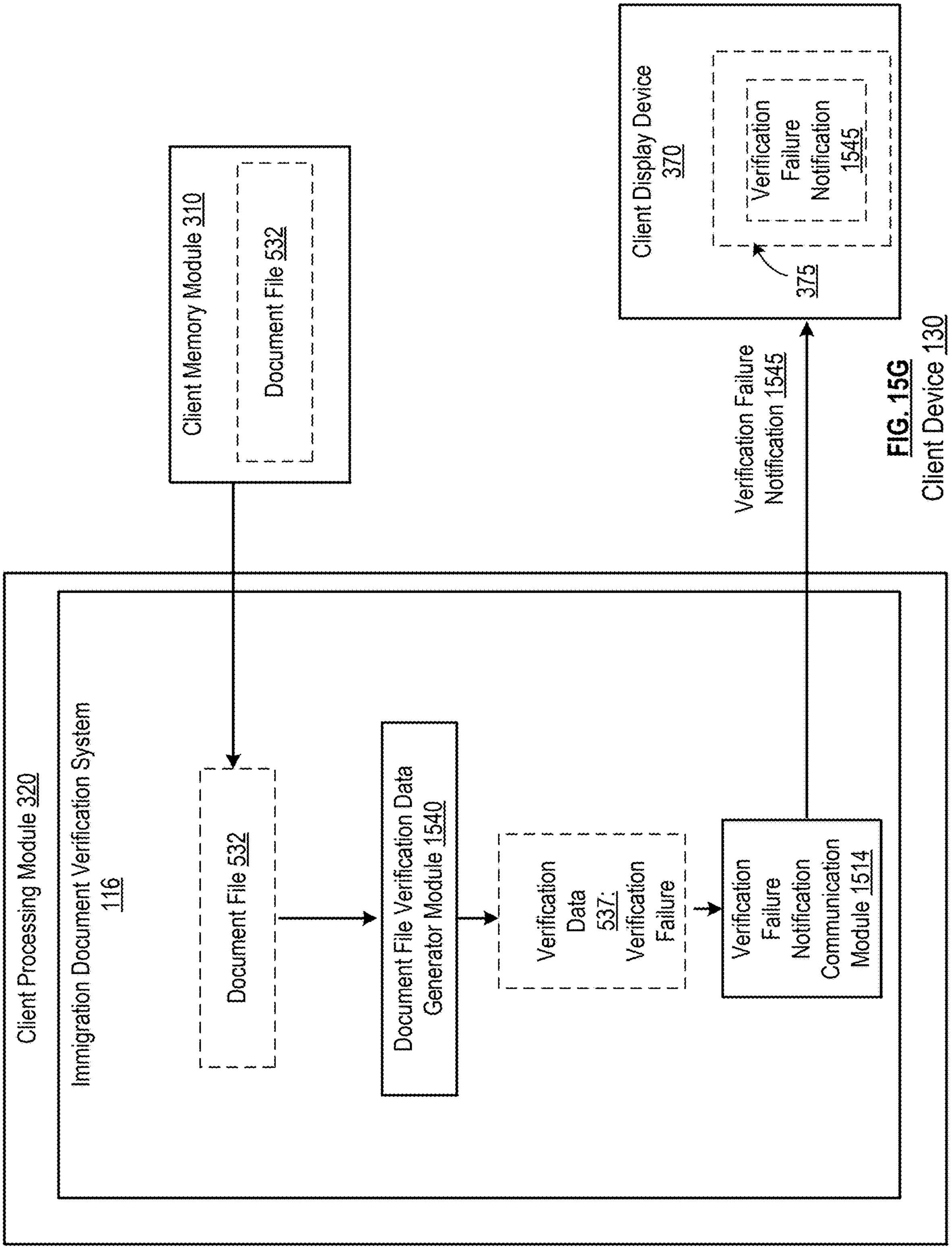
Figure 15H:
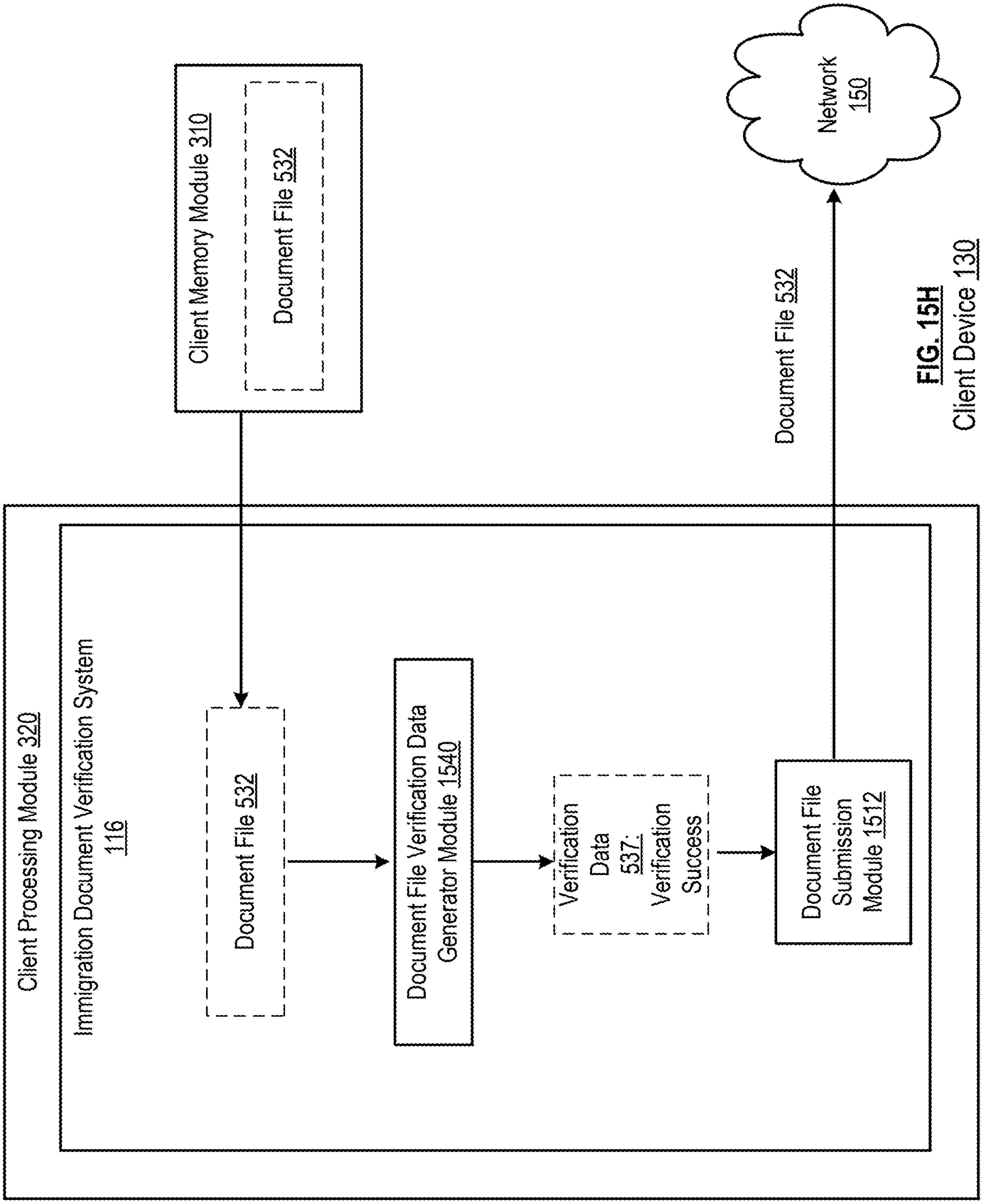
Figure 15I:
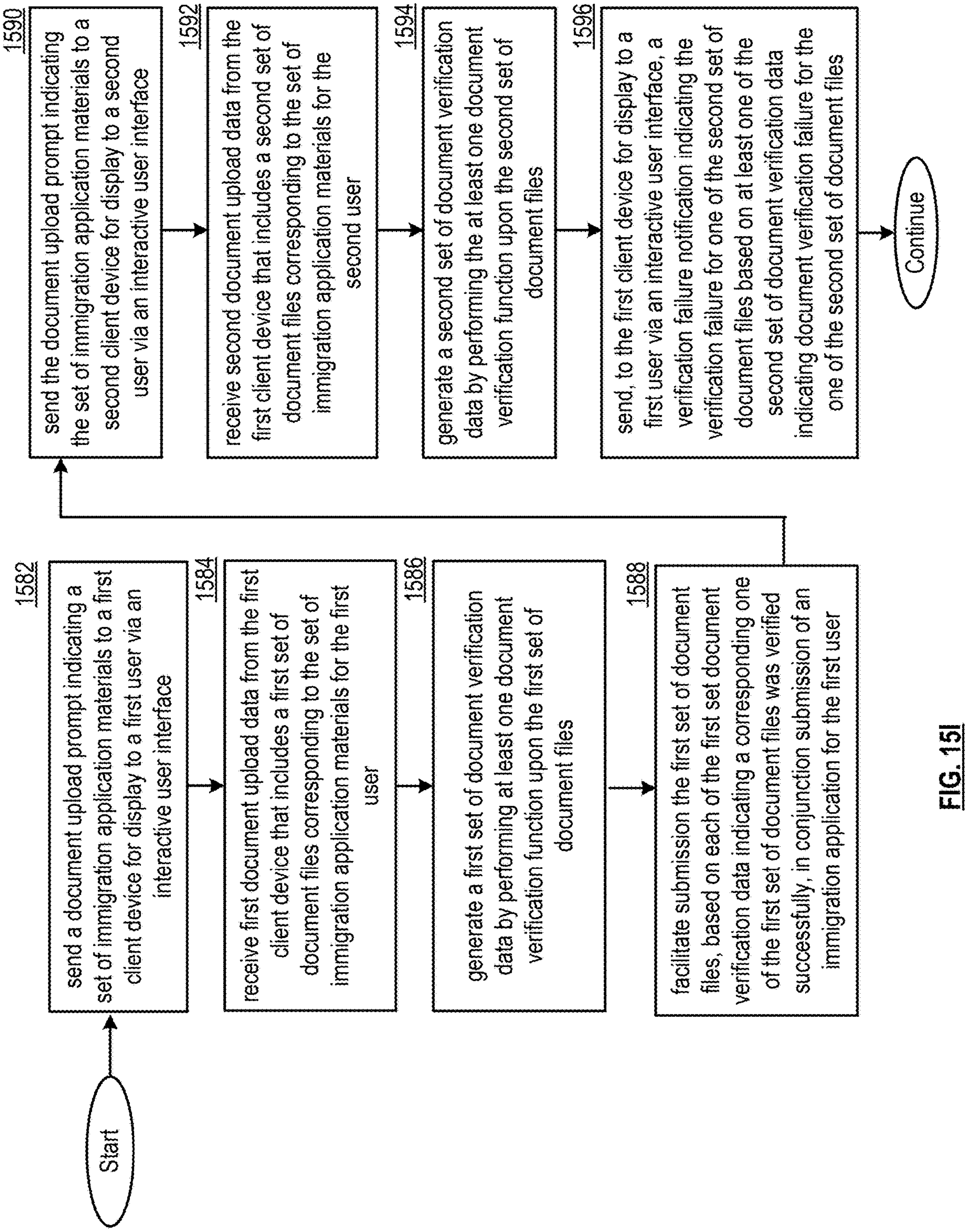
Figure 15J:
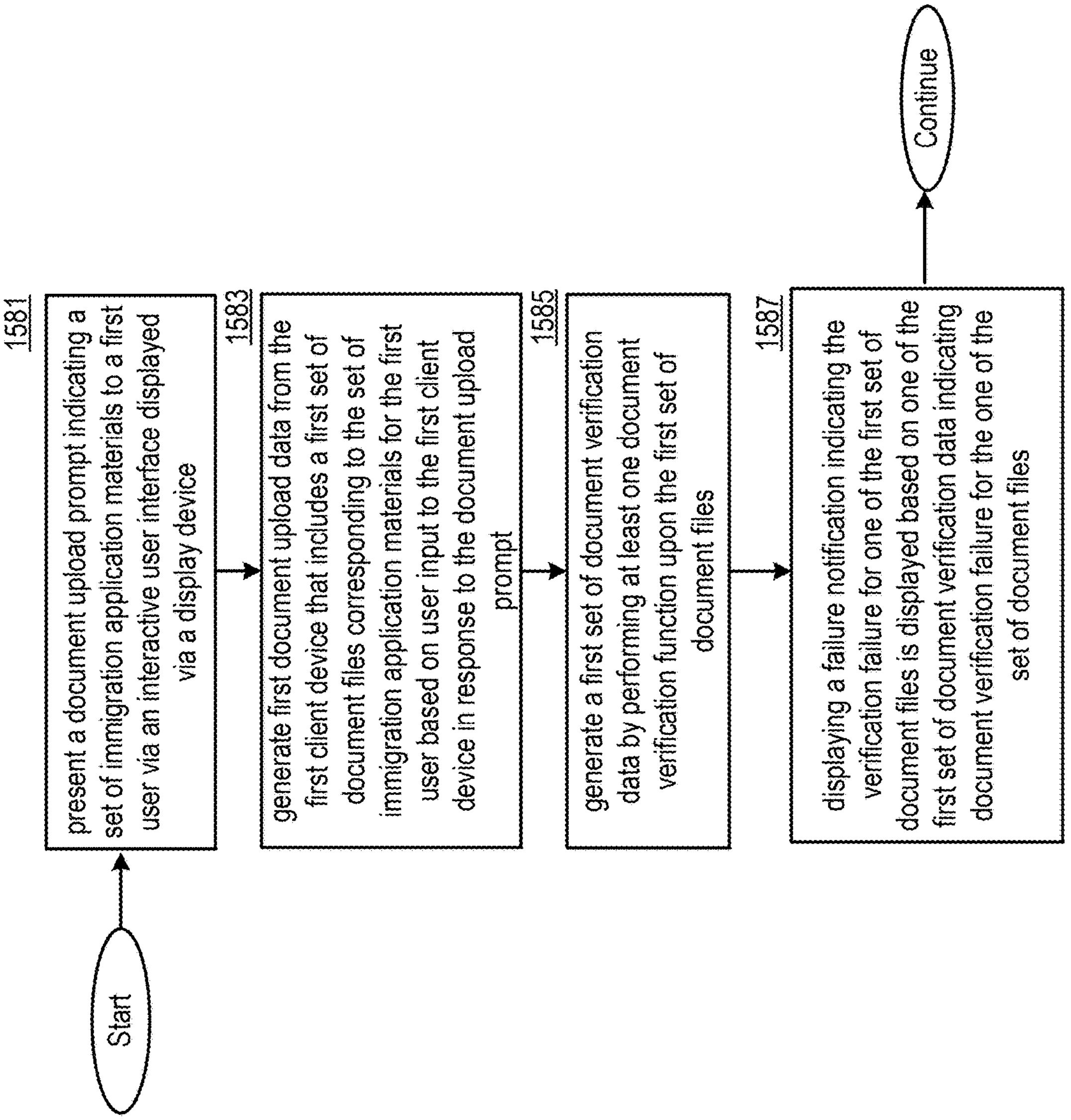
Figure 16A:
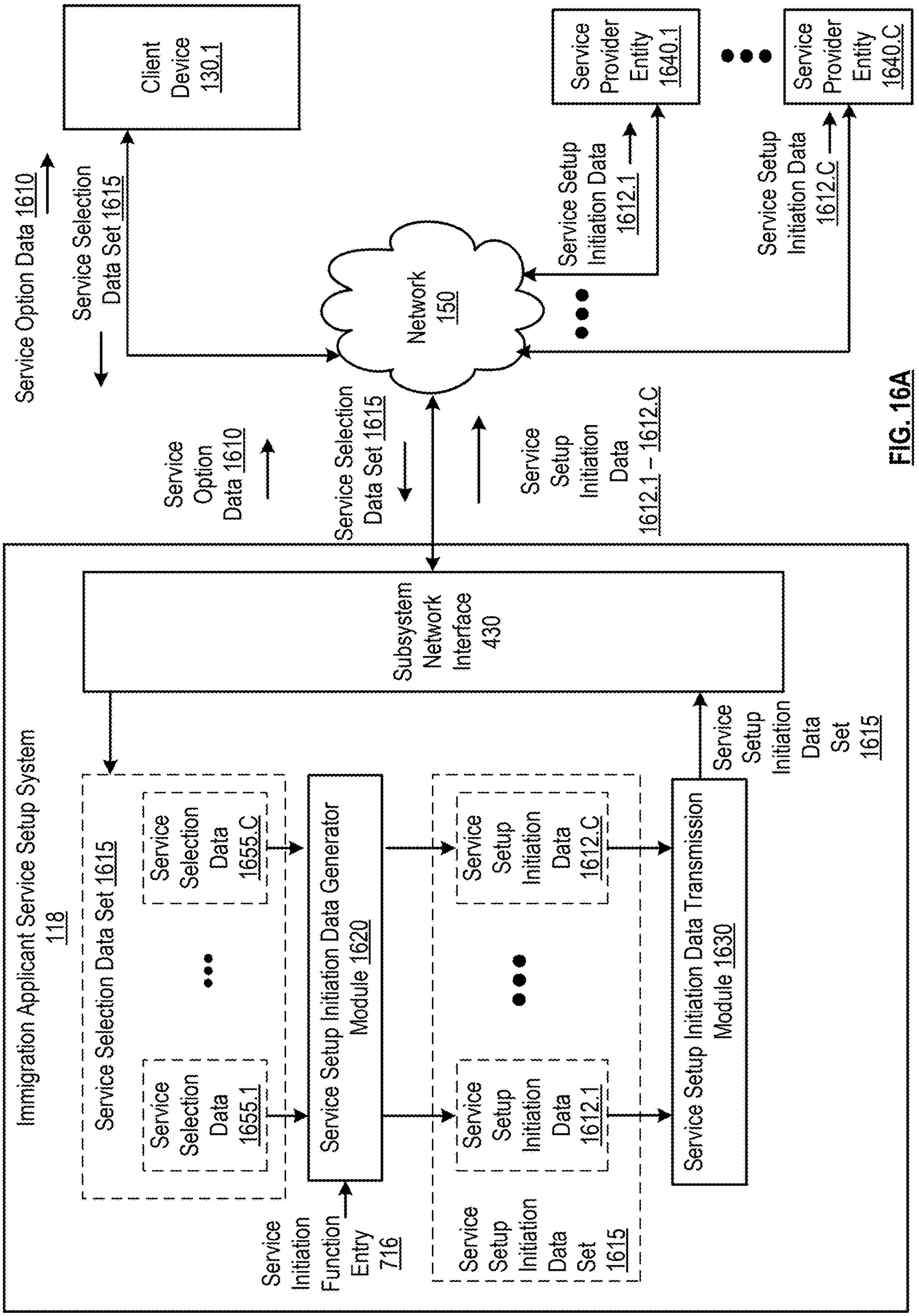
Figure 16B:
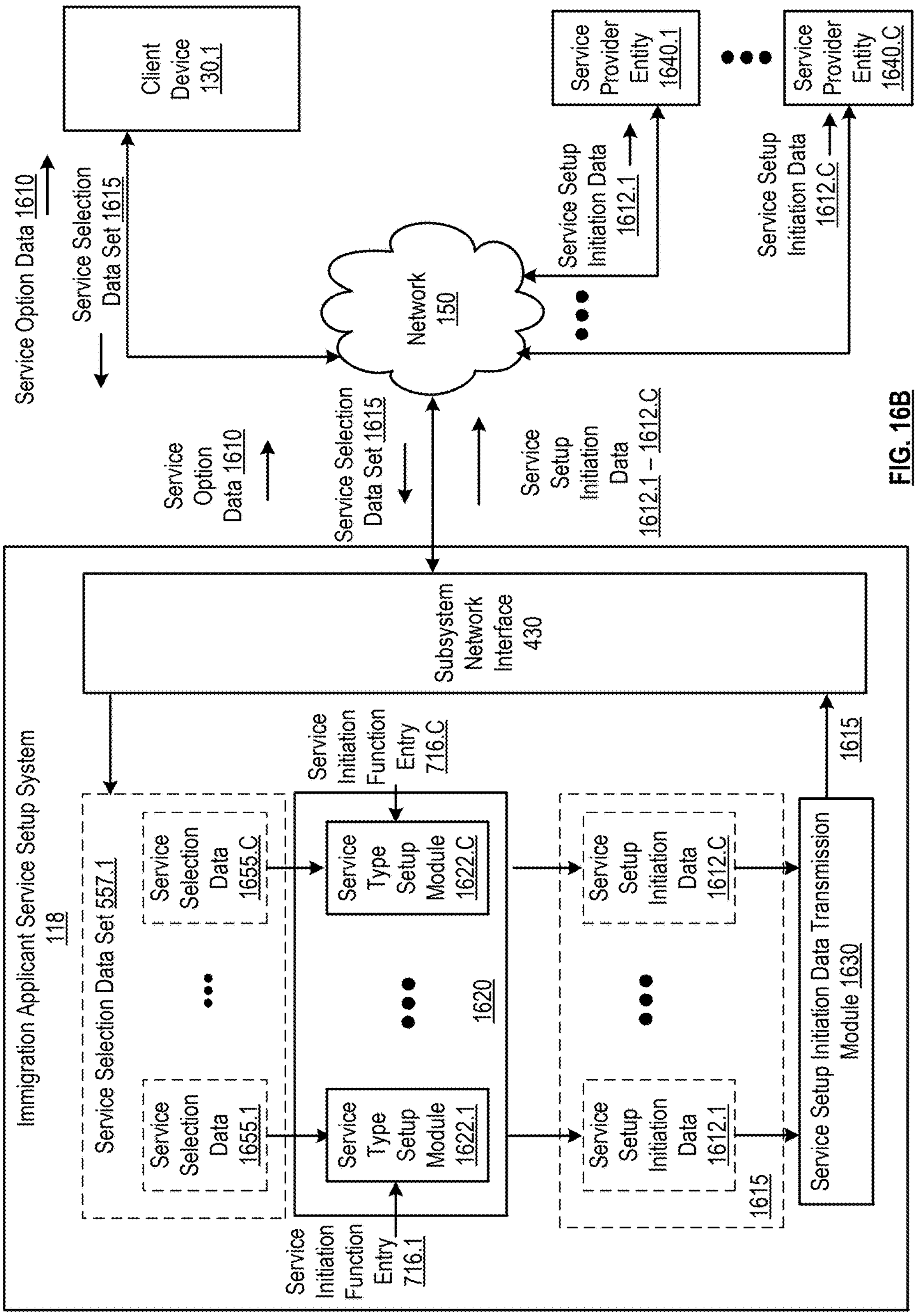
Figure 16C:
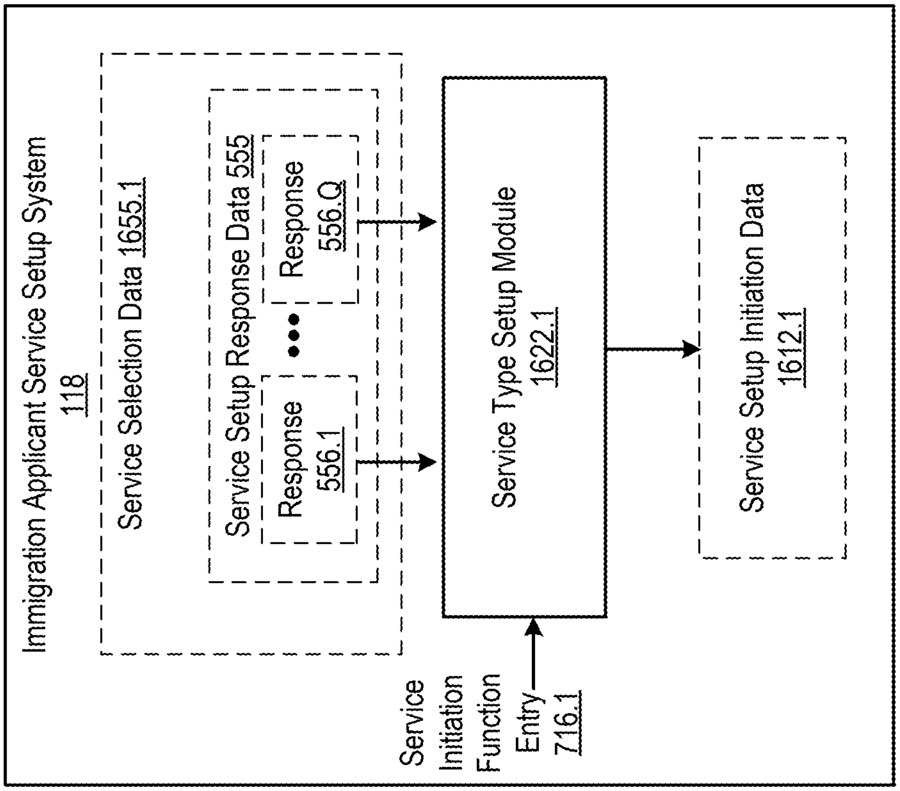
Figure 16D:
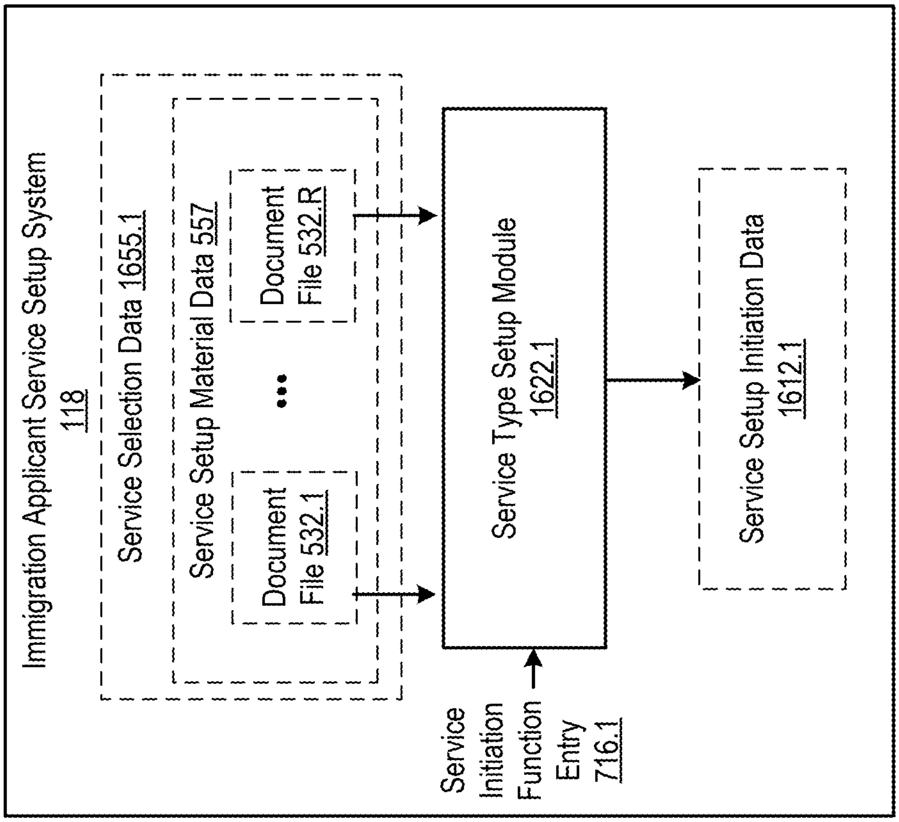
Figure 16E:
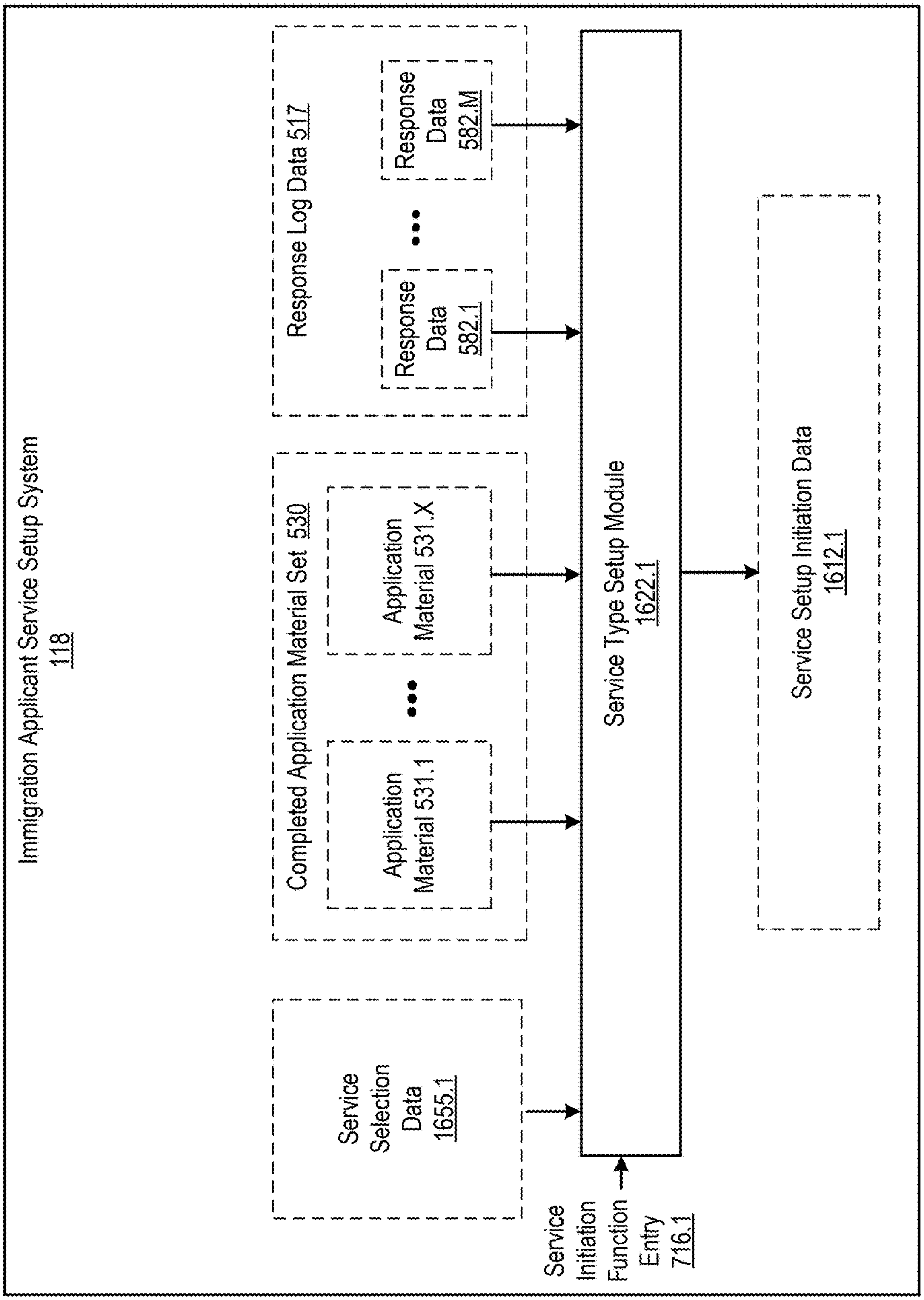
Figure 16F:
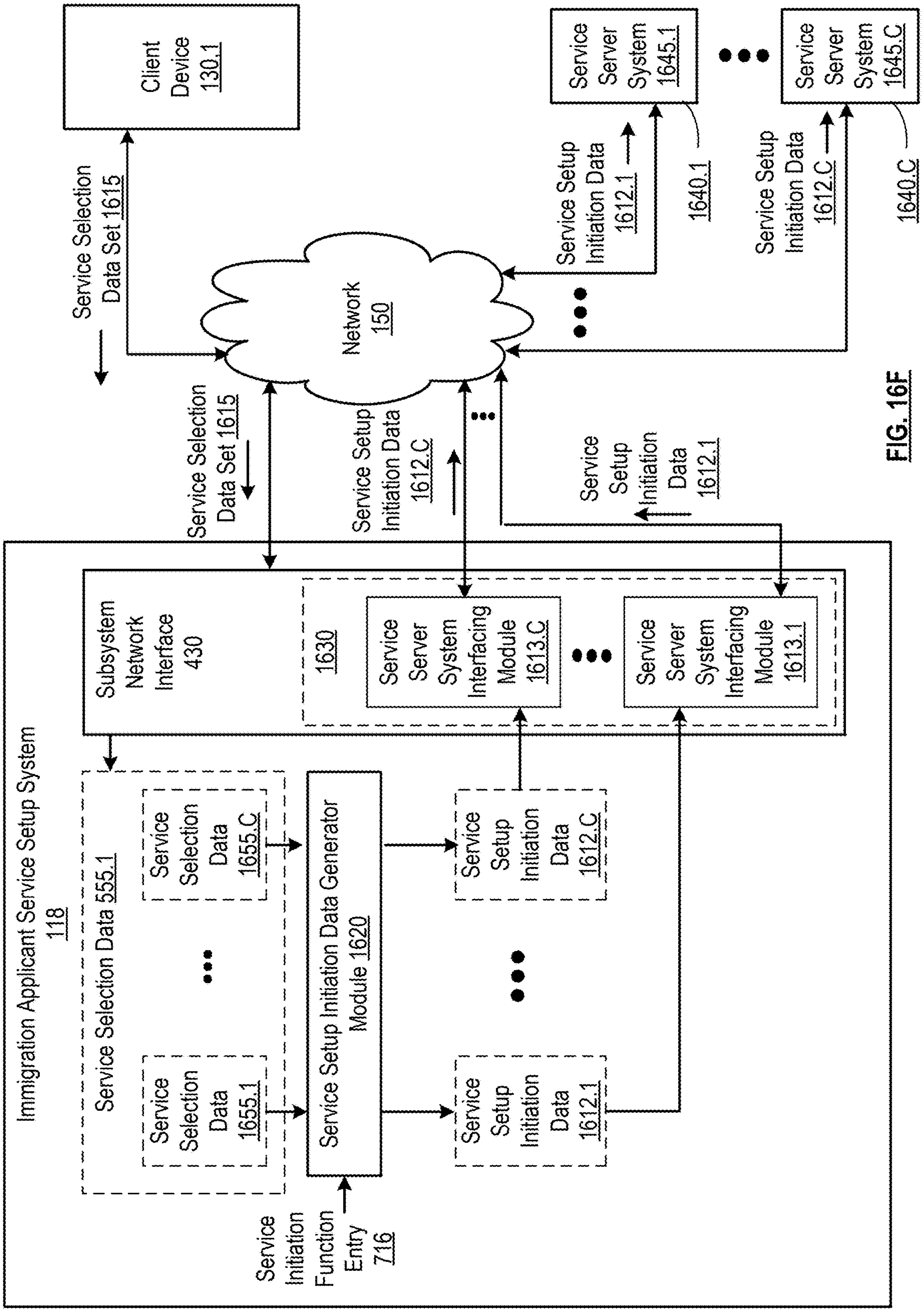
Figure 16G:
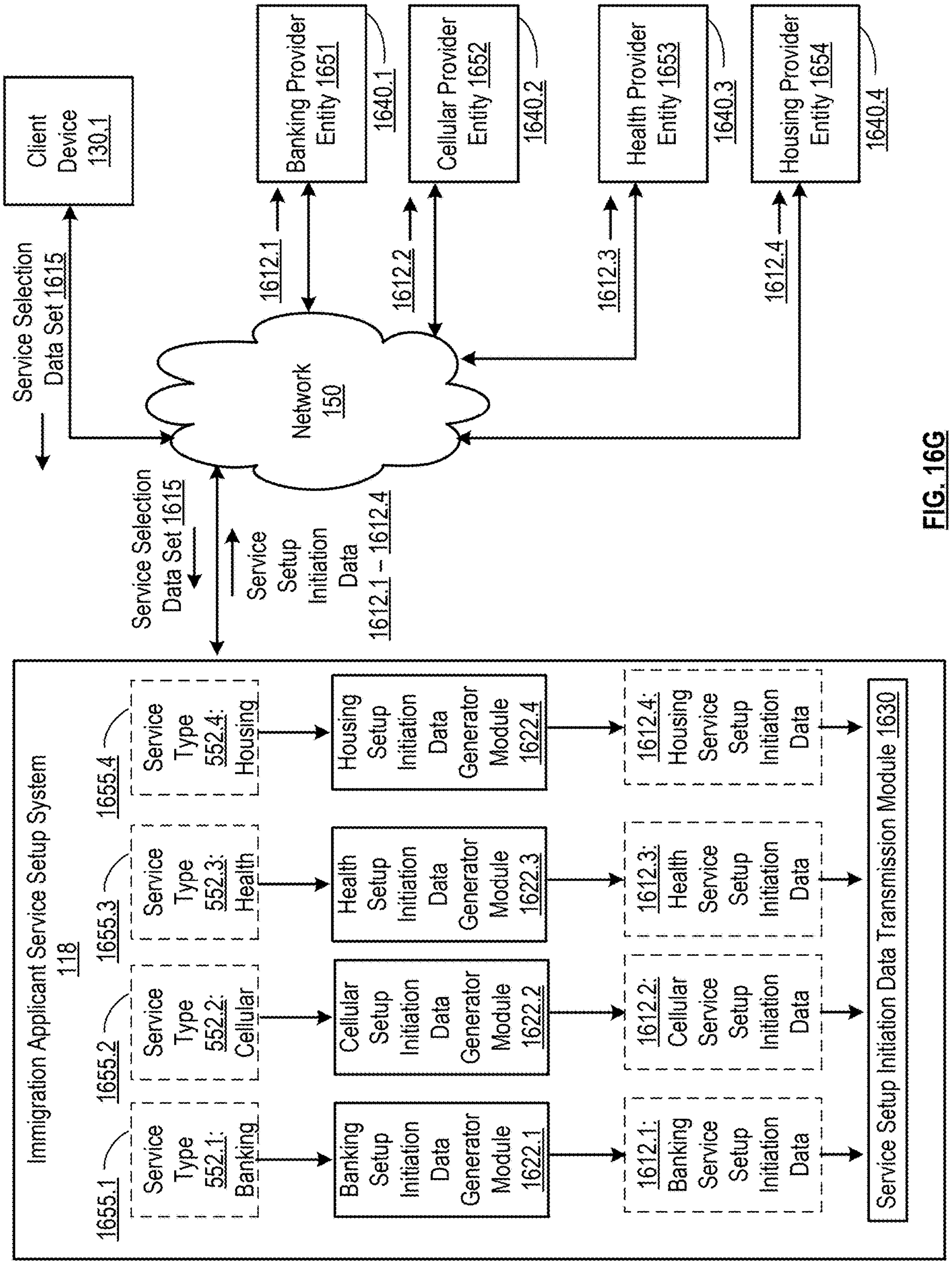
Figure 16H:
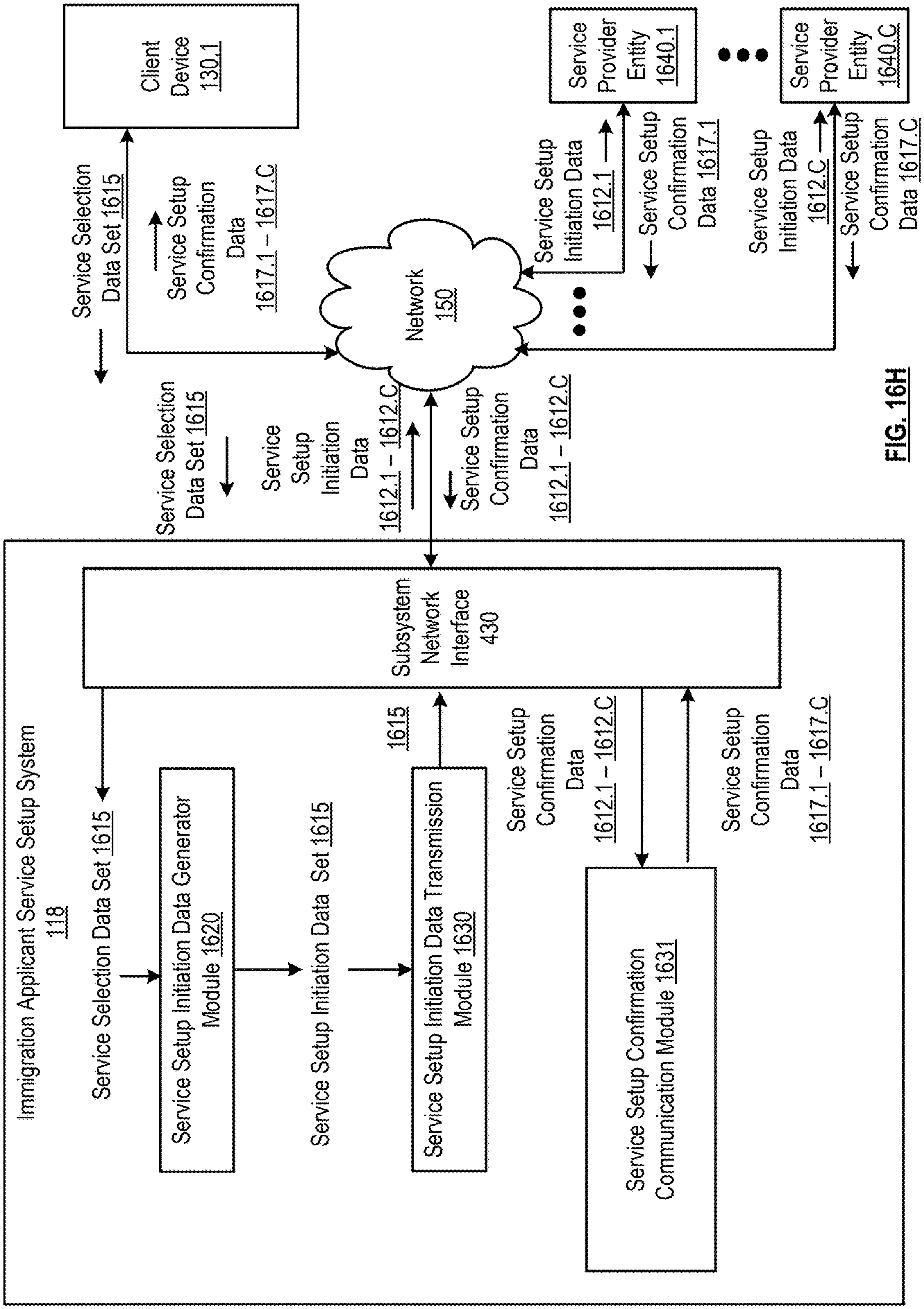
Figure 16I:
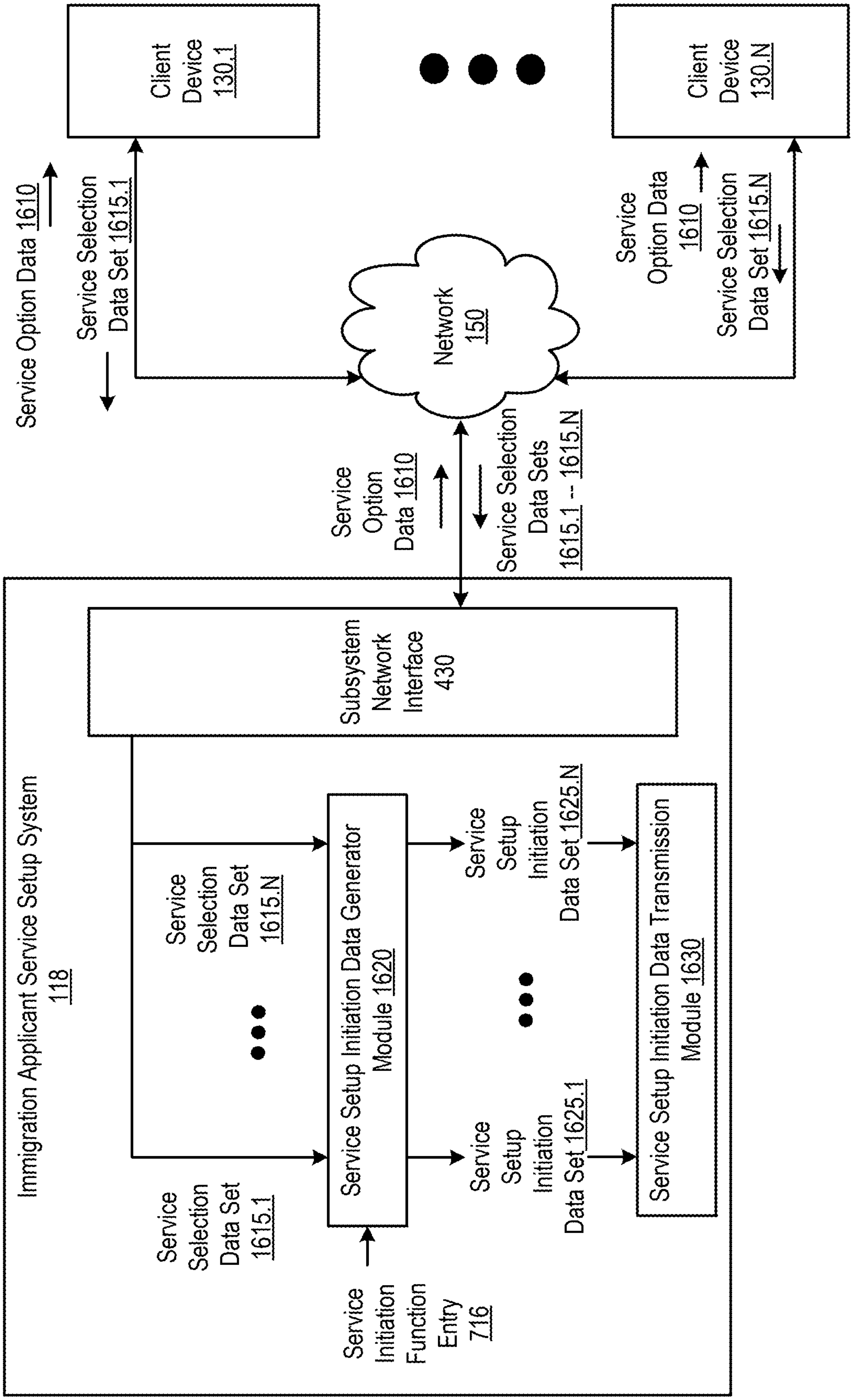
Figure 16J:
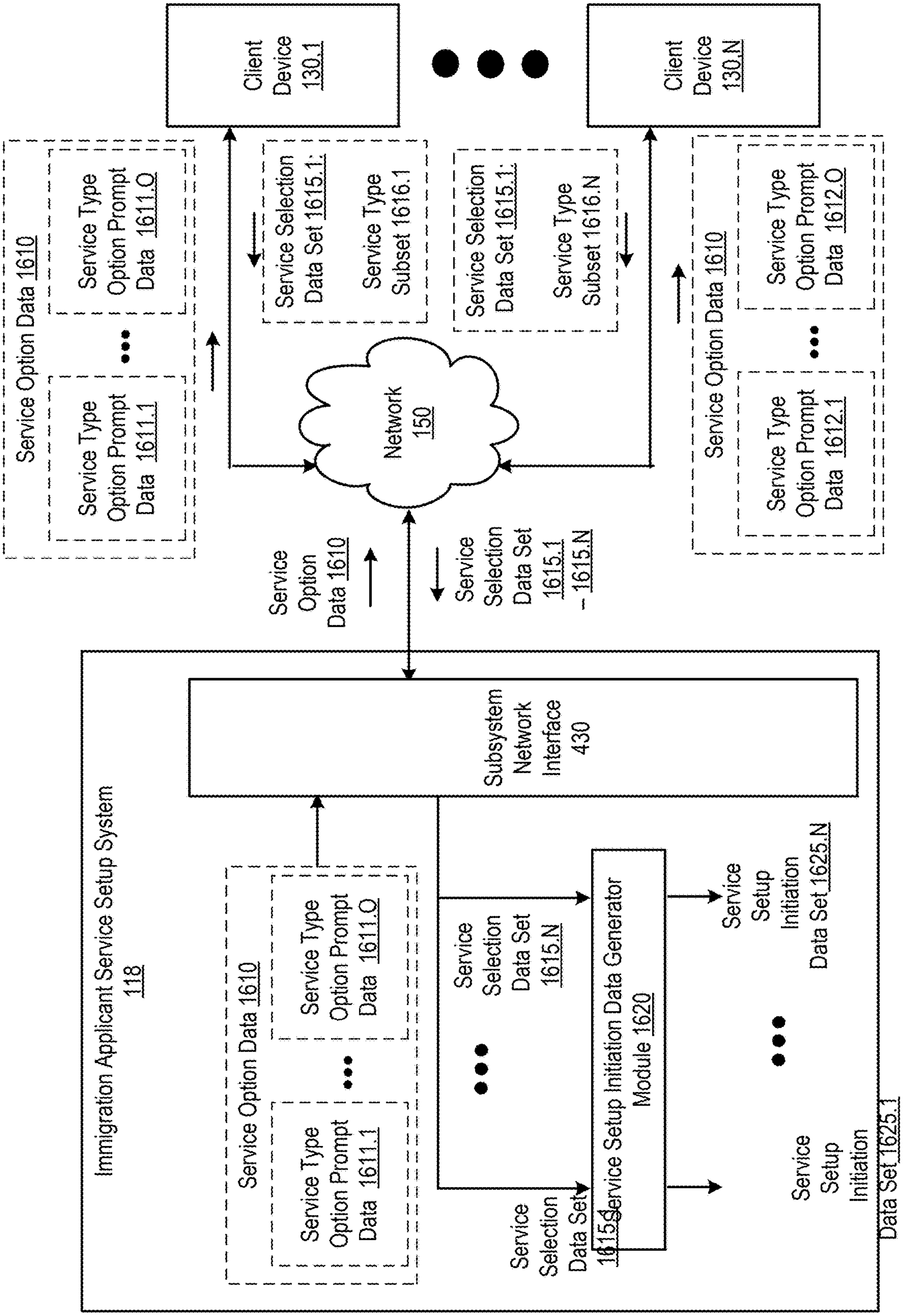
Figure 16K:
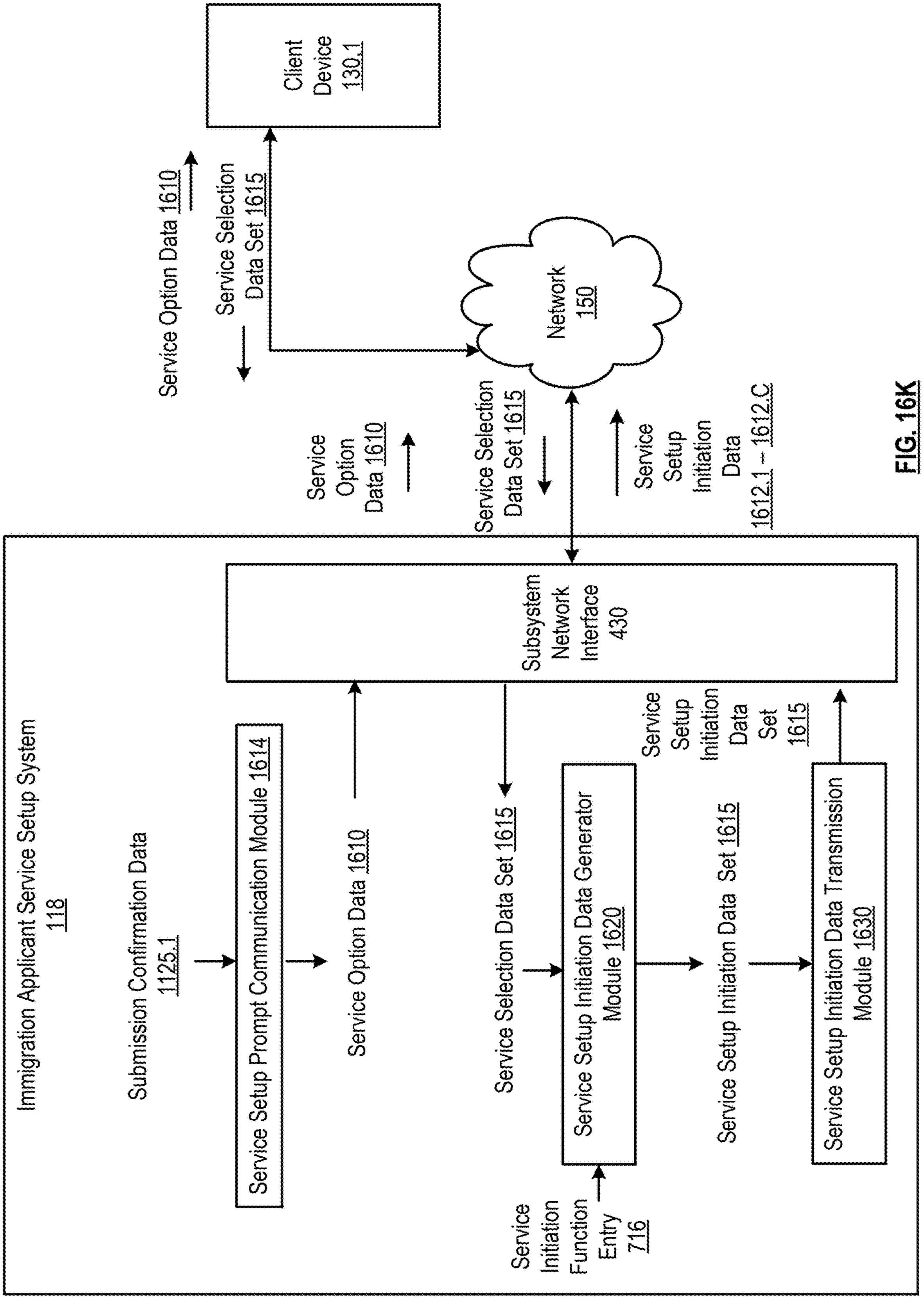
Figure 16L:
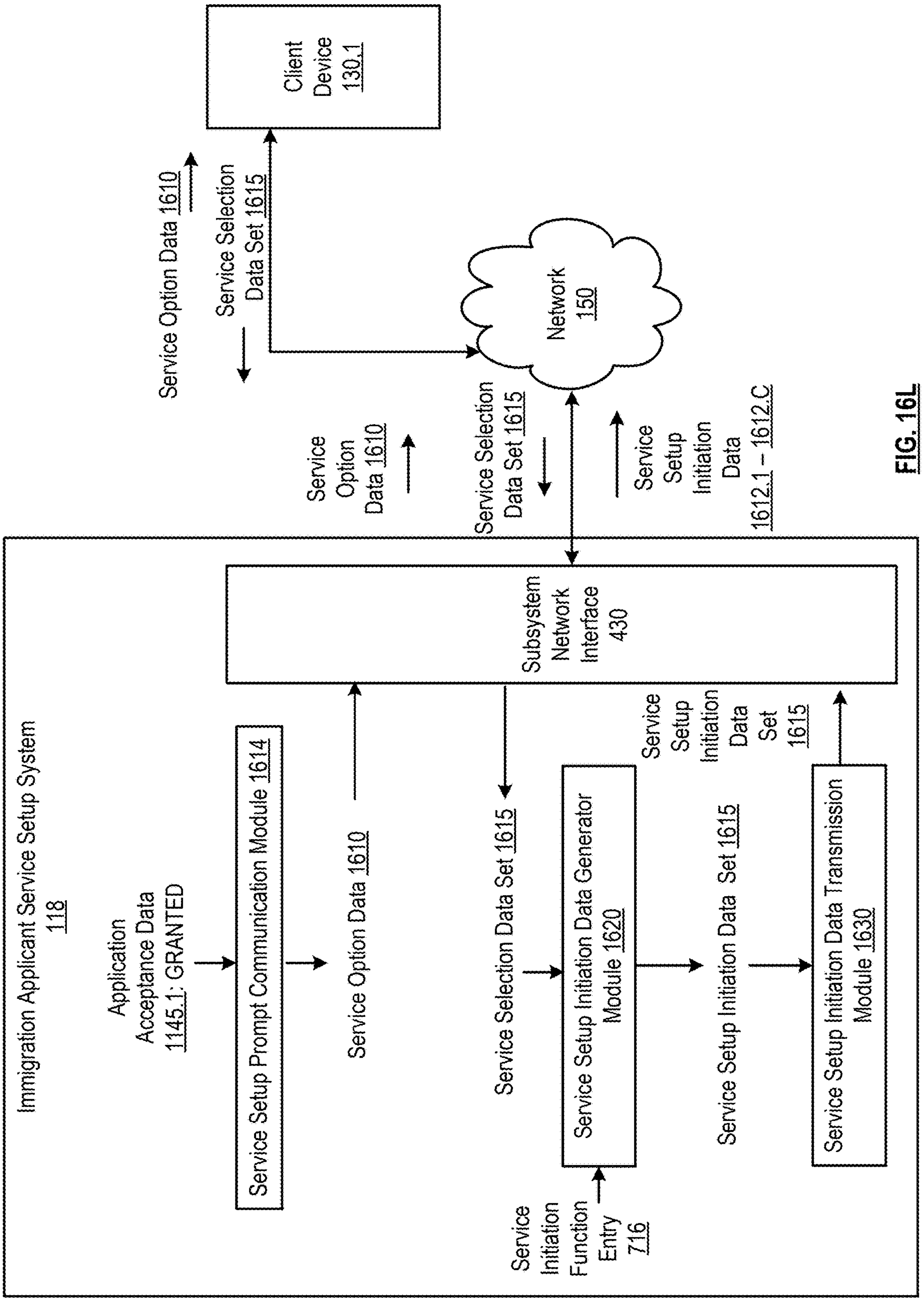
Figure 16M:
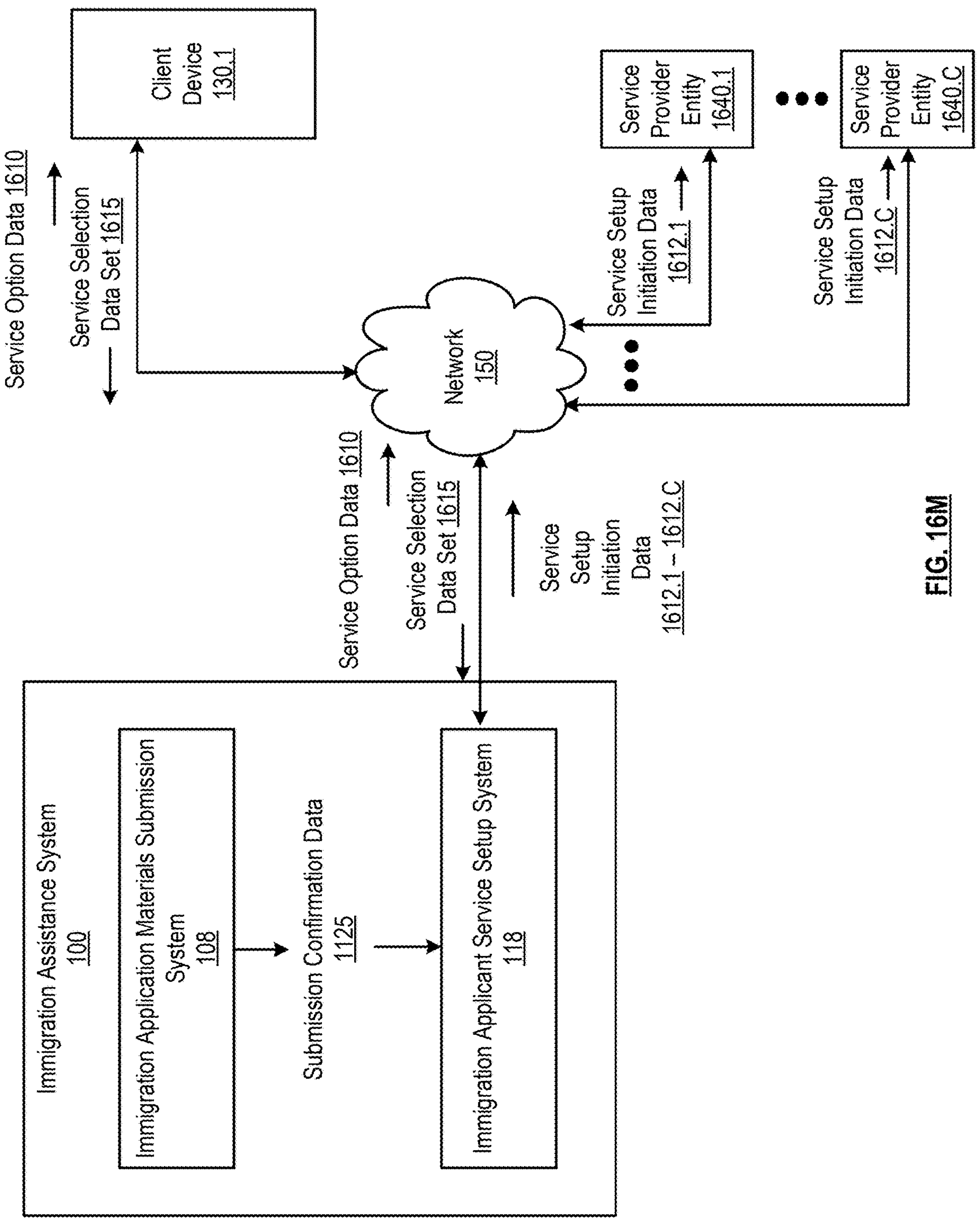
Figure 16N:
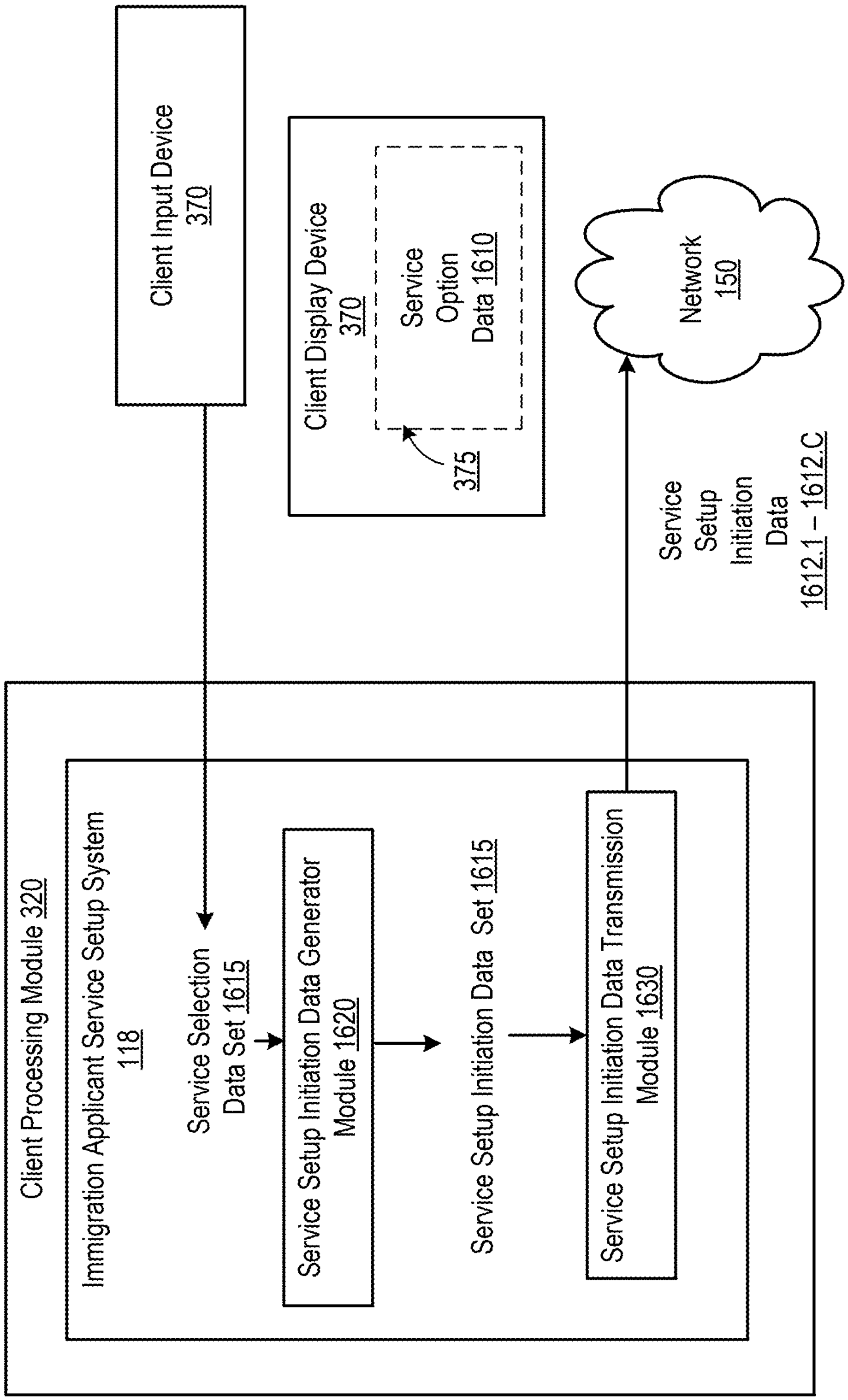
Figure 16O:
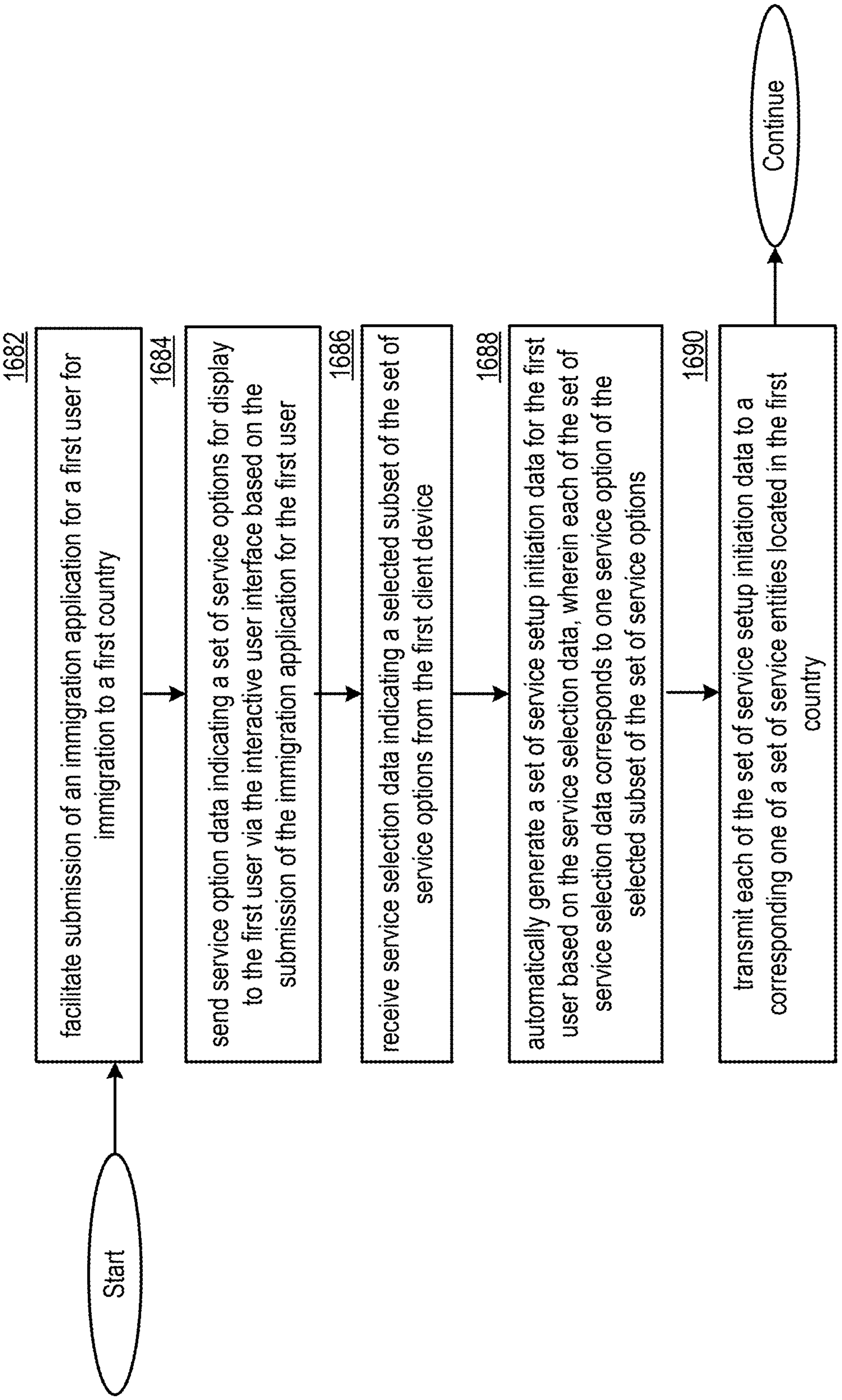
Figure 16P:
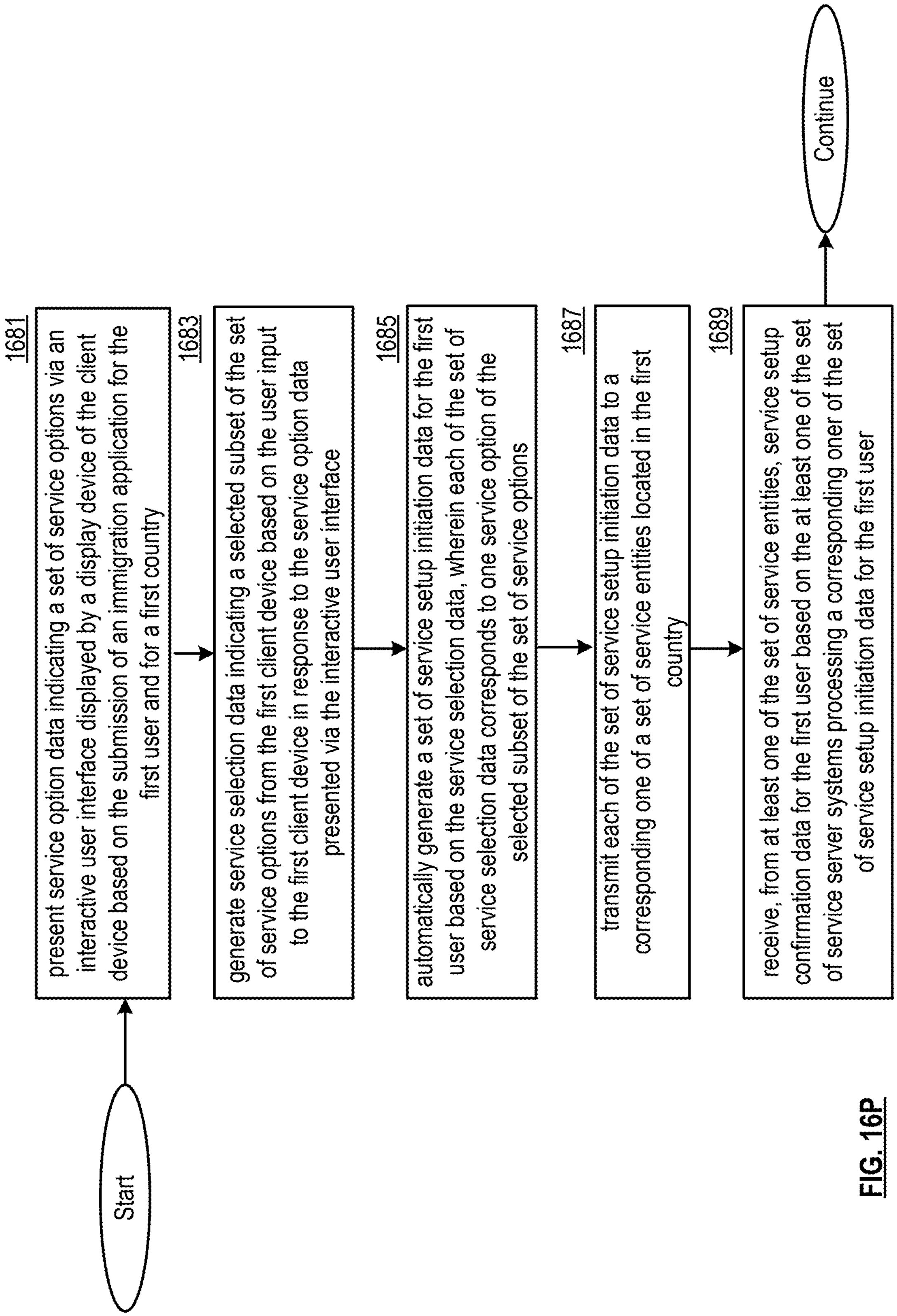
Figure 16Q:
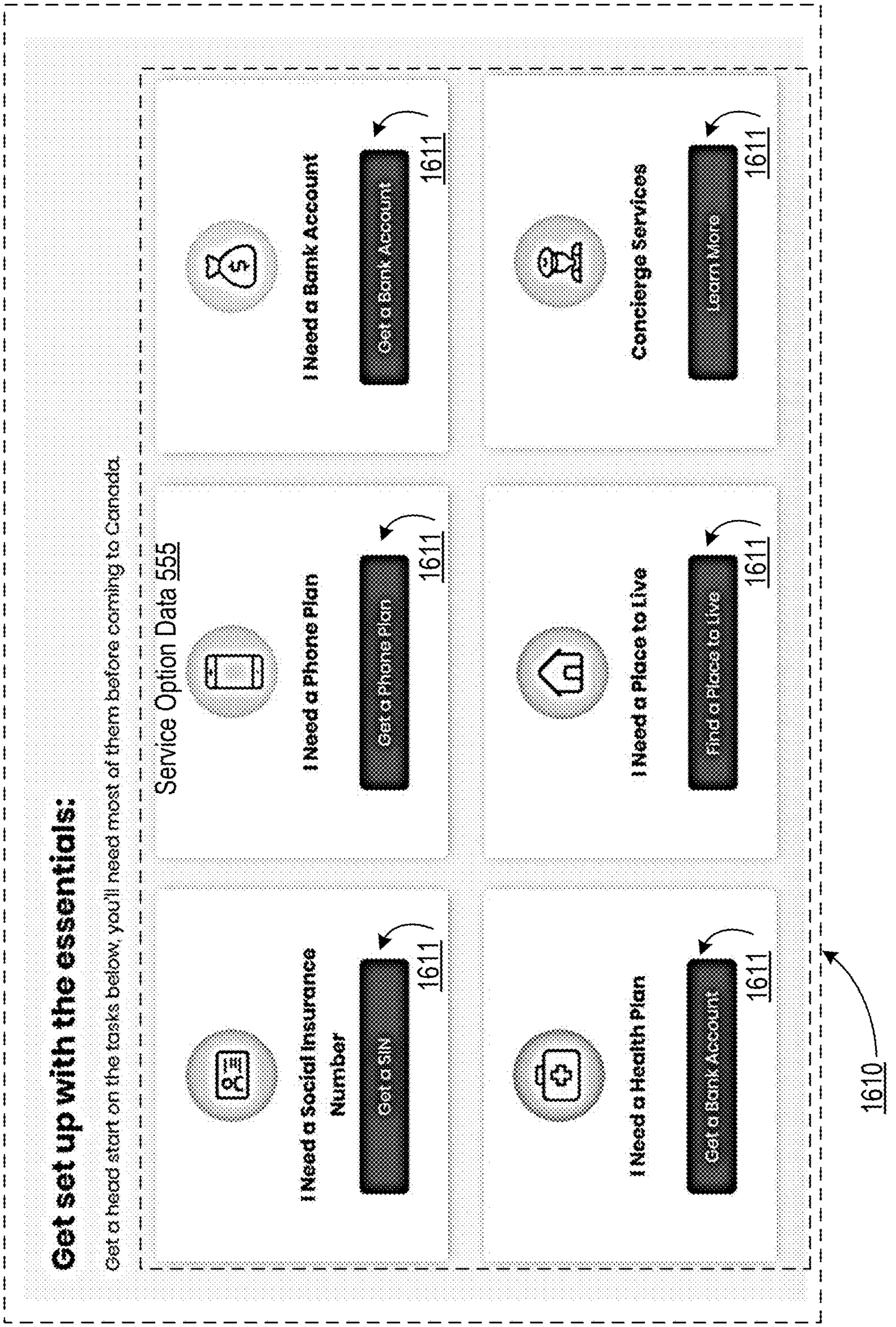
Figure 16S:
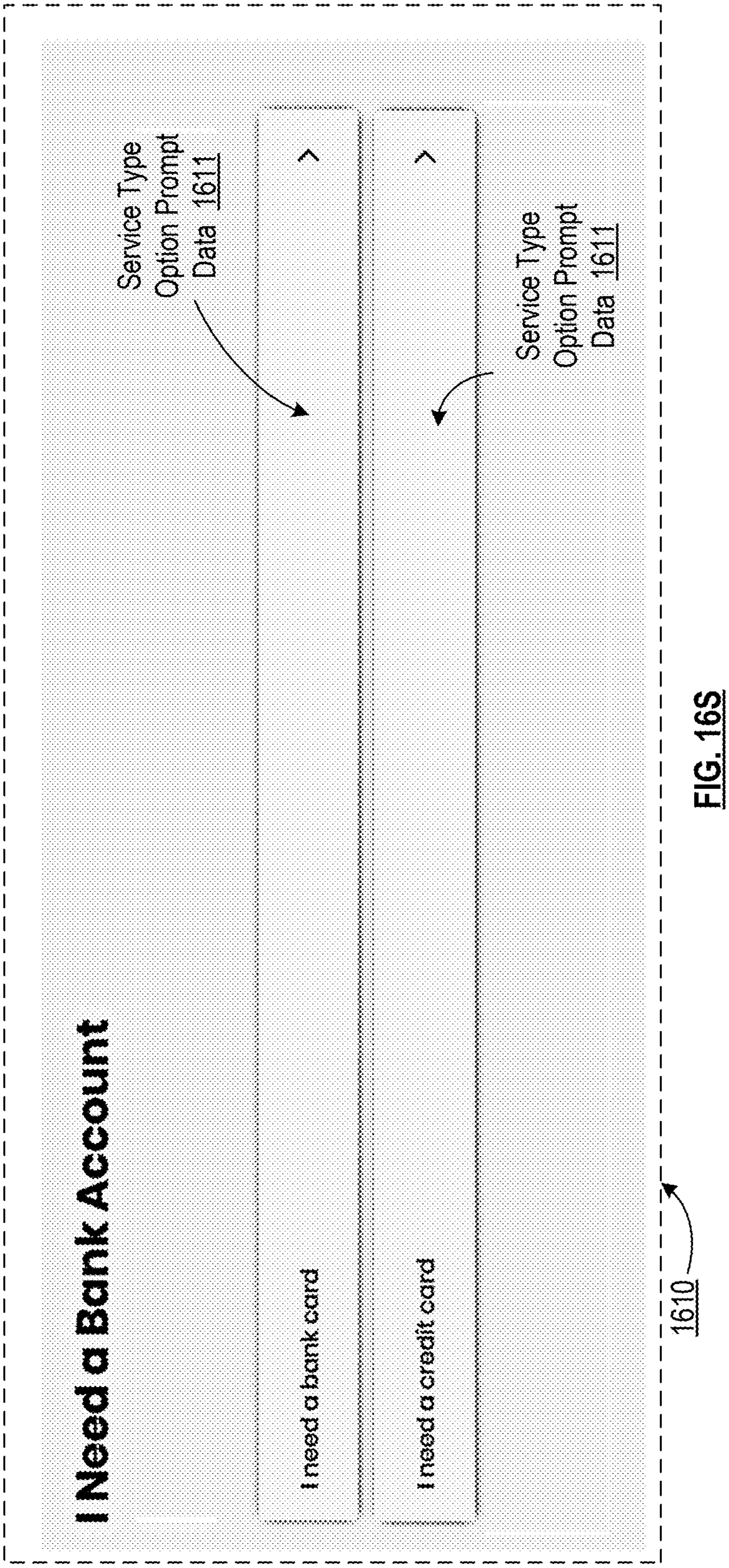
Figure 17A:
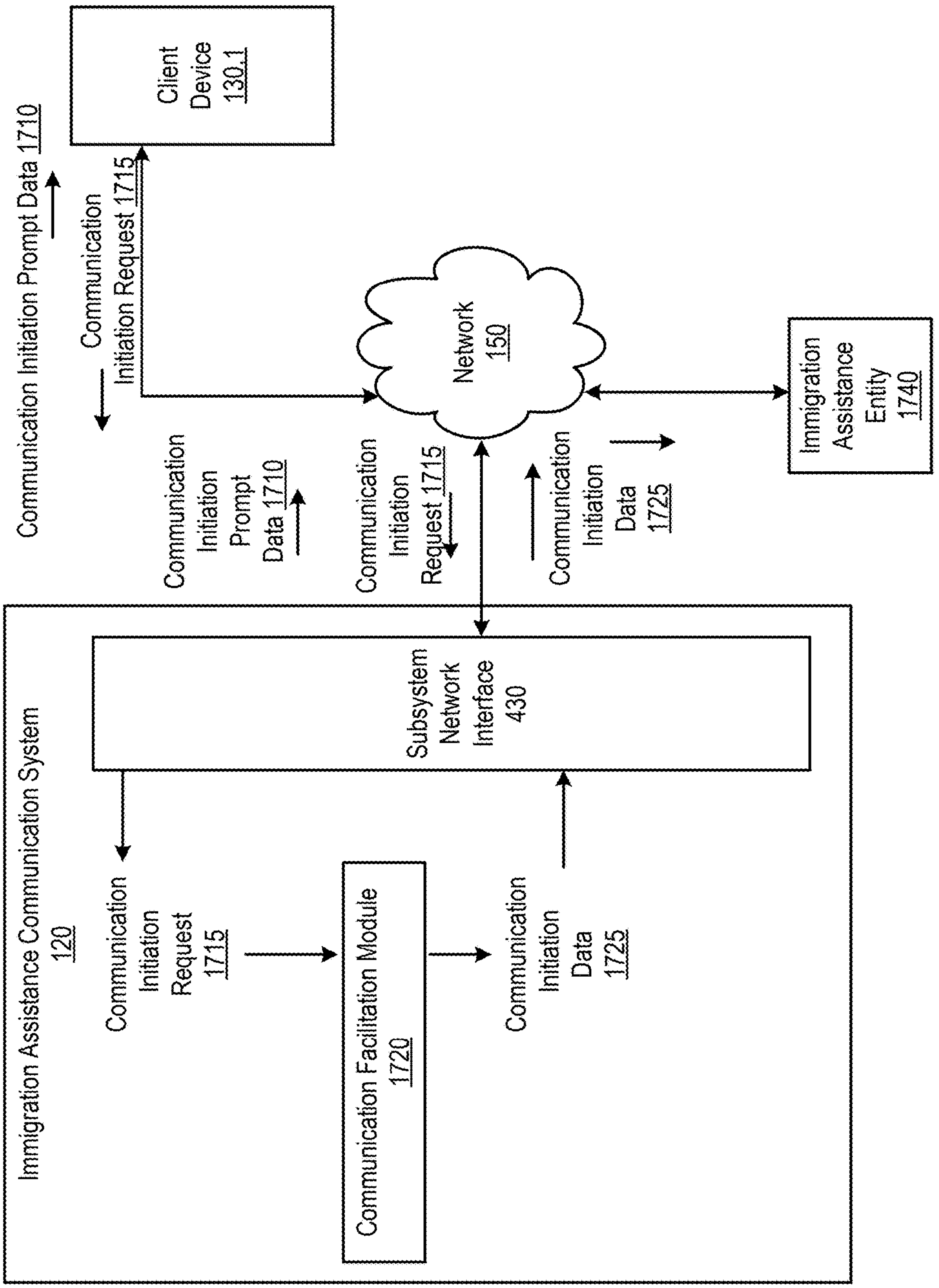
Figure 17B:
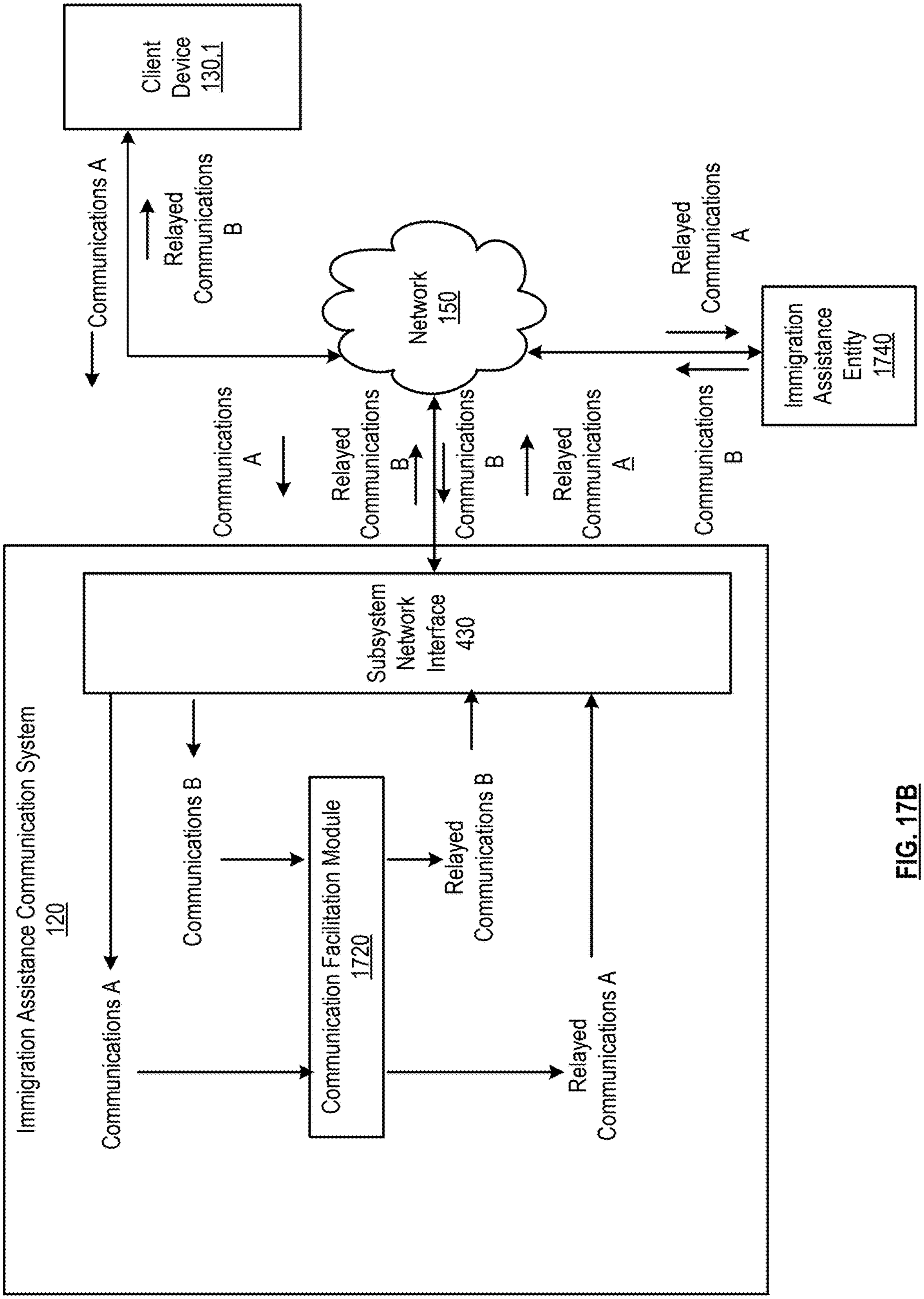
Figure 17C:
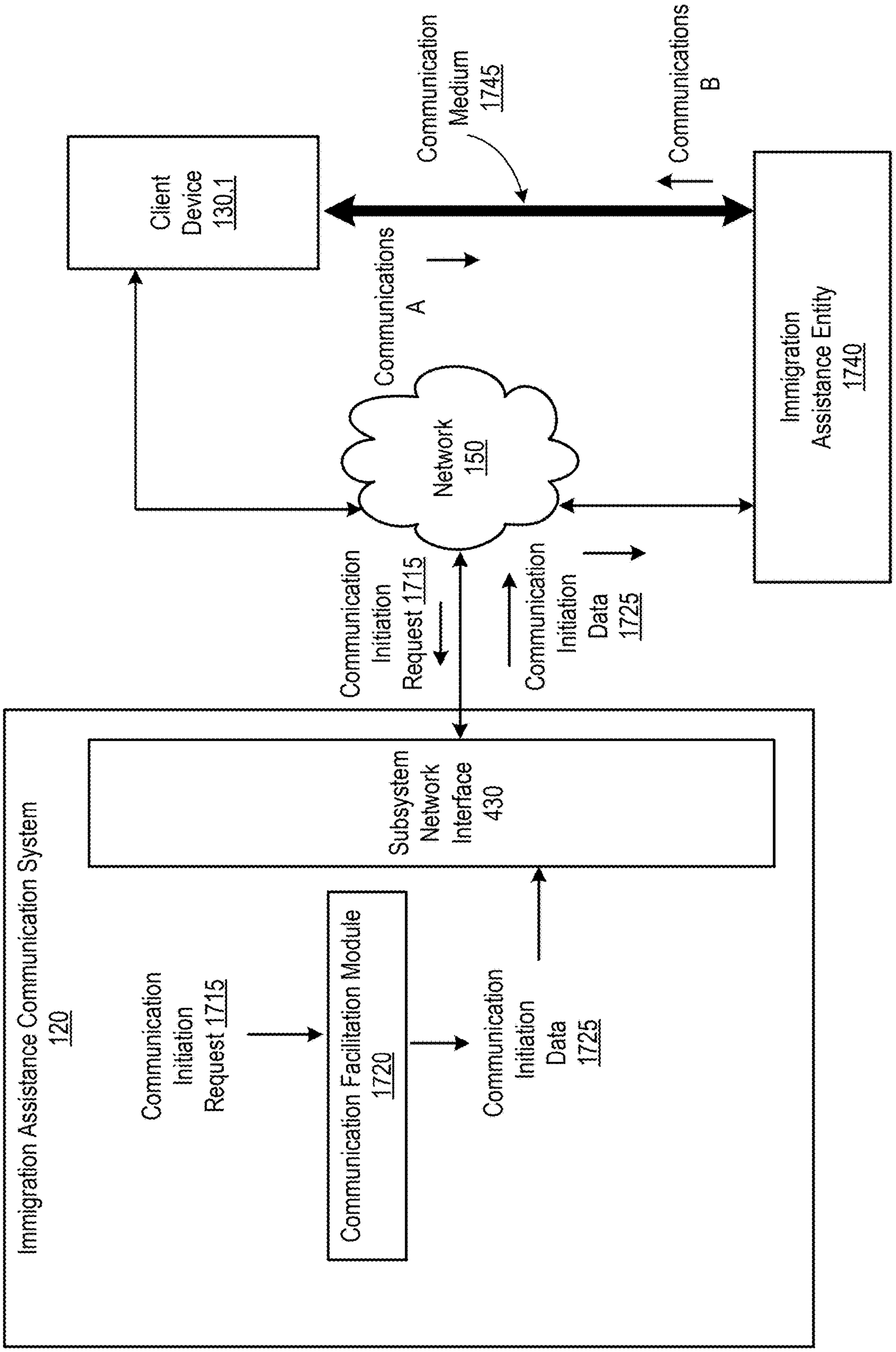
Figure 17D:
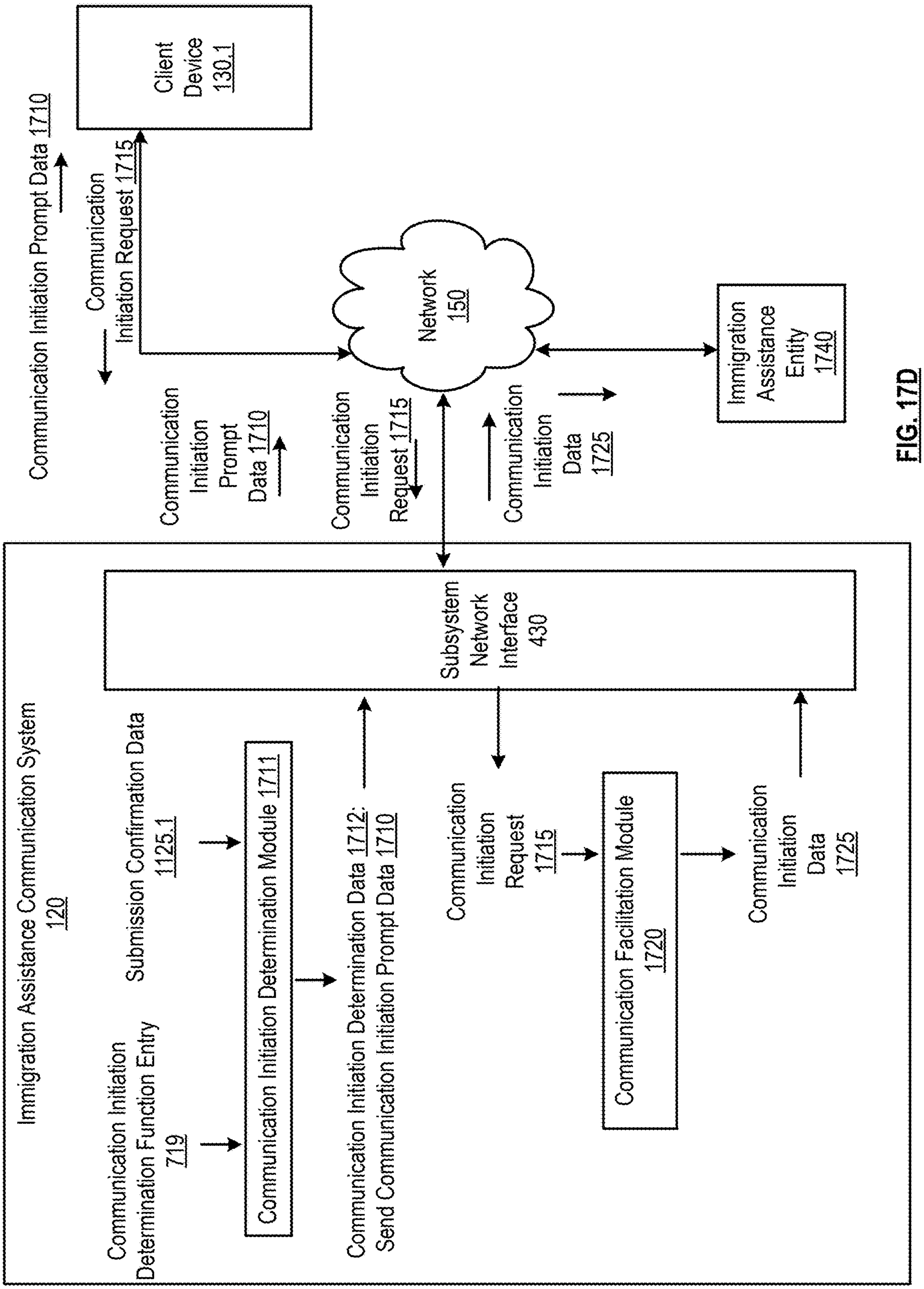
Figure 17E:
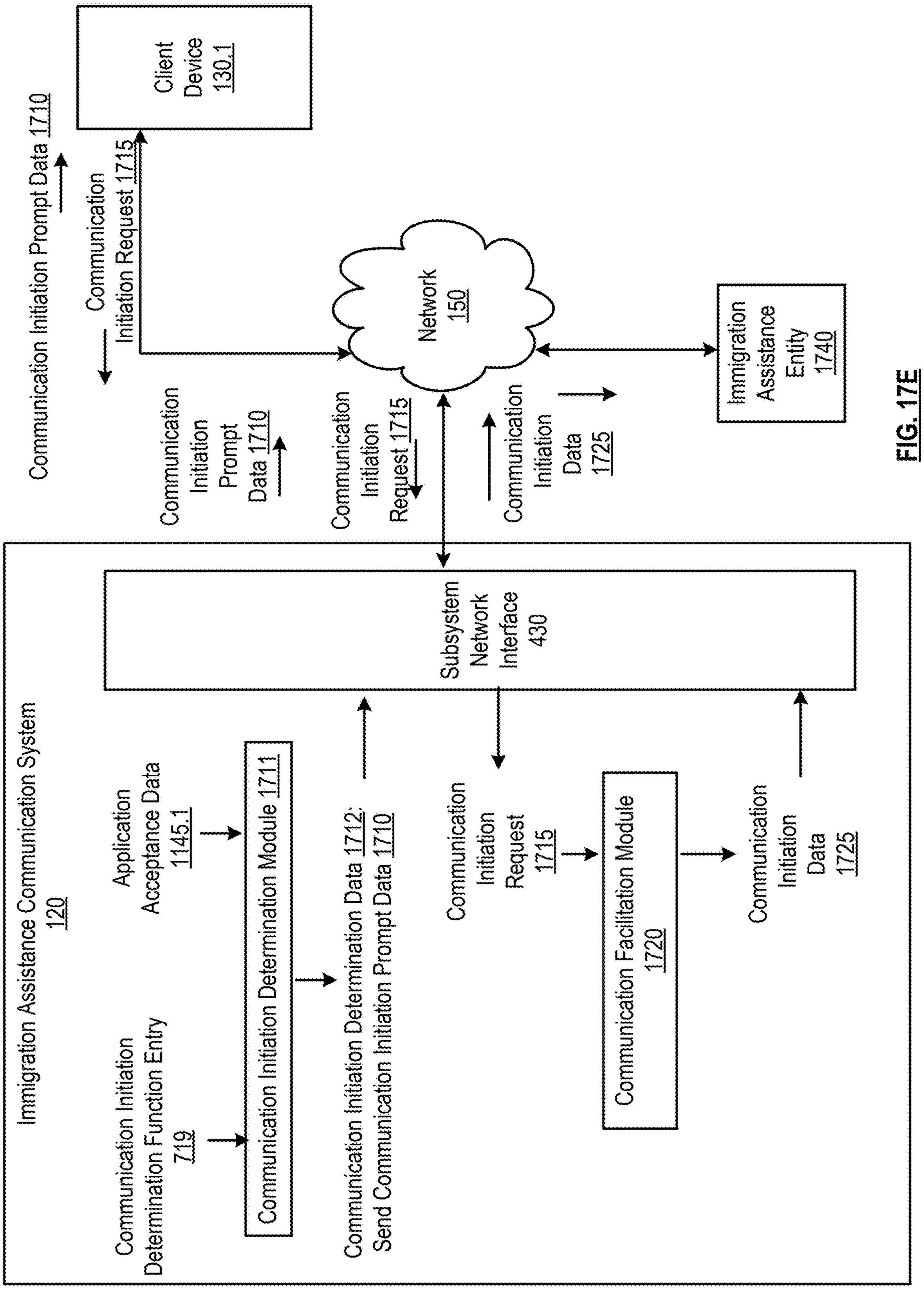
Figure 17F:
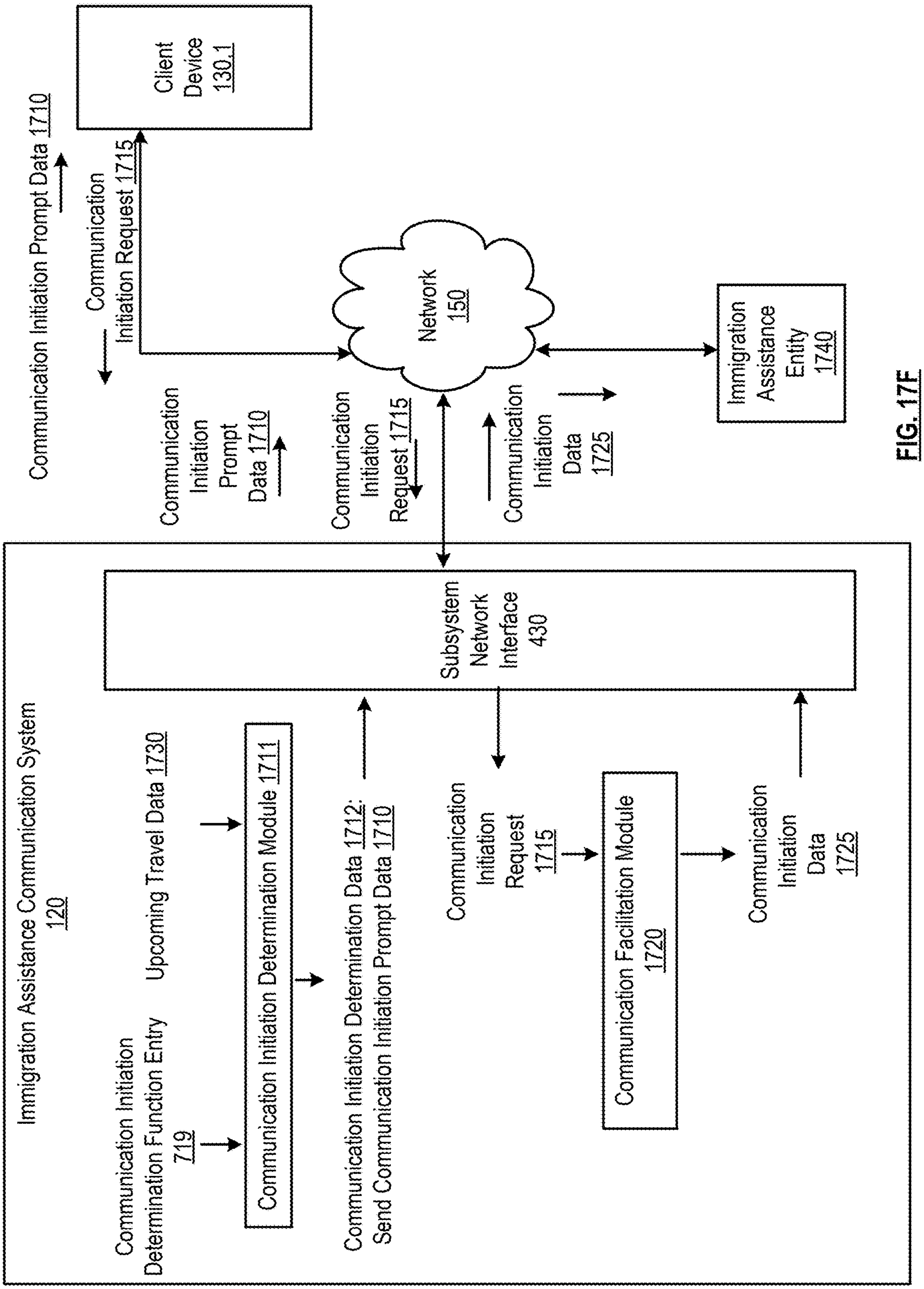
Figure 17G:
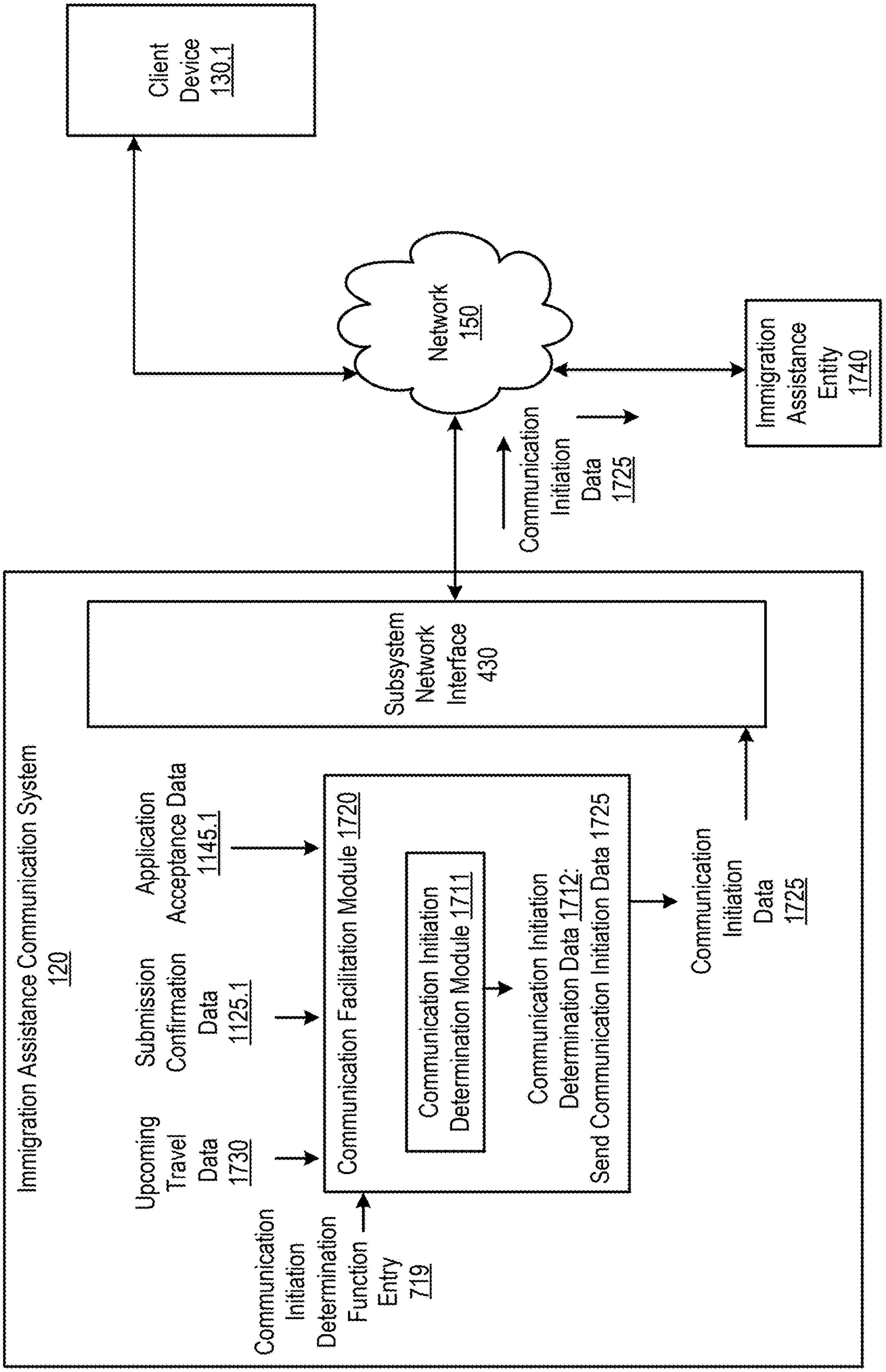
Figure 17H:
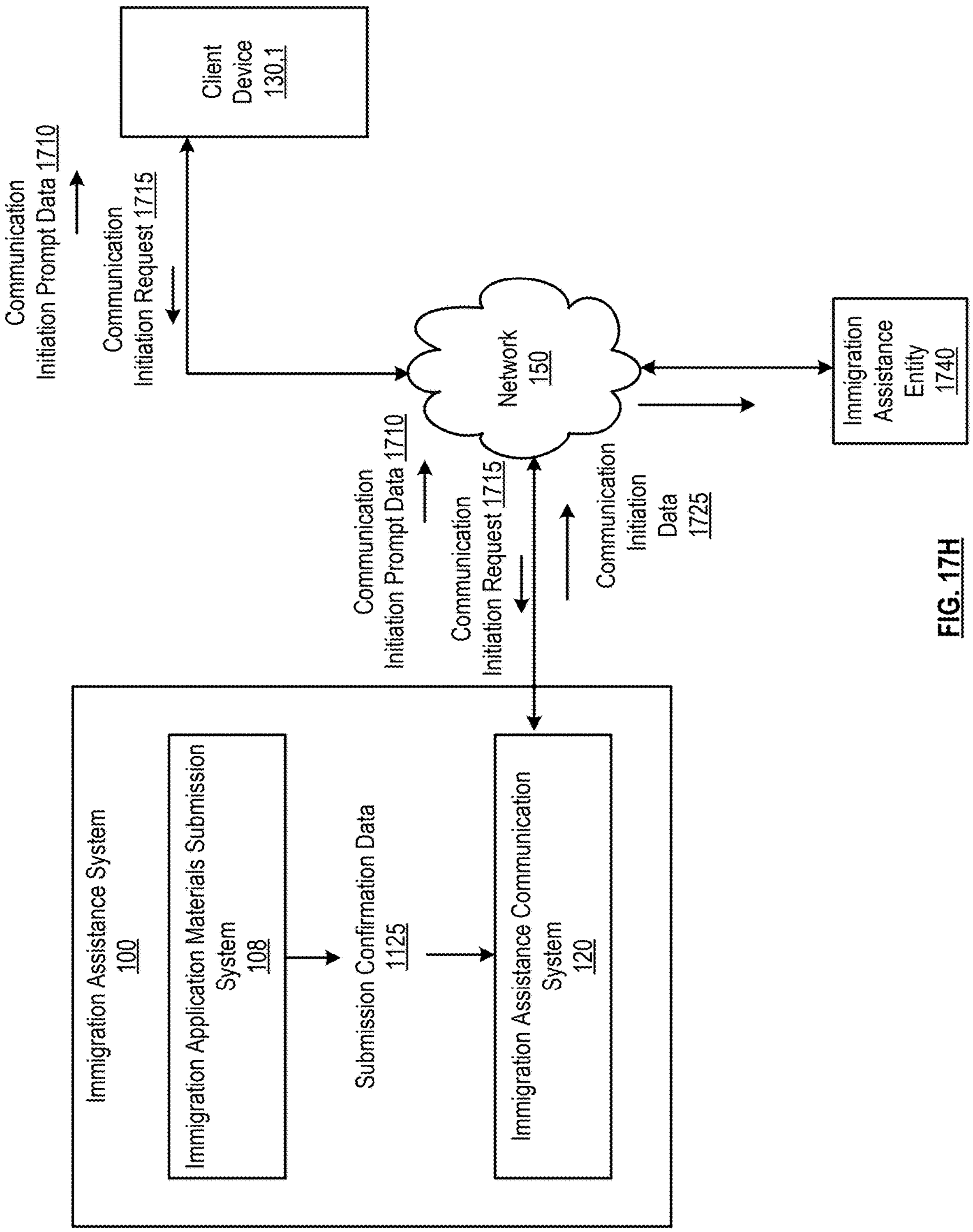
Figure 17I:
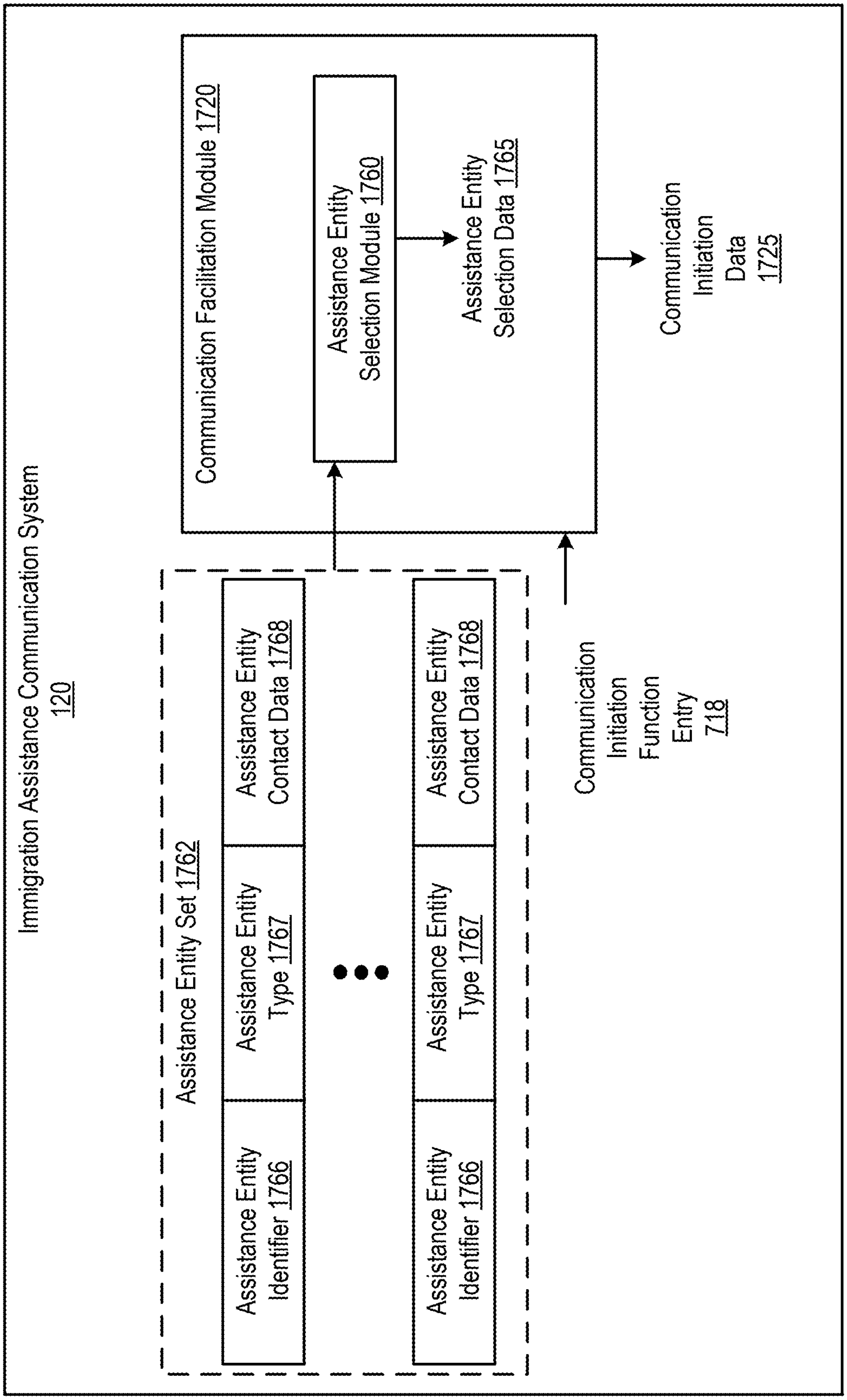
Figure 17J:
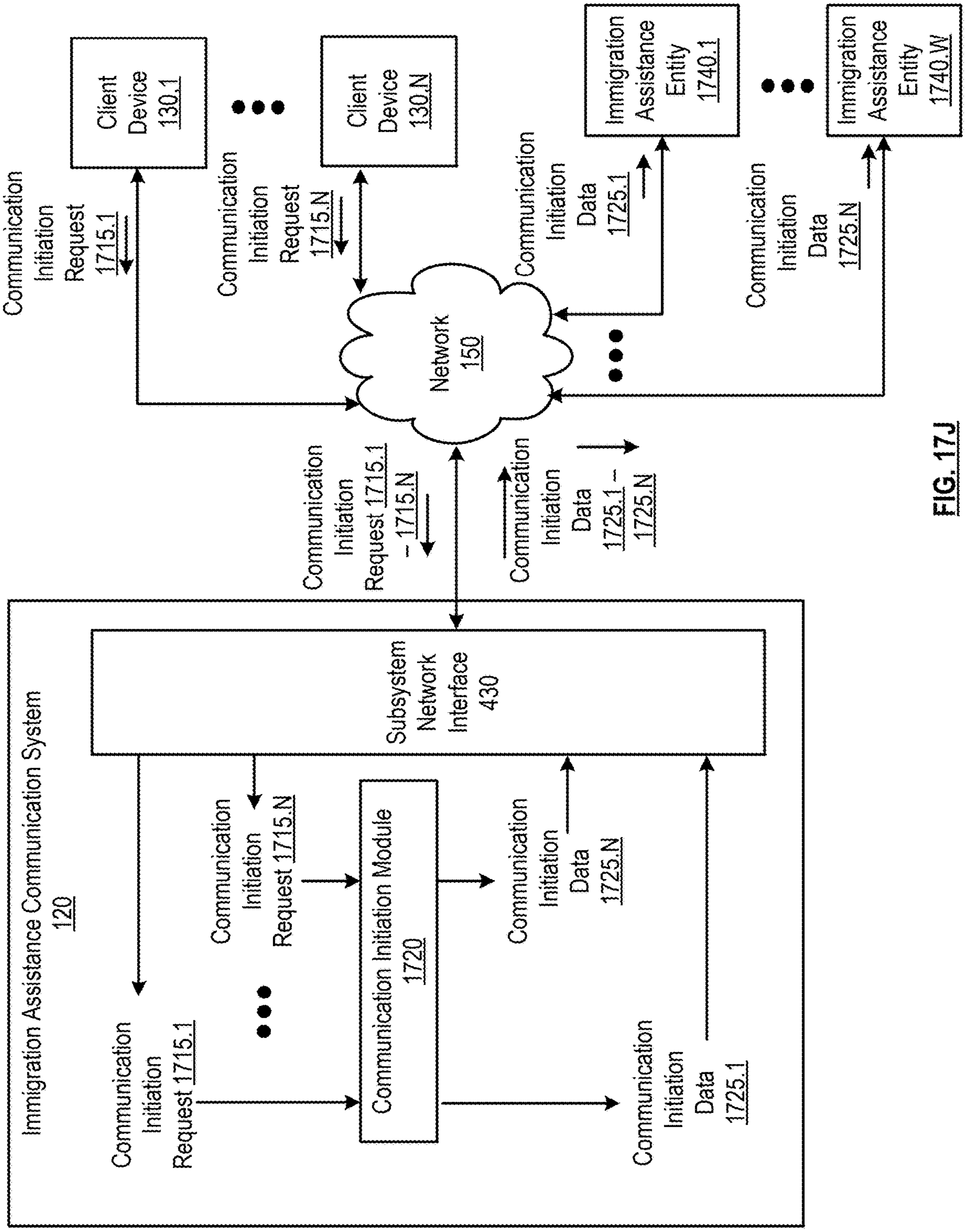
Figure 17K:
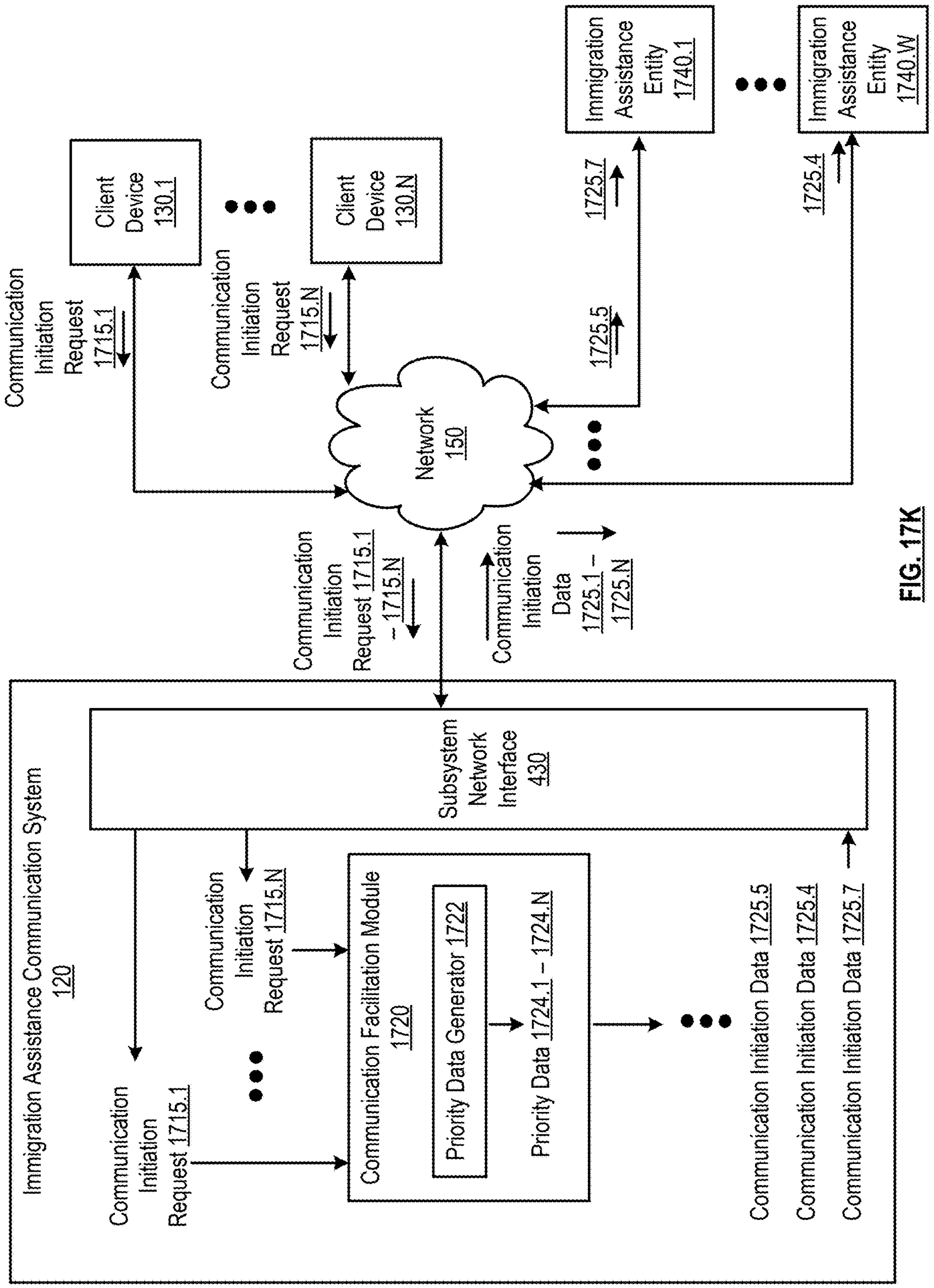
Figure 17L:
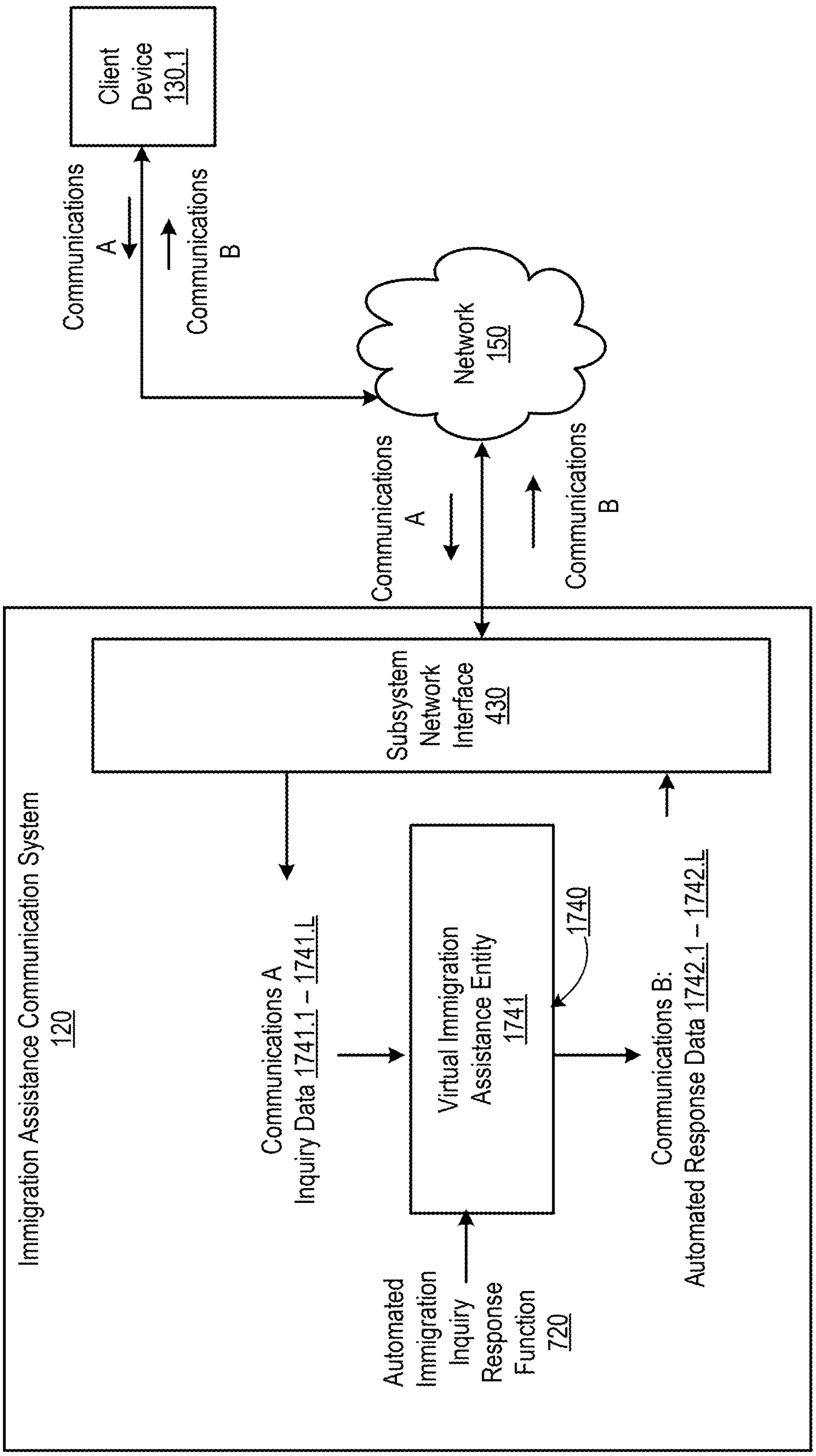
Figure 17M:
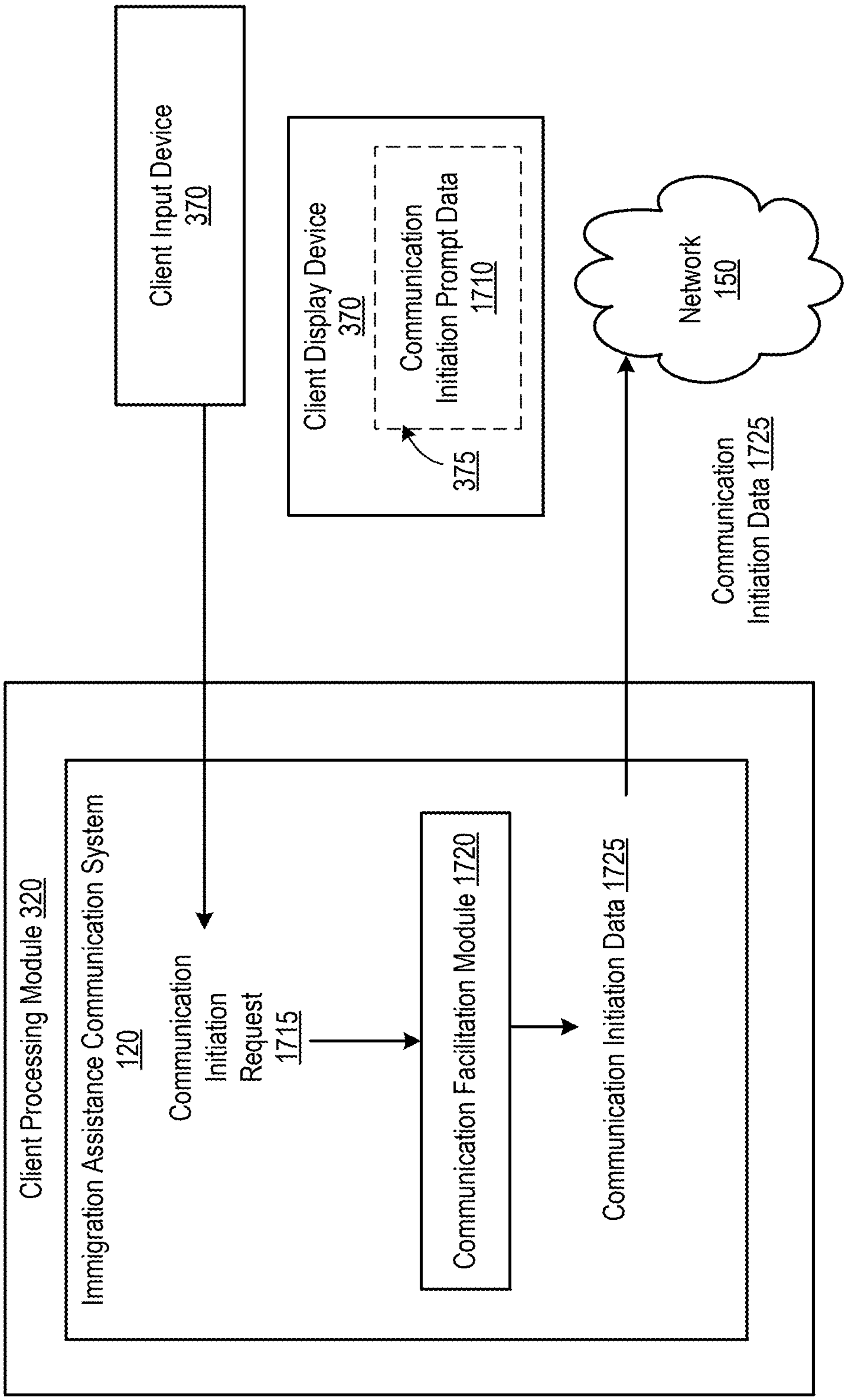
Figure 17N:
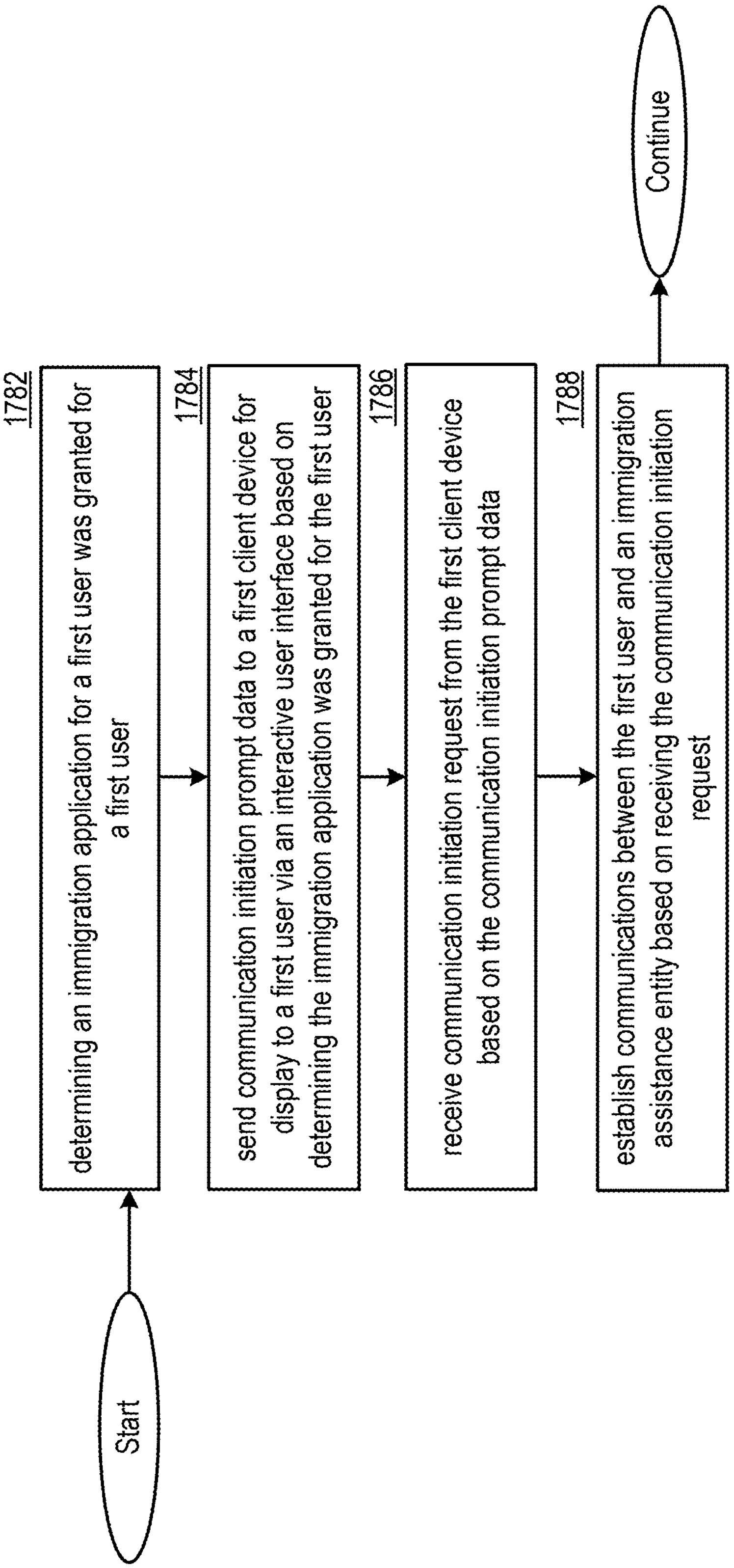
Figure 17O:
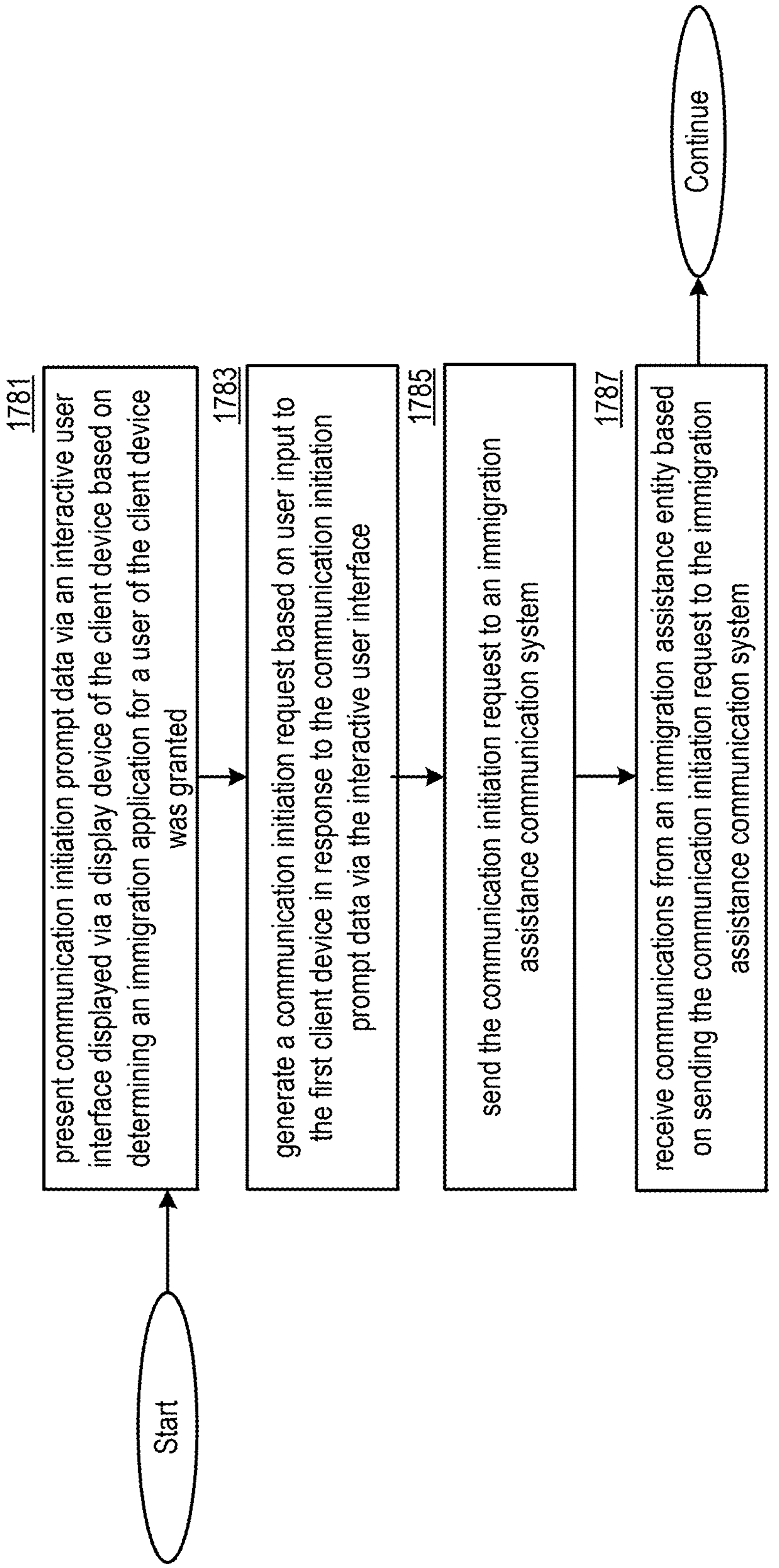
Figure 18A:
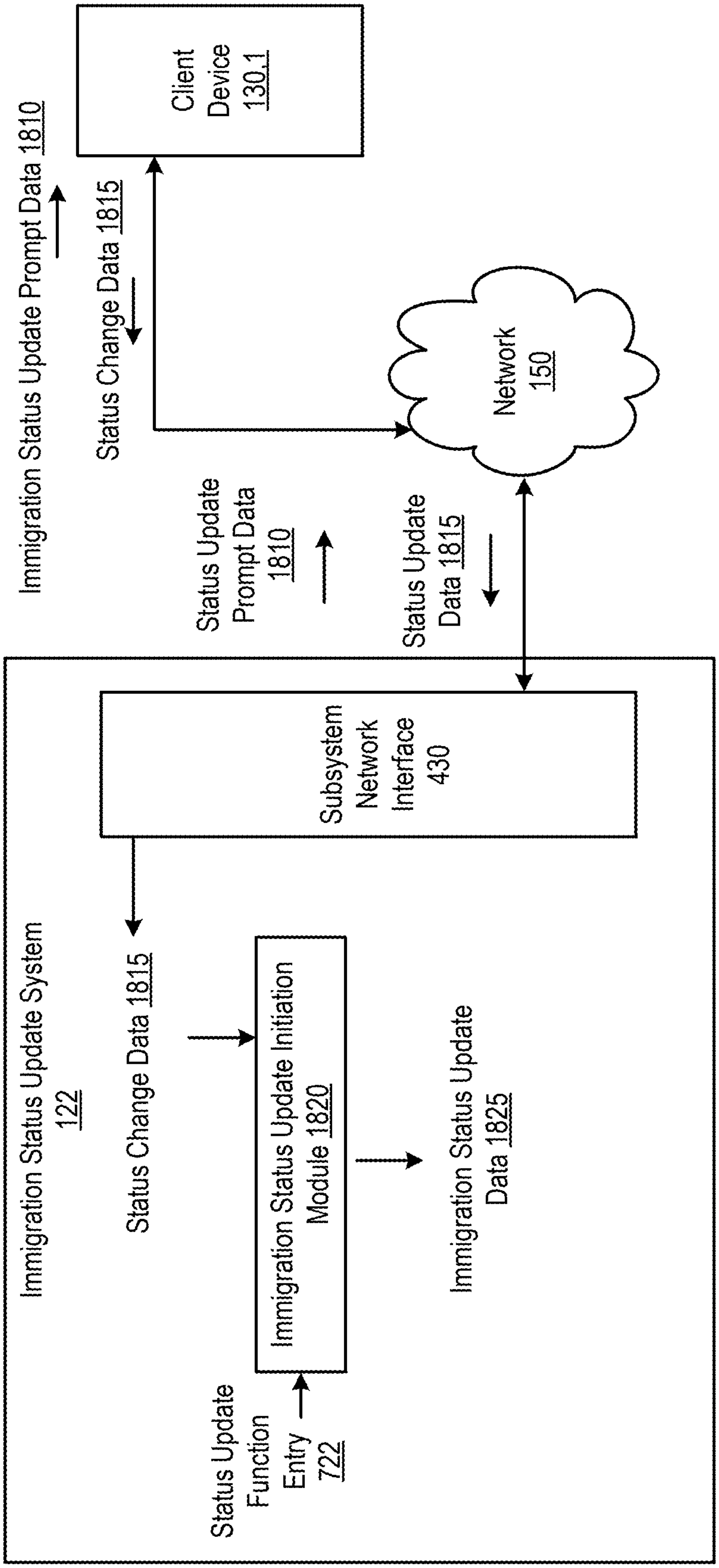
Figure 18B:
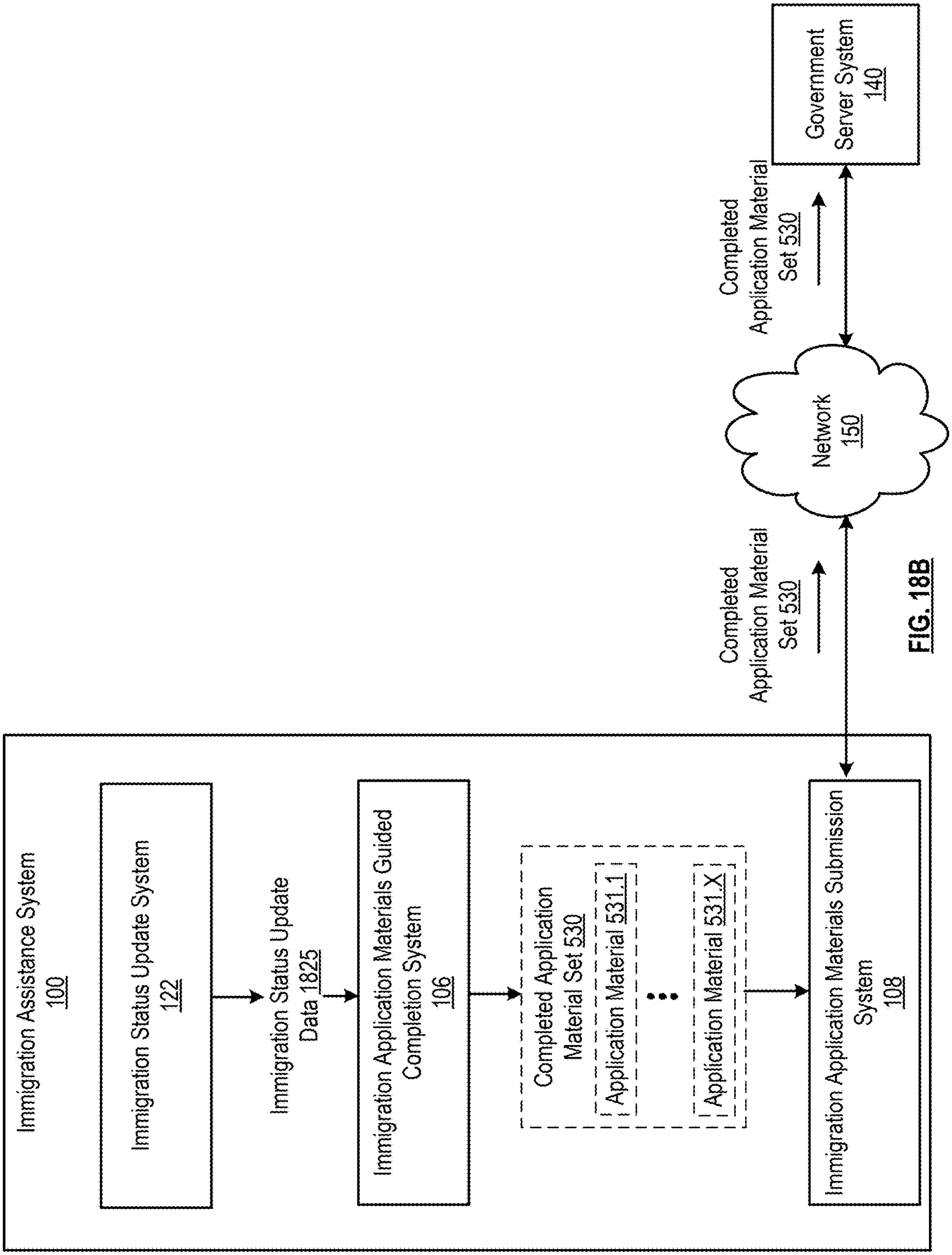
Figure 18C:
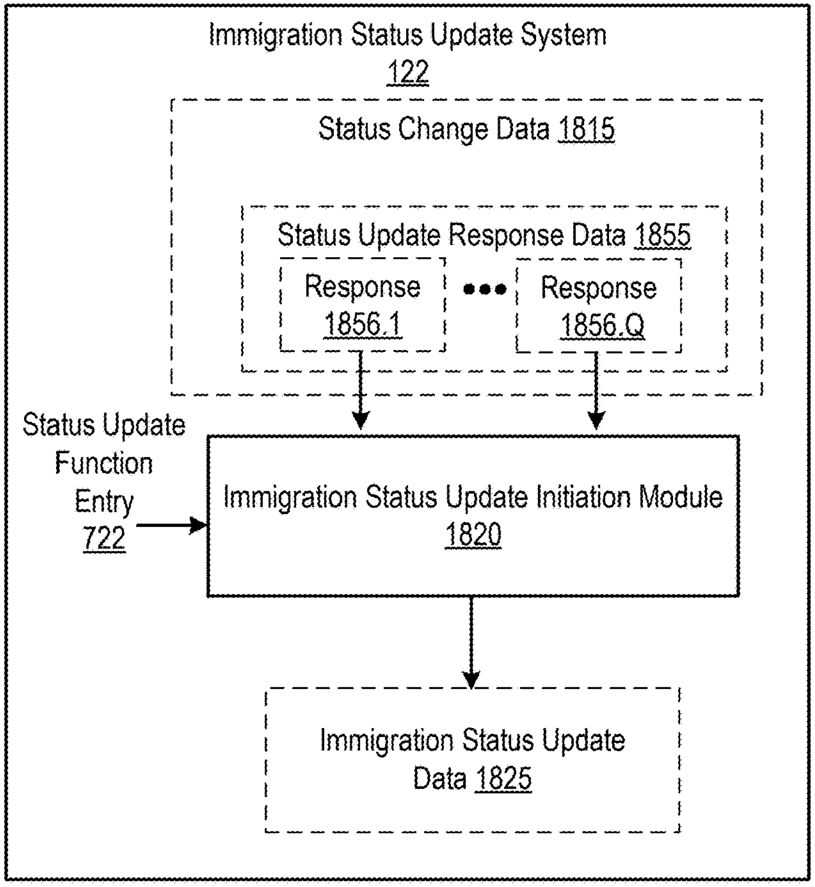
Figure 18D:
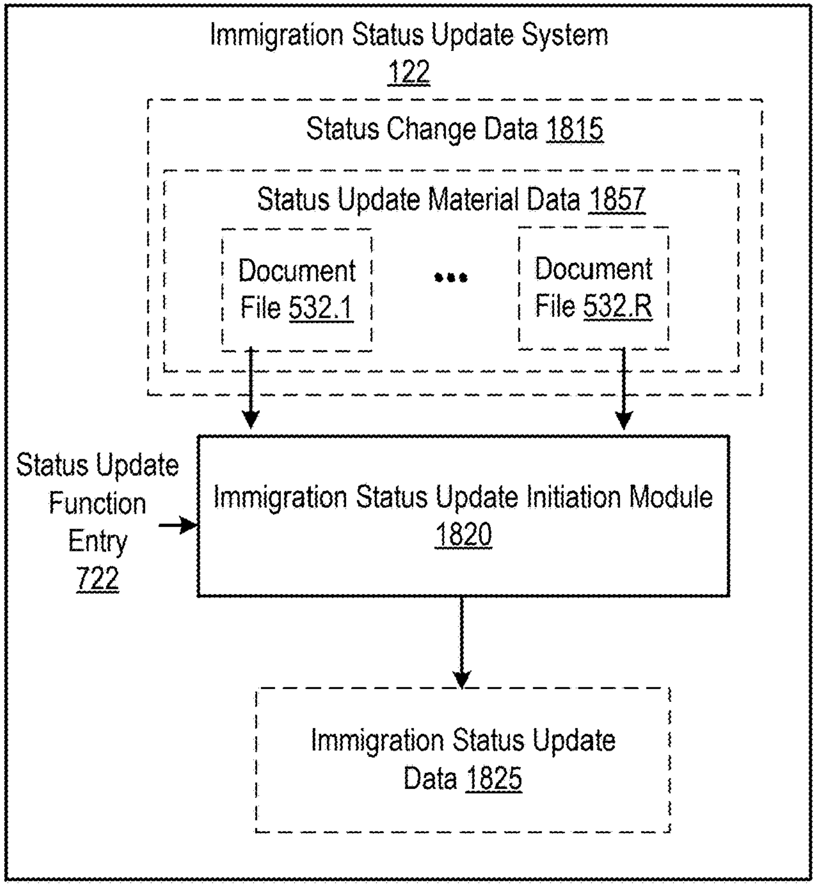
Figure 18E:
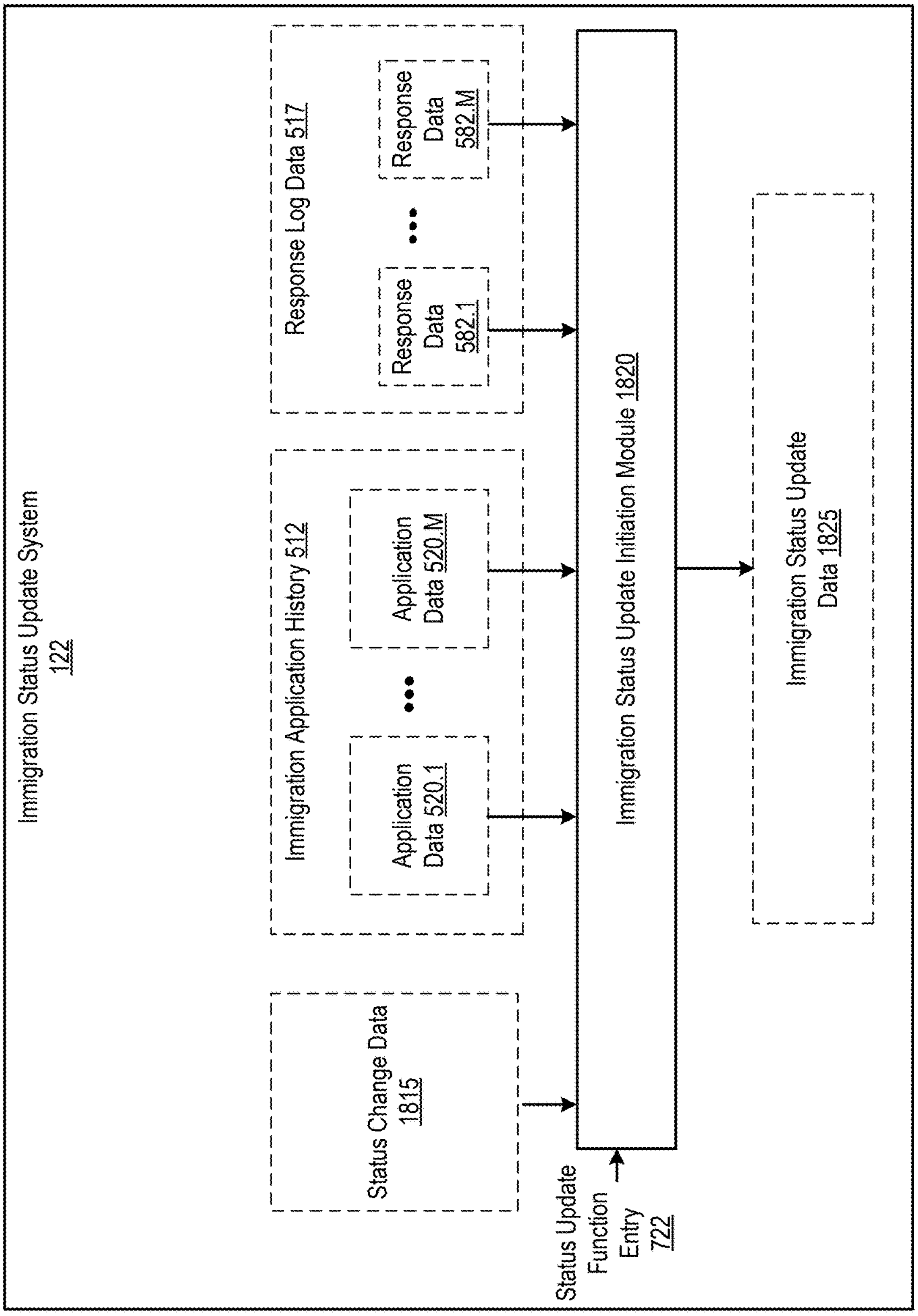
Figure 18F:
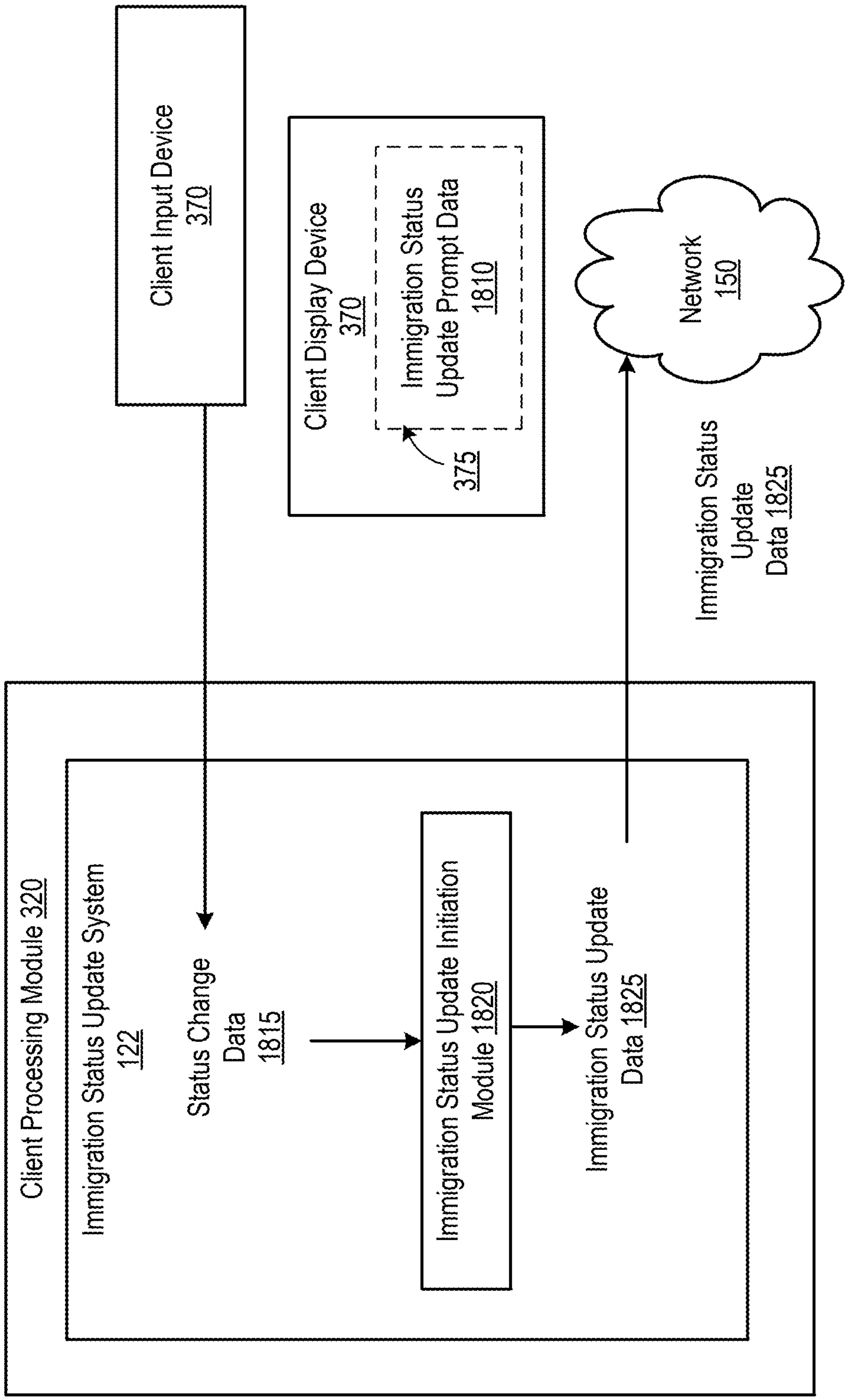
Figure 18G:
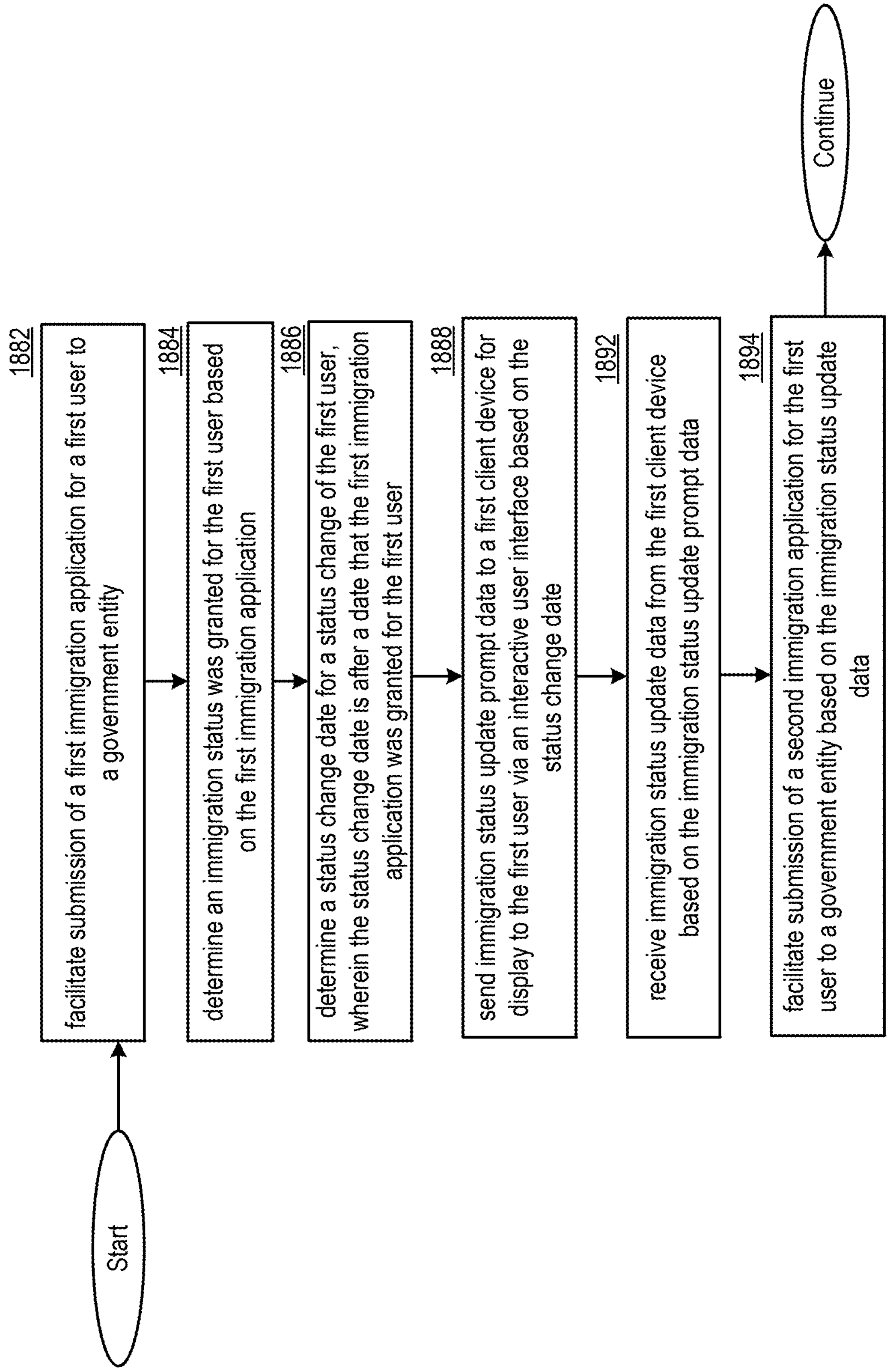
Figure 18H:
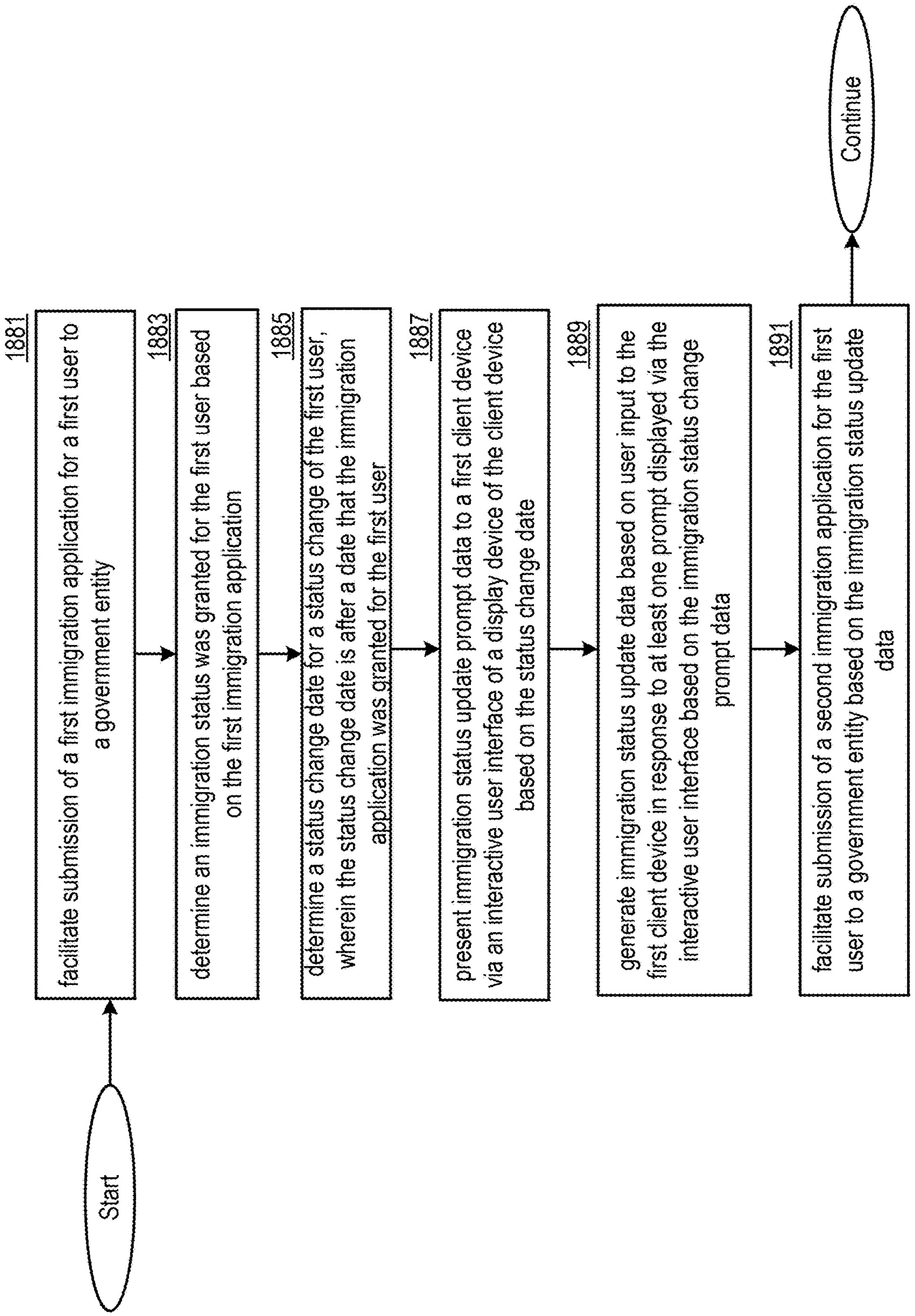
Figure 19A:
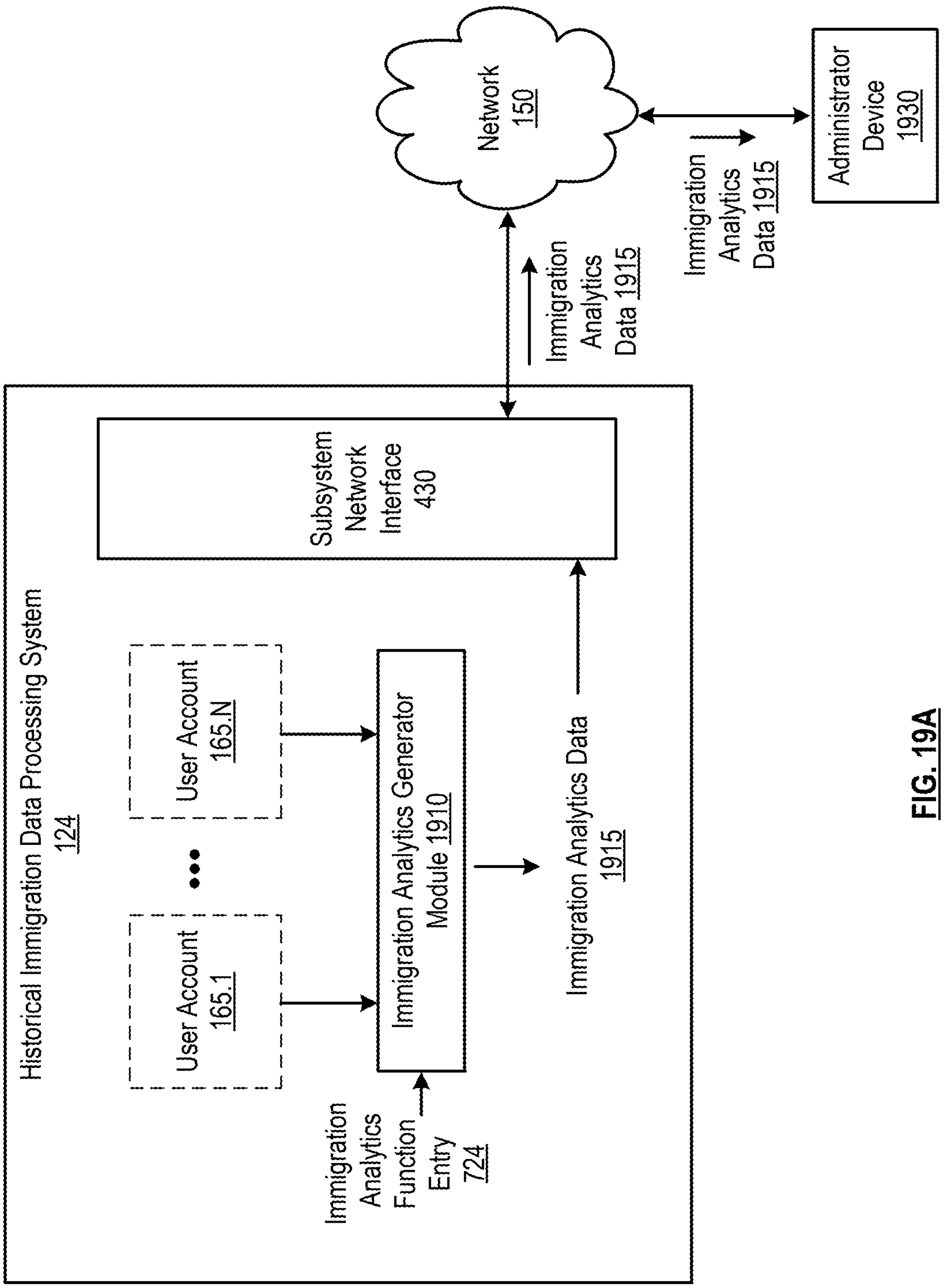
Figure 19B:
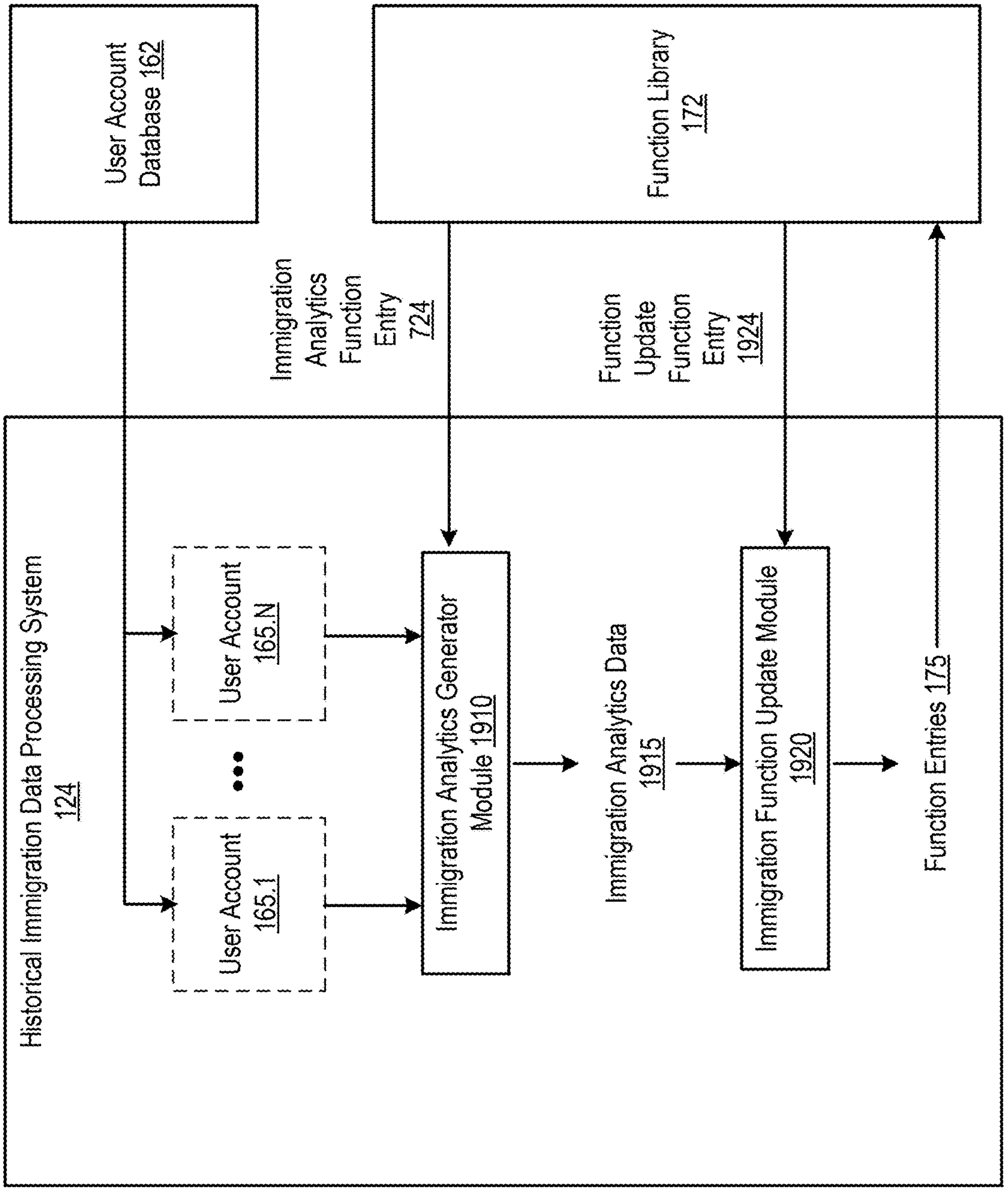
Figure 19C:
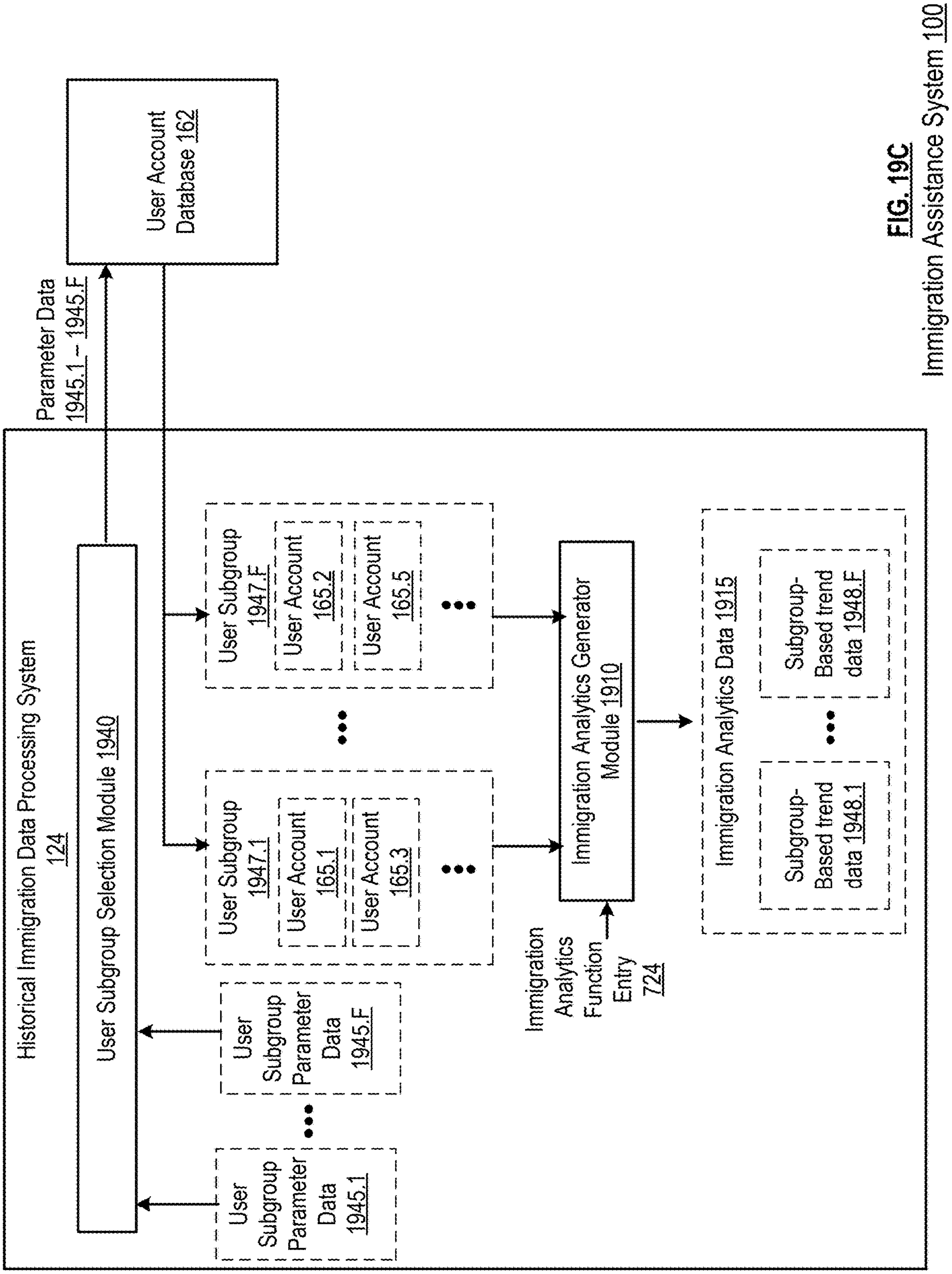
Figure 19D:
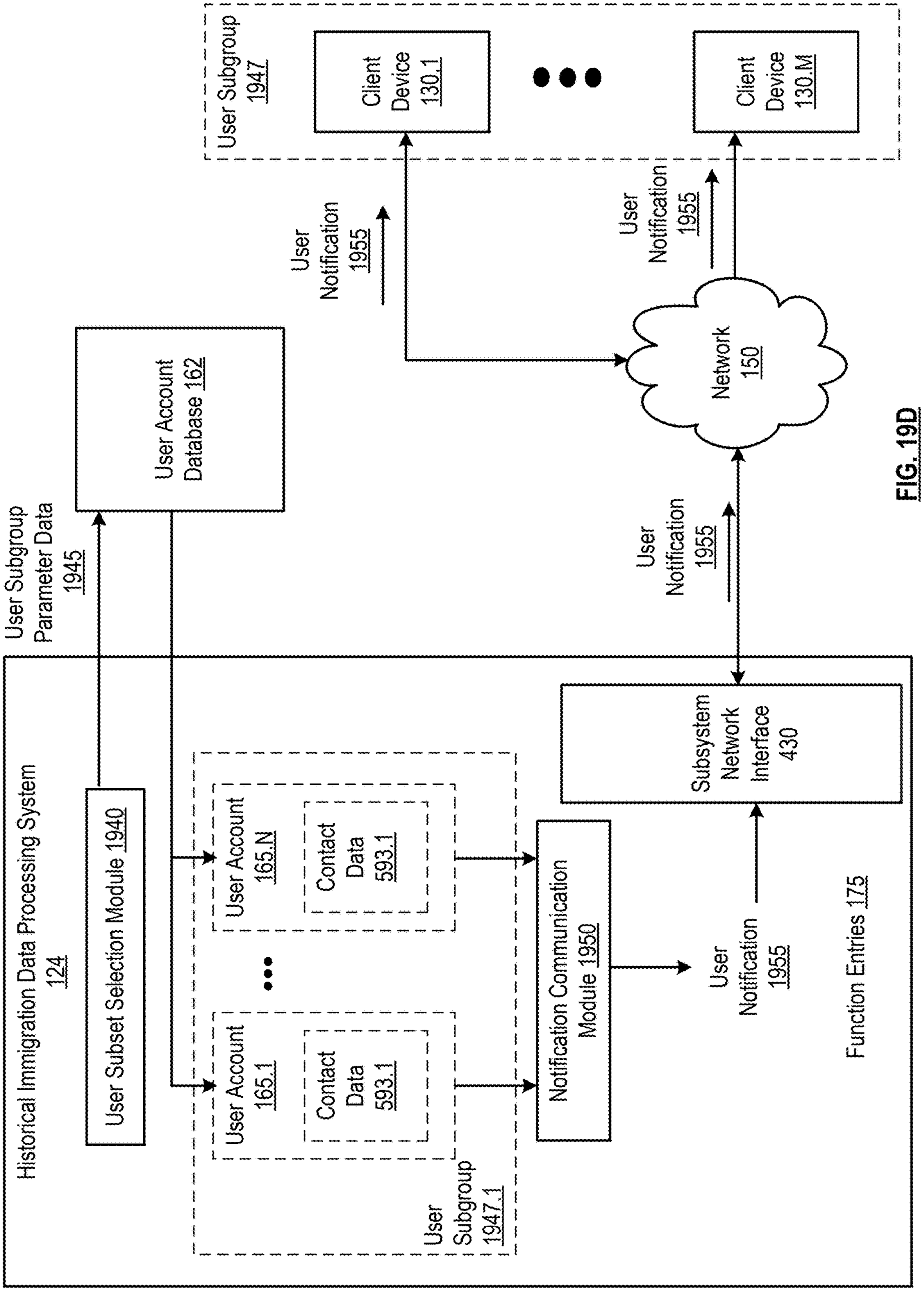
Figure 19E:
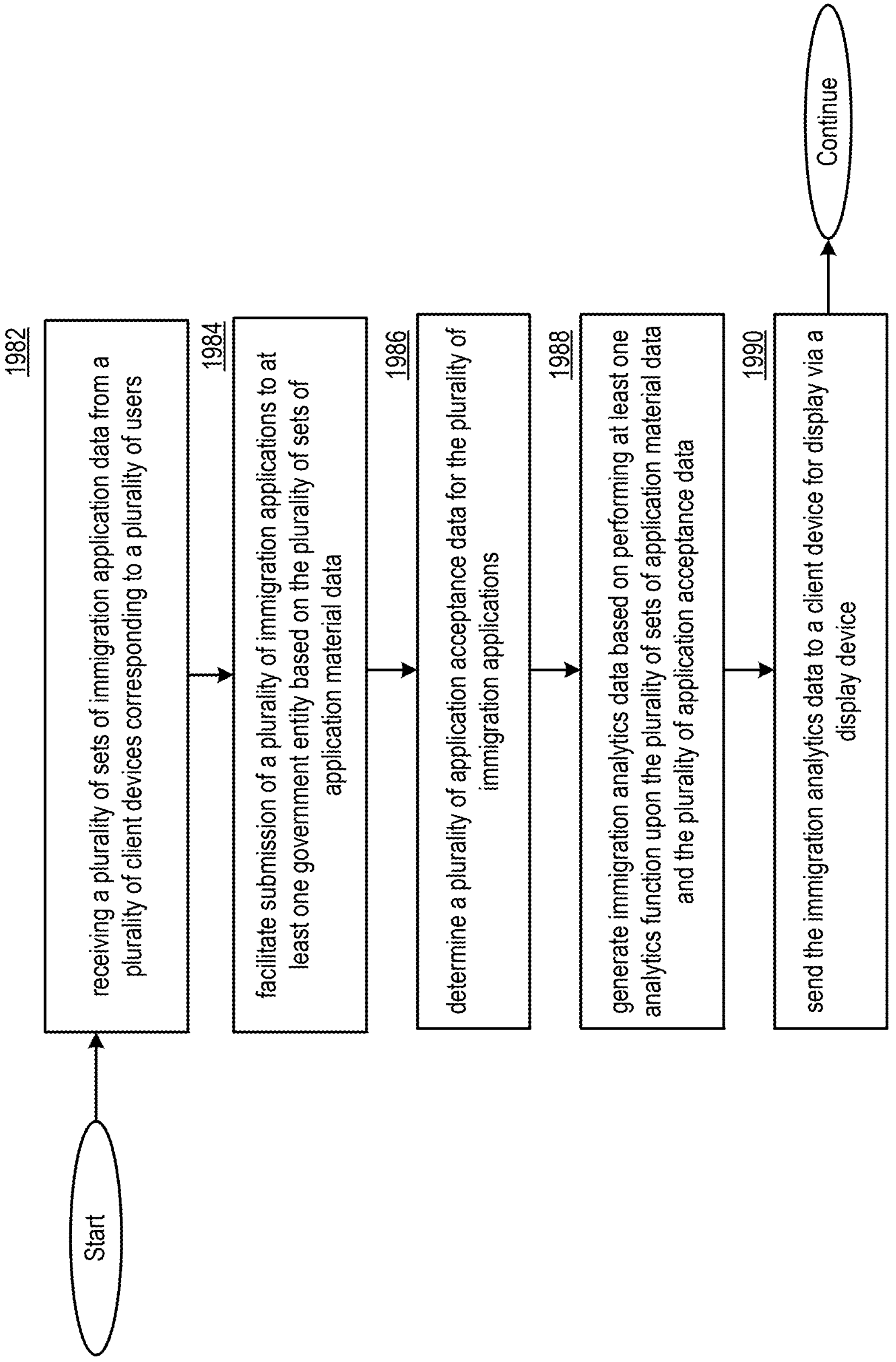

FIGS. 9L-9AP illustrate example layouts of prompts and/or information displayed via an interactive user interface in accordance with various embodiments;

FIGS. 10A-10C are schematic block diagrams of an immigration application materials guided completion system in accordance with various embodiments;

FIG. 10D is a schematic block diagram of an immigration assistance system in accordance with various embodiments;

FIGS. 10E-10F are schematic block diagrams of a client device in accordance with various embodiments;

FIGS. 10G-10O illustrate example layouts of prompts and/or information displayed via an interactive user interface in accordance with various embodiments;

FIGS. 11A-11E are schematic block diagrams of an immigration application materials submission system in accordance with various embodiments;

FIGS. 11F-11G are logic diagrams illustrating methods for execution in accordance with various embodiments;

FIGS. 11H-11K illustrate example layouts of prompts and/or information displayed via an interactive user interface in accordance with various embodiments;

FIGS. 12A-12C are schematic block diagrams of an immigration assistance system that implements an immigration information extraction system in accordance with various embodiments;

FIG. 12D is a schematic block diagram of an immigration information extraction system in accordance with various embodiments;

FIG. 12E is a schematic block diagram of a client device in accordance with various embodiments;

FIGS. 12F-12G are logic diagrams illustrating methods for execution in accordance with various embodiments;

FIGS. 13A-13C are schematic block diagrams of an immigration digital photograph processing system in accordance with various embodiments;

FIG. 13D is a schematic block diagram of an immigration assistance system in accordance with various embodiments;

FIG. 13E is a schematic block diagram of an immigration digital photograph processing system in accordance with various embodiments;

FIGS. 13F-13G are schematic block diagrams of a client device in accordance with various embodiments;

FIGS. 13H-13I are logic diagrams illustrating methods for execution in accordance with various embodiments;

FIG. 14A is a schematic block diagram of an immigration application letter generator system in accordance with various embodiments;

FIG. 14B is a schematic block diagram of an immigration assistance system in accordance with various embodiments;

FIG. 14C is a schematic block diagram of an immigration application letter generator system in accordance with various embodiments;

FIG. 14D is a schematic block diagram of a client device in accordance with various embodiments;

FIGS. 14E-14F are logic diagrams illustrating methods for execution in accordance with various embodiments;

FIGS. 14G-14AB illustrate example layouts of prompts and/or information displayed via an interactive user interface in accordance with various embodiments;

FIG. 15A-15D are schematic block diagrams of a client device in accordance with various embodiments;

FIG. 15E is a schematic block diagram of an immigration assistance system in accordance with various embodiments;

FIG. 15F is a schematic block diagram of an immigration document verification system in accordance with various embodiments;

FIG. 15G-15H are schematic block diagrams of a client device in accordance with various embodiments;

FIGS. 15I-15J are logic diagrams illustrating methods for execution in accordance with various embodiments;

FIGS. 16A-16L are schematic block diagrams of an immigration applicant service setup system in accordance with various embodiments;

FIG. 16M is a schematic block diagram of an immigration assistance system in accordance with various embodiments;

FIG. 16N is a schematic block diagram of a client device in accordance with various embodiments;

FIGS. 16O-16P are logic diagrams illustrating methods for execution in accordance with various embodiments;

FIGS. 16Q-16S illustrate example layouts of prompts and/or information displayed via an interactive user interface in accordance with various embodiments;

FIGS. 17A-17L are schematic block diagrams of an immigration assistance communication system in accordance with various embodiments;

FIG. 17M is a schematic block diagram of a client device in accordance with various embodiments;

FIGS. 17N-17O are logic diagrams illustrating methods for execution in accordance with various embodiments;

FIG. 18A is a schematic block diagram of an immigration status update system in accordance with various embodiments;

FIG. 18B is a schematic block diagram of an immigration assistance system in accordance with various embodiments;

FIGS. 18C-18E are schematic block diagrams of an immigration status update system in accordance with various embodiments;

FIG. 18F is a schematic block diagram of a client device in accordance with various embodiments;

FIGS. 18G-18H are logic diagrams illustrating methods for execution in accordance with various embodiments;

FIG. 19A is a schematic block diagram of a historical immigration data processing system in accordance with various embodiments;

FIGS. 19B-19C are schematic block diagram of an immigration assistance system in accordance with various embodiments;

FIG. 19D is a schematic block diagram of a historical immigration data processing system in accordance with various embodiments;

FIG. 19E is a logic diagram illustrating a method for execution in accordance with various embodiments;

FIGS. 20A-20G are logic diagrams illustrating methods for execution in accordance with various embodiments.

DETAILED DESCRIPTION OF THE INVENTION

Figure 1A:
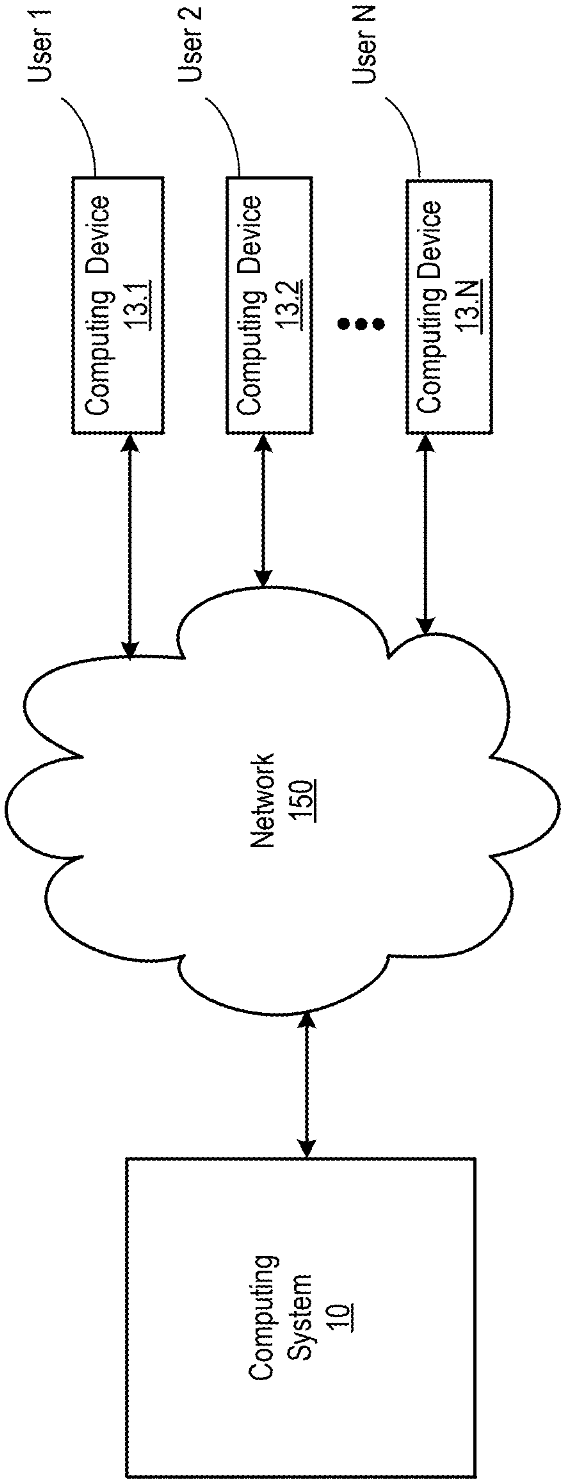
FIG. 1A is a schematic block diagram illustrating communication between a computing system and one or more computing devices in accordance with various embodiments.

FIG. 1A is a schematic block diagram of an embodiment of a computing system 10 that communicates bidirectionally with one or more computing devices 13 via a network 150.

The network 150 can be implemented via: one or more wireless and/or wired communication systems; one or more non-public intranet systems and/or public internet systems; one or more satellite communication systems; one or more cellular communication systems; one or more fiber optic communication systems; one or more local area networks (LAN); one or more wide area networks (WAN); the Internet; and/or one or more other communication networks.

Figure 1B:
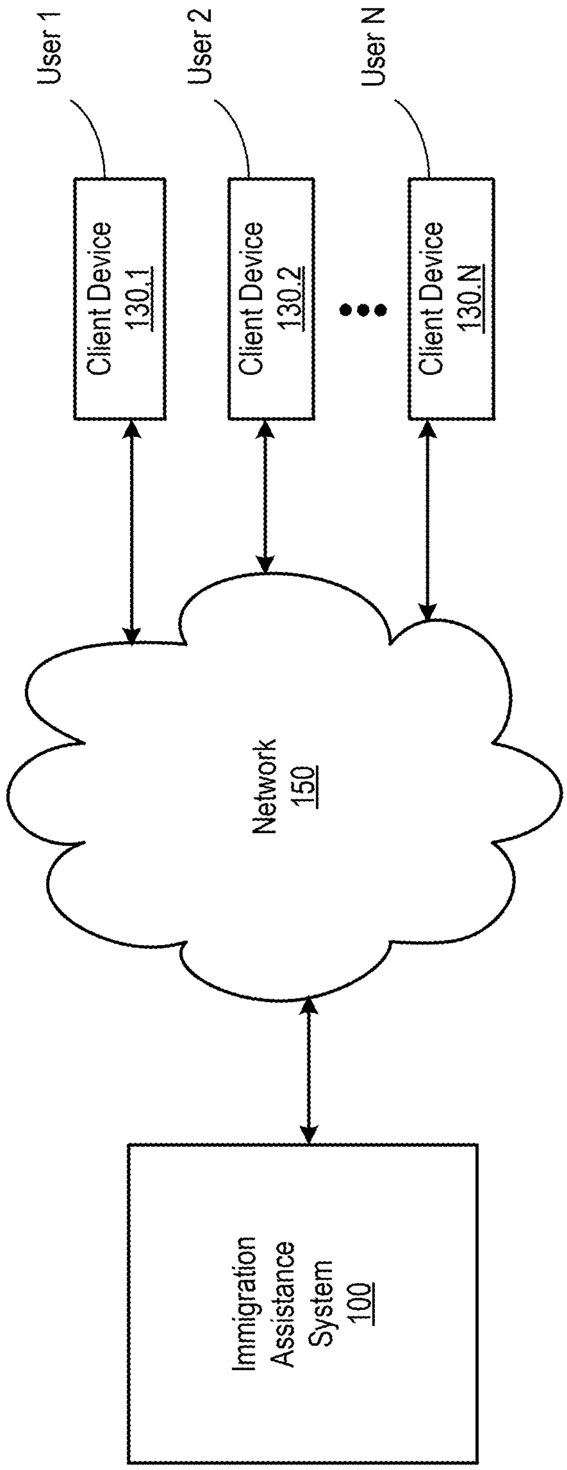
FIG. 1B is a schematic block diagram illustrating communication between an immigration assistance system and one or more client devices in accordance with various embodiments.

FIG. 1B is a schematic block diagram of an embodiment of an immigration assistance system 100 that communicates bidirectionally with one or more client devices 130 via a network 150.

As discussed in further detail herein, the immigration assistance system 100 can be operable to facilitate various immigration assistance, including: assessing eligibility for immigration to a country by applicants corresponding to users of client devices 130; preparation and completion of immigration applications for immigration to the country by applicants corresponding to users of client devices 130; submission of immigration applications to a government entity corresponding to the country by applicants corresponding to users of client devices 130; preparation for entry into the country by applicants corresponding to users of client devices 130 via setup of various services; continued legal and/or cultural assistance while the applicants corresponding to users of client devices 130 are living in the country to which they immigrated; preparation and completion of new and/or updated immigration applications for by applicants corresponding to users of client devices 130 based on status changes after immigrating to the country; and/or other forms of assistance relating to immigration. The immigration assistance system 100 can further aggregate information received from client devices 130 and/or corresponding immigration statuses for a plurality of applicants to generate immigration analytics.

The immigration assistance system 100 can provide immigration assistance to a plurality of users 1-N of the immigration assistance system 100 via communication with some or all of a plurality of corresponding client devices 130.1-130.N. In the examples discussed herein, each user can further correspond to a user of the immigration assistance system 100, and can correspond to a user of the corresponding client device 130. For example, each user 1-N correspond to an applicant.

As used herein, a user of the immigration assistance system 100 can correspond to any person that is applying for a immigration status in another country, has previously applied for immigration status in another country, that is receiving immigration assistance regarding their own immigration via the immigration assistance system 100, has a corresponding user account with the immigration assistance system 100, and/or interacts with a client device 130 to receive information from and/or provide information to the immigration assistance system 100.

As used herein, immigration status applied for by and/or granted to a user can correspond to: one or more types of visas, a study permit, a work permit, a visitor visa, permanent residency, citizenship, and/or any other types of other permanent or temporary visas, permits, and/or status granted by a government entity of any country allowing a person to travel to, live in, work in, and/or study in the corresponding country for a temporary, fixed length of time or a permanent, indefinite length of time. Immigration assistance provided by the immigration assistance system 100 to a given user can correspond to assistance in applying for, assistance after submission of an application for, and/or assistance after granting of one or more various types of immigration status for the given user in one or more countries. As used herein, a user that is immigrating to a country, or applying to immigrate to a country, corresponds to a user that performs, previously performed, or has or previously had another person perform on their behalf, one or more steps necessary in applying for and/or being granted the immigration status necessary for them to travel to, study in, live in, and/or work in the particular country. Some or all of these steps necessary in a given user applying for and/or being granted immigration status can optionally be performed via the immigration assistance system 100 on behalf of the given user, as described in further detail herein.

In some embodiments, while not illustrated in FIG. 1, a given client device 130 is utilized to facilitate immigration assistance for multiple users of the immigration assistance system 100, for example, based on each user being an applicant. For example, an owner or other user of the given client device 130 interacts with the given client device 130 to facilitate immigration assistance for: themself; for one or more friends and/or family members; and/or for one or more clients and/or customers, for example, if the user of the given client device is a legal professional and/or an immigration professional.

Thus, some users of the immigration assistance system 100 may be current or previous immigration applicants that do interact with a client device 130 directly to communicate with the immigration assistance system 100 themselves, where a different person interacts with client device 130 on their behalf to enable the immigration assistance system 100 to facilitate their immigration assistance. Alternatively or in addition, other users of the immigration assistance system 100 may not be current or previous immigration applicants themselves, but use the immigration assistance system 100 via interaction with their client device 130 to facilitate immigration assistance for one or more other people that are current or previous immigration applicants.

In some embodiments, while not illustrated in FIG. 1, a given user of the immigration assistance system 100 can receive immigration assistance via interaction with multiple different client devices 130. For example, the given user can login to a corresponding user account on any client device 130 to receive immigration assistance. For example, the given user can receive a first subset of immigration assistance via first communication with the immigration assistance system 100 via interaction with a first client device 130, and the given user can receive a second subset of immigration assistance via first communication with the immigration assistance system 100 via interaction with a second client device 130 that is different from the first client device.

The computing system 10 of FIG. 1A and/or any embodiment of a computing system described herein can be implemented via implementing some or all features and/or functionality of immigration assistance system 100 of FIG. 1B and/or any embodiment of immigration assistance system 100 described herein. For example, the computing system 10 can be operable to provide some or all types of immigration assistance via performing some or all functionality of immigration assistance system 100. As another example, the computing system 10 can be operable to perform other functionality optionally not related to immigration based on adapting technical functionality of immigration assistance system 100 described herein for other purposes that involve generating, transmitting, receiving, and/or storing data via communication with one or more client devices 130 and/or other computing devices 13.

Each computing device 13 of computing devices 13.1-13.N of FIG. 1A and/or any embodiment of a computing device described herein can implement some or all features and/or functionality of client device 130 of FIG. 1B and/or any embodiment of client device 130 described herein, for example, regardless of whether a corresponding user is seeking immigration assistance.

FIGS. 1C-1F illustrate example embodiments of communication between computing system 10 and a given computing device 13. Some or all features and/or functionality of communications between computing system 10 and computing device 13 of FIGS. 1C and/or 1D can implement any embodiment of communications between computing system 10 and computing device 13 described herein and/or can implement any embodiment of communications between immigration assistance system 100 and client device 130 described herein.

Figure 1C:
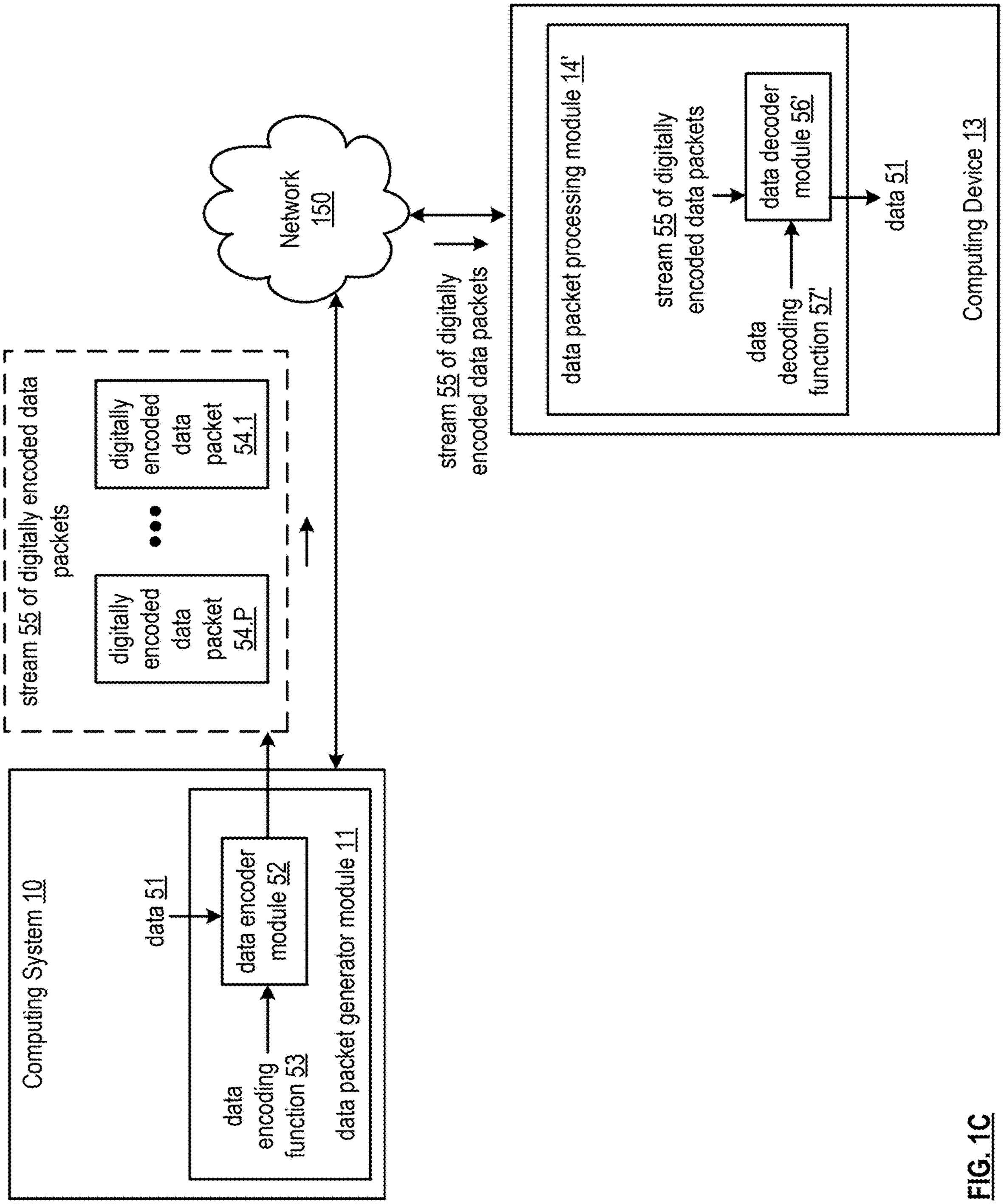
FIGS. 1C-1F are schematic block diagrams illustrating communication between a computing system and a computing device in accordance with various embodiments.

As illustrated in FIG. 1C, computing system 10 can transmit given data 51 to a computing device 13 as a stream 55 of digitally encoded data packets 54.1-54.P (which can include a single digitally encoded data packet 54 or multiple digitally encoded data packets 54) based on utilizing a data packet generator module 11 implementing a data encoder module 52 to generate this stream 55 of digitally encoded data packets 54.1-54.P based on applying a data encoding function 53 to the data 51, and further based on transmitting this stream 55 of digitally encoded data packets 54.1-54.P as an outgoing stream of digitally encoded data packets transmitted to the computing device 13 via network 150. For example, the data packet generator module 11 and/or data encoder module 52 are implemented via one or more processors and/or other computing resources of the computing system 10.

The computing device 13 can extract the given data 51 from this stream 55 of digitally encoded data packets based on, for example, in response to receiving the stream 55 of digitally encoded data packets as an incoming stream of data packets received from computing system 10, utilizing a data packet processing module 14' implementing a data decoder module 56' to generate the given data 51 based on applying a data decoding function 57' (e.g. corresponding to the data encoding function 53) to the stream 55 of digitally encoded data packets. For example, the data packet processing module 14' and/or data decoder module 56' are implemented via one or more processors and/or other computing resources of the computing device 13. The computing device 13 can further process, store, and/or display the given data 51 extracted from stream 55 of digitally encoded data packets.

The given data 51 can be generated, received, and/or accessed by the computing system 10. The given data 51 and/or respective stream 55 of digitally encoded data packets can optionally be generated and/or transmitted by computing system 10 in response to processing an incoming stream of other digitally encoded data packets received from the respective computing device 13. Any data generated by and/or transmitted by computing system 10 and/or immigration assistance system 100 as described herein can be transmitted in a corresponding stream 55 of digitally encoded data packets 54.1-54.P for extraction and/or further processing, storage, and/or display by computing device 13. Any data received by, processed by, stored by, and/or displayed by the computing device 13 and/or client device 130 as described herein can be received in and/or extracted from a corresponding stream 55 of digitally encoded data packets 54.1-54.P.

Figure 1D:
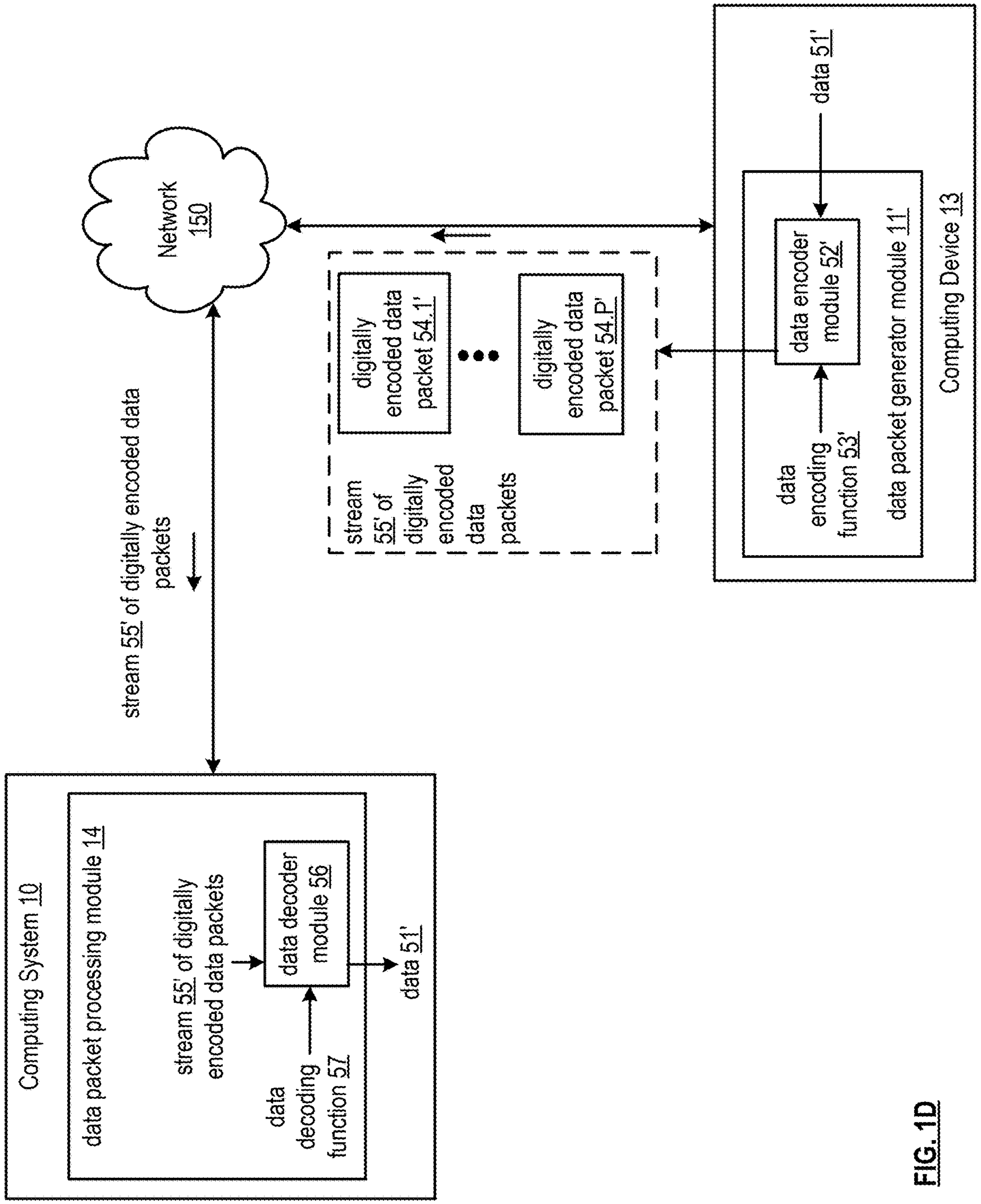

As illustrated in FIG. 1D, a computing device 13 can transmit given data 51' to computing system 10 as a stream 55' of digitally encoded data packets 54.1'-54.P' (which can include a single digitally encoded data packet 54 or multiple digitally encoded data packets 54') based on utilizing a data packet generator module 11' implementing a data encoder module 52' to generate this stream 55 of digitally encoded data packets 54.1'-54.P' based on applying a data encoding function 53' to the data 51', and further based on transmitting this stream 55' of digitally encoded data packets 54.1'-54.P' as an outgoing stream of digitally encoded data packets transmitted to the computing system 10 via network 150. For example, the data packet generator module 11' and/or data encoder module 52' are implemented via one or more processors and/or other computing resources of the computing device 13.

The computing system 10 can extract the given data 51' from this stream 55' of digitally encoded data packets based on, for example, in response to receiving the stream 55' of digitally encoded data packets as an incoming stream of data packets received from computing system 10, utilizing a data packet processing module 14 implementing a data decoder module 56' to generate the given data 51 based on applying a data decoding function 57 (e.g. corresponding to the data encoding function 53') to the stream 55' of digitally encoded data packets. For example, the data packet processing module 14 and/or data decoder module 56 are implemented via one or more processors and/or other computing resources of the computing system 10. The computing system 10 can further process and/or store the given data 51 extracted from stream 55 of digitally encoded data packets.

The given data 51' can be generated, received, and/or accessed by the computing device 13. The given data 51' and/or respective stream 55' of digitally encoded data packets can optionally be generated and/or transmitted by computing device 13 in response to processing an incoming stream of other digitally encoded data packets received from the computing system 10. Any data generated by and/or transmitted by computing device 13 and/or client device 130 as described herein can be transmitted in a corresponding stream 55' of digitally encoded data packets 54.1'-54.P' for extraction and/or further processing and/or storage by computing device 13. Any data received by, processed by, and/or stored by the computing system 10 and/or immigration assistance system 100 as described herein can be received in and/or extracted from a corresponding stream 55' of digitally encoded data packets 54.1'-54.P'.

The given data 51' encoded and transmitted by computing device 13 can be implemented in a same, similar, or different fashion from given data 51 encoded and transmitted by computing system 10. The stream 55' generated and transmitted by computing device 13 can be implemented in a same, similar, or different fashion as stream 55 generated and transmitted by computing system 10. The digitally encoded data packets 54' generated and transmitted by computing device 13 can be implemented in a same, similar, or different fashion as digitally encoded data packets 54 generated and transmitted by computing system 10. The data packet processing module 14, data decoder module 56, and/or data decoding function 57 implemented by computing system 10 can be implemented in a same, similar, or different fashion as processing module 14', data decoder module 56', and/or data decoding function 57' implemented by computing device 13. The data packet generator module 11', data encoder module 52', and/or data encoding function 53' implemented by computing device 13 can be implemented in a same, similar, or different fashion as data packet generator module 11, data encoder module 52, and/or data encoding function 53 implemented by computing system 10.

Further data can be exchanged between computing system 10 and a given client device 13, where multiple different streams of data packets 55 are sent from computing system 10 to the given computing device 13 over time to include different data 51 (e.g. where some or all of these streams 55 are generated to send corresponding data 51 in response to receipt and/or processing of data 51' received from the given computing device over time), and/or where multiple different streams of data packets 55' are sent from computing device 13 to the given computing system 10 over time to include different data 51' (e.g. where some or all of these streams 55' are generated to send corresponding data 51' in response to receipt and/or processing of data 51 received from the computing system over time).

The given data 51 and/or 51' can include, can be extracted from, and/or be generated based on processing of any data described herein, such as: user account data; application data, prompt data and/or response data, machine executable instructions for execution; digital display data and/or digital image data for processing, display or storage; responses to prompts displayed via display device; digitally encoded document files such as image files, textual data, and/or completed forms; function definitions for function entries and/or for various functions/models that are trained, generated, stored and/or executed; risk assessment data; and/or other data described herein.

The stream 55 and/or 55' of digitally encoded data packets 54.1-54.1 and/or 54.1'-54.P can be generated as Internet Packet (IP) packets, for example, that each include their own header, trailer, and/or corresponding payload that includes a portion of the underlying data 51 and/or 51', respectively. The stream 55 and/or 55' of digitally encoded data packets 54.1-54.1 and/or 54.1'-54.P can be generated in accordance with a protocol such as Internet Control Message Protocol (ICMP), Transmission Control Protocol (TCP), User Datagram Protocol (UDP), Internet Group Management Protocol (IGMP), Raw Network Packets (RAW) and/or other protocol.

In some embodiments, the data 51 and/or 51' included in the stream 55 and/or 55' of digitally encoded data packets 54.1-54.1 and/or 54.1'-54.P can be generated in accordance with a communication protocol. As a particular example, the digitally encoded data packets 54.1-54.1 and/or 54.1'-54.P of stream 55 and/or 55', respectively, are generated in accordance with the Hyper Text Transfer Protocol, where data 51 optionally includes HTML data and/or where data 51' optionally includes data generated via computing device based on interaction with a corresponding webpage displayed via a display device (e.g. where such interaction is generated based on processing measurements generated by sensor devices of the computing device and/or generated by input devices of the computing device, such as at least one keyboard, mouse, touchscreen, and/or other sensing hardware), for example, based on the computing device extracting the HTML data from the stream of digitally encoded data packets and displaying corresponding digital display data accordingly via processing the HTML data. Processing of such data 51' by computing system 10 based on receiving data 51' from computing device 13 can render generation and/or transmission of further/updated HTML data to the computing device 13 for display by the computing device, which can optionally induce further interaction and thus further data 51' generated and transmitted by computing device 13' which can induce generation and/or transmission of further subsequent HTML data by computing device.

In some embodiments, multiple streams 55 are generated and/or transmitted simultaneously by the computing system 10 in conjunction with communicating with multiple different computing devices simultaneously, and/or multiple streams 55' are received and/or processed simultaneously by the computing system 10 in conjunction with communicating with multiple different computing devices contemporaneously and/or during overlapping time spans (e.g. based on multiple users interacting with a corresponding platform hosted by a corresponding server system at the same time), for example, based on executing a corresponding plurality of parallelized processes. Different streams that are transmitted simultaneously can include same or different data 51 (e.g. different data is generated for different users and/or is otherwise transmitted to different devices 13). At a given time, the computing system 10 can be contemporaneously: accessing and/or generating one or more data 51; generating and/or transmitting one or more streams 55 of digitally encoded data packets from this one or more data 51; receiving and/or processing one or more other streams 55' of digitally encoded data packets that include one or more other data 51'; and/or processing and/or storing the one or more other data 51'.

Figure 1E:
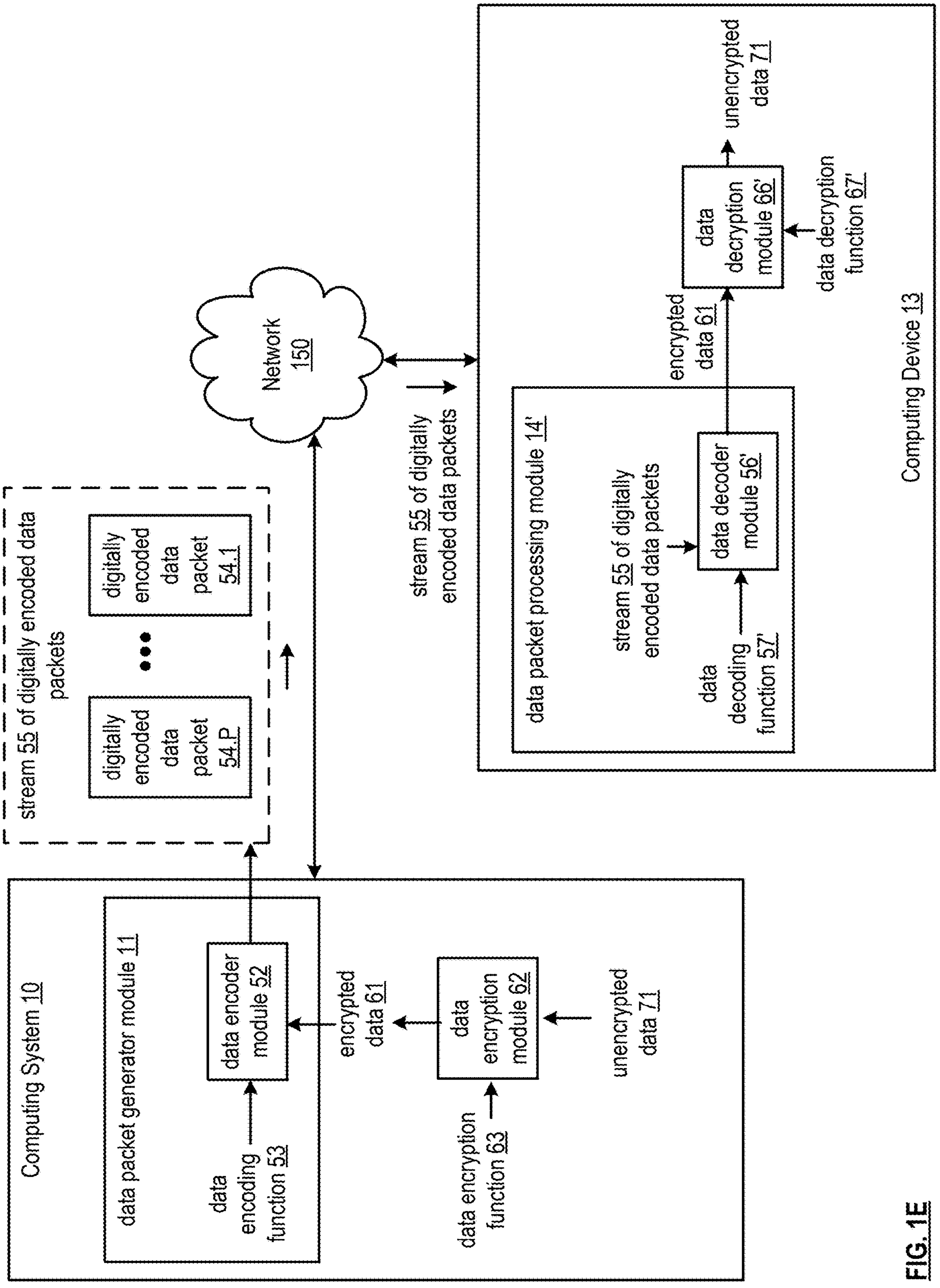
Figure 1F:
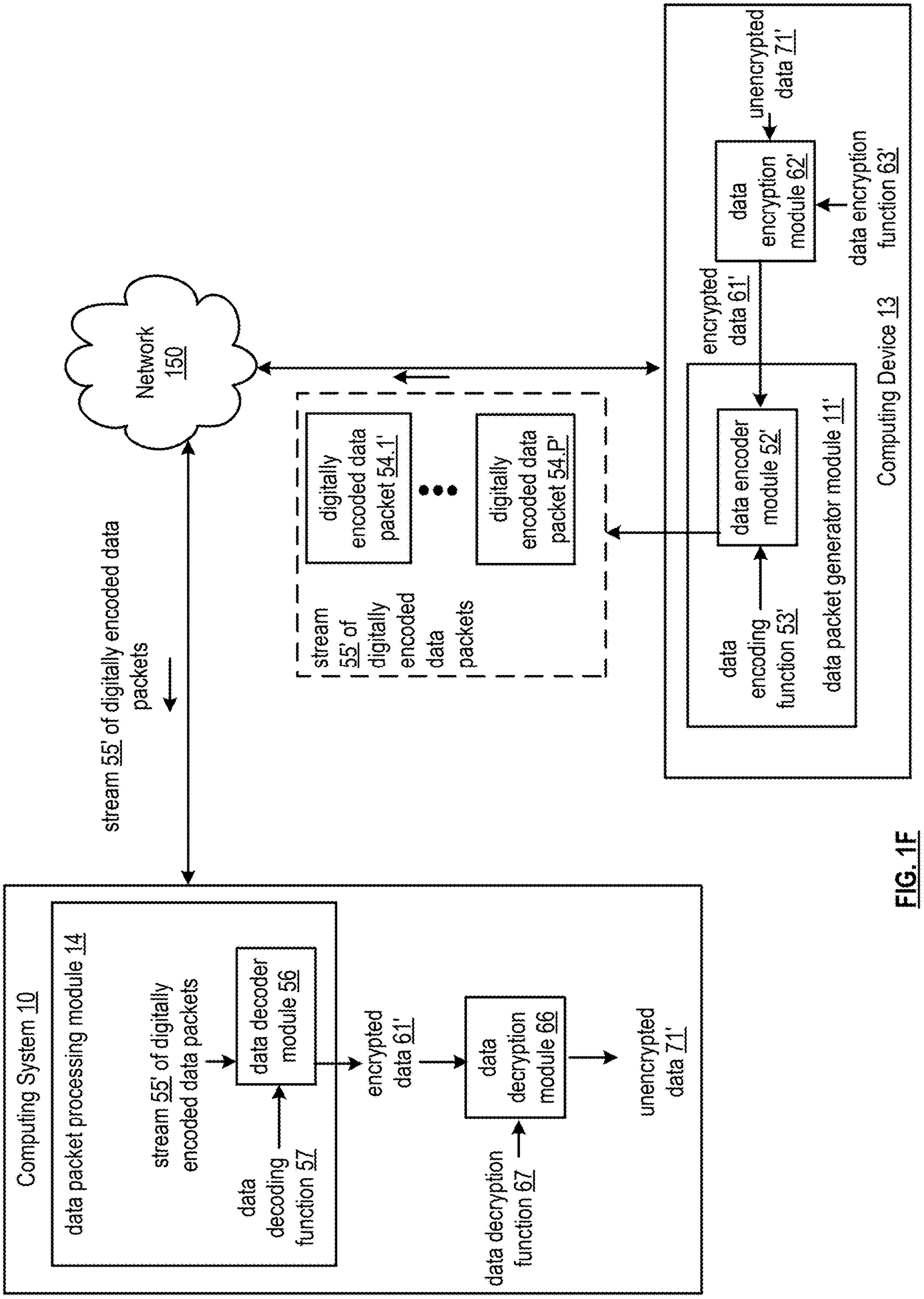

FIGS. 1E-1F illustrate embodiments where some or all data 51 and/or data 51' communicated between computing system 10 and computing device 13 is optionally implemented as encrypted data generated from corresponding unencrypted (e.g. plaintext) data. As a particular example, sensitive information such as social security number or other national identification number, birthdate, and/or sensitive documents such as birth certificate or national registration documents such as social security card, etc., and/or other sensitive information is encrypted for transmission and/or storage. In some embodiments, some or all data 51 and/or 51' communicated between computing system and computing device is not encrypted and is transmitted as unencrypted data (e.g. based on not corresponding to sensitive data for the user). In some embodiments, some data exchanged between computing system 10 and computing device 13 is encrypted and other data exchanged between computing system 10 and computing device is not encrypted.

As illustrated in FIG. 1E, computing system 10 can generate encrypted data 61 from unencrypted data 71 based on utilizing a data encryption module 62 to generate encrypted data 61 based on applying a data encryption function 63 to the unencrypted data 71. This encrypted data 61 can then be encoded and transmitted in a stream 55 of digitally encoded data packets 54.1-54.P, for example, where encrypted data 61 is implemented as data 51. The computing device 13 can extract the unencrypted data 71 from the encrypted data 61 extracted from the stream 55 of digitally encoded data packets 54.1-54.P based on implementing a data decryption module 66' to generate unencrypted data 71 based on applying data decryption function 67' (e.g. corresponding to data encryption function 63) to encrypted data 61.

The given unencrypted data 71 can be generated, received, and/or accessed by the computing system 10. In an example embodiment, some or all of the given unencrypted data 71 can optionally be generated via decrypting other data (e.g. based on being extracted from previously encrypted data stored, for example, as user account data for a corresponding user, where this previously encrypted data is encrypted via a same or different encryption scheme as utilized in data encryption function 63 to generate encrypted data 61 from the unencrypted data 71 generated via decrypting this previously encrypted data). In another example embodiment, some or all of the encrypted data 61 is accessed directly based on already being encrypted via prior performance of the encryption function on corresponding unencrypted data (e.g. based on being previously encrypted and stored as encrypted data, for example, as user account data for a corresponding user, where this encrypted data is accessed and remains encrypted for transmission) The given encrypted data 61 and/or respective stream 55 of digitally encoded data packets can optionally be generated and/or transmitted by computing system 10 in response to processing an incoming stream of other digitally encoded data packets received from the respective computing device 13. Any data generated by and/or transmitted by computing system 10 and/or immigration assistance system 100 as described herein can be encrypted for transmission as encrypted data 61. Any data received by, processed by, stored by, and/or displayed by the computing device 13 and/or client device 130 as described herein can be received in and/or extracted from corresponding encrypted data 61.

As illustrated in FIG. 1F, computing device 13 can generate encrypted data 61' from unencrypted data 71' based on utilizing a data encryption module 62' to generate encrypted data 61' based on applying a data encryption function 63' to the unencrypted data 71'. This encrypted data 61' can then be encoded and transmitted in a stream 55' of digitally encoded data packets 54.1'-54.P', for example, where encrypted data 61' is implemented as data 51'. The computing system 10 can extract the unencrypted data 71' from the encrypted data 61' extracted from the stream 55' of digitally encoded data packets 54.1'-54.P' based on implementing a data decryption module 66 to generate unencrypted data 71' based on applying data decryption function 67 (e.g. corresponding to data encryption function 63') to encrypted data 61'.

The given unencrypted data 71' can be generated, received, and/or accessed by the computing device 13. The given encrypted data 61' and/or respective stream 55' of digitally encoded data packets can optionally be generated and/or transmitted by computing device 13 in response to processing an incoming stream of other digitally encoded data packets received from the computing system 10. Any data generated by and/or transmitted by computing device 13 and/or client device 130 as described herein can be encrypted for transmission as encrypted data 61. Any data received by, processed by, and/or stored by the computing system 100 and/or immigration assistance system 100 as described herein can be received in and/or extracted from corresponding encrypted data 61'. In an example embodiment, some or all of the unencrypted data 71' extracted from encrypted data 61' received by the computing system 10 is re-encrypted for storage, for example, as user account data for a corresponding user, where this re-encrypted data is encrypted via a same or different encryption scheme as utilized in data encryption function 63' to generate encrypted data 61' from the unencrypted data 71'. In another example embodiment, some or all of the unencrypted data 71' extracted from encrypted data 61' received by the computing system 10 is stored in its decrypted form as unencrypted data 71', for example, as user account data for a corresponding user. In another example embodiment, data 51' received from computing device 13 is unencrypted data 71', and some or all of the unencrypted data 71' extracted from stream 55' received by the computing system 10 is encrypted for storage, for example, as user account data for a corresponding user, where this encrypted data is encrypted via a same or different encryption scheme as utilized in data encryption function 63' to generate encrypted data 61' from the unencrypted data 71'.

FIGS. 1G-1M illustrate embodiments of a computing system 10 implementing a storage system 85 to store data 51 for access and/or modification over time.

Figure 1G:
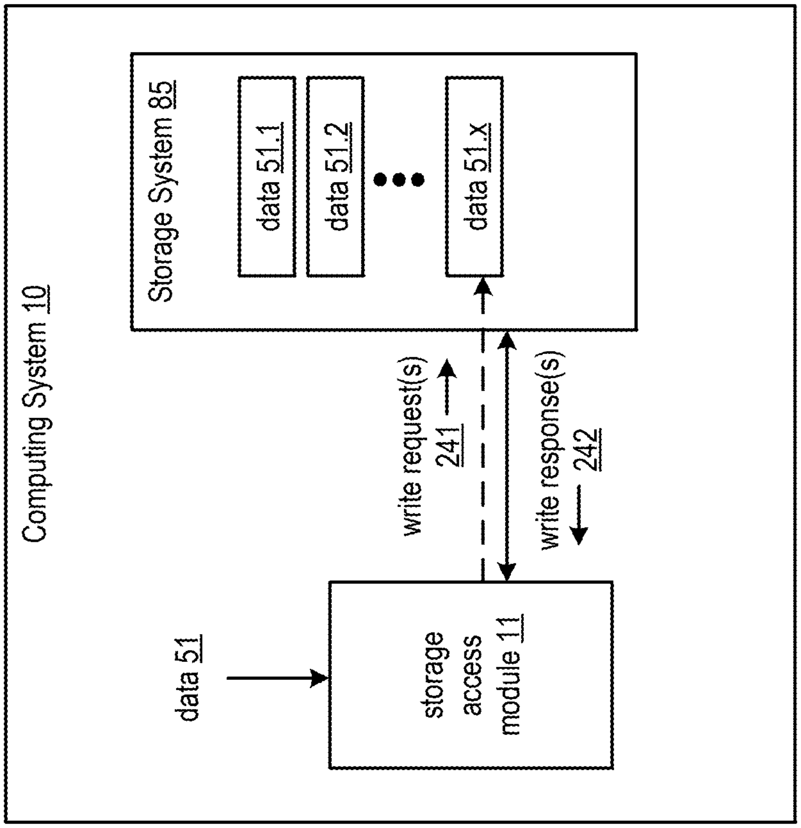
FIG. 1G-1M are schematic block diagrams of a computing system implementing a storage system in accordance with various embodiments.

As illustrated in FIG. 1G, a storage access module 11 can be implemented to store given data 51.*x* via storage system 85 (e.g. in one or more corresponding memory devices and/or storage devices implementing storage system 85). For example, data 51.*x* is stored based on having been received from a computing device 13 and/or having been extracted from encoded/encrypted data received from a computing device 13. As another example, data 51.*x* is stored based on having been generated by computing system 10 (e.g. as output of processing one or more other given data 51 and/or 51', for example, in response to processing instructions/a request/other data received from a respective computing device 13).

Such storage of given data 51.*x* can include generating and/or sending one or more write requests 241 to the storage system 85 for execution to render writing of the given data 51.*x* in storage resources. The storage system can optionally generate and/or send one or more write responses 242 in response to executing the write request, for example, in conjunction with completing a corresponding storage system transaction. The corresponding writing of data 51.*x* can include writing new data 51.*x* and/or modifying currently stored data 51.*x* as an updated version of this data. The storage system 85 can store this newly written data 51.*x* in conjunction with storing a plurality of other data including data 51.1, 51.2, etc. Such data can be stored over time, for example, until a deletion transaction is performed to delete and/or overwrite the data.

Figure 1H:
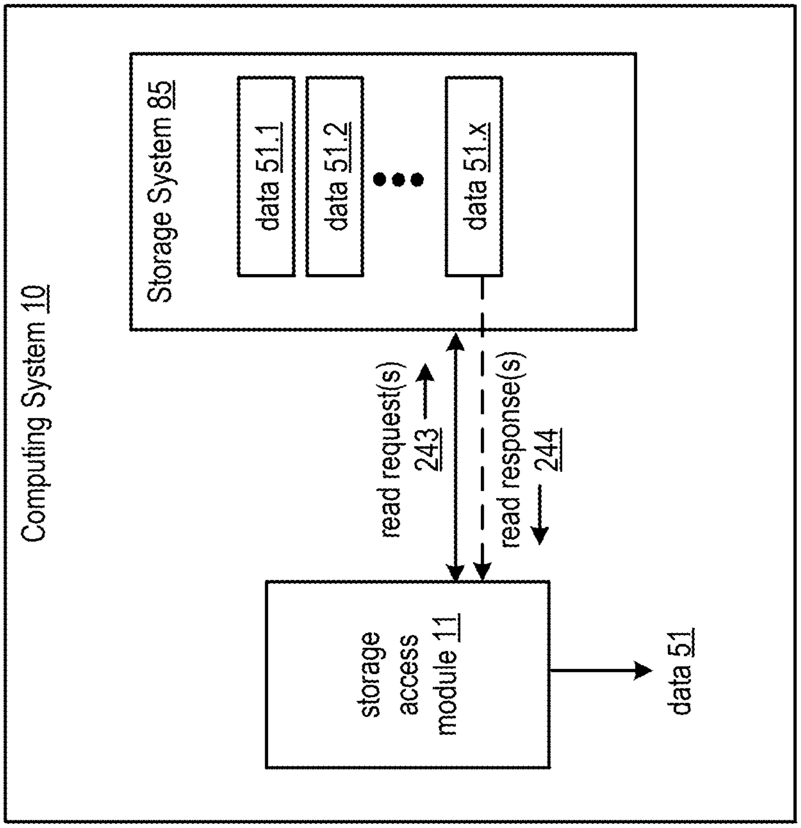

As illustrated in FIG. 1H, the storage access module 11 can be implemented to access the given data 51.*x* via storage system 85 (e.g. in one or more corresponding memory devices and/or storage devices implementing storage system 85), for example, after it is stored as illustrated in FIG. 1G. For example, given data 51.*x* is accessed for transmission to a computing device 13 and/or is accessed for processing in generating other data for storage and/or transmission (e.g. in response to processing instructions/a request/other data received from the respective computing device 13).

Such access of given data 51.*x* can include generating and/or sending one or more read requests 243 to the storage system 85 for execution to render reading of some or all of the given data 51.*x* from the storage resources. The storage system can optionally generate and/or send one or more read responses 244 in response to executing the read request (for example, in conjunction with completing a corresponding storage system transaction), which can include the data 51.*x*. Other data (e.g. data 51.1, 51.2, etc.) can be similarly accessed as required to perform functionality of computing system 10.

The data 51.*x* that is written to storage system 85 for storage over time and/or subsequent access (e.g. reads and/or modifications) over time can include any of the data 51 and/or 51' of FIGS. 1C-1F, and/or any other data/instructions described herein. For example, data 51 generated and/or transmitted by the computing system 10 can be stored in and/or retrieved from storage system 85 as one or more given data 51.*x*, and/or any of the data 51' received by and/or extracted by the computing system 10 can be stored in and/or retrieved from storage system 85 as one or more given data 51.*x*. As another example, given user account data; given application data, given machine executable instructions for execution; given risk assessment data; given prompt data and/or given response data, given digital display data and/or given digital image data for processing, display or storage; given responses to prompts displayed via display device; given digitally encoded document files such as image files, textual data, and/or completed forms; given function definitions for function entries and/or for various functions/models that are trained, generated, stored and/or executed and/or other various data described herein can be stored in and/or retrieved from storage system 85 as one or more given data 51.*x*.

Any given data 51.*x* stored via storage system 85 can optionally be encoded, compressed, and/or encrypted for storage, for example, via applying a corresponding encoding, compression, and/or encryption scheme. Reading such data can optionally include performing corresponding decoding, decryption, and/or decompression of the respective data in storage to recover the underlying data (e.g. for processing/transmission/etc.).

Figure 1I:
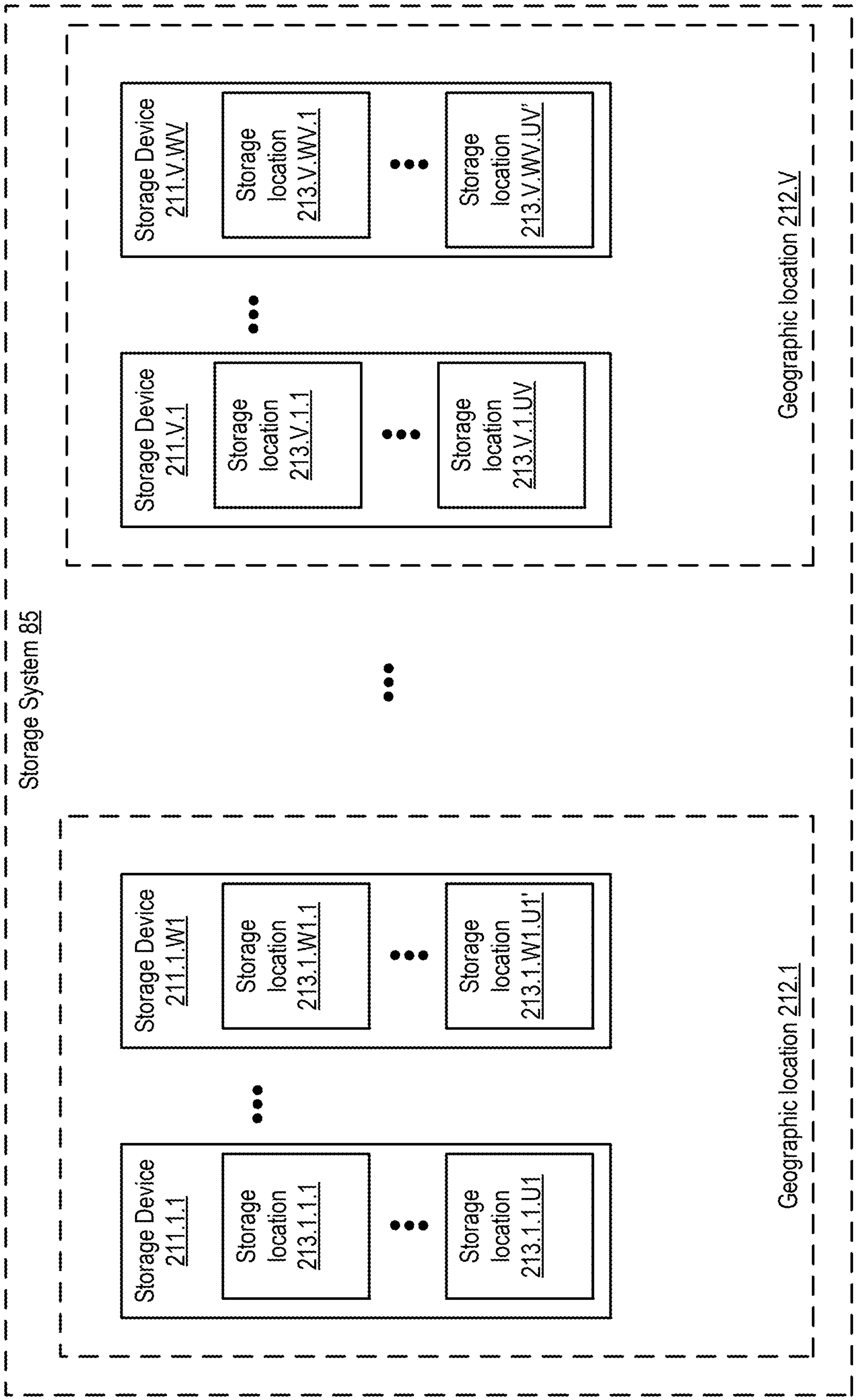

FIG. 1I illustrates an embodiment of storage system 85 that implements a plurality of storage devices 211 physically located across a plurality of geographic locations 212.1-212.V (e.g. different server racks within a same datacenter, different datacenters with different physical addresses and/or located in different cities, etc.). Different geographic locations can contain same or different numbers of storage device W. Different storage devices 211 within same or different geographic locations can be of the same or different type of device implementing the same or different type and/or amount of storage. Each storage device 211 can have a plurality of storage locations 213 (e.g. memory addresses, blocks or memory, portions of memory that can be written to/read from, etc.). Different storage devices 211 can have same or different numbers/types of storage locations U (E.g. based on implementing same or different types/amounts of storage). The plurality of storage devices 211 across the plurality of geographic locations 212 can optionally implement a cloud storage system and/or other dispersed storage system.

Any given data 51.*x* or other given data (e.g. a given document file, given user account, given function definition, etc.) described herein can be stored by storage system 85 via one or more storage locations 213 of one or more storage devices 211 in one or more geographic locations 212. For example, a given document file, user account, function definition, or other given data is stored across a plurality of storage locations 213 located in a plurality of storage devices 211 in multiple geographic locations 212, for example, in conjunction with storing the data redundantly (e.g. to ensure data is recoverable in the case of device wide and/or site-wide outage), where given data is replicated across different devices in same or different geographic locations and/or where different portions and/or corresponding parity data of given data is dispersed across different devices in same or different geographic locations in accordance with a fault tolerant storage scheme.

Figure 1J:
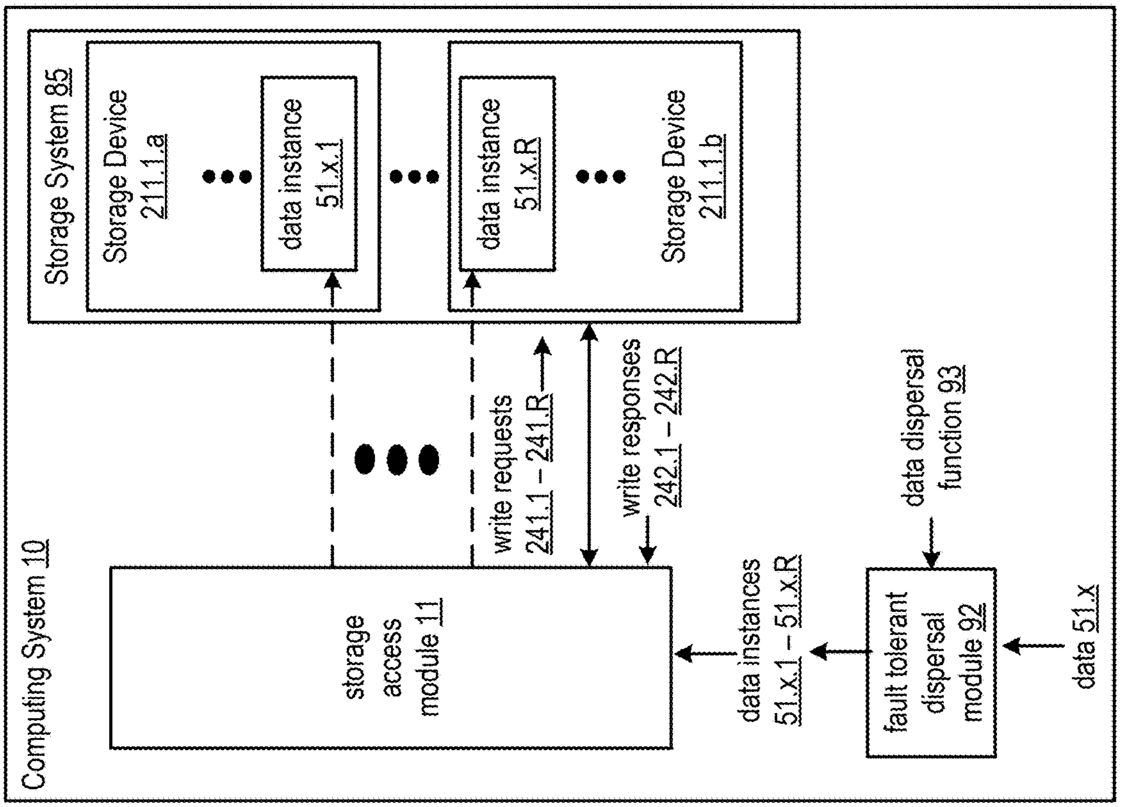

FIG. 1J illustrates an embodiment of storing data 51.*x* as a set of data instances 51.*x*.1-51.*x*.R (e.g. R replicas of the data 51.*x*, R different encoded portions of the data 51.*x* generated to include parity data, for example, in accordance with a fault tolerant encoding scheme, etc.) across a given set of R different storage devices 211 (e.g. that includes at least 3 given storage devices 211.*a*, 211.*b*, and/or 211.*c* located in same or different geographic locations 212), for example, in R respective storage locations 213 across the R devices 211.

The set of data instances 51.*x*.1-51.*x*.R can be generated, and/or the R respective locations/devices in which the R data instances are to be stored, can be selected/identified, via implementing a fault tolerant dispersal module 92, for example, via executing a data dispersal function 93 upon the data 51.*x*. The storage access module 11 can generate and send a set of different write requests 241.1-241.R to different storage devices for execution to each render storage of a corresponding data instance upon the corresponding storage device.

Different data can be stored in different sets of locations 213 and/or different numbers of locations 213. Storing particular data in multiple locations can include: automatically selecting the set of storage location 213 and/or number of locations 213 across which the particular data will be stored (e.g. as a function of an identifier of the data, a type of the data, which storage devices have space available, which storage devices are currently operational, etc.); and/or executing the storage operation to store different portions/different replicated instances of the data across the identified set of locations (e.g. contemporaneously and/or in parallel), for example, via sending a set of corresponding write requests to corresponding storage devices 211 for execution.

Figure 1K:
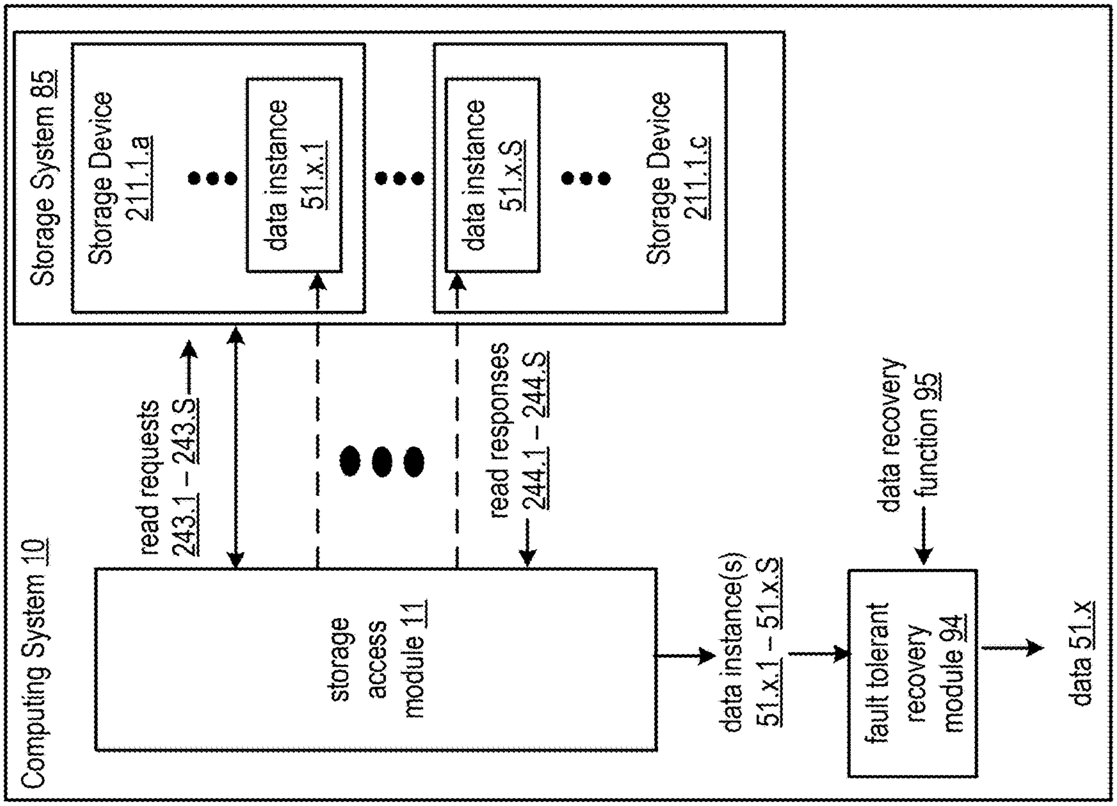

FIG. 1K illustrates an embodiment of accessing data 51.*x* via accessing a set of data instances 51.*x*.1-51.*x*.S (e.g. S replicas of the data 51.*x*, S different encoded portions of the data 51.*x* generated to include parity data, for example, in accordance with a fault tolerant encoding scheme, etc.), which can include some or all of the set of data instances 51.*x*.1-51.*x*.R generated and stored for the given data as illustrated in FIG. 1I (e.g. S is less than or equal to R). For example, the set of data instances 51.*x*.1-51.*x*.S includes only one data instance in the case where data 51.*x* is stored as a set of replicas. As another example, the set of data instances 51.*x*.1-51.*x*.S includes multiple data instances in the case where data 51.*x* is stored as a plurality of different encoded data portions/parity data.

Accessing particular data can include: determining how the data be accessed via automatically selecting an access type from a plurality of access options (e.g. selecting which version be accessed; selecting whether the data be accessed directly or reconstructed via accessing multiple corresponding portions and/or parity data from multiple locations, etc.); automatically identifying the set of storage locations 213 and/or number of locations 213 across which the particular data to be accessed is stored (e.g. as a function of an identifier of the data, a type of the data, a mapping/index indicating where various data is stored etc.); and/or executing the access operation to access the data from the set of one or more storage locations 213 (e.g. contemporaneously and/or in parallel), for example, via a set of corresponding read requests to corresponding storage devices 211 for execution.

Storage devices and/or storage locations 213 of the set of data instances 51.*x*.1-51.*x*.S can be identified for access, for example, via implementing a fault tolerant recovery module 94 The storage access module 11 can generate and send a set of different read requests 241.1-241.S to different storage devices for execution to each render access of a corresponding data instance upon the corresponding storage device (e.g. based on these requests optionally indicating the identified storage locations 213 and/or identifiers for the data instances), where the plurality of requested data instances 51.*x*.1-51.*x*.S are indicated in a plurality of read responses generated and/or sent by a respective set of S storage devices 211 (e.g. that include at least storage device 211.*a* and 211.*c* but optionally not storage device 211.*b* in the case where not all R data instances are retrieved).

The data 51.*x* can be recovered from the set of data instances (e.g. in the case where a direct replica is not accessed) based on for example, via implementing a fault tolerant recovery module 94 to execute a data recovery function 95 upon the data instances 51.*x*.1-51.*x*.S indicated in the plurality of read responses 244.1-244.S (e.g. to decode a plurality of encoded portions of the data based on parity data included in at least some of the plurality of encoded portions).

Figure 1L:
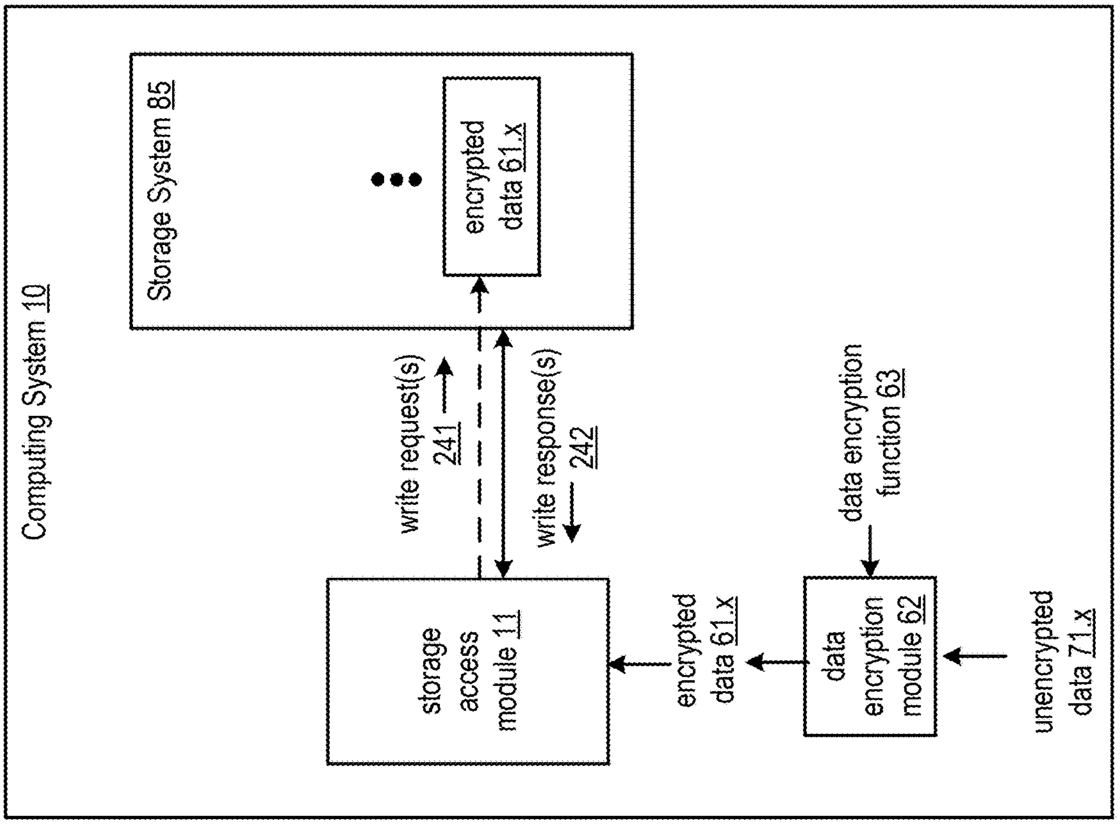
Figure 1M:
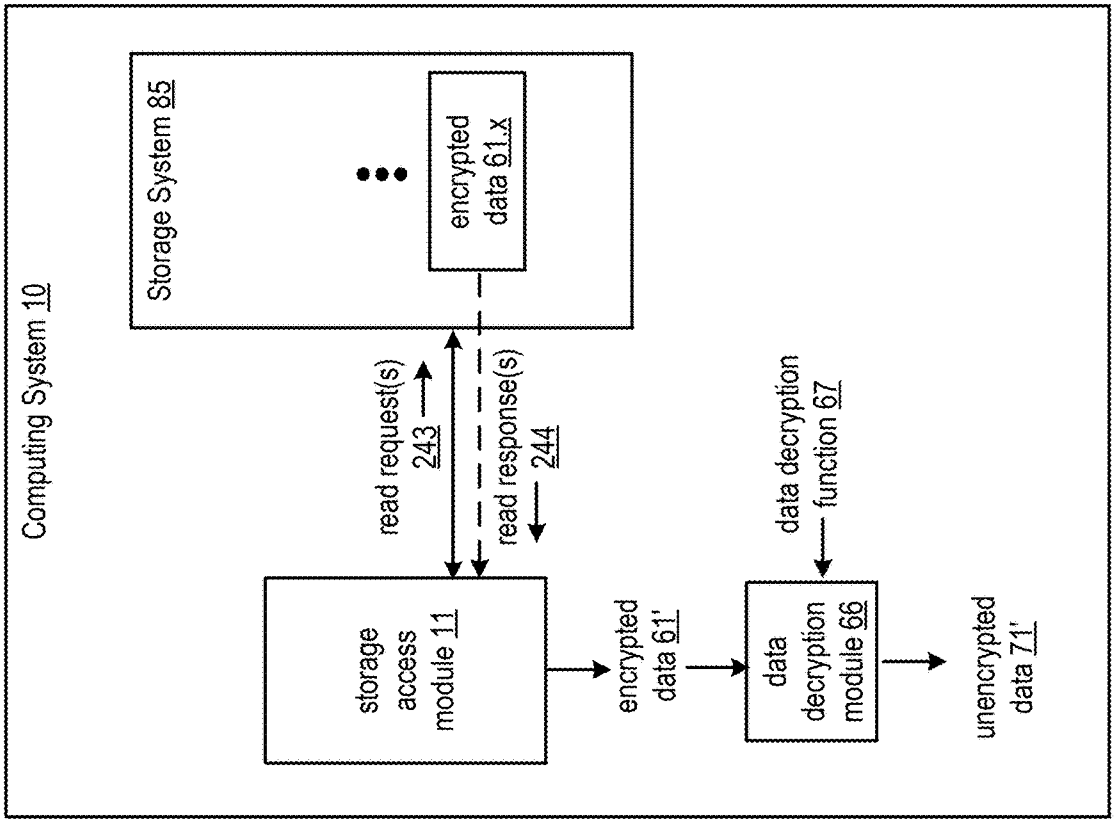
Figure 10:
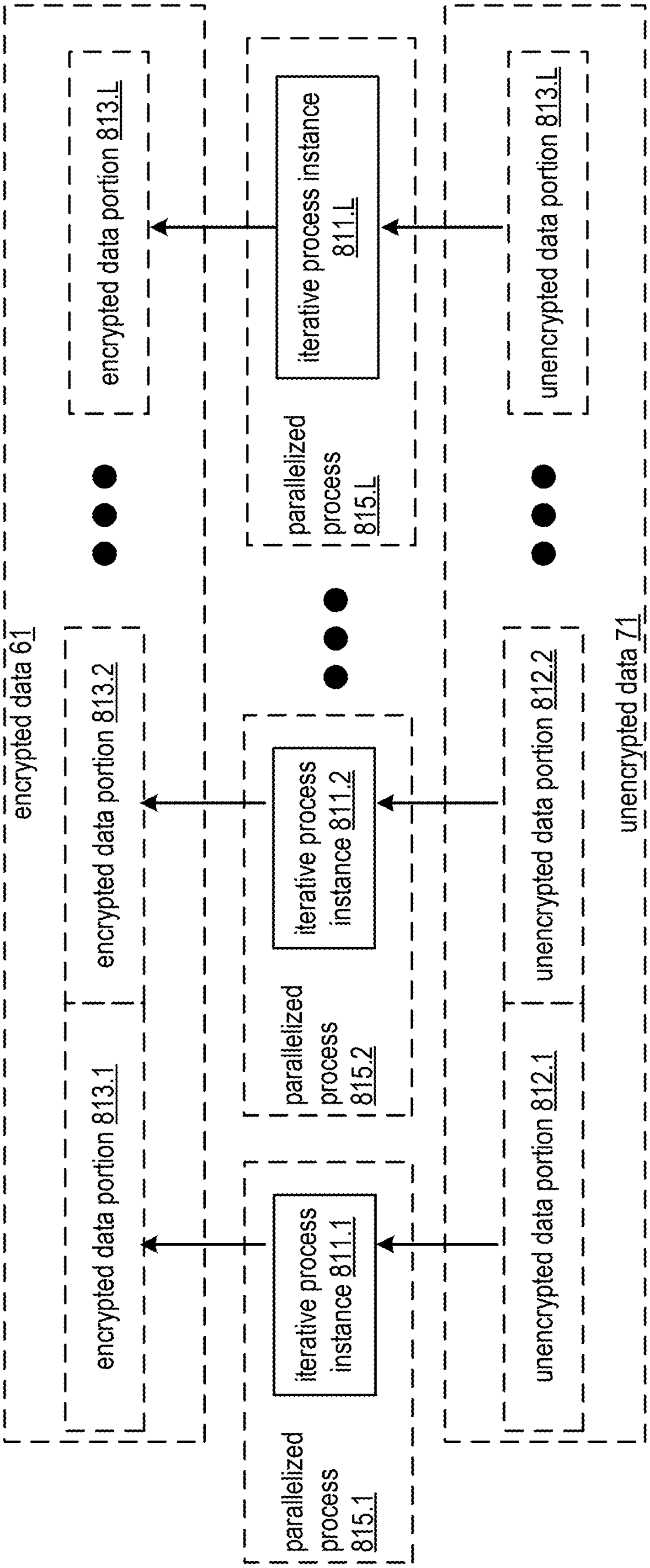

FIGS. 1L and 1M illustrate embodiments where some or all data 51, and/or some or all respective data instances, stored via storage system 85 are optionally implemented as encrypted data generated from corresponding unencrypted (e.g. plaintext) data. As a particular example, sensitive information such as social security number or other national identification number, birthdate, and/or sensitive documents such as birth certificate or national registration documents such as social security card, etc., and/or other sensitive information is encrypted for storage. In some embodiments, some or all data 51 and/or 51' communicated between computing system and computing device is not encrypted and is stored as unencrypted data (e.g. based on not corresponding to sensitive data for the user). In some embodiments, some data stored by storage system 85 is encrypted and other data ex stored by storage system 85 is not encrypted.

As illustrated in FIG. 1L, computing system 10 can generate encrypted data 61 from unencrypted data 71 based on utilizing a data encryption module 62 to generate encrypted data 61 based on applying a data encryption function 63 to the unencrypted data 71 (e.g. in a same, similar, or different fashion as implementing the encrypted data 61 and/or data encryption function 63 of FIG. 1E). As one example, this encrypted data 61 can then be optionally dispersed into a corresponding set of data instances. As another example, some or all data instances are encrypted after being generated.

As illustrated in FIG. 1M, the computing system 10 can extract the unencrypted data 71 from the encrypted data 61 stored in storage system 85 when the respective encrypted data is accessed.

The given unencrypted data 71.*x* can be generated, received, and/or accessed by the computing system 10, and/or can correspond to unencrypted data 71 and/or unencrypted data 71' of FIG. 1E and/or FIG. 1F. In an example embodiment, some or all of the given unencrypted data 71 can optionally be generated via decrypting other data (e.g. based on being extracted from previously encrypted data received in a transmission from a computing device 13, where this previously encrypted data is encrypted via a same or different encryption scheme as utilized in data encryption function 63 to generate encrypted data 61 from the unencrypted data 71 generated via decrypting this previously encrypted data). In another example embodiment, some or all of the encrypted data 61 is accessed directly based on already being encrypted via prior performance of the encryption function on corresponding unencrypted data (e.g. based on being previously encrypted, for example, received in a transmission from a computing device 13).

Any embodiment of data encryption module 62 and/or 62' described herein, and/or any encryption of data described herein, can be implemented via applying any data encryption function. For example, data encryption function 63 and/or 63' applied by any embodiment of data encryption module 62 and/or 62' described herein can be implemented via a symmetric encryption scheme and/or an asymmetric encryption scheme. The data encryption function 63 and/or 63' can generate encrypted data 61 and/or 61' as a function of corresponding key data applied to the corresponding unencrypted data 71 and/or 71', where the data decryption function is optionally implemented to recover the unencrypted data 71 and/or 71' as a function of this corresponding key data applied to the encrypted data 61 and/or 61' generated from this corresponding key data, for example, in accordance with applying a symmetric encryption scheme. The data encryption function 63 and/or 63' can optionally implement a block cipher or other type of cipher. The data encryption function 63 and/or 63' can optionally implement an Advanced Encryption Standard (AES) encryption scheme and/or other encryption scheme.

FIGS. 1N-1O illustrate example embodiments of data encryption module 62. Some or all features and/or functionality of the data encryption module 62 of FIG. 1N and/or 1O can implement the data encryption module 62 and/or 62' of FIG. 1E, FIG. 1F, and/or FIG. 1L, and/or can implement any embodiment of encrypting and/or securely storing data described herein.

As illustrated in FIG. 1N, an initialization step 801 can be applied to unencrypted data 71 to generate intermediate data version 810.0. For example, the intermediate data version 810.0 includes one or more unencrypted (e.g. plaintext) blocks (e.g. one or more blocks having a fixed number of bits representing a corresponding matrix, such as a square matrix, for example, where each cell of the matrix includes a same number of bytes and/or the respective block includes a number of bytes equal to the number of bytes per cell time number of cells, where number of cells has an integer square root based on the matrix being a square matrix) that are generated from the unencrypted data).

The intermediate data version 810 can be serially updated a plurality of times as a function of a plurality of subkeys 804.1-804.M+1 generated via a subkey generator module 802 as a function of corresponding key data 803 (e.g. a particular key utilized to encrypt the unencrypted data, which is optionally applied to "reverse" the process when subsequently decrypting the data via data decryption module 63). Generating the plurality of subkeys 804.1-804.M+1 can include generating and/or processing at least one matrix and/or fixed-size ordered set of bits as a function of the key data 803. Different given unencrypted data can be encrypted via same or different key data (e.g. encrypted data 61.*x* is generated from unencrypted data 71.*x* from one corresponding key data 803.*x*, which can be same or different from key data 803.1, 803.2, etc. utilized to generate encrypted data 61.1, 61.2, etc. from unencrypted data 71.1, 71.2 etc., respectively.).

A subsequent plurality of intermediate data versions 810.1-810.M can be generated from the initial intermediate data version 810.0 via performing an iterative process 811 to generate respective intermediate data versions across a corresponding plurality of iterative steps 805.1-805.M. Each iterative step 805.1-805.M can be performed via applying a corresponding one of the plurality of different subkeys 804.1-804.M to an immediately prior one of the plurality of intermediate data versions (e.g. iterative step 805.1 is executed via performance of a respective function upon subkey 804.1 and intermediate data version 810.0; iterative step 805.2 is executed via performance of a respective function upon subkey 804.2 and intermediate data version 810.1; etc.).

Each intermediate data version 810.*i* can include one more intermediate blocks. Each intermediate block can be implemented as a corresponding matrix (e.g. represented via a corresponding ordered set of bits), such as a square matrix, for example, generated via one or more transformations/modifications to one or more previously matrixes of the immediately prior one of the plurality of intermediate data versions. For example, each intermediate data version and/or sub-version is generated from a prior version and/or sub-version maintains a same matrix shape (e.g. same number of cells across a same number of rows and columns) having its respective set of cells (e.g. set of values in its respective cells of its rows and columns) manipulated (e.g. via corresponding changes to corresponding adjacent sets of bits, representing respective cells, in a full fixed sized ordered set of bits, representing the matrix). This can include manipulating different sets of bits included in an ordered set of bits representing the matrix (e.g. sets of adjacent bits in different portions of the ordered set of bits correspond to the value of different cells, and changing of a given set of adjacent bits corresponding to a given cell changes the value of the given cell), and/or where a same matrix shape (and/or same number of bits in the set of ordered bits) is maintained across the performance of the iterative process with respective updates/manipulation of the cell values included in the matrix.

A finalization step 809 can be performed upon intermediate data version 810.M to generate encrypted data 61 (e.g. as a final data version generated from intermediate data version 810.M). The finalization step 809 can be performed in a same, similar, or different fashion from performing iterative steps 805.1-805.M. The finalization step 809 can be performed via applying a final subkey 804.M+1 (e.g. the encrypted data 61 is generated via performing a function upon the intermediate data version 810.M and the subkey 804.M+1).

In some embodiments, executing each given iterative step 805.*i* to generate a given intermediate data version 810.*i* from an immediate prior intermediate data version 810.*i*−1 includes performing a plurality of different subprocesses to generate a plurality of intermediate sub-versions (e.g. further intermediate data versions 810 generated in distinct, serialized steps in progressing from intermediate data version 810.*i*−1 to intermediate data version 810.*i*). As a particular example, four different subprocesses 811, 812, 813, and/or 814 (e.g. different corresponding functions, for example, applied to transform respective matrices) are applied to generate a given intermediate data version 810.*i* from an immediate prior intermediate data version 810.*i*−1 via generating three respective sub-versions (e.g. a first sub-version 810.*i*−1.1 is generated via executing a first subprocess 811 upon intermediate data sub-version 810.*i*−1; a second sub-version 810.*i*−1.2 is generated via executing a second subprocess 812 upon intermediate data sub-version 810.*i*−1.1; a third sub-version 810.*i*−1.3 is generated via executing a third subprocess 813 upon intermediate data sub-version 810.*i*−1.2; and/or the intermediate data version 810.*i*+1 is generated via executing a fourth subprocess 814 upon intermediate data sub-version 810.*i*−1.3. In other embodiments, any other number of same or different subprocesses are serially performed in performing some or all iterative steps 805 to generate a different number of further intermediate data versions as a different set of corresponding sub-versions.

In some embodiments, the subkey 804.*i* for a given iterative step 805.*i* is processed as input to only a proper subset of the plurality of subprocesses (e.g. the subkey 804.*i* is processed as input to subprocess 814 but not subprocesses 811, 812, and/or 813; or some other number of subprocesses/proper subset of the full set of subprocesses).

In some embodiments, performing the finalization step 809 includes performing some or all of the subprocesses 811, 812, 813, and/or 814. In some embodiments, only subprocesses included in the a proper subset of the set of four subprocesses 811, 812, 813, and 814 is performed (e.g. only subprocesses 811, 812, and 814 are performed in the final round, where subprocess 814 is performed directly upon a sub-version generated as output of subprocess 812, for example, via applying subkey 804.M+1).

In some embodiments, the plurality of iterative steps 805.1-805.M are performed based on applying a block cipher, for example, implemented in a same or similar fashion as one or more types of Advanced Encryption Standard (AES) encryption schemes. For example, in some embodiments of performing a given iterative step 805.*i*, the first subprocess 811 can be performed via applying a substitution step to generate the first sub-version 810.*i*−1.1 by substituting at least one portion (e.g. at least one byte and/or at least one matrix cell) of intermediate data sub-version 810.*i*−1 (e.g. via applying a predetermined mapping). Alternatively or in addition, the second subprocess 812 can be performed via applying a row shifting step to generate the second sub-version 810.*i*−1.2 by cyclically shifting at least one row (e.g. shifting a predetermined proper subset of a set of rows of the matrix, where different rows are cyclically shifted by same or different predetermined amounts) of intermediate data sub-version 810.*i*−1.1 accordingly for example, via rearranging positions of at least one adjacent set of bits corresponding to at least one matrix cell in the ordered set of bits of intermediate data sub-version 810.*i*−1.1 accordingly. Alternatively or in addition, the third subprocess 813 can be performed via a matrix multiplication step to generate the third sub-version 810.*i*−1.3 by performing at least one matrix multiplication upon intermediate data sub-version 810.*i*−1.2 (e.g. multiplying at least some columns of the matrix of intermediate data sub-version 810.*i*−1.2 with a predetermined matrix, for example, to generate a new corresponding column to replace each column). Alternatively or in addition, the fourth subprocess 814 can be performed via a subkey application step to generate the intermediate data sub-version 810.*i* via applying the subkey 804.*i* generated for the respective iterative step 805.*i* to the intermediate data sub-version 810.*i*−1.3 (e.g. an XOR function and/or bitwise addition function, for example, applied to the fixed size ordered set of bits representing the matrix and another fixed size ordered set of bits representing the subkey 804.*i* having a same number of bits as the fixed size ordered set of bits representing the matrix).

Figure 2A:
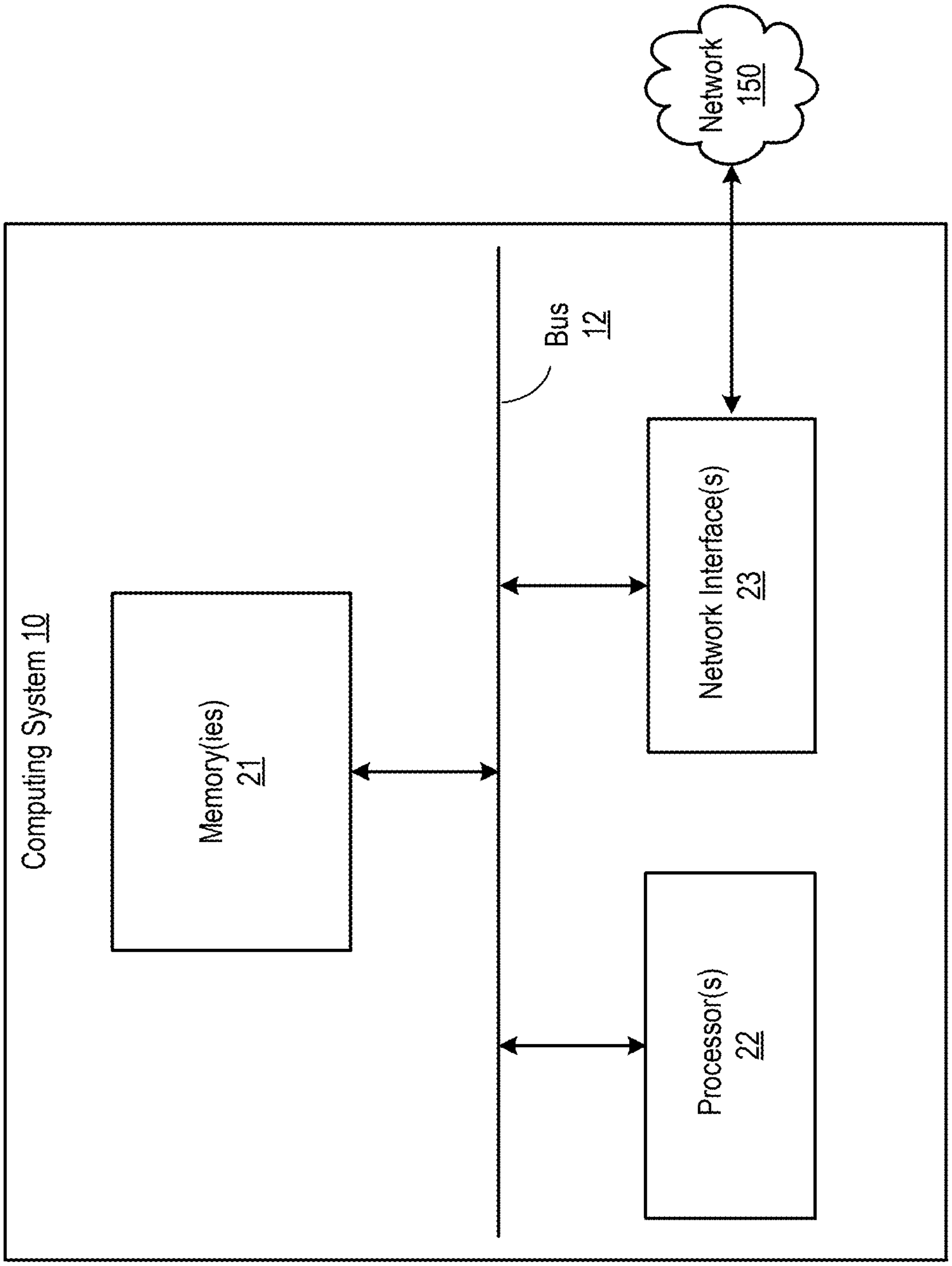
FIG. 2A is a schematic block diagram of a computing system in accordance with various embodiments.

As illustrated in FIG. 2A, computing system 10 can be implemented via one or more processors 22 (e.g. corresponding processing devices and/or other processing resources), one or more memories 21 (e.g. corresponding memory devices and/or storage devices and/or other memory/storage resources), and/or one or more network interfaces 23, communicating via a bus 12. The one or more network interfaces 23 can be operable to send and/or receive data via the network 150 and/or via any other communication system. Bus 12 can facilitate communication of data between the one or more processors 22, one or more memories 210, and/or one or more network interfaces 230 via one or more wired and/or wireless communication resources.

The one more processors 22 can implement operation of any systems and/or modules described herein, and/or can implement execution of any steps, processes, operations, methods and/or functions described herein. The one or more processors 22 can optionally include at least one processing device is implemented in accordance with a multi-core architecture and includes a corresponding plurality of processing cores, where some or all steps, processes, operations, methods and/or functions described herein can be implemented via multiple ones of the plurality of processing cores of at least one processing device contemporaneously each performing different portions of a given step, process, operation, method and/or function contemporaneously and/or in parallel.

In various embodiments, some or all of the one more processors 22 implements at least one integrated circuit unit. For example, the at least one integrated circuit unit can include at least one graphics processing unit, at least one field programmable gate array, at least one application-specific integrated circuit, and/or at least one AI chip. The at least one integrated circuit unit can be operable to perform a plurality of parallelized operations contemporaneously. In various embodiments, one or more of the processes, operation, steps, and/or functionality described herein can be performed as a plurality of parallelized sub-tasks as a plurality of parallelized processes, for example, executed in parallel via the at least one integrated circuit unit. In various embodiments, multiple ones of the processes, operation, steps, and/or functionality described herein can be performed in parallel as a plurality of parallelized processes, for example, executed in parallel via the at least one integrated circuit unit.

The one more memories 21 can implement storage system 85, can be implemented to store any data (e.g. data 51 and/or 51') and/or instructions described herein, and/or can be implemented to store intermediate data as required by implementing operation of any systems and/or modules described herein and/or as required by executing of any steps, processes, and/or functions described herein.

Figure 2B:
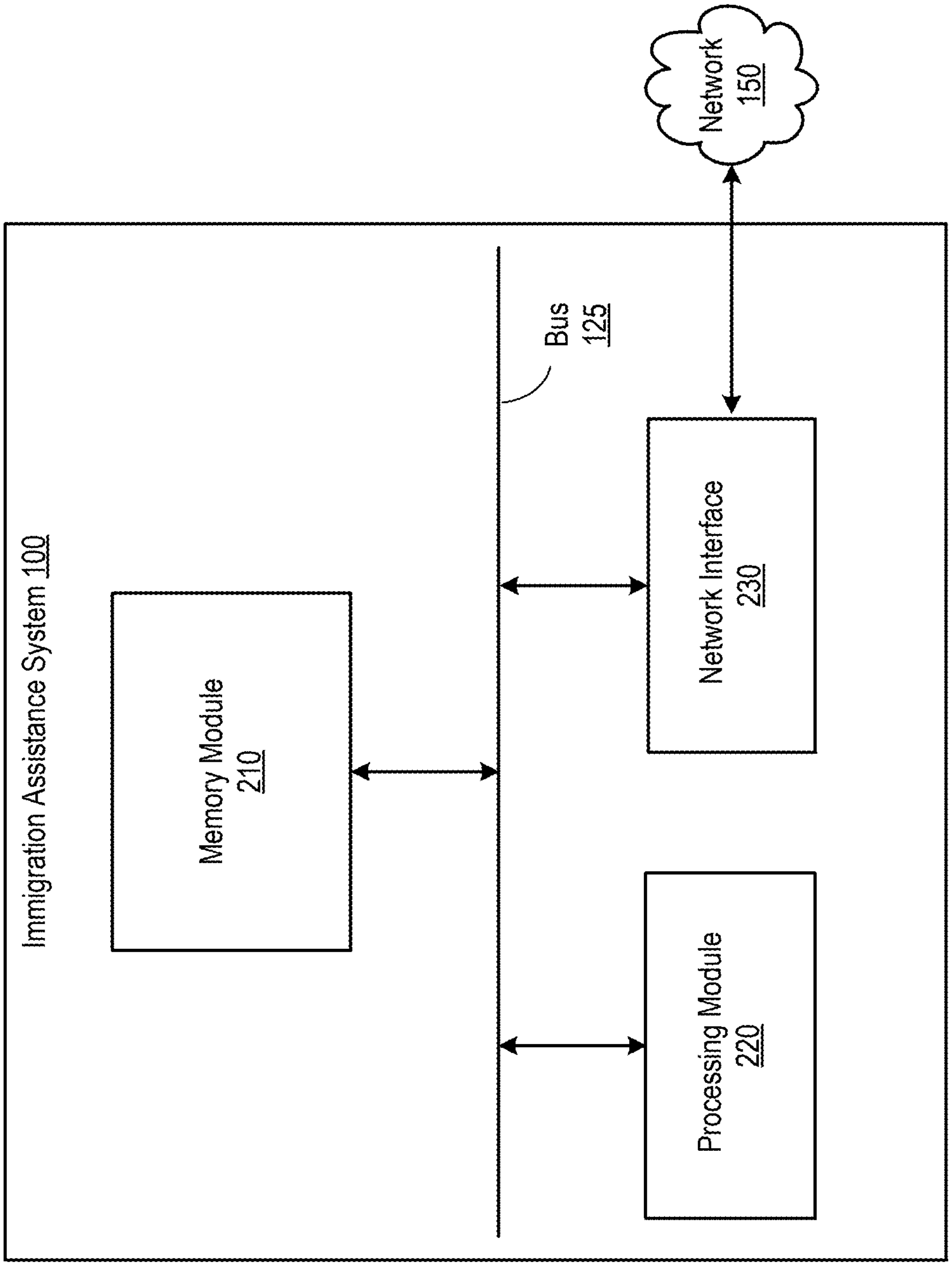
FIGS. 2B-2D are schematic block diagrams of an immigration assistance system in accordance with various embodiments.

As illustrated in FIG. 2B, the immigration assistance system 100 can be implemented via one or more processing modules 220, one or more memory modules 210, and/or one or more network interfaces 230, communicating via a bus 125. The one or more network interfaces 230 can be operable to send and/or receive data via the network 150 and/or via any other communication system. Bus 125 can facilitate communication of data between the one or more processing modules 220, one or more memory module 210, and/or one or more network interfaces 230 via one or more wired and/or wireless communication resources.

The one or more processors 22, one or more memories 21, and/or one or more network interfaces 23, and/or bus 12 of FIG. 2A can be implemented via implementing some or all features and/or functionality of the one or more processing modules 220, the one or more memory module 210, the one or more network interfaces 230, and/or the bus 125 of FIG. 2B, respectively and/or via any embodiment of the one or more processing modules 220, the one or more memory module 210, the one or more network interfaces 230, and/or the bus 125 described herein.

The memory module 210 can include memory that stores operational instructions that, when executed by the one or more processing modules 220, cause the immigration assistance system 100 to execute some or all of the functionality described herein.

As another example, the operational instructions, when executed by the one or more processing modules 220, can cause the immigration assistance system 100 to utilize network interface 230 to receive data from one or more client devices 130 via network 150. For example, this data can include response data and/or document upload data generated by the client devices 130.

As another example, the operational instructions, when executed by the one or more processing modules 220, can cause the one or more processing modules 220 to generate data. For example, this data is generated based on: receiving and processing other data, such responses or documents generated and/or sent by one or more client devices 130; retrieving and processing other data, such as user account data, retrieved from one or more memory modules 210; performing one or more functions on other data, for example, based on corresponding function entries of a function library; and/or one or more other mechanisms.

As another example, the operational instructions, when executed by the one or more processing modules 220, can further cause the one or more processing modules 220 to store data in one or more memory modules 210. For example, data can be stored as data of a user account and/or a function entry. This data can be obtained prior to storage in the one or more memory modules 210 based on being: generated by the one or more processing modules 220; stored in and retrieved from one or more memory modules 210; configured via user input by an administrator; received via network 150; and/or otherwise being determined.

As another example, the operational instructions, when executed by the one or more processing modules 220, can cause the immigration assistance system 100 to utilize network interface 230 to send data to one or more client devices 130 via network 150. This data can include information, instructions, and/or prompts for display via an interactive user interface of the client device. This data can alternatively or additionally include application data for storage and/or execution by client devices 130. This data can be obtained prior to transmission to the one or more client devices 130 based on being: generated by the one or more processing modules 220; stored in and retrieved from one or more memory modules 210; configured via user input by an administrator; received via network 150; and/or otherwise being determined.

Figure 2C:
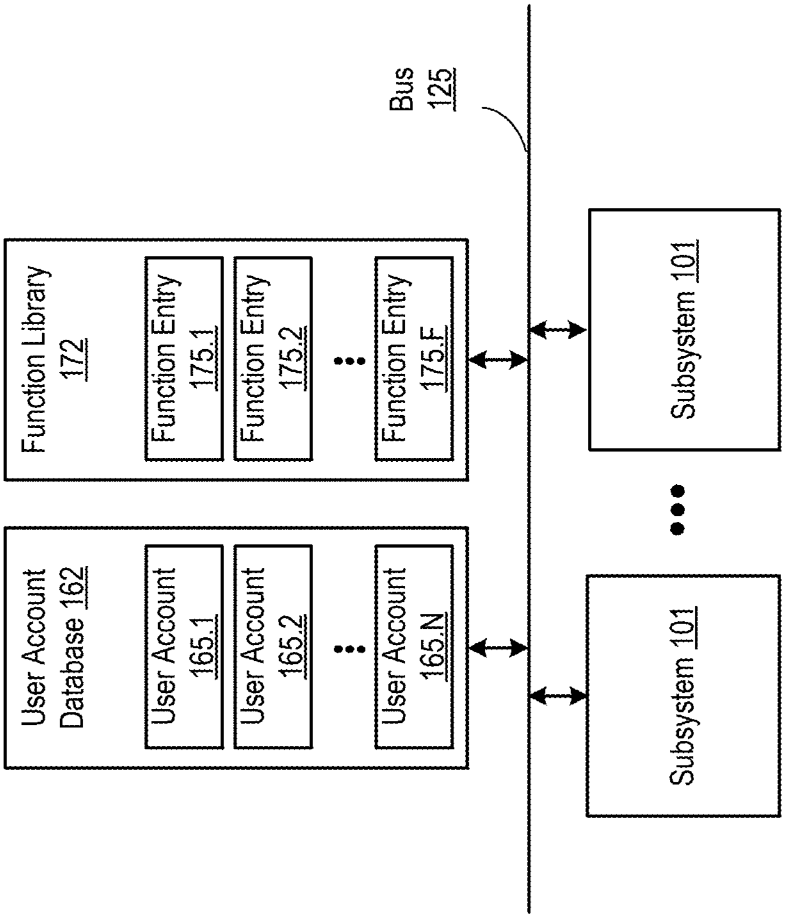

As illustrated in FIG. 2C, the immigration assistance system 100 can include and/or can communicate with: one or more user account databases 162; one or more function libraries 172; and/or one or more subsystems 101, all communicating via a bus 125. Bus 125 can facilitate communication of data between the one or more user account databases 162; one or more function libraries 172; and/or one or more subsystems 101 via one or more wired and/or wireless communication resources.

The user account database 162 can store a plurality of user accounts 165. Each user account 165 can correspond to one of the plurality of users of the immigration assistance system 1-N. The user account database can be implemented as one or more relational and/or non-relational databases, and/or can be implemented via any one or more memory devices accessible by the immigration assistance system 100 that is operable to store and/or access the plurality of user accounts 165. Some or all user accounts 165 of the user account database 162 can be generated by the immigration assistance system based on responses, documents, and/or other information received from one or more client devices 130. The information stored in user accounts 165 is discussed in further detail in conjunction with FIGS. 5A-5H.

The function library 172 can include a plurality of function entries 175. The function library 172 can be implemented via any one or more memory devices accessible by the immigration assistance system 100 that is operable to store and/or access the plurality of function entries 175. Some or all function entries 175 of the function library 172 can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; and/or otherwise determined by immigration assistance system.

Each function entry can include information and/or instructions utilized to perform a corresponding function. Some or all functions described herein can be stored in function library 172 and/or can be executed in accordance with the information and/or instructions of a corresponding function entry 175. Function entries 175 of various functions are discussed in further detail in conjunction with FIGS. 6A-7Z.

A function entry 175 can correspond to a function that can be executed by the immigration assistance system 100 to perform functionality of the immigration assistance system 100. For example, the immigration assistance system 100 performs a given function based on accessing and/or executing information and/or instructions stored in and/or indicated by the corresponding a function entry 175. Alternatively or in addition, the immigration assistance system 100 executes operational instruction stored in memory module 210 that cause the immigration assistance system 100 to execute a given function that corresponds to a function entry 175.

Alternatively or in addition, a function entry 175 can correspond to a function that can be executed by a client device 130. For example, the client device 130 performs a given function based on receiving information and/or instructions stored in and/or indicated by the corresponding a function entry 175, and/or based on storing and/or executing the received function entry 175. Alternatively or in addition, the client device 130 can receive application data from the immigration assistance system 100 via the network 150 that includes information and/or instructions corresponding to one or more function entries 175, the client device 130 can store this application data via its memory resources, and/or the client device 130 can perform one or more corresponding functions based on accessing and/or executing this application data.

The plurality of subsystems 101 can be utilized to implement different ones of the various functionality of the immigration assistance system 100 described herein. Each of the plurality of subsystems 101 can perform some or all of its functionality based on accessing and/or communicating with: other subsystems 101; the user account database 162, and/or the function library 172. In some embodiments, different subsystems 101 each access and/or maintain their own user account database 162 and/or the function library 172.

Figure 2D:
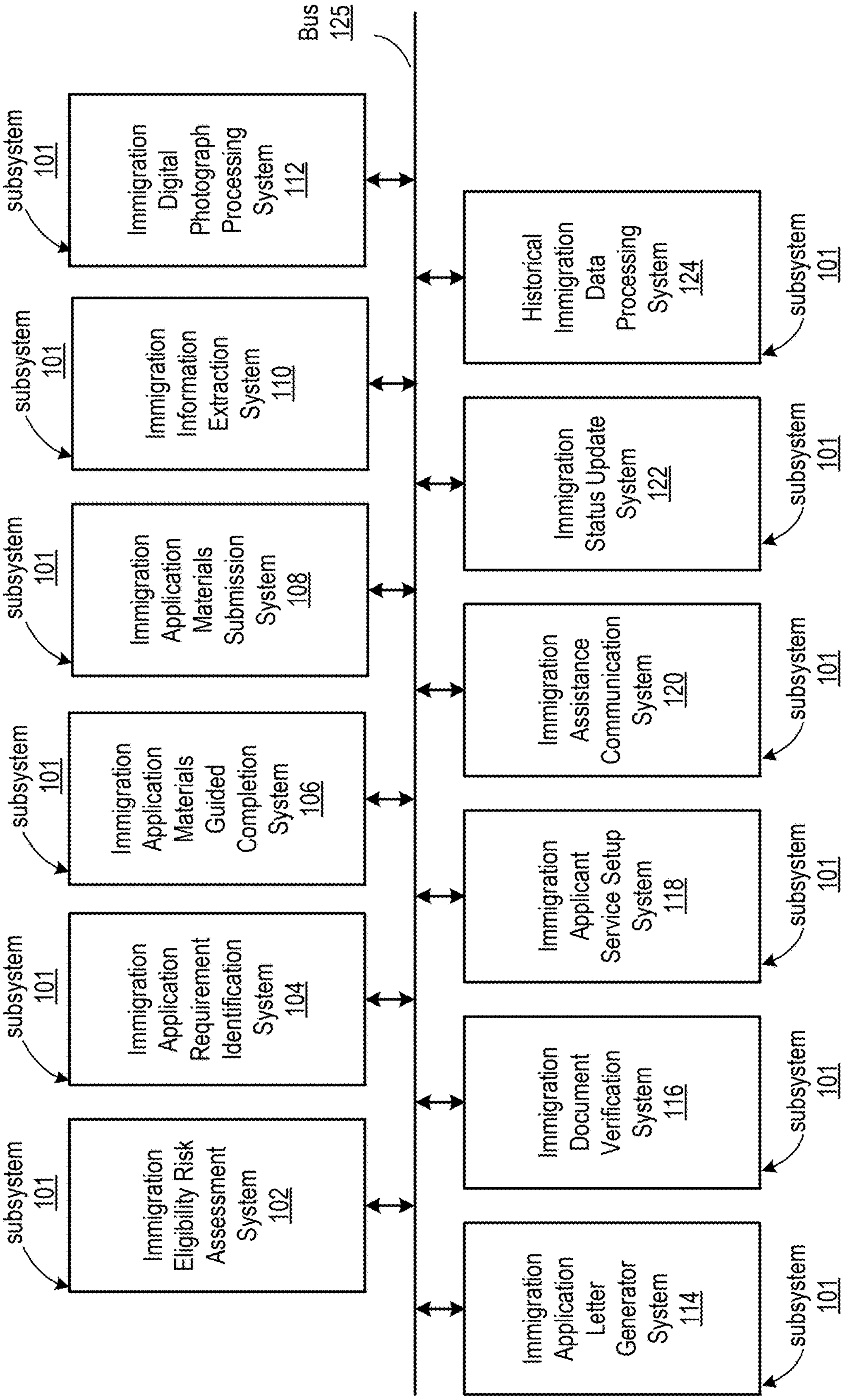

FIG. 2D illustrates a particular example of a plurality of subsystems 101 implemented by the immigration assistance system 100. Some embodiments of the immigration assistance system 100 can implement all of the set of subsystems 101 of FIG. 2D. Some embodiments of the immigration assistance system 100 can implement only a proper subset of the set of subsystems 101 of FIG. 2D. Some embodiments of the immigration assistance system 100 can implement additional subsystems 101 not illustrated in FIG. 2D.

The plurality of subsystems 101 implemented by the immigration assistance system 100 can include an immigration eligibility risk assessment system 102. The immigration eligibility risk assessment system 102 is discussed in further detail in conjunction with FIGS. 8A-8V.

The plurality of subsystems 101 implemented by the immigration assistance system 100 can alternatively or additionally include an immigration application requirement identification system 104. The immigration application requirement identification system 104 is discussed in further detail in conjunction with FIGS. 9A-9AP.

The plurality of subsystems 101 implemented by the immigration assistance system 100 can alternatively or additionally include an immigration application materials guided completion system 106. The immigration application materials guided completion system 106 is discussed in further detail in conjunction with FIGS. 10A-10O.

The plurality of subsystems 101 implemented by the immigration assistance system 100 can alternatively or additionally include an immigration application materials submission system 108. The immigration application materials submission system 108 is discussed in further detail in conjunction with FIGS. 11A-11J.

The plurality of subsystems 101 implemented by the immigration assistance system 100 can alternatively or additionally include an immigration information extraction system 110. The immigration information extraction system 110 is discussed in further detail in conjunction with FIGS. 12B-12F.

The plurality of subsystems 101 implemented by the immigration assistance system 100 can alternatively or additionally include an immigration digital photograph processing system 112. The immigration digital photograph processing system 112 is discussed in further detail in conjunction with FIGS. 13A-13I.

The plurality of subsystems 101 implemented by the immigration assistance system 100 can alternatively or additionally include an immigration application letter generator system 114. The immigration application letter generator system 114 is discussed in further detail in conjunction with FIGS. 14A-14AB.

The plurality of subsystems 101 implemented by the immigration assistance system 100 can alternatively or additionally include an immigration document verification system 116. The immigration document verification system 116 is discussed in further detail in conjunction with FIGS. 15A-15J.

The plurality of subsystems 101 implemented by the immigration assistance system 100 can alternatively or additionally include an immigration applicant service setup system 118. The immigration applicant service setup system 118 is discussed in further detail in conjunction with FIGS. 16A-16S.

The plurality of subsystems 101 implemented by the immigration assistance system 100 can alternatively or additionally include an immigration assistance communication system 120. The immigration assistance communication system 120 is discussed in further detail in conjunction with FIGS. 17A-17O.

The plurality of subsystems 101 implemented by the immigration assistance system 100 can alternatively or additionally include an immigration status update system 122. The immigration status update system 122 is discussed in further detail in conjunction with FIGS. 18A-18J.

The plurality of subsystems 101 implemented by the immigration assistance system 100 can alternatively or additionally include an historical immigration data processing system 124. The historical immigration data processing system 124 is discussed in further detail in conjunction with FIGS. 19A-19E.

Figure 2E:
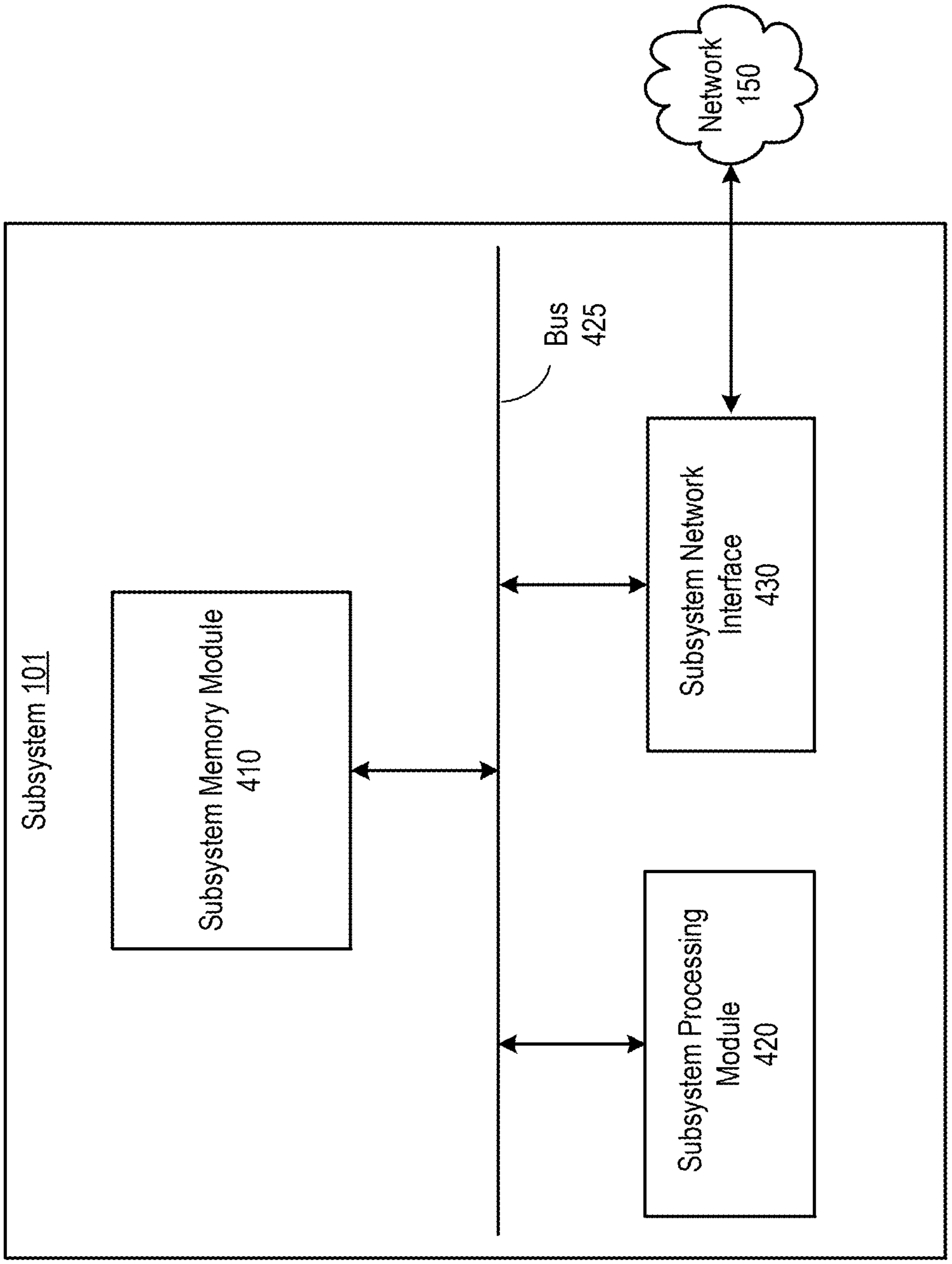
FIG. 2E is a schematic block diagrams of a subsystem of an immigration assistance system in accordance with various embodiments.

As illustrated in FIG. 2E, a given subsystem 101 can be implemented via: one or more subsystem processing modules 420; one or more subsystem memory modules 410; and/or one or more subsystem network interfaces 430, communicating via bus 425. The subsystem memory module 410 can include memory that stores operational instructions that, when executed by the one or more subsystem processing modules 420, cause the corresponding subsystem 101 to execute some or all of the functionality described herein. The one or more network interfaces 430 can be operable to send and/or receive data via the network 150 and/or via any other communication system. Bus 425 can facilitate communication of data between the: one or more subsystem processing modules 420; one or more subsystem memory modules 410; and/or one or more subsystem network interfaces 430 via one or more wired and/or wireless communication resources. Bus 425 of a given subsystem 101 can be implemented by, or can be distinct from, bus 125.

The one or more subsystem processing modules 420 of a given subsystem 101 can be implemented by, or can be distinct from, the one or more processing modules 220 of the immigration assistance system 100. The one or more subsystem memory modules 410 of a given subsystem 101 can be implemented by, or can be distinct from, the one or more memory modules 210 of the immigration assistance system 100. The one or more subsystem network interfaces 430 of a given subsystem 101 can be implemented by, or can be distinct from, the one or more network interfaces 230 of the immigration assistance system 100.

Different subsystems 101 can be implemented via shared resources and/or via distinct resources. For example, a first subsystem 101 is implemented via a first subsystem processing module 420; a first subsystem memory module 410; a first subsystem network interface 430; and a first bus 425. A second subsystem 101 is implemented via a second subsystem processing module 420; a second subsystem memory module 410; a second subsystem network interface 430; and a first bus 425. The first subsystem processing module 420 can have shared processing resources with, or can be entirely distinct from, the second subsystem processing module 420. The first subsystem memory module 420 can have shared memory resources with, or can be entirely distinct from, the second subsystem processing module 420. The first subsystem network interface 430 can have shared network interface resources with, or can be entirely distinct from, the second subsystem network interface 430. The first bus 425 can have shared communication resources with, or can be entirely distinct from, the second bus 425.

As a particular example, multiple subsystems 101 can optionally be implemented via shared resources based on their functionality being implemented in tandem. Alternatively or in addition, one or more different subsystems 101 can optionally be implemented via separate resources, such as separate devices and/or server systems, based on their functionality being implemented separately.

Figure 3A:
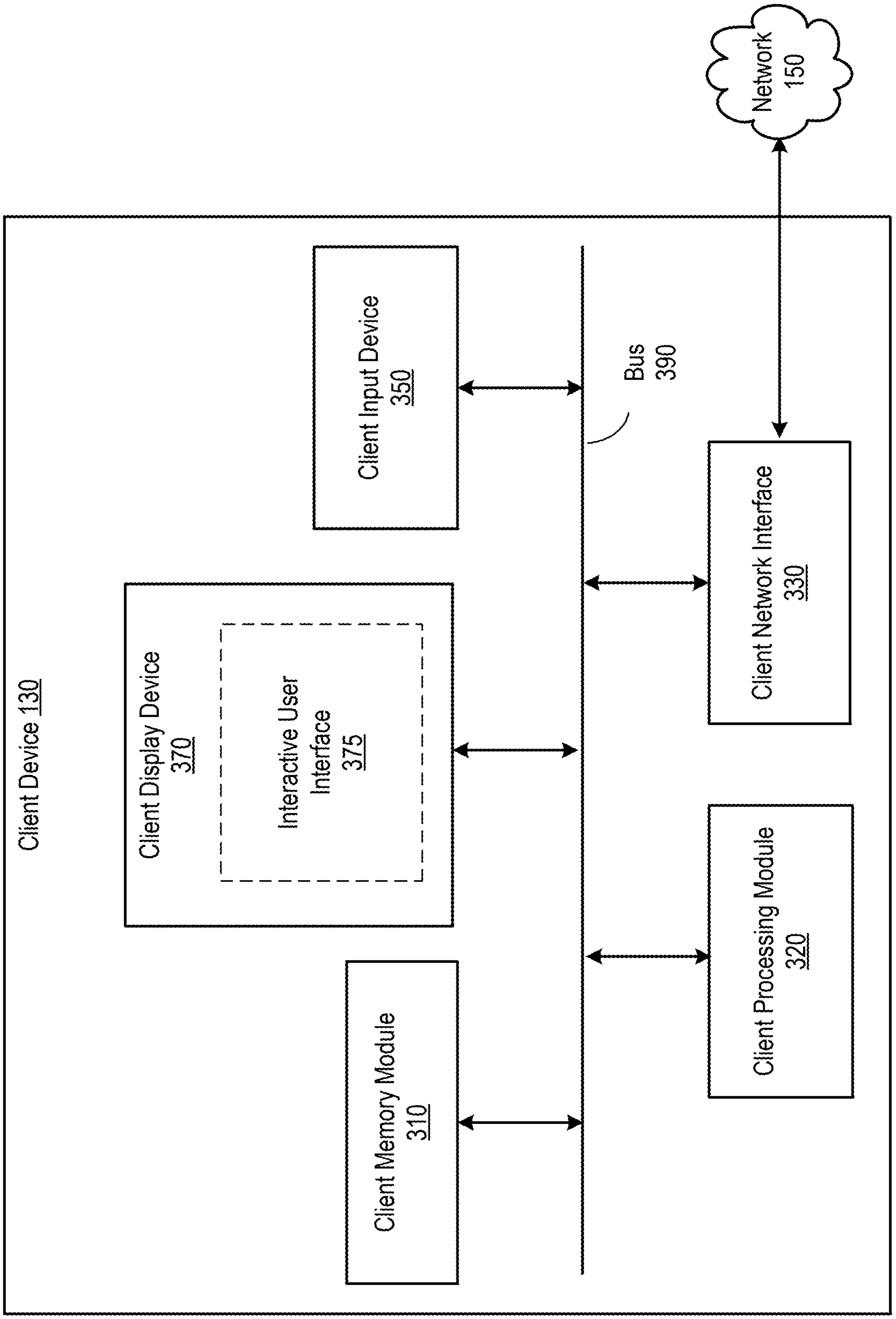
FIGS. 3A-3B are schematic block diagrams of a subsystem of a client device in accordance with various embodiments.

As illustrated in FIG. 3A, a given client device can be implemented via: one or more client processing modules 320; one or more client memory modules 310; one or more client network interfaces 330; one or more client display devices 370; and/or one or more client input devices 350, communicating via bus 390. The one or more network interfaces 330 can be operable to send and/or receive data via the network 150 and/or via any other communication system. Bus 390 can facilitate communication of data between the: one or more client processing modules 320; one or more client memory modules 310; one or more client network interfaces 330; one or more client display devices 370; and/or one or more client input devices 350. One or more client devices 130 can be implemented as: a computer, a laptop computer, a desktop computer, a mobile device, a cellular phone, a tablet, a smart device, a wearable device, and/or any other computing device.

The client display device 370 can be operable to display one or more views of an interactive user interface 375. Interactive user interface 375 can be implemented as a graphical user interface and/or can present prompts and/or information as described herein, and/or can facilitate user selection and/or user entered text. For example, client display device 370 can be implemented via at least one touchscreen, at least one monitor, at least one screen, and/or at least one other display device. In some embodiments, client device 130 is implemented to convey some or all information and/or prompts as audio data, for example, via at least one speaker of the client device 130.

The client input device 350 can be operable to collect user input, for example, in response to one or more prompts presented via interactive user interface 375. For example, client input device 350 can be implemented via at least one keyboard, at least one touchscreen, at least one mouse, at least one knob or button, at least one microphone, at least one camera, at least one interface to one or more memory drives storing document files, and/or at least one other input device that collects data utilized as user input.

The client memory module 310 can include memory that stores operational instructions that, when executed by the one or more client processing modules 320, cause the corresponding client device 130 to execute some or all of the functionality described herein. For example, the operational instructions, when executed by the one or more client processing modules 320, can cause the one or more client processing modules 320 to utilize network interface 330 to receive data from the immigration assistance system 100 via network 150. As another example, the operational instructions, when executed by the one or more client processing modules 320, can cause the corresponding client display device 370 to display information and/or prompts via interactive user interface 375 in one or more views, for example, based on instructions, information and/or prompts included in the data received from the immigration assistance system 100. As another example, the operational instructions, when executed by the one or more client processing modules 320, can cause the one or more client processing modules 320 to generate data based on user input to client input device 350, for example, as response data and/or upload data for a corresponding prompt displayed via interactive user interface 375. As another example, the operational instructions, when executed by the one or more client processing modules 320, can cause the one or more client processing modules 320 to utilize network interface 330 to send data generated by client input device 350, for example, to the immigration assistance system 100 via network 150.

Figure 3B:
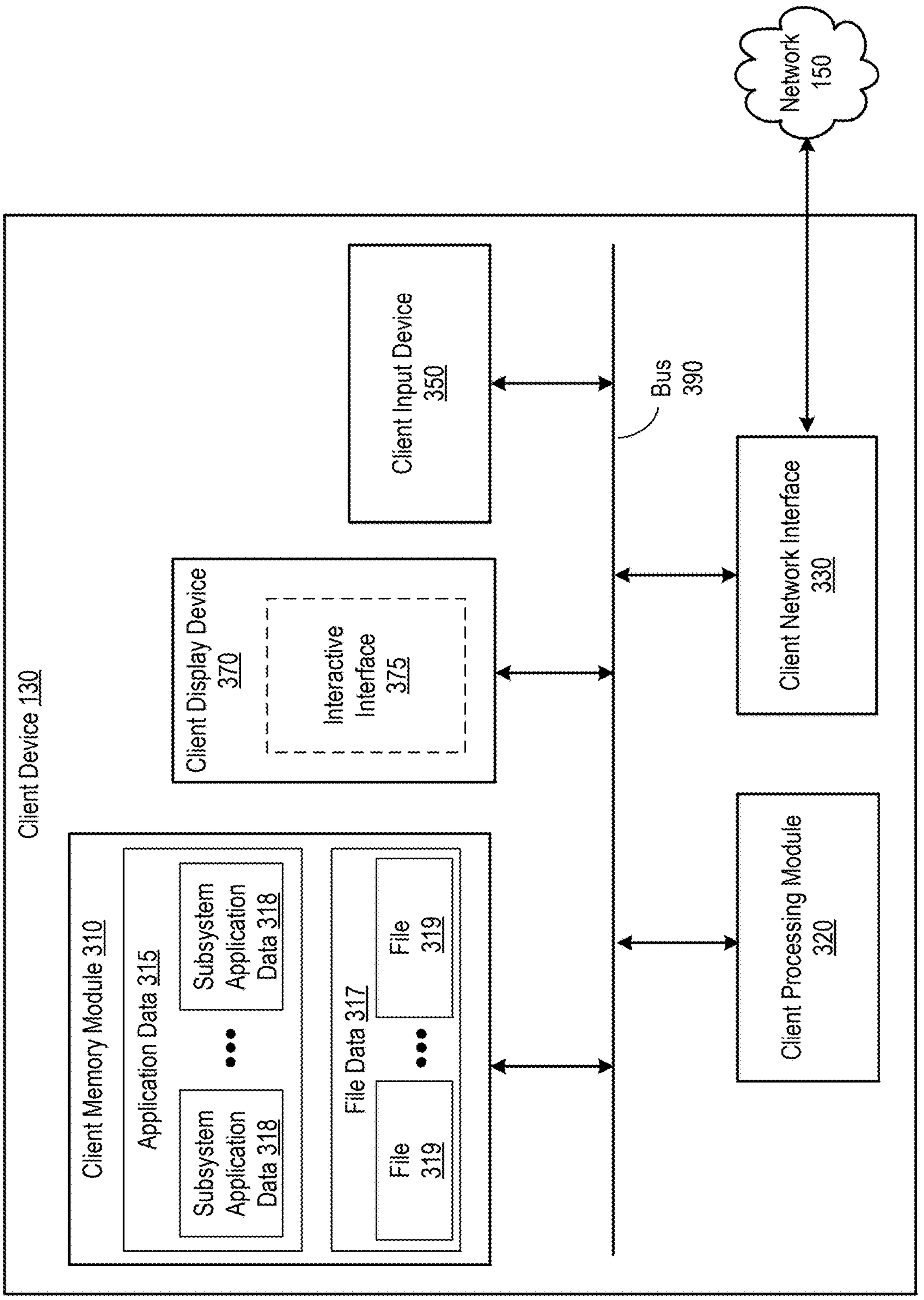

As illustrated in FIG. 3B, the memory module 310 can optionally store application data 315 corresponding to the immigration assistance system 100. The application data, when executed by the client device 130, can cause the client device 130 to perform some or all functionality described herein. The application data 315 can include some or all of the operational instructions that cause the client device 130 to perform some or all of its functionality. The application data 315 can include prompts and/or information for display via interactive user interface 375. The application data 315 can indicate one or more functions for execution by the client device 130, such as one or more function entries 175. The application data 315 can store one or more subsystem application data 318 corresponding to one or more subsystems 101, which can cause the client device to perform functionality in conjunction with the one or more subsystems 101.

In some embodiments, the application data 315, when executed by the client device 130, can cause the client device 130 to perform some or all functionality of one or more subsystems 101 described herein. For example, a client device 130 can be utilized to implement one or more subsystems 101, where some or all functionality of a given subsystem 101 is performed via the one or more client processing modules 320.

The application data 315 can be received from the immigration assistance system 100, server system associated with the immigration assistance system 100. The application data 315 can alternatively be received from an application marketplace based on the application marketplace receiving the application data from the immigration assistance system 100.

Alternatively or in addition to storing and executing application data to perform its functionality, the client device 130 can interact with immigration assistance system 100 via a browser application and/or via a webpage, for example, hosted by a server system of the immigration assistance system 100. For example, prompts are displayed via interactive user interface 375 based on display of this webpage via execution of the browser application.

Alternatively or in addition to storing and executing application data and/or interacting with a browser application and/or webpage, the client device can receive machine executable instructions, for example, in data 51 received from the immigration assistance system 100 and/or computing system 10 (e.g. in conjunction with downloading a corresponding application for execution and/or in conjunction with visiting and interacting with a particular website). As a particular example, the machine executable instructions include coded instructions, for example, included in corresponding Hyper Text Markup Language (HTML) data, JavaScript data, and/or other coded data received from the immigration assistance system 100 and/or computing system 10, for example, in conjunction with communicating with a corresponding server system via requests such as Hyper Text Transfer Protocol (HTTP) requests generated and transmitted by the computing device and extraction of corresponding machine executable instructions in HTTP responses received by the computing device, for example, from the immigration assistance system 100 and/or computing system 10. For example, the machine executable instructions are generated by computing system 10 to include particular digital image data for display via the display device of a corresponding computing device 13 to which the machine executable instructions are transmitted, for example, to indicate a particular set of prompts for display, particular digital image data for display, particular digitally encoded document files and/or other data for display as described herein. Different machine executable instructions can be generated for and/or transmitted to a given computing device 13 over time for execution (e.g. to render display of different digital display data by the computing device 13 over time and/or to render execution of different functionality by the computing device 13 over time), for example, in response to different communications (e.g. responses, document files, etc.) generated by and/or received from the given computing device 13 over time. Same or different machine executable instructions can be generated for and/or transmitted to multiple different computing devices 13 for execution (e.g. to render display of same or different digital display data by the multiple different computing devices 13 and/or to render execution of same or different functionality by the multiple different computing devices 13). For example, different machine executable instructions can be generated for and/or transmitted to different computing devices 13 for execution (e.g. to render display of same or different digital display data by the multiple different computing devices 13 and/or to render execution of same or different functionality by the multiple different computing devices 13)), for example, in response to different communications generated by and/or received from the multiple different computing devices 13 (e.g. based on the different computing devices generating and sending different responses, document files, etc. in response to executing the same or different prior machine executable instructions).

As illustrated in FIG. 3B, the one or more memory modules 310 of a client device 130 can optionally store and/or access file data 317 that includes a plurality of files 319. For example, the files 319 are stored in conjunction with a file storage system. One or more files 319 can include image data and/or in accordance with various file formats such as: a portable document format (PDF), a Joint Photographic Experts Group (JPEG) format, a JPEG2000 format, a portable network graphic (PNG) format, other image file formats text file formats, document file formats, and/or other file formats. Data sent by the client device 130 to the immigration assistance system 100 can include raw and/or processed files 319, for example, in response to a document upload prompt displayed via the interactive user interface 375. Files 319 received from a client device 130 by the immigration assistance system 100 can be: further processed by immigration assistance system 100; stored by immigration assistance system 100, for example, in a user account for the corresponding user; sent to a government server system in conjunction with submission of an immigration application; and/or otherwise processed.

Figure 3C:
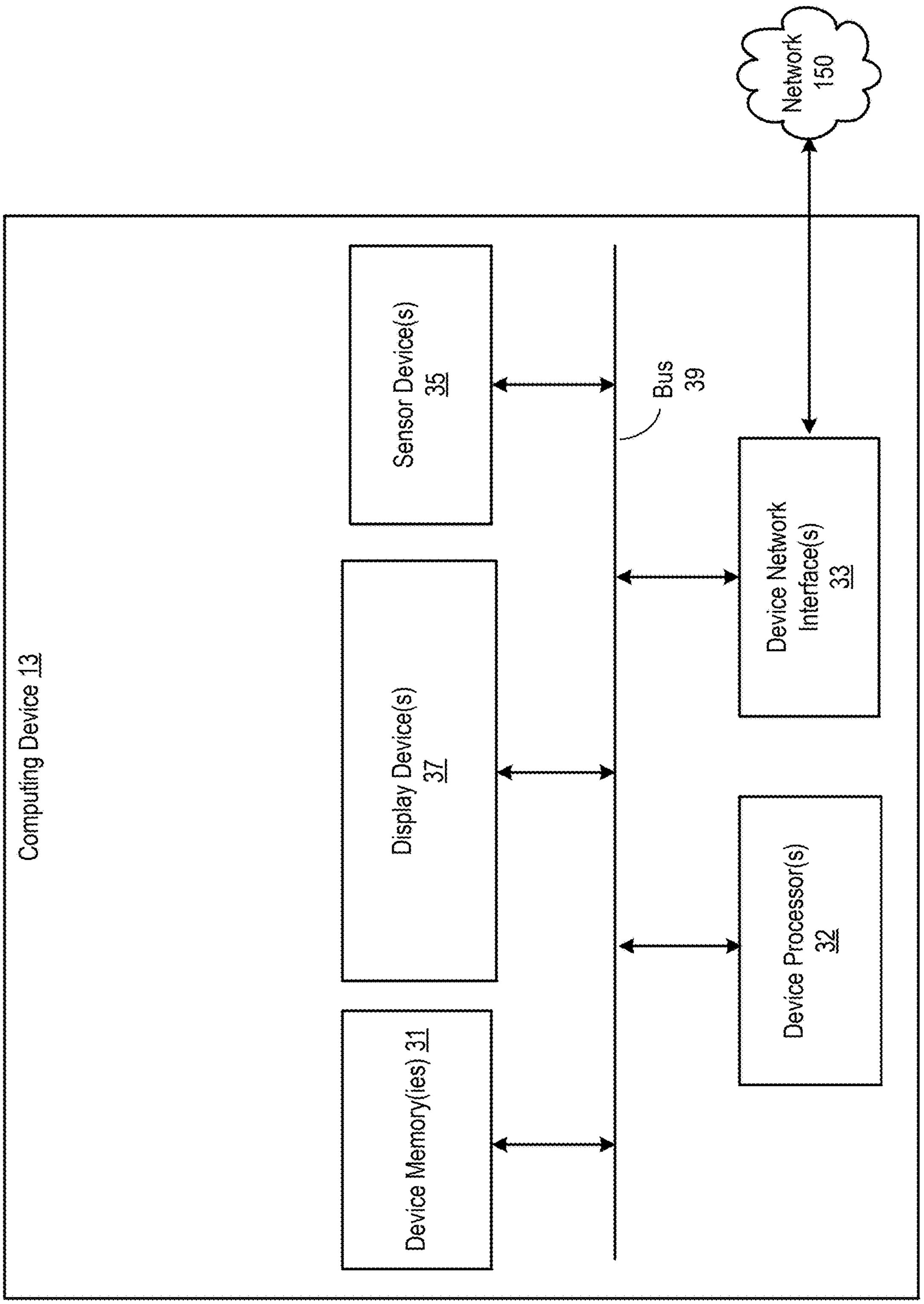
FIGS. 3C-3D are schematic block diagrams of a computing device in accordance with various embodiments.
Figure 3D:
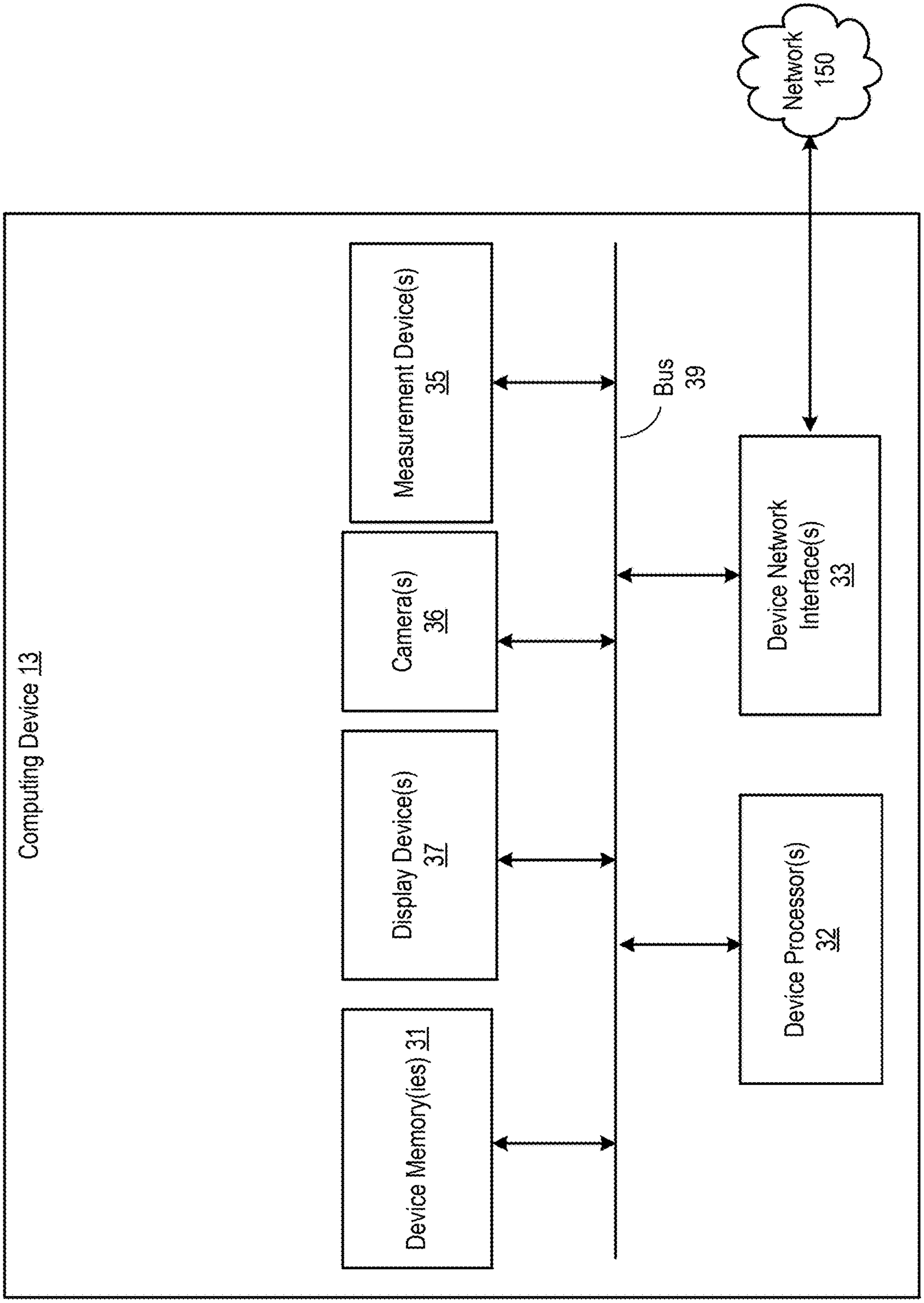

As illustrated in FIG. 3C, a given computing device 13 can be implemented via: one or more devices processors 32; one or more device memories 31; one or more device network interfaces 33; one or more display devices 37; and/or one or more sensor devices 35, communicating via bus 39. As illustrated in FIG. 3D, a given computing device 13 can optionally further include at least one camera 36 and/or other image capture device operable to capture image data.

One or more computing devices 13 can be implemented as: a computer, a laptop computer, a desktop computer, a mobile device, a cellular phone, a tablet, a smart device, a wearable device, and/or any other computing device.

The one more processors 32 can implement operation of any systems and/or modules described herein, and/or can implement execution of any steps, processes, operations, methods and/or functions described herein. The one or more processors 32 can optionally include at least one processing device is implemented in accordance with a multi-core architecture and includes a corresponding plurality of processing cores, where some or all steps, processes, operations, methods and/or functions described herein can be implemented via multiple ones of the plurality of processing cores of at least one processing device contemporaneously each performing different portions of a given step, process, operation, method and/or function contemporaneously and/or in parallel.

In various embodiments, some or all of the one more processors 32 implements at least one integrated circuit unit. For example, the at least one integrated circuit unit can include at least one graphics processing unit, at least one field programmable gate array, at least one application-specific integrated circuit, and/or at least one AI chip. The at least one integrated circuit unit can be operable to perform a plurality of parallelized operations contemporaneously. In various embodiments, one or more of the processes, operation, steps, and/or functionality described herein can be performed as a plurality of parallelized sub-tasks as a plurality of parallelized processes, for example, executed in parallel via the at least one integrated circuit unit. In various embodiments, multiple ones of the processes, operation, steps, and/or functionality described herein can be performed in parallel as a plurality of parallelized processes, for example, executed in parallel via the at least one integrated circuit unit.

The one or devices processors 32; one or more device memories 31; one or more device network interfaces 33; one or more display devices 37; one or more sensor devices 35, and/or bus 39 of FIG. 3C and/or 3C can be implemented via implementing some or all features and/or functionality of the one or more client processing modules 320; one or more client memory modules 310; one or more client network interfaces 330; one or more client display devices 370; one or more client input devices 350, and/or bus 390 of FIG. 3A and/or 3B, respectively, and/or via any embodiment of the one or more processing modules 220, the one or more client processing modules 320; one or more client memory modules 310; one or more client network interfaces 330; one or more client display devices 370; one or more client input devices 350, and/or bus 390 described herein.

Figure 3E:
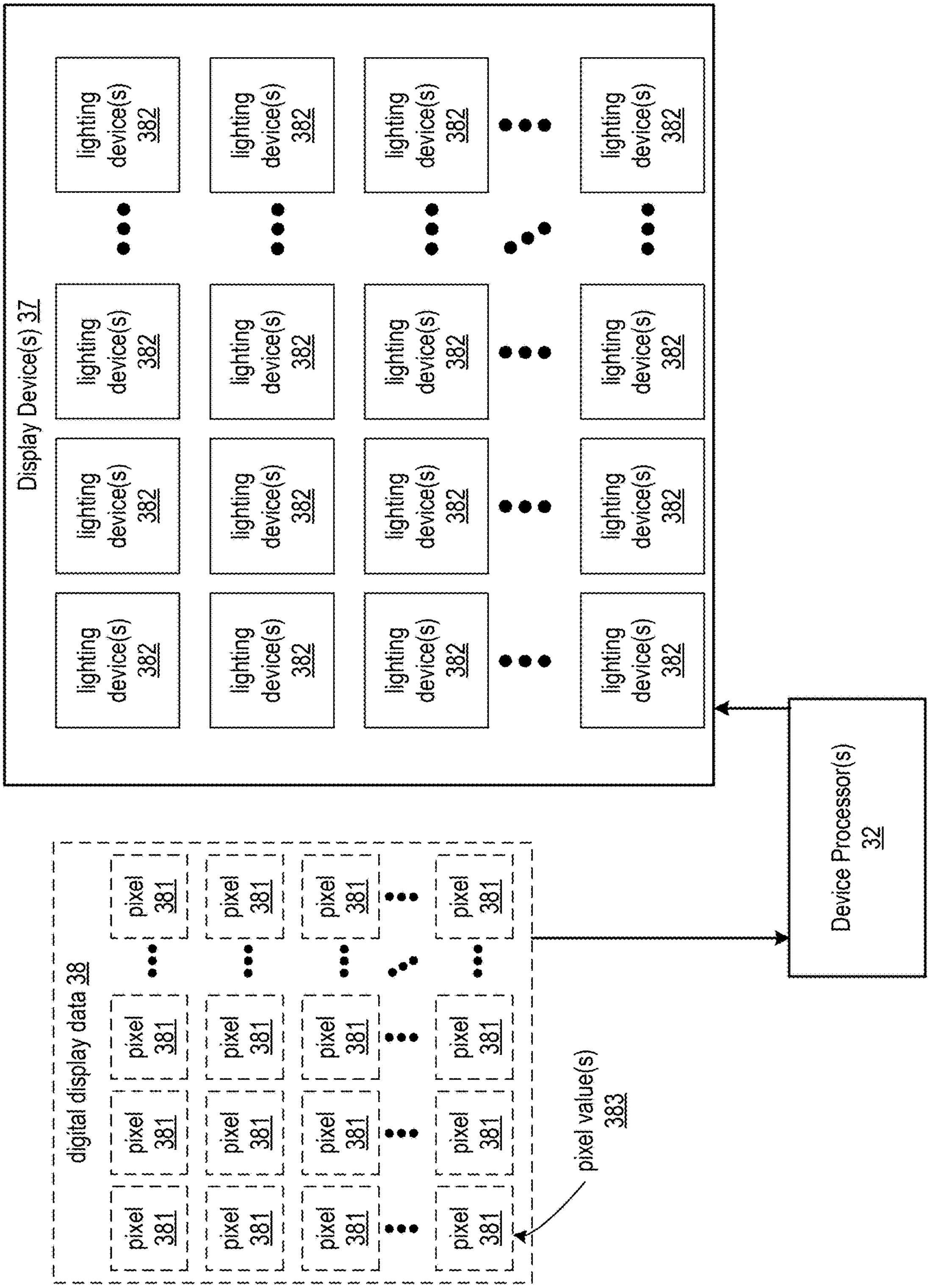
FIG. 3E is a schematic block diagram of a display device in accordance with various embodiments.

FIG. 3E presents an embodiment of one or more display devices 37 of computing device 13 that includes a plurality of lighting devices 382. Some or all features and/or functionality of display device 37 of FIG. 3E can implement any embodiment of client display device 370 or any other display device described herein. Some or all features and/or functionality of digital display data 38 of FIG. 3E can implement any embodiment of digital display data, image data, and/or interactive interface 375 described herein.

In some embodiment, the output of each of the plurality of lighting devices 382 can be configured (e.g. via device processor(s) 32) to display given digital display data 38 at a given time (e.g. different digital display data 38 is displayed at different times based on reconfiguring the output of lighting devices 382 as a function of values of at least one two-dimensional array of pixel values 381 accordingly). For example, the processor 32 can control, or otherwise automatically configure, the output (e.g. voltage, intensity, color, etc.) of each lighting device to cause the display device 37 to visually convey digital display data 38 accordingly.

In some embodiments, the plurality of lighting devices are arranged in a grid having a plurality of rows and columns. In some embodiments, the plurality of lighting devices are implemented via a plurality of light emitting diodes (LEDs) of an LED display, for example, each having red, green, and/or blue LEDs grouped together in a same/similar position in the grid, having a collective set of outputs configured to render display of a corresponding set of red, green, and blue pixel values of a corresponding pixel 382 in digital image data 381. In some embodiments, the plurality of lighting devices are implemented to configure images displayed via an LCD display, for example, to configure volage applied to each of a plurality of pixels across a liquid crystal layer of the display device, for example, that are backlit by at least one backlighting device. 381. In some embodiments, the plurality of lighting devices are implemented to configure images displayed via an OLED and/or QLED display, for example, to configure lighting generated by each of a plurality of pixels of the OLED and/or QLED display.

The position of each pixel 381 in at least one corresponding two dimensional array relative to other pixels 381 can be denoted based on each pixel having a corresponding index (e.g. a row index value and/or a corresponding index value) in the corresponding two-dimensional array (and/or in multiple aligned two-dimensional arrays, such as three arrays corresponding to red, green, and blue having a same number of rows and columns indicating each indicating the value assigned to red, green, or blue, respectively), where each pixel 381 has one or more pixel values 383 (e.g. multiple pixel values 383 correspond to a set of values for each of a set of multiple aligned two-dimensional arrays, such as a red value, a green value, and a blue value). One or more pixels can correspond to one or more lighting devices 382 in a corresponding position with respect to other lighting devices in a corresponding two-dimensional arrangement based on their respective index values. As a particular example, the pixel values 383 of the bottom right pixel (e.g. in the last row and last column) of the digital display data 38 is processed to dictate the configuration of lighting device(s) 382 at the bottom right (e.g. in the last row and last column) of the display device, while the pixel values 383 of the top left pixel (e.g. in the first row and first column) of the digital display data 38 is processed to dictate the configuration of output of lighting device(s) 382 at the top left (e.g. in the first row and first column) of the display device. In the case where there are more pixels than corresponding lighting devices, multiple pixels can map to a given lighting device and can all be processed (e.g. have values averaged together) to dictate the respective output of this given lighting device, and/or can be processed to render digital display data having a same number of rows and columns as the rows and columns of lighting devices of the display device.

The digital display data 38 can include static image data and/or a stream of different digital display data 38 (e.g. corresponding to video data, an animation, and/or changes to static digital image data presented over time), where digital display data 38 displayed by display devices 37 can change over time, for example, in response to user input and/or in response to receiving updated digital image data from computing system 10 and/or another system generating and/or transmitting digital display data to the computing device for display.

In some embodiments, some or all of the one or more sensor devices 35 operate as client input device(s) 350 based on collecting measurement values corresponding to user input (e.g. measurement values denoting particular keyboard, mouse, and/or touchscreen input, etc.) to sense respective user input, for example, as the user interacts with interactive user interface 375 (e.g. measurement values are collected by the sensor device(s) 35 contemporaneously with respective digital display data being displayed via display device(s) 37, indicating user responses to respective prompts displayed via the user interface and/or user selections to trigger particular actions (e.g. indicating corresponding text entered by the user; indicating one or more selections by the user from a discrete set of options presented to the user in the digital display data; indicating instructions/selections by the user to cause the computing device to generate, upload, and/or transmit data such as digitally encoded document files, image files, and/or responses, etc.). As a particular example, the measurement values indicate user clicking/touching/selection of a two-dimensional position spatially relative to portions of the interactive user interface 375 conveyed via digital display data 38 corresponding to particular buttons/check boxes/other interactable elements triggering particular actions. As another particular example, the measurement values indicate a series of different physical and/or virtual keyboard buttons pressed and/or selected at a corresponding plurality of times (e.g. after selection of a particular field and/or other selectable portion of the interactive user interface in a particular position spatially relative to other fields and/or interactable elements), where a mapping of buttons to characters indicates which set of characters are selected, and/or where timestamps of these presses and/or selection indicate an ordering of the selection of such buttons which can be processed to render an ordered set of characters entered by the user. In some embodiments, the processing of measurement values causes new digital display data to be generated (e.g. to indicate responses entered via user input and/or to change based on a selection to perform a respective action).

In some embodiments, some or all of the one or more sensor devices 35 collect other sensor data. For example, the one or more sensor devices 35 includes at least one antenna, at least one GPS receiver, at least one accelerometer, at least one gyroscope, at least one temperature sensor, at least one light sensor, at least one NFC sensor, at least one proximity sensor, at least one heart rate sensor, and/or at least one other device operable to compute measurements via collecting sensor data. In some embodiments, any data generated by and/or transmitted by the client device can include data collected from other sensors (e.g. GPS data or other geolocation data, etc.), where any data received, processed, and/or stored by the computing system 10 can include any such sensor data collected and transmitted by computing device 13. Any data generated by computing system 10 can be generated as a function of processing the values of such sensor data received from a respective computing device 13.

Figures 4A, 4B, 4C:
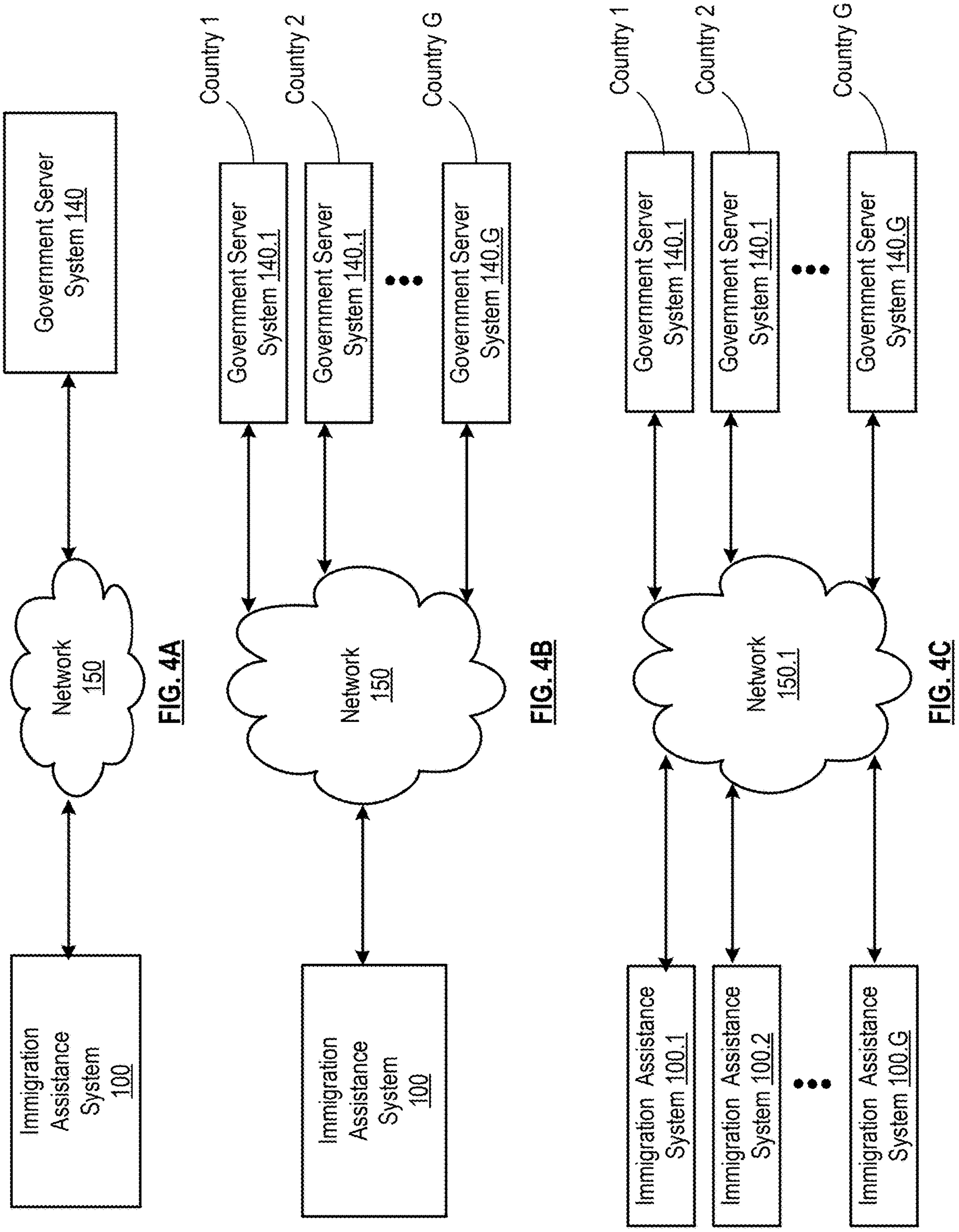
FIGS. 4A-4B are schematic block diagrams illustrating communication between an immigration assistance system and one or more government server systems in accordance with various embodiments.
FIG. 4C is a schematic block diagrams illustrating communication between a plurality of immigration assistance systems and a plurality of government server systems in accordance with various embodiments.

FIGS. 4A-4C illustrate embodiments of an immigration assistance system 100 that communicates with a government server system 140 via the same or different network 150 of FIG. 1. For example, the immigration assistance system 100 can communicate with one or more government server systems 140 corresponding to government entities of one or more particular countries 1-G to: receive application requirement data indicating parameters and/or requirements for immigration applications; send various application materials for submission in conjunction with submission of immigration applications for one or more of the users 1-N for immigration to the particular country; receive submission confirmation data regarding success or failure of the submission of the immigration applications; receive application acceptance data indicating status of the immigration application and/or whether or not the immigration application has been accepted by the government entity; and/or send or receive other information.

The immigration assistance system 100 can facilitate some or all of the immigration assistance discussed herein only for one given country, for example, where its users 1-N are applying to immigrate to, are in the process of immigrating to, and/or have already immigrated to the one given country, and not to other countries. As illustrated in FIG. 4A the immigration assistance system 100 can be configured to communicate with a government server system 140 of one given country in such embodiments. For example, the country can be Canada, or any other country that accepts immigration applications. Some or all servers and/or other resources of the immigration assistance system 100 can optionally be stored in the given country. Some or all servers and/or other resources of the immigration assistance system 100 can optionally be stored in one or more different countries, such as one or more countries from which corresponding users are immigrating.

A government server system 140 can be completely distinct from the immigration assistance system 100 and/or can be implemented as an independent set of processing and/or memory devices from the immigration assistance system 100. For example, the immigration assistance system 100 is implemented to perform services by a third party corporate entity that is independent from the corresponding government entity and/or that has a partnership with the government entity.

Alternatively or in addition, a government server system 140 can implement some or all subsystems 101 of the immigration assistance system 100 and/or can be implemented as a shared set of processing and/or memory devices with the immigration assistance system 100. For example, the immigration assistance system 100 is implemented to perform services by the government entity itself and/or is implemented by a third party entity that has a partnership with the government entity.

The immigration assistance system 100 can alternatively or additionally facilitate some or all of the immigration assistance discussed herein for a set of different countries 1-G, for example, where each of its users 1-N are applying to immigrate to, are in the process of immigrating to, and/or have already immigrated to one or more of this set of different countries 1-G, and not to other countries that are not included in this set of different countries 1-G.

As illustrated in FIG. 4B the immigration assistance system 100 be configured to communicate with multiple government server system 140 corresponding to a set of multiple countries 1-G in such embodiments. For example, one of the set of countries can include Canada, or any other countries that accepts immigration applications. Some or all servers and/or other resources of the immigration assistance system 100 can optionally be stored in one or more of the set of countries 1-G. Some or all servers and/or other resources of the immigration assistance system 100 can optionally be stored in one or more different countries, such as one or more countries from which corresponding users are immigrating.

Alternatively or in addition, a plurality of distinct immigration assistance systems 100.1-100.G can each facilitate some or all of the immigration assistance discussed herein for a set of different countries 1-G. For example, a first immigration assistance systems 100.1 services its own set of $N_1$ users that are applying to immigrate to, are in the process of immigrating to, and/or have already immigrated to country 1, while a second immigration assistance systems 100.2 services its own set of $N_2$ users that are applying to immigrate to, are in the process of immigrating to, and/or have already immigrated to country 2. The set of $N_1$ users and the set of $N_2$ users can be mutually exclusive.

As illustrated in FIG. 4C, each of a set of immigration assistance systems 100.1-100.G can each be configured to communicate with one government server system 140 of the corresponding country in the set of countries 1-G in such embodiments. For example, one of the set of countries can include Canada, or any other countries that accepts immigration applications. Some or all servers and/or other resources of each immigration assistance system 100 can optionally be stored in the corresponding one of the set of countries 1-G.

In other embodiments, the immigration assistance system 100 performs its functionality without communicating with a government server system 140. For example, users 1-N are responsible for submitting immigration applications themselves, based on assistance facilitated via communication with immigration assistance system 100, via sending of immigration application materials from client device 130 to the government server system 140. As another example, the immigration assistance system 100 provides other assistance that does not require communication with the government server system 140 such as assistance for users who have already submitted immigration applications and/or have already immigrated to the corresponding country.

FIGS. 5A-5H illustrate embodiments of information stored in accordance with a user account 165 a user of the immigration assistance system 100. For example, some or all users of the immigration assistance system 100 can each have exactly one user account 165, where the user account 165 for a given user stores some or all of the corresponding information discussed in conjunction with FIGS. 5A-5H for that given user. The user account 165 can be stored as one or more entries of one or more databases and/or other memory of user account database 162. Some or all information of user account 165 for a given user can optionally be stored and/or updated locally by the client device 130 of the given user.

Alternatively or in addition to being stored by the immigration assistance system 100 in a corresponding user account 165, any of the information discussed in conjunction with FIGS. 5A-5H can be: otherwise mapped to and/or linked to the user in memory resources accessible by the immigration assistance system 100; automatically generated by the immigration assistance system 100; automatically generated by one or more client devices 130 of the corresponding user; received by the immigration assistance system 100 via network 150, for example, from a client device 130, a government server system 140, another server system of an official entity; processed by the immigration assistance system 100 to generate other information; utilized as input to one or more functions of function library 172 performed by the immigration assistance system 100 and/or the client device 130; generated as output of one or more functions of function library 172 performed by the immigration assistance system 100 and/or the client device 130; configured by the corresponding user based on user input to a corresponding client device 130; configured by an administrator of the immigration assistance system 100; and/or otherwise received, accessed, processed, generated, and/or determined by the immigration assistance system 100 and/or a client device 130.

In some embodiments, some or all information illustrated and/or discussed in conjunction with FIGS. 5A-5H is not stored in user accounts 165 for some or all users. In some embodiments, additional data not discussed in conjunction with FIGS. 5A-5H that is received, accessed, processed, generated, and/or determined by the immigration assistance system 100 and/or a client device 130 discussed in conjunction with other Figures described herein can optionally be stored in in user accounts 165 for some or all corresponding users and/or can be later accessed via access to corresponding user accounts 165.

Figure 5A:
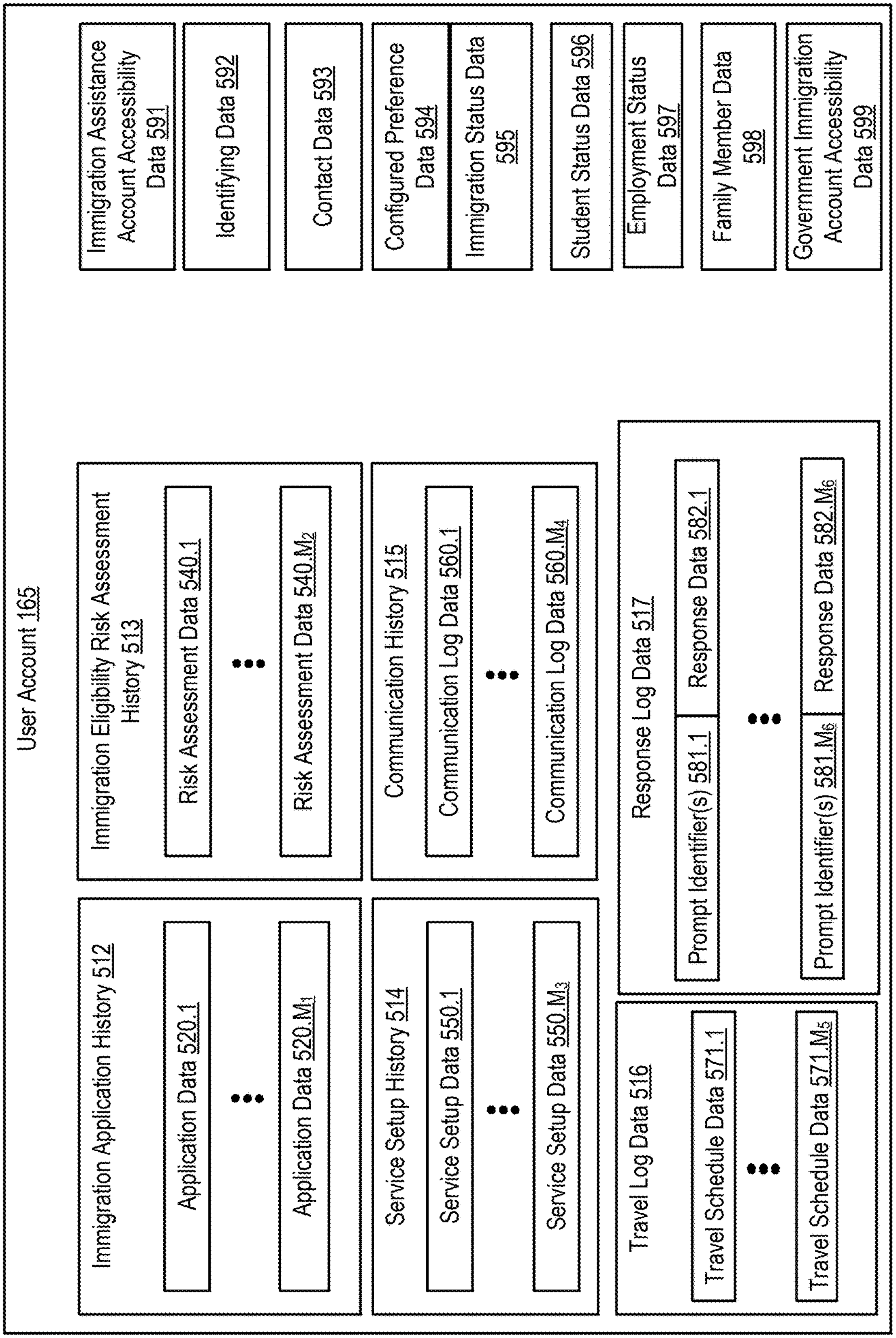
FIG. 5A illustrates data included in and/or indicated by a user account in accordance with various embodiments.

FIG. 5A illustrates an embodiment of a user account 165 for a corresponding user of the immigration assistance system 100. As the immigration assistance system 100 receives data, such as responses to questions and/or uploaded documents, from client devices 130 over time, this data can be utilized to populate and/or update user accounts 165 for a corresponding user. For example, a given user account 165 corresponds to a user of the immigration assistance system 100, such as a single person that is currently applying to immigrate, has previously applied to immigrated, is currently immigrating, has previously immigrated, and/or interacts with one or more client devices 130 to send data to and/or receive data from immigration assistance system 100.

A user account 165 can include immigration application history 512, which can include one or more application data 520.1-520.$M_1$. Each application data 520 can correspond to a single immigration application that is currently in the process of being prepared, that is complete, that has already been submitted, and/or that has been processed via a government entity to render immigration for the corresponding user to be granted and/or refused.

A given user account can have exactly one application data 520 for a single incomplete, complete, submitted, granted, and/or refused immigration application for the corresponding user. Each application data 520 can include information based on: data generated by the immigration assistance system 100, data received from one or more client devices 130 for the corresponding user, and/or information received from a government server system 140 regarding the corresponding immigration application. Information included in individual application data 520 is discussed in further detail in conjunction with FIGS. 5B-5E.

A given user account can have multiple application data 520, for example, if the corresponding user has applied to immigrate multiple times under same or different types of immigration status to same or different countries. For example, multiple application data 520 can correspond to multiple attempts to immigrate for the first time, where some or all of the corresponding applications were refused. As another example, multiple application data 520 can correspond to multiple immigrations to different countries. As another example, multiple application data 520 can correspond to various immigration extensions and/or status changes over time for a user that immigrated to a given country, where new application data is generated and submitted for the user to extend or change status of the immigration. A given user can optionally have no application data 520 based on not ever starting and/or completing an immigration application via immigration assistance system 100.

Alternatively or in addition, a user account 165 can include immigration eligibility risk assessment history 513, which can include one or more risk assessment data 540.1-540.$M_2$. Each risk assessment data 540 can correspond to data generated via a single risk assessment for the given user, for example, by implementing the immigration eligibility risk assessment system 102. Each risk assessment data 540 can include information based on: data generated by the immigration assistance system 100 and/or data received from one or more client devices 130 for the corresponding user. Information included in individual risk assessment data 540 is discussed in further detail in conjunction with FIG. 5F.

A given user can have exactly one more risk assessment data 540 based on risk assessment data 540 being generated only once for the given user. A given user can have multiple risk assessment data 540 based on risk assessment data 540 being generated multiple times for the given user, for example, based on the user's answers to one or more risk assessment questions changing over time and/or being revised by the user, based on a risk assessment function utilized to generate risk assessment data 540 being updated over time, and/or based on the user electing to retake the immigration eligibility risk assessment. A given user can optionally have no risk assessment data 540 based on not ever completing a risk assessment via immigration assistance system 100.

Alternatively or in addition, a user account 165 can include service setup history 514, which can include one or more service setup data 550.1-550.$M_3$. Each service setup data 550 can correspond to data generated in conjunction with setup of a corresponding service for the corresponding user, for example, by implementing the immigration applicant service setup system 118. Each service setup data 550 can include information based on: data generated by the immigration assistance system 100 and/or data received from one or more client devices 130 for the corresponding user. Information included in individual service setup data 550 is discussed in further detail in conjunction with FIG. 5G.

A given user can have any number of service setup data 550 based on a number of different services that are set up for the user in conjunction with their immigration to a given country and/or multiple immigrations to one or more different countries. A given user can optionally have no service setup data 550 based on no services being set up for the user via immigration assistance system 100.

Alternatively or in addition, a user account 165 can include communication history 515, which can include one or more communication log data 560.1-560.$M_4$. Each communication log data 560 can correspond to data generated in conjunction with initiating and/or facilitating communication between the corresponding user and an assistance entity, for example, by implementing the immigration assistance communication system 120. Each communication log data 560 can include information based on: data generated by the immigration assistance system 100, data received from one or more client devices 130 for the corresponding user, and/or data received from an assistance entity in conjunction with communicating with the corresponding user. Information included in individual communication log data 560 is discussed in further detail in conjunction with FIG. 5H.

A given user can have any number of service setup data 550 based on a number of different conversations that are initiated and/or facilitated for the user with one or more assistance entities in conjunction with their immigration to a given country and/or multiple immigrations to one or more different countries. A given user can optionally have no communication log data 560 based on no communications with an assistance entity being initiated and/or facilitated for the user via immigration assistance system 100.

Alternatively or in addition, a user account 165 can include travel log data 516, which can include one or more travel schedule data 571.1-571.$M_5$. Each travel schedule data 571 can include data regarding travel into, within, and/or out of country to which the user immigrated.

Each travel schedule data 571 can as: dates of travel, date of entry into the country to which the user immigrated, date of exit from the into the country to which the user immigrated, ticketing and/or itinerary information for one or more scheduled modes of transportation during the travel such as: flight schedule data, train schedule data, nautical schedule data, bus schedule data, rental car data, and/or other transportation data; address and/or confirmation information for one or more scheduled locations of stay, such as: one or more addresses of homes in which the user is staying during travel, a hotel and/or hostel address, and/or other location information regarding overnight stay by the user; emergency contact data; contact data for the user while they are traveling; contact information for legal services during the user's travel; and/or other information regarding the user's travel.

Each travel schedule data 571 can include information based on: data generated by the immigration assistance system 100, data received from one or more client devices 130 for the corresponding user, and/or data received from a travel entity such as a travel planning service, a transportation service, and/or a lodging service assistance entity in conjunction with communicating with the corresponding user. Information included in individual communication log data 560 is discussed in further detail in conjunction with FIG. 5H.

A given user can have any number of travel schedule data 571 based on a number of different trips that are planned and/or have been performed by the user. The given user can have travel schedule data 571 regarding a first entry into the country in conjunction with a start of a corresponding immigration status. The given user can have travel schedule data 571 regarding a final exit from the country in conjunction with an elapsing of a corresponding immigration status. The given user can have travel schedule data 571 regarding one or more trips from and back into the country within a timeframe corresponding to their immigration status. A given user can optionally have no additional travel schedule data 571 based on not travelling from the country during this timeframe.

Alternatively or in addition, a user account 165 can include response log data 517, which can include one or more response data 582. Each response data 582 can correspond to data received for the corresponding user from a client device 130 in response to a displayed via interactive user interface 375 by display device 370 of the client device. Each response data 582 can be mapped to a corresponding prompt identifier, such as a name or unique identifier code, indicating the corresponding prompt displayed via interactive user interface 375 that prompted the user to enter and/or select the corresponding response data 582.

Each response data 582 can correspond to a: a single, selected one of a discrete set of response options presented in conjunction with the corresponding prompt; multiple selected ones of a discrete set of response options presented in conjunction with the corresponding prompt; textual data entered by the user, for example, via a keyboard or microphone, in response to the corresponding prompt, for example, in a text box presented in conjunction with the corresponding prompt; one or more document files, such as files 319, uploaded by the user in conjunction with the corresponding prompt, for example, based on the prompt corresponding to a document upload prompt; and/or any other data received from the user in response to one or more prompts.

Alternatively or in addition, a user account 165 can include immigration assistance account accessibility data 591, such as: a username and/or password associated with the user; other user credentials that are utilized to facilitate login to the user account by the corresponding user and/or to prevent other people from maliciously accessing the given user's user account 165; account recovery information; two step authentication credentials and/or information; payment information such as credit card information utilized to facilitate the user's payment for use of services provided by one or more subsystems 101; and/or other information utilized to facilitate login to and/or access to user account 165. The immigration assistance account accessibility data 591 can be based on: data generated by the immigration assistance system 100 and/or data received from one or more client devices 130 for the corresponding user.

Some or all population of and/or updates to a given user account 165 can be based on receiving data from a client device 130 in conjunction with login to the user account by the user in conjunction with the immigration assistance account accessibility data 591. For example, new document files are added to application materials for a given immigration application for the user in application data 520 of a particular user account 165 based on a client device 130 sending the document files in conjunction with being logged in to the particular user account 165.

A user that accesses their user account 165 successfully can optionally enter, edit, view and/or view various types of data stored in user account 165. For example, some or all information of user account 165 can be sent to client device 130 for display to the corresponding user via interactive user interface 375. As a particular example, an application status associated with an immigration application is displayed to the user based on the user accessing their user account 165. In some embodiments, some data of user account 165 described herein is stored in conjunction with the corresponding user, but is not viewable, changeable, and/or accessible by the corresponding user.

Alternatively or in addition, a user account 165 can include identifying data 592, such as: the user's name; the user's birthdate; citizenship data indicating one or more countries to which the user is a citizen; the user's national identification number, such as the user's social insurance number or social security number, for one or more countries; the user's driver's license information, the user's passport information, and/or other information that identifies the user. For example, the identifying data 592 can be based on: data generated by the immigration assistance system 100, data received from one or more client devices 130 for the corresponding user, and/or data received from a government server system 140 regarding identification of and/or citizenship status of the user.

Alternatively or in addition, a user account 165 can include contact data 593, such as one or more phone numbers for the user; one or more email addresses for the user; one or more mailing addresses and/or residential addresses for the user; one or more social media handles for the user; one or more messaging handles corresponding to one or more messaging platforms; and/or other contact information. For example, the contact data 593 can be based on: data generated by the immigration assistance system 100, data received from one or more client devices 130 for the corresponding user, and/or data received from a service provider regarding contact of the corresponding user in the country to which the user is immigrating.

The one or more phone numbers can correspond to phone numbers for use in different countries, for example, where a user has a first phone number for the country from which they immigrated and where the user has a second phone number for the country to which they immigrated. In some embodiments, the second phone number was generated in conjunction with generating service setup data 550 to setup cellular service with a cellular provider in the country to which the user is immigrating.

The one or more residential addresses for the user can correspond to residential addresses for the user in different countries, for example, where a user has a first residential address for the country from which they immigrated and where the user has a second residential address for the country to which they immigrated. In some embodiments, the second residential address was generated in conjunction with generating service setup data 550 to set up housing in the country to which the user is immigrating via a housing provider.

The one or more mailing addresses for the user can correspond to mailing addresses for use in different countries, for example, where a user has a first mailing address for the country from which they immigrated and where the user has a second mailing address for the country to which they immigrated. In some embodiments, the second mailing address was generated in conjunction with generating service setup data 550 to setup mailing service in the country to which the user is immigrating, such as a post office box, in cases where the mailing service is not provided by the user's residence in the country to which the user is immigrating.

Alternatively or in addition, the user account 165 can include configured preference data 594, which can be generated based on data received from the client device 130 and can be utilized to: configure features and/or layout of interactive user interface 375; configure notifications sent to the user by the immigration assistance system 100; configure functionality of the immigration assistance system 100 for the user; and/or other configurations by the user in conjunction with interacting with their user account and/or receiving immigration assistance via immigration assistance system 100. For example, the configured preference data 594 can be based on: data generated by the immigration assistance system 100 and/or data received from one or more client devices 130 for the corresponding user.

Alternatively or in addition, the user account 165 can include immigration status data 595 indicating the past or current immigration status for the user to one or more countries. For example, the immigration status data 595 is based on prior submission of one or more immigration applications based on corresponding application data 520. Alternatively or in addition, the immigration status data 595 is based on prior immigration status that was granted to the user independent of and/or prior to the user's interaction with the immigration assistance system 100. The immigration status data 595 can indicate a type of the user's immigration status, such as a working immigration status, a student immigration status, and/or another type of immigration status. The immigration status data 595 can indicate whether or not the user's immigration status is pending. The immigration status data 595 can indicate whether or not the user's immigration status is granted and/or rejected. The immigration status data 595 can indicate a start date and/or end date of the user's immigration status. The immigration status data 595 can indicate restriction data for the user's immigration status, such as restrictions relating to employment, study, and/or travel by the user. For example, the immigration status data 595 can be based on: data generated by the immigration assistance system 100, data received from one or more client devices 130 for the corresponding user, data received from one or more government server systems 140 regarding immigration status of the corresponding user, and/or application data 520 corresponding to the immigration status for the user.

Alternatively or in addition, the user account 165 can include student status data 596 indicating the status of the user as a student of a study program, for example, in the country to which they are immigrating. As used herein, a "study program" can correspond to any program attended by a user at a college, university, language institution, school, or other academic institution, for example, to obtain a corresponding degree and/or certification. For example, the study program can correspond to a four year program to obtain a bachelor's degree at a university in the country to which the user plans to immigrate or has already immigrated. As another example, the study program can correspond to a six month English language program in the country to which the user plans to immigrate or has already immigrated.

The student status data 596 can include identifying information and/or location of the institution to which the user will study in the country, a field and/or type of study program in which the user participates in conjunction with the study program; start and/or end dates of the study program; acceptance data for the user to the institution to which the user intends to study; test scores, GPA data, and/or grades for the user while in the study program, and/or other information regarding the user's status as a student. In some cases, the student status data 596 indicates the corresponding user is not applying for or currently participating in a study program, for example, based on the user instead being employed. For example, the student status data 596 can be based on: data generated by the immigration assistance system 100, data received from one or more client devices 130 for the corresponding user, and/or data received from one or more educational institutions regarding employment of the corresponding user.

Alternatively or in addition, the user account 165 can include employment status data 597 indicating the employment status of the user for example, in the country to which they are immigrating. This can include identifying information and/or location of a company and/or branch at which the user will be employed in the country, a field and/or type of employment in which the user is employed; start and/or end dates of the employment; salary of the employment; and/or other information regarding the user's employment status. In some cases, the employment status data 597 indicates the corresponding user is not applying for employment or currently employed, for example, based on the user instead being a student. For example, the employment status data 597 594 can be based on: data generated by the immigration assistance system 100, data received from one or more client devices 130 for the corresponding user, and/or data received from one or more educational institutions regarding employment of the corresponding user.

Alternatively or in addition, the user account 165 can include family member data 598 indicating the family members of the user. The family member data 598 can include identifiers of other user accounts 165 for the one or more family members, for example, to link users that are in the same family. The family member data 598 can include: identifying data 592 of one or more family members; contact data 593 of one or more family members; immigration status data 595 of one or more family members, student status data 596 of one or more family members; employment status data 597 of one or more family members; and/or other information regarding the one or more family members. The family member data 598 can indicate whether or not each of the one or more family members is immigrating with and/or residing with the user in the country to which the user is immigrating. The family member data 598 can indicate one or more family members that are citizens of and/or current residents of the country to which the user is immigrating. For example, the employment status data 597 594 can be based on: data generated by the immigration assistance system 100, data received from one or more client devices 130 for the corresponding user, and/or data accessed from one or more other user accounts 165 corresponding to the one or more family members.

Alternatively or in addition, the user account 165 can include government immigration account accessibility data 599. The government immigration account accessibility data 599 can include information such as: a username and/or password associated with the user's account with one or more government server systems 140 and/or other user credentials that are utilized to facilitate login to the user's account with one or more government server systems 140 by the corresponding user. The government immigration account accessibility data 599 can be based on: data generated by the immigration assistance system 100, data received from one or more client devices 130 for the corresponding user, and/or data received from one or more corresponding government server systems 140. The government immigration account accessibility data 599 can be utilized by the immigration assistance system 100 to automatically login to the user's account with a government server systems 140, for example, to facilitate submission of an immigration application for the user in conjunction with the user's account with a government server systems 140 based on implementing the immigration application materials submission system 108.

Figure 5B:
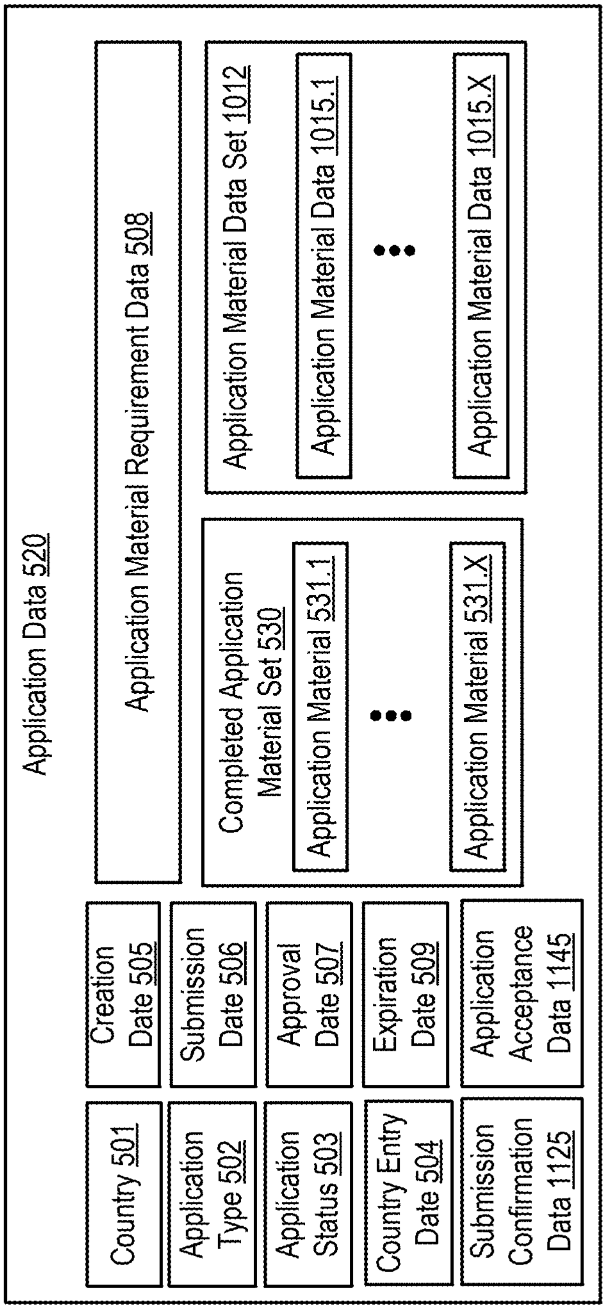
FIG. 5B illustrates data included in and/or indicated by application data in accordance with various embodiments.

FIG. 5B illustrates example data included in application data 520 for a given immigration application for the user. Some or all of the application data 520 can be based on: data generated by the immigration assistance system 100, data received from one or more client devices 130 for the corresponding user, data received from a government server system 140, and/or other included in the user account 165.

The application data 520 can indicate a country 501, indicating the country into which the user intends to immigrate with the corresponding immigration application. The application data 520 can alternatively or additionally indicate an application type 502 corresponding to an immigration type of the immigration, such as a study program visa or a working visa. The application data 520 can alternatively or additionally indicate an application status 503, which can indicate: whether or not the application is complete; whether the application has been submitted; and/or whether or not a decision regarding the application has been made by the government entity to accept or reject the application. The application data 520 can alternatively or additionally indicate a country entry date 504 indicating a prior or scheduled date of entry into the country in conjunction with a start of the immigration. The application data 520 can alternatively or additionally indicate a creation date 505 indicating a date that the application was started, initiated, and/or created by the immigration assistance system 100 for the corresponding user. The application data 520 can alternatively or additionally indicate a submission date 506 indicating a date that the application was submitted for the corresponding user and/or that the application was received by a corresponding government entity for processing. The application data 520 can alternatively or additionally indicate an approval date indicating a date that the immigration was granted or rejected by a corresponding government entity. The application data 520 can alternatively or additionally indicate submission confirmation data 1125, for example, that is received from a government server system 140 confirming receipt of and/or successful submission of the corresponding immigration application. The application data 520 can alternatively or additionally indicate application acceptance data 1145, for example, that is received from a government server system 140 indicating whether the application was granted or rejected.

Alternatively or in addition, the application data 520 can include application material requirement data 508. The application material requirement data 508 can indicate a set of required application materials that are required for inclusion in the user's immigration application and/or a set of recommended application materials that are recommended for inclusion in the user's immigration application. The application material requirement data 508 can include identifiers indicating the set of required application materials and/or the set of recommended application materials, and/or can flag each of a set of possible immigration materials as being required, being recommended, or being neither recommended nor required. For example, the set of recommended application materials and/or the set of recommended application materials are determined by the immigration assistance system 100 based on: the application type 502, requirements received from the government server system 140 and/or established by the corresponding government entity; and/or based on other information determined for the user. As a particular example, the application requirement data 508 is generated based on implementing the immigration application requirement identification system 104. The application material requirement data 508 is discussed in further detail in conjunction with FIG. 5C.

Alternatively or in addition, the application data 520 can include a completed application material set 530 that includes one or more application materials 531.1-531.X. For example, each of the application materials 531 is received from the client device 130 and/or is generated by the immigration assistance system 100. As a particular example, some or all of the application materials 531.1-531.X are completed based on implementing the immigration application materials guided completion system 106. Embodiments of completed application material set 530 are discussed in further detail in conjunction with FIG. 5D-5E.

Alternatively or in addition, the application data 520 can include an application material data set 1012 that includes one or more of a set of application material data 1015.1-1015.X. Each application material data 1015 can correspond to one of the application materials 531. For example, the application material data 1015 was received from the client device 130 in conjunction with implementing the immigration application materials guided completion system 106, and the corresponding application material 531 was generated based on the application material data 1015 via the immigration application materials guided completion system 106.

In some embodiments, the application status 503 is automatically set and updated by the immigration assistance system 100 based on comparing the application material requirement data 508 to the completed application material set 530. In particular, the application status 503 can indicate the immigration application is complete only when each of the set of required application materials are completed. The application status 503 can indicate the immigration application is incomplete if one or more of the set of required application materials is not included in the completed application material set. The application status 503 can indicate which ones of the set of required application materials and/or which ones of the set of recommended application materials have been completed and/or can indicate which ones of the set of required application materials and/or which ones of the set of recommended application materials have yet to be completed. The user can be notified of which application materials are pending completion and/or whether the application is complete based on sending of and/or display of application status 503 via interactive user interface 375.

In some embodiments, the immigration assistance system 100 implements the immigration application materials submission system 108 to automatically submit the completed application material set 530 in conjunction with submission of the corresponding immigration application via sending of each completed application material 531 to a government server system 140. In some embodiments, the immigration application materials submission system 108 only submits the completed application material set 530 only when only each of the set of required application materials and/or each of the set of recommended application materials are completed.

Figure 5C:
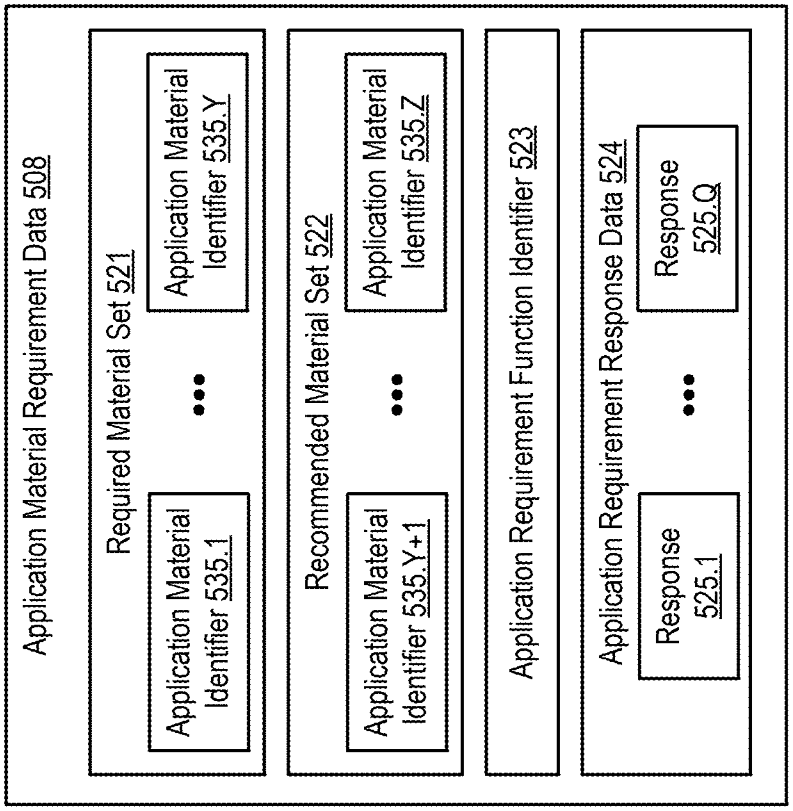
FIG. 5C illustrates data included in and/or indicated by application material requirement data in accordance with various embodiments.

FIG. 5C illustrates an embodiment of application material requirement data 508. The application material requirement data 508 can indicate a required material set 521 that includes a first set of application material identifiers 535.1-535.Y. The application material requirement data 508 can indicate a recommended material set 522 that includes a second set of application material identifiers 535.Y+1-535.Z. The first set of application material identifiers 535.1-535.Y and the second set of application material identifiers 535.Y+1-535.Z can be mutually exclusive. Each application material identifier 535 can identify one of a plurality of possible of application materials, for example, via a name and/or unique identifier code.

The application material requirement data 508 can alternatively or additionally indicate an application requirement function identifier 523, for example, identifying one or more functions in the function library 172 that was performed to identify the required material set 521 and/or the recommended material set 522. For example, the identification of the application requirement function utilized to identify the required material sets 521 and/or the recommended material sets 522 for different users can enable evaluation of function performance over time and/or can trigger function updating and/or retraining if the application requirement function is determined to perform poorly, for example, based on one or more users having rejected immigration applications for missing required materials that were not identified by the application requirement function.

The application material requirement data 508 can alternatively or additionally indicate application material response data 524 that indicates a plurality of responses 525.1-525.Q received from one or more client devices 130, indicating the user's responses to a set of prompts that were utilized to identify the required material set 521 and/or the recommended material set 522. The plurality of responses 525.1-525.Q can optionally be mapped to prompt identifiers 581 of corresponding prompts. For example, the identification of the plurality of responses 525.1-525.Q utilized to identify the required material sets 521 and/or the recommended material sets 522 for different users can enable evaluation of prompt selection and/or the use of responses as input to the application requirement function over time and/or can trigger updating of the set of prompts and/or the use of responses as input to the application requirement if the function is determined to perform poorly, for example, based on one or more users having rejected immigration applications for missing required materials that were not identified by the application requirement function.

The plurality of possible application materials, corresponding application material identifiers 535, and/or any application materials and/or document files described herein can include and/or correspond to one or more application materials of one or more application material categories. For example, a set of application material categories can include some or all of: a digital photograph category; a passport category; a proof of finances category; a letter of acceptance category; a study plan category; a co-op category; a guaranteed investment certificate (GIC) category; an application for study permit made category; a family information category; a representation category; an information consent category; a personal history category; an educational transcript category; a medical exam result category; a language test category; a proof of first year tuition category, and/or one or more other categories corresponding to one or more other types of application materials that can be recommended and/or required in immigration applications. The immigration assistance system can be operable to identify immigration application materials of one or more of these application material categories as being recommended and/or required for some or all users. The immigration assistance system can be operable to complete and/or submit one or more immigration application materials 531 for one or more of these application material categories for some or all users.

The digital photograph category can include a digital photograph application material. The digital photograph application material can correspond to digital photograph of the user applying to immigrate, such as a headshot and/or portrait of the user. For example, this digital photograph corresponds to a visa photograph to be included on the user's visa.

The letter of acceptance category can include a letter of acceptance application material, for example, that correspond to a letter from an academic institution in the country to which the user is applying to immigrate. The letter of acceptance category can alternatively or additionally include a letter of conditional acceptance from an academic institution in the country to which the user is applying to immigrate, for example, where acceptance is contingent on the basis that the user competes one or more required courses and/or achieves required test results prior to and/or while attending the academic institution, such as a language course and/or language test result. The letter of acceptance category can include program of acceptance screenshot data, such as one or more screenshots of an online portal of a website hosted by the academic institution in the country to which the user is applying to immigrate that shows the user's acceptance to a program at the academic institution. The letter of acceptance category can include letter of enrollment data, for example, corresponding to the user's enrollment in courses at the academic institution, for example, if the user is a returning student.

The passport category can include a passport, which can include image data for one or more photographs and/or scans of different pages of the user's passport, such as a passport biodata page, and/or one or more pages of the user's document that include stamps, visas and/or other markings. The passport category can include a national ID card, which can include image data for one or more photographs and/or scans of the user's national ID card, such as a front and/or back of the user's national ID card. The passport category can include a travel document corresponding to a travel document of the user.

The language test category can include one or more test result documents, such as results of International English Language Test (IELTS), results of a test d'évaluation de français (TEF) test, and/or other test results.

The educational transcript category can include a diploma application material, such as one or more diploma documents from one or more academic institutions attended by the user, and/or a transcript application material, such as one or more transcripts and/or marksheets from one or more academic institutions attended by the user.

The medical exam category can include an information sheet, which can correspond to an information sheet provided to the user by their physician. The medical exam category can include an information sheet, which can correspond to an information sheet provided to the user by their physician. The medical exam category can include a medical report, such as an upfront medical report.

The proof of first year tuition category can include a receipt of tuition payment to the academic institution in which the user plans to attend. The proof of first year tuition category can include a letter from the academic institution confirming payment of tuition by the user. The proof of first year tuition category can include a receipt or other documentation from a banking entity indicating a transfer of funds from a bank account to the academic institution for the user's payment of tuition.

The co-op category can include one or more documents proving the user is required to complete a co-op for their study program and/or one or more documents confirming the user is enrolled in a study program that includes a co-op work. This can correspond to one or more documents received from the corresponding academic institution and/or one or more screenshots of an online portal of a website presented by the academic institution.

The proof of finances category can include a letter from a financial supporter, such as a family member, other person, academic institution, employer, or other institution. The proof of finances category can include one or more bank statements of the user's bank account, such as monthly bank statements for the last 4 months or another number of months. The proof of finances category can include one or more bank statements of the financial provider's bank account, such as monthly bank statements for the last 4 months or another number of months. The proof of finances category can include proof of funds from a bank account in the country to which the user is immigrating, such as a corresponding bank statement and/or other documentation indicating proof of funds in the bank account. The proof of finances category can include proof of payment of tuition, such as one or more documents of the proof of first year tuition payment category. The proof of finances category can include proof of accommodation secured in Canada, such as a lease, confirmation, payment of a security deposit or rent, or other documents confirming accommodations are secured. The proof of finances category can include tax statements of the user and/or financial supporter, such as annual tax statements for the past two years. The proof of finances category can include proof of purchase of plane tickets to the country to which the user is immigrating, such as flight data, a credit card statement, and/or a screenshot of a confirmation page and/or email from a corresponding airline. The proof of finances category can include proof of purchases in the country to which the user is immigrating, such as documents proving purchase of property, a vehicle, and/or other large expenses in the country, such as a credit card statement or bank statement indicating corresponding transfer of funds, a motor vehicle bill of sale, a vehicle title, a property title, a screenshot of electronic data indicating the corresponding purchase, and/or another document. The proof of finances category can include proof of ownership in the home country of the user, such as proof of ownership of a car, property, business, and/or other large asset in the home country of the user, such as a credit card statement or bank statement indicating corresponding transfer of funds, a motor vehicle bill of sale, a vehicle title, a property title, a screenshot of electronic data indicating the corresponding ownership, and/or another document. The proof of finances category can include proof of a student loan, proof of an education loan, and/or proof of being awarded a scholarship to attend the academic institution, and/or proof of other funding from within the country to which the user is immigrating, such as a letter from the institution providing the user with funding, loan documentation, banking documents indicating the loan, an award or letter confirming the scholarship being awarded and/or the corresponding amount, and/or other proof of loan, scholarship, or other funding.

The GIC category can include proof that the user obtained a GIC and/or can indicate an amount of the GIC. For example, the GIC is a GIC of at least $10,000 and/or another minimum funding requirement. Documents of the GIC category can be included in the proof of finances category.

Figure 5D:
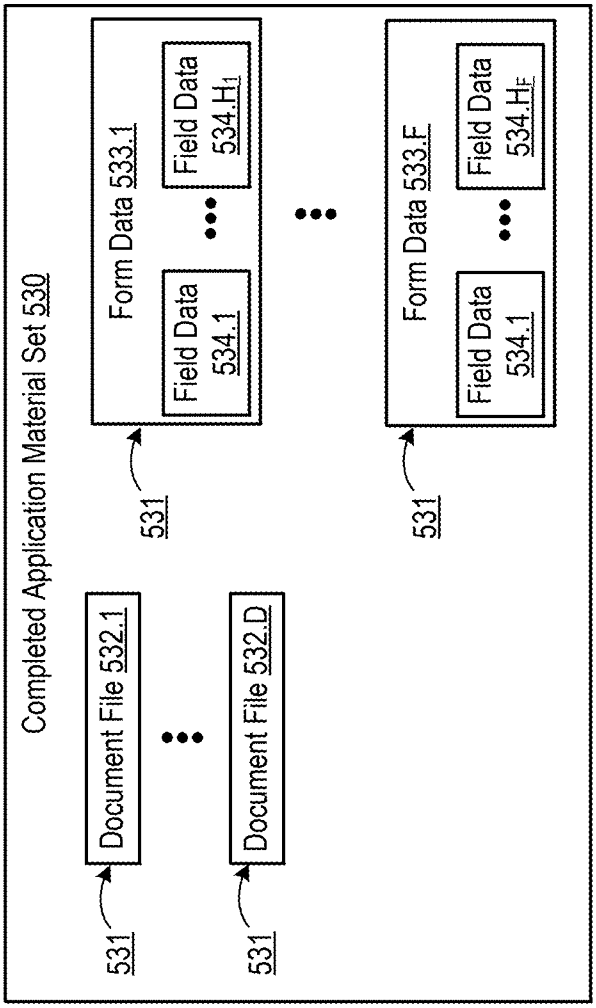
FIGS. 5D-5E illustrates data included in and/or indicated by a completed application material set in accordance with various embodiments.

As illustrated in FIG. 5D, the set of application materials 531 of the completed application material set 530 can include a set of one or more document files 532.1-532.D.

For example, some or all of the document files 532 correspond to files in accordance with a file format, such as one or more PDF files, one or more JPEG files, one or more JPEG2000 files, one or more PNG files, and/or one or more files in accordance with any other text, document, image, and/or other file format. In some embodiments, document files 532 can be submitted in accordance with submitting of the immigration application based on uploading of the document files 532 to a government server system 140 by the user via client device 130 and/or automatically by the immigration assistance system 100, for example, via implementing of the immigration application materials submission system 108.

Some or all document files 532 can each correspond to one of the plurality of possible application materials for the user. In particular, document files 532 can correspond to required and/or recommended types of document files for inclusion in the user's immigration application. Different document files 532 can correspond to different types of forms. Each document file 532 can optionally be linked to and/or identified with a corresponding application material identifier 535 that identifies the type of document file.

Some types of document files 532 can correspond to documents that are hard copy documents, such as a passport, birth certificate, driver's license, or other document whose original and/or official form is printed on paper, plastic, or another physical material. A corresponding document file 532 for a hard copy document can include image data, such as a digital photograph, fax data, or scan data of the hard copy document. In some embodiments, the user can be prompted with instructions for capturing a digital photograph or scan of a hard copy document and/or the corresponding type of document file 532 can have corresponding digital photograph requirement data. In some embodiments, the interactive user interface 375 prompts the user to capture image data of the corresponding hard copy document for transmission to the immigration assistance system 100 via one or more cameras of the client device 130, where the client device 130 generates the document file 532 via one or more of its cameras in response to user input, and where the client device 130 then sends this generated document file 532 to the immigration assistance system 100 for processing and/or submission.

Some types of document files 532 can correspond to information that is displayed electronically via a display device of a client device 130 or other computing device, but not necessarily downloadable and/or is not traditionally stored in a file format. For example, one or more document files 532 can correspond to information presented via a webpage and/or mobile application associated with and/or communicating with a government server system, an academic institution server system, a banking server system, or server system of another official entity. As a particular example, one document files 532 can correspond to information displayed via an online portal of an academic institution that conveys acceptance of the user to an academic program. A corresponding document file 532 for electronically displayed information can include image data, such as a screenshot, of the electronically displayed information. In some embodiments, the user can be prompted with instructions for capturing a screenshot of electronically displayed information and/or the corresponding type of document file 532 can have corresponding document requirement data. In some embodiments, the interactive user interface 375 prompts the user to capture image data of the corresponding electronically displayed information for transmission to the immigration assistance system 100 by capturing a screenshot of a current display displayed via display device 370 of the client device 130, where the client device 130 generates the document file 532 by capturing the screenshot of a current display displayed via display device 370 in response to user input, and where the client device 130 then sends this generated document file 532 to the immigration assistance system 100 for processing and/or submission.

One or more document files 532 for a given user can be received from a client device 130, for example, based on the user uploading a file 319 from the file storage system of the client device and/or based on the user generating the file in response to one or more prompts received from the immigration assistance system 100. Some of these received document files 532 can be further processed and/or verified, for example, in conjunction with implementing the: immigration information extraction system 110; immigration digital photograph processing system 112; and/or the immigration document verification system 116.

Alternatively or in addition, one or more document files 532 for a given user can be generated automatically by the immigration assistance system 100, for example, based on: response data 582 received from a client device 130 based on user input to corresponding prompts; information extracted from one or more document files 532; and/or other information accessed in user account 165 for the user. For example, one or more document files 532 are generated in conjunction with implementing the immigration information extraction system 110 and/or the immigration application letter generator system 114.

As further illustrated in FIG. 5D, the set of application materials 531 of the completed application material set 530 can alternatively or additionally include a set of one or more form data 533.1-533.F. Each form data 533 can include a set of field data 534.1-534.H, where different form data 533 can have same or different numbers of field data 534 based on a corresponding number of fields of the corresponding form.

Some or all form data 533 can correspond to one of the plurality of possible application materials for the user. In particular, form data 533 can correspond to required and/or recommended types of forms for inclusion in the user's immigration application. Different form data 533 correspond to different types of forms. Each form data 533 can optionally be linked to and/or identified with a corresponding application material identifier 535 that identifies the type of form.

Some or all form data 533.1-533.F of a given user can be received from a client device 130, for example, based on the user responding to a plurality of prompts corresponding to some or all field data 534.1-534.H of one or more forms. Alternatively or in addition, one or more field data 534 of one or more form data 533 can be generated automatically by the immigration assistance system 100, for example based on: response data 582 received from a client device 130 based on user input to corresponding prompts; information extracted from one or more document files 532; and/or other information accessed in user account 165 for the user. For example, one or more document files 532 are generated in conjunction with implementing the immigration information extraction system 110 and/or the immigration application letter generator system 114. For example, one or more field data 534 are generated in conjunction with implementing the immigration information extraction system 110.

In some embodiments, the form data 533 is optionally not formatted in accordance with a traditional file format. For example, while some document files 532, such as one or more PDF files, can optionally correspond to forms that are completed based on populating one or more fields of the document file with field data 534.1-534.H, form data 533 can correspond to only the field data 534.1-534.H to be used to populate a corresponding form, for example, electronically via interfacing with the government server system. As described herein, form data 533 can be considered "complete" when all of its necessary field data 534.1-534.H is generated, extracted from other documents, or otherwise determined, even if the corresponding form has not yet been populated with the field data 534.1-534.H.

In some embodiments, the set of form data 533.1-533.H for a corresponding set of forms can be submitted in accordance with submitting of the immigration application based on uploading of each set of field data 534.1-534.H for each form data 533 to a government server system 140. $H_1$. Submission of form data 533 can include accessing a webpage hosted by the government server system corresponding to completion of one or more corresponding forms, where the webpage presents a set of text boxes, check boxes, and/or other populatable fields that when populated and submitted via the webpage, render submission of the corresponding form. Submission of form data 533 can further include populating, for each form data 533, each of a set of fields presented via the webpage hosted by the government server system with corresponding ones of the set of field data 534.1-534.H for the corresponding form data 533. This submission of form data via populating of field presented by a government-hosted webpage can be performed by the user via client device 130 and/or can be performed automatically by the immigration assistance system 100, for example, via implementing of the immigration application materials submission system 108.

Alternatively or in addition, the immigration assistance system 100 can optionally generate one or more document files 532 corresponding to one or more forms based on automatically populating, for each form data 533, each of a set of fields of a corresponding document file 532, such as a PDF file for the form, with corresponding ones of the set of field data 534.1-534.H for the corresponding form data 533. In such embodiments, the corresponding application material is completed based on the immigration assistance system 100 first determining each of the set of field data 534.1-534.H for the corresponding form, and then generating the corresponding document file 532 via population of a set of H fields of the document file with the set of field data 534.1-534.H accordingly.

Figure 5E:
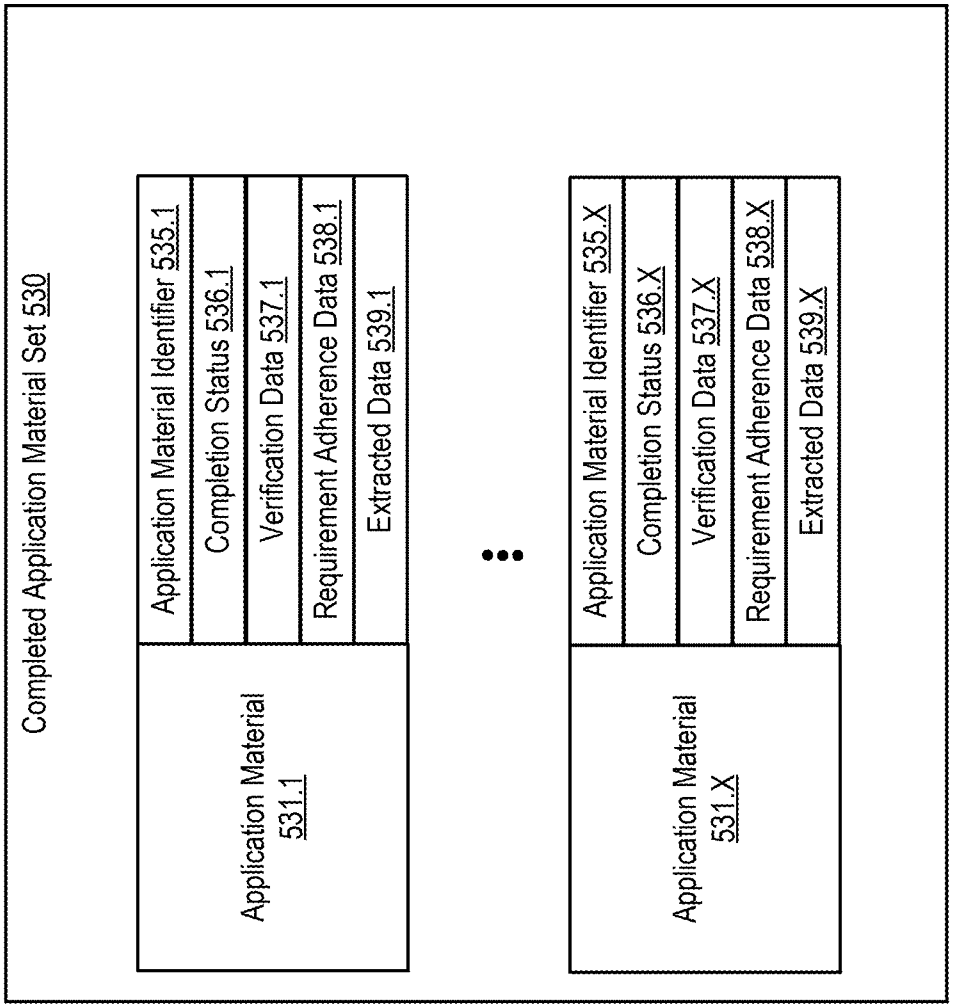

FIG. 5E illustrates other metadata that can be indicated in conjunction with some or all completed application materials 531 of completed application material set 530. This metadata can be stored in, mapped to, indicated by, and/or determined from the completed application material set 530 and/or other information of user account 165.

One or more application materials 531 can be linked and/or mapped to an application material identifier 535 identifying the type of the corresponding application material 531. For example, an application material identifier 535.2 for one application material 531.1 indicates the application material 531.1 corresponds to a letter of acceptance from an educational institution, while an application material identifier 535.1 for another application material 531.2 indicates the application material 531.2 is a passport.

Alternatively or in addition, one or more application materials 531 can be linked and/or mapped to a completion status 536 indicating whether the corresponding application material 531 has been started and/or whether or not the corresponding application material 531. In some embodiments, an application material can be started, but incomplete based on: the additional information being required from the user, the application material undergoing processing and/or requiring further processing by the immigration assistance system 100; based on the application material not meeting all requirements or not having yet been verified; or other reasons. The completion status 536 can be generated based on implementing the immigration application materials guided completion system 106.

Alternatively or in addition, one or more application materials 531 can be linked and/or mapped to a verification data 537 indicating whether the application material has been verified. In some cases, only some types of application materials 531, such as documents generated or issued by government entities, educational institutions, employers, testing entities, or other official entities, require verification, while other types of application materials 531 do not require verification. The verification data 537 can be generated based on implementing the immigration document verification system 116.

Alternatively or in addition, one or more application materials 531 can be linked and/or mapped to requirement adherence data 538 indicating whether the application material adheres to all requirements. In some cases, only some types of application materials 531 must adhere to a set of corresponding requirements for the type of application material indicated by the application material identifier 535, while other types of application materials 531 do not need to adhere to a set of requirements. For example, one or more digital photographs included in the completed application material set, such as a headshot and/or portrait of the user applying to immigrate, must adhere to a set of digital photograph requirements. The requirement adherence data 538 can be generated based on implementing the digital photograph processing system 112.

Alternatively or in addition, one or more application materials 531 can be linked and/or mapped to extracted data 539. For example, the extracted data 539 was extracted from the corresponding application material 531. This extracted data 539 can be accessed and utilized by the immigration assistance system 100 to generate one or more other application materials 531, to implement functionality of other subsystems 101, and/or to populate any other data of the corresponding user account 165 described herein. The extracted data 539 can be generated based on implementing the immigration information extraction system 110.

Figure 5F:
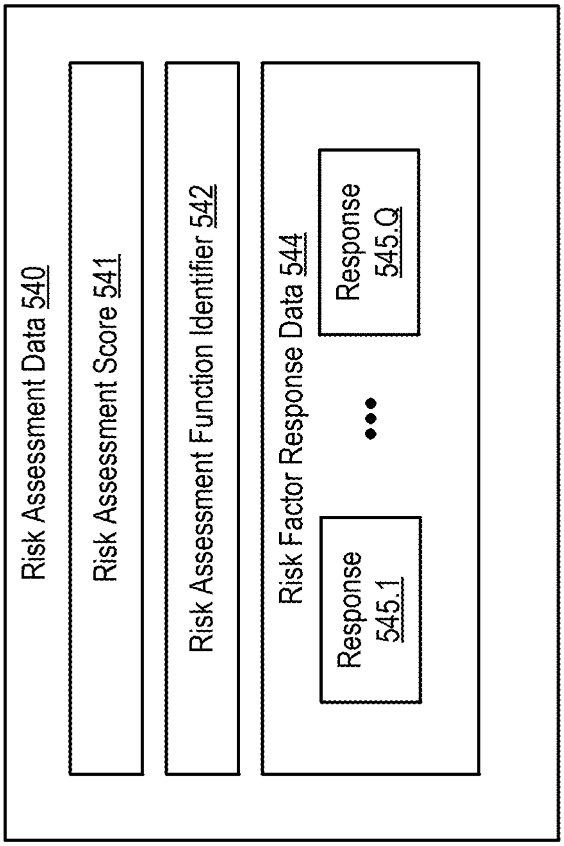
FIG. 5F illustrates data included in and/or indicated by a risk assessment data in accordance with various embodiments.

FIG. 5F illustrates an example of risk assessment data 540. Risk assessment data 540 can be included in user account 165 for a corresponding user, can be generated by performing a corresponding risk assessment function, and/or can be generated by immigration eligibility risk assessment system 102.

The risk assessment data 540 can include a risk assessment score 541. The risk assessment score 541 can indicate a level of risk associated with the corresponding user's immigration eligibility and/or a level of confidence that the user will be granted immigration status. The As used herein, a first risk assessment score can be more favorable than a second risk assessment score based on the first risk assessment score indicating a lower level of risk associated with the corresponding user's immigration eligibility and/or a higher level of confidence that the user will be granted immigration status than the second risk assessment score.

The risk assessment score 541 can alternatively or additionally indicate an estimated amount of time for the corresponding immigration application to be processed, such as the amount of time between submission of an immigration application and receiving acceptance data indicating either granting or refusal of the immigration status for the corresponding user. This estimated application processing time can be a deterministic function of the level of risk associated with the corresponding user's immigration eligibility. For example, the estimated application processing time is a monotonically increasing function of the level of risk based on users with more complicated circumstances, corresponding to more and/or greater risk factors, inducing both higher levels of risk and more time to be processed by a government entity. Alternatively, this estimated application processing time can monotonically increase with the level of risk up until a threshold level of risk, and then can decrease after this threshold level of risk, for example, based on complicated circumstances, corresponding to moderate risk factors where status granting versus rejection is uncertain, inducing greater amounts of processing time, while more dire circumstances where the risk factors are much greater and more inducive of application rejection that the processing time is shorter, as the rejection of the application may be quick and/or obvious to the government entity.

In some embodiments, the risk assessment score 541 can correspond to a numeric score in a discrete and/or continuous range that indicates a level of risk associated with the corresponding user's immigration eligibility, a level of confidence that the user will be granted immigration status, and/or an expected amount of processing time between application submission and receiving of acceptance data. For example, the numeric score can be either an increasing or decreasing function of the level of risk associated with the corresponding user's immigration eligibility, the level of confidence that the user will be granted immigration status, and/or an expected amount of processing time between application submission and receiving of acceptance data. As a particular example, the numeric score can indicate, correspond to, and/or be based on a probability value indicating a computed probability that the corresponding user will be granted immigration status and/or that the corresponding user will be granted immigration status within a threshold time window.

Alternatively or in addition, the risk assessment score 541 can correspond to and/or indicate a binary score, for example, indicating whether or not the immigration assistance system 100 will provide additional immigration assistance for the corresponding user, indicating whether or not the corresponding user is expected to be granted an immigration application, and/or indicating whether or not the expected amount of processing time between application submission and receiving of acceptance data falls within a predetermined time window. In some cases, the binary score is generated based on first computing a numeric score, and then determining whether the numeric score compares favorably to a predetermined numeric threshold. For example, a numeric score corresponding to a probability value indicating a computed probability that the corresponding user will be granted immigration status yields: a favorable binary score, when the numeric score is greater than and/or equal to, or other compares favorably to, the predetermined numeric threshold; and an unfavorable binary score, when the numeric score is less than and/or equal to, or other compares unfavorably to, the predetermined numeric threshold. As another example, a numeric score corresponding to an expected amount of processing time between application submission and receiving of acceptance data yields: a favorable binary score, when the numeric score is greater than and/or equal to, or other compares favorably to, a predetermined numeric threshold corresponding to the predetermined time window; and an unfavorable binary score, when the numeric score is less than and/or equal to, or other compares unfavorably to, the predetermined numeric threshold.

The estimated amount of time for the corresponding immigration to be processed can alternatively or additionally be expressed a first value of the risk assessment score 541, while the level of risk associated with the corresponding user's immigration eligibility and/or a level of confidence that the user will be granted immigration status can be expressed as a second value of the risk assessment score 541. Alternatively or in addition, the risk assessment score 541 can jointly process the estimated amount of time for the corresponding immigration to be processed and the level of risk associated with the corresponding user's immigration eligibility and/or a level of confidence that the user will be granted immigration status, for example, where the risk assessment score 541 indicates a probability associated with the user being granted immigration status, and also being granted the immigration status within a threshold time window as a single probability value.

The risk assessment data 540 can alternatively or additionally include a risk assessment function identifier 542 indicating the risk assessment function that was performed to generate the risk assessment score 541. For example, the identification of the risk assessment function utilized to generate risk assessment scores for different users can enable evaluation of function performance over time and/or can trigger function updating and/or retraining if the function is determined to perform poorly, for example, based on: at least a threshold proportion of users having rejected immigration applications despite having favorable risk assessment scores; at least a threshold proportion of users having granted immigration applications despite having unfavorable risk assessment scores; at least a threshold proportion of users having waiting periods between submission and granting of their immigration applications that comparing unfavorably to a waiting period threshold despite having favorable risk assessment scores; and/or at least a threshold proportion of users having waiting periods between submission and granting of their immigration applications that comparing favorably to a waiting period threshold despite having unfavorable risk assessment scores.

The risk assessment data 540 can alternatively or additionally include risk factor response data 544 that includes a set of responses 545.1-545.Q received from one or more client devices 130, indicating the user's responses to a set of prompts that were utilized to generate the risk assessment score 541, for example, as input to the risk assessment function. The plurality of responses 545.1-545.Q can optionally be mapped to prompt identifiers 581 of corresponding prompts. For example, the identification of the plurality of responses 545.1-545.Q utilized to generate the risk assessment score 541 for different users can enable evaluation of prompt selection and/or the use of responses as input to the risk assessment function over time and/or can trigger updating of the set of prompts and/or the use of responses as input to the risk assessment if the risk assessment function is determined to perform poorly.

Figure 5G:
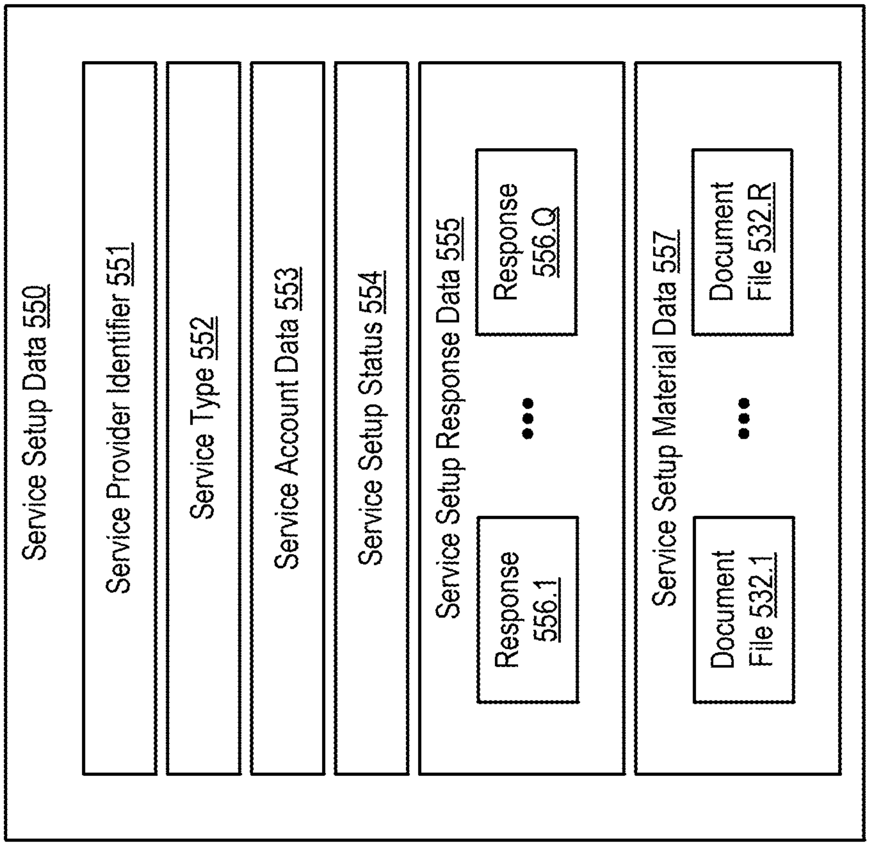
FIG. 5G illustrates data included in and/or indicated by service setup data in accordance with various embodiments.

FIG. 5G illustrates an example of service setup data 550. Service setup data 550 can be included in user account 165 for a corresponding user, can be generated by performing a corresponding service initiation function, and/or can be generated by immigration application service setup system 118. Service setup data 550 can include information regarding a service that is setup for the user with a service provider prior to and/or after: an immigration application is submitted for the corresponding user; corresponding approval data 507 is received and/or determined for the corresponding user; and/or the user arrives in the country to which they are immigrating.

The service setup data 550 can indicate a service provider identifier 551, such as a name or unique identifier code, identifying a corresponding service provider. For example, the service provider identifier 551 indicates a particular company, particular point of contact, and/or other particular entity providing a corresponding service.

Alternatively or in addition, the service setup data 550 can indicate a service type 552 identifying a type of service. For example, the service type 552 indicates a type of service being provided, for example, from a set of service types. The set of service types can include one or more of: a banking service type, a housing service type, a cellular service type, a health care service type, a social insurance number service type, a cultural service type, and/or one or more other service types.

As a particular example, one service setup data 550 for a given user can indicate a cellular service type as service type 552, and can further indicate a particular cellular service company providing cellular service as service provider identifier 551. Another service setup data 550 for the given user can indicate a banking service type as service type 552, and can further indicate a particular banking company providing banking service as service provider identifier 551.

Different service types can have multiple corresponding service providers that can provide the corresponding type of service to users of the immigration assistance systems.

Different users may select and/or be assigned to receive service via different service providers, for example, based on: different user preferences; different countries the users are immigrating to; different location within a same country where different users are living, working, or attending a study program; different companies within a same country where different users working; different academic institutions within a same country where different users attend a study program; and/or other information included in user accounts 165; and/or other information.

As a particular example, one service setup data 550 for a first given user can indicate a cellular service type as service type 552, and can further indicate a first particular cellular service company providing cellular service as service provider identifier 551. Another service setup data 550 for a second given user can also indicate a cellular service type as service type 552, and can further indicate a second particular cellular service company providing cellular service as service provider identifier 551, where the second particular cellular service company is different from the first particular cellular service company.

Alternatively or in addition, the service setup data 550 can include service account data 553, which can indicate an account identifier for the user with the corresponding service provider. For example, the service account data 553 for a cellular service can correspond to a phone number assigned to the user. As another example, the service account data 553 for a banking service can indicate a bank account number, a credit card number, and/or a debit card number assigned to the user. The service account data 553 can be sent to the client device 130 of the corresponding user and/or can be otherwise accessed by the corresponding user, for example, to enable the user to utilize the service provided by the service provider after the service is set up.

In some embodiments, the service setup data 550 account accessibility data such as a username and/or password associated with the user for login to an account with the service provider, other user credentials that are utilized to facilitate login to a user account with the service provider by the corresponding user. For example, the service account data 553 can be established by the immigration assistance system 100 via communication with a server system of the corresponding servicer provider in conjunction with setting up the corresponding service, and/or is utilized by immigration assistance system 100 to automatically login to the user's account with the service provider, for example, to initialize and/or finalize setup of the corresponding service for the user with the service provider. Account accessibility data of the service account data 553 can be received from the client device 130 and/or can be sent to the client device 130, for example, to enable the user to interact with their account with the service provider after the service is set up.

Alternatively or in addition, the service setup data 550 can include service setup data 554, which can indicate the status of setup of the corresponding service for the user with the service provider. The service setup data 550 can indicate that service has been initialized, is pending, and/or is finalized for the user with the service provider and/or can indicate that additional information is required by the user and/or service provider to finalize service.

Alternatively or in addition, the service setup data 550 can include service setup response data 555 and/or service setup material data 557 indicating a set of responses 556.1-556.Q and/or a set of document files 532.1-532.S, respectively, that are utilized to initialize and/or facilitate setup of the corresponding service. For example, the set of responses 556.1-556.Q and/or a set of document files 532.1-532.S are utilized as input to a service initiation function performed by the immigration assistance system to generate service setup initiation data that is utilized to initialize and/or facilitate setup of the corresponding service. The service setup data 550 can optionally further indicate: an identifier of an entry for the service initiation function in the function library 172; and/or the service setup initiation data generated via performance of the service initiation function. In some embodiments, some or all information 551, 552, and/or 553 included in service setup data 550 is indicated in and/or generated based on the service setup initiation data generated via performance of the service initiation function.

Figure 5H:
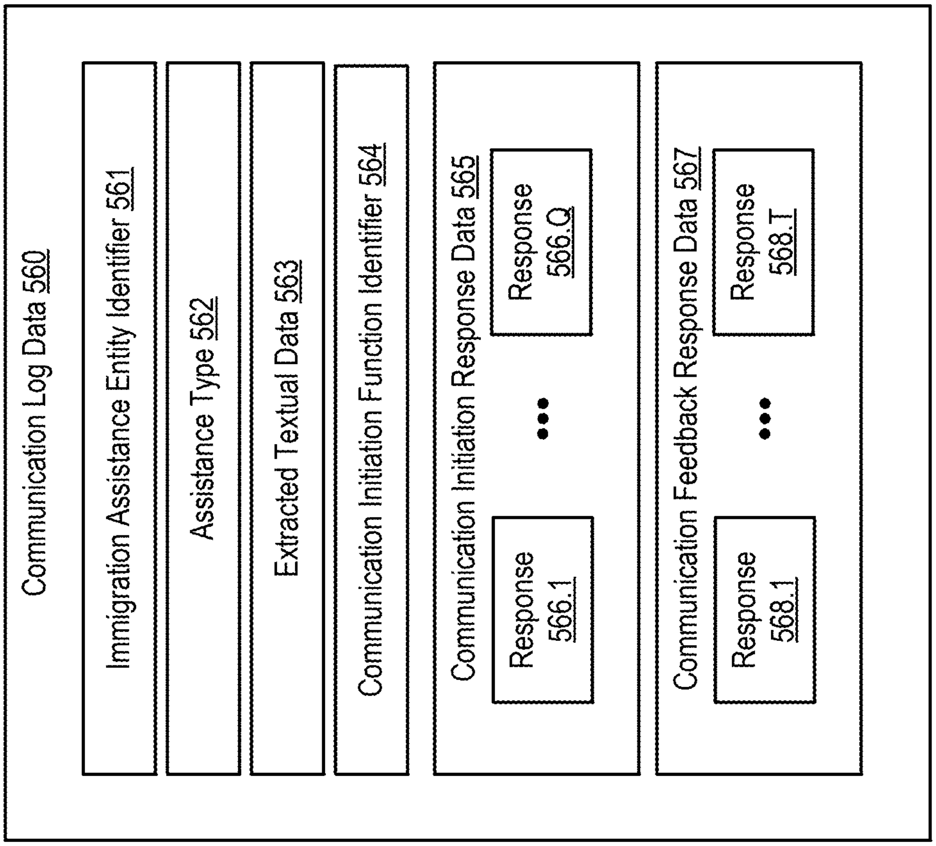
FIG. 5H illustrates data included in and/or indicated by communication log data in accordance with various embodiments.

FIG. 5H illustrates an example of communication log data 560. Communication log data 560 can be included in user account 165 for a corresponding user, can be generated by performing a corresponding communication initiation function and/or communication initiation determination function, and/or can be generated by immigration assistance communication system 120. Communication log data 560 can include information regarding communications that were initialized and/or facilitated for the user with one or more assistance entities prior to and/or after: an immigration application is submitted for the corresponding user; corresponding approval data 507 is received and/or determined for the corresponding user; and/or the user arrives in the country to which they are immigrating.

Communication log data 560 can include an immigration assistance entity identifier 561, such as a name, phone number, email address, messaging handle, and/or unique code, that identifies the assistance entity with which communication is initiated and/or facilitated. Communication log data 560 can alternatively or additionally include an assistance type 562, indicating the type of assistance that is initiated or facilitated. The assistance type 562 can be one of a set of different assistance types. For example, the set of different assistance types can include a legal assistance type, a cultural assistance type, and/or other types of assistance provided via communications between a user and an assistance entity.

Alternatively or in addition, the communication log data 560 can include extracted textual data 563 that is extracted from communications between the user and the assistance entity in a corresponding communication session, such as text data extracted from corresponding chat communications, voice communications, and/or video communications facilitated between the user and the assistance entity.

Alternatively or in addition, the communication log data 560 can include a communication initiation function identifier 564 indicating a corresponding function entry in function library 172 utilized to initiate communication with the assistance entity and/or determine to initiate communication with the assistance entity, such as identifiers for a communication initiation function and/or a communication initiation determination function. Alternatively or in addition, the communication log data 560 can indicate communication initiation response data 565, which can indicate one or more responses 556.1-556.Q received from the client device 130 based on user input that are utilized to initiate and/or determine to initiate communication with the assistance entity, for example, as input to the communication initiation function and/or a communication initiation determination function. Alternatively or in addition, the communication log data 560 can indicate communication feedback response data 567, which can indicate one or more responses 568.1-568.Q received from the client device 130 based on user input to prompts after the communication is complete, asking the user to rate their satisfaction with the communication and/or to provide other feedback regarding the quality, helpfulness, and/or other favorability of the communication.

For example, the identification of the communication initiation function and/or a communication initiation determination function utilized to initiate communication between the user and the assistance entity can enable evaluation of function performance over time and/or can trigger function updating and/or retraining if the communication initiation function and/or the communication initiation determination function is determined to perform poorly, for example, based on unfavorable responses 568.1-568.T indicating the communications were not favorable.

As another example, the plurality of responses 556.1-556.Q utilized to initiate the communication for different users with the same or different assistance entity can enable evaluation of prompt selection and/or the use of responses as input to the communication initiation function and/or the communication initiation determination function over time and/or can trigger updating of the set of prompts and/or the use of responses as input to the communication initiation function and/or the communication initiation determination function if the function is determined to perform poorly, based on unfavorable responses 568.1-568.T indicating the communications were not favorable.

FIGS. 6A-6H illustrate example function entries 175 of the function library 172. In some embodiments, alternatively or in addition to being stored in or accessed in a function library 172, functions corresponding to function entries 175 of FIGS. 6A-6H, and/or corresponding to any other function entries 175 described herein, can be otherwise performed by the immigration assistance system 100 and/or computing system 10, for example, in accordance with the function definition and/or other parameters discussed in conjunction with their corresponding function entries 175 illustrated in FIGS. 6A-6H and/or as illustrated in other Figures depicting function definition for and/or corresponding execution of these functions.

In some embodiments, alternatively or in addition to being stored in or accessed in a function library 172, functions corresponding to function entries 175 of FIGS. 6A-6H, and/or corresponding to any other function entries 175 described herein, can be sent by the immigration assistance system 100 to client devices 130 and/or computing devices 100 in application data 315 and/or in machine executable instructions, and/or the client devices 130 and/or computing devices 13 can store some or all function entries 175 of function library 172 themselves to enable client devices to perform some or all corresponding functions, for example, in accordance with the function definition and/or other parameters discussed in conjunction with their corresponding function entries 175 illustrated in FIGS. 6A-6H and/or illustrated in other Figures depicting function definition for and/or corresponding execution of these functions.

Some or all functions of function library 172 and/or that are otherwise performed by immigration assistance system 100, computing system 10, computing device 13, and/or a client device 130 can be: predetermined; configured via user input by an administrator of the immigration assistance system; stored in and retrieved from memory accessible by the immigration assistance system; received by the immigration assistance system; accessed via a corresponding function entry of function library 172; and/or otherwise determined by immigration assistance system, computing system 10, computing device 13, and/or client device 130. Alternatively or in addition, one or more functions can be automatically generated, trained, and/or updated by the immigration assistance system, for example, based on implementing the historical immigration data processing system 124. For example, one or more functions can be automatically trained in accordance with at least one artificial intelligence technique and/or at least one machine learning technique.

Figure 6A:
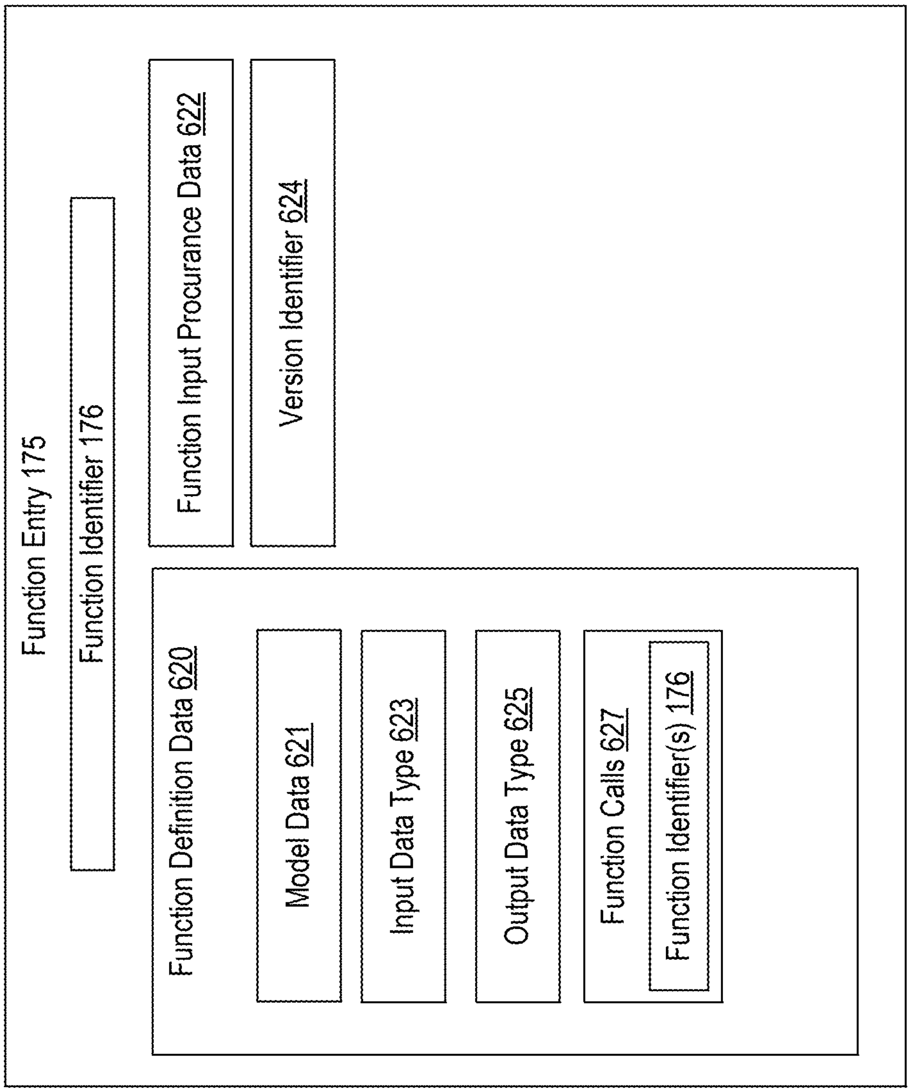
FIG. 6A illustrates data included in and/or indicated by a function entry in accordance with various embodiments.

FIG. 6A illustrates an example function entry 175 that includes information that can be stored and/or indicated for some or all functions of the function library 172. A function entry 175 can include a corresponding function identifier 176, such as a name or unique code, that identifies the function entry and/or that enables the corresponding function to be called, for example, in the function definition of another function.

Alternatively or in addition, the function entry 175 can include function definition data 620. The function definition data can include operational instruction for execution, an executable file, computer code in accordance with a programming language, algorithm data, and/or other information enabling the corresponding function to be performed by the immigration assistance system 100 and/or a client device 130.

The function definition data 620 can optionally include model data 621 for corresponding functions that are performed based on applying a corresponding model. The model data 621 can indicate parameters, such as weights and/or coefficient values of the corresponding model. The model data 621 can indicate a type and/or structure of the corresponding model, such as a particular machine learning and/or artificial intelligence construct utilized to implement the corresponding model. The model data 621 can optionally indicate a storage location and/or memory address of a corresponding model required to perform the corresponding function in memory accessible by the immigration assistance system 100, where the immigration assistance system 100 performs the corresponding function based on accessing the corresponding model in memory via the storage location and/or memory address.

The function definition data 620 can alternatively or additionally indicate model data 621 an input data type 623 and/or output data type 625. For example, the corresponding function is performed on data corresponding to the input data type and/or generates data corresponding to the output data type 625.

The function definition data 620 can include one or more function calls 627, for example, in accordance with instructions for execution of the corresponding function. Some or all function calls 627 can correspond to execution of other functions of the function library 172 and/or other functions described herein. A given function call can denote a function identifier 176 of the corresponding other functions being performed in the given function, and/or corresponding parameters corresponding to the input data type 623 of these other functions. These other functions can be performed in accordance with their respective function definition data 620, for example, based on accessing and/or otherwise determining their function definition data 620 based on the function identifiers 176 included in the function calls 627.

The function definition data 620 can optionally include function input procurance data 622, for example, with additional instructions and/or information regarding how input data for the corresponding function is procured. For example, the function input procurance data 622 can indicate one or more question prompts, where responses to the one or more question prompts entered via user input correspond to the input data type 623 of the corresponding function. As another example, the function input procurance data 622 can indicate one or more prompts for document upload, where documents uploaded in response to the one or more document upload prompts correspond to the input data type 623 of the corresponding function. As another example, the function input procurance data 622 can indicate that information and/or documents corresponding to the input data type 623 be accessed in the corresponding user account 165 and/or accessed via other data mapped to the corresponding user.

The function definition data 620 can alternatively or additionally include a version identifier 624, for example, indicating which of a set of versions of a same type of function the function entry 175 corresponds to. For example, different versions of the same function are generated over time based on editing and/or retraining the function over time based on new information and/or to attempt to improve performance of the function, for example, based on implementing the historical immigration data processing system 124. In some embodiments, the most recent version of a given type of function is always performed. In some embodiments, a function can be reverted to a prior version based on detecting errors and/or poor performance with the most recent version of the given type of function.

Figure 6B:
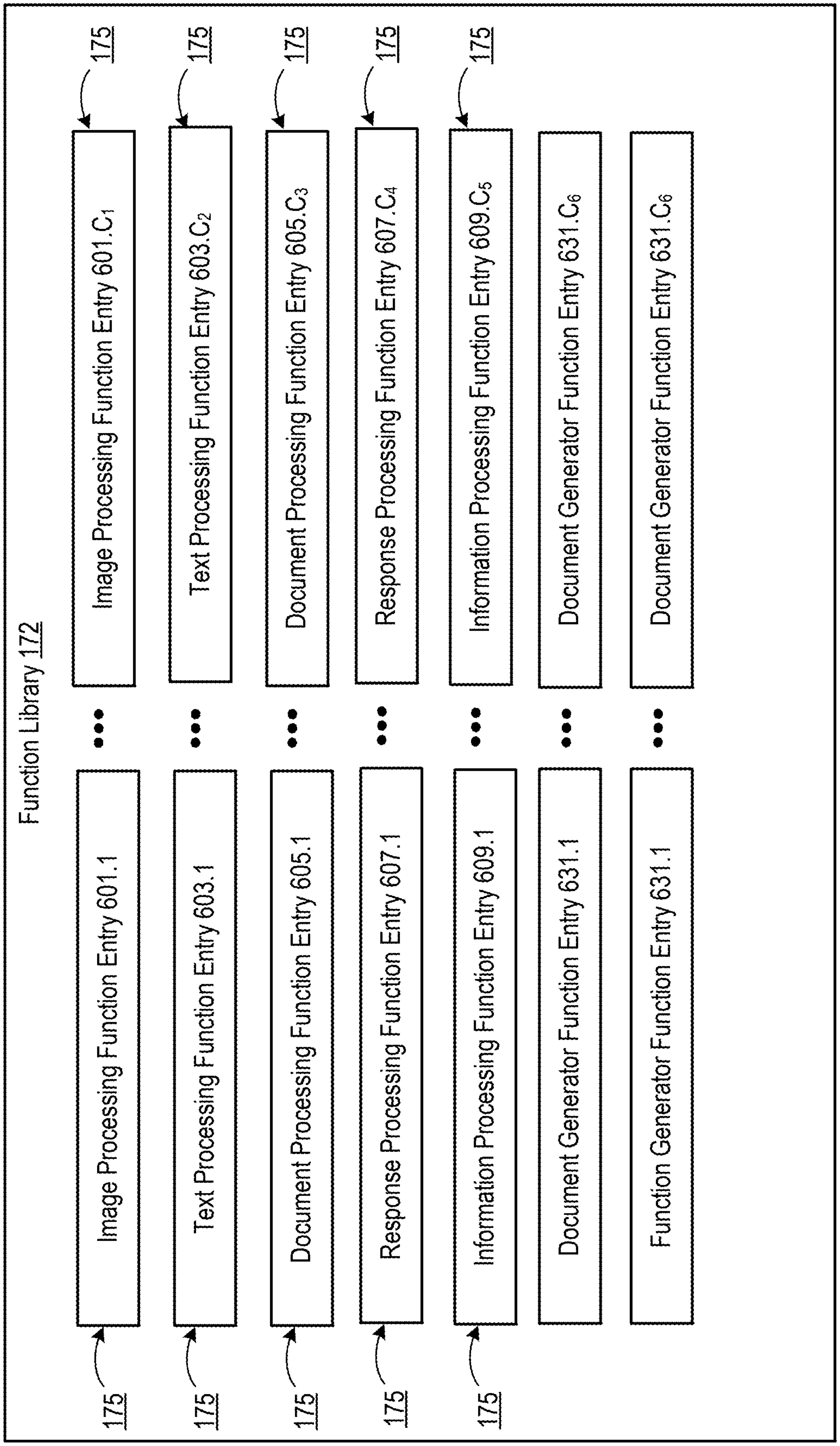
FIG. 6B illustrates a set of function types of a function library in accordance with various embodiments.

FIG. 6B illustrates a plurality of function entries that can be included in function library 172 and/or that can otherwise correspond to functions that can be performed by the immigration assistance system 100 and/or client device 130. Function library 172 can optionally include additional functions not depicted in FIG. 6B. Some or all of the function entries of FIG. 6B can be implemented to include some or all of the information discussed in conjunction with FIG. 6A. The immigration assistance system 100 and/or client device 130 can be operable to perform functions corresponding to any of the function entries 175 of FIG. 6B. The immigration assistance system 100 and/or client device 130 can be operable to perform multiple functions corresponding to function entries 175 of FIG. 6B in parallel for different users, such as dozens, hundreds, and/or thousands of users, simultaneously and/or in overlapping time intervals.

The function library 172 can optionally include one or more image processing function entries 601.1-601.$C_1$. Two or more different image processing function entries 601 can correspond to different types of image processing functions, for example, corresponding to different input data types 623 and/or different output data types 625. Two or more different image processing function entries 601 can alternatively or additionally correspond to different versions of a same type of image processing function. Image processing function entries 601 are discussed in further detail in conjunction with FIG. 6C.

The function library 172 can optionally include one or more text processing function entries 603.1-603.$C_2$. Two or more different text processing function entries 603 can correspond to different types of text processing functions, for example, corresponding to different input data types 623 and/or different output data types 625. Two or more different text processing function entries 603 can alternatively or additionally correspond to different versions of a same type of text processing function. Text processing function entries 603 are discussed in further detail in conjunction with FIG. 6D.

The function library 172 can optionally include one or more document processing function entries 605.1-605.$C_3$. Two or more different document processing function entries 605 can correspond to different types of document processing functions, for example, corresponding to different input data types 623 and/or different output data types 625. Two or more different document processing function entries 605 can alternatively or additionally correspond to different versions of a same type of document processing function. Document processing function entries 605 are discussed in further detail in conjunction with FIG. 6E.

The function library 172 can optionally include one or more response processing function entries 607.1-607.$C_4$. Two or more different response processing function entries 607 can correspond to different types of response processing functions, for example, corresponding to different input data types 623 and/or different output data types 625. Two or more different response processing function entries 607 can alternatively or additionally correspond to different versions of a same type of response processing function. Response processing function entries 605 are discussed in further detail in conjunction with FIGS. 6F-6G.

The function library 172 can optionally include one or information processing function entries 609.1-609.$C_5$. Two or more different response information processing function entries 609 can correspond to different types of information processing functions, for example, corresponding to different input data types 623 and/or different output data types 625. Two or more different response processing function entries 607 can alternatively or additionally correspond to different versions of a same type of information processing function. Information processing function entries 609 are discussed in further detail in conjunction with FIG. 6H.

Figure 6C:
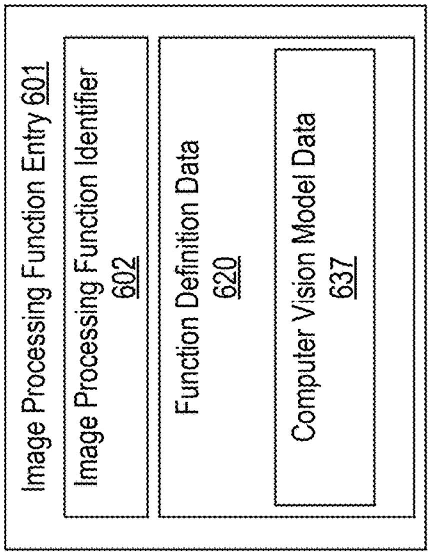
FIG. 6C illustrates data included in and/or indicated by an image processing function entry in accordance with various embodiments.

FIG. 6C illustrates an embodiment of an image processing function entry 601 for a corresponding image processing function that is operable to process images. The image processing function entry can have a corresponding image processing function identifier 602, for example, that implements the function identifier 176 and identifies the corresponding image processing function. The function definition data 620 can include computer vision model data 637, for example, that implements the model data 621. In particular, the computer vision model data 637 can be trained utilizing at least one computer vision technique and/or at least one other artificial intelligence technique and/or machine learning technique relating to processing of images.

While not depicted, the input data type 623 of an image processing function entry 601 can optionally correspond to a particular type of image data, such as a particular type of document file 532 that includes image data. For example, the input data type 623 can denote one or more particular application material identifiers 535 corresponding to particular types of document files upon which the image processing function is operable to be performed. In such cases, the corresponding computer vision model data 637 can be trained based on a training set that includes a plurality of image data that all correspond to this one more particular types of document files.

Figure 6D:
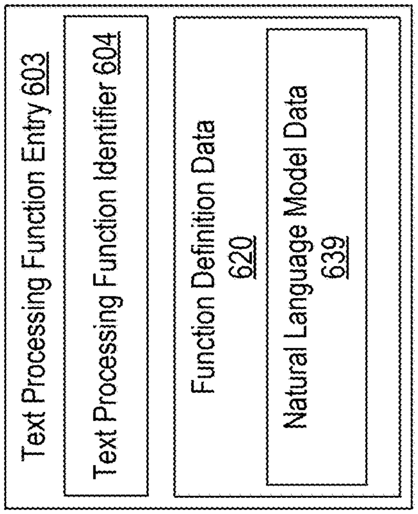
FIG. 6D illustrates data included in and/or indicated by a text processing function entry in accordance with various embodiments.

FIG. 6D illustrates an embodiment of a text processing function entry 603 for a corresponding image processing function that is operable to process text. The text processing function entry can have a corresponding text processing function identifier 604, for example, that implements the function identifier 176 and identifies the corresponding text processing function. The function definition data 620 can include natural language model data 639, for example, that implements the model data 621. In particular, the natural language model data 639 can be trained utilizing at least one natural language processing technique and/or at least one other artificial intelligence technique and/or machine learning technique relating to processing of text.

While not depicted, the input data type 623 of a text processing function entry 603 can optionally correspond to a particular type of textual data, such as a particular type of document file 532 that includes textual data. For example, the input data type 623 can denote one or more particular application material identifiers 535 corresponding to particular types of document files upon which the text processing function is operable to be performed. In such cases, the corresponding natural language model data 639 can be trained based on a training set that includes a plurality of textual data that all correspond to this one more particular types of document files.

Figure 6E:
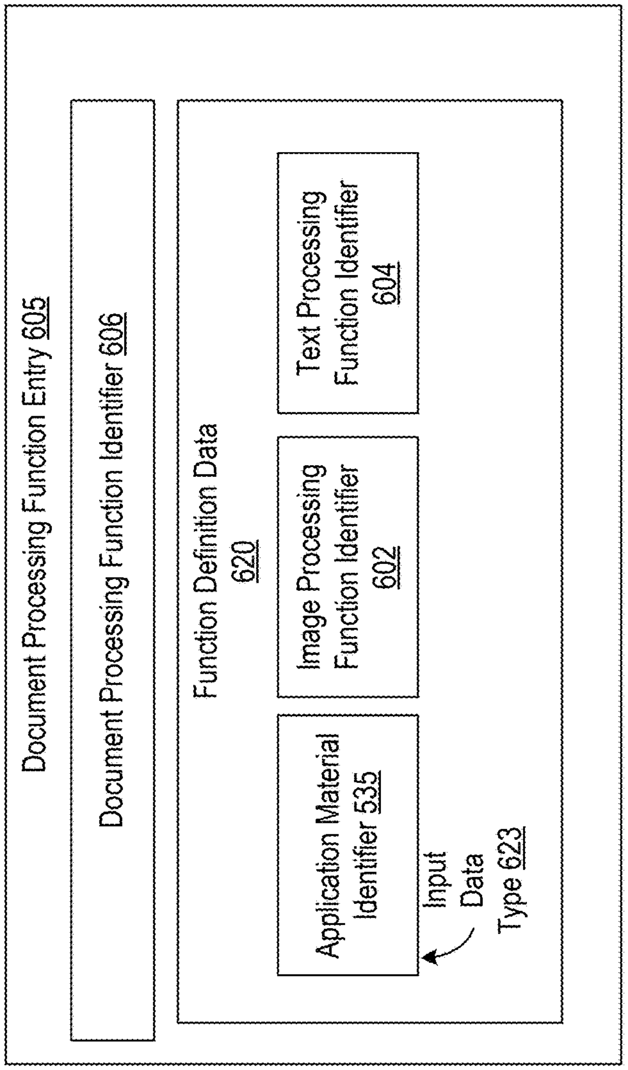
FIG. 6E illustrates data included in and/or indicated by a document processing function entry in accordance with various embodiments.

FIG. 6E illustrates an embodiment of a document processing function entry 605 for a corresponding document processing function that is operable to process documents, such as document files 532, application materials 531, files 319, and/or any other type of document. The document processing function entry can have a corresponding document processing function identifier 606, for example, that implements the function identifier 176 and identifies the corresponding document processing function.

The input data type 623 of a document processing function entry 605 can optionally correspond to one or more particular types of documents. For example, the input data type 623 can denote one or more particular application material identifiers 535 corresponding to particular types of document files upon which the document processing function is operable to be performed. Different document processing functions can be trained to and/or is operable to process different types of documents. For example, one document processing function can be trained to and/or is operable to process passports, while another document processing functions can be trained to and/or is operable to process letters of acceptance from academic institutions. Any of the types of application materials 531 and/or types of document files 532 described herein can optionally be indicated in one or more document processing function entries 605, where one or more corresponding document processing functions are trained based on and/or are operable to process the corresponding type of document.

Some document processing functions can utilize a single document as input and are trained to and/or are operable to generate output based on processing a single document. Some document processing functions can utilize multiple different documents as input and are trained to and/or are operable to generate output based on processing multiple documents.

The function definition data 620 of a document processing function entry 605 can further indicate at least one image processing function identifier 602 and/or at least one text processing function identifier 604, for example, as one or more function calls 627 of the function definition data 620. In particular, the function definition data 620 can indicate an image processing function identifier 602 for an image processing function that utilizes a computer vision model data 637 trained to process image data of the corresponding type of document indicated by application material identifiers 535. Alternatively or in addition, the function definition data 620 can indicate a text processing function identifier 604 for a text processing function that utilizes natural language model data 639 trained to process text of the corresponding type of document indicated by application material identifiers 535.

In some embodiments, at least one document processing function can be implemented to perform a single image processing function and no text processing functions, for example, where the corresponding image processing function entry 601 is implemented as a document processing function entry 605 for the corresponding type of application material. In some embodiments, at least one document processing function can be implemented to perform a single text processing function and no image processing function, for example, where the corresponding image processing function entry 601 is implemented as a document processing function entry 605 for the corresponding type of application material.

In some embodiments, at least one document processing function can be implemented to perform both an image processing function and a text processing function. As a particular example, the corresponding type of document can include image data capturing a document that include a plurality of text. The document processing function can be operable to: first, identify text in the image data to generate textual data based on the text conveyed in the image as intermediate output based on performing the image processing function; and second, process the textual data outputted by the image processing function to generate second output based on performing the natural language text processing function.

Figure 6F:
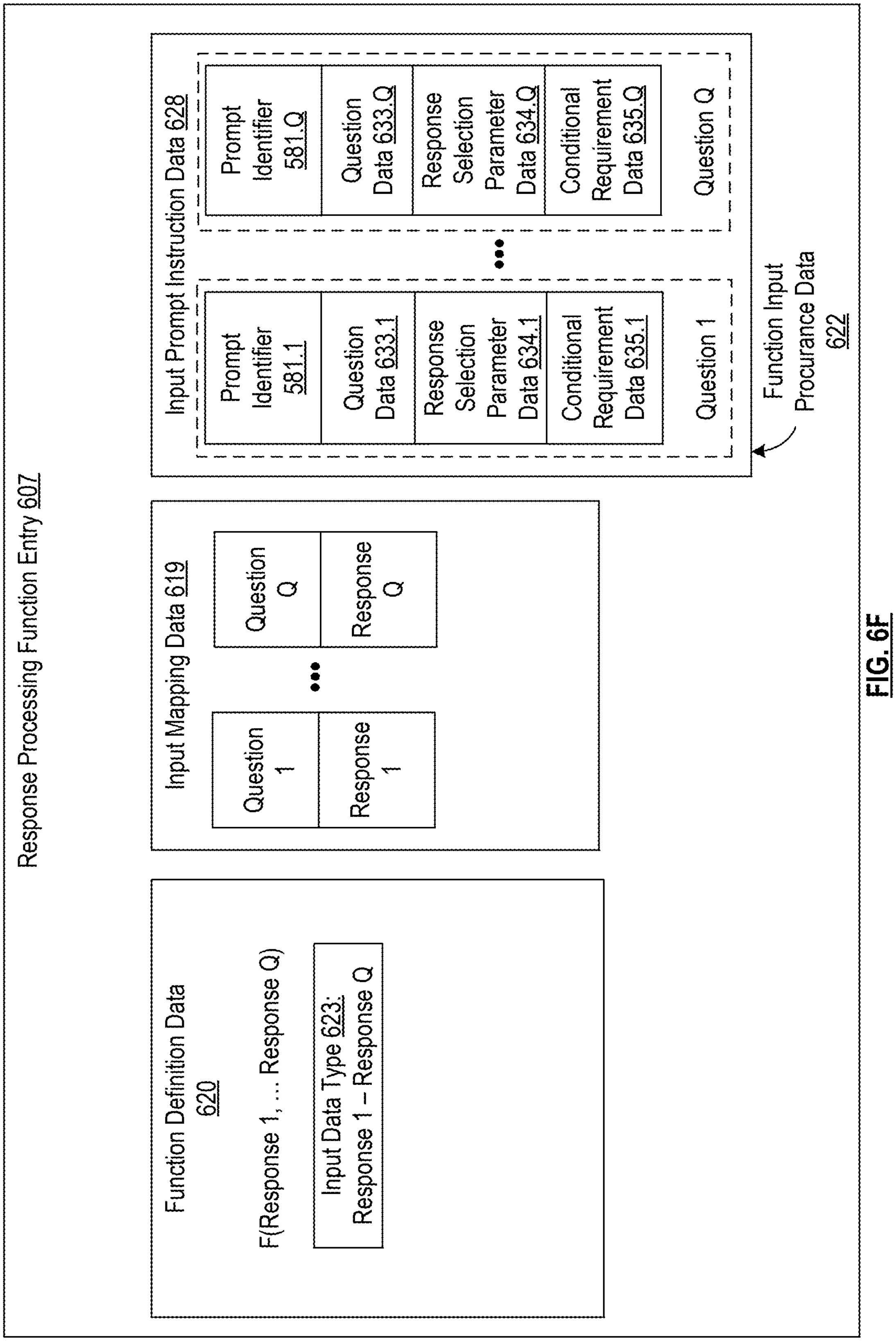
FIG. 6F illustrates data included in and/or indicated by a response processing function entry in accordance with various embodiments.

FIG. 6F illustrates an embodiment of a response processing function entry 607 for a corresponding response processing function that is operable to process response data, such as a set of responses 1-Q of any of the response data described herein. Note that different types of response data may have different types and/or numbers of responses Q, for example, based on different numbers of prompts being displayed for the different types of corresponding prompt data. Note that a same type of response data may have different types and/or numbers of responses Q for different users, for example, based on different numbers and/or types of prompts being displayed for the different users as a function of prior responses, where prompts are selected dynamically.

The input data type 623 of a document processing function entry 605 can correspond to a set of responses 1-Q. For example, the input data type 623 can denote a particular type of response data, corresponding to responses to a particular type of prompt data, upon which the response processing function is operable to be performed. The corresponding function definition can denote a function of some or all of the set of responses 1-Q, where the output of the function is generated based on some or all of the set of responses 1-Q.

Different response processing functions can be trained to and/or is operable to process different types of response data generated from different types of corresponding prompt data. For example: a first response processing function can be trained to and/or is operable to process responses 525.1-525.Q of application requirement response data 522; a second response processing function can be trained to and/or is operable to process responses 545.1-545.Q of risk factor response data 544; a third response processing function can be trained to and/or is operable to process responses 556.1-556.Q of service setup response data; and/or a fourth response processing function can be trained to and/or is operable to process responses 556.1-556.Q of communication initiation response data 565; and/or a fifth response processing function can be trained to and/or is operable to process responses of one or more other response data 582. Any of the other types of response data described herein can similarly be indicated in one or more response processing function entries 607, where one or more corresponding response processing functions are trained based on and/or are operable to process the corresponding type of response data.

The set of responses 1-Q of input data type 623 that are utilized to perform the corresponding response processing function can each be identified based on being mapped to a corresponding one of a set of questions 1-Q in input mapping data 619. For example, each question is identified with a corresponding prompt identifier 581 identifying the particular question from a plurality of possible questions stored by and/or accessible by the immigration assistance system.

This mapping of questions to prompt identifiers be ideal in embodiments where responses 1-Q by a user are received in multiple transmissions from the same or different client devices over time and/or are not received in accordance with a predefined ordering. For example, the user answers questions one at a time via client device 130, and responses to questions are transmitted to the immigration assistance system 100 by client device 130 as they are answered in multiple transmissions and/or transactions. As another example, some responses are received in conjunction with previous prompt data and are optionally accessed via accessing the user's response log data 517. As another example, the user logs out of their user account prior to answering all question 1-Q, and logs back in to the same or different client device at a later time to resume answering of questions from where they left off. As another example, different users answer different sets of questions from same prompt data based on dynamic selection of questions as a function of prior responses. In other embodiments, a user answers all of the set of questions 1-Q to render responses 1-Q, and responses 1-Q are sent to the immigration assistance system 100 in a same transmission and/or transaction based on all of the set of questions being answered.

As used herein a "question" can correspond to any prompt presented via interactive user interface 375, where a user selects a corresponding response via user input via client input device 350, for example, via one or more selections from a discrete set of options presented in conjunction with the prompt and/or as an unstructured response, such as text entered via a text box. Some questions as described herein can be presented as commands, instructions, fill in the blank prompts, and/or other constructs that are not necessarily constructed as an interrogative sentence and/or that do not end in a question mark.

A response processing function entry can optionally indicate input prompt instruction data 628, for example, that implements the function input procurance data 622. The indicate input prompt instruction data 628 can be utilized in conjunction with performance of the response processing function to denote which corresponding prompts be presented to a user to obtain the set of responses 1-Q required by input data, for example, as dictated by the input mapping data. For example, corresponding prompt data is sent to and/or presented to a user via interactive user interface 375 based on input prompt instruction data 628, where the corresponding set of responses 1-Q are received from the user in response.

For each of the set of questions 1-Q, input prompt instruction data 628 can indicate a corresponding prompt identifier 581 denoting the corresponding question, such as a name or unique code. Some or all questions of some or all possible prompts mapped to any of the responses of response data described herein can be mapped to a prompt identifier 581 in memory accessible by the immigration assistance system 100 to distinguish different questions that can be asked to the user and/or to further distinguish responses received from the user over time, for example, in response log data 517.

For each of the set of questions 1-Q, input prompt instruction data 628 can alternatively or additionally indicate a corresponding question data 633, response selection parameter data 634, and/or conditional requirement data 635. Note that the corresponding question data 633, response selection parameter data 634, and/or conditional requirement data 635 can be otherwise mapped to the prompt identifier 581, for example, in other memory accessible by the immigration assistance system.

The question data 633 of input prompt instruction data 628 for a given question can indicate data or instruction regarding display of the question itself, such a text data, image data, audio data, and/or video to be displayed as a prompt via interactive user interface 375. The response selection parameter data 634 can indicate data or instruction regarding display of response options and/or rules regarding the entering of responses by the user. For example, the response selection parameter data 634 indicates a discrete set of possible responses and/or indicates rules for entering a response via user input, such as a text limit of a text box. In some cases, a single question data 633 of a given question indicates multiple distinct questions to be presented in tandem, for example, in a same view of interactive user interface 375.

The conditional requirement data 635 can indicate additional requirements for whether or not the corresponding question be presented to the user and/or requirements for an ordering in which the question be presented to the user in relation to other questions. For example, questions are presented to a user one at a time, where the interactive user interface 375 presents question data 633 of a first question in a view of the interactive user interface 375, and the interactive user interface 375 only presents question data 633 of a second question in a view of the interactive user interface 375 only once the first question is answered by the user to render a corresponding response, based on conditional requirement data 635 indicating the questions be presented one at a time and/or indicating the second question be presented after the first question. In other embodiments, some or all questions are presented all at once in a same view of the interactive user interface 375 and/or can be answered by the user in any order.

While not illustrated, in some embodiments, the input prompt instruction data 628 can alternatively or additionally indicate response guide data for one or more questions 1-Q that can be displayed in conjunction with some or all question data 633, which can indicate text, images, videos, and/or hyperlinks to other websites indicating instructions, examples clarifications, or additional information regarding the corresponding question. In some embodiments, the response guide data can be large and/or lengthy, and is only displayed in response to the user clicking on, selecting, or otherwise interacting with a response guide prompt, such as an icon, displayed in conjunction with the corresponding question. When the user clicks on or otherwise indicates a selection to response guide prompt, the interactive user interface 375 can display the response guide data for the corresponding question. A response guide exit prompt 851 can displayed in conjunction with the response guide data, and when clicked on or otherwise selected, can cause the interactive user interface 375 to hide the response guide data, for example, when the user has completed reading the information or otherwise no longer needs this information. An example of response guide data, a corresponding response guide prompt, and a corresponding response guide exit prompt are illustrated in FIGS. 8M and 8N.

Figure 6G:
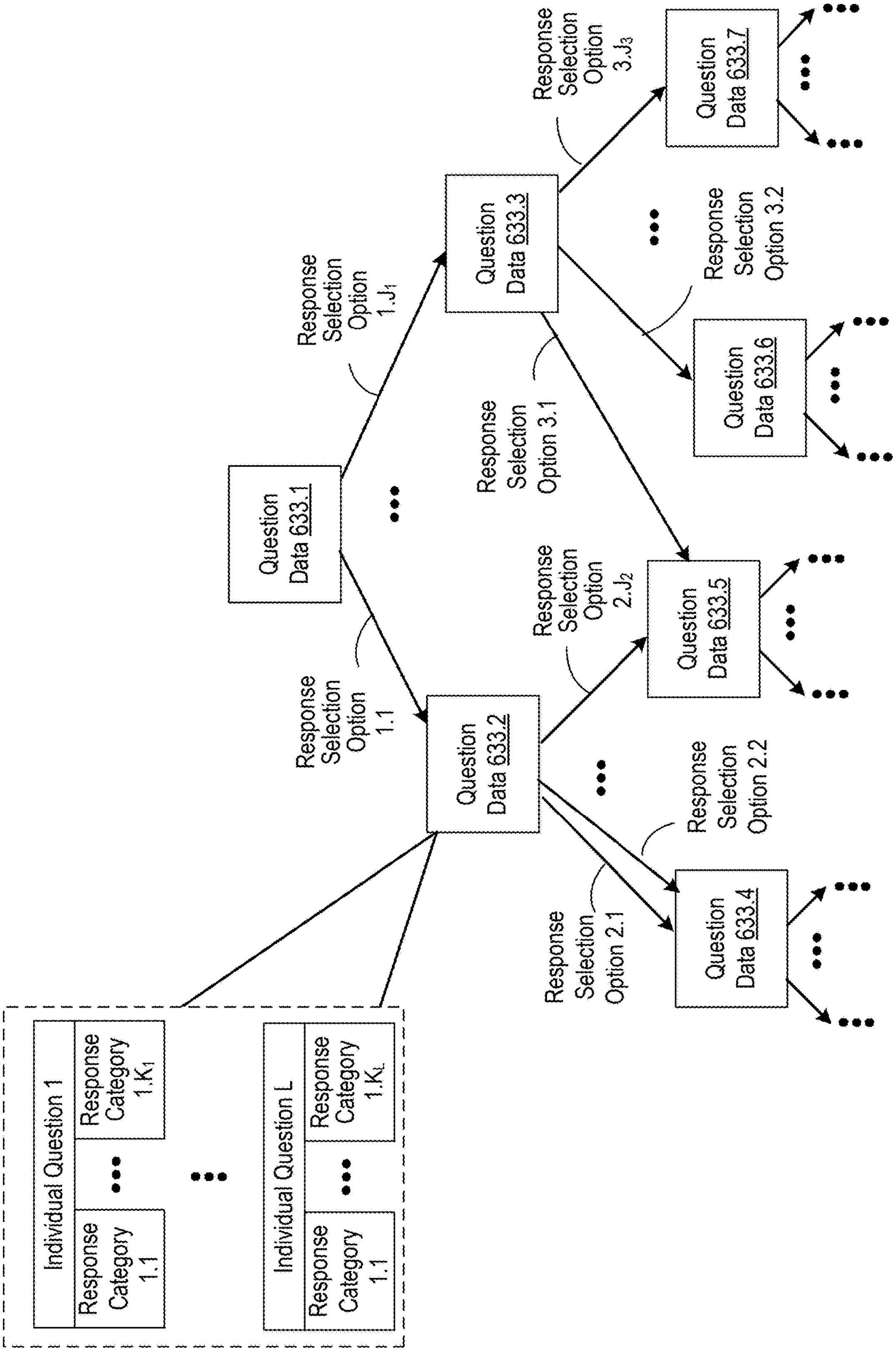
FIG. 6G illustrates an example relationship between question data indicated by input prompt instruction data in accordance with various embodiments.

FIG. 6G illustrates an example embodiment of input prompt instruction data 628 indicating that questions be presented dynamically as a function of responses to prior questions, in accordance with corresponding conditional requirement data 635. In some embodiments, the conditional requirement data 635 of input prompt instruction data 628 can optionally be stored and/or expressed as rules of a corresponding knowledge based system and/or expert system.

In this example, question data 633.1 is presented first and has a corresponding set of $J_1$ response selection options 1.1-1.$J_1$, as indicated by response selection parameter data 634.1. In this example, the one or more individual questions of question data 633.1 are always presented to the user and answered by the user, for example as a first set of one or more individual questions. However, the one or more individual questions of other question data 633 may not be presented or answered for some users based on their responses to question data 633.1 and/or to prior questions. For example, a second set of one or more individual questions presented to the user is automatically selected by the immigration assistance system 100 and/or client device 130 as a function of the one or more responses of the first set of individual questions.

In this example, when response selection option 1.1 is selected, question data 633.2 is presented and question data 633.3 is not presented, while when response selection option 1.$J_1$ is selected, question data 633.3 is presented and question data 633.2 is not presented. Other question data presented after question data 633.2 and/or question data 633.3 may similarly be presented or not presented based on responses to prior questions.

In some embodiments, that some question data, such as question data 633.5, have multiple conditions for being presented, where question data 633.5 is presented if response selection option 2.$J_2$ is selected for question data 633.2 or if response selection option 3.1 is selected for question data 633.3. In some embodiments, some question data, such as question data 633.4, will be presented if any one of a set of multiple different response selection options are selected.

In some embodiments, the same or different numbers of response selection options J can be possible for one or more question data 633. In some embodiments, a given question data 633 can include a single individual question, or can include multiple individual questions L. Different question data 633 can have same or different numbers of individual questions L. Each individual question can have possible responses corresponding to K possible response categories, where different individual questions can have different numbers and/or sets of possible responses K. K can correspond to the number of discrete options when the user must select a single option. K can correspond to a number of possible selections from a discrete set of options when the user must select multiple ones of the set of options. K can correspond to a number of other categories that the response, such as text data or other unstructured response data, can be classified within, for example, as output of a classification function and/or natural language processing function. The number of response selection options J of given question data can be equal to and/or based on a sum of numbers of response categories K across all of the individual questions L. In some cases, multiple different response selection options are grouped in a same response selection options based on rendering a same next question data 633 be presented.

In some embodiments, the selection of questions is based on other information previously received from and/or determined for the user. For example, the set of questions presented to the user is based on extracted data 539, prior response data 582 in response log data 517, and/or other information that is: accessed in the user's user account 165; generated for the user, received from a client device of the user, and/or otherwise determined for the user. For example, question 633.1 and the corresponding set of response selection options of FIG. 7H can be instead implemented as a set of predeterminable options 1.1-1.$J_1$, where one predeterminable option 1.1 is automatically determined based on this information previously received from and/or determined for the user, and where question data 633.2 is selected and presented to the user as a first set of one or more individual questions based on predeterminable option 1.1 being determined for the user.

In some embodiments, based on this dynamic selection of questions presented to a given user, the user does not supply a response to at least one of the questions 1-Q of FIG. 6F, based on the corresponding question data 633 of the corresponding question not being presented to the user due to the corresponding conditional requirement data 635 not having been met. In such embodiments, the function definition data can apply a predetermined or null value and/or other data to responses that are not received based on the corresponding question being automatically selected to not be presented. The function definition data 620 can otherwise indicated how particular responses with no received data be treated in performing the corresponding response processing function.

Figure 6H:
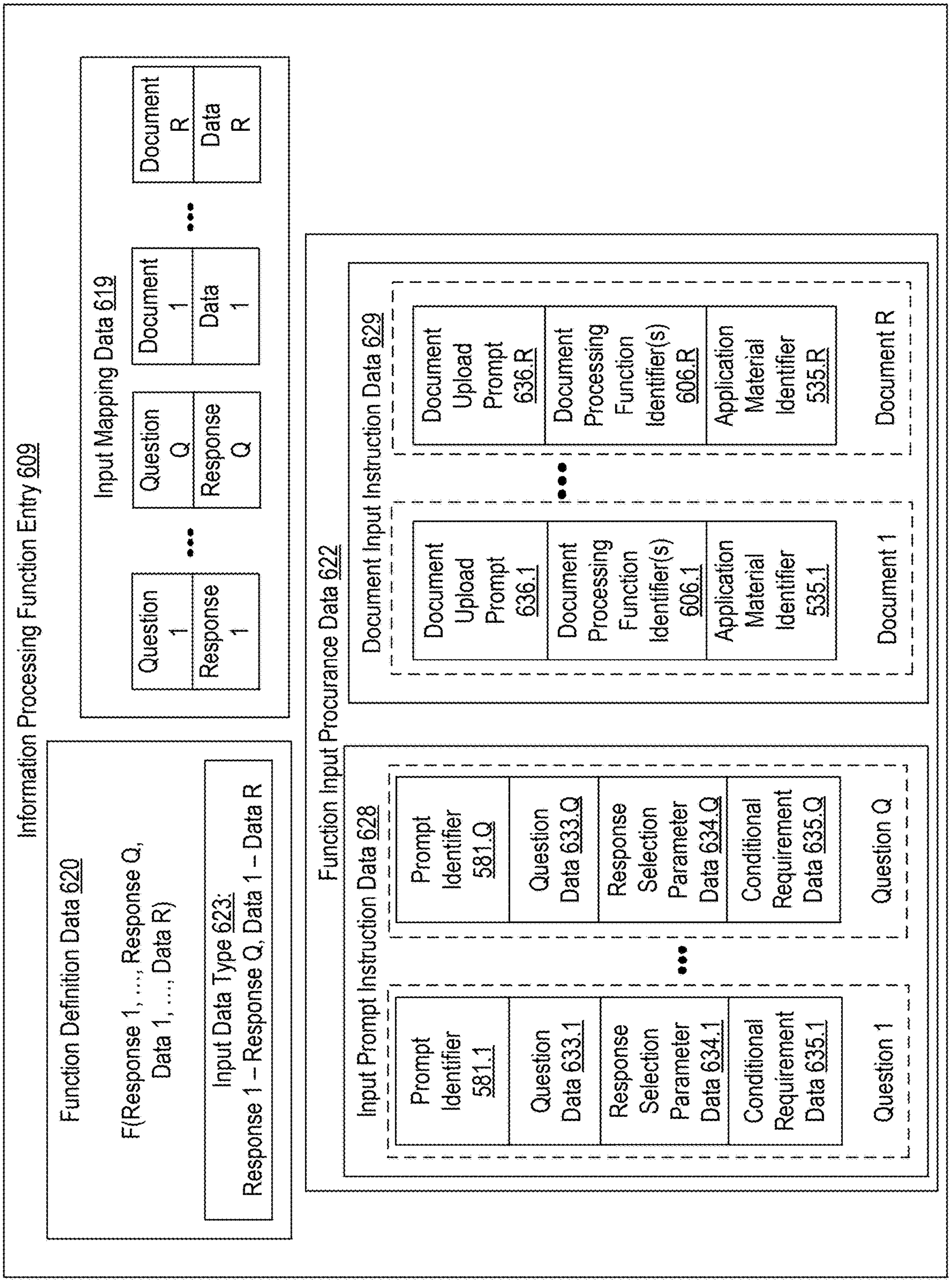
FIG. 6H illustrates data included in and/or indicated by an information processing function entry in accordance with various embodiments.

FIG. 6H illustrates an example embodiment of an information processing function entry 609. An information processing function can be operable to process responses and/or documents to generate output. In particular, the function definition data 620 can indicate output be generated as a function of a set of responses 1-Q and/or a set of data 1-R.

Each of the set of responses 1-Q can correspond to corresponding questions, for example, as indicated in input mapping data 619 and/or as discussed in conjunction with FIG. 6F. Input prompt instruction data 628 can be included in function input procurance data 622, and can be implemented in a same or similar fashion as the input prompt instruction data 628 of FIG. 6F. In some cases, the information processing function entry 609 can indicate function calls to and/or can otherwise identify a corresponding response processing function of a response processing function entry 607.

Each of the set of data 1-R can correspond to a corresponding one or a set of documents 1-R. Given data of a corresponding document can include extracted information and/or other data generated by processing a corresponding document, for example, via a corresponding document processing function.

In some embodiments, the function input procurance data 622 can indicate document input instruction data 629 that indicates document upload prompts 636 for each of the set of R documents; corresponding application material identifiers 535 for each of the set of R documents; and/or document processing function identifiers 606 for each of the set of R documents. Each data R can be generated based on: receiving a document of the corresponding type of application material denoted by application material identifier 535 in response to corresponding document upload prompt 636 being displayed via interactive user interface 375; and processing the document via the document processing function denoted by the document processing function identifier to generate the corresponding data.

In some cases, the document has already been uploaded and/or was generated by the immigration assistance system 100, and can be accessed rather than being reuploaded via the document upload prompt 636, for example, based on being accessed in user account 165. In some cases, the data has already been generated for the document, for example, as an application material 531; verification data 537; requirement adherence data 538; and/or extracted data 539 that was previously generated via prior performance of the corresponding document processing function denoted by the document processing function identifier 606.

Some information processing functions only generate output as a function of responses. For example, a response processing function entry 607 can be implemented as an information processing function entry 609 that processes only responses to questions, and not document data. Some information processing functions only generate output as a function of document and/or corresponding data. For example, a document processing function entry 605 can be implemented as an information processing function entry 609 that processes only document and/or corresponding data, and not responses to questions.

Figure 6I:
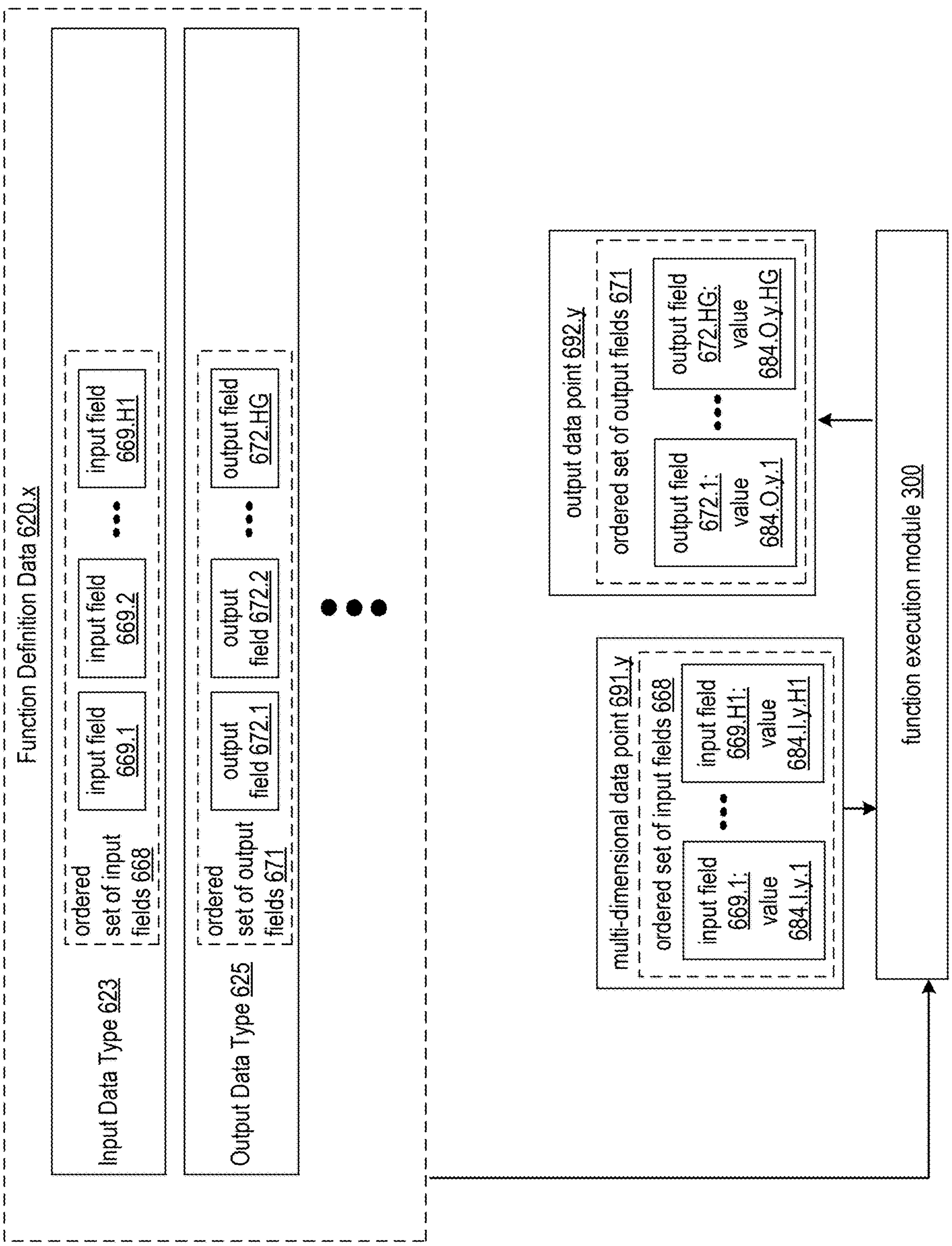
FIG. 6I illustrates an embodiment of a function execution module that applies function definition data to generate an output data point based on processing a multi-dimensional input point in accordance with various embodiments.

FIG. 6I illustrates an embodiment of a function execution module 300 processing given function definition data 620.*x* for a given function (e.g. any given function having an entry 175 in function library 172 and/or any other function/process/method described herein). Some or all features and/or functionality of function definition data 620 of FIG. 6I can implement any embodiment of function definition data 620 described herein. Some or all features and/or functionality of function execution module 300 can implement any embodiment of executing any function described herein. The function execution module 300 can be implemented via at least one processor 22 and/or via any other processing and/or memory resources of computing system 10 and/or computing device 13.

The input data type 623 of given function definition data 620 can indicate at least one ordered set of input fields 668 that includes a set H1 of input fields 669.1-669.H1 having corresponding values that are processed in executing the given corresponding function. Each input field 669 can correspond to a given piece of information (e.g. included in a user account, extracted from a document file, included in a response to a prompt, etc.). As one example, the set of input fields correspond to a set of responses for a set of prompts. As one example, the set of input fields correspond to a set of different information extracted from one or more document files (e.g. received from a computing device and/or read from user account data). As another example, the set of input fields correspond to a set of different information of one or more fields of user account data (e.g. read from user account data and/or processed in conjunction with populating corresponding user account data).

The ordered set input fields 669.1-669.H1 can include exactly one input field (e.g. H1 equals 1) or multiple different input fields (e.g. H1 is strictly greater than 1). The number and/or type of input fields 669 in the order set of input fields 668 can be the same or different for various different function definition data 620 of various different functions described herein.

In some embodiments, some functions do not require a fixed set of input values and can be executed upon a set of input values that includes a variable number of input values (e.g. natural language text data, image data or document files of varying sizes). In some embodiments, such functions include a first one or more sub-functions (e.g. of other function entries 175) utilized to extract a fixed set of data of a fixed size from variable length data and/or include a second one or more sub-functions (e.g. of other function entries 175) that process this extracted fixed-size data as input.

Alternatively or in addition, the output data type 625 of given function definition data 620 can indicate at least one ordered set of output fields 668 that includes a set of output fields 672.1-672.HG having corresponding values that are generated in executing the given corresponding function. Each output field 669 can correspond to a given piece of information (e.g. that includes at least one portion of text data, image data, document file(s) generated for inclusion in a user account and/or generated for inclusion in a document file, risk assessment score 541 and/or estimated length of time for application to be processed, etc.). As one example, at least some of the set of output fields correspond to a set of prompts. As another example, at least some of the set of output fields correspond to a set of different information for inclusion in one or more document files and/or to be written to user account data. As another example, at least one of the set of output fields indicates a risk assessment store 541. As another example, at least some of the set of output fields correspond to information to be included in and/or utilized to generate machine executable instructions to be sent do and/or executed by a corresponding computing device. As another example, at least some different ones of the set of output fields correspond to different pixel of digital image data and/or digital display data. As another example, at least some of the set of output fields correspond to information to be sent to a corresponding computing device for display and/or processing.

The ordered set output fields 672.1-672.HG can include exactly one output field (e.g. HG equals 1) or multiple different input fields (e.g. HG is strictly greater than 1). The ordered set output fields 672.1-672.HG can include a same or different number of fields as the ordered set of input fields 671.1-671.H1 (e.g. HG can be equal to H1 or unequal to H1). The number and/or type of output fields 672 in the order set of output fields 671 can be the same or different for various different function definition data 620 of various different functions described herein.

In some embodiments, some functions do not generate a fixed set of output values and can be executed to generate a set of output values that includes a variable number of output values (e.g. natural language text data, image data or document files of varying sizes). In some embodiments, such functions include a first one or more sub-functions (e.g. of other function entries 175) utilized to generate variable length data and/or include a second one or more sub-functions (e.g. of other function entries 175) that process this extracted variable length data as input to generate fixed-size output. In some embodiment, such functions apply repeated execution of a given sub-function (e.g. iteratively and/or recursively) to generate subsequent sub-output as a function of previous sub-output (e.g. natural text is generated one word/text portion at a time, for example serially where new text is appended to the end of and/or is concatenated with the previously generated text, and/or where a set of text generated so far is processed as input to a given sub-function to generate a subsequent set of text as a superset of this processed set of text, and/or this subsequent set of text is further processed to processed as input to this given sub-function in a further execution of this given sub-function to generate a further subsequent set of text as a superset of this processed subsequent set of text, and so on).

A function execution module 300 can be implemented to execute a given function x upon given input data via applying/accessing/reading its respective function definition data 620 to generate respective output data via processing the given input data as defined in the function definition data 620.*x*.

Function execution module 300 can be implemented via any processing and/or memory resources described herein, such as one or more processors 22 and/or 32 and/or one or more memories 21 and/or 31. Function execution module 300 can implement parallelized processing to process a given multi-dimensional data points 691.*y* to generate corresponding output data point 692.*y* via a plurality of corresponding parallelized processes, and/or can implement parallelized processing to process multiple given multi-dimensional data points 691.*y* to generate multiple corresponding output data points 692.*y* (e.g. for different users) contemporaneously via a plurality of corresponding parallelized processes.

The function definition module 300 can generate at least one given output data point 692.*y* (e.g. having values 684 corresponding to the at least one ordered set of output fields 671) as a function of at least one given multi-dimensional data point 691.*y* (e.g. having values 684 corresponding to the at least one ordered set of input fields 668). The function definition module 300 can be applied multiple times (e.g. contemporaneously and/or over time) to execute the function x upon various different input (e.g. different corresponding multi-dimensional data points 691, for example, corresponding to different users) to generate various different output (e.g. different corresponding output data points 692, for example, corresponding to the different users).

A given multi-dimensional data point 691.*y* (e.g. corresponding to a given user and/or otherwise corresponding to given input for a given instance of executing the respective function having function definition data 620.*x*) can have a set of values 684.I.y.1-684.I.y.H1 for its set of input fields (e.g. particular values identified for the set of input fields, for example, based being included in and/or extracted from communications received from a corresponding computing device, based on being accessed in the user account for the corresponding user, etc.).

Different instances of executing the respective function having function definition data 620.*x* can have different values 684 for some or all input fields (e.g. based on the corresponding multi-dimensional data points being generated to include different values identified for the set of input fields, for example, based on being included in and/or extracted from different data, such as other communications received from other corresponding computing devices, other communications received from the same computing device at other times; other user accounts for other corresponding users, etc.). In some embodiments, data point 691 is optionally not multi-dimensional (e.g. based on having only one value 684 for one input field, for example, in the case where H1 is equal to one).

A given multi-dimensional data point 691.*y* can correspond to a point in H1 dimensional space, where each dimension corresponds to a corresponding one of the set of input fields. Alternatively or in addition, a given multi-dimensional data point 691.*y* can correspond to, can represent, and/or can be utilized to generate at least one corresponding vector (e.g. including the values 684.I.y.1-684.I.y.H1, for example, in the specified order dictated by the ordered set of input fields 668), such as a feature vector or other input vector.

A given output data point 692.*y* (e.g. corresponding to a given user and/or otherwise corresponding to given output for a given instance of executing the respective function having function definition data 620.*x* upon the respective given input 691.*y*) can have a set of values 684.O.y.1-684.O.y.HG for its set of output fields (e.g. particular values identified for the set of output fields, for example, each generated as a function of processing some or all values 681.I.y.1-684.O.y.H1 of the given multi-dimensional data point 691.*y*).

Different instances of executing the respective function having function definition data 620.*x* can have different values 684 for some or all output fields (e.g. based on processing different multi-dimensional data points 691 each having different sets of values for their ordered set of input fields etc.). In some embodiments, data point 691 is optionally multi-dimensional (e.g. based on having multiple values 684 for multiple output fields, for example, in the case where HG is strictly greater than one). In some embodiments, data point 692 is optionally not multi-dimensional (e.g. based on having only one value 684 for one output field, for example, in the case where HG is equal to one).

A given output data point 691.*y* can correspond to a multi-dimensional data point 691.*y* in HG dimensional space, where each dimension corresponds to a corresponding one of the set of output fields. Alternatively or in addition, a given multi-dimensional data point 691.*y* can correspond to, can represent, and/or can be utilized to generate at least one corresponding vector (e.g. including the values 684.O.y.1-684.O.y.HG, for example, in the specified order dictated by the ordered set of input fields 668).

Figure 6J:
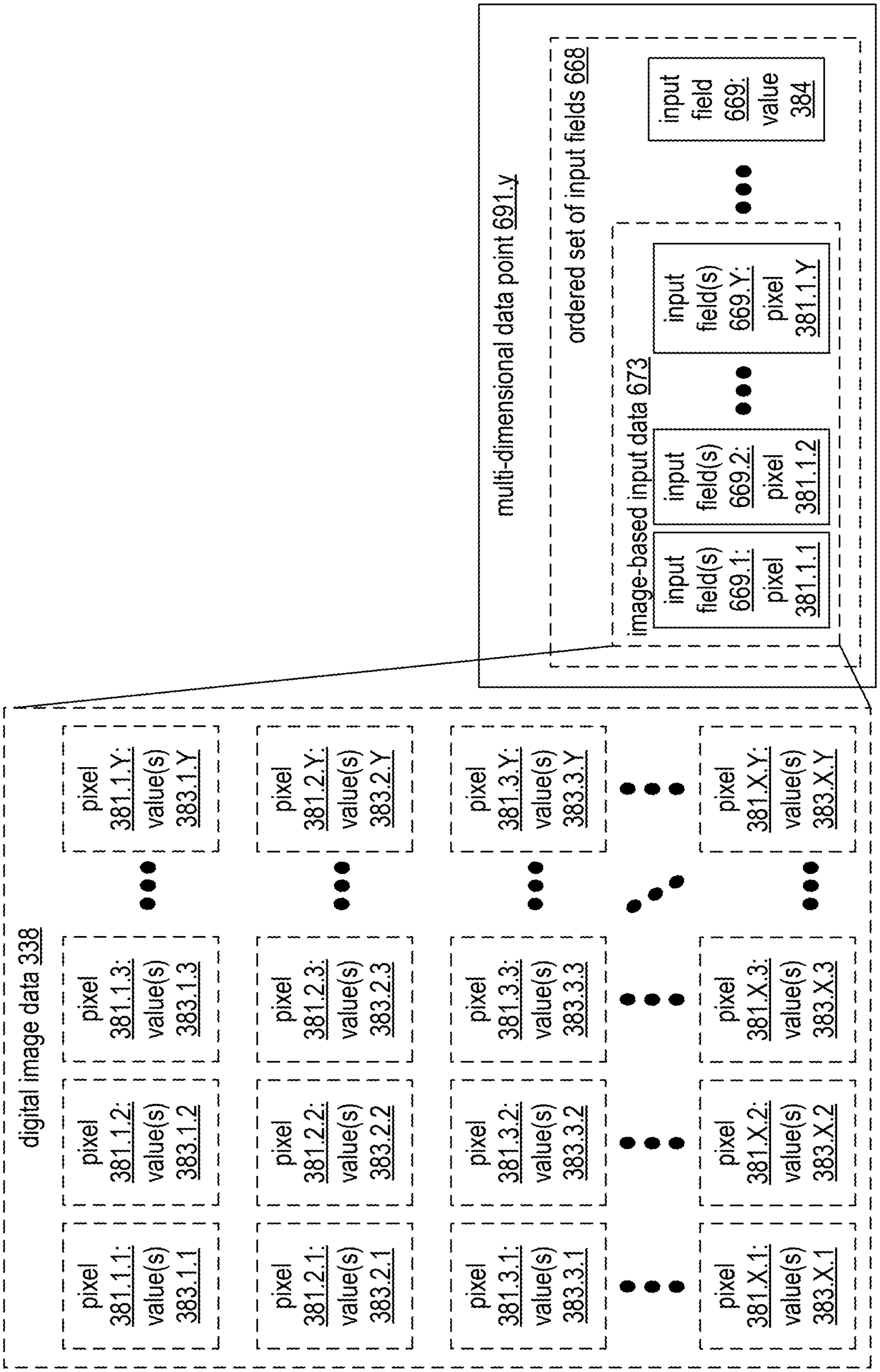
FIG. 6J illustrates an embodiment of a multi-dimensional data point that includes values of pixels of digital image data in accordance with various embodiments.
Figure 6K:
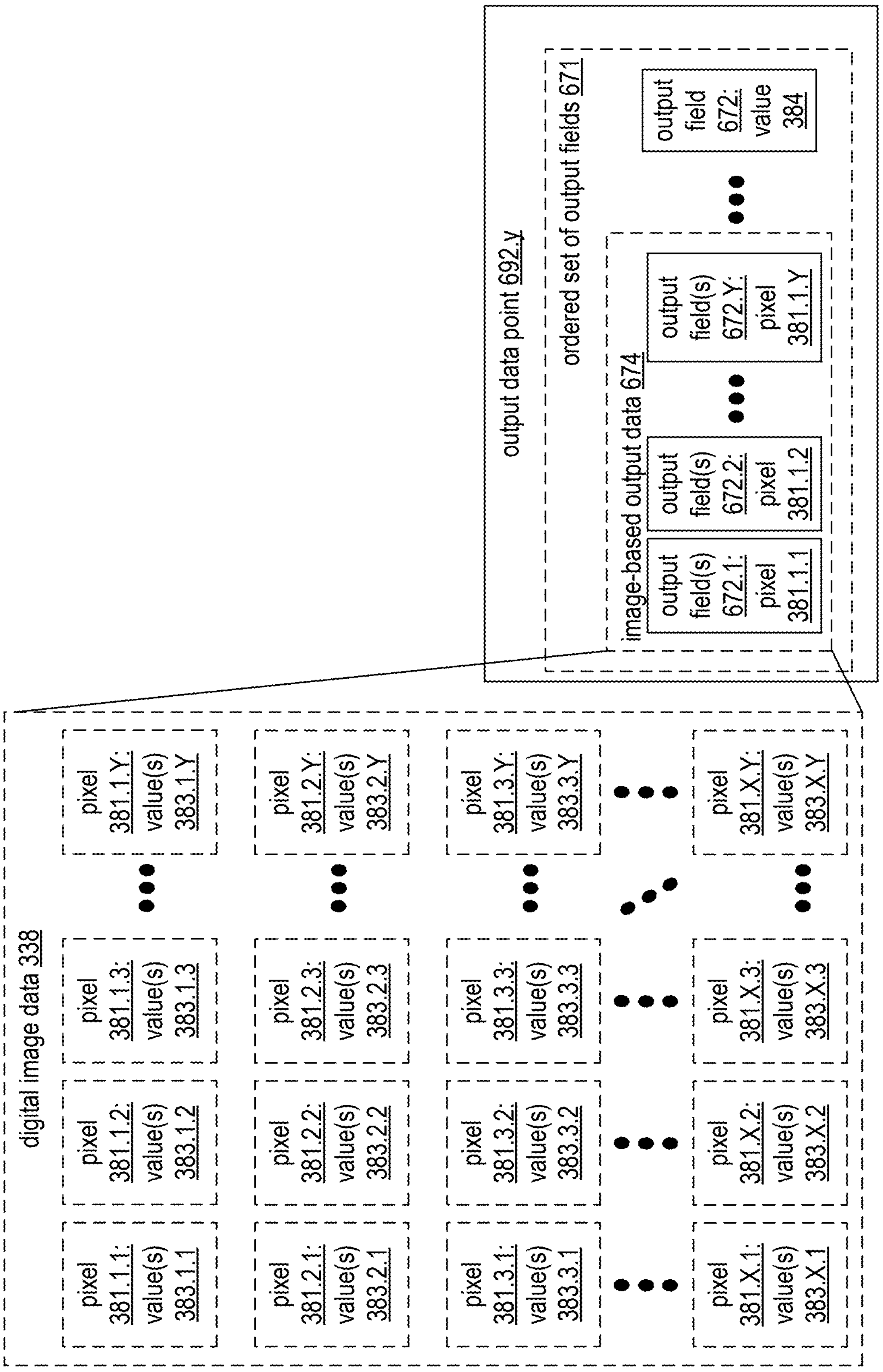
FIG. 6K illustrates an embodiment of an output data point that includes values of pixels of digital image data in accordance with various embodiments.
Figure 6L:
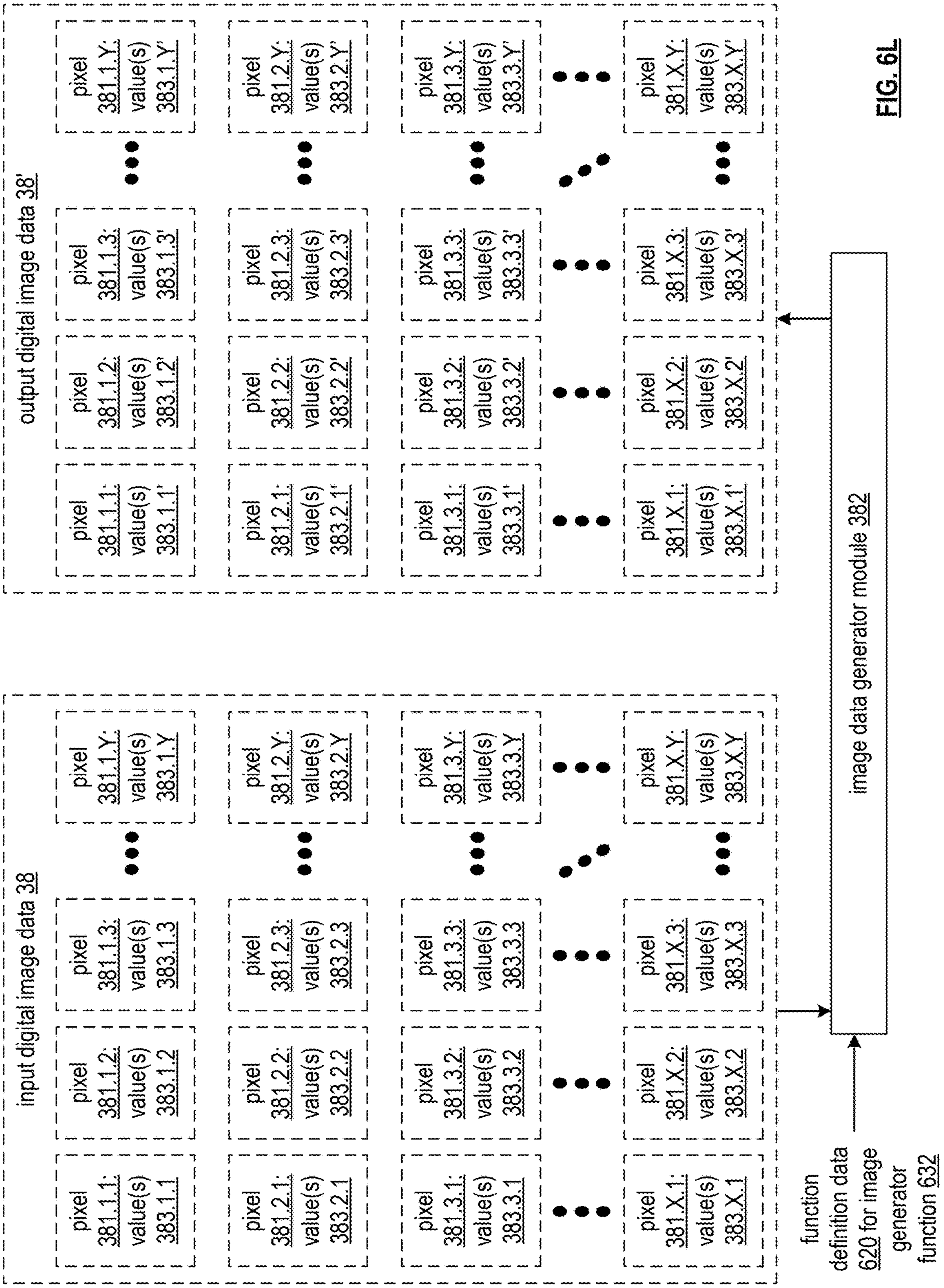
FIG. 6L illustrates an embodiment of an image data generator module that generates output digital image data based on applying function definition data for an image generator function in accordance with various embodiments.

FIGS. 6J-6L illustrate embodiment where digital image data 338 is included/reflected in input and/or output of at least one function executed via a corresponding function execution module 300.

Any embodiment of digital image data or image data described herein can be implemented as digital image data 338. Any embodiment of digital image data or image data described herein can be implemented in a same or similar fashion as any embodiment of digital display data described herein such as digital display data 38, for example, even if not ultimately displayed via a display device. Any embodiment of digital display data 38 described herein can be generated as and/or based on processing corresponding digital image data 338.

Digital image data 338 can include any image data, such as any image data described herein. Digital image data 338 can include any digital image data captured via an image capture device (e.g. a scanner and/or camera, such as a camera 36 of a computing device that generated and/or transmitted the given digital image data 338). For example, given digital image data 338 can visually depict a physical document, for example, based on the physical document being proximity to the image capture device when the respective digital image data was generated via activation of the image capture device. As another example, the given digital image data 338 visually depicts an anatomical feature of a person, for example, based on the physical document being proximity to this person when the respective digital image data was generated via activation of the image capture device, where this person corresponds to a respective user having a user account that optionally includes this digital image data. In some embodiments, a document file can be digitally encoded document files generate to include the respective digital image data 338. In some embodiments, given digital image data 338 is extracted from a digitally encoded document file (e.g. any file 319 and/or document file 532 described herein) based on decoding the digitally encoded document file, for example, for processing as input in executing a respective function x via function execution module 300. In some embodiments, a digitally encoded document file (e.g. any file 319 and/or document file 532 described herein) is generated to include given digital image data 338 based on encoding the given digital image data 338, for example, after generating the respective digital image data 338 as output of executing a respective function x via function execution module 300.

Given digital image data 338 can be represented as a set of pixel values 383 for each of a set of pixels 381.1.1-381.X.Y. For example, digital image data 338 can have X rows and/or Y columns. In some embodiments, each pixel value includes multiple values (e.g. is itself a multi-dimensional data point and/or is itself a vector of multiple values). Various different digital image data 338 can be processed in input of a same given function or various different functions and/or can be generated in output of a same given function or various different functions. Some or all of the various different digital image data 338 can be the same or different size (e.g. have a same or different number of pixels in the same or different number of rows and/or columns).

Different functions can be operable to process digital image data of same or different fixed sizes as input (e.g. a given image processing function processes digital image data having a given number of rows and columns of pixels, which can be the same or different number of rows or columns of pixels for digital image data another given image processing function is configured to process). Some functions are optionally operable to process variable sized image data (e.g. having any number of rows and/or column of pixels). Such processing of variable sized image data can optionally include executing a first sub-function to generating intermediate image data having a fixed number of rows and columns (e.g. via modifying the resolution/aspect ratio of the variable sized input) and/or based on executing a second-sub-function to processed the fixed-size image data to generate output.

Different functions can be operable to generate digital image data of same or different fixed sizes as output (e.g. a given image processing function generates digital image data having a given number of rows and columns of pixels, which can be the same or different number of rows or columns of pixels for digital image data another given image processing function is configured to generate). Some functions are optionally operable to generate variable sized image data (e.g. having any number of rows and/or column of pixels), for example, as a function of the size of image data processed as input to the respective function.

FIG. 6J illustrates an embodiment where multi-dimensional data point 691.*y* is implemented to include at least some of its set of values 684 as image-based input data 673, generated as and/or based on pixel values 383 of some or all of the set of pixels 381.1.1-381.X.Y. of digital image data 338 having X rows and/or Y columns. In embodiments where each pixel value includes multiple values (e.g. is itself a multi-dimensional data point and/or is itself a vector of multiple values), the ordered set of input fields 668 can include a set of multiple (e.g. 3) different input fields 669 for each pixel 381 (e.g. optionally grouped together to indicate a corresponding pixel). The ordering of the ordered set of input fields 668 can be based on (e.g. be a predetermined function of) an arrangement of the respective pixel (e.g. based on their respective indexes, for example, as a function of a corresponding row index value and column index value indicating in which of the X rows and in which of the Y columns a given pixel is located, respectively). For example, pixels in a same row are adjacent input fields and/or pixels in a same column are adjacent input fields.

FIG. 6K illustrates an embodiment where output data point 692.*y* is implemented to include at least some of its set of values 684 as image-based output data 674, generated as and/or based on pixel values 383 of some or all of the set of pixels 381.1.1-381.X.Y of digital image data 338 having X rows and/or Y columns. In embodiments where each pixel value includes multiple values (e.g. is itself a multi-dimensional data point and/or is itself a vector of multiple values), the ordered set of input fields 668 can include a set of multiple (e.g. 3) different input fields 669 for each pixel 381 (e.g. optionally grouped together to indicate a corresponding pixel). The ordering of the ordered set of output fields 669 can be based on (e.g. be a predetermined function of) an arrangement of the respective pixel (e.g. based on their respective indexes, for example, as a function of a corresponding row index value and column index value indicating in which of the X rows and in which of the Y columns a given pixel is located, respectively). For example, pixels in a same row are adjacent input fields and/or pixels in a same column are adjacent input fields.

FIG. 6L illustrates an embodiment of a digital image data generator module 382 that executes an image generator function 632 based on applying its respective function definition to generate output digital image data 38', for example, based on processing input digital image data 38 and/or other value 384 of a respective multi-dimensional data point 691. The pixel values 383' for some or all pixels 381 of output digital image data 38' can be different from the pixel values 383 for some or all of these pixels 381 of the input digital image data, where output digital image data 38' is thus different from input digital image data 38. The output digital image data 38' can have a same or different number of rows and/or columns from input digital image data 38. The output digital image data can be generated as a modified version of input digital image data 38 and/or an entirely new image. Output digital image data can be generated based on performing at least one affine transformation and/or other transformation upon the input digital image data. For example the transformation is performed to shift, rotate, crop, enhance colors, etc.

Some or all features and/or functionality of image data generator module 382 can implement any embodiment of executing any function described herein. The image data generator module 382 can be implemented via at least one processor 22 and/or via any other processing and/or memory resources of computing system 10 and/or computing device 13.

Output digital image data can be generated based on modifying only a proper subset of adjacent or non-adjacent pixels of the input digital image data. Output digital image data to indicate the input digital image data with a detected portion of the input digital image data highlighted (e.g. via identifying and modifying the respective pixel values for at least one color by a particular amount as a linear or nonlinear function of its current pixel value), circled (e.g. via identifying and modifying pixel values outside of the detected portion and having index values collectively creating a circular shape to all have a same pixel value corresponding to a particular color, as black or red), enclosed in a polygon shape (e.g. via identifying and modifying pixel values outside of the detected portion and having index values collectively creating a polygon shape such as a rectangular shape to all have a same pixel value corresponding to a particular color, as black or red), pointed to (e.g. via identifying and modifying pixel values included in and/or adjacent to of the detected portion and having index values collectively creating a line shape and/or arrow all have a same pixel value corresponding to a particular color, as black or red), or otherwise visually drawing attention to this detected set of pixels via identification and modification of values of some or all of this detected set of pixels and/or adjacent pixels/pixels with indexes in proximity to these pixels, while keeping values of some or all other pixel values of other pixels not included in/adjacent to/in proximity to these detected pixels the same.

The detected portion of the input digital image data can be identified via performance of the same or different function upon the digital image data 38 to automatically identifying a set of pixels meeting/comparing favorably to particular values/criteria for detection. This can include not meeting/comparing unfavorably to predetermined image requirement data configured for the respective function.

The detected portion of the input digital image data can be identified based on generating visual marker detection data indicating a subset of pixels visually conveying at least one predetermined visual marker in the digital image data 38 (e.g. a face, a portion of a face, sunglasses, headwear, eyes, a chin, a forehead, a watermark of a document, a signature of a document, a background of the image, an outline/border of a document, at least one field of a document detected based on predetermined spatial arrangement data that is configured based on a standardized spatial layout of a plurality of different user fields in a particular type of document, such as a passport, birth certificate, driver's license, national registration document, social security card, transcript, document administered by an academic institution, or any other physical document/hard copy document and/or any application material type described herein, etc.)

Executing the image generator function via image data generator module 382 can include generating at least one of: a size offset value based on a measured size difference between a predetermined size of the predetermined visual marker and a detected size of the subset of pixels in the digital image data 38; a horizontal position offset value based on a measured horizontal position difference between a predetermined horizontal position of the predetermined visual marker and a detected horizontal position of the subset of pixels in the first digital image data; a vertical position offset value based on a measured vertical position difference between a predetermined vertical position of the predetermined visual marker and a detected vertical position of the subset of pixels in the first digital image data; and/or an orientation offset based on a measured orientation difference between a predetermined orientation of the predetermined visual marker and a detected orientation of the at least one predetermined visual marker in the subset of pixels. Executing the image generator function via image data generator module 382 can include performing an affine transformation is performed upon the two-dimensional arrangement of the first plurality of pixels as a function of at least one of: the size offset value, the horizontal position offset value, the vertical position offset value, or the orientation offset value.

Executing the image generator function via image data generator module 382 can include executing a pixel value modification function upon pixel values of the plurality of pixel values of image data 38 to generate the digital image data 38' having different pixel values for some or all pixels, for example, as a function of a color hue offset value. The pixel value modification function can be a linear or non-linear function of pixel value. Executing the image generator function via image data generator module 382 can include generating the a color hue offset value based on a measured color difference between predetermined color data of the orientation of the predetermined visual marker and detected color data of the at least one predetermined visual marker in the subset of pixels.

Figure 6M:
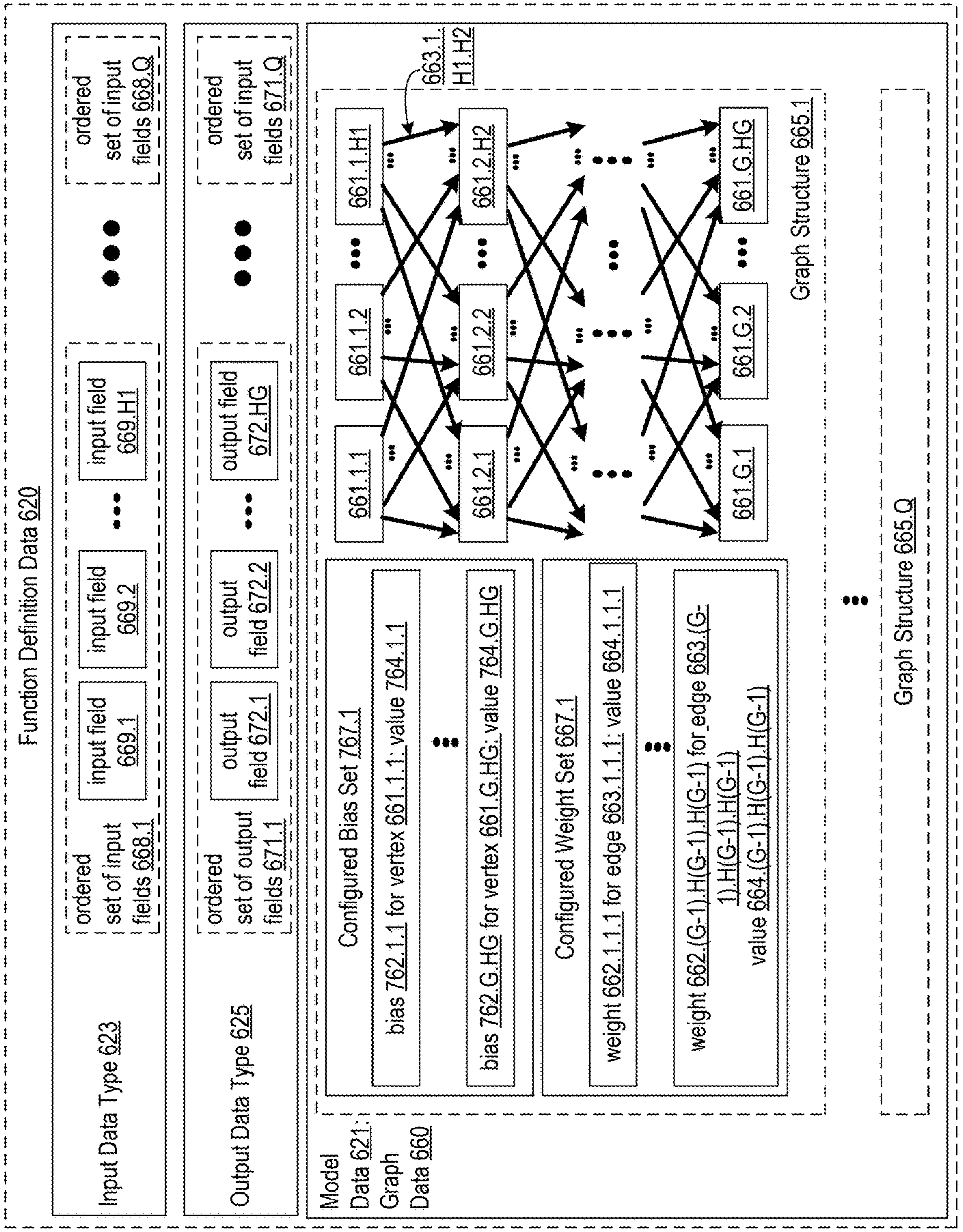
FIG. 6M illustrates an embodiment of function definition data that includes graph data in accordance with various embodiments in accordance with various embodiments.

FIG. 6M illustrates an embodiment of function definition data 620 that includes graph data 660 (e.g. indicated by its respective model data 621) indicating at least one graph structure 665. Some or all features and/or functionality of function definition data 620 of FIG. 6M can implement any embodiment of function definition data 620 for any function (e.g. any function of function library 172) described herein. Any function described herein can be executed based on utilizing corresponding graph data (e.g. based on accessing the corresponding graph data in memory such as memories 21 and/or storage system 85).

A given graph structure 665 can include a plurality of vertices 661 (e.g. nodes) of the respective graph structure, where various vertices 661 are connected via corresponding edges 663 of the graph structure 665 (e.g. directed edges from one vertex to another as illustrated via the arrows of FIG. 6M). In some embodiments, the graph structure 665 can include hundreds, thousands, and/or millions of edges 663 and/or vertices 661.

Each given vertex of the plurality of vertices can correspond to a particular computation that be applied to respective input to this given vertex (e.g. "received" along a respective set of incoming edges, each depicted as having arrows pointing to the given vertex from another vertex) to generate its output (e.g. "emitted" along each of respective set of outgoing edges, each depicted as having arrows pointing from the given vertex to another vertex).

A first proper subset of the plurality of vertices 661 can correspond to a set of H1 input vertices, for example, based on the given graph structure 665 being trained/configured to process H1 input values of a corresponding ordered set of input fields 668. Input to the set of H1 input vertices (e.g. input to the graph structure as a whole) can correspond to a corresponding set of values, for example, of the ordered set of input fields 668 for a given multidimensional point (e.g. for a given user), where each value is applied as input to one corresponding vertex and/or where the number of input vertices H1 corresponds to the number of input fields in the ordered set of input fields. In some embodiments, the number of input fields includes dozens, hundreds, thousands, and/or millions of fields, inducing dozens, hundreds, thousands, and/or millions of input vertices H1 of the graph structure.

A second proper subset of the plurality of vertices 661 can correspond to a set of HG output vertices, for example, based on the given graph structure 665 being trained/configured to process HG input values of a corresponding ordered set of output fields 671. Output of the set of HG output vertices (e.g. output of the graph structure as a whole) can correspond to a corresponding set of values, for example, of the ordered set of output fields 671 computed for a given multidimensional point (e.g. for a given user), for example, as inference data, where each value is generated as output of one corresponding vertex and/or where the number of output vertices HG corresponds to the number of output fields in the ordered set of output fields. In some embodiments, the number of output fields includes dozens, hundreds, thousands, and/or millions of fields, inducing dozens, hundreds, thousands, and/or millions of output vertices HG of the graph structure.

The plurality of vertices 661 can be dispersed across G levels (e.g. layers) of the graph structure. The H1 input vertices of the first proper subset of the plurality of vertices 661 can be included in a first level of the graph structure. The HG output vertices of the first proper subset of the plurality of vertices 661 can be included in a Gth level of the graph structure. At least one additional level between the $1^{st}$ level and the Gth level can be implemented as internal (e.g. hidden) levels of the graph structure. Different levels can have same or different numbers of vertices H. For example, each level of the graph includes a corresponding proper subset of the plurality of vertices, where a plurality of proper subsets of the plurality of vertices each include the respective set of vertices included in a corresponding level, and where this plurality of proper subsets of the plurality of vertices are mutually exclusive and collectively exhaustive.

In some embodiments, outgoing edges 663 (e.g. depicted by arrows pointing away from the respective vertex) of any vertex in a given level of the graph structure optionally only extend to some or all vertices of exactly one other level, such as a next subsequent level of the graph structure (e.g. outgoing edges of each vertex of the set of vertexes 661.1.1-661.1.H1 in level 1 of the graph structure each point to some or all vertices vertexes 661.2.1-661.2.H2 in level 2 of the graph structure; outgoing edges of each vertex of the set of vertexes 661.2.1-661.2.H2 in level 2 of the graph structure each point to some or all vertices vertexes 661.3.1-661.3.H3 in level 3 of the graph structure; etc.). In other embodiments, outgoing edges 663 (e.g. depicted by arrows pointing away from the respective vertex) of at least one vertex in a given level of the graph structure optionally extend to vertices of multiple other levels of the graph structure.

In some embodiments, at least one level (e.g. a set of one or more adjacent levels) of the graph structure are structured cyclically. For example, some or all outgoing edges 663 of vertexes 661 included in a final level of such a set of adjacent levels extend to one or more vertexes of a first level of such as set of adjacent levels (e.g. the set of adjacent levels includes levels 3, 4, and 5; vertexes in level 3 have edges extending to vertexes in level 4; vertexes in level 4 have vertexes extending to level 5; vertexes in level 5 have vertexes extending back to level 3). As another example, such a set of adjacent levels includes exactly one level, where some or all outgoing edges 663 of vertexes 661 included in this level of such a set of adjacent levels extend to one or more vertexes of this same level (e.g. at least one vertex in this level has an edge directed back to itself, and/or directed to at least one other vertex at this level). Such cyclical structuring can correspond to repeating of computations applied via this respective set of edges multiple consecutive times, where output is applied as input, for example, recursively and/or iteratively. other embodiments, none of the levels of the graph structure are structured cyclically, where data is propagated through the graph in one direction.

The graph structure can be further defined by a configured weight set 667 which can include a plurality of values 664 configured for a plurality of weights 662 for the plurality of edges 663 of the graph structure 665, where some or all edges each have a corresponding weight defined via a corresponding configured value 664. For example, the number of different weights in the configured weight set 667 corresponds to the number of edges in the graph, which can be a function of the number of levels/layers, the number of vertices in each level/layer, and/or the number of edges extending from each vertex (e.g. whether each vertex in a given level has edges extending to all vertexes of the next level, etc.).

The graph structure can alternatively or additionally be defined by a configure bias set 767 which can include a plurality of values 764 configured for a plurality of biases 762 for the plurality of vertices 661 of the graph structure 665, where come or all vertexes each have a corresponding bias defined via a corresponding configured value 764. For example, the number of biases in the configured bias set 767 can be equal to or a function of the number of vertices in the graph structure.

The value of output of a given vertex can be computed as a function of input values of its set of incoming input edges, values weights assigned to this set of input edges, and/or value of the bias for the given vertex. For example, output of a given vertex (e.g. along each of its output vertices as input to vertices to which they point) can include a value computed as a function of (e.g. sum of) a set of values, where the set of values includes a separate corresponding value computed from each incoming edge (e.g. a function of the value of this edge computed as output of the respective vertex from which it extends, such as the value of this edge multiplied by the value of a configured weight 662 assigned to this edge), and/or where this set of values further includes an additional value indicating and/or computed as a function of a value of a bias 762 assigned to the given vertex, where this bias value is optionally computed independently of any of the incoming values of incoming edges.

In some embodiments, the graph structure implements some or all features and/or functionality of a neural network, such as an artificial neural network, a convolutional neural network, a recurrent neural network, and/or other type of neural network.

In some embodiments, graph data 660 of given model data 621 can include a single graph structure 665. In some embodiments, the graph data of given model data 621 can include multiple graph structures 665.1-665.Q. For example, some or all of these multiple graph structures 665.1-665.Q can have their own set of vertices and edges having their own configured weights and/or biases. The ordered set of input fields 668 and/or corresponding set of input vertices 661 of a given graph structure 665 can correspond to its own ordered set of input fields, and some or all of which can correspond to output of one or more other graph structures 665. The ordered set of output fields 671 and/or corresponding set of output vertices of a given graph structure 665 can correspond to its own ordered set of output fields, and some or all of which can correspond to input of one or more other graph structures 665. For example, executing a given function via applying the graph data 660 of its model data 621 can include applying multiple different graph structures 665 separately, for example, in its own graph (e.g. directed, acyclic graph having graph structure 665 as its nodes) structuring of serialized graphs 665 (e.g. different graphs are applied one at a time; output of one graph is input to the next) and/or parallelized graphs 665 (e.g. multiple graphs are applied at the same time from same or different output, for example, of other graphs applied serially before these graphs, where output of the multiple graphs are optionally applied as input to one or more other graphs applied serially after these graphs).

As a particular example, different graphs are configured for processing different information. For example, a first graph is configured to localize a particular feature in image data; a second graph applied to output of this first graph is configured to characterize a detected feature; a third graph applied to output of this second graph is configured to generate a new image as output, etc. As another example, multiple different graphs are configured to localize and/or characterize different types of features, and another graph is configured to generate the new image based on output of these multiple different graphs being applied in parallel, indicating which graphs rendered detection and/or characterization of corresponding types of features.

In some embodiments, a given graph structure and/or set of graph structures of a given function definition 620 is stored across a plurality of storage devices 221 (e.g. across multiple geographic locations) of a storage system 85. For example, different configured weight values and/or bias values are stored in different locations.

In some embodiments, the graph structure implementing input prompt instruction data 628 of FIG. 6G can be implemented as a particular type of graph structure 665, where each question data 883 corresponds to a vertex 661 and/or where each response selection option corresponds to an edge 663. Some or all features and/or functionality of generating, storing, and/or utilizing graph structure 665 described herein can be applied to implement corresponding generation, storage, and/or utilizing of the input prompt instruction data 628.

Figure 6N:
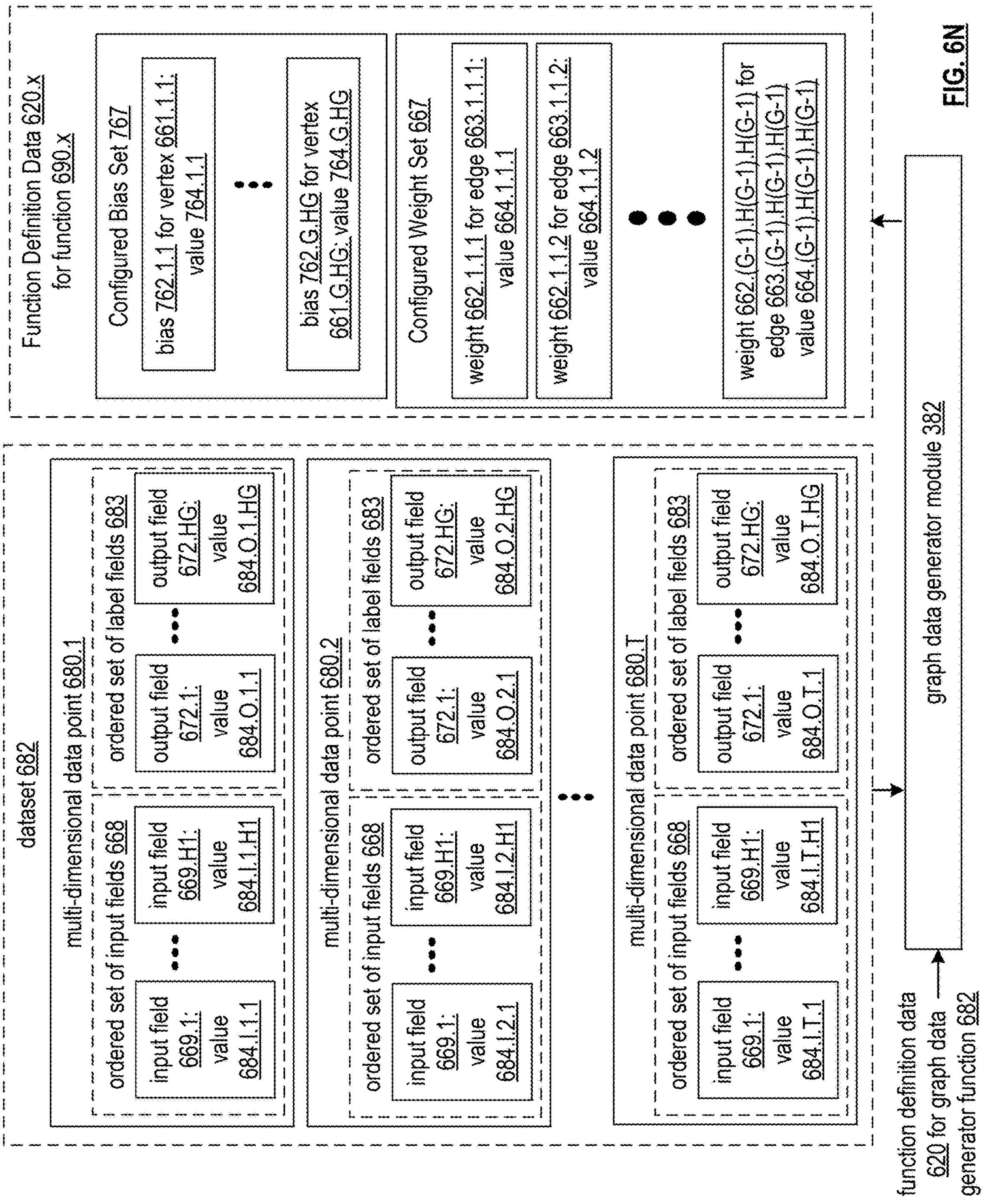
FIG. 6N illustrates an embodiment of a graph data generator module 382 that generates function definition data based on processing a dataset that includes a plurality of multi-dimensional data points in accordance with various embodiments.

FIG. 6N illustrates an example of a graph data generator module 382 configured to generate the configured bias set 767 and/or configured weight set 667 for a given one or more graph structures 665 in conjunction with generating function definition data 620.*x* for a given function 690.*x*. This can be based on processing a dataset 682 (e.g. a set of training data) that includes a plurality of multi-dimensional data points 680.1-680.T (e.g. hundreds, thousands, and/or millions of data points 680). Each multi-dimensional data point can have its own set of H1 values 684.I.1-684.I.H1 for the ordered set of input fields 668 and/or can further have its own set of HG values 684.O.1-684.O.HG for an ordered set of label fields 683 (e.g. corresponding to some or all of the ordered set of output fields 671), where some or all multi-dimensional data points 680 are thus H1+HG dimensional data points. For example, some or all multi-dimensional data points 680 include values for some or all of its fields that are included in and/or derived from corresponding image data, natural text data, data corresponding to responses to prompts, document files, user account data, and/or any other data/information described herein.

The ordered set of label fields 683 can correspond to truth data, utilized by graph data generator module 382 to characterize the relationship between input fields 668 and output fields 671 in ultimately generating the configured weights and/or biases of its graph structure 665. For example, performing the graph data generator function 682 via applying its corresponding function definition data 620 can include generating the configured bias set 767 and/or configured weight set 667 includes minimizing a particular value computed as a function of the weight values, bias values, values 684 of input fields 668 and/or values 684 of label fields, for example, in conjunction with applying a corresponding loss function. This can include performing the plurality of iterations of an iterative process (e.g. hundreds, thousands, and/or millions of iterations), where each iteration is applied to some or all of the plurality of multi-dimensional data points 680 (e.g. to generate output for each point as a function of its input to be measured against its known values of the label fields as a function of the current value of weights as biases). where the values of some or all weights and/or biases are adjusted in each iteration as a function of this computed value and/or as a function of the previously assigned values generated in the previous iteration, and/or where the iterative process continues until a threshold number of iterations are performed and/or until the particular value is less than a predetermined threshold value (e.g. in conjunction with minimizing the particular value, for example, in conjunction with minimizing error of the model), where the final set of values configured for the graph structures weights and/or biases in the final iteration are applied in the corresponding function definition data 620.*x* for the respective function (e.g. saved in a corresponding function library). Such iterations can be performed in conjunction with performing forward and/or backward propagation processes of graph structure 665. In some embodiments, executing the graph data generator function 682 includes performing a model training function, for example, to train a corresponding neural network and/or other machine learning and/or AI model.

For example, the particular value minimized over the plurality of iterations is a measure of error of the given model as a function of the configured weights and/or biases, measured based on measuring a computed difference value (e.g. Euclidean difference of other difference metric) of output generated for each ordered set of input values of each multi-dimensional point from the known values of the ordered set of label fields for each point and/or based on measuring error as a function of all computed difference values across all of the plurality of data points of the dataset. Generating this output for input values of each multi-dimensional point in a given iteration for measuring against this given multi-dimensional point's values of the set of output labels can include applying the graph structure with the current set of weights and biases to the given ordered set of input values by generating output for each vertex of the graph structure accordingly, for example, via processing input values of incoming edges via applying corresponding weights accordingly, for example to compute, for each vertex, output (e.g. as a sum of values computed as a function of a set of values that includes the set of the input values each computed from a corresponding input value of an incoming edge and its corresponding weight value, and/or that further includes the bias for the given vertex), to ultimately generate the output values as output of the vertexes at the final layer HG that is measured against the known values of the corresponding output fields for this given data point. The particular value (e.g. error value) computed in a given iteration for the dataset as a whole can be a function of a plurality of difference values (e.g. each difference of the plurality of difference values computed difference between the computed output via applying the current weights and biases of the graph structure and the known output indicated by the values of the label fields) computed across all data points in the dataset, for example, in conjunction with applying a corresponding loss function and/or measure of error.

In some embodiments, a first iteration of the function is applied to an initial set of values assigned to the weights and/or biases, such as a set of randomly generated values and/or predetermined starting values, where the final values are generated via progressively updating these values of the set of weights and biases over the plurality of iterations.

In some embodiments, performing the graph data generator function 682 includes configuring the weights and/or biases for a predetermined layout of graph structure 665 (e.g. predetermined number of vertices across a predetermined number of levels G), where the number of weights and biases is fixed and their respective values are configured, for example, across a plurality of iterations of an iterative process. In other embodiments, performing the graph data generator function 682 further includes automatically selecting how many weights and biases be configured in conjunction with configuring the layout of the graph structure (e.g. number of levels, number of vertices to include at each level, etc. are automatically configured via graph data generator function).

Some or all features and/or functionality of graph data generator module 382 of FIG. 6N can implement any model training and/or function generation of any function and/or corresponding graph data 660/model data 621 described herein.

Some or all features and/or functionality of graph data generator module 382 can implement any embodiment of executing any function described herein. The graph data generator module 382 can be implemented via at least one processor 22 and/or via any other processing and/or memory resources of computing system 10 and/or computing device 13.

Figure 6O:
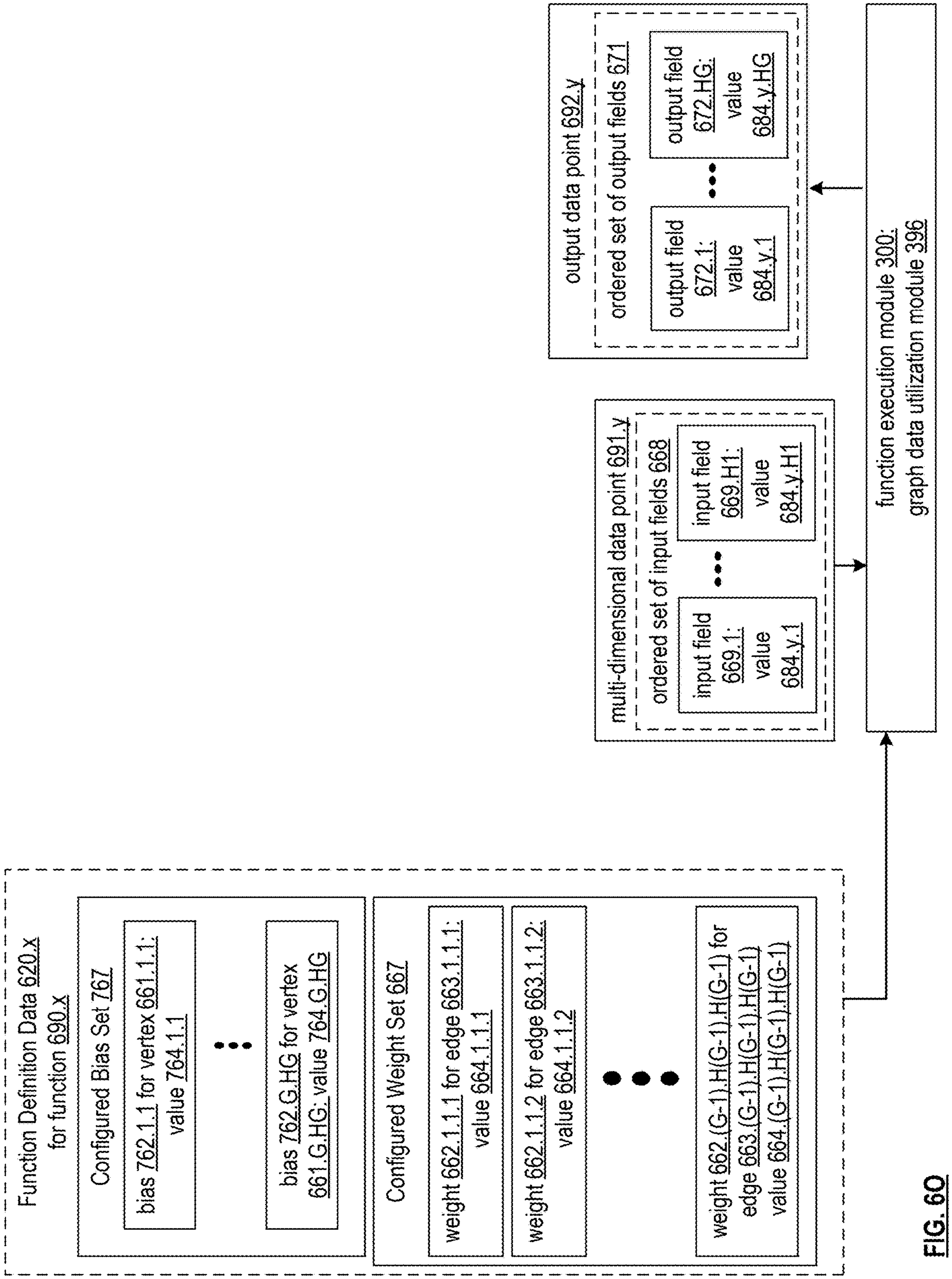
FIG. 6O illustrates an embodiment of a graph data utilization module that applies a configured weight set of function definition data to generate an output data point based on processing a multi-dimensional input point in accordance with various embodiments.

FIG. 6O illustrates an embodiment of implementing a function execution module 300 implementing a graph data utilization module 396 to generate an output data point 692.*y* from a given multi-dimensional data point 691 based on applying the configured weight set 667 and/or configured bias set 767 of the graph data 660 defining the given respective function 690.*x* being executed (e.g. defined in function definition data 620.*x*, for example, previously generated as illustrated in FIG. 6N).

Generating this output data point 692.*y* for input values of the given multi-dimensional point 691.*y* can include applying the graph structure with the current set of weights and biases to the given ordered set of input values by generating output for each vertex of the graph structure accordingly, for example, via processing input values of incoming edges via applying corresponding weights accordingly, for example to compute, for each vertex, output (e.g. as a sum of values computed as a function of a set of values that includes the set of the input values each computed from a corresponding input value of an incoming edge and its corresponding weight value, and/or that further includes the bias for the given vertex), to ultimately generate the output values as output of the vertexes at the final layer HG. This output data point 692.*y* can correspond to inference data and/or a prediction data for the true value of the respective output (e.g. based on minimizing loss in configuring the weights and/or biases that are utilized to generate the output data point 692.*y* as a function of the input data point 691.*y*). Some or all features and/or functionality of function execution module 300 of FIG. 6O can implement the function execution module 6I and/or any embodiment of executing a function of function library described herein.

Generating this output data point 692.*y* for input values of the given multi-dimensional point 691.*y* can include accessing all of the values of all weights of the configured weight set and/or accessing all of the values of all biases of the configured bias set. This can include accessing these values in storage system 85, for example, via accessing different weights and biases having values stored in different storage devices in different locations.

Generating this output data point 692.*y* for input values of the given multi-dimensional point 691.*y* can include performing a plurality of parallelized tasks (e.g. to generate different output of different vertices at a same layer of the graph structure), for example, in conjunction with implementing specialized hardware such as specialized processing resources (e.g. AI chips) operable to perform this parallelized processing.

Some or all features and/or functionality of graph data utilization module 396 can implement any embodiment of executing any function described herein. The graph data utilization module 396 can be implemented via at least one processor 22 and/or via any other processing and/or memory resources of computing system 10 and/or computing device 13.

Figure 6P:
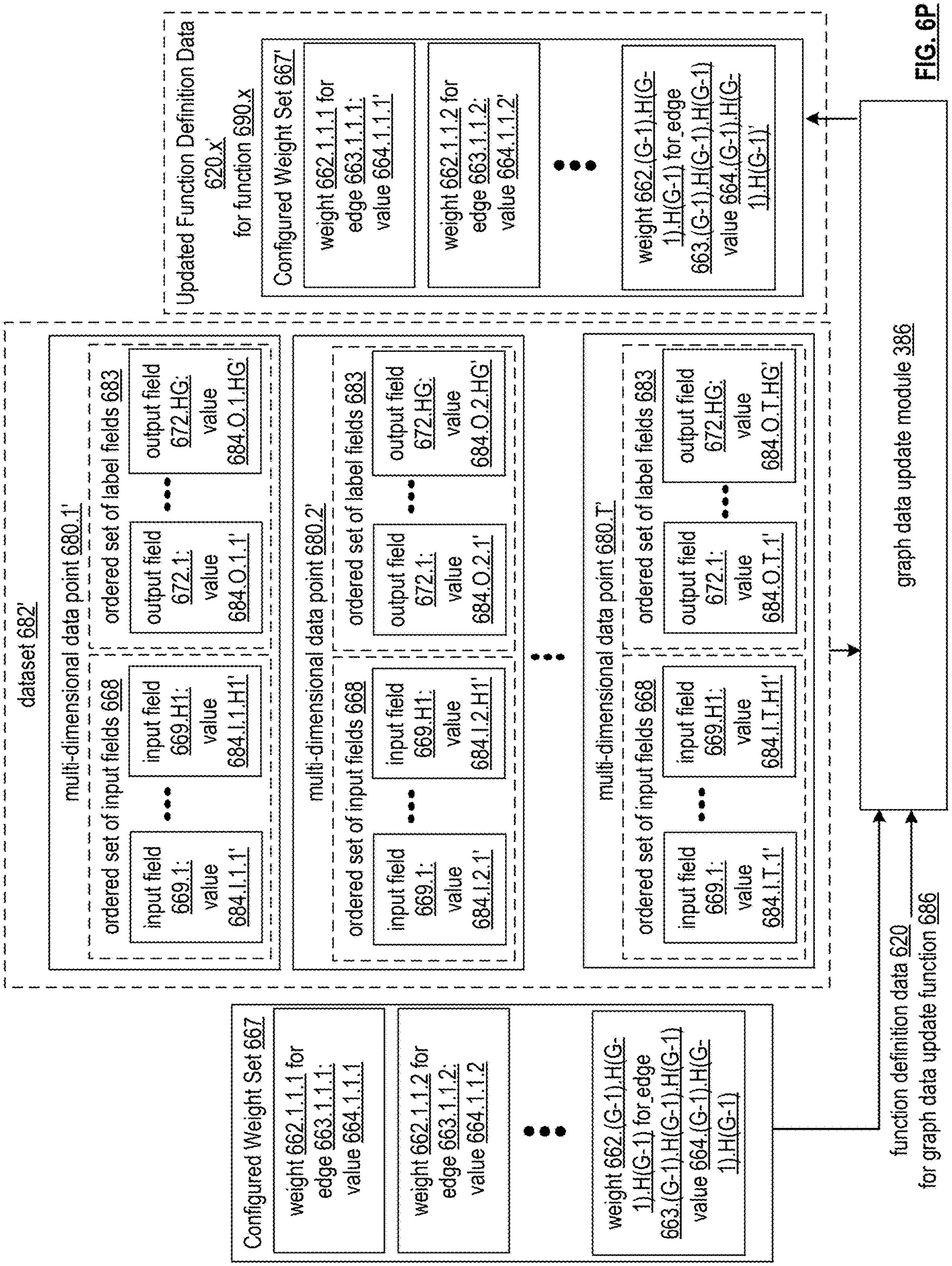
FIG. 6P illustrates an embodiment of a graph data update module that generates updated function definition data for a function in accordance with various embodiments.

FIG. 6P illustrates an embodiment of a graph data update module 386 that generates updated function definition data 620.*x*' that includes a new configured weight set 667' (e.g. having values for some or all weights different from the values in a previous version of configured weight set 667) and/or, while not illustrated, a new configured bias set 767' for the given function 620.*x*.

For example, the new configured weight set 667' and/or new configured bias set 767' have their respective values computed based on executing a graph data update function 686 (e.g. via applying corresponding function definition data 620) upon a dataset 682' (e.g. different from an original dataset 682 that was utilized to generate a previous version of the function definition data 620.*x*) and/or upon the configured weight set 667 (and/or, while not illustrated, the configured bias set 767) of a previous version of the function definition data 620.*x* for the given function 690.*x* (e.g. generated as illustrated in FIG. 6N and/or generated via a previous update upon a further prior version of the function definition).

The dataset 682' can include a same or different number of points as dataset 682 utilized to generate the previous version. Some or all points in the prior dataset 682 can be again included in dataset 682'. The new dataset 682' can alternatively or additionally include a plurality of new points with respective known values for both its input and output fields. This can include points 691.*y* of FIG. 6O for which output points were previously generated via applying the previous function definition 620.*x*, where actual output determined for these points (different from the predicted output 692.*y* and optionally determined after output 692.*y* is generated, where output 692.*y* was generated due to the actual output not yet being known/available) is applied as the values for the label fields.

In some embodiments, the updated function definition data 620.*x*' includes a same graph structure 665 of vertexes and edges as function definition data 620.*x*, having updated values for their respective weights and/or biases (e.g. the number of weights and biases remains the same, but they have new configured values). In some embodiments, the updated function definition data 620.*x*' includes a new graph structure 665 of vertexes and edges different from function definition data 620.*x* (e.g. the number of weights and biases changes due to changing of number of layers and/or number of vertexes per layer, etc.).

In some embodiments, generating of the updated function definition data 620.*x*' is performed in a same or similar fashion as generating of function definition data 620.*x* of FIG. 6N via execution of graph data generator function 682, for example, via performing a plurality of iterations of an iterative process in conjunction with minimizing a particular value computed in conjunction with applying a corresponding loss function. As a particular example, rather than a first iteration of this iterative function being applied to an initial set of values assigned to the weights and/or biases, such as a set of randomly generated values and/or predetermined starting values as is applied in performing graph data generator function 682 in some or all embodiments, the first iteration of this iterative function applied in executing the graph data update function 686 can include initializing the weights and biases as the values in the current version of configured wright set 667 and/or configured bias set 767 being updated.

In some embodiments, the graph data update module 386 of FIG. 6P is implemented in conjunction with retraining a corresponding model (E.g. corresponding neural network). Some or all features and/or functionality of graph data update module 386 of FIG. 6P can implement any embodiment of retraining and/or updating of functions over time described herein.

Some or all features and/or functionality of graph data update module 386 can implement any embodiment of executing any function described herein. The graph data update module 386 can be implemented via at least one processor 22 and/or via any other processing and/or memory resources of computing system 10 and/or computing device 13.

Figure 6Q:
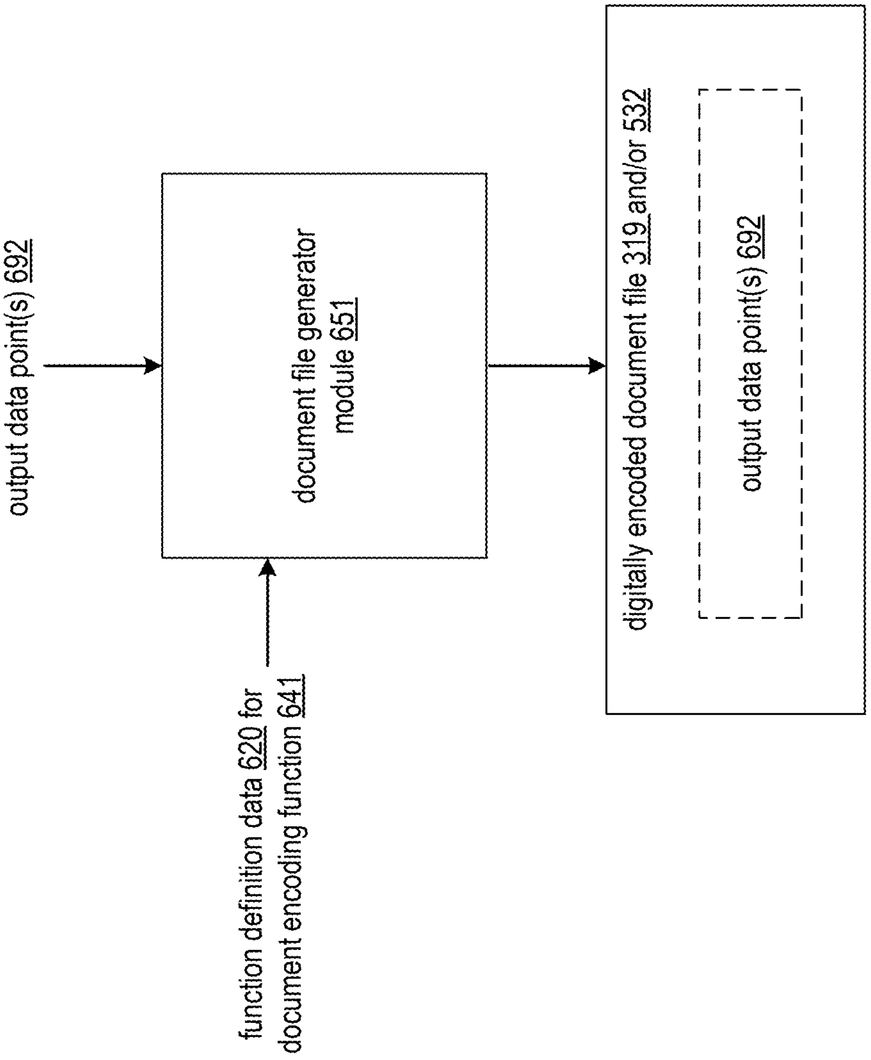
FIG. 6Q illustrates an embodiment of a document file generator module that executes a document encoding function in accordance with various embodiments.

FIG. 6Q illustrates an embodiment of a document file generator module 651 that executes a document encoding function 641 (e.g. via applying corresponding function definition data) to generate a digitally encoded document file (e.g. a file 319 and/or 532 and/or any embodiment of a document file described herein) via encoding one or more of output data points 692 for inclusion in the document file in accordance with a corresponding digital file format. For example, the one or more output data point 692 are generated as output of another function 690.*x* (e.g. generated via applying a graph structure 665 as illustrated in FIG. 6M and/or 6O, generated as output digital image data 38', generated as natural language text or other text, and/or generated any other data included in any files and/or application materials described herein), for example, in conjunction with generating the respective document and/or application material for a given user. In some embodiments, the document file generator module 651 alternatively or additionally executes document encoding function 641 to generate a digitally encoded document file via encoding other data (e.g. data received from a computing device 13 in response to one or more prompts, etc.). For example, a PDF file, a digitally encoded image file such as a JPEG file, and/or other digitally encoded file is generated to include text and/or images in conjunction with generating any application materials and/or corresponding files for user review and/or automatic submission as described herein. Different digitally encoded document files can be generated as a function of different output data points 692 (e.g. different files are generated to include different image data, different text, etc.). Different document encoding functions 641 can be implemented to encode data differently, for example, in accordance with different file types (e.g. one document encoding function 641 is implemented to generate a PDF file while another document encoding function 641 is implemented to generate a JPEG file). Any generation and/or submission of document files and/or application materials described herein can include performing the document encoding function 641 to generate a corresponding digitally encoded document file that includes the underlying data that was encoded via the document encoding function 641, for example, in accordance with a predetermined file format.

Some or all features and/or functionality of document file generator module 651 can implement any embodiment of executing any function described herein. The document file generator module 651 can be implemented via at least one processor 22 and/or via any other processing and/or memory resources of computing system 10 and/or computing device 13.

Figure 6R:
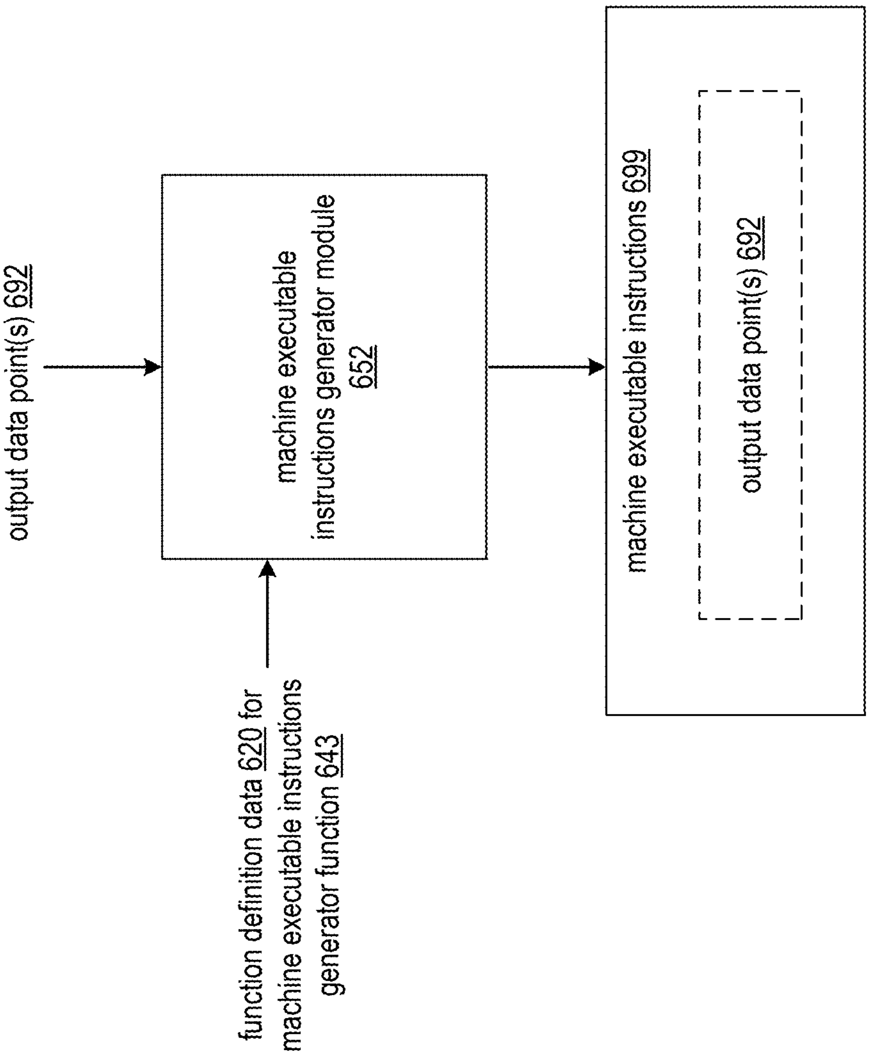
FIG. 6R illustrates an embodiment of a machine executable instructions generator module that executes a machine executable instruction generator function in accordance with various embodiments.

FIG. 6R illustrates an embodiment of a machine executable instructions generator module 652 that executes a machine executable instructions generator function 643 (e.g. via applying corresponding function definition data) to generate machine executable instructions 699 (e.g. machine coded instructions in a coding language for interpretation and/or execution by a computer, such as HTML instructions and/or other instructions) via processing one or more output data points 692 for inclusion in the document file in accordance with a corresponding digital file format. For example, the one or more output data points 692 are generated as output of another function 690.*x* (e.g. generated via applying a graph structure 665 as illustrated in FIG. 6M and/or 6O, generated as output digital image data 38', generated as natural language text or other text, and/or generated any other data included in any files and/or application materials described herein), for example, in conjunction with configuring execution of a corresponding client device (e.g. configuring how its data, such as one or more prompts, is displayed and/or how measurement values generated via sensor devices are processed in generating and/or sending respective data back to the computing system, for example, as one or more responses). For example, an HTML file and/or corresponding HTML instructions are generated to include text, prompts, and/or images for display and/or user interaction in conjunction with sending prompts, files, information, and/or instructions for execution to a client device 130 and/or computing device 13, for example, in conjunction with supplying immigration assistance to a corresponding user. Different machine executable instructions can be generated as a function of different output data points 692 (e.g. different machine executable instructions are generated to include different sets of prompts different digital display data for display and/or to include different instructions for execution by respective different client devices of different users, etc.). Different machine executable instruction generator functions 643 can be implemented to generate machine executable instructions data differently, for example, in accordance with different executable instruction types (e.g. one machine executable instruction generator functions 643 is implemented to generate HTML data including HTML instructions for execution while another machine executable instruction generator function 643 is implemented to generate a .exe file for execution, etc.). Any generation and/or transmission of prompts and/or other information for display to a user via a display device of a corresponding computing device and/or client device can include performing the machine executable instructions generator to generate corresponding machine executable instructions 699 to include the underlying data of the one or more output data points 692 (e.g. document files, corresponding image data and/or digital display data, corresponding text, corresponding prompts for display to trigger supplying and/or generation of at least one corresponding response, etc.).

Some or all features and/or functionality of machine executable instructions generator module 652 can implement any embodiment of executing any function described herein. The machine executable instructions generator module 652 can be implemented via at least one processor 22 and/or via any other processing and/or memory resources of computing system 10 and/or computing device 13.

Figure 6S:
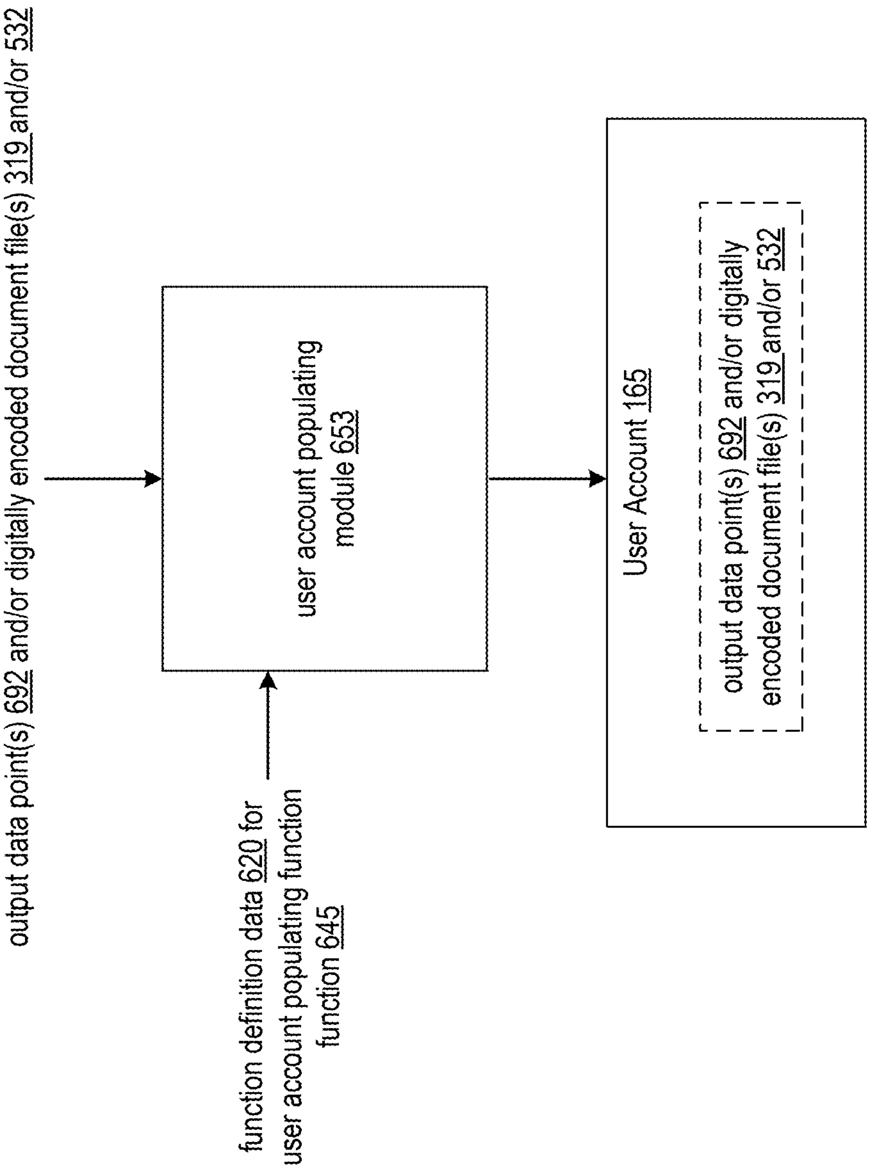
FIG. 6S illustrates an embodiment of a user account populating module that executes a user account populating function in accordance with various embodiments.

FIG. 6S illustrates an embodiment of a user account populating module 653 that executes a user account populating function 654 (e.g. via applying corresponding function definition data) to generate and/or populate data included in a user account via processing and/or storing one or more of output data points 692 and/or one or more digitally encoded document files for inclusion in the user account 165 for a corresponding user. For example, the one or more output data point 692 are generated as output of another function 690.*x* (e.g. generated via applying a graph structure 665 as illustrated in FIG. 6M and/or 6O, generated as output digital image data 38', generated as natural language text or other text, and/or generated any other data included in any files and/or application materials described herein). As another example, the one or more digitally encoded document files are generated as output of executing the document encoding function 641), for example, in conjunction with generating the respective document and/or application material for a given user. In some embodiments, the user account populating module 653 alternatively or additionally executes user account populating function 645 to populate user account 165 with other data (e.g. data received from a computing device 13 in response to one or more prompts, etc.). Executing the user account populating function 654 can include utilizing storage access module 11 to generate and send write requests 241 to one or more storage devices 211 of storage system 85 to write the respective output data point(s) and/or digitally encoded document files via one or more storage devices in one or more geographic locations. Executing the user account populating function 654 can include generating the user account and/or updating the user account (e.g. via generating and/or updating a corresponding entry of a database table, etc.). Different user account data for a given field can be populated to include different information for different user accounts can be generated as a function of different output data points 692 and/or different document files (e.g. a given field of user account is populated to include different image data, different text, different document files, different values, etc. for different users). Any generating, storing, and/or updating of user account data of user account 165 described herein can include performing the user account populating function 645 to store respective data in one or more fields of a user account.

Some or all features and/or functionality of user account populating module 653 can implement any embodiment of executing any function described herein. The user account populating module 653 can be implemented via at least one processor 22 and/or via any other processing and/or memory resources of computing system 10 and/or computing device 13.

Figure 6T:
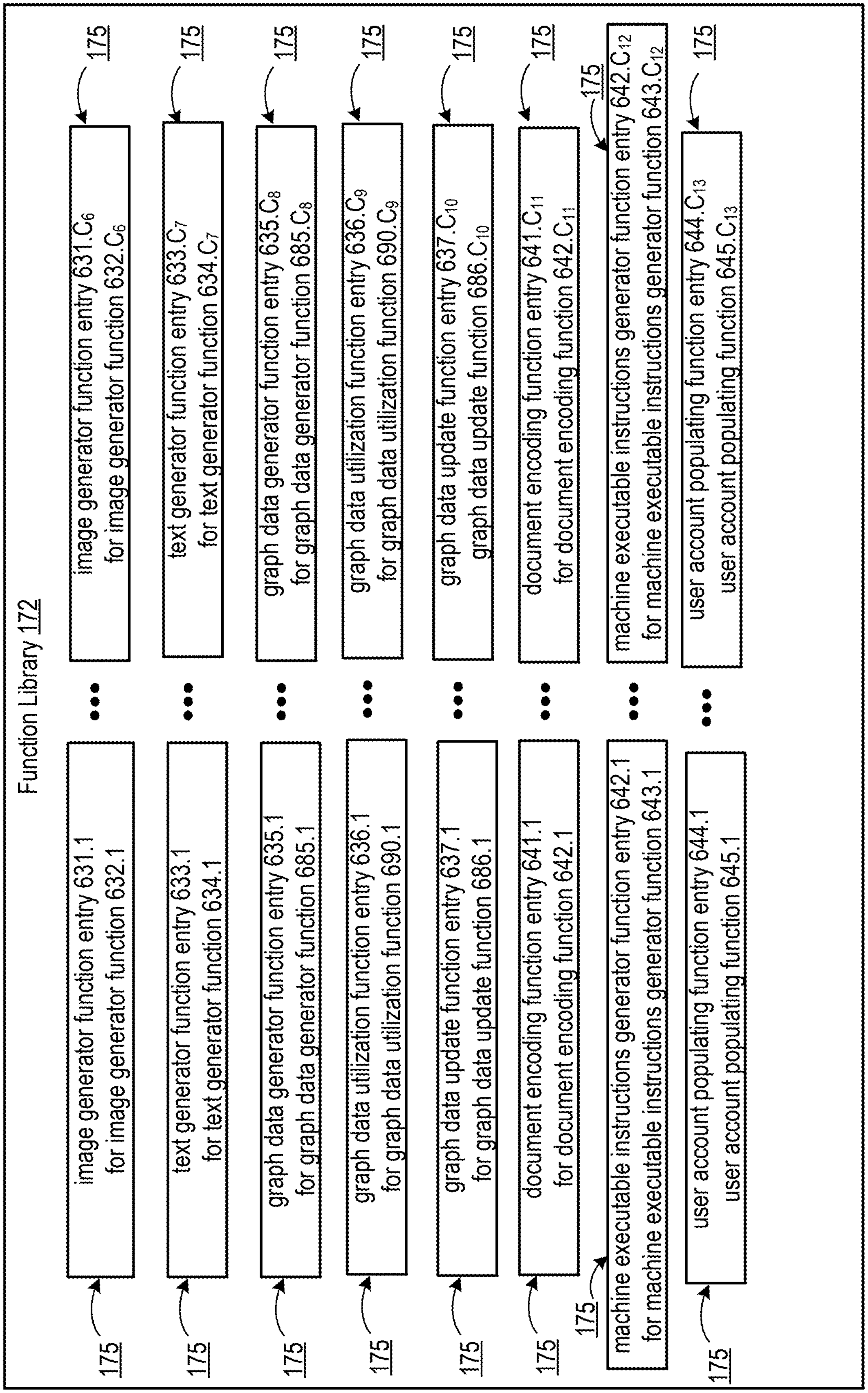
FIGS. 6T and 6U illustrate a set of function types of a function library in accordance with various embodiments.
Figure 6U:
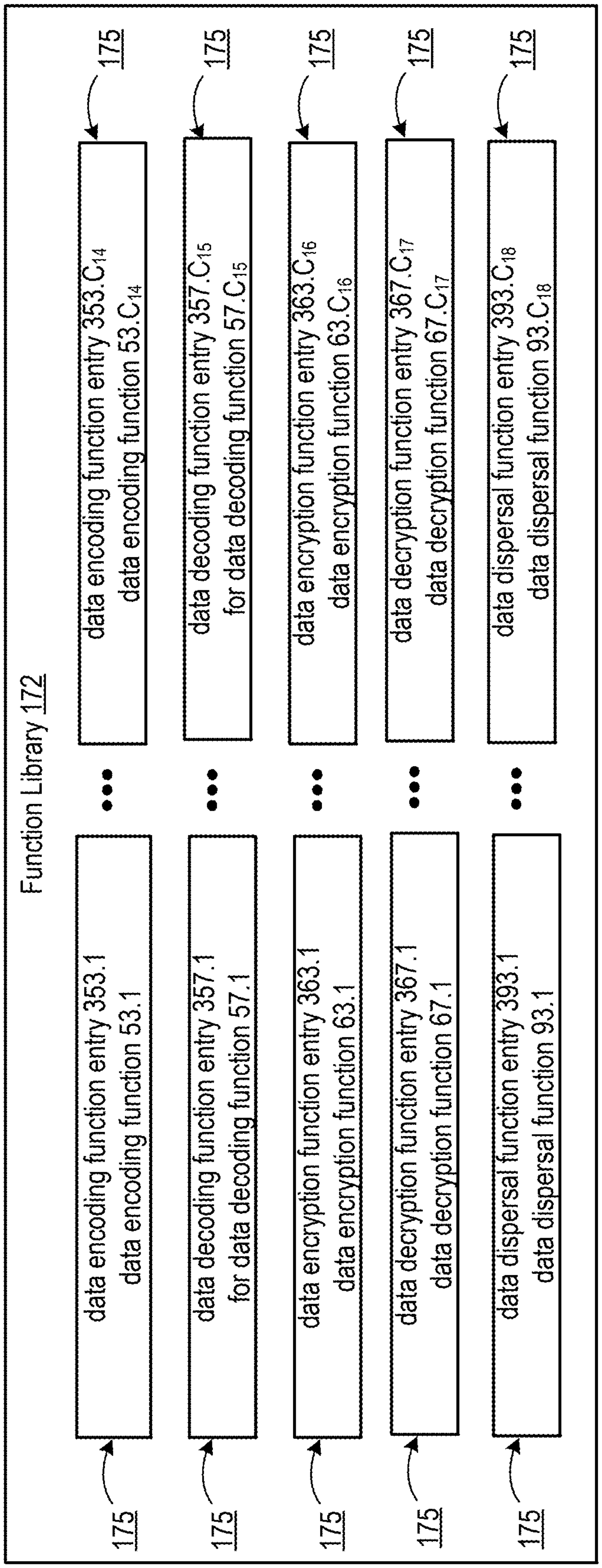

FIGS. 6T and 6U present embodiments of function library 172 that includes a plurality of function entries 175. Some or all of the plurality of function entries 175 of FIG. 6T can include some or all of the information discussed in conjunction with FIG. 6A. One or more of the plurality of function entries 175 of FIG. 6T and/or 6U can be implemented as, or via function calls to any one or more other functions (e.g. having other entries 175 in function library 172) described herein.

The immigration assistance system 100, computing system 10, computing device 13, and/or client device 130 can be operable to perform functions corresponding to any of the function entries 175 of FIG. 6T and/or 6U. The immigration assistance system 100, computing system 10, computing device 13, and/or client device 130 can be operable to perform multiple functions corresponding to function entries 175 of FIG. 6T and/or 6U in parallel for different users, such as dozens, hundreds, and/or thousands of users, simultaneously and/or in overlapping time intervals.

Figure 7A:
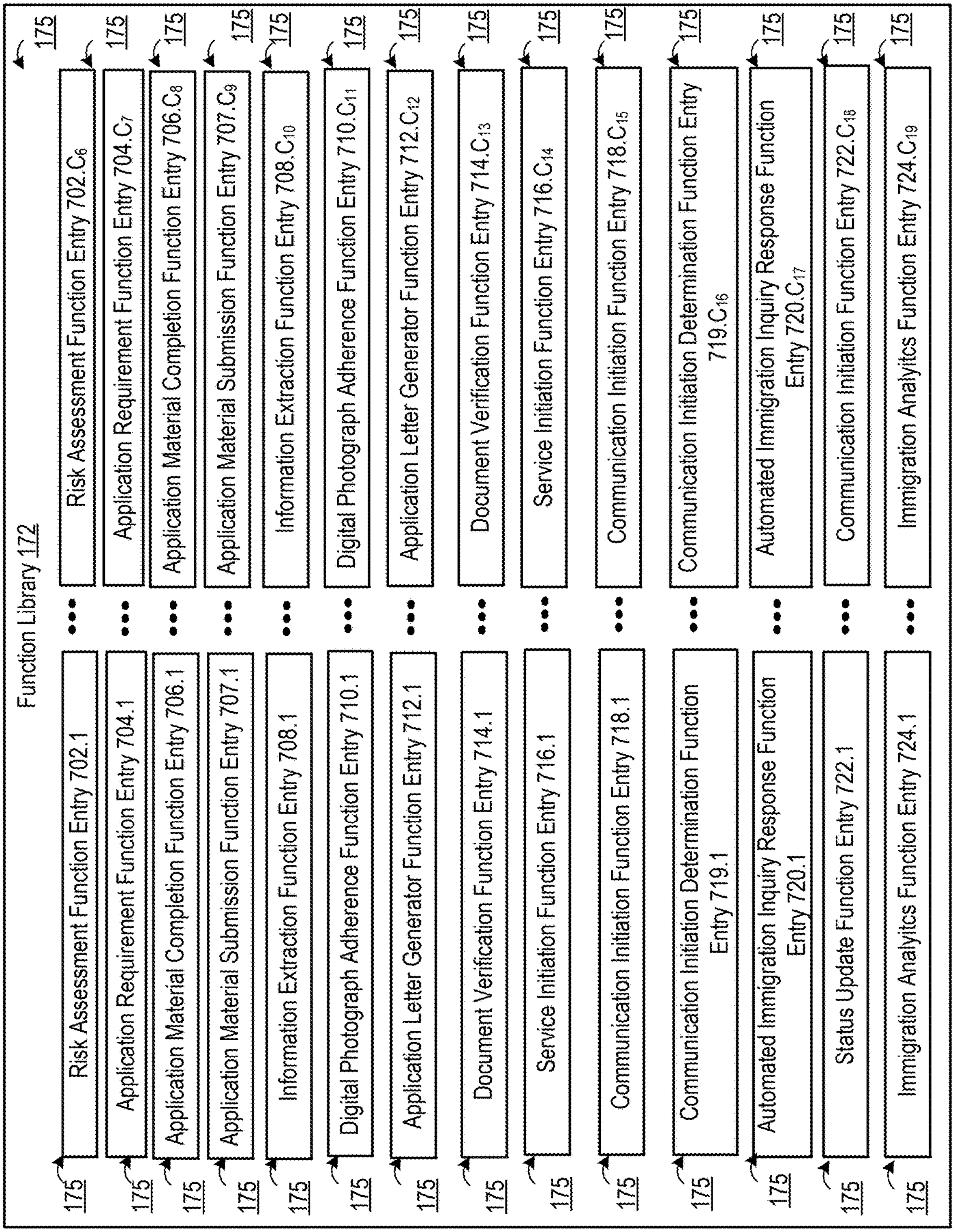
FIG. 7A illustrates a set of function types of a function library in accordance with various embodiments

FIG. 7A presents an embodiment of function library 172 that include a plurality of function entries 175. Some or all of the plurality of function entries 175 of FIG. 7A can include some or all of the information discussed in conjunction with FIG. 6A. One or more of the plurality of function entries 175 of FIG. 7A can be implemented as, or via function calls to: at least one image processing function entry 601 of FIG. 6C; at least one text processing function entry 603 of FIG. 6D; at least one document processing function entry 605 of FIG. 6E; at least one response processing function entry 607 of FIG. 6F; at least one information processing function entry 609 of FIG. 6H. One or more of the plurality of function entries 175 of FIG. 7A can be implemented as, or via function calls to any one or more other functions (e.g. having other entries 175 in function library 172) described herein.

The immigration assistance system 100, computing system 10, computing device 13, and/or client device 130 can be operable to perform functions corresponding to any of the function entries 175 of FIG. 7A. The immigration assistance system 100, computing system 10, computing device 13, and/or client device 130 can be operable to perform multiple functions corresponding to function entries 175 of FIG. 7A in parallel for different users, such as dozens, hundreds, and/or thousands of users, simultaneously and/or in overlapping time intervals.

Any embodiment of function library 172 can include some or all function entries 175 for some or all functions described herein, such as one or more function entries 175 of FIG. 6B, FIG. 6T, FIG. 6U, and/or FIG. 7A.

The function library 172 can optionally include one or more risk assessment function entries 702.1-702.$C_6$. Two or more different risk assessment function entries 702 can correspond to different types of risk assessment functions, for example, corresponding to different input data types 623 and/or different output data types 625, corresponding to different types of immigration statuses, and/or corresponding to different counties. Two or more different risk assessment function entries 702 can alternatively or additionally correspond to different versions of a same type of risk assessment function. Risk assessment function entries 702 are discussed in further detail in conjunction with FIG. 7B.

The function library 172 can optionally include one or more application requirement function entries 704.1-704.$C_7$. Two or more different application requirement function entries 704 can correspond to different types of application requirement functions, for example, corresponding to different input data types 623 and/or different output data types 625, corresponding to different types of immigration statuses, and/or corresponding to different counties. Two or more different application requirement function entries 704 can alternatively or additionally correspond to different versions of a same type of application requirement function. Application requirement function entries 704 are discussed in further detail in conjunction with FIG. 7C.

The function library 172 can optionally include one or more application material completion function entries 706.1-706.$C_8$. Two or more different application material completion function entries 706 can correspond to different types of application material completion functions, for example, corresponding to different input data types 623 and/or different output data types 625, corresponding to different types of application materials, corresponding to different types of immigration statuses, and/or corresponding to different counties. Two or more different application material completion function entries 706 can alternatively or additionally correspond to different versions of a same type of application material completion function. Application material completion function entries 706 are discussed in further detail in conjunction with FIGS. 7D, 7E, and 7G.

The function library 172 can optionally include one or more application material submission function entries 707.1-707.$C_9$. Two or more different application material submission function entries 707 can correspond to different types of application material submission functions, for example, corresponding to different input data types 623 and/or different output data types 625, corresponding to different types of application materials, corresponding to different types of immigration statuses, and/or corresponding to different counties. Two or more different application material submission function entries 707 can alternatively or additionally correspond to different versions of a same type of application material submission function. Application material submission function entries 707 are discussed in further detail in conjunction with FIG. 7H.

The function library 172 can optionally include one or more information extraction function entries 708.1-708.$C_{10}$. Two or more different information extraction function entries 708 can correspond to different types of information extraction functions, for example, corresponding to different input data types 623 and/or different output data types 625, corresponding to different types of application materials, corresponding to different types of immigration statuses, and/or corresponding to different counties. Two or more different information extraction function entries 708 can alternatively or additionally correspond to different versions of a same type of information extraction function. Information extraction function entries 708 are discussed in further detail in conjunction with FIG. 7F.

The function library 172 can optionally include one or more digital photograph adherence function entries 710.1-710.$C_{11}$. Two or more different digital photograph adherence function entries 710 can correspond to different types of digital photograph adherence functions, for example, corresponding to different input data types 623 and/or different output data types 625, corresponding to different types of application materials, corresponding to different types of digital photographs, and/or corresponding to different counties. Two or more different digital photograph adherence function entries 710 can alternatively or additionally correspond to different versions of a same type of digital photograph adherence function. Digital photograph adherence function entries 710 are discussed in further detail in conjunction with FIGS. 7I and 7J.

The function library 172 can optionally include one or more application letter generator function entries 712.1-712.$C_{12}$. Two or more different application letter generator function entries 712 can correspond to different types of application letter generator functions, for example, corresponding to different input data types 623 and/or different output data types 625, corresponding to different types of application materials, corresponding to different types of application letters included in immigration applications, corresponding to different types of immigration statuses, and/or corresponding to different counties. Two or more different application letter generator function entries 712 can alternatively or additionally correspond to different versions of a same type of application letter generator function. Application letter generator function entries 712 are discussed in further detail in conjunction with FIGS. 7K and 7L.

The function library 172 can optionally include one or more document verification function entries 714.1-714.$C_{13}$. Two or more different document verification function entries 714 can correspond to different types of document verification functions, for example, corresponding to different input data types 623 and/or different output data types 625, corresponding to different types of application materials, and/or corresponding to different counties Two or more different document verification function entries 714 can alternatively or additionally correspond to different versions of a same type of document verification function. Document verification function entries 714 are discussed in further detail in conjunction with FIGS. 7M-7O.

The function library 172 can optionally include one or more service initiation function entries 716.1-716.$C_{14}$. Two or more different service initiation function entries 716 can correspond to different types of service initiation functions, for example, corresponding to different input data types 623 and/or different output data types 625, corresponding to different types of services, corresponding to different service providers, and/or corresponding to different counties. Two or more different service initiation function entries 716 can alternatively or additionally correspond to different versions of a same type of service initiation function. Service initiation function entries 716 are discussed in further detail in conjunction with FIGS. 7P-7S.

The function library 172 can optionally include one or more communication initiation function entries 718.1-718.$C_{15}$. Two or more different communication initiation function entries 718 can correspond to different types of communication initiation functions, for example, corresponding to different input data types 623 and/or different output data types 625, corresponding to different types of assistance, corresponding to different assistance entities, corresponding to different types of immigration statuses, and/or corresponding to different counties. Two or more different communication initiation function entries 718 can alternatively or additionally correspond to different versions of a same type of communication initiation function. Communication initiation function entries 718 are discussed in further detail in conjunction with FIGS. 7T-7U.

The function library 172 can optionally include one or more communication initiation determination function entries 719.1-719.$C_{16}$. Two or more different communication initiation determination function entries 719 can correspond to different types of communication initiation determination functions, for example, corresponding to different input data types 623 and/or different output data types 625, corresponding to different types of assistance, corresponding to different assistance entities, corresponding to different types of immigration statuses, and/or corresponding to different counties. Two or more different communication initiation determination functions 719 can alternatively or additionally correspond to different versions of a same type of communication initiation determination function. Communication initiation determination function entries 719 are discussed in further detail in conjunction with FIG. 7V.

The function library 172 can optionally include one or more automated inquiry response function entries 720.1-720.$C_{17}$. Two or more different automated inquiry response function entries 720 can correspond to different types of communication initiation determination functions, for example, corresponding to different input data types 623 and/or different output data types 625, corresponding to different types of assistance, corresponding to different types of immigration statuses, and/or corresponding to different counties. Two or more different automated inquiry response function entries 720 can alternatively or additionally correspond to different versions of a same type of automated inquiry response function. Automated inquiry response function entries 720 are discussed in further detail in conjunction with FIG. 7W.

The function library 172 can optionally include one or more status update function entries 722.1-722.$C_{18}$. Two or more different status update function entries 722 can correspond to different types of status update functions, for example, corresponding to different input data types 623 and/or different output data types 625, corresponding to different types of immigration statuses, and/or corresponding to different counties. Two or more different status update function entries 722 can alternatively or additionally correspond to different versions of a same type of status update function. Status update function entries 722 are discussed in further detail in conjunction with FIGS. 7X and 7Y.

The function library 172 can optionally include one or more immigration analytics function entries 724.1-724.$C_{19}$. Two or more different immigration analytics function entries 724 can correspond to different types of status update functions, for example, corresponding to different input data types 623 and/or different output data types 625, corresponding to different counties, and/or corresponding to detection of different types of trends. Two or more different immigration analytics function entries 724 can alternatively or additionally correspond to different versions of a same type of immigration analytics function. Immigration analytics function entries 724 are discussed in further detail in conjunction with FIG. 7Z.

Figure 7B:
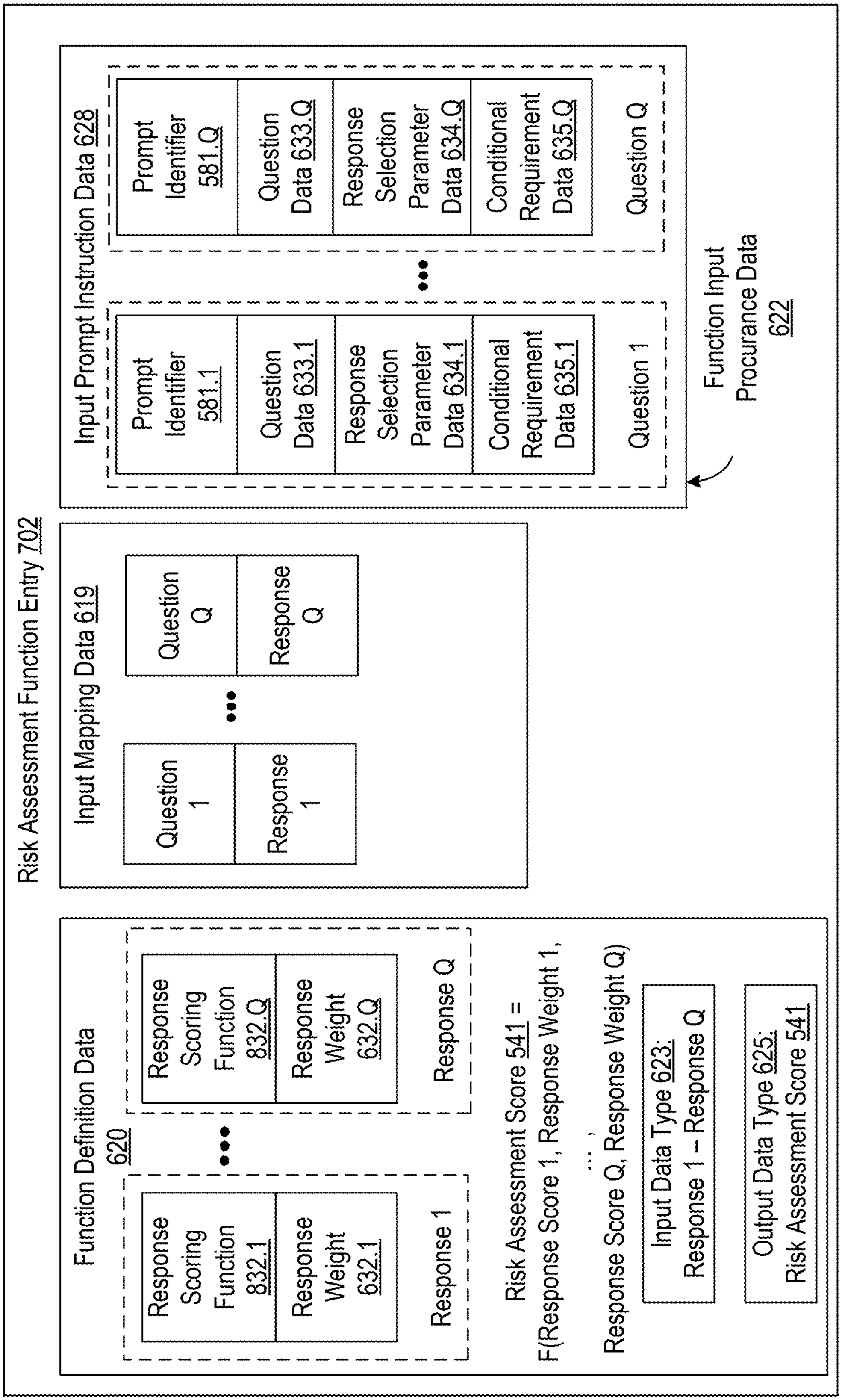
FIG. 7B illustrates data included in and/or indicated by a risk assessment function entry in accordance with various embodiments.

FIG. 7B illustrates an embodiment of a risk assessment function entry 702. A risk assessment function entry 702 can be implemented as a response processing function entry 607 and/or can otherwise be performed in a same or similar fashion as response processing functions as discussed in conjunction with FIGS. 6F and 6G. In other embodiments, a risk assessment function entry can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

As illustrated in FIG. 7B, the function definition data 620 can optionally indicate a plurality of response scoring functions 832.1-832.Q, and/or corresponding response weights 632.1-632.Q, corresponding to the set of responses 1-Q. The output data type 625 can correspond to a risk assessment score 541, which can implement the risk assessment score 541 of risk assessment data 540. The risk assessment score 541 can be computed via performance of the risk assessment function as a function of each of a set of response scores 1-Q, for example, that are generated based on performing each response scoring function 832 to each corresponding response.

The response scoring functions 832.1-832.Q can be configured via user input and/or can be generated automatically based on: training the risk assessment function via one or more learning algorithms and/or machine learning techniques, and/or based on implementing the historical immigration data processing system 124.

The resulting response scores 1-Q can be numeric and/or binary values corresponding to each response. In some embodiments, a response scoring function generates a corresponding response score as a deterministic function of and/or mapping of the response. For example, each of a set of response options 1-J for the corresponding question each have a corresponding predetermined response score.

The response weighs 632.1-632.Q can be values corresponding to each response, for example, to dictate a predefined weight that each response has in the resulting risk assessment score. For example, more important responses have higher and/or more impactful weights than less important responses. The response weighs 1-Q can be configured via user input and/or can be generated automatically based on: training the risk assessment function via one or more learning algorithms and/or machine learning techniques, and/or based on implementing the historical immigration data processing system 124.

In some cases, such as cases where one or more questions are not answered by the applicant due to not being presented based on the dynamic selection of questions as discussed in conjunction with FIG. 6G, the corresponding response score can be set to a default value. The default value for one or more responses 1-Q can be configured via user input and/or can be generated automatically based on: training the risk assessment function via one or more learning algorithms and/or machine learning techniques, and/or based on implementing the historical immigration data processing system 124.

As a particular example, the risk assessment score can be expressed as a sum of a plurality of products, where each product of the plurality of products corresponds to one of the set of responses 1-Q, and where a product for a given response corresponds to the response score computed for the given response based on applying the corresponding response scoring function 832 multiplied by the response weight 632 for the corresponding response scoring function.

While not illustrated in FIG. 7B, in some embodiments, combinations of responses can affect risk assessment scores in tandem, alternatively or in addition to influencing the risk assessment score individually. Alternatively or in addition, a set of individual responses 1-L to be treated in tandem have a corresponding set of individual questions 1-L of same question data 633, for example, as discussed in conjunction with FIG. 6G. A single, corresponding response scoring function 832 can be applied to this set of individual responses to render a single response score for this group of multiple responses.

This joint processing of groups of responses can be ideal in cases where particular combinations of responses are related and/or dependent, and/or otherwise jointly affect the eligibility risk for immigration applicants. This tandem treatment of responses can be applied based on configuring the risk assessment function accordingly via user input and/or based on being determined automatically based on: training the risk assessment function via one or more learning algorithms and/or machine learning techniques, and/or based on implementing the historical immigration data processing system 124.

Performance of a risk assessment function, for example, corresponding to a risk assessment function entry 702 of FIG. 7B, is discussed in further detail in conjunction with FIGS. 8A-8H. Example question data 633 and example response selection parameter data 634 for questions included in questions 1-Q of risk assessment function entry 702 is illustrated in FIGS. 8K-8R.

Figure 7C:
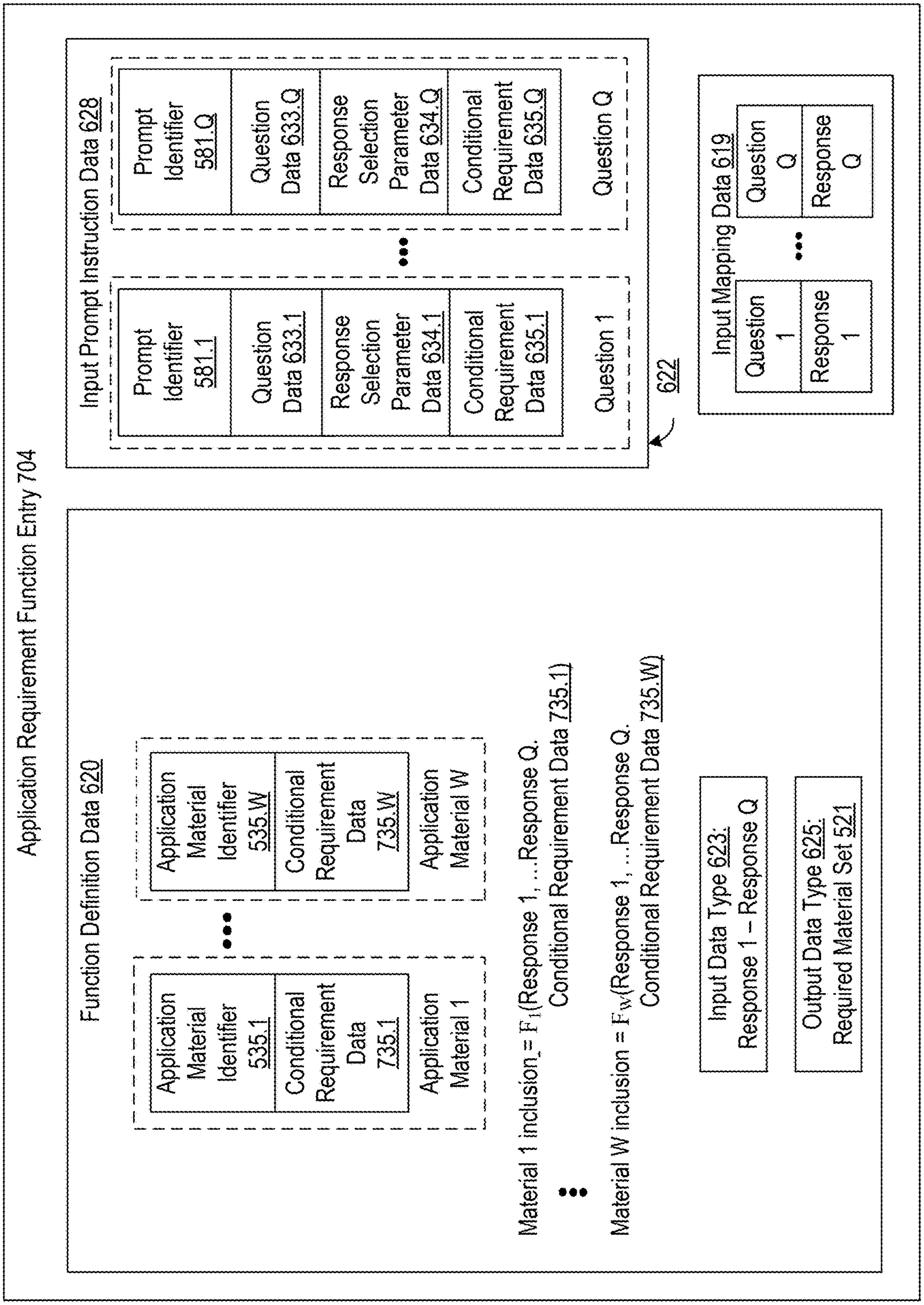
FIG. 7C illustrates data included in and/or indicated by an application requirement function entry in accordance with various embodiments.

FIG. 7C illustrates an embodiment of an application requirement function entry 704. An application requirement function entry 704 can be implemented as a response processing function entry 607 and/or can otherwise be performed in a same or similar fashion as response processing functions as discussed in conjunction with FIGS. 6F and 6G. In other embodiments, an application requirement function entry can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

Performance of application requirement functions is discussed in further detail in conjunction with FIGS. 9A-9K.

As illustrated in FIG. 7C, the function definition data 620 can optionally indicate conditional requirement data 735.1-735.W, where each conditional requirement data 735 corresponds to one application material in a set of possible application materials 1-W.

Each conditional requirement data 735 can indicate one or more conditions that, if met, cause the corresponding application material to be: required for inclusion in the immigration application; not required for inclusion in an immigration application; recommended for inclusion in an immigration application; and/or neither required nor recommended for inclusion in the immigration application. In some cases, the conditional requirement data 735 indicates that, if a one or more individual conditions in the set of conditions are met, the corresponding application material is: required, recommended, not required, and/or neither required nor recommended. In some cases, the conditional requirement data 735 indicates that, if and only if all conditions in the set of conditions are met, the corresponding application material is: required, recommended, not required, and/or neither required nor recommended. The conditional requirement data 735 can indicate a ranking and/or prioritization of the corresponding conditions, where some conditions supersede other conditions. In some embodiments, the conditional requirement data 735 for some or all application materials can optionally be stored and/or expressed as rules of a corresponding knowledge based system and/or expert system.

Each application material can have material inclusion data generated as a function of some or all of the set of responses 1-Q, and its corresponding conditional requirement data. For example, one or more conditions in the set of conditions of the corresponding conditional requirement data for one or more application materials are determined to be met and/or not met based on one or more corresponding responses indicating these one or more conditions are met and/or not met. The outputted material inclusion data can thus indicate whether the corresponding application material is: required, recommended, not required, and/or neither required nor recommended for inclusion in the immigration application for the user.

The output data type 625 can indicate required material set 521, which can identify only ones of the set of application materials 1-W with material inclusion data indicating they are required for inclusion in the immigration application for the user. While not illustrated in FIG. 7C, the outputted material inclusion data can alternatively or additionally indicate recommended material set 522, which can identify only ones of the set of application materials 1-W with material inclusion data indicating they are recommended, but not required, for inclusion in the immigration application for the user. In some cases, at least one application material in the set of possible application materials 1-W is neither included in the required material set 521 nor the recommended material set 522. In other cases, all application materials in the set of application materials 1-W that are not required are included in the recommended material set 522.

Performance of a risk assessment function, for example, corresponding to an application requirement function entry 704 of FIG. 7C, is discussed in further detail in conjunction with FIGS. 8A-8H. Example question data 633 and example response selection parameter data 634 for questions included in questions 1-Q of application requirement function entry 704 is illustrated in FIGS. 9L-9AM. An example required material set 521 and recommended material set 522 is illustrated in FIGS. 9AN-9AP.

Figure 7D:
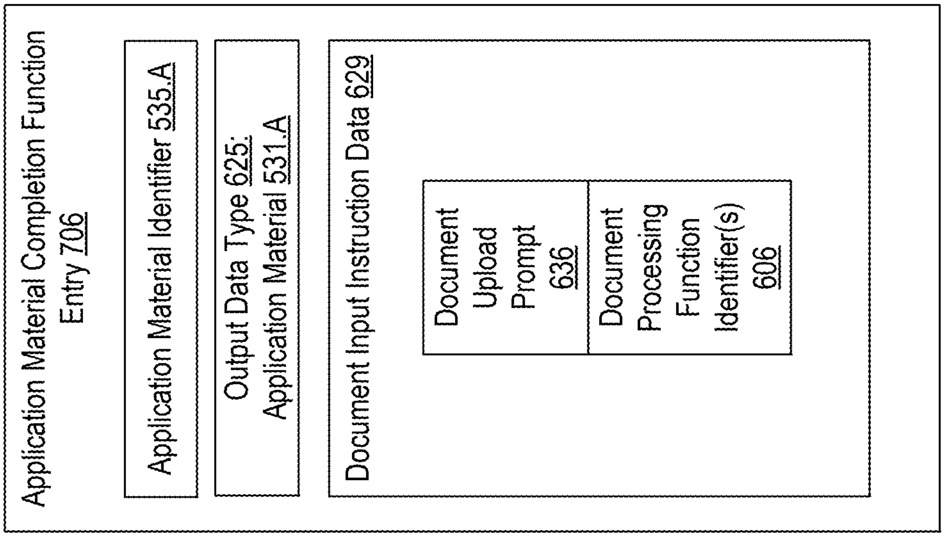
FIGS. 7D-7E illustrate data included in and/or indicated by an application material completion function entry in accordance with various embodiments.
Figure 7E:
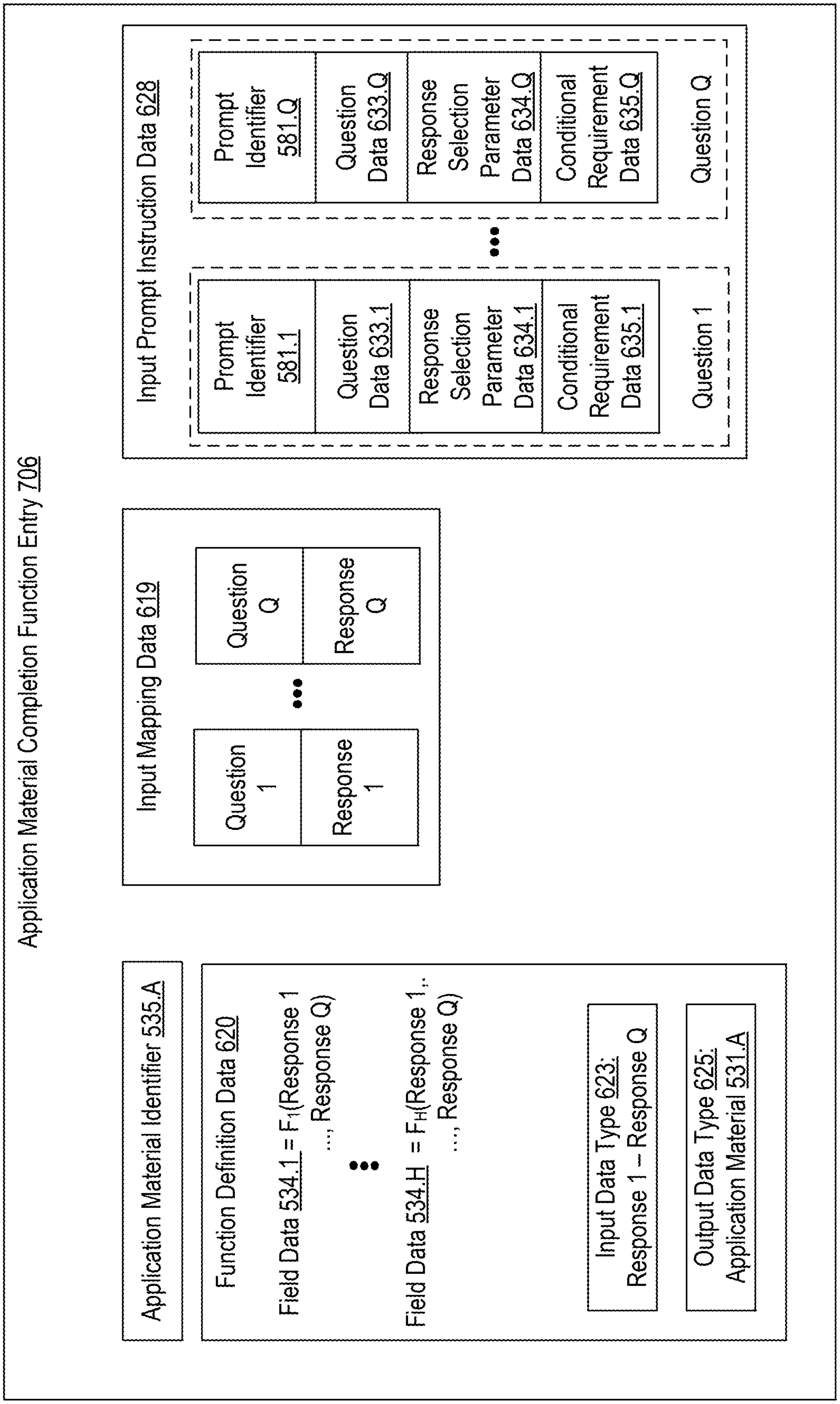
Figure 7F:
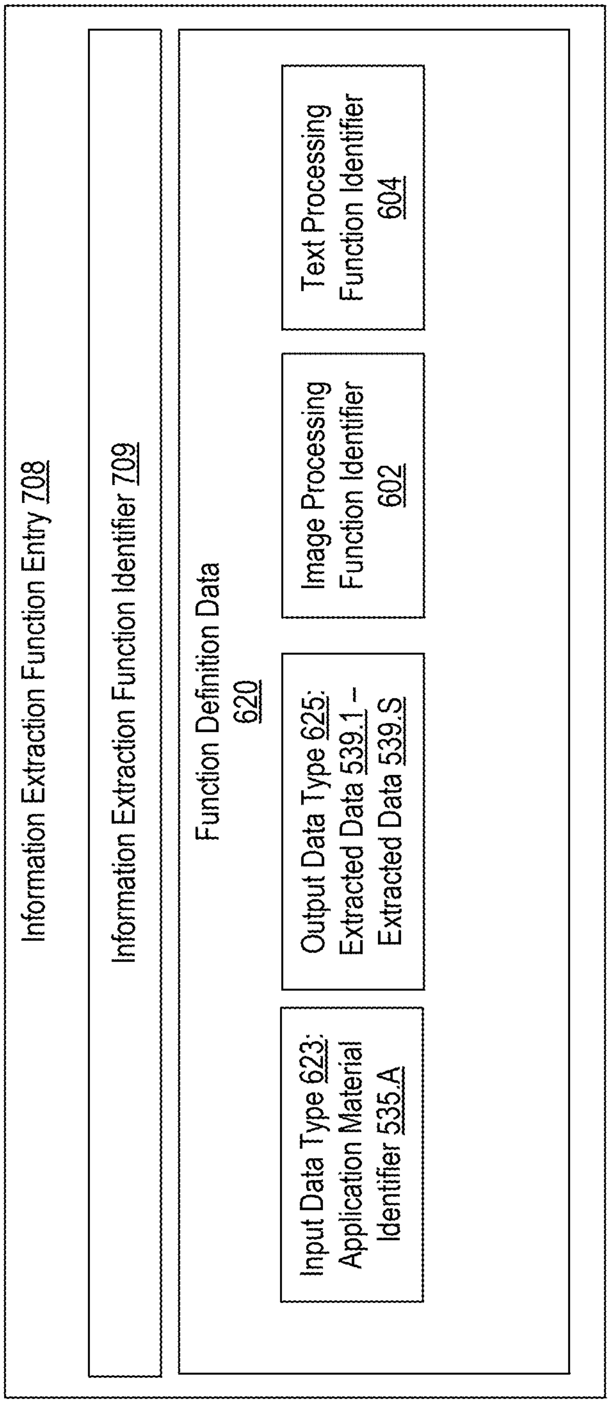
FIG. 7F illustrates data included in and/or indicated by an information extraction function entry in accordance with various embodiments.
Figure 7G:
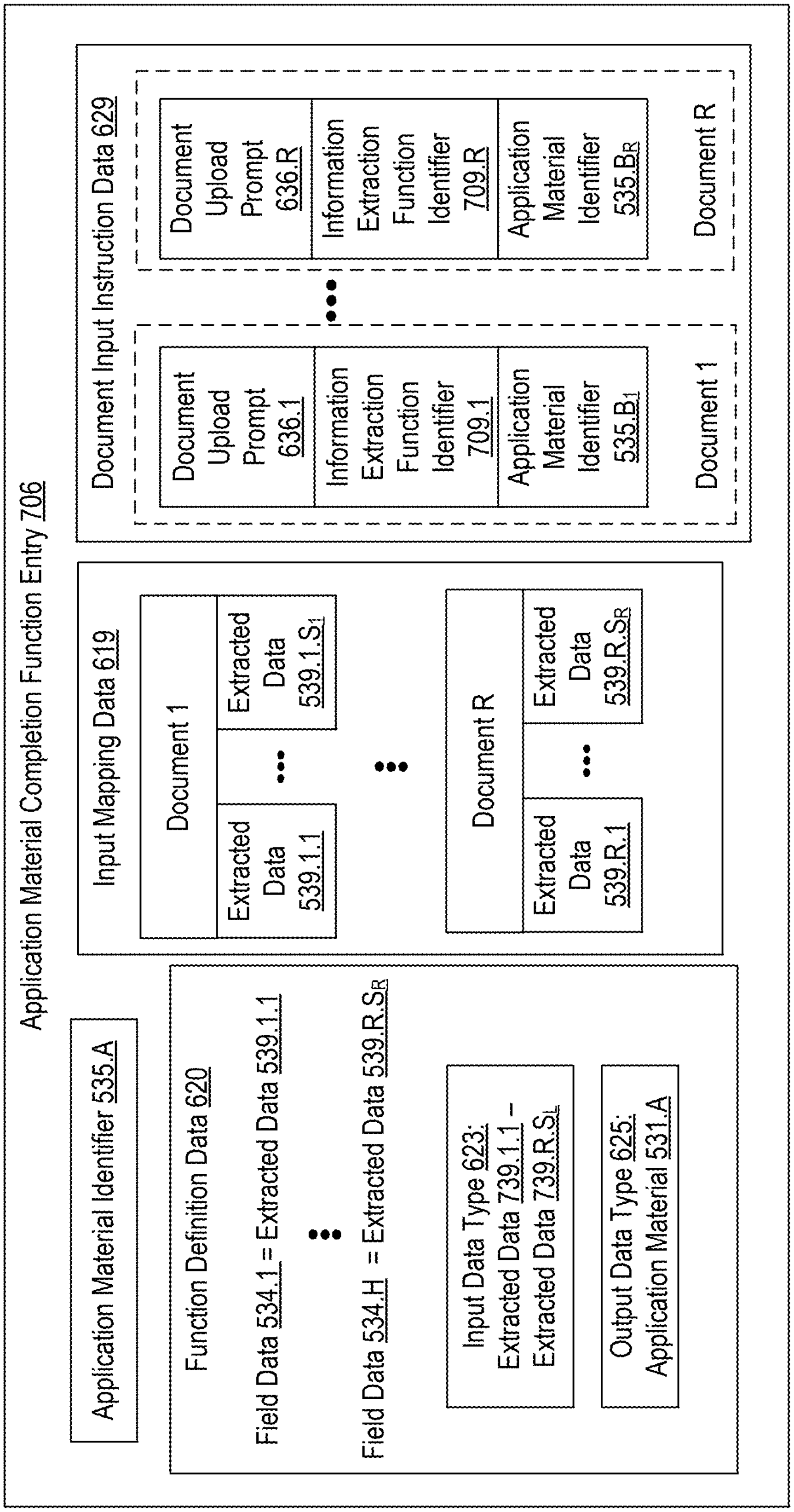
FIG. 7G illustrates data included in and/or indicated by an application material completion function entry in accordance with various embodiments.

FIGS. 7D, 7E, and 7G illustrate embodiments of an application material completion function entry 706. A given application material completion function can correspond to one or more particular types of document for inclusion in immigration applications, as denoted by one or more application material identifiers 535. For example, every possible application material 1-W can have a corresponding application material completion function entry 706 that, when performed, can output a completed application material 531 of the corresponding type. For example, generating a completed immigration application that includes a subset of the set of possible application material 1-W, for example, that includes X different required documents, can include performing the corresponding X application material completion functions for the user.

Different types of application materials can have different types of application material completion functions. For example, one or more of the X documents can be completed for the user by performing an application material completion function as described in conjunction with FIG. 7D. Alternatively or in addition, a different one or more of the X documents can be completed for the user by performing an application material completion function as described in conjunction with FIG. 7E. Alternatively or in addition, a different one or more of the X documents can be completed for the user by performing an application material completion function as described in conjunction with FIG. 7G. Performance of application material completion functions is discussed in further detail in conjunction with FIGS. 10A-10F.

As used herein, an application material identifier "535.A" denotes that the application material identifier corresponds to a particular type of document, such as a particular type of application material to be completed, a particular type of document file, a particular form, and/or any other particular document "A". Different uses of application material identifier 535.A can correspond to different particular types of document.

FIG. 7D illustrates one example of an application material completion function entry 706. One or more application material completion function entries 706 for one or more corresponding types of application material such as application materials corresponding to document files 532, can be implemented to output a completed application material 531 with a type corresponding to the corresponding application material identifier based on receiving and/or processing an uploaded document file 532 that is implemented as, included in, and/or utilized to generate, the completed application material 531.

In such embodiments, performing an application material completion function corresponding to an application material completion function entry 706 can include obtaining one or more document files as input, for example, in accordance with a document upload prompt 636 displayed via an interactive user interface 375 of a client device 130 and receiving the one or more document files. For example, performing the application material completion function can include sending the document upload prompt 636 to the client device 130 for display and/or can include receiving the document in response to the user interacting with client device 130 in conjunction with display of the document upload prompt 636. Examples of document upload prompts 636 utilized in conjunction with application material completion functions are illustrated in FIGS. 10G-10O. The document can alternatively be accessed, for example, in the user account 165, based on being previously uploaded and/or generated by the immigration assistance system 100.

These uploaded one or more documents, once received by the immigration assistance system 100, can optionally be processed via one or more document processing functions, as denoted by one or document processing function identifiers 606. For example, an application material completion function entry 706 can be implemented as, or based on performing, a document processing function entry 605. In some embodiments, the document is first verified via a document verification function, is processed to determine whether or not it adheres to a set of requirements via a digital photograph adherence function, and/or is processed to identify relevant information via extracted text by performing an information extraction function, via performance of one or more document processing functions corresponding to the identified one or more document processing function entries 605.

The uploaded document, and/or data outputted via performance of the one or more document processing functions, can be utilized as input to the application material function. The Application material completion function can output an application material 531, corresponding to the type of application material denoted by the application material identifier 535.A.

For one or more application material completion functions corresponding to one or more types of application materials, the outputted application material 531 includes and/or corresponds to the document file, such as a document file 532 and/or 319, uploaded by the user, without modification. For example, the application material completion function with application material identifier 535 corresponding to a passport can be operable to output a document file uploaded by a user that included the user's passport.

In some embodiments, the outputted application material 531 includes a modified version of the document file uploaded by the user, for example, where one or more image processing functions are performed to enhance image quality, to crop out portions of the image that do not depict the document, and/or to align a rectangular document captured in the image in the frame of the image.

In some embodiments, in addition to the application material 531, the application material completion function outputs verification data 537, requirement adherence data 538, and/or extracted data 539. For example, the document uploaded for an application material completion function with a particular application material identifier 535 can be processed via one or more image processing functions to verify that: the document corresponds to the corresponding type of application material with the particular application material identifier 535, and not a different type of document; or that the uploaded document is valid for submission. For example, the application material completion function with application material identifier 535 corresponding to a passport can be operable to reject, and/or deem the passport application material 535 not complete, based on performing one or more image processing functions upon the uploaded document and determining that the image depicts a driver's license rather than a passport, or that the depicted passport has an expiration date indicating the passport is expired.

FIG. 7E illustrates another example of an application material completion function. One or more application material completion function entries 706 for one or more corresponding types of application materials, such as application materials corresponding to form data 533, can be implemented to output a completed application material 531 with a type corresponding to the corresponding application material identifier based on receiving and/or processing one or more responses 1-Q to a set of questions 1-Q. For example, one or more application material completion function entries 706 for one or more corresponding types of application materials can be implemented as a response processing function entry 607 and/or can otherwise be performed in a same or similar fashion as response processing functions as discussed in conjunction with FIGS. 6F and 6G. In other embodiments, an application requirement function entry can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

Such embodiments of an application material completion function can complete the corresponding application material based on generating a plurality of field data 534.1-534.H as a function of responses 1-Q. As illustrated in FIG. 7E, one or more field data 534 can be a function of multiple responses, such as all of the responses 1-Q. Alternatively, one or more field data 534 can be a function of a single corresponding response. For example, the responses 1-Q includes exactly H responses, where each field data 534.1-534.H is set as a corresponding one of the set of responses 1-Q. The set of functions utilized to generate the set of field data 534.1-534.H can be configured via user input, and/or can be generated automatically based on: training the risk assessment function via one or more learning algorithms and/or machine learning techniques, and/or based on implementing the historical immigration data processing system 124.

FIG. 7F illustrates an embodiment of an information extraction function entry 708. An information extraction function entry 708 can be implemented as a document processing function entry 605 and/or can be implemented in accordance with functionality discussed in conjunction with FIG. 6E. The information extraction function entry 708 can have a corresponding information extraction function identifier 709, which can implement the function identifier 176. Different information extraction functions can be configured to extract relevant information from different types of documents, such as some or all of the set of possible application materials 1-W. Different information extraction functions can be configured to extract different types of relevant information from the same type of documents. Performance of information extraction functions is discussed in further detail in conjunction with FIGS. 12B-12G.

The corresponding information extraction function can have an input data type 623 of a particular type of completed application material 531, file 319, and/or document file 532, denoted by application material identifier 535.A. In some embodiments, the inputted document corresponds to a document that is also included in the same user's immigration application as a completed application material 535. Alternatively, the inputted file and/or document is utilized for information extraction only, and is not included in the user's immigration application as a completed application material 531. In some embodiments, the type of input document corresponds to image data, such as a photograph, scan, or screenshot capturing an image of a particular type of document, such as a hard copy document or an electronically presented document.

The corresponding information extraction function can have an output data type 625 of extracted data 539.1-539.S, which can collectively implement the extracted data 539 of the corresponding document as illustrated in FIG. 5E, for example, if the input document corresponds to a completed application material 531. Each extracted data 539.1-539.S can correspond to one of a set of relevant information 1-S that is extracted from the input document.

The extracted data 539.1-539.S can be generated based on performing one or more image processing functions and/or text processing functions, denoted by corresponding identifiers 602 and 604. The image processing function can be performed to identify text and/or other information in the document. For example, the image processing function can be operable to generate textual data by identifying some or all of a set of text included in the document. The text processing function can be performed upon this identified text to extract relevant information from the text as extracted data 539.1-539.S. Performing the text processing function can include utilizing a known textual structure and/or format of the document, searching for and/or detecting one or more keywords in the document, and/or utilizing one or more natural language processing techniques to detect and extract extracted data 539.1-539.S. In some cases, if the input document does not include image data, for example based on being formatted as a text file, PDF file, or other document file where text can be extracted directly, only the text processing function 609 is performed.

In some embodiments, some or all extracted data 539.1-539.S is generated by performing the image processing function alone to identify particular, relevant text and/or other information in the document. This can be based on a known graphical layout and/or format of the relevant information in the given type of document, and/or based on identifying known textual labels for the relevant information in the given type of document. Some extracted data can correspond to other types of data such as image data, where a picture of the user, a signature, an official seal, watermarks, or other image data is extracted as some or all of extracted data 539.1-539.S.

FIG. 7G illustrates another example of an application material completion function that utilizes extracted data from one or more documents. One or more application material completion function entries 706 for one or more corresponding types of application materials, such as application materials corresponding to form data 533, can be implemented to output a completed application material 531 with a type corresponding to the corresponding application material identifier based on extracted data 539.1-539.S generated from one or more documents 1-R. For example, one or more application material completion function entries 706 for one or more corresponding types of application materials can be implemented as a document processing function entry 605 and/or can otherwise be performed in a same or similar fashion as response processing functions as discussed in conjunction with FIG. 6E. Each of the one or more documents 1-R can be of a corresponding document type denoted by a corresponding application material identifier 535.B, which can be different from application material identifier 535.A, as the application material types of the documents 1-R are different from the type of application material outputted by the application material completion function.

As illustrated in FIG. 7G, extracted data 539.1-539.S for a given document can be generated based on performing a corresponding information extraction function as discussed in conjunction with FIG. 7F. In some embodiments, an application requirement function entry can be implemented as an information processing function entry 609 of FIG. 6H that utilizes as input, instead of or in addition to the extracted data 539.1-539: responses 1-Q from a set of prompts; previously received response data 582 of response log data 517, and/or any other relevant data accessed via user account 165 and/or otherwise generated for, received from, or otherwise determined for the user.

Each of a set of field data 534.1-534.H can be generated as a function of the set extracted data 539.1-539.S of one or more of the R documents, for example, in a same or similar fashion as utilizing responses 1-Q to generate each of a set of field data 534.1-534.H as discussed in conjunction with 7E. As illustrated in FIG. 7G, each field data 534 can optionally correspond to a particular extracted data 539. For example, the corresponding information extraction function entry 708 can be configured for the corresponding form data 533 of the corresponding application material, and can be configured to generate and/or format the extracted data 539 in accordance with a data type and/or formatting requirements of the corresponding field data 534. Alternatively, the application material completion function is configured to format, further extract from, further process, and/or modify extracted data 539 to render corresponding field data 534 in accordance with the data type and/or formatting requirements.

Figure 7H:
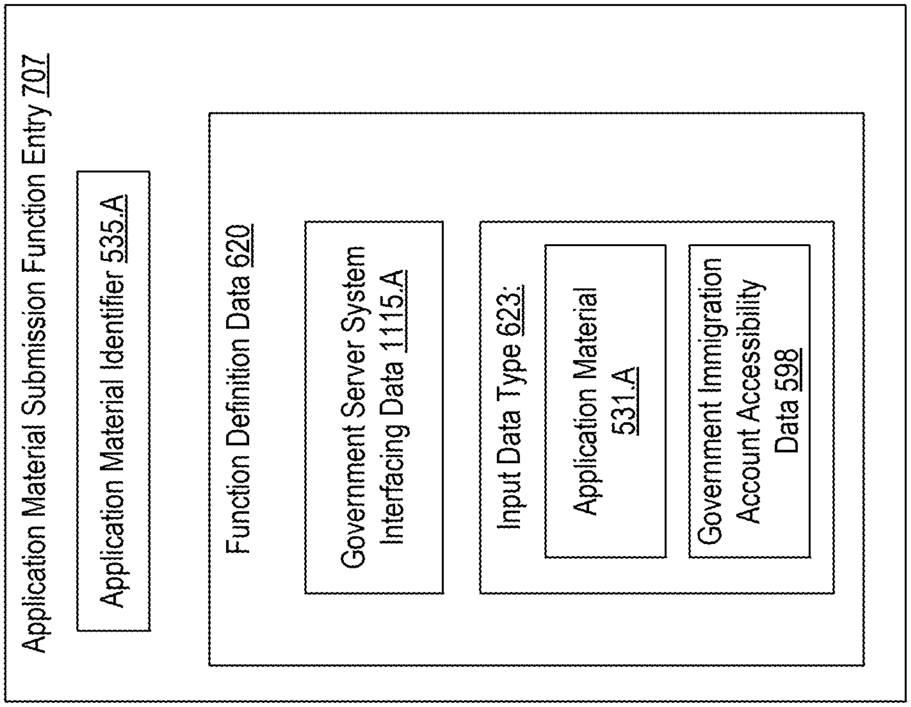
FIG. 7H illustrates data included in and/or indicated by an application material submission function entry in accordance with various embodiments.

FIG. 7H illustrates an embodiment of an application material submission function entry 707. One or more application material submission function entries 707 can be implemented and performed for one or more corresponding types of application materials, corresponding countries, and/or corresponding types of immigration status. An application material submission function entry 605.

The application material submission function entry 707 for a given application material can have a corresponding input data type 623 indicating an application material 531 of a particular type be utilized as input, for example, based on being generated via a corresponding application material completion function as discussed in conjunction with FIGS. 7D, 7E, and 7G; based on being accessed in user account 165; and/or based on being otherwise received and/or accessed.

The input data can optionally include government immigration account accessibility data 599 for the corresponding user, for example, to enable login to and/or access to the user's account with a government server system corresponding to the country and/or immigration status type of the user's immigration application in conjunction with submitting the application material 531.A for the user.

Performing the application material submission function entry 707 can include submitting the corresponding application material 531.A to a government server system, for example, based on utilizing government server system interfacing data 1115.A corresponding to the type of application material denoted by application material identifier 535.A and/or based on otherwise sending the corresponding application material 531.A to the government server system in accordance with submitting a corresponding immigration application. This can include accessing a particular webpage, entering field data 534 of particular form data 533 of the application material 531.A in fields presented via the particular webpage hosted by the government server system, and/or uploading a document file 532 of the application material 531.A via interaction with a website hosted by government server system. Different types of documents can have different government server system interfacing data 1115 based on being submitted via different web addresses, in response to different presented prompts via one or more presented webpages, and/or based on otherwise being submitted via different instructions, locations, and/or means. Performance of application material submission functions is discussed in further detail in conjunction with FIGS. 11A-11G.

Figure 7I:
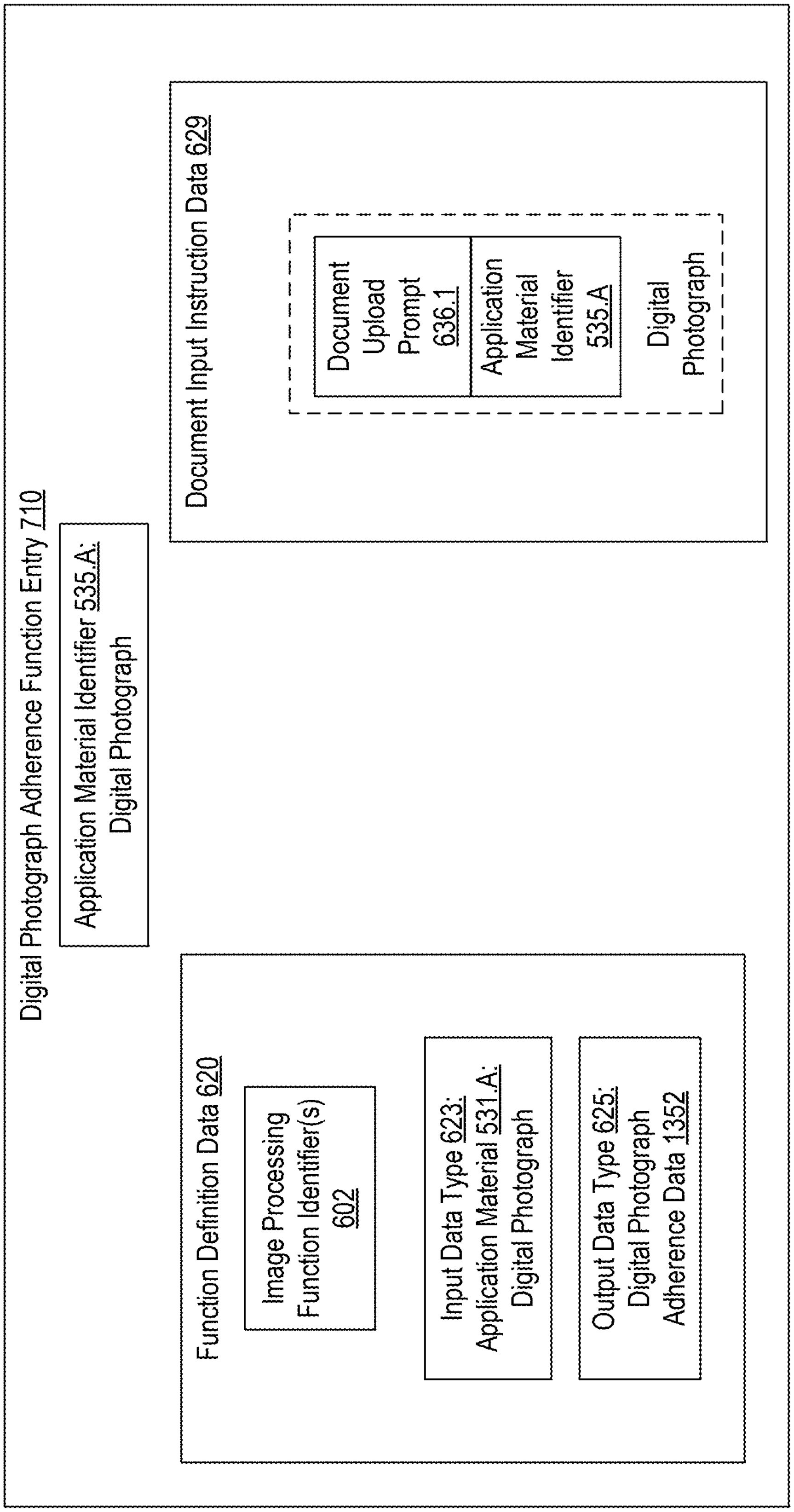
FIGS. 7I-7J illustrate data included in and/or indicated by a digital photograph adherence function entry in accordance with various embodiments.
Figure 7J:
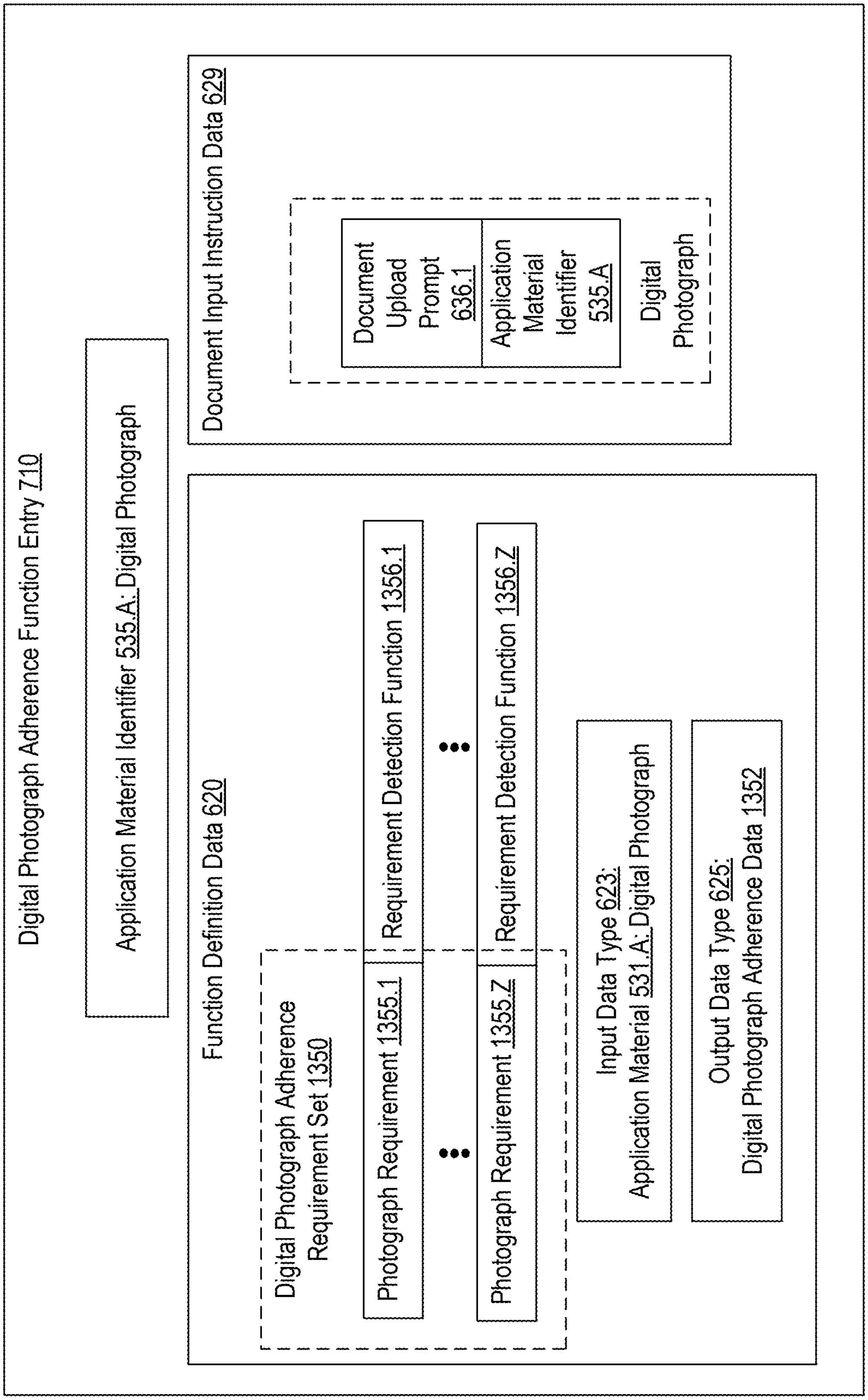

FIGS. 7I and 7J illustrates embodiments of a digital photograph adherence function entry 710. For example, one or more digital photograph adherence function entries 710 for one or more corresponding types of application materials, such as application materials that include digital photographs or other image data, can be implemented as a document processing function entry 605 and/or can otherwise be performed in a same or similar fashion as document processing functions as discussed in conjunction with FIG. 6E. As another example, one or more digital photograph adherence function entries 710 for one or more corresponding types of application materials can be implemented as an application material completion function entry 706 for the corresponding type of application material and/or can otherwise be performed in conjunction with completing the corresponding type of application material.

A given digital photograph adherence function entry 710 can correspond to a particular type of application material. One digital photograph adherence function entry 710 can correspond to an application material corresponding to a digital photograph of the user, such as a headshot or portrait of the user that is required in an immigration application. Different types of application materials that include digital photographs or other image data can optionally have their own corresponding digital photograph adherence function entries 710.

As illustrated in FIG. 7I, the output data type 625 can correspond to digital photograph adherence data 1352 generated to indicate whether or not the digital photograph adheres to one or more requirements. Performing the digital photograph adherence function can include receiving the digital photograph, for example, based on a user interacting with a corresponding document upload prompt. Performing the digital photograph adherence function can include performing one or more image processing function upon the digital photograph to generate digital photograph adherence data 1352 for the digital photograph, which can be outputted by the digital photograph adherence function.

As illustrated in FIG. 7J, the function definition data 620 for a digital photograph adherence function entry 710 can further indicate a digital photograph adherence requirement set 1350, which can include a set of photograph requirements 1355.1-1355.Z. Each of the photograph requirements 1355 can have a corresponding requirement detection function 1356, which can be based on performing one or more image processing functions. A requirement detection function 1356 can generate adherence data indicating whether the corresponding photograph requirement 1355 was adhered to. The digital photograph adherence data 1352 can indicate adherence if and only if all of the requirement detection function 1356 indicate the photograph adhered to the corresponding photograph requirement. The digital photograph adherence data 1352 can indicate non-adherence if one or more of the requirement detection function 1356 indicate the photograph did not adhere to the corresponding photograph requirement. The digital photograph adherence data 1352 can indicate which photograph requirements 1355 were adhered to and/or which photograph requirements 1355 were not adhered to.

The digital photograph adherence requirement set 1350 can be configured based on user input, can be determined based on receiving and/or accessing corresponding requirements for the corresponding application material that are established by a government entity, and/or can be automatically generated, trained, and/or updated by the immigration assistance system, for example, by implementing the historical immigration data processing system. The requirement detection function 1356 can be configured to generate the digital photograph adherence data 1352 via computing corresponding measurements and/or comparing these measurements to required measurement thresholds dictating adherence to a corresponding requirement (e.g. via detecting at least one corresponding feature in a set of adjacent pixels of a corresponding image and measuring the feature and/or distance between features).

For example, one or more photograph requirements 1355 the digital photograph adherence requirement set 1350 for a type of application material corresponding to a headshot or portrait digital photograph of the user can include: a minimum pixel dimension requirement, a minimum file size requirement, a maximum file size requirement, a file format requirement, a color space requirement, an unaltered requirement, a required chin to crown length range, a front-facing orientation requirement, a face-centered framing requirement, an eye visibility requirement, a non-obscured face requirement, a minimal head covering requirement, a neutral facial expression requirement, a background requirement, a paper photo scanning requirement, a maximum photograph age requirement, and/or any other requirements for the digital photograph.

As a particular example, the maximum photograph age requirement can require that the digital photograph was taken within the last 6 months. The maximum photograph age requirement can alternatively require that the digital photograph was taken in any other time window.

As another particular example, the front-facing orientation requirement and/or the face-centered framing requirement can require that the digital photograph shows a full front view of the head and tops of shoulders, with the face in the middle of the photo, and/or with the face square to the camera.

As another particular example, the required chin to crown length range can require that the size of the head, from chin to crown, be between 31 mm and 36 mm. The required chin to crown length range can alternatively require any other any other length range. A corresponding measurement can be computed based on a predetermined mapping of pixel to number of millimeters and/or further computing a number of pixels between at least one pixel detected to include the chin and another at least one pixel detected to include the crown.

As another particular example, the minimum pixel dimension requirement can indicate the image size be at least 420×540 pixels. The required minimum pixel dimension requirement can alternatively require other minimum pixel dimensions.

As another particular example, the file format requirement can require that the digital photograph be in a JPEG file format or a JPEG2000 file format. The file format requirement can alternatively indicate any other one or more file formats.

As another particular example, the minimum file size requirement and/or the maximum file size requirement can indicate the file size be approximately 240 kB and/or no more than 4 MB. The minimum file size requirement and/or the maximum file size requirement can alternatively indicate any other maximum, approximate, and/or minimum file size.

As another particular example, the color space requirement can indicate that the image must be in color and/or must have 24 bits per pixel in RGB color space. The color space requirement can alternatively indicate any other color requirements.

As another particular example, the unaltered requirement can require that the digital photograph be taken with a digital camera and/or that the digital photograph not be altered in any way, for example, where the digital photograph cannot be altered via photo editing software.

As another particular example, the neutral facial expression requirement can require that the user: assume a neutral facial expression in the photograph, neither smile nor frown; and/or that the mouth of the user be closed. A corresponding measurement can include computing a horizontal distance detected between sets of pixels detected to include corners of the mouth, a vertical span detected between all pixels detected to include the mouth, and/or a ratio between the horizontal and vertical distance (e.g. the vertical distance is constrained by a threshold amount and/or vertical distance relative to the horizontal distance is constrained by a threshold ratio of horizontal distance to vertical distance or vice versa).

As another particular example, the eye visibility requirement can require that two eyes of the user are clearly visible and/or are open. The eye visibility requirement can allow the user to wear prescription glasses in the digital photograph and/or can require that the prescription glasses be non-tinted. A corresponding measurement can include measuring a difference in average pixel color between a set of pixels detected to include the face and/or skin of the face and a set of pixels detected to include glasses, where the difference is constrained by a threshold difference amount in each of Red, Green, and Blue, or as a Euclidean difference between the sets of three values on average.

As another particular example, a non-disguise requirement can allow the user to wear a hairpiece or other cosmetic accessory in the photograph as long as it does not disguise the normal appearance of the user.

As another particular example, the non-obscured face requirement and/or the minimal head covering requirement can allow the user to wear a head covering in the photograph, for example, for religious reasons, but can require that full facial features are not obscured by the head covering.

As another particular example, the background requirement can require the photo include a white and/or solid colored background behind the user. The background requirement can further require that the background not be reflective and/or that the reflectivity of the background not exceed a threshold reflectivity.

As another particular example, the paper photo scanning requirement can indicate that a paper photo may be scanned, and if the digital photograph corresponds to the scanning of a paper photo, the frame must be at least 35 mm×45 mm.

Performance of the digital photograph adherence function, for example, to detect whether one or more of these photograph requirements 1355 are adhered to via one or more requirement detection functions, are discussed in further detail in conjunction with the various embodiments of FIGS. 13A-13I.

One or more other document adherence function entries can be included in function library and can be implemented as document processing function entries that, when performed, generate adherence data indicating whether a corresponding document adheres to each of a set of requirements, for example, in a same or similar fashion as discussed in conjunction with digital photograph adherence function entry 710. For example, these other document adherence function entries can correspond to different types of documents that have their own document adherence requirement set of document requirements, even if the corresponding document is not implemented as a digital photograph. The document adherence requirement set of document requirements for other document adherence function entries can be based on requirements received from and/or established by a government entity for a country corresponding to the document adherence function entry.

For example, another document adherence function entry can be implemented for application materials corresponding to letters of acceptance to schools or other academic institutions, and can have an input data type corresponding to a letter of acceptance application material. The document adherence requirement set for the letter of acceptance application material can include one or more document requirements including: a requirement to include a school letterhead; a requirement to include the school's full mailing address and/or contact information; a requirement to include tuition fees to the school; a requirement to include a start date and finish date of a program at the school; and/or a requirement to include name of the program at the school.

The document adherence function entry for the letter of acceptance application material can indicate an input data type 623 indicating that input corresponds to a letter of acceptance. The document adherence function entry for the letter of acceptance application material can indicate an output data type 625 indicating that output corresponds to document adherence data for the letter of acceptance application material. For example, the document adherence data for the letter of acceptance application material can indicate whether all of the document adherence requirement set for the letter of acceptance application material are met, and/or which ones of the document adherence requirement set for the letter of acceptance application material are met and/or are not met.

If the letter of acceptance is submitted as image data, such as a photograph, screenshot, or scan of the letter of acceptance, performing a corresponding document adherence function can include performing an image processing function, for example, indicated in function definition data 620 of the document processing function. For example, the image processing function is implemented to detect the letterhead and/or to detect text included in the image data corresponding to text of the letter of acceptance from the inputted letter of acceptance document. Performing the document adherence function can alternatively or additionally include detect whether text of the letter of acceptance document include the school's full mailing address, school's contact information, tuition fees to the school, a program start date, a program finish date, a name of the program at the school, and/or other required text, for example, based on performing a text processing function.

As another example, another document adherence function entry can be implemented for application materials corresponding to passports. The document adherence requirement set for the passport application material can include one or more document requirements including: a requirement that the passport not expire prior to completion of the user's studies at an academic intuition, and/or other requirements.

The document adherence function entry for the passport application material can indicate an input data type 623 indicating that input corresponds to a passport application material. The input data type 623 indicating that input corresponds to a study program end date and/or other immigration end date. For example, the study program end date is indicated by corresponding response data 582, is indicated by corresponding extracted data 539 from a letter of acceptance from the institution, and/or is accessed in the user account 165 for the user, for example, as expiration date 509 or other information indicating ending date of the user's study program and/or immigration to the country.

The document adherence function entry for the passport application material can indicate an output data type 625 indicating that output corresponds to document adherence data for the passport application material. For example, the document adherence data for the passport application material can indicate whether all of the document adherence requirement set for the passport application material are met, and/or which ones of the document adherence requirement set for the passport application material are met and/or are not met.

If the passport is submitted as image data, such as a photograph, screenshot, or scan of the passport, performing a corresponding document adherence function can include performing an image processing function, for example, indicated in function definition data 620 of the document processing function. For example, the image processing function is implemented to detect the expiration date in image data of the passport. Performing the corresponding document adherence function can alternatively or additionally include comparing the expiration date detected in and/or extracted from the passport as extracted data 539, and generating document adherence data indicating adherence only when the expiration date is after the ending date of the user's study program and/or immigration to the country.

As another example, another document adherence function entry can be implemented for application materials corresponding to travel documents. The document adherence requirement set for the travel document application material can include one or more document requirements including: a requirement that the travel document include a photo of the user; a requirement that the travel document include a full name of the user; a requirement that the travel document include a date of birth of the user; a requirement that the travel document include a citizenship or residency status for the user in the country the user is immigrating from; and/or a document number.

The document adherence function entry for the travel document application material can indicate an input data type 623 indicating that input corresponds to a travel document application material. The document adherence function entry for the travel document application material can indicate an output data type 625 indicating that output corresponds to document adherence data for the travel document application material. For example, the document adherence data for the travel document application material can indicate whether all of the document adherence requirement set for the travel document application material are met, and/or which ones of the document adherence requirement set for the travel document application material are met and/or are not met.

If the travel document is submitted as image data, such as a photograph, screenshot, or scan of the travel document, performing a corresponding document adherence function can include performing an image processing function, for example, indicated in function definition data 620 of the document processing function. For example, the image processing function is implemented to detect the photo of the user in the travel document and/or to detect text in image data of the travel document. Performing the corresponding document adherence function can alternatively or additionally include identifying whether or not the text of the travel document indicates a full name of the user, a date of birth of the user, a citizenship or residency status, and/or a document number, for example, based on performing at least one text processing functions.

As another example, another document adherence function entry can be implemented for application materials corresponding to language test results, such as IELTS or TEF test results. The document adherence requirement set for the test result application material can include one or more document requirements including: a requirement that the test result be within the last 2 years, or other predetermined timeframe, and/or other requirements. The document adherence requirement set for the test result application material corresponding to IELTS test results can include one or more language skill score requirements, such as: a required listening score of at least 6, or another threshold; a required reading score of at least 6, or another threshold; a required writing score of at least 6, or another threshold; a required speaking score of at least 6, or another threshold; and/or other language skill score requirements. The document adherence requirement set for the test result application material corresponding to TEF test results can include a benchmark score requirement, such as Canadian Language Benchmark score requirement of 7, and/or can and/or one or more language skill score requirements, such as: a required listening score of at least 249, or another threshold; a required reading score of at least 207, or another threshold; a required writing score of at least 310, or another threshold; a required speaking score of at least 310, or another threshold; and/or other language skill score requirements.

The document adherence function entry for the language test result application material can indicate an input data type 623 indicating that input corresponds to a language test result application material. The document adherence function entry for the language test result application material can indicate an output data type 625 indicating that output corresponds to document adherence data for the language test result application material. For example, the document adherence data for the language test result application material can indicate whether all of the document adherence requirement set for the language test result application material are met, and/or which ones of the document adherence requirement set for the language test result application material are met and/or are not met.

If the language test result is submitted as image data, such as a photograph, screenshot, or scan of the language test result, performing a corresponding document adherence function can include performing an image processing function, for example, indicated in function definition data 620 of the document processing function. For example, the image processing function is implemented to detect a testing date in image data of the language test result application material. Alternatively or in addition, performing the corresponding document adherence function can include detecting the testing date in text of the language test result application material.

Performing the corresponding document adherence function can alternatively or additionally include determining whether the testing date in text of the language test result is: prior to a current date by at least two years; prior to a projected application submission data by at least two years; and/or prior to a start date of the study program by at least two years, where the start date of the study program is received as input based on being indicated in a prior response, being indicated in extracted data 539, and/or being accessed in user account 165.

Performing the corresponding document adherence function can alternatively or additionally further include determining whether the benchmark score and/or each of a set of language skill scores, such as each of a listening score, reading score, writing score, and/or speaking score, meet or exceed corresponding score thresholds indicated in the document adherence requirement set of the language test result.

As another example, another document adherence function entry can be implemented for application materials corresponding to transcripts and/or mark sheets from academic institutions. The document adherence requirement set for the transcript application material can include one or more document requirements including: a requirement that the transcript identify a set of classes taken by the user; a requirement that the transcript identify when each of the set of classes was taken by the user; a requirement that the transcript identify the grade achieved by the user for each of the set of classes, and/or a requirement that the transcript be transcribed into English, French, or another predetermined language.

The document adherence function entry for the transcript application material can indicate an input data type 623 indicating that input corresponds to a transcript application material. The document adherence function entry for the transcript application material can indicate an output data type 625 indicating that output corresponds to document adherence data for the transcript application material. For example, the document adherence data for the transcript application material can indicate whether all of the document adherence requirement set for the transcript application material are met, and/or which ones of the document adherence requirement set for the transcript application material are met and/or are not met.

If the transcript is submitted as image data, such as a photograph, screenshot, or scan of the transcript, performing a corresponding document adherence function can include performing an image processing function, for example, indicated in function definition data 620 of the document processing function. For example, the image processing function is implemented to detect text in the transcript. Performing the corresponding document adherence function can alternatively or additionally include identifying whether or not the text of the transcript indicates names, grades, and/or dates of a set of courses taken by the user, for example, based on performing at least one text processing function. Performing the corresponding document adherence function can further include identifying whether or not the text of the transcript is in English, French, or the other predetermined language.

As another example, another document adherence function entry can be implemented for application materials corresponding to medical exam results. The document adherence requirement set for the medical exam application material can include one or more document requirements including: a requirement that the medical exam result be taken within the last 12 months, or other predetermined timeframe, and/or other requirements.

The document adherence function entry for the medical exam results application material can indicate an input data type 623 indicating that input corresponds to a medical exam results application material. The document adherence function entry for the medical exam results application material can indicate an output data type 625 indicating that output corresponds to document adherence data for the medical exam results application material. For example, the document adherence data for the medical exam results application material can indicate whether all of the document adherence requirement set for the medical exam results application material are met, and/or which ones of the document adherence requirement set for the medical exam results application material are met and/or are not met.

If the medical exam result is submitted as image data, such as a photograph, screenshot, or scan of the medical exam results, performing a corresponding document adherence function can include performing an image processing function, for example, indicated in function definition data 620 of the document processing function. For example, the image processing function is implemented to detect a testing date in image data of the medical exam results application material. Alternatively or in addition, performing the corresponding document adherence function can include detecting the medical exam results in text of the language test result application material.

Performing the corresponding document adherence function can alternatively or additionally include determining whether the testing date in text of the medical exam results is: prior to a current date by at least 12 months; prior to a projected application submission data by at least 12 months; and/or prior to a start date of the study program by at least 12 months, where the start date of the study program is received as input based on being indicated in a prior response, being indicated in extracted data 539, and/or being accessed in user account 165.

As another example, another document adherence function entry can be implemented for application materials corresponding to GIC application materials. The document adherence requirement set for the GIC application material can include one or more document requirements including one or more conditional threshold monetary amount requirements. For example different monetary amounts can be required based on different conditions. As a particular example, the document adherence requirement set for the GIC application material can include: a requirement that the GIC be at least $10,000 for the user if the user is a student attending school in Canada outside Quebec; a requirement that the GIC be at least $4,000 for the first family member of the user if the user is a student attending school in Canada outside Quebec; a requirement that the GIC be at least $3,000 for each additional family member of the user if the user is a student attending school in Canada outside Quebec; a requirement that the GIC be at least $11,000 for the user if the user is a student attending school in Quebec; a requirement that the GIC be at least $51000 for the first family member of the user that is older than 18 years of age if the user is a student attending school in Quebec; a requirement that the GIC be at least $5,125 for each additional family member of the user if the user that is older than 18 years of age if the user is a student attending school in Quebec; and/or a requirement that the GIC be at least $1,903 for each family member of the user if the user that is younger than 18 years of age if the user is a student attending school in Quebec. The threshold monetary amounts for these requirements can be any other predetermined monetary amounts.

The document adherence function entry for the GIC application material can indicate an input data type 623 indicating that input corresponds to a GIC application material. The document adherence function entry for the GIC application material can indicate an output data type 625 indicating that output corresponds to document adherence data for the GIC application material. For example, the document adherence data for the GIC application material can indicate whether all of the document adherence requirement set for the GIC application material are met, and/or which ones of the document adherence requirement set for the GIC application material are met and/or are not met.

If the GIC is submitted as image data, such as a photograph, screenshot, or scan of the GIC, performing a corresponding document adherence function can include performing an image processing function, for example, indicated in function definition data 620 of the document processing function. For example, the image processing function is implemented to detect a monetary amount date in image data of the GIC application material. Alternatively or in addition, performing the corresponding document adherence function can include detecting the monetary amount in text of the language test result application material.

Performing the corresponding document adherence function can alternatively or additionally include determining whether the monetary in text of the GIC application material adheres to one or more corresponding conditional requirements. Performing the corresponding document adherence function can alternatively or additionally include determining whether the one or more conditional requirements apply to the user, for example, based on extracted data 539 response data 582, and/or information extracted from user account 165, and/or other information for the user indicating: a location, such as a province of Canada, in which the academic institution to which the user is attending is located; family member data for the user indicating family members immigrating to Canada, and/or other relevant information utilized to determine whether one or more conditional requirements apply to the user.

In some embodiments, digital photograph adherence data and/or other document adherence data can be utilized as input to a risk assessment function of a corresponding risk assessment function entry 702. For example, a user with uploaded documents for submission in their immigration application that do not adhere to all respective requirements can render their risk assessment score as being unfavorable and/or less favorable than that of a user with uploaded documents for submission in their immigration application that do adhere to all respective requirements.

In some embodiments, digital photograph adherence data and/or other document adherence data can be utilized as input to an application material completion function of a corresponding application material completion function entry 706 for the corresponding type of document. For example, an uploaded documents for submission that do not adhere to all respective requirements are rejected, where a user is required to resubmit documents for these application materials that do adhere to all respective requirements for the corresponding application material to be deemed complete and/or for the corresponding immigration application to be submitted to the government server system.

Figure 7K:
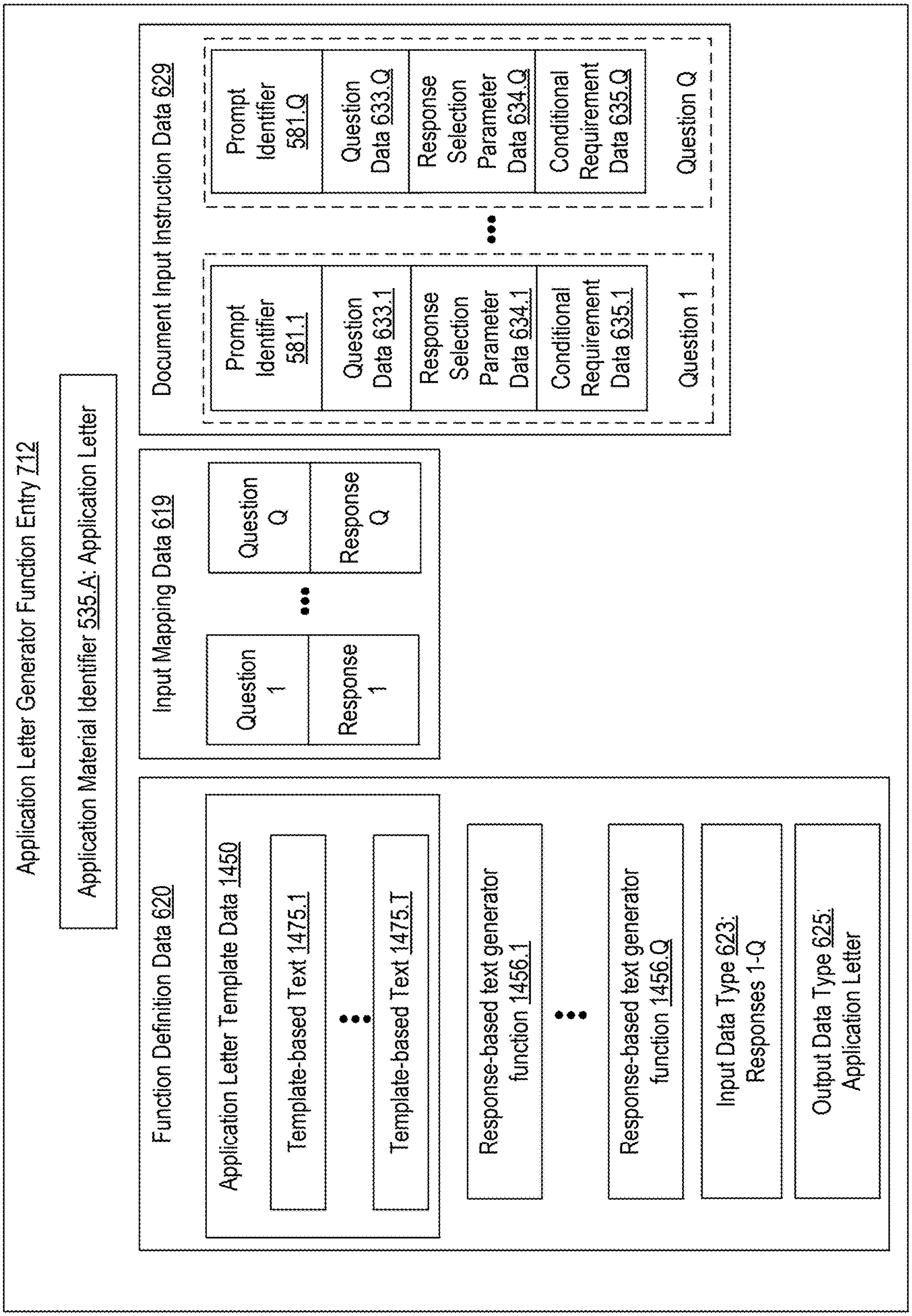
FIGS. 7K-7L illustrate data included in and/or indicated by an application letter generator function entry in accordance with various embodiments.
Figure 7L:
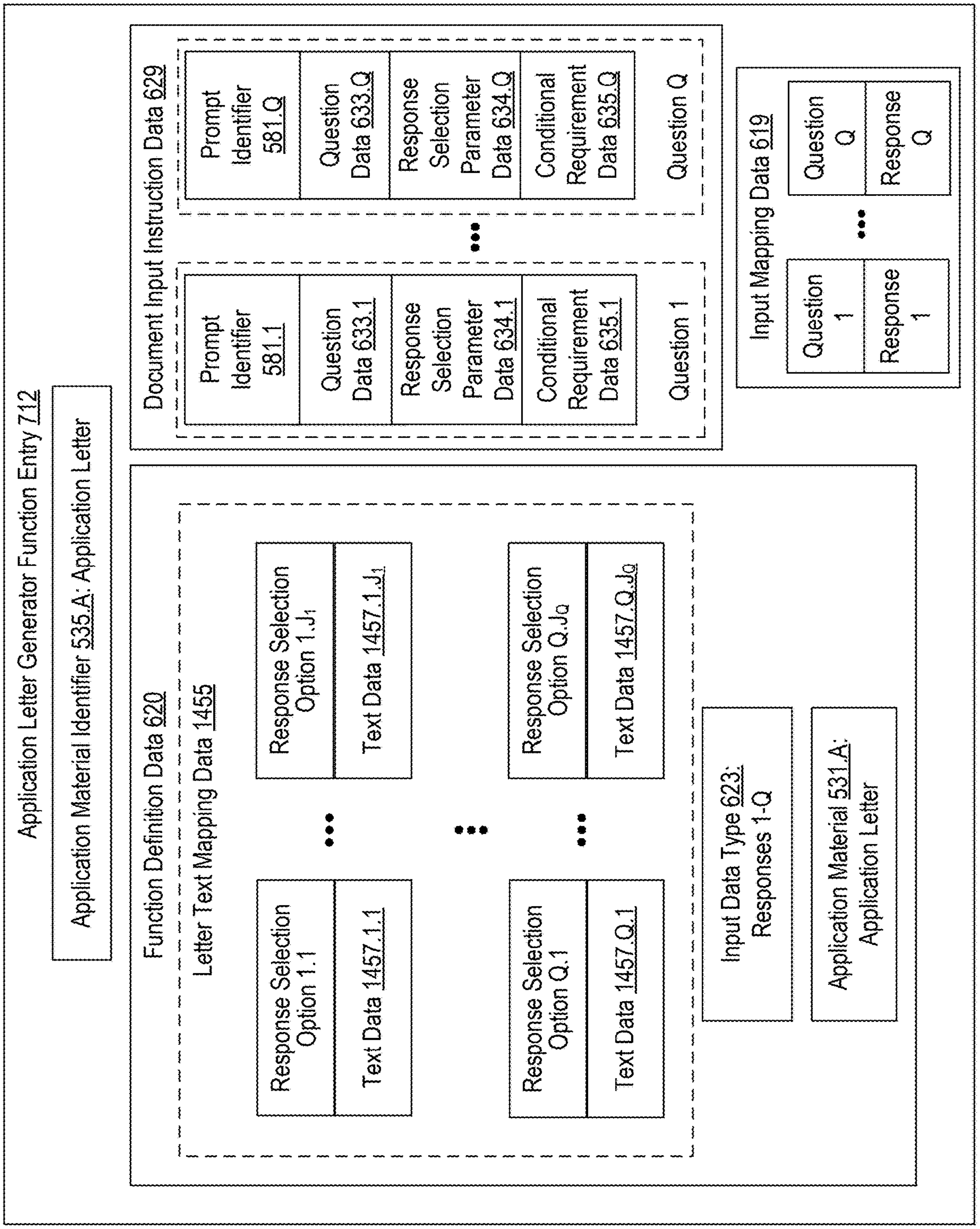

FIGS. 7K and 7L illustrate embodiments of an application letter generator function entry 712. For example, one or more application letter generator function entries 712 for one or more corresponding types of application materials, such as application materials that include letters, statements, or essays, can be implemented as a response processing function entry 607 and/or can otherwise be performed in a same or similar fashion as response processing function as discussed in conjunction with FIGS. 6F and 6G. In other embodiments, an application letter generator function entry 712 can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

As another example, one or more application letter generator function entries 712 for one or more corresponding types of application materials can be implemented as an application material completion function entry 706 for the corresponding type of application material and/or can otherwise be performed in conjunction with completing the corresponding type of application material.

A given application letter generator function entry 712 can correspond to a particular type of application material. One application letter generator function entry 712 can correspond to an application material corresponding to a letter of explanation, such as a study plan, that is required in an immigration application corresponding to a study permit. Another application letter generator function entry 712 can correspond to an application material corresponding to a letter from a person providing funding that is required in an immigration application corresponding to a study permit when the user is not self-funded. Different types of application materials that include letters, essays, and/or statements can optionally have their own corresponding application letter generator function entries 712. Performance of application letter generator functions is discussed in further detail in conjunction with FIGS. 14A-14F.

As illustrated in FIG. 7K, the function definition data 620 can indicate application letter template data 1450, which can include a plurality of template-based text 1475 for the corresponding type of application letter. The application letter template data 1450 can be: configured via user input, received and/or accessed, and/or can be generated automatically based on: a training set of application letters by implementing one or more learning algorithms and/or machine learning techniques, and/or based on implementing the historical immigration data processing system 124.

The function definition data 620 can optionally indicate a plurality of response-based text generator functions 1456.1-1456.Q, for example, each for performance by utilizing a corresponding one of the set of responses 1-Q as input. The plurality of response-based text generator functions 1456.1-1456.Q can be: configured via user input, received and/or accessed, and/or can be generated automatically based on: training the application letter generator function via one or more learning algorithms and/or machine learning techniques, and/or based on implementing the historical immigration data processing system 124.

The set of responses 1-Q can be generated in response to a plurality of questions, for example based on presenting corresponding question data 633 and/or response selection parameter data 634 via interactive user interface 375. Example question data 633 and response selection parameter data 634 for questions 1-Q presented in accordance with an application letter generator function are illustrated in FIGS. 14G-14AB.

The resulting application letter outputted by the application letter generator function can be generated based on generating a plurality of response-based text via performing the plurality of response-based generator functions upon the responses 1-Q. In some embodiments, one or more of the response based text includes raw and/or automatically edited text data received from the user in one or more corresponding responses, for example, via entry into a text box presented in conjunction with corresponding prompt and/or via dictation by the user. The plurality of response-based text can be included in the application letter in accordance with locations indicated by the application letter template data.

The application letter can further include some or all template-based text 1475.1-1475.T.

As illustrated in FIG. 7L, the function definition data 620 can optionally indicate letter text mapping data 1455, which can map each of a plurality of possible response selection options 1-J for some or all of the plurality of questions 1-Q, such as ones of the plurality of questions 1-Q with multiple choice and/or discrete, selection based responses, to corresponding text data 1457. For example, if response 1 indicates response selection option 1.1 was selected, and response selection options 1.2-1.$J_1$ were not selected, the text data 1457.1.1 is included in the application letter, while text data 1457.1.2-1457.1.$J_1$ is not included in the application letter. The letter text mapping data 1455 can optionally be utilized to implement one or more of the plurality of response-based text generator functions 1456.1-1456.Q of FIG. 7K. The selected set of text data 1457, such as text data 1457 for each response, can be included in the application letter in accordance with formatting and/or location requirements indicated by the application letter template data 1450.

Figure 7M:
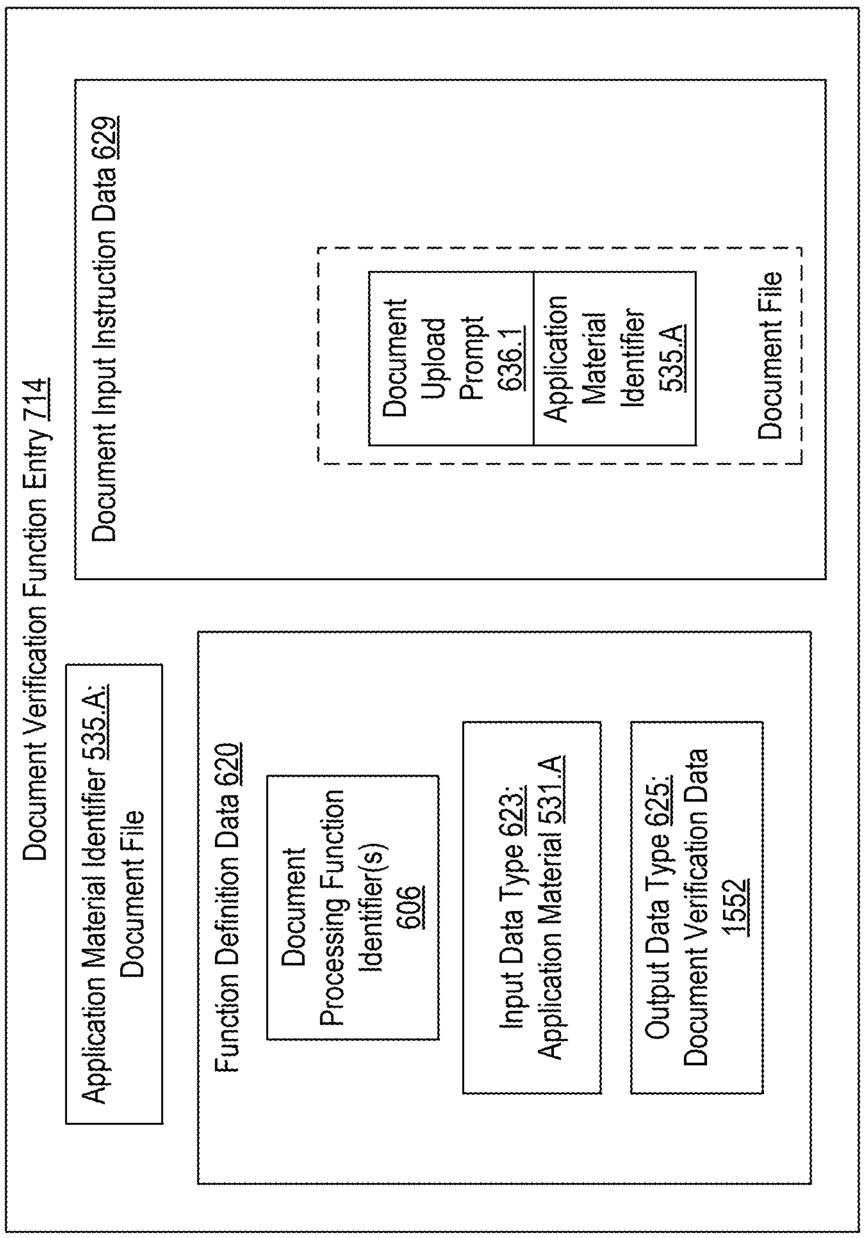
FIGS. 7M-7O illustrate data included in and/or indicated by a document verification function entry in accordance with various embodiments.
Figure 7N:
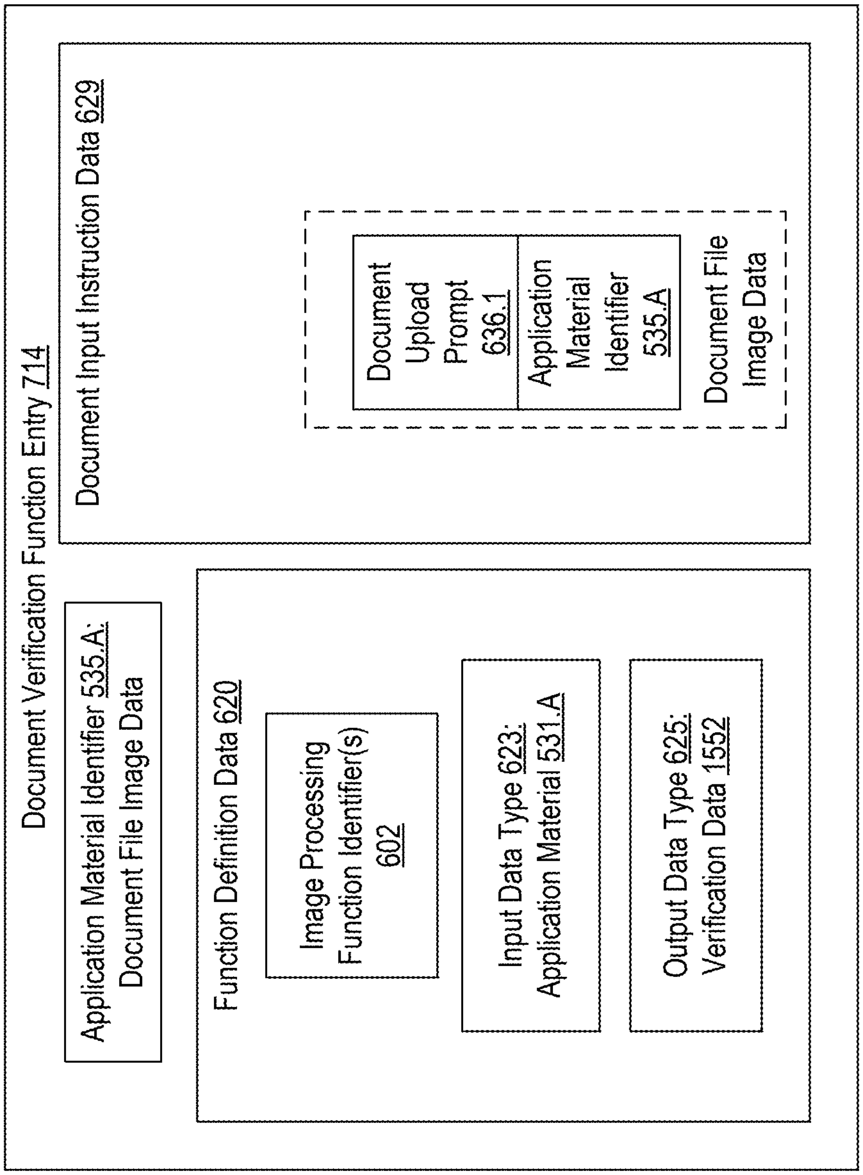
Figure 7O:
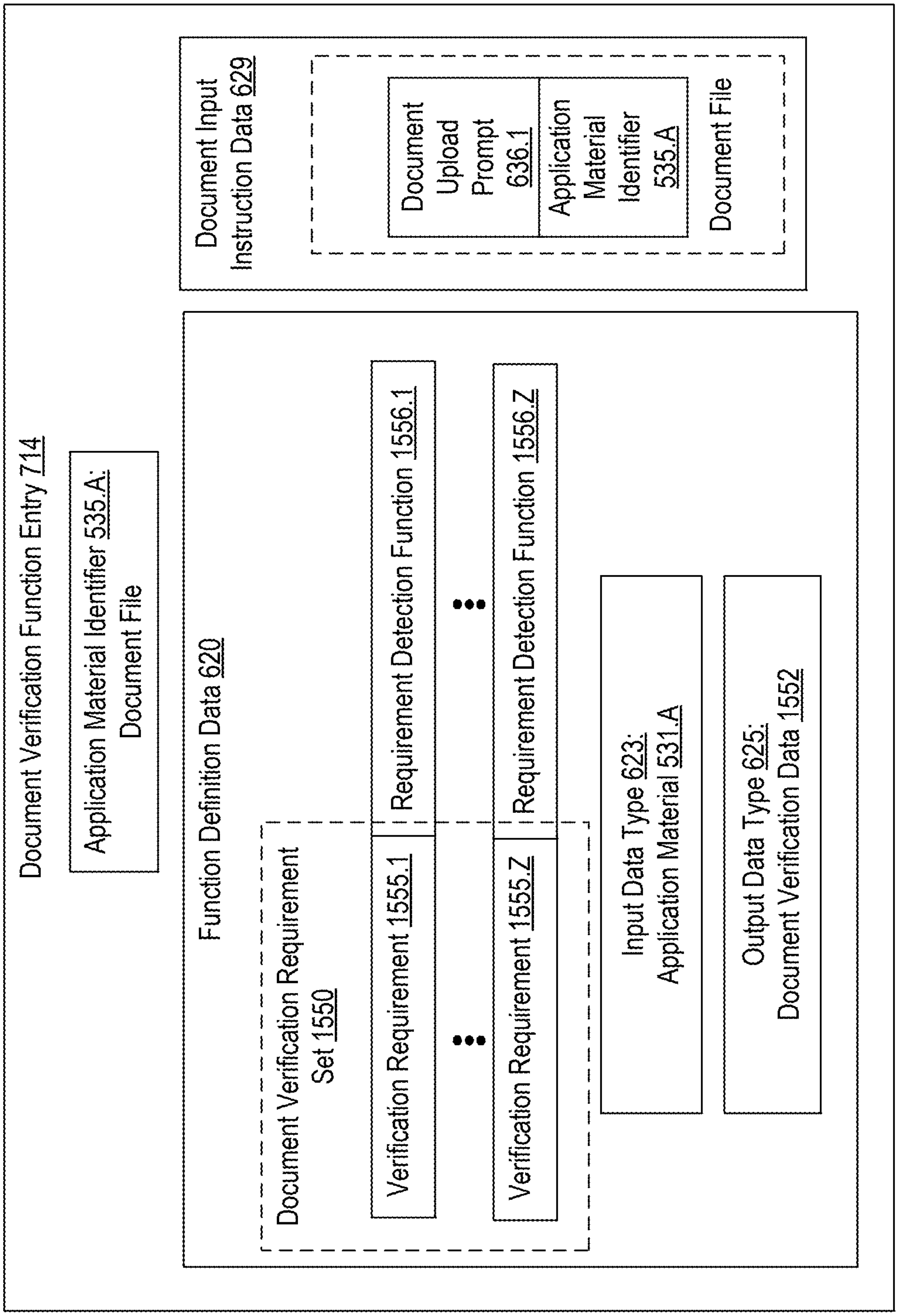

FIGS. 7M-7O illustrate embodiments of a document verification function entry 714. For example, one or more document verification function entry 714 for one or more corresponding types of application materials, such as application materials corresponding document files 532 and/or corresponding to official document generated and/or issued by official entities such as government entities, academic institutions, companies, testing entities, or other official entities, can be implemented as a document processing function entry 605 and/or can otherwise be performed in a same or similar fashion as document processing functions as discussed in conjunction with FIG. 6E. As another example, one or more document verification function entry 714 for one or more corresponding types of application materials can be implemented as an application material completion function entry 706 for the corresponding type of application material and/or can otherwise be performed in conjunction with completing the corresponding type of application material.

A given document verification function entry 714 can correspond to a particular type of application material. For example, one document verification function entry 714 can correspond to an application material corresponding to a passport, while another document verification function entry 714 can correspond to an application material corresponding to a letter of acceptance from an academic institution. Different types of application materials, such as some or all of the possible application materials 1-W, can optionally have their own corresponding document verification function entry 714. Performance of document verification functions is discussed in further detail in conjunction with FIGS. 15A-15J.

As illustrated in FIG. 7M, the function definition data 620 can indicate document verification data 1552 is generated as output based on performing one or more document processing functions, denoted by their document processing function identifiers, upon an application material of the corresponding application material type. The document can be received from a client device 130 based on a document upload prompt 636 presented via an interactive user interface 375 and/or based on being accessed in user account 165.

The document verification data 1552 can indicate whether the document is verified. This can include indicating whether the document is determined to be authentic, is confirmed to have been indeed generated by a corresponding official entity, is determined to not have been falsely fabricated, is of a necessary quality and/or format to enable the document to be verified, and/or is not expected to be rejected by the government entity in conjunction with application submission. The document verification data 1552 can correspond to verification data 537 for the corresponding application material and/or can be utilized to set the verification data 537 of the corresponding application material.

As illustrated in FIG. 7N, a document verification function entry 714 can indicate that one or more image processing function of image processing function entries 601 be performed upon image data of the corresponding document file. For example, the input document is a photograph of, scan of, and/or screenshot of the corresponding document. The one or more image processing functions can be trained to generate the document verification data 1552, for example, based on being trained upon a training set of documents of the given document type via one or more machine learning techniques and/or learning algorithms. As another example, the one or more image processing functions are operable to detect and/or process seals, watermarks, signatures, document format, logos and/or other image data that can indicate whether the document was issued by the corresponding official entity and/or is otherwise verified or not verified.

As illustrated in FIG. 7O, a document verification function entry 714 can indicate a document verification requirement set 1550 indicate a set of verification requirements 1555.1-1555.Z. The set of verification requirements can be based on requirements established by the official entity, can be automatically determined based on utilizing at least one machine learning technique and/or learning algorithm, can be configured via user input, and/or can be otherwise determined.

Some or all verification requirements can have a corresponding requirement detection function 1556, which can be implemented in a same or similar fashion as the requirement detection functions 1356 of digital photograph adherence function entry 710. The requirement detection function 1556 can be implemented by performing one or more image processing functions of image processing functions entries 601, text processing function of text processing function entries 603, and/or document processing functions of document processing function entries 605 upon the input document. A requirement detection function 1556 can be implemented to detect features such as required seals, required watermarks, required signatures, required document format, required logos and/or other image data, and/or to further determine whether the detected features adhere to corresponding verification requirements. A requirement detection function 1556 can be implemented to detect and process textual data to determine whether the textual data adheres to corresponding verification requirements.

FIGS. 7P-7S illustrate embodiments of a service initiation function entry 716. A service initiation function corresponding to a service initiation function entry 716 can be implemented to initiate service for a user with a corresponding service provider 551. A given service initiation function can correspond to one or more particular types of service and/or particular service providers. For example, each of a set of possible service providers 1-C can have a corresponding a service initiation function entry 716 that, when performed, can initiate and/or facilitate setup of a service provided by the corresponding service provider via generating of service setup initiation data 1612. Performance of service initiation functions is discussed in further detail in conjunction with FIGS. 16A-16P.

As used herein, a service provider "551.A" denotes that the service initiation function corresponds to a particular service provider with identifier 551 and/or a particular service type 552. Different uses of service provider with identifier 551.A can correspond to different particular service providers and/or different types of service. The service setup initiation data 1612.A can correspond to the setup of service with the particular service provider with identifier 551.A and/or corresponding service type 552.

Figure 7P:
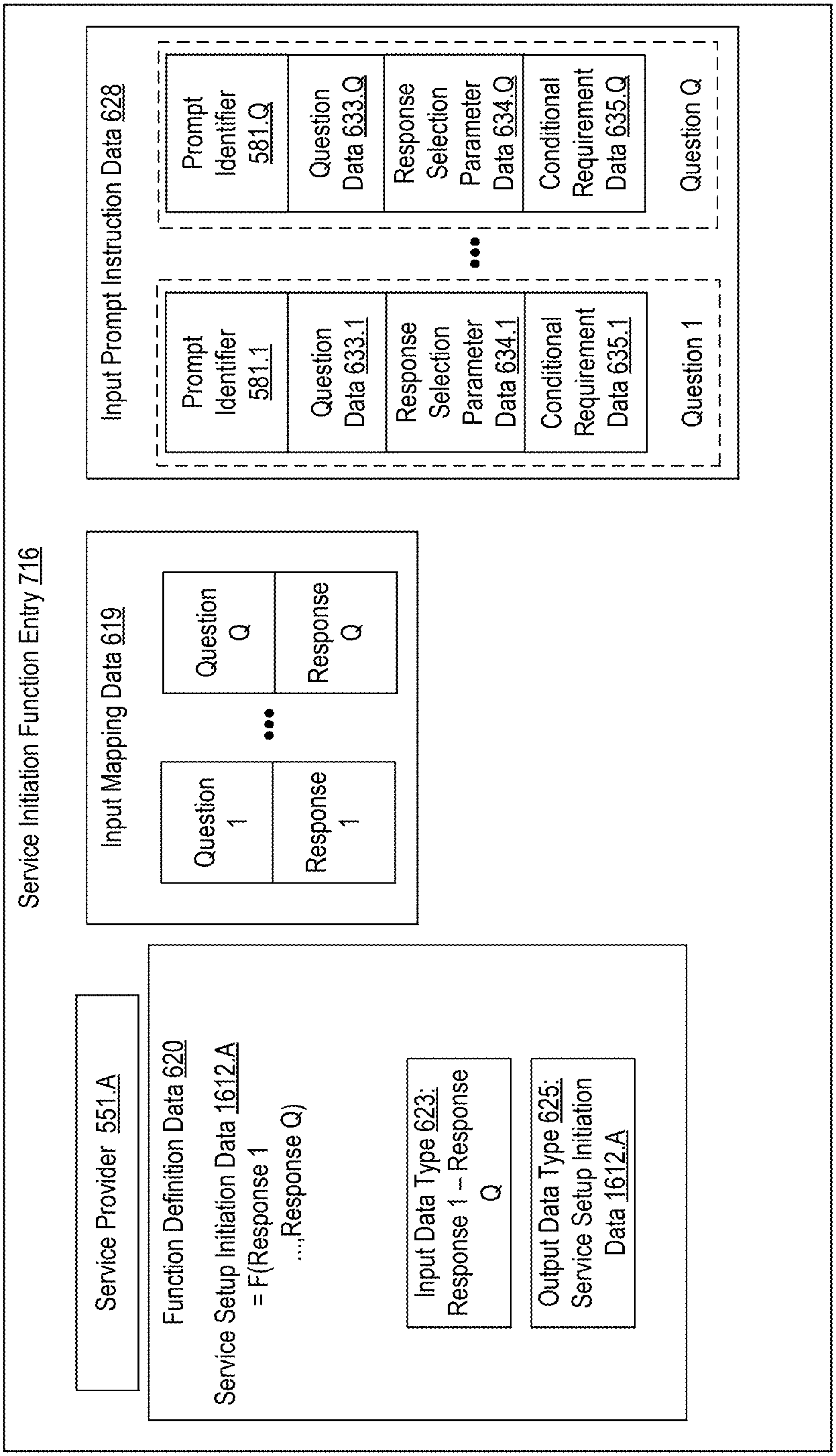
FIGS. 7P-7S illustrate data included in and/or indicated by a service initiation function entry in accordance with various embodiments.

FIG. 7P illustrates a service initiation function entry 716 for a service initiation function that generates service setup initiation data 1612 as a function of one or more responses 1-Q. For example, one or more service initiation function entries 716 can be implemented as a response processing function entry 607 and/or can otherwise be performed in a same or similar fashion as response processing function as discussed in conjunction with FIGS. 6F and 6G. In other embodiments, a service initiation function entry 716 can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

Figure 7Q:
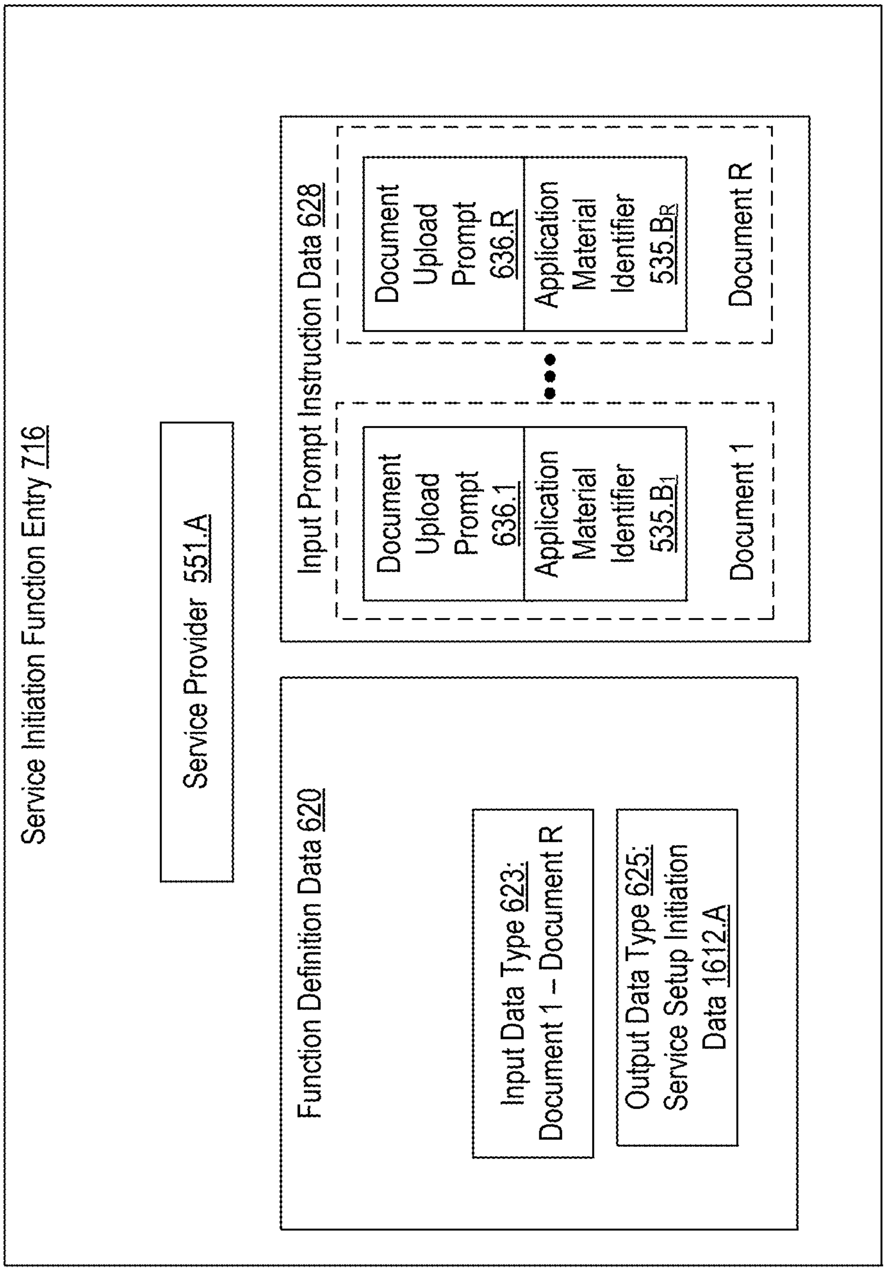

FIG. 7Q illustrates a service initiation function entry 716 for a service initiation function that generates service setup initiation data 1612 as a function of documents 1-R. For example, one or more service initiation function entries 716 can be implemented as a document processing function entry 605 and/or can otherwise be performed in a same or similar fashion as document processing function as discussed in conjunction with FIG. 6E. For example, the service setup initiation data 1612 includes and/or is based on one or more documents uploaded by the user and/or previously submitted in conjunction with an immigration application.

Figure 7R:
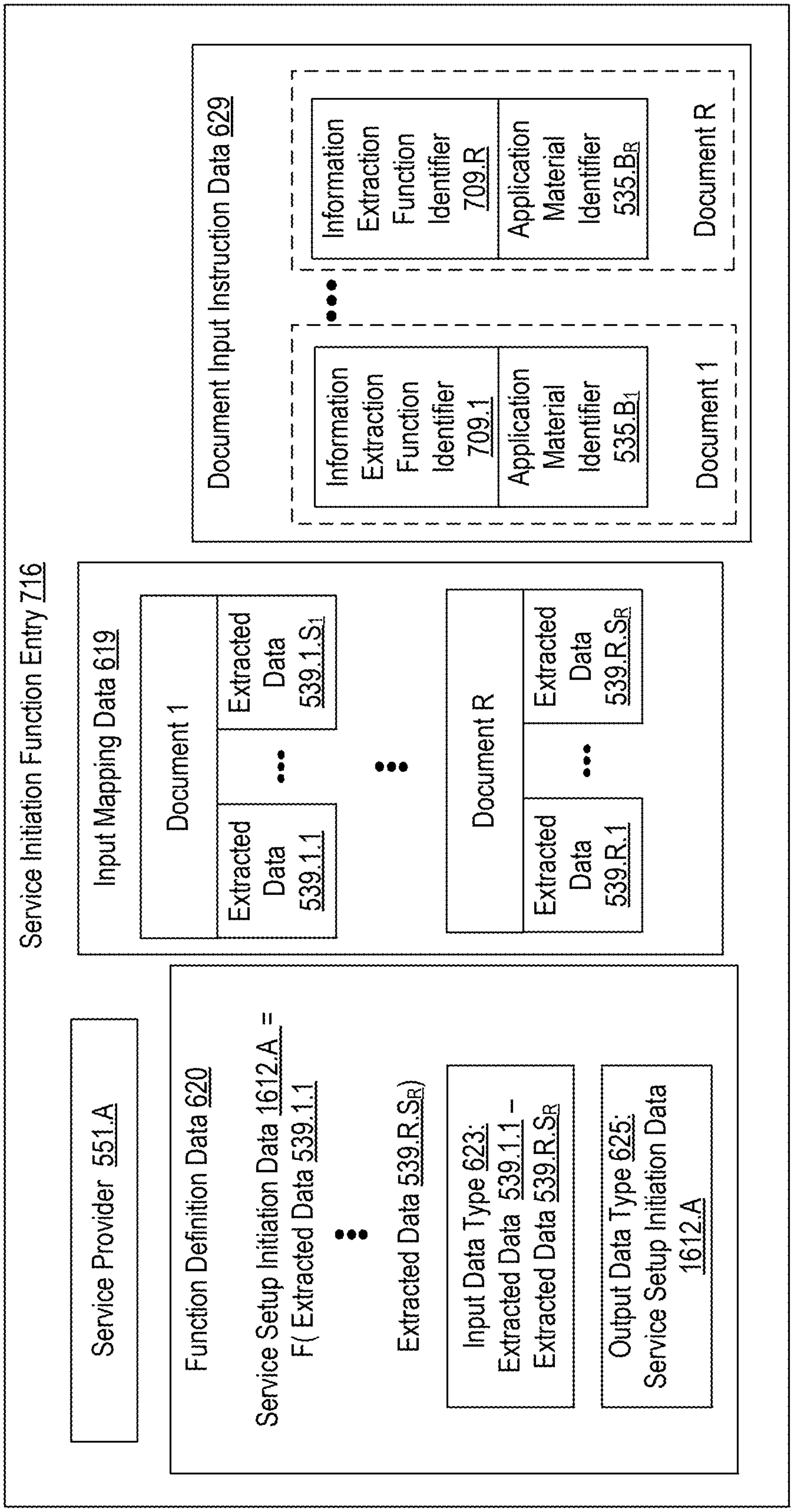

FIG. 7R illustrates a service initiation function entry 716 for a service initiation function that generates service setup initiation data 1612 as a function of extracted data 539 extracted from one or more documents. This can include performing an information extraction function of a corresponding information extraction function entry 710, denoted by information extraction function identifier 709, for one or more uploaded and/or accessed documents 1-R. For example, the service setup initiation data 1612 includes and/or is based on extracted data 539.1-539.S of one or more documents uploaded by the user and/or previously submitted in conjunction with an immigration application.

Figure 7S:
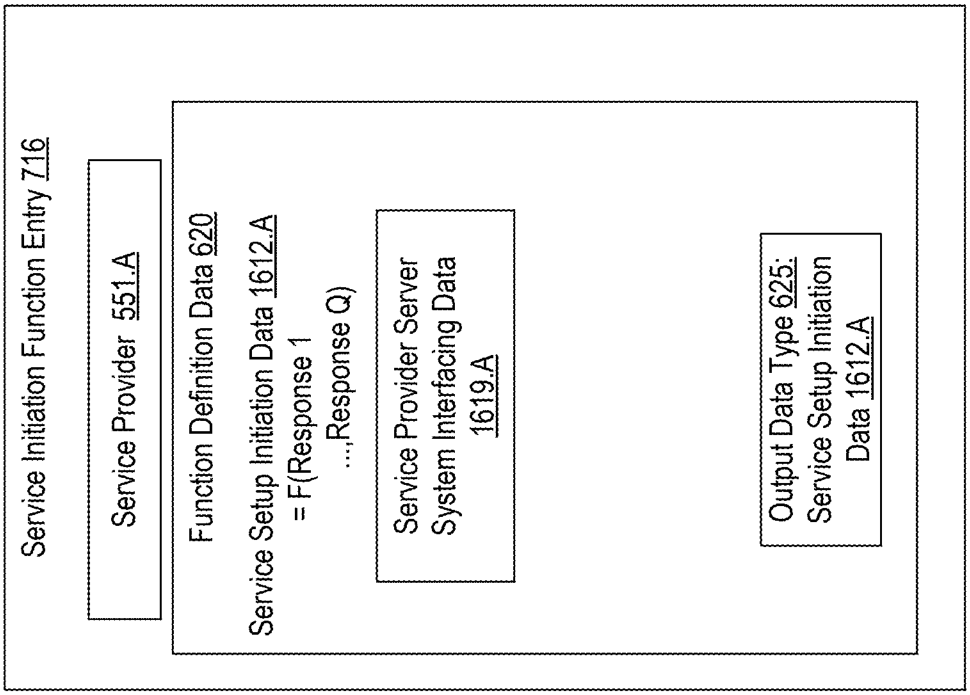

FIG. 7S illustrates a service initiation function entry 716 that further operates to send service setup initiation data 1612 to the service provider via corresponding service provider server system interfacing data 1619. For example, the service setup initiation data 1612.A is automatically sent to a server system hosted by the service provider with identifier 551.A.

Figure 7T:
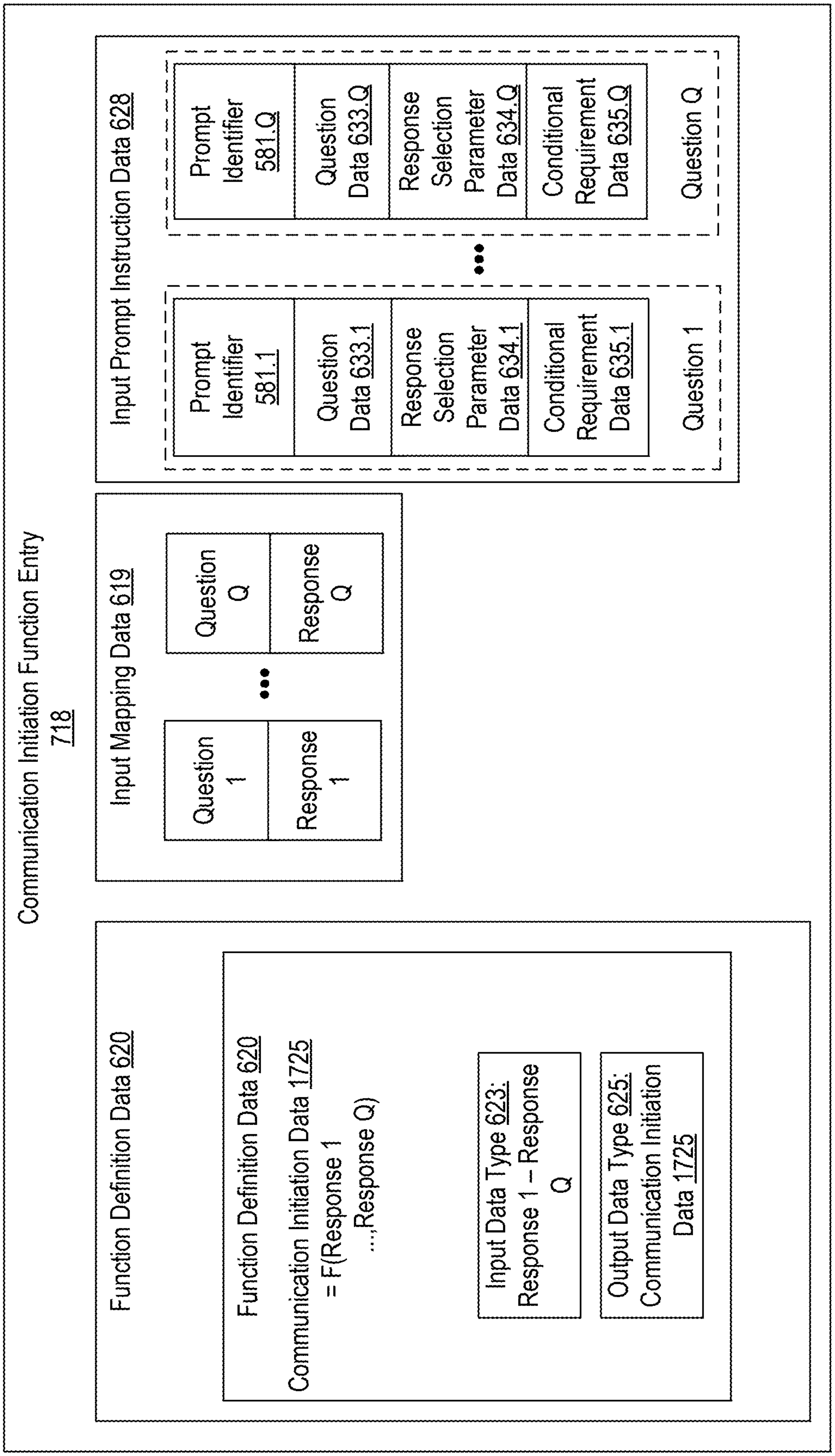
FIGS. 7T-7U illustrate data included in and/or indicated by a communication initiation function entry in accordance with various embodiments.
Figure 7U:
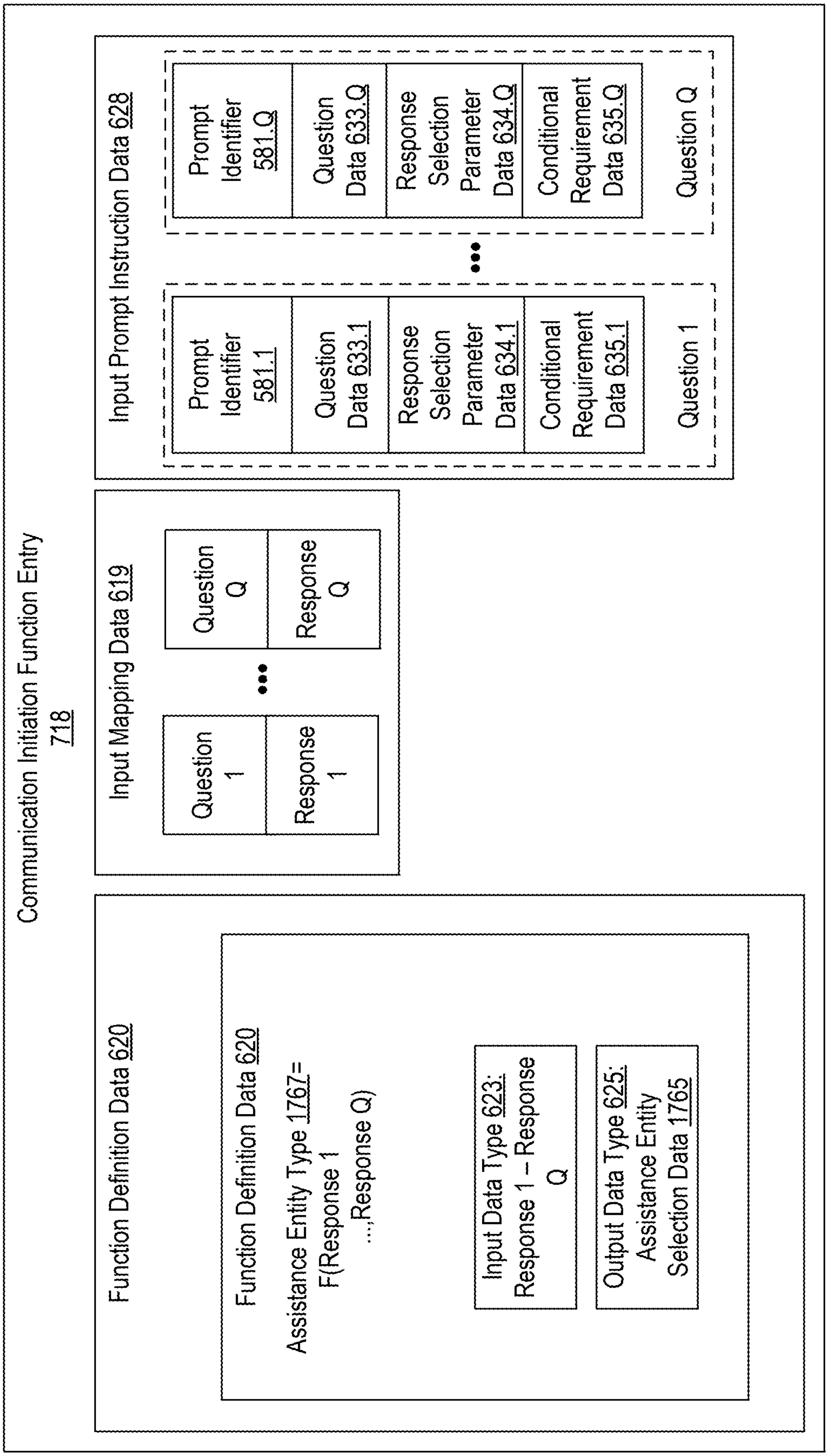

FIGS. 7T-7U illustrate embodiments of a communication initiation function entry 718. A communication initiation function corresponding to a communication initiation function entry 718 can be implemented to initiate communications for a user with a corresponding assistance entity. A communication initiation function Performance of communication initiation functions is discussed in further detail in conjunction with FIGS. 17A-17N.

FIG. 7T illustrates a communication initiation function entry 718 for a communication initiation function that generates communication initiation data 1725 as a function of one or more responses 1-Q. Communication initiation data 1725 indicate communications be initiated with an assistance entity and/or can include data regarding the means of communication and/or contact information for initiating and/or facilitating communications between a user and the assistance entity based on the user's responses 1-Q.

FIG. 7U illustrates a communication initiation function entry 718 for a communication initiation function that generates assistance entity selection data 1765 as a function of one or more responses 1-Q. For example, the assistance entity selection data 1765 can indicate one assistance entity from a plurality of possible assistance entities that is selected to communicate with the user based on the user's responses 1-Q.

For example, one or more communication initiation function entries 718 as illustrated in FIG. 7T and/or 7U can be implemented as a response processing function entry 607 and/or can otherwise be performed in a same or similar fashion as response processing function as discussed in conjunction with FIGS. 6F and 6G. In other embodiments, a communication initiation function entry 718 can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

Figure 7V:
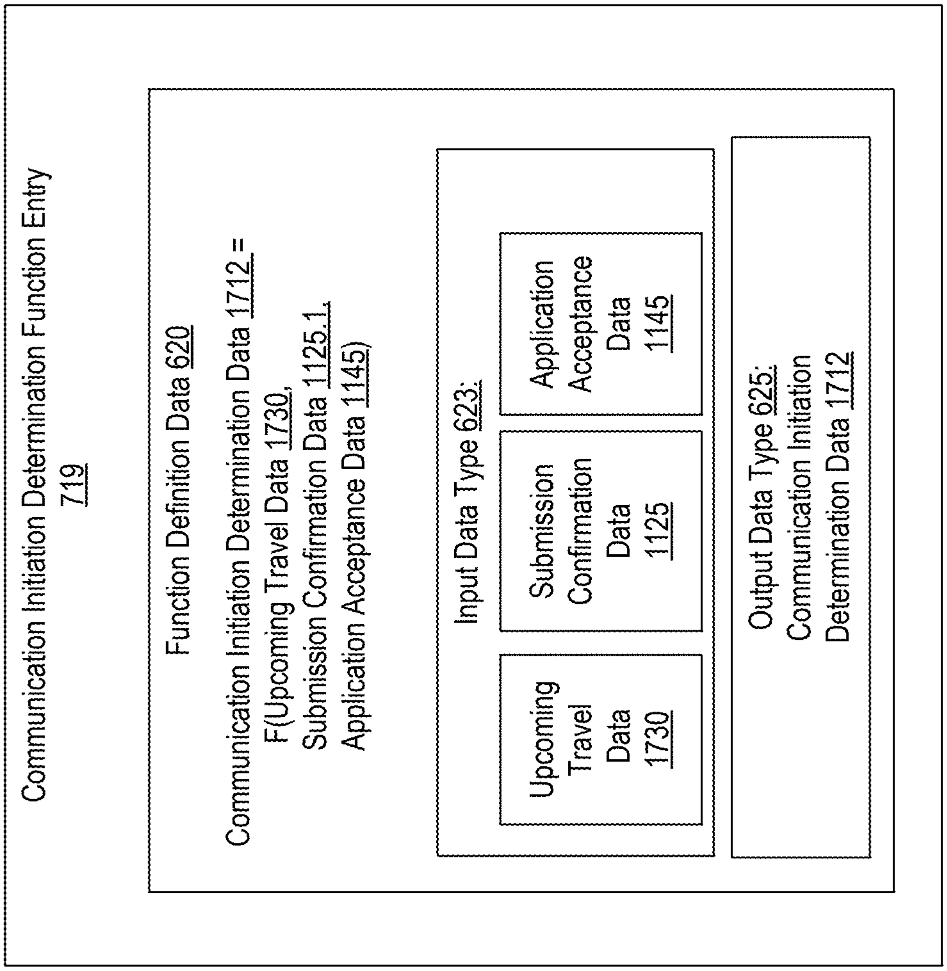
FIG. 7V illustrates data included in and/or indicated by a communication initiation determination function entry in accordance with various embodiments.
Figure 7W:
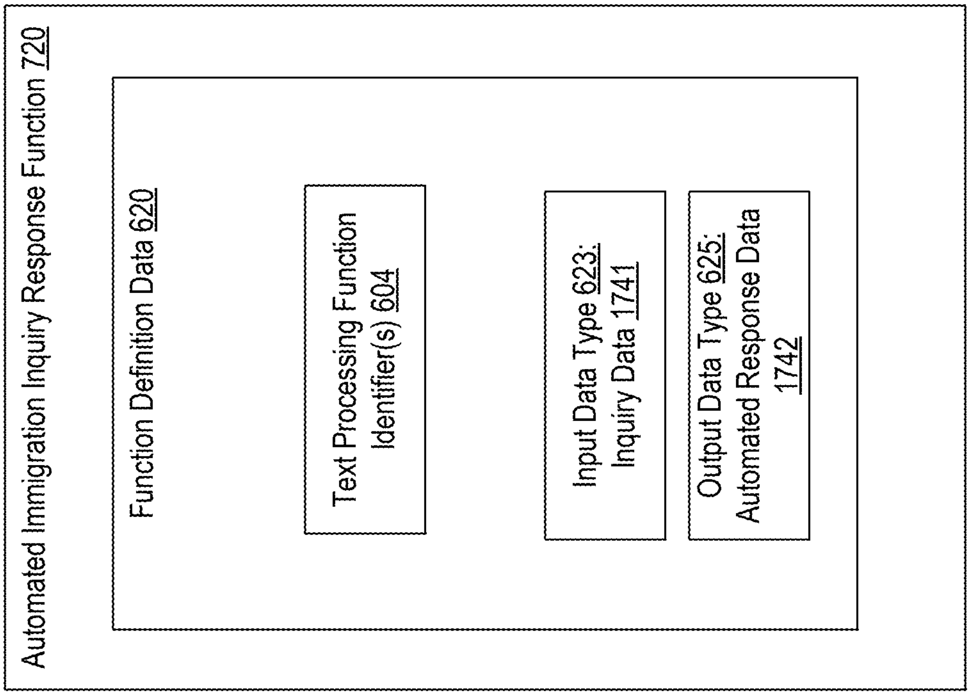
FIG. 7W illustrates data included in and/or indicated by an automated immigration inquiry response function entry in accordance with various embodiments.

FIG. 7V illustrates an embodiment of a communication initiation determination function entry 719 for a communication initiation determination function that generates Communication initiation determination data 1712 as a function of upcoming travel data 1730; submission confirmation data 1125; and/or application acceptance data 1145. Communication initiation determination data 1712 can indicate whether to prompt a user to initiate communications and/or to initiate communications automatically.

The upcoming travel data 1730; submission confirmation data 1125; and/or application acceptance data 1145 can be received based on being included in responses 1-Q. For example, one or more communication initiation determination function entries 719 can be implemented as a response processing function entry 607 and/or can otherwise be performed in a same or similar fashion as response processing function as discussed in conjunction with FIGS. 6F and 6G. Alternatively or in addition, the upcoming travel data 1730; submission confirmation data 1125; and/or application acceptance data 1145 can be extracted from one or more documents as extracted data 539 generated via an information extraction function, can be accessed via user account 165 and/or otherwise generated for, received from, or otherwise determined for the user.

Figure 7X:
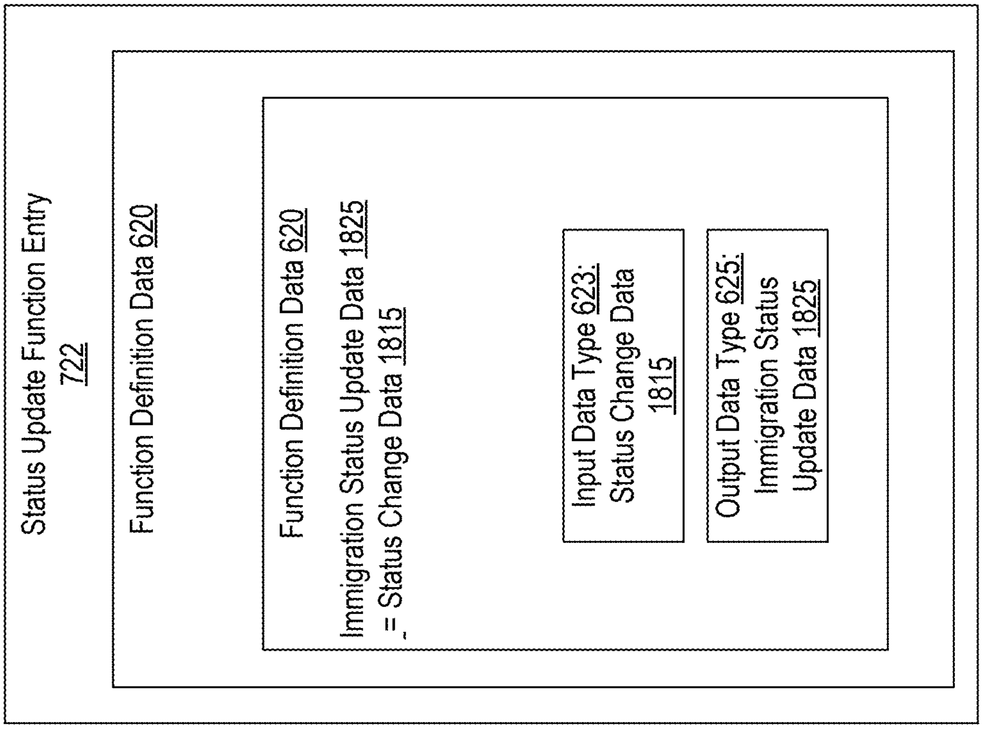
FIGS. 7X-7Y illustrate data included in and/or indicated by a status update function entry in accordance with various embodiments.

FIG. 7X illustrates an embodiment of an automated inquiry response function entry 720 for an automated inquiry response function that generates automated response data 1742 in response to one or more inquiries from the user received as inquiry data 1741, such as unstructured text data received as chat, voice, and/or audio communications from a user. For example, the inquiry data 1741 is processed via performing one or more text processing functions, corresponding to text processing function identifier 604, upon text extracted from the inquiry data 1741. For example, the one or more text processing functions are trained and/or generated based on training data corresponding to one or more prior conversations and/or answers to prior inquiries via one or more machine learning techniques and/or learning algorithms, based on a mapping of common and/or possible inquiries to inquiry responses, and/or based on legal and/or cultural information established by a legal and/or cultural entity.

The automated response data 1742 can alternatively or additionally be generated based on: responses 1-Q to one or more prompts, information extracted from one or more documents as extracted data 539 generated via an information extraction function, information accessed via user account 165, and/or other information generated for, received from, or otherwise determined for the user. Multiple automated response data 1742 can be generated by automated inquiry response function for a given user based on continued inquiry data 1741 received over time, for example, as a conversation in response to prior automated response data 1742.

Figure 7Y:
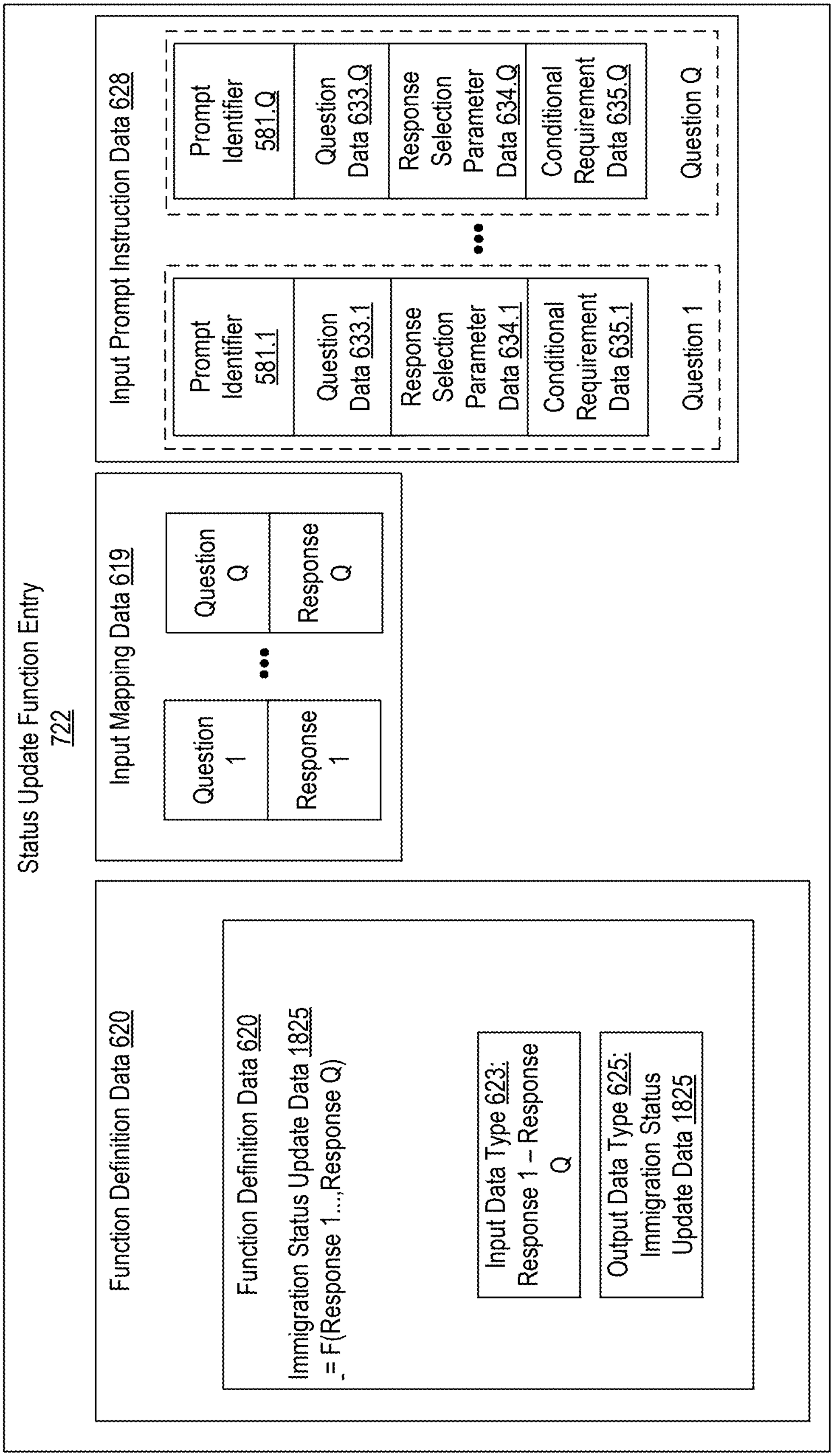

FIG. 7Y illustrates a status update function entry 722 for a status update function that generates immigration status update data 1825 as a function of one or more responses 1-Q. The immigration status update data 1825 can indicate: that a current immigration status is expiring; that a status of the user has changed; that the user requests to update their immigration status; that new immigration status be initiated for the user via a new immigration application; and/or immigration application material data, such as one or more completed application materials 531, for the new immigration application.

For example, one or more status update function entry 722 can be implemented as a response processing function entry 607 and/or can otherwise be performed in a same or similar fashion as response processing function as discussed in conjunction with FIGS. 6F and 6G. In other embodiments, a status update function entry 722 can be implemented as an information processing function entry 609 of FIG. 6H that utilizes as input, instead of or in addition to the responses 1-Q: data extracted from documents such as extracted data 539 of one or more documents, previously received response data 582 of response log data 517, and/or any other relevant data accessed via user account 165 and/or otherwise generated for, received from, or otherwise determined for the user.

Figure 7Z:
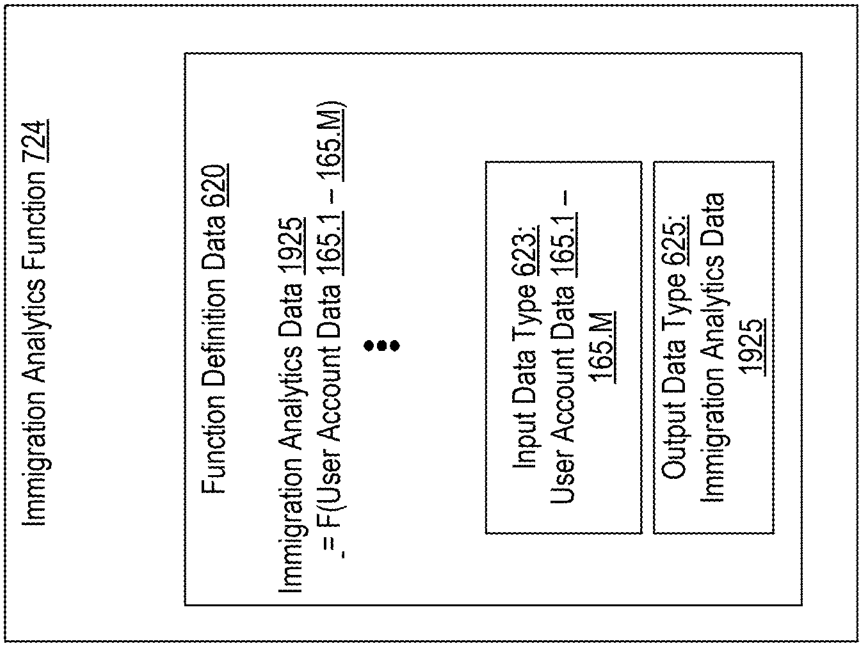
FIG. 7Z illustrates data included in and/or indicated by an immigration analytics function entry in accordance with various embodiments.

FIG. 7Z illustrates an embodiment of an immigration analytics function entry 724 for an immigration analytics function that generates immigration analytics data 1915 as a function of some or all data of one or more user accounts 165, such as some or all of the information discussed in conjunction with user accounts 165 in conjunction with FIGS. 5A-5H that is received, generated, stored, and/or otherwise determined by the immigration assistance system 100 for one or more users. The immigration analytics data 1915 can include statistical information, correlation data, trend data, and/or other information derived from information in user accounts 165 for multiple users of the immigration assistance system 100 over time.

The immigration analytics data 1915 can be generated based on some or all data, such as information of user accounts 165 corresponding to one or more particular, configured categories, for some or all users N, such as users corresponding to one or more particular, configured categories. The particular, configured categories utilized to select a subset of information of user accounts 165 for processing can be automatically selected by the immigration assistance system 100, can be configured via user input, for example, by an administrator of the immigration assistance system 100, and/or can otherwise be determined. The particular, configured categories utilized to select a subset of users N for processing can be automatically selected by the immigration assistance system 100, can be configured via user input, for example, by an administrator of the immigration assistance system 100, and/or can otherwise be determined.

The immigration analytics function entry 724 can be implemented via at least one corresponding graph structure 665 and/or can be implemented to generate at least one corresponding graph structure. For example, the immigration analytics function entry 724 is implemented as a graph data generator function, a graph data utilization function, and/or a graph data update function. The immigration analytics data 1915 can be generated based on processing a dataset of multi-dimensional data points corresponding to some or all users N, each containing some or all information contained in and/or derived from respective user accounts. The immigration analytics data 1915 can include, can be derived from, and/or can be utilized to generate the configured weights and/or biases generated for one or more corresponding functions.

FIGS. 8A-8H present embodiments of an immigration eligibility risk assessment system 102. The immigration eligibility risk assessment system 102 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to determination and communication of the likelihood that a given user will be granted an immigration application, based on information received from and/or determined for the user. In particular, the immigration eligibility risk assessment system 102 can determine various factors that impact eligibility of applicant/likelihood applicant's application will be accepted and/or can apply these factors to information corresponding to a given user, for example, based on the user's responses to one or more questions, to compute a risk assessment score 541 for the user, for example, based on performing a risk assessment function. For example, the immigration eligibility risk assessment system 102 can build and/or access a knowledge base for immigration risk established based on expert knowledge and/or official guidance regarding various factors that impact eligibility of applicant/likelihood applicant's application will be accepted.

In some cases, other functionality of the immigration assistance system 100, such as a user's access to some or all other subsystems 101 described herein, can be contingent on a favorable risk assessment score 541 being computed for the user. For example, a user can only create a user account 165 with the immigration assistance system 100 after being assigned a risk assessment score 541. As another example, an immigration application is only created and completed for submission via the immigration application materials guided completion system 106 and/or the immigration application material submission completion system 108 if the corresponding user having a favorable risk assessment score 541. As another example, the immigration assistance system 100 computes risk assessment scores 541 for a plurality of users, where only a proper subset of the risk assessment scores 541 are favorable, and where only a corresponding proper subset of the plurality of users are provided immigration assistance via the immigration application materials guided completion system 106 and/or the immigration application material submission completion system 108, and/or some or all other subsystems 101.

Some or all of this functionality of the immigration eligibility risk assessment system 102 improves the technology of computer-based immigration systems based on improving the depth of information supplied to users regarding their eligibility and/or likelihood of being granted immigration status and/or regarding the estimated processing time for being granted their immigration status. Some or all of this functionality of the immigration eligibility risk assessment system 102 improves the technology of computer-based immigration systems based on improving efficiency of computer-based immigration systems by limiting storage of user accounts and/or limiting use of processing resources in implementing one or more other subsystems 101 based on only servicing a proper subset of prospective users with most favorable prospects of obtaining immigration status. Some or all of this functionality of the immigration eligibility risk assessment system 102 improves the technology of computer-based immigration systems based on gathering information and computing corresponding quantitative data regarding immigration eligibility that can be utilized over time as historical data utilized as input to one or more immigration analytical functions utilized determine trends in rate of granting of immigration applications to users and/or length of time in processing of immigration applications as a function of their various risk factors.

Figure 8A:
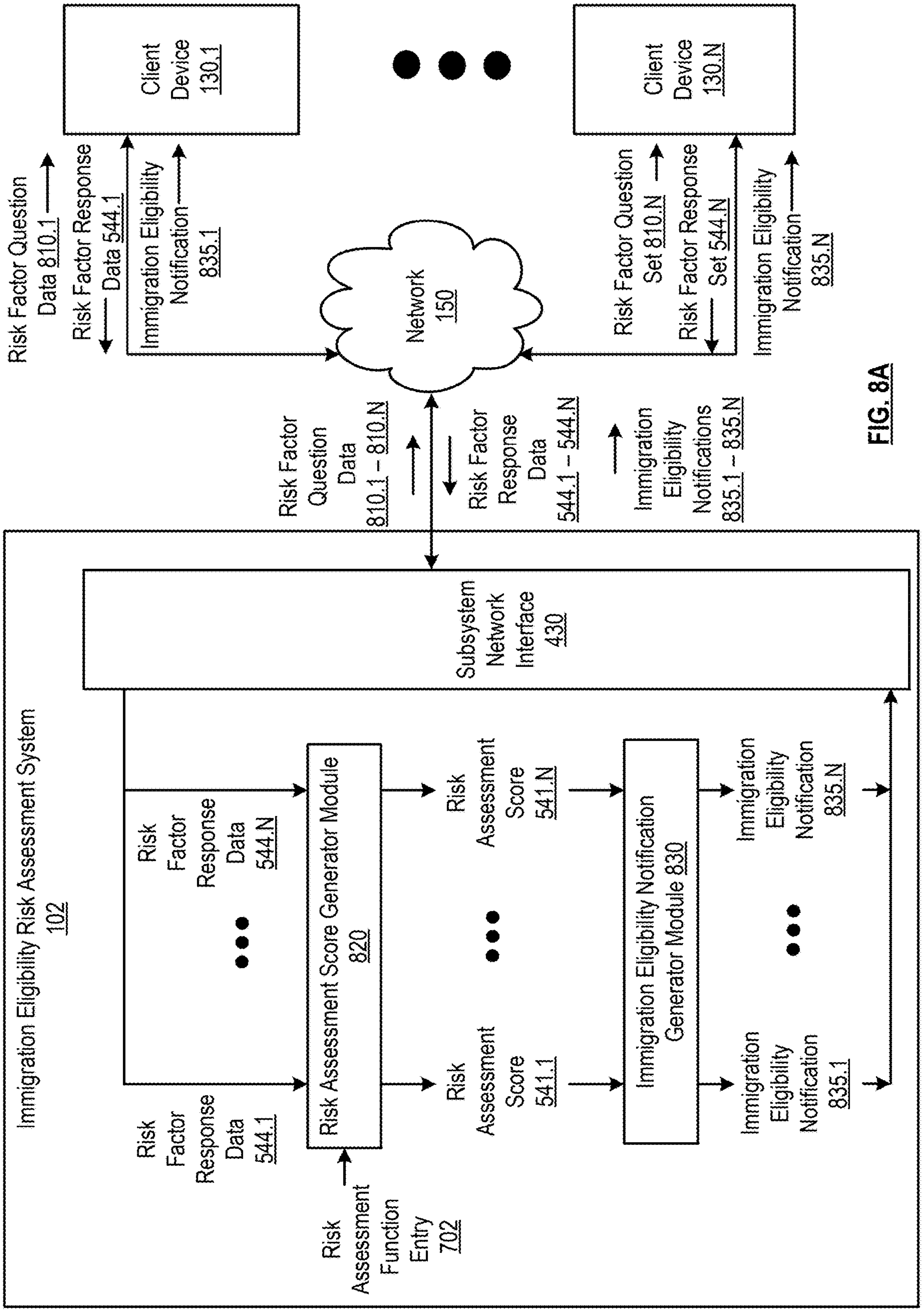
FIGS. 8A-8B are schematic block diagrams of an immigration eligibility risk assessment system in accordance with various embodiments.

As illustrated in FIG. 8A, the immigration eligibility risk assessment system 102 can send risk factor question data 810.1-810.N to a plurality of client devices 130.1-130.N. For example, the risk factor question data 810 is implemented as some or all of the input prompt instruction data 628 of risk assessment function entry 702 utilized to procure the corresponding set of responses 1-Q as discussed in conjunction with FIG. 7B, FIG. 6F, and/or FIG. 6G. As another example, the risk factor question data 810 is indicated in application data 318 sent to the client device 130 for execution. As another example, the risk factor question data 810 is sent to a corresponding client device based on receiving a request from the client device to take a risk assessment quiz and/or to receive immigration assistance. Each risk factor question data 810 can be presented to the corresponding user via interactive user interface 375, for example, as one or more individual questions or other prompts.

The immigration eligibility risk assessment system 102 can receive a plurality of risk factor response data 544.1-544.N. Each risk factor data 544 can be generated by the corresponding client device 130 based on user input to the client device 130 indicating responses to questions indicated in the risk factor question data 810. Risk factor response data 544 can be implemented as the set of responses 1-Q utilized as input to a risk assessment function of a corresponding risk assessment function entry 702. Risk factor response data 544 can alternatively or additionally be implemented as the risk factor response data 544 and/or any other response data 582 of user account 165, and can be stored in user account 165 for the corresponding user by immigration eligibility risk assessment system 102 based on being received from the corresponding client device 130. Alternatively, the user does not yet have a user account based on favorable immigration eligibility not yet being determined for the user via generation of risk assessment score 541.

The immigration eligibility risk assessment system 102 can implement a risk assessment score generator module 820, for example, via subsystem processing module 420 and/or subsystem memory module 410. The risk assessment score generator module 820 can generate each of a plurality of risk assessment scores 541.1-541.N from a corresponding one of the plurality of risk factor response data 544.1-544.N. For example, each risk assessment score 541 is generated by performing the risk assessment function in accordance with risk assessment function entry 702 by utilizing responses 1-Q indicated in the corresponding risk factor response data 544 as input, for example, as discussed in conjunction with FIG. 7C. Each risk assessment score 541, once generated, can optionally populate the risk assessment score 541 of the corresponding user's user account 165 and/or can initiate generation of the corresponding user's user account 165 if the risk assessment score 541 compares favorably to a risk assessment score threshold and/or is otherwise favorable.

The immigration eligibility risk assessment system 102 can implement an immigration eligibility risk notification generator module 830, for example, via subsystem processing module 420 and/or subsystem memory module 410. The immigration eligibility risk notification generator module 835 can generate each of a plurality of immigration eligibility notifications 835.1-835.N from a corresponding one of the plurality of risk assessment scores 541.1-541.N. The plurality of immigration eligibility notifications 835.1-835.N can be sent to corresponding client devices 130 for display via interactive user interface 375. Examples of immigration eligibility notifications 835 are illustrated in FIGS. 8S-8V.

For example, each immigration eligibility notification 835 indicates: the raw value of the corresponding risk assessment scores 541; and/or whether or not the user has favorable or unfavorable immigration eligibility based on whether the risk assessment score 541 compares favorably to a risk assessment score threshold and/or is otherwise favorable.

In some embodiments, an immigration eligibility notification 835 can indicate one or more individual risk factors that rendered the risk assessment score 541 to compare unfavorably to the risk assessment score threshold and/or to otherwise be unfavorable. An example of such an embodiment is illustrated in FIG. 8T.

In some embodiments, an immigration eligibility notification 835 can indicate a communication initiation prompt to initiate communication with an assistance entity, such as a legal professional In such embodiments, when the user responds to the communication initiation prompt with a request to communicate with the assistance entity, the immigration assistance communication system 120 can be implemented to initiate and/or facilitate communications between the user and the assistance entity, for example, as discussed in conjunction with FIGS. 17A-17O. Examples of the communication initiation prompt are illustrated in FIG. 8U and FIG. 8V.

One more immigration eligibility notifications 835 can indicate first additional prompts and/or instructions for obtaining immigration status and/or other immigration assistance, for example, to initiate user interaction with one or more other subsystem 101. This can include one or more immigration assistance initiation prompts 863. In some embodiments, user interaction with one or more other subsystem 101 is only initiated via the first additional prompts and/or instructions included in the immigration eligibility notifications 835 when the corresponding risk assessment score 541 compares favorably to the risk assessment score threshold and/or is otherwise favorable. Examples of the first additional prompts and/or instructions are illustrated in FIG. 8S and FIG. 8U.

One more immigration eligibility notifications 835 can indicate second additional prompts and/or instructions for obtaining immigration status and/or other immigration assistance. This can include prompts to retake the assessment, create a user account, and/or receive additional assistance and/or information. The second additional prompts and/or instructions can be different from the first additional prompts and/or instructions, and can included in the immigration eligibility notifications 835 when the corresponding risk assessment score 541 compares unfavorably to the risk assessment score threshold and/or is otherwise unfavorable. Examples of the first additional prompts and/or instructions are illustrated in FIG. 8T and FIG. 8V.

Figure 8B:
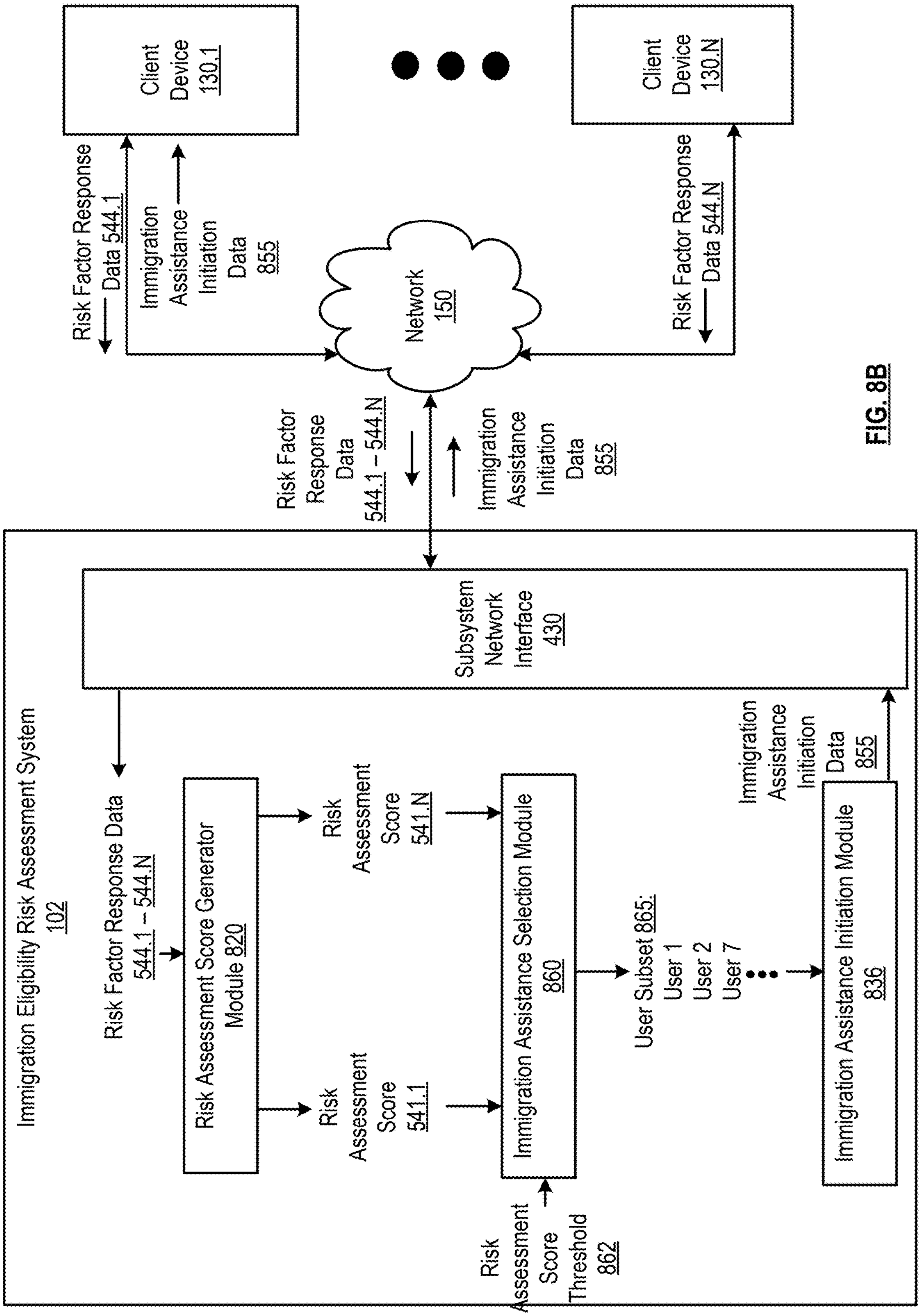

Such an embodiment where only some users receive additional immigration assistance is illustrated in FIG. 8B. The immigration eligibility risk assessment system 102 can implement an immigration assistance selection module 860, for example, via subsystem processing module 420 and/or subsystem memory module 410. The immigration assistance selection module 860 can identify a user subset 865 that only includes users of the plurality of users with risk assessment scores 541 that compare favorably to risk assessment score threshold 862 and/or that otherwise have favorable risk assessment scores. In this example user subset 865 includes at least users 1, 2, and 7, but not user N, based on users 1, 2, and 7 having favorable risk assessment scores 541 and based on user N having an unfavorable risk assessment score 541.

The immigration eligibility risk assessment system 102 can implement an immigration assistance initiation module 836, for example, via subsystem processing module 420 and/or subsystem memory module 410. The immigration assistance initiation module 836 can generate and/or send immigration assistance initiation data 855 to only users in the user subset 865. For example, the immigration eligibility risk assessment system 102 sends the immigration assistance initiation data 855 to at least users 1, 2, and 7, but not user N, based on users 1, 2, and 7 having favorable risk assessment scores 541 and based on user N having an unfavorable risk assessment score 541.

Figure 8C:
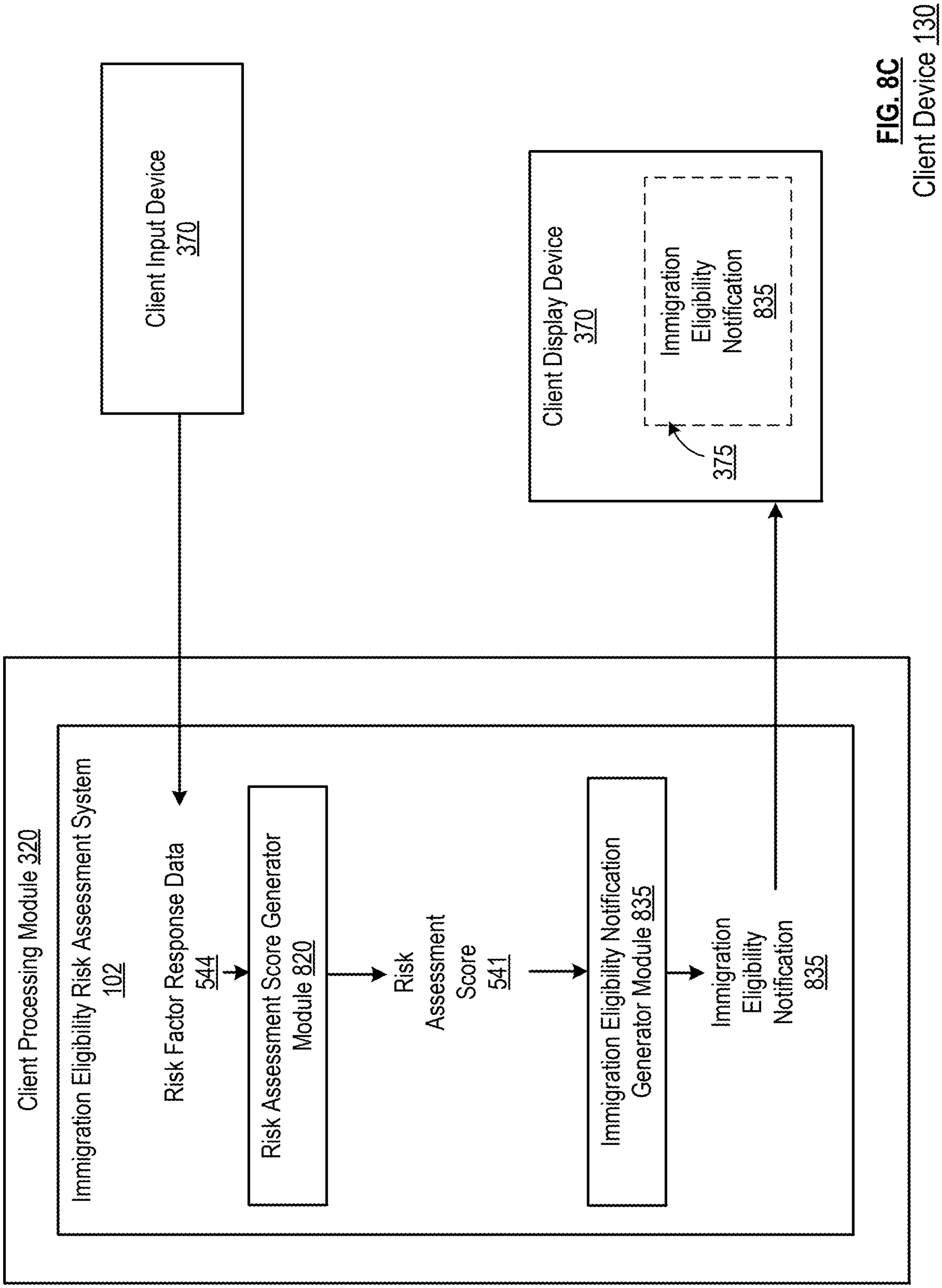
FIG. 8C is a schematic block diagrams of a client device in accordance with various embodiments.

FIG. 8C illustrates an embodiment of client device 130 that locally implements some or all functionality of the immigration eligibility risk assessment system 102, for example, based on storing and/or executing corresponding subsystem application data 318. In such embodiments, the risk assessment score generator module 820 and/or the immigration eligibility risk notification generator module 830 can be implemented via client processing module 320 and/or client memory module 310.

Figure 8D:
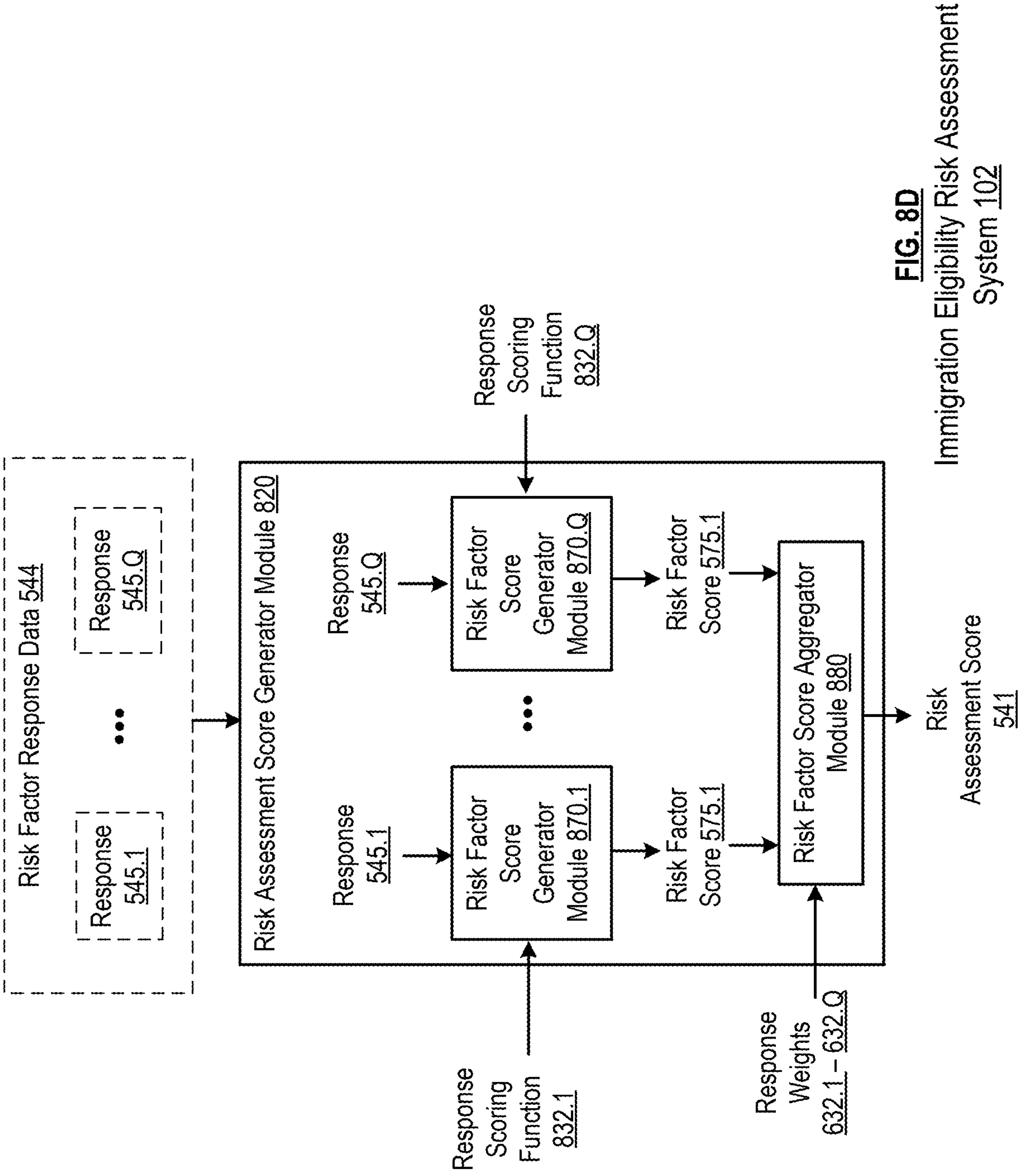
FIGS. 8D-8F are schematic block diagrams of an immigration eligibility risk assessment system in accordance with various embodiments.

FIG. 8D illustrates an embodiment of a risk assessment score generator module 820. The risk assessment score generator module 820 can implement a plurality of risk factor score generator modules 870.1-870.Q to generate risk factor scores 575.1-575.Q for each of a set of responses 545.1-545.Q of risk factor response data 544 for a given user. Each risk factor score 575 can be generated based on performing a corresponding one of a set of response scoring functions 832.1-832.Q. For example, each response 545 and/or each corresponding question corresponds to one of a set of risk factors 1-Q evaluated for the user to render the corresponding risk assessment score 541.

Each response scoring function 832 can utilize a corresponding one of the set of responses 545 as input to generate the risk factor scores 575 for the given user. For example, one or more responses 545 are utilized as input to exactly one response scoring function 832. As another example, one or risk factor score generator modules 870 utilize multiple responses 545 as input. While not depicted in FIG. 8D, one or more response scoring function 832 can optionally utilize other information corresponding to the user, such as: any other response data 582 received from the user in conjunction with any other presented prompts; extracted data 539 extracted from a document file 532 received from the user; and/or any other information discussed in conjunction with user account 165. For example, this other response data 582, extracted data 539 other information of user account 165 can correspond to, and/or can indicate for the user, additional types of risk factors evaluated for the user to render the corresponding risk assessment score 541.

The risk assessment score generator module 820 can implement a risk factor score aggregator module 880 to generate the risk assessment score 541 for the given user, for example, based on applying a corresponding one of a set of response weights 632.1-632.Q to the corresponding risk factor score 575. The set of response weights 632.1-632.Q and/or the set of response scoring functions 832.1-832.Q can be indicated by a corresponding immigration risk assessment function entry 702, for example, as discussed in conjunction with FIG. 7B.

The set of responses 545.1-545.Q of risk factor response data 544 for a given user can otherwise correspond to a set of risk factor data 1-Q of a set of risk factor categories 1-Q, where the risk assessment score 541 for the user is a function of the user's risk factor data and/or where each risk factor data can be assigned a corresponding risk factor score 575, and/or can have a corresponding weight applied. Alternatively or in addition, if one or more risk factor scores 575 are themselves unfavorable, the risk assessment score 541 can automatically be unfavorable, regardless of other risk factor scores of other risk factor categories. Alternatively or in addition, if one or more risk factor scores 575 are themselves unfavorable, the risk assessment score 541 can still be favorable, for example, based on the unfavorable risk factor score 575 being outweighed by one or more other risk factor scores 575. As a particular example, a user being determined to be studying engineering in a 4 year program at a prestigious school can have highly favorable risk factor scores in corresponding categories that outweigh more negative risk factor scores for other categories, which can yield a better score, such as a favorable score versus an unfavorable score, for example if this same user were instead planning to learn English for 6 months.

The set of risk factor categories 1-Q can include: one or more age based risk factor categories; one or more location based risk factor categories, one or more schooling based risk factor categories, one or more time period based risk factor categories, one or more finances based risk factor categories, one or more history based risk factor categories, one or more health status risk factor categories, and/or one or more language proficiency based risk factor categories. For example, some or all of these types of risk factor categories can be configured for users intending to apply for a study permit to study in Canada, or a different country, as their immigration application. Other types of immigration status can have the same or different sets of risk factor categories, for example, where another set of risk factor categories can be configured for users intending to apply to work in Canada, or another country, and where this other set of risk factor categories includes questions relating to employment of the user in the other country, employment history of the user, and/or salary of the user.

The risk factor data for one or more risk factor categories can be determined based on question data 633 presented to the user to provide the corresponding risk factor data, and based on a corresponding response indicating the user's risk factor data, as illustrated in FIGS. 8A-8C. The risk factor data for one or more risk factor categories can alternatively or additionally be determined based on corresponding extracted data 539 extracted from one or more application materials 531 received for the user via an information extraction function. The risk factor data for one or more risk factor categories can alternatively or additionally be determined based on accessing corresponding data for the user in user account 165. Risk factor data for different risk factor categories can cause the user to have a favorable or unfavorable risk assessment score 541 individually or in tandem.

A risk factor for one or more age based risk factor categories can be implemented as age data or birthday data. The age data or birthday data can be determined based on question data 633 presented to the user to provide their age or birthday data, and based on a corresponding response indicating the user's age and/or birthday. An example of question data 633 and response selection parameter data 634 presented to the user to provide birthday data for an age based risk factor category is presented in FIG. 8K.

A risk factor for one or more location based risk factor categories can be implemented as location data, which can indicate one or more of: country of residence data, current address data, birth country data, citizenship data, prior immigration data, and/or other data relating to locations where the user is currently residing or previously resided. An example of question data 633 and response selection parameter data 634 presented to the user to provide location data for a location based risk factor category is presented in FIG. 8L.

A risk factor for one or more schooling based risk factor categories can be implemented as schooling data, which can indicate one or more of: whether or not the user has been accepted into an academic institution in the country to which the user is attempting to immigrate, a name of the study program or type of study program at the academic institution, a corresponding field of study for the study program, a location of the academic institution within the country to which the user is attempting to immigrate, whether the academic institution is a public university, private university community college, trade school, or language school, previous schooling data and corresponding degrees obtained, and/or other data related to schooling for the user.

For example, a first user has a more favorable risk assessment score 541 than a second user based on the first user having schooling data indicating a first academic institution, based on the second user having schooling data indicating a second academic institution, and based on the first academic institution being more prestigious than the second academic institution. As another example, a first user has a more favorable risk assessment score 541 than a second user based on the first user having schooling data indicating a first academic institution that is a four year university and based on the second user having schooling data indicating a second academic institution that is a language school. As another example, a first user has a more favorable risk assessment score 541 than a second user based on the first user having schooling data indicating a first field of study corresponding to a math, science, or engineering degree, and based on the second user having schooling data indicating a second field of study indicating a language degree, arts degree, or history degree. An example of question data 633 and response selection parameter data 634 presented to the user to provide schooling data for a schooling based risk factor category is presented in FIG. 8M.

A risk factor for one or more time period based risk factor categories can be implemented as: time period data, which can indicate one or more of: an amount of time expected or scheduled to complete the study program and/or a type of degree the study program corresponds to, and/or an amount of time the user is intending to stay in the country to which they intend to immigrate. For example, first user has a more favorable risk assessment score 541 than a second user based on the first user having time period data indicating a first length of time for their study, a second user having time period data indicating a second length of time for their study program, and the second length of time being shorter than longer than the first length of time. The schooling time period data can optionally be included in the schooling data. An example of question data 633 and response selection parameter data 634 presented to the user to provide time period data for a time period based risk factor category is presented in FIG. 8O.

A risk factor for one or more finances based risk factor categories can be implemented as financial data, which can indicate one or more of: proof of finances for the user, whether the user has at least a threshold amount of money, such as $10,000 CAD, to support their stay in the country to which they are immigrating, whether the user or another person will be supplying funding for their stay in the country, scholarship or financial aid data awarded to the user for study at the academic institution, a net worth of the user, credit report data for the user, a current salary of the user, a salary for the user if current address data, or other financial data for the user. For example, first user has a more favorable risk assessment score 541 than a second user based on the first user having financial data indicating the first user has at least the threshold amount of money, and based on the second user having financial data indicating the second user does not have at least the threshold amount of money. An example of question data 633 and response selection parameter data 634 presented to the user to provide financial data for a finances based risk factor category is presented in FIG. 8P.

A risk factor for one or more history based risk factor categories can be implemented as history data, which can indicate one or more of: criminal history for the user, whether or not the user has committed a criminal offense in any country, whether or not the user has been arrested in any country, whether or not the user has been convicted of a criminal offence in any country, financial history of the user, residential history of the user, work history of the user, schooling history of the user, medical history of the user, and/or other history of the user. For example, a first user has a more favorable risk assessment score 541 than a second user based on the first user having criminal history data indicating no prior criminal offences or convictions, and based on the second user having criminal history data indicating one or more prior criminal offences or convictions. An example of question data 633 and response selection parameter data 634 presented to the user to provide criminal history data for a history based risk factor category is presented in FIG. 8Q.

A risk factor for one or more health based risk factor categories can be implemented as health status data, which can indicate one or more of: whether or not the user is currently in good health, whether or not the user meet each of a set of health requirements, medical condition data of the user, current medications being taken by the user, medical history of the user, vaccination history of the user, whether the user is up to date on required vaccinations, allergy data for the user, health insurance data for the user, and/or other medical and/or health data for the user. For example, a first user has a more favorable risk assessment score 541 than a second user based on the first user having heath status data indicating the first user is in good health and/or meets all health requirements, and based the second user having health status data indicating the second user is not good health and/or does not meet all health requirements. An example of question data 633 and response selection parameter data 634 presented to the user to provide health status data for a health based risk factor category is presented in FIG. 8R.

A risk factor for one or more language proficiency based risk factor categories can be implemented as language proficiency data corresponding to proficiency in one or more national languages of the country to which the user is attempting to immigrate, such as language test results and/or language skill scores such as a writing score, a reading score, a speaking score, or a listening score. This information can be extracted from language test documents received from the user. For example, a first user has a more favorable risk assessment score 541 than a second user based on the first user having language proficiency indicating the first user has higher language skill scores in one or more categories and/or a higher overall language score than the second user.

Figure 8E:
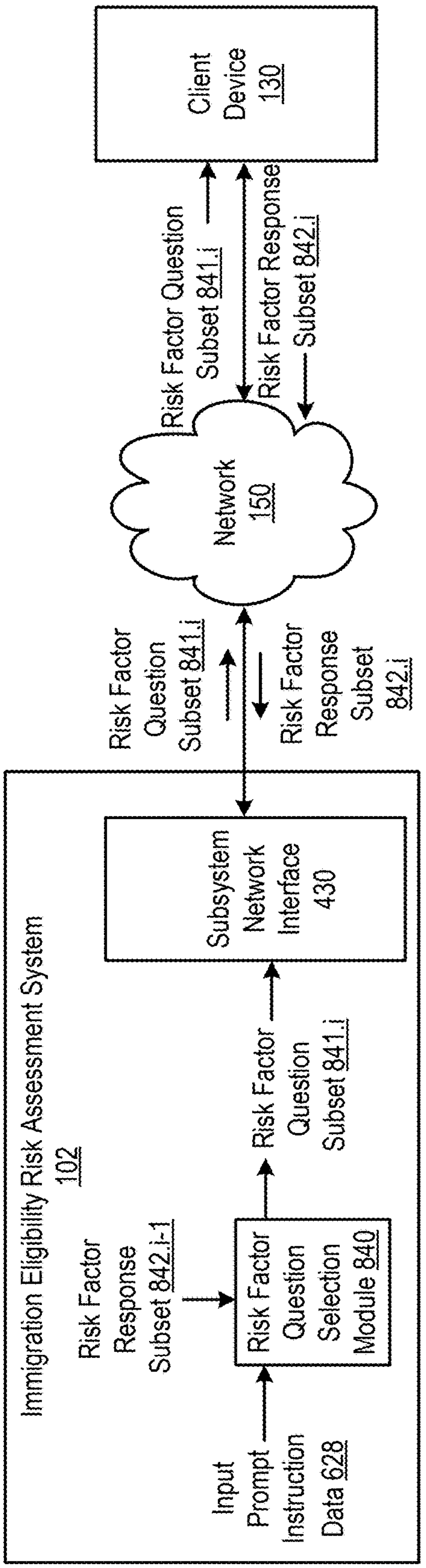
Figure 8F:
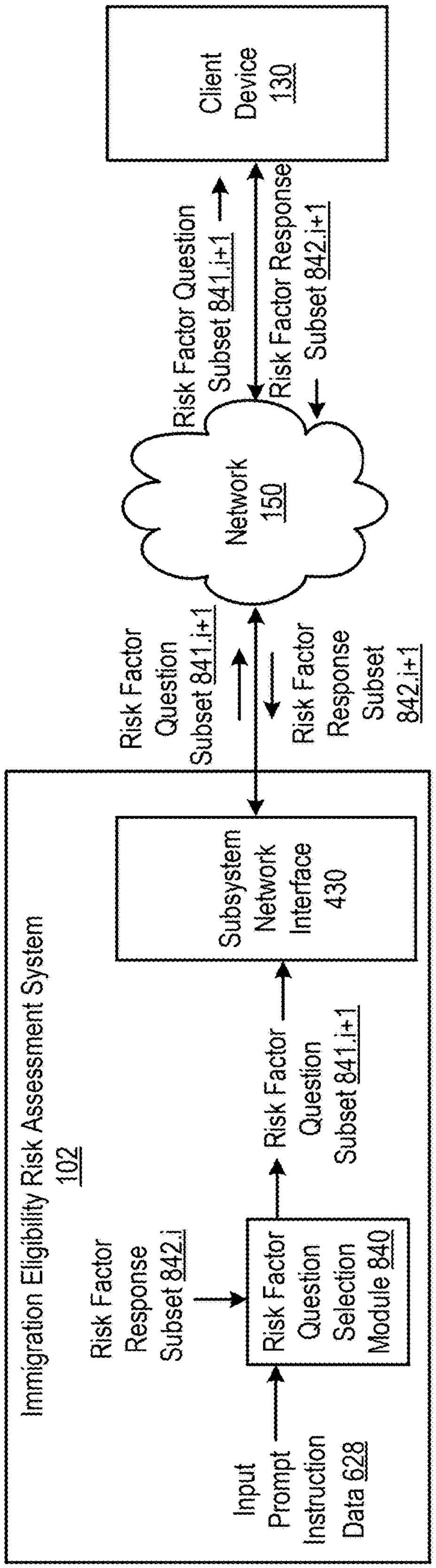

FIGS. 8E and 8F illustrate an example of dynamically selecting questions for each given user based on their answers to prior questions. The immigration eligibility risk assessment system 102 can implement a risk factor question selection module 840, for example, via subsystem processing module 420 and/or subsystem memory module 410.

For example, different questions can be presented to different users based on which country each user is from, based on which country each user is immigrating to, based on the type of immigration status each user is applying for, based on the length and/or type of study program different users are seeking, and/or based on other differences determined for different users based on their answers to one or more previously presented questions.

As illustrated in FIG. 8E, the risk factor question selection module 840 can select one or more questions as a risk factor question subset 841.*i* from a set of possible questions, for example, based on a set of one or more responses of risk factor response subset 842.*i*−1, for example, received in response to prior questions in a prior risk factor question subset 841.*i*−1. For example, a given risk factor question subset 841.*i* is implemented as one of the set of questions 1-Q of FIGS. 6F and 6G, is implemented as and/or identifies question data 633 and/or response selection parameter data 634 for display via the interactive user interface 375 as discussed in conjunction with FIGS. 6F and 6G, and/or is implemented as one or more individual questions or other prompts for response by the user. The one or more questions of a risk factor question subset 841.*i* can be selected by the risk factor question selection module 840 based on corresponding instructions, such as conditional requirement data 635 of one or more possible questions as discussed in conjunction with FIGS. 6F and 6G.

The selected a risk factor question subset 841.*i* can be sent to the corresponding client device 130 for display via interactive user interface. For example, the corresponding question data 633 and/or response selection parameter data 634 indicated by risk factor question subset 841.*i* is displayed via the interactive user interface 375. The client device 130 can generate a corresponding risk factor response subset 842.*i*, for example, indicating one or more responses to the questions of risk factor question subset 841.*i*. The risk factor response subset 842.*i* can be sent by the client device to the immigration eligibility risk assessment system 102.

As illustrated in 8F, once the immigration eligibility risk assessment system 102 receives risk factor response subset 842.*i* for the user, another risk factor question subset 841.*i*+1 can be selected based on this risk factor response subset 842.*i*, for example, in a similar fashion as selecting risk factor response subset 842.*i* in FIG. 8E. This selected a risk factor question subset 841.*i*+1 can similarly be sent to the corresponding client device 130 for display via interactive user interface 375, and another risk factor response subset 842.*i*+1 is generated by the client device 130 and received by the immigration eligibility risk assessment system 102 in response.

The process can eventually complete after a set of multiple distinct risk factor question subsets 841.1-841.R are each selected and sent to the corresponding client device 130 for display via interactive user interface 375, and after a corresponding set of risk factor response subsets 842.1-842.R are received for the user in response. The risk factor response subsets 842.1-842.R can render the full set of responses 545.1-545.Q for the given user's risk factor response data 544, and the risk factor question subsets 841.1-841.R can render a full set of questions included in risk factor question data 810. However, based on supplying different answers to questions, different users' risk factor response data 544 can have different numbers of responses Q and/or can include responses to different questions of different risk factor question data 810.

In some embodiments, the risk assessment score 541 is computed for a user as each risk factor response subsets 842.1-842.R is received, and can be deemed favorable or unfavorable prior to completion and receiving of all risk factor response subsets 842.1-842.R of risk factor response data 544. For example, the risk factor assessment can end early for a first user based on receiving a response to a criminal history question indicating the first user has committed a major criminal offence in another country while a second user can continue answering questions after the criminal history question based on receiving a response to the criminal history question indicating the second user has not committed any criminal offenses.

Figure 8G:
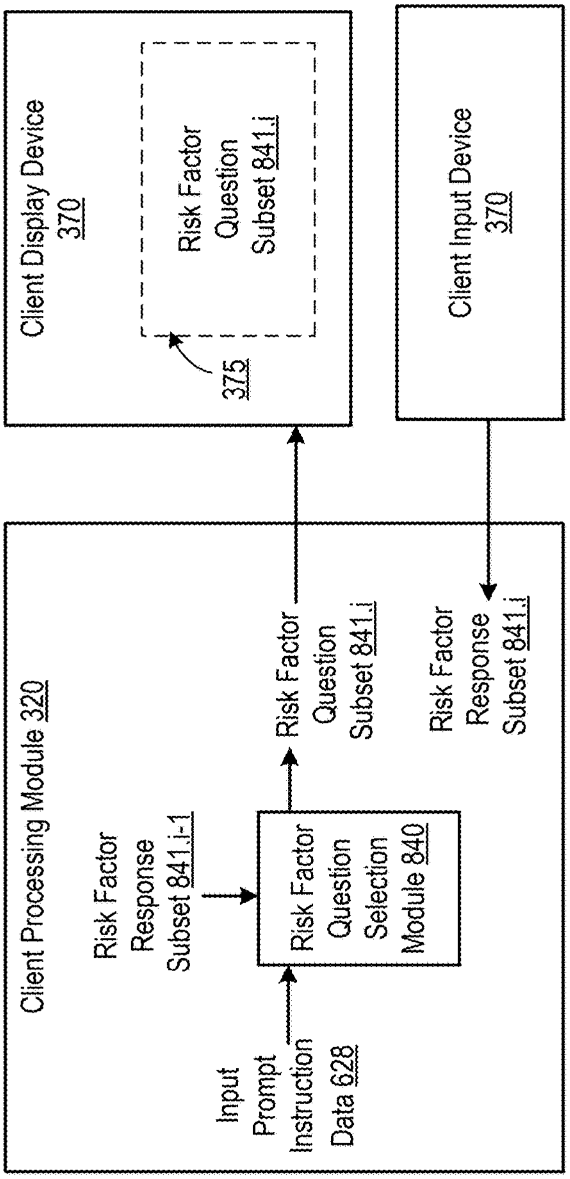
FIGS. 8G-8H are schematic block diagrams of a client device in accordance with various embodiments.
Figure 8H:
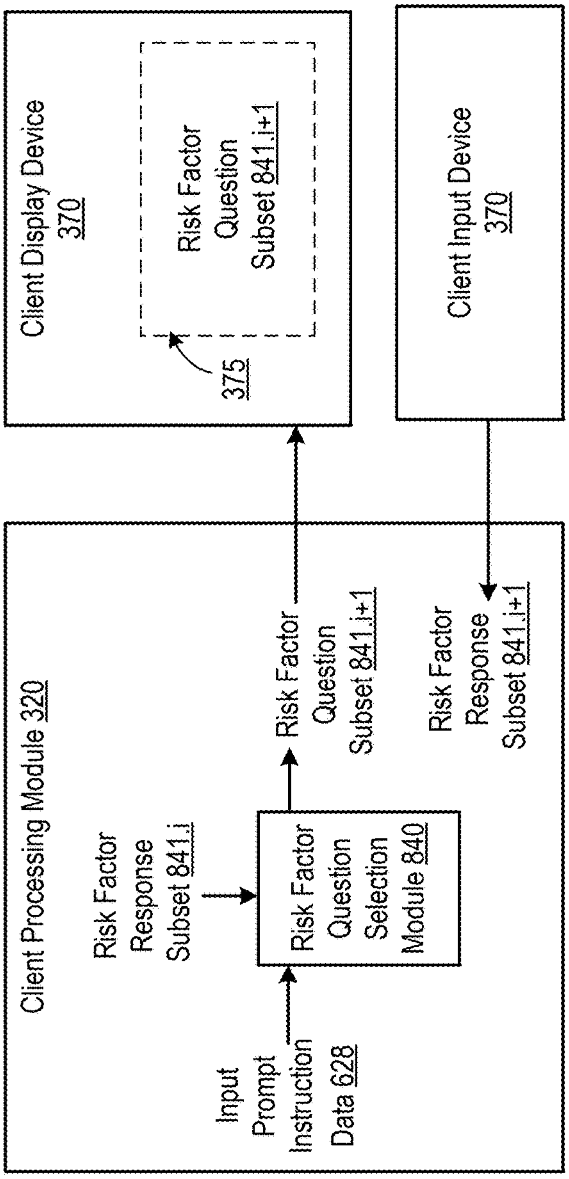

FIGS. 8G-8H illustrate an embodiment of client device 130 that locally implements some or all functionality of the immigration eligibility risk assessment system 102, for example, based on storing and/or executing corresponding subsystem application data 318. In such embodiments, the risk factor question selection module 840 can be implemented via client processing module 320 and/or client memory module 310.

In various embodiments, an immigration eligibility risk assessment system includes at least one processor and at least one memory that stores executable instructions. The executable instructions, when executed by the at least one processor, can cause the immigration eligibility risk assessment system to: send first question data indicating a first set of immigration eligibility risk factor questions to a first client device for display to a first user via an interactive user interface; receive first response data indicating a first set of responses to the first set of immigration eligibility risk factor questions from the first client device, where the first client device generated the first response data based on user input to the first client device in response to at least one first prompt displayed via the interactive user interface to supply responses to the first set of immigration eligibility risk factor questions; generate an immigration eligibility risk assessment score for the first user by performing a risk assessment function based on the first set of responses; and/or initiate immigration assistance for the first user based on determining the immigration eligibility risk assessment score for the first user compares favorably to a risk assessment threshold.

In various embodiments, a client device includes at least one processor, and at least one memory that stores executable instructions. The executable instructions, when executed by the at least one processor, can cause the client device to: present first question data indicating a first set of immigration eligibility risk factor questions to a first user via an interactive user interface displayed by a display device of the client device; generate first response data indicating a first set of responses to the first set of immigration eligibility risk factor questions based on user input to the client device in response to the first question data; generate an immigration eligibility risk assessment score for the first user by performing a risk assessment function based on the first set of responses; and/or initiate immigration assistance for the first user based on determining the immigration eligibility risk assessment score for the first user compares favorably to a risk assessment threshold.

Figure 8I:
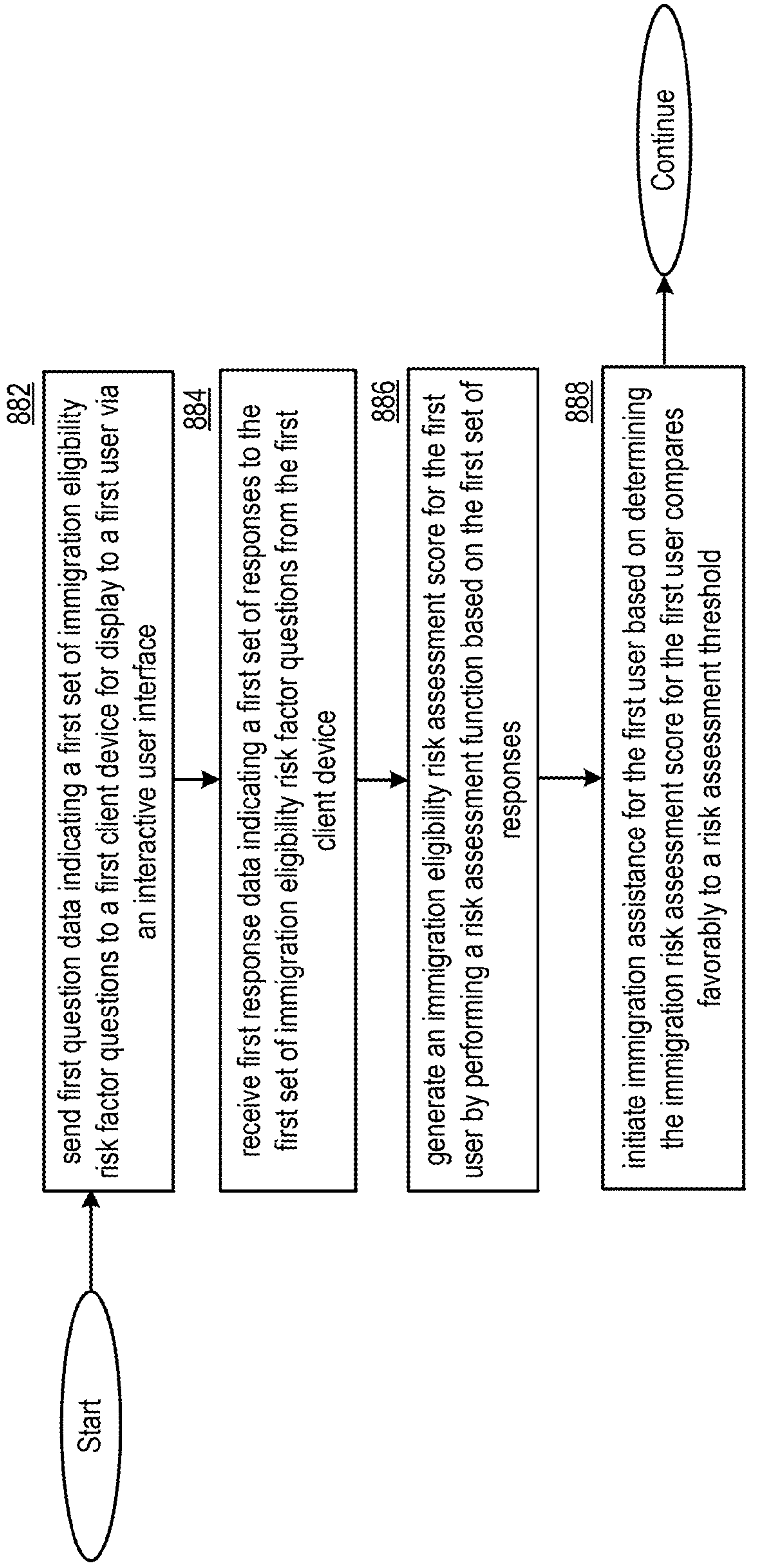
FIGS. 8I-8J are logic diagrams illustrating methods for execution in accordance with various embodiments.

FIG. 8I illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 8I and/or to perform some or all of the functionality discussed in conjunction with FIGS. 8A-8H.

Some or all steps of FIG. 8I can be performed by implementing an immigration eligibility risk assessment system 102. For example, at least one subsystem memory module of the immigration eligibility risk assessment system 102 stores executable instructions that, when executed by at least one subsystem processing module of the immigration eligibility risk assessment system 102, cause the immigration eligibility risk assessment system 102 to execute some or all steps of FIG. 8I and/or to perform some or all of the functionality discussed in conjunction with FIGS. 8A-8H.

Some or all steps of FIG. 8I can be performed by implementing and/or communicating with one or more other subsystems 101. Some or all steps of FIG. 8I can be performed by accessing user account database 162, utilizing some or all data of one or more user accounts 165, and/or generating some or all data of one or more user accounts 165. Some or all steps of FIG. 8I can be performed by accessing function library 172 and/or by performing one or more functions of function library 172. Some or all steps of FIG. 8I can be performed based on communicating with one or more client devices 130.

Step 882 includes sending first question data indicating a first set of immigration eligibility risk factor questions to a first client device for display to a first user via an interactive user interface. For example, the first question data is sent in application data that is stored by and/or executed by the first client device. As another example, the first question data is sent based on receiving a request from the first client device and/or based on determining to send the first question data to the first client device. The first set of immigration eligibility risk factor questions can include a single question and/or can include multiple questions. The first set of immigration eligibility risk factor questions can be displayed via the interactive user interface one at a time, in multiple, sequential views, and/or or all at once in a single view.

Step 884 includes receiving first response data indicating a first set of responses to the first set of immigration eligibility risk factor questions from the first client device. For example, the first client device generated the first response data based on user input to the first client device in response to at least one first prompt displayed via the interactive user interface to supply responses to the first set of immigration eligibility risk factor questions. The first set of responses can include a single response and/or can include multiple responses. The first response data can be received in multiple, separate transmissions, for example, as each of the first set of responses are separately generated and transmitted by the first client device. The first response data can alternatively be received together in a same transmission, for example, after all of the first set of responses are generated by the first client device.

Step 886 includes generating an immigration eligibility risk assessment score for the first user, and/or another applicant corresponding to the first client device, by performing a risk assessment function based on the first set of responses. The risk assessment score can correspond to a binary value, a value determined from a discrete set of options, a percentage, and/or a continuous value. The risk assessment score can correspond to a quantitative value indicating a level of immigration eligibility risk for the first user.

In various embodiments, the risk assessment function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as a risk assessment function entry 702, of function library 172; and/or otherwise determined by immigration assistance system.

Step 888 includes initiating immigration assistance for the first user, and/or another applicant corresponding to the immigration eligibility risk assessment score, based on determining the immigration eligibility risk assessment score for the first user compares favorably to a risk assessment threshold.

Initiating immigration assistance can include identifying the first user in data sent to the immigration application requirement identification system 104, the immigration application materials guided completion system 106, the immigration application materials submission system 108, and/or one or more other subsystems 101. Initiating immigration assistance can include initiating and/or facilitating identification of a set of required application materials for an immigration application for the first user, for example, via the immigration application requirement identification system 104. Initiating immigration assistance can include initiating and/or facilitating completion of an immigration application for the first user, for example, via the immigration application materials guided completion system 106. Initiating immigration assistance can alternatively or additionally include initiating and/or facilitating submission of an immigration application for the first user, for example, via the immigration application materials submission system 108. Initiating immigration assistance can alternatively or additionally include facilitating other assistance for the first user, for example, via functionality of one or more other subsystems 101 described herein.

In various embodiments, the risk assessment threshold can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system;

accessed via a corresponding function entry of function library 172, such as risk assessment function entry 702, of function library 172; and/or otherwise determined by immigration assistance system.

In various embodiments, performing the risk assessment function based on the first set of responses includes accessing the immigration risk factor knowledge base. For example, the immigration risk factor knowledge base is accessed via function library 172 and/or is accessed in other memory accessible by the immigration assistance system 100.

In various embodiments, the method includes sending the first question data to a plurality of client devices for display to a plurality of users, where the plurality of client devices includes the first client device and where the plurality of users includes the first user. The method can further include receiving a plurality of first response data from the plurality of client devices. Each first response data of the plurality of first response data can indicate a first set of responses to the first set of immigration eligibility risk factor questions from a corresponding one of the plurality of client devices. The method can further include generating a plurality of immigration eligibility risk assessment scores for the plurality of users. Each immigration eligibility risk assessment score of the plurality of immigration eligibility risk assessment scores can be generated for a corresponding user of the plurality of users by performing the risk assessment function based on one first set of responses of the plurality of first response data corresponding to the corresponding user. The method can further include automatically selecting a proper subset of the plurality of users based on identifying only ones of the plurality of users with corresponding ones of the plurality of immigration eligibility risk assessment scores that compare favorably to the risk assessment threshold. The method can further include initiating immigration assistance for the proper subset of the plurality of users, and foregoing initiation of immigration assistance for ones of the plurality of users included in a set difference of between the plurality of users and the proper subset of the plurality of users.

In various embodiments, the first user is included in the proper subset of the plurality of users based on the immigration eligibility risk assessment score for the first user comparing favorably to the risk assessment threshold. A second user of the plurality of users is not included in the proper subset of the plurality of users based on the immigration eligibility risk assessment score for the second user comparing unfavorably to the risk assessment threshold. Immigration assistance is therefore initiated for the first user, but not the second user.

In various embodiments, a set difference between a first set of responses corresponding to the first user and another first set of responses corresponding to a second user of the plurality of users is non-null. The first user is included in the proper subset of the plurality of users and the second user is not included in the proper subset of the plurality of users based on the set difference being non-null.

In various embodiments, the first set of responses for the first user indicates a first academic institution as a response to an academic institution question. The another first set of responses for the second user indicates a second academic institution as a response to the academic institution question. The first user is included in the proper subset of the plurality of users and the second user is not included in the proper subset of the plurality of users based on the second academic institution being different from the first academic institution. For example, the first user is included in the proper subset of the plurality of users and the second user is not included in the proper subset of the plurality of users based on the second academic institution corresponding to a less favorable response score than the first academic institution.

In various embodiments, the first set of responses for the first user indicates a first study program duration length as a response to a study program duration length question, where the another first set of responses for the second user indicates a second study program duration length as a response to a study program duration length question as a response to the academic institution question, and where the first user is included in the proper subset of the plurality of users and the second user is not included in the proper subset of the plurality of users based on the first study program duration being longer than the second study program length.

In various embodiments, the method includes automatically selecting a second set of immigration eligibility risk factor questions for the first user as a proper subset of a plurality of immigration risk factor question options based on at least one of the first set of responses. For example, the second set of questions are selected based on conditional requirement data indicated in input prompt instruction data for at least one of the first set of questions. The method can further include sending second question data indicating the second set of immigration eligibility risk factor questions to the first client device for display to the first user via the interactive user interface. The method can further include receiving second response data indicating a second set of responses to the second set of immigration eligibility risk factor questions from the first client device. For example, the first client device generated the second response data based on user input to the first client device in response to at least one second prompt displayed via the interactive user interface to supply responses to the second set of immigration eligibility risk factor questions. The immigration eligibility risk assessment score for the first user can be generated by performing a risk assessment function based on the first set of responses and further based on the second set of responses.

In various embodiments, automatically selecting the second set of immigration eligibility risk factor questions for the first user includes utilizing at least one artificial intelligence technique. In various embodiments, automatically selecting the second set of immigration eligibility risk factor questions for the first user includes accessing an immigration risk factor knowledge base stored in memory accessible by the immigration assistance system, In various embodiments, the second set of immigration eligibility risk factor questions are presented via the interactive user interface sequentially. At least one of the second set of immigration eligibility risk factor questions is automatically selected based on a response received from the first client device for a sequentially prior one of the second set of immigration eligibility risk factor questions.

In various embodiments, the method includes sending the first question data to a plurality of client devices for display to a plurality of users, where the plurality of client devices includes the first client device and where the plurality of users includes the first user. The method can further include receiving a plurality of first response data from the plurality of client devices. Each first response data of the plurality of first response data can indicate a first set of responses to the first set of immigration eligibility risk factor questions from a corresponding one of the plurality of client devices. The method can further include automatically selecting a plurality of second sets of immigration eligibility risk factor questions. Each second set of immigration eligibility risk factor questions of the plurality of second sets of immigration eligibility risk factor questions can be automatically selected for a corresponding one of the plurality of users as a subset of the plurality of immigration risk factor question options based on the first set of responses of a corresponding one of the plurality of first response data. The method can further include sending a plurality of second question data to the plurality of client devices for display. Each second question data can be sent to one of the plurality of client devices of a corresponding one of the plurality of users and indicates one second set of immigration eligibility risk factor questions of the plurality of second sets of immigration eligibility risk factor questions for the corresponding one of the plurality of users. The method can further include receiving a plurality of second response data from the plurality of client devices. Each second response data of the plurality of second response data can indicate a second set of responses from a corresponding one of the plurality of client devices to a corresponding second set of immigration eligibility risk factor questions of the plurality of second sets of immigration eligibility risk factor questions. The method can further include generating a plurality of immigration eligibility risk assessment scores for the plurality of users. Each immigration eligibility risk assessment score of the plurality of immigration eligibility risk assessment scores can be generated for a corresponding user of the plurality of users by performing the risk assessment function based on one first set of responses of the plurality of first response data corresponding to the corresponding user and further based on one second set of responses of the plurality of second response data corresponding to the corresponding user. The method can further include automatically selecting a proper subset of the plurality of users based on identifying only ones of the plurality of users with corresponding ones of the plurality of immigration eligibility risk assessment scores that compare favorably to the risk assessment threshold. The method can further include initiate immigration assistance for the proper subset of the plurality of users, and forego initiation of immigration assistance for ones of the plurality of users included in a set difference of between the plurality of users and the proper subset of the plurality of users.

In various embodiments, a first set difference between the first set of responses indicated in the first response data received from the first client device corresponding to the first user, and a first other first set of responses indicated in a first other one of the plurality of first response data corresponding to a second user of the plurality of users, is non-null. In various embodiments, a second set difference between the second set of immigration eligibility risk factor questions selected for the first user, and a first other one of the plurality of second sets of immigration eligibility risk factor questions selected for the second user of the plurality of users, is non-null based on the first set difference being non-null. In various embodiments, a third set difference between the first set of responses indicated in the first response data received from the first client device corresponding to the first user, and a second other first set of responses indicated in a second other one of the plurality of first response data corresponding to a third user of the plurality of users, is null. In various embodiments, a fourth set difference between the second set of immigration eligibility risk factor questions selected for the first user, and a second other one of the plurality of second sets of immigration eligibility risk factor questions selected for the third user of the plurality of users, is null based on the third set difference being null.

In various embodiments, the first set of immigration eligibility risk factor questions includes a country of current citizenship question. A first response to the country of current citizenship question in the first set of responses indicates a first country for the first user. A second response to the country of current citizenship question in the first other first set of responses for the second user indicates a second country for the second user. The second set difference is non-null based on the first country being different from the second country. For example, second set difference is non-null: based on the second set of immigration eligibility risk factor questions selected for the first user including at least one first question corresponding to immigration from the first country, and not including at least one second question corresponding to immigration from the second country; and further based on the first other one of the plurality of second sets of immigration eligibility risk factor questions selected for the second user of the plurality of users not including the at least one first question corresponding to immigration from the first country, and including the at least one second question corresponding to immigration from the second country.

In various embodiments, the first set of immigration eligibility risk factor questions includes a study type question. A first response to the study type question in the first set of responses indicates a first type of study for the first user. A second response to the study type question in the first other first set of responses for the second user indicates a second type of study for the second user. The second set difference is non-null based on the first type of study being different from the second type of study. For example, second set difference is non-null: based on the second set of immigration eligibility risk factor questions selected for the first user including at least one first question corresponding to the first type of study, and not including at least one second question corresponding to the second type of study; and further based on the first other one of the plurality of second sets of immigration eligibility risk factor questions selected for the second user of the plurality of users not including the at least one first question corresponding to the first type of study, and including the at least one second question corresponding to the second type of study.

In various embodiments, the second set of immigration eligibility risk factor questions selected for the first user includes a first number of questions, and the first other one of the plurality of second sets of immigration eligibility risk factor questions selected for the second user of the plurality of users includes a second number of questions that is different from the first number of questions based on the first set difference being non-null.

In various embodiments, generating the immigration eligibility risk assessment score includes generating a plurality of immigration risk factor scores, where each of the plurality of immigration risk factor scores is generated for a corresponding one of a set union of the first set of responses. The method can further include generating the immigration eligibility risk assessment score as a function of the plurality of immigration risk factor scores.

In various embodiments, generating the plurality of immigration risk factor scores includes performing a plurality of response scoring functions, where each of the plurality of response scoring functions is performed for a corresponding one of the set of responses. In various embodiments, performing at least one of the plurality of response scoring functions includes utilizing a mapping of discrete response options to response scores. In various embodiments, performing at least one of the plurality of response scoring functions includes performing a monotonically increasing function upon a continuous value for a response included in the set of responses.

In various embodiments, generating the immigration eligibility risk assessment score includes applying a plurality of weights corresponding to the plurality of immigration risk factor scores. In various embodiments, the plurality of weights can have a plurality of corresponding values that are: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry of function library 172, such as risk assessment function entry 702, of function library 172; and/or otherwise determined by immigration assistance system.

In various embodiments, initiating immigration assistance for the first user includes sending third question data that includes a set of immigration application questions to the first client device for display to the first user. Initiating immigration assistance for the first user can include receiving third response data indicating a set of responses to the set of immigration application questions from the first client device. For example, the first client device generated the third response data based on user input to the first client device in response to at least one third prompt displayed via the interactive user interface to supply responses to the set of immigration application questions. Initiating immigration assistance for the first user can include generating immigration application data based on the third response data. Initiating immigration assistance for the first user can include facilitating submission of an immigration application for the first user by sending the immigration application data to a government server system. In various embodiments, the immigration application data is further generated based on at least one response included in at least one of: the first set of responses or the second set of responses.

In various embodiments, the method includes sending document upload prompt data indicating a set of documents to a first client device for display to a first user via an interactive user interface. The method can further include receiving document upload data from the first client device that includes a set of document files corresponding to the set of documents. For example, the first client device generated the document upload data based on user input to the first client device in response to at least one third prompt displayed via the interactive user interface to upload the set of document files. At least one document file of the set of document files can correspond to an image file capturing an image of a corresponding document. At least one document file of the set of document files can include a digital version of the corresponding document. The method can further include automatically extracting textual data from the set of document files. In various embodiments, the second set of immigration eligibility risk factor questions for the first user are automatically selected based on the first set of responses and further based on the textual data extracted from the set of image data. In various embodiments, generating the immigration eligibility risk assessment score for the first user includes performing a risk assessment function based on the first set of responses and the second set of responses, and further based on the textual data extracted from the set of image data.

Figure 8J:
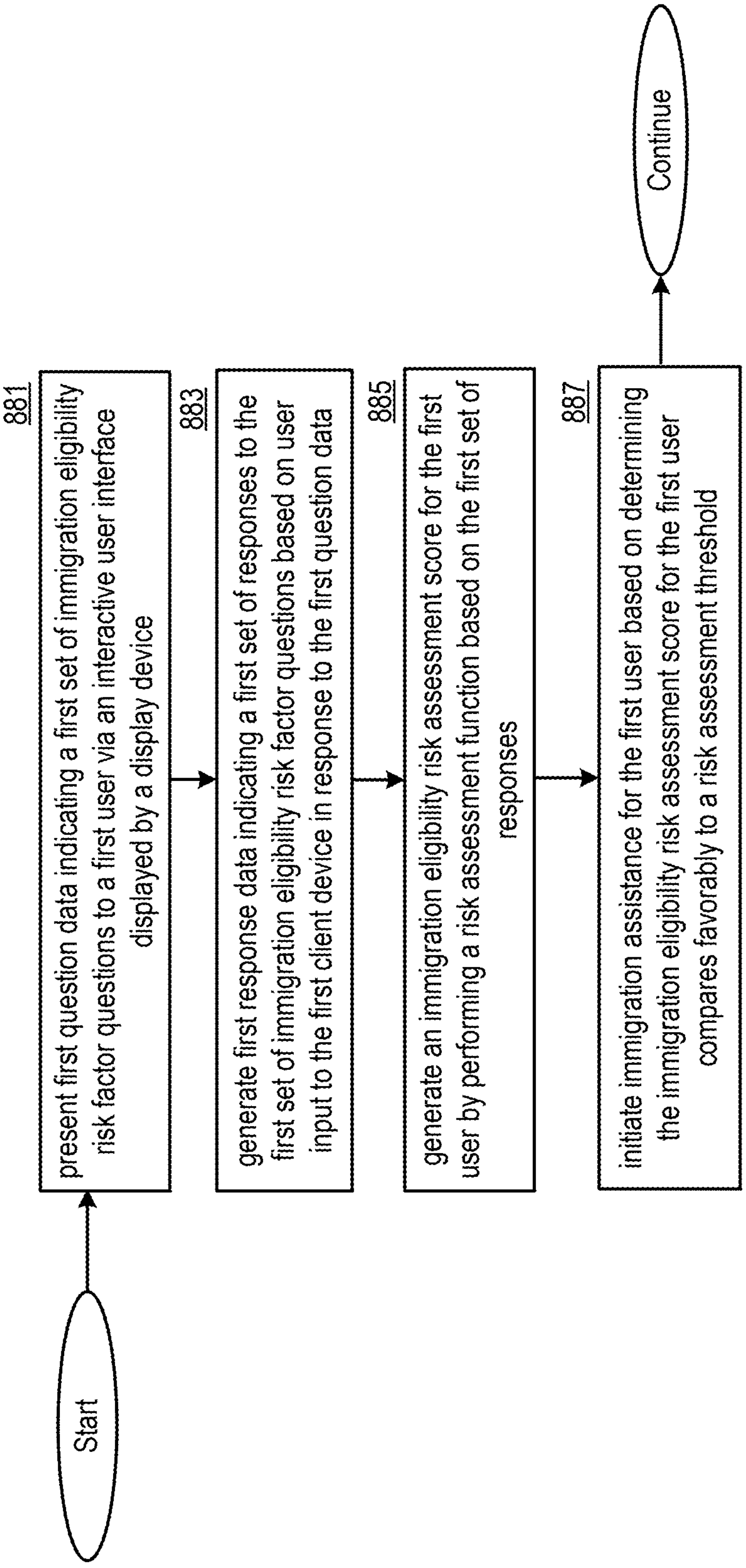

FIG. 8J illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 8J and/or to perform some or all of the functionality discussed in conjunction with FIGS. 8A-8H.

Some or all of the executable instructions can be included in application data 315 that is generated by, is received from, and/or otherwise corresponds to the immigration assistance system 100. For example, execution of the application data 315 can cause the client device to implement functionality of the immigration eligibility risk assessment system 102 as illustrated in FIG. 8C, FIG. 8G, and/or FIG. 8H.

Some or all steps of FIG. 8J can be performed based on communicating with one or more subsystems 101 of immigration assistance system 100. Some or all steps of FIG. 8J can be performed in a same or similar fashion as some or all steps of FIG. 8I. Some or all steps of FIG. 8J can be performed in conjunction with one or more of the various embodiments discussed in conjunction with FIG. 8I.

Step 881 includes presenting first question data indicating a first set of immigration eligibility risk factor questions to a first user via an interactive user interface displayed by a display device of the client device. Step 883 includes generating first response data indicating a first set of responses to the first set of immigration eligibility risk factor questions based on user input to the first client device in response to the first question data. Step 885 includes generating an immigration eligibility risk assessment score for the first user by performing a risk assessment function based on the first set of responses. Step 887 includes initiating immigration assistance for the first user based on determining the immigration eligibility risk assessment score for the first user compares favorably to a risk assessment threshold.

FIGS. 8K-8R present example embodiments of a display by interactive user interface 375 that presents question data 633 and response selection parameter data 634 of example questions of risk factor question data 810. Some or all question data 633 and response selection parameter data 634 of FIGS. 8K-8R can alternatively be utilized to implement any other prompts discussed herein, such as: questions of application requirement question data 910; questions of application letter prompt data 1415; any other questions of any response processing function entry 607 and/or information processing function entry 609; any prompts utilized to collect any other response data 582 discussed herein discussed herein; and/or any prompts presented to the user in conjunction with one or more other subsystems 101.

Figure 8K:
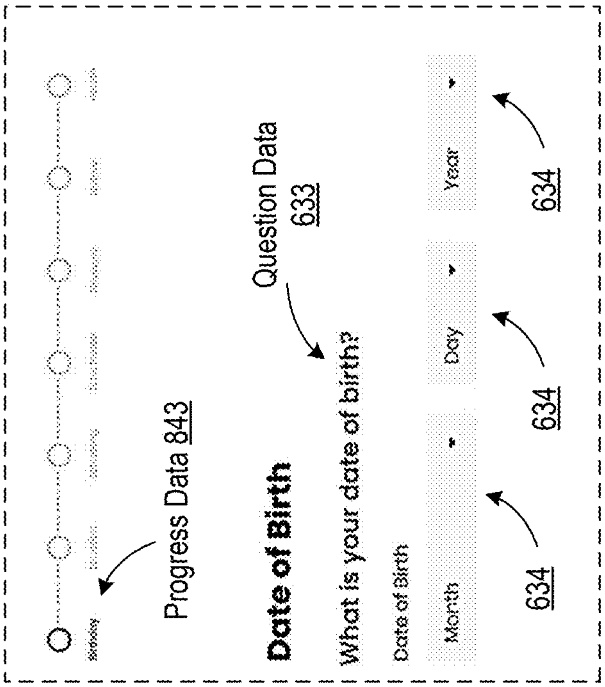
FIGS. 8K-8V illustrate example layouts of prompts and/or information displayed via an interactive user interface in accordance with various embodiments.
Figure 8L:
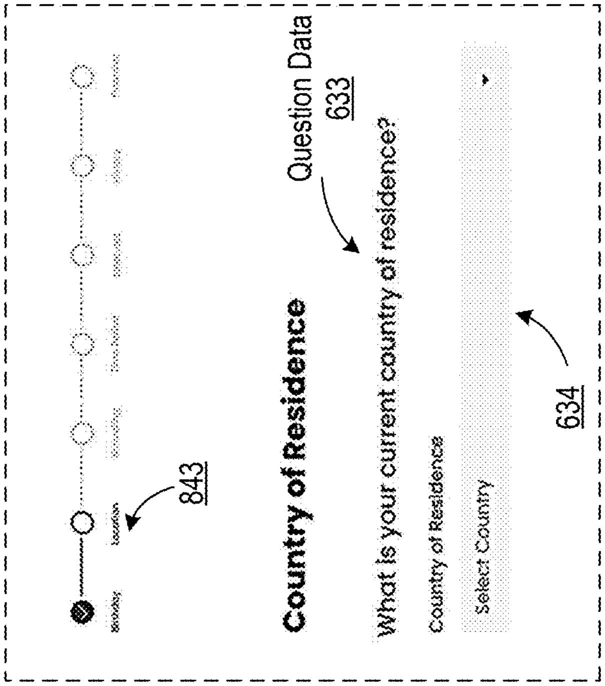
Figure 8M:
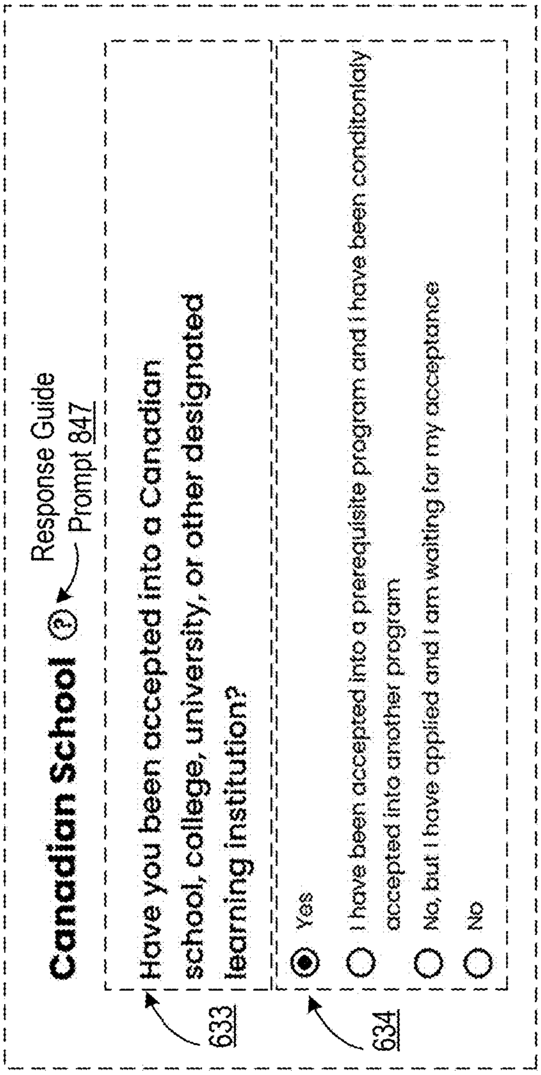
Figure 8N:
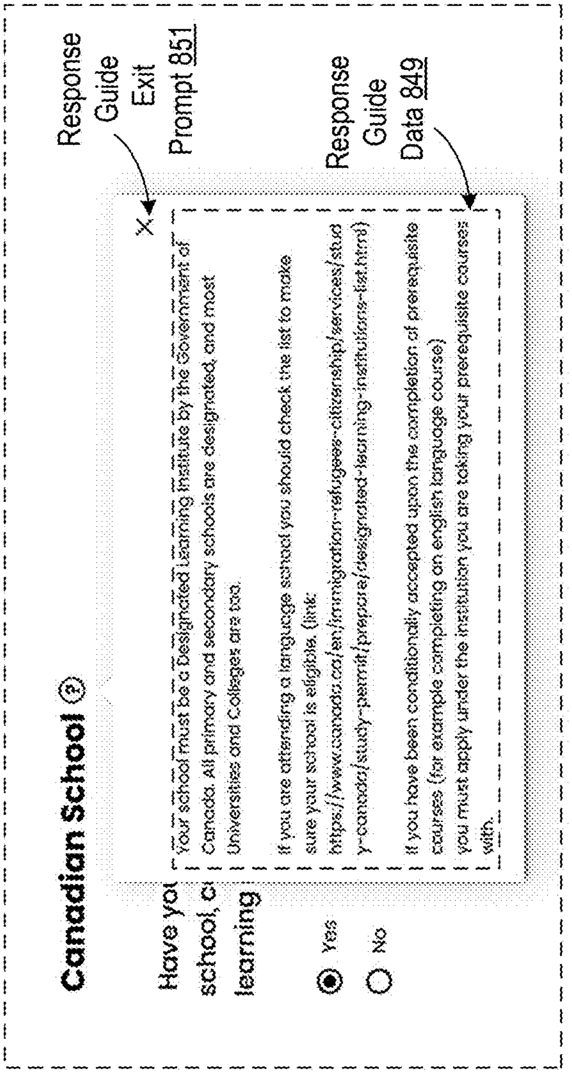
Figure 8O:
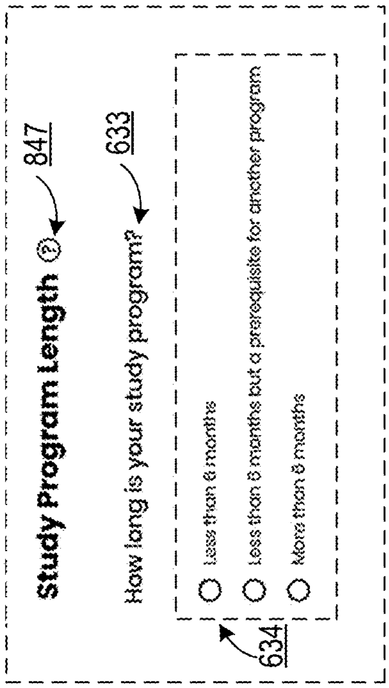
Figure 8P:
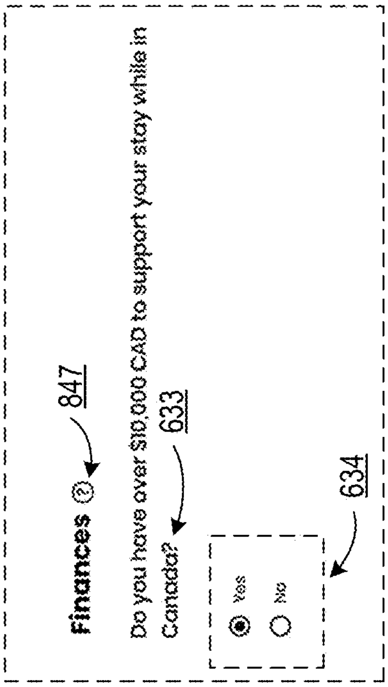
Figure 8Q:
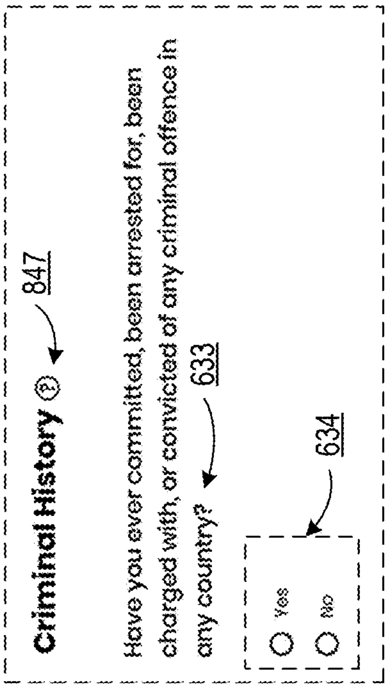
Figure 8R:
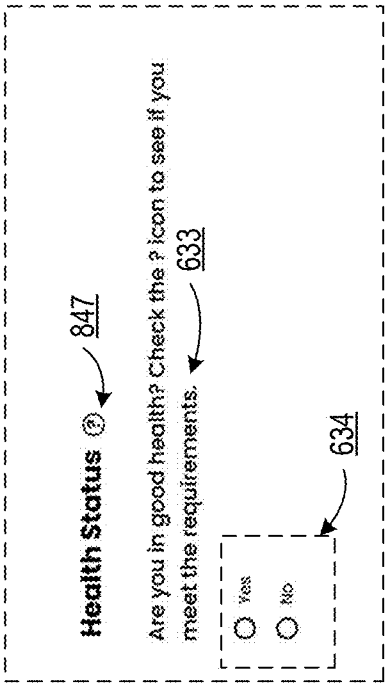
Figure 8S:
Figure 8T:
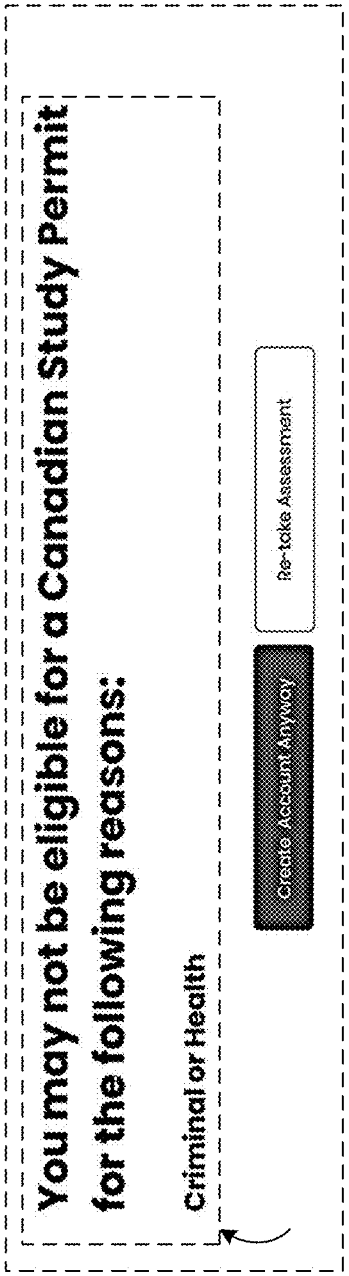
Figure 8U:
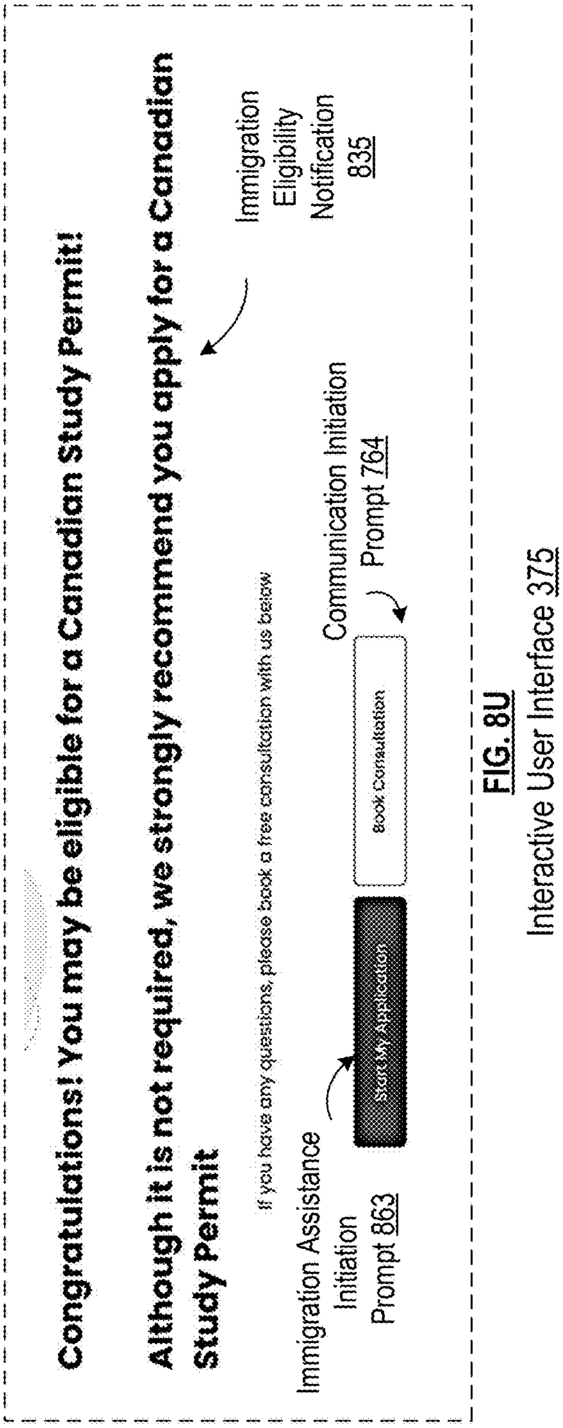
Figure 8V:
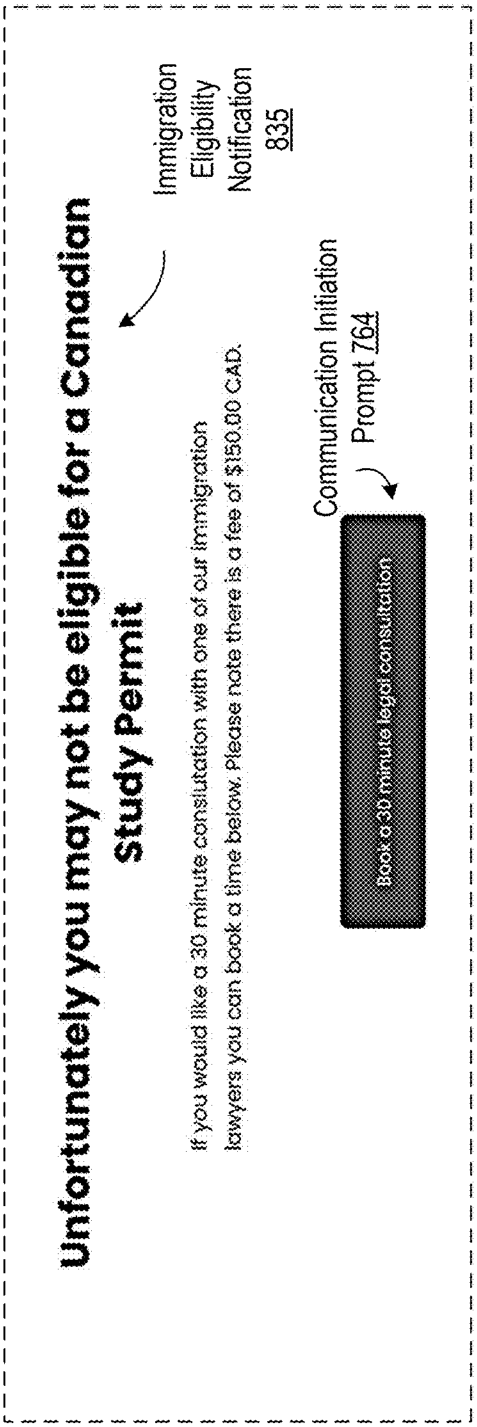

As illustrated in FIGS. 8K and 8L, the interactive user interface 375 can optionally display progress data 843 indicating progress of the user in completing a corresponding risk factor assessment. The display progress data 843 can optionally be displayed in conjunction with all questions to indicate an ordering of the questions, a number of questions or sections already completed, and/or a number of questions or sections that have yet to be completed. The full set of questions presented to the user can optionally be presented one at a time in an ordering denoted by the display progress data 843.

As discussed previously, some or all question data 633 discussed herein can be displayed in conjunction with a response guide prompt 847 as illustrated in the example of FIG. 8M. When the user clicks on or otherwise indicates a selection to response guide prompt 847, the interactive user interface 375 can display response guide data 849 for the corresponding question indicating instructions, clarifications, or additional information, corresponding to the question as illustrated in FIG. 8N. As illustrated 8N, a response guide exit prompt 851 can be clicked on or otherwise selected to hide the response guide data 849, for example, when the user has completed reading the information or otherwise no longer needs this information.

FIGS. 8S-8V present example embodiments of a display by interactive user interface 375 that presents immigration eligibility notification 835. As illustrated in FIGS. 8S and 8U, the interactive user interface 375 can further display an immigration assistance initiation prompt 863, for example, based on the corresponding client device receiving immigration assistance initiation data 855 and/or based on the corresponding user having a favorable risk assessment score 541. As illustrated in FIGS. 8U and 8V, the interactive user interface 375 can further display a communication initiation prompt 764 that when selected, cause communications to be initiated between the user and an assistance entity.

FIGS. 9A-9I present embodiments of an immigration application requirement identification system 104. The immigration application requirement identification system 104 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to determination and communication of a set of required immigration application materials for their immigration application as a subset of a set of possible immigration application materials via implementing immigration application requirement identification system 104. This can include indicating which application materials are necessary for the user and/or which application materials are recommended to expedite the immigration application processing for the user.

In some embodiments, only the required and/or recommended set of immigration materials identified by the immigration application requirement identification system 104 are presented to the applicant with corresponding instructions and/or guidance for completion of a corresponding immigration application via immigration application materials guided completion system 106. In some embodiments, only users with favorable risk assessment scores 541 previously generated via immigration eligibility risk assessment system 102 have required and/or recommended application materials identified by immigration application requirement identification system 104.

In particular, immigration application requirement identification system 104 can determine different sets of required immigration application materials for different users based on different information, such as responses to one or more questions or extracted data 539 extracted from one or more documents, being received, generated, and/or otherwise determined for different users. For example, different sets of required application materials are determined for different users based on which country each user is from, based on which country each user is immigrating to, based on the type of immigration status each user is applying for, based on the length and/or type of study program different users are seeking, and/or based on other differences determined for different users.

Some or all of this functionality of the immigration application requirement identification system 104 improves the technology of computer-based immigration systems based on improving the efficiency of generating immigration applications for users, for example, based on identification of and completion of only materials that are required, rather than additional unnecessary materials. Some or all of this functionality of the immigration application requirement identification system 104 improves the technology of computer-based immigration systems based on gathering information and computing corresponding quantitative data regarding immigration application requirements that can be utilized over time as historical data utilized as input to one or more immigration analytical functions utilized determine trends in rate of granting of immigration applications to users and/or length of time in processing of immigration applications as a function of the set of application materials included in immigration applications.

As illustrated in FIG. 9A, the immigration application requirement identification system 104 can send application requirement question data 910.1-910.N to a plurality of client devices 130.1-130.N. For example, the application requirement question data 910 is implemented as some or all of the input prompt instruction data 628 of application requirement function entry 704 utilized to procure the corresponding set of responses 1-Q as discussed in conjunction with FIG. 7C, FIG. 6F, and/or FIG. 6G. As another example, the application requirement question data 910 is indicated in application data 318 sent to the client device 130 for execution. As another example, the application requirement question data 910 is sent to a corresponding client device based on receiving a request from the client device to identify application requirements and/or to receive immigration assistance. Each application requirement question data 910 can be presented to the corresponding user via interactive user interface 375, for example, as one or more individual questions or other prompts.

The immigration application requirement identification system 104 can receive a plurality of application requirement response data 524.1-524.N. Each application requirement response data 524 can be generated by the corresponding client device 130 based on user input to the client device 130 indicating responses to questions indicated in the application requirement question data 910. Application requirement response data 524 can be implemented as the set of responses 1-Q utilized as input to an application requirement function of a corresponding application requirement function entry 704. Application requirement response data 524 can alternatively or additionally be implemented as the application requirement response data 524 and/or any other response data 582 of user account 165, and can be stored in user account 165 for the corresponding user by immigration application requirement identification system 104 based on being received from the corresponding client device 130.

The immigration application requirement identification system 104 can implement a required material set identification module 920, for example, via subsystem processing module 420 and/or subsystem memory module 410. The required material set identification module 920 can generate each of a plurality of required material sets 521.1-521.N from a corresponding one of the plurality of application requirement response data 524.1-524.N. For example, each required material set 521 is generated by performing the application requirement function in accordance with application requirement function entry 704 by utilizing responses 1-Q indicated in the corresponding application requirement response data 524 as input, for example, as discussed in conjunction with FIG. 7C. The plurality of required material sets 521.1-521.N can be sent to corresponding client devices 130 for display via interactive user interface 375. Each required material set 521 can alternatively or additionally be stored as required material set 521 of a corresponding user account 165 for the corresponding user. An example of a required material set 521 presented via interactive user interface 375 is illustrated in FIG. 9AN.

FIG. 9B illustrates an embodiment of an immigration application requirement identification system 104 that further generates each of a plurality of recommended material sets 522.1-522.N based on a corresponding one of the plurality of application requirement response data 524.1-524.N. For example, the same or different application requirement function of a corresponding same or different application requirement function entry 704 is executed to generate the plurality of recommended material sets 522.1-522.N from the plurality of application requirement response data 524.1-524.N, for example, as discussed in conjunction with FIG. 7C. The plurality of required material sets 521.1-521.N can be similarly sent to corresponding client devices 130 for display via interactive user interface 375. Each recommended material set 522 can alternatively or additionally be stored as recommended material set 522 of a corresponding user account 165 for the corresponding user. Examples of presenting a recommended material set 522 via interactive user interface 375 are illustrated in FIGS. 9AN, 9AO, and 9AP.

FIG. 9C illustrates an embodiment of client device 130 that locally implements some or all functionality of the immigration application requirement identification system 104, for example, based on storing and/or executing corresponding subsystem application data 318. In such embodiments, the required material set identification module 920 can be implemented via client processing module 320 and/or client memory module 310.

FIG. 9D illustrates an embodiment of a required material set identification module 920. The required material set identification module 920 can implement a plurality of requirement data generator modules 970.1-970.W to generate requirement data 975.1-975.W for each of a set of possible application materials 1-W.

Each requirement data generator module 970.1-970.W can utilize one or more of the responses 525.1-525.Q as input. For example, one or more responses 525 are utilized as input to exactly one requirement data generator module 970. As another example, one or more requirement data generator modules 970.1-970.W utilize exactly one response 525 as input. While not depicted in FIG. 8D, one or more requirement data generator modules 970 can optionally utilize other information corresponding to the user, such as: any other response data 582 received from the user in conjunction with any other presented prompts; extracted data 539 extracted from a document received from the user; and/or other information discussed in conjunction with user account 165.

Each requirement data 975 can be generated based on utilizing a corresponding one of a set of conditional requirement data 735.1-735.W. In particular, each requirement data 975 can be generated to indicate whether or not the corresponding type of application material is required, where the resulting required material set 521 only indicates identifiers for ones the set of possible application materials 1-W with requirement data 975 indicating these application materials are required. Alternatively or in addition, each requirement data 975 can be generated to indicate whether or not the corresponding type of application material is recommended, where the resulting recommended material set 522 only indicates identifiers for ones the set of possible application materials 1-W with requirement data 975 indicating these application materials are recommended. The conditional requirement data 735.1-735.W can be indicated by a corresponding application requirement function entry 704, for example, as discussed in conjunction with FIG. 7C.

For example, a first user has required material set 521 indicating at least one co-op application material based on the first user's responses 525 and/or other extracted data 539 indicating their study program includes co-op work, while a second user has required material set 521 that does not indicate the at least one co-op application material based on the second user's responses 525 and/or other extracted data 539 indicating their study program does not include co-op work.

As another example, a first user has required material set 521 indicating a GIC of at least $10,000 Canadian dollars based on the first user's responses 525 and/or other extracted data 539 indicating their study program is located in Canada, outside of Quebec, while a second user has required material set 521 indicating a GIC of at least $11,000 Canadian dollars based on the second user's responses 525 and/or other extracted data 539 indicating their study program is located in Quebec.

As another example, a first user has required material set 521 indicating their own personal proof of finances, such as bank statements of the first user, based on the first user's responses 525 and/or other extracted data 539 indicating they are funding their study program themselves, while a second user has required material set 521 indicating their proof of finances from a different financial provider, such as bank statements of or a letter from the different financial provider, based on the second user's responses 525 and/or other extracted data 539 indicating another person or institution is funding their study program.

As another example, a first user has required material set 521 indicating a custodian declaration form, based on the first user's responses 525 and/or other extracted data 539 indicating they are under 17 and are not living with a parent or legal guardian during the entirety of their stay in the country, while a second user has required material set 521 that does not indicate the a custodian declaration form based on the second user's responses 525 and/or other extracted data 539 indicating they are over 17, or that they are living with a parent or legal guardian during the entirety of their stay in the country.

As another example, a first user has required material set 521 indicating fingerprints and/or biometrics, based on the first user's responses 525 and/or other extracted data 539 indicating they have not given fingerprints and/or biometrics to the country in the last 10 years, while a second user has required material set 521 that does not fingerprints and/or biometrics, based on the first user's responses 525 and/or other extracted data 539 indicating they have not given fingerprints and/or biometrics to the country in the last 10 years, based on the second user's responses 525 and/or other extracted data 539 indicating they have already given fingerprints and/or biometrics to the country in the last 10 years.

As another example, a first user has required and/or recommended application data indicating proof of immigration status of other family members, such as a study permit and/or work permit of a spouse or child of the first user, based on the first user's responses 525 and/or other extracted data 539 indicating they have a spouse or child with a study permit and/or work permit for the country, while a second user has required material set 521 that does not indicate proof of immigration status of other family members, based on the second user's responses 525 and/or other extracted data 539 indicating they do not have a spouse or child with a study permit and/or work permit for the country.

As another example, a first user has recommended material set 522 indicating proof of scholarship or financial aid for their study program, such as a commonwealth scholarship, a full bursary, and/or participation in an aid program, or proof of another type of scholarship or financial aid for their study program, based on the first user's responses 525 and/or other extracted data 539 indicating they have been granted a scholarship or financial aid for their study program, while a second user has required material set 521 that does not indicate proof of a scholarship or financial aid for their study program, based on the second user's responses 525 and/or other extracted data 539 indicating they have not been granted a scholarship or financial aid for their study program.

FIGS. 9E and 9F illustrate an example of dynamically selecting questions for each given user based on their answers to prior questions. The immigration application requirement identification system risk assessment system 104 can implement an immigration application question selection module 940, for example, via subsystem processing module 420 and/or subsystem memory module 410.

For example, different questions can be presented to different users based on which country each user is from, based on which country each user is immigrating to, based on the type of immigration status each user is applying for, based on the length and/or type of study program different users are seeking, and/or based on other differences determined for different users based on their answers to one or more previously presented questions. The immigration application question selection module 940 can be implemented in a same or similar fashion as the risk factor question selection module 840.

As illustrated in FIG. 9E, the immigration application question selection module 940 can select one or more questions as an immigration application question subset 941.*i* from a set of possible questions, for example, based on a set of one or more responses of immigration application response subset 942.*i*−1, for example, received in response to prior questions in a prior immigration application question subset 941.*i*−1. For example, a given immigration application question subset 941.*i* is implemented as one of the set of questions 1-Q of FIGS. 6F and 6G, is implemented as and/or identifies question data 633 and/or response selection parameter data 634 for display via the interactive user interface 375 as discussed in conjunction with FIGS. 6F and 6G, and/or is implemented as one or more individual questions or other prompts for response by the user. The one or more questions as an immigration application question subset 941.*i* can be selected by the immigration application question selection module 940 based on corresponding instructions, such as conditional requirement data 635 of one or more possible questions as discussed in conjunction with FIGS. 6F and 6G.

The selected an immigration application question subset 941.*i* can be sent to the corresponding client device 130 for display via interactive user interface. For example, the corresponding question data 633 and/or response selection parameter data 634 indicated by immigration application question subset 941.*i* is displayed via the interactive user interface 375. The client device 130 can generate a corresponding immigration application response subset 942.*i*, for example, indicating one or more responses to the questions of immigration application question subset 941.*i*. The immigration application response subset 942.*i* can be sent by the client device to the immigration application requirement identification system 104.

As illustrated in 9F, once the immigration application requirement identification system 104. receives immigration application response subset 942.*i* for the user, another immigration application question subset 941.*i*+1 can be selected based on this immigration application response subset 942.*i*, for example, in a similar fashion as selecting immigration application response subset 942.*i* in FIG. 8E. This selected an immigration application question subset 941.*i*+1 can similarly be sent to the corresponding client device 130 for display via interactive user interface 375, and another immigration application response subset 942.*i*+1 is generated by the client device 130 and received by the immigration application requirement identification system 104 in response.

The process can eventually complete after a set of multiple distinct risk immigration application subsets 941.1-941.R are each selected and sent to the corresponding client device 130 for display via interactive user interface 375, and after a corresponding set of immigration application response subsets 942.1-942.R are received for the user in response. The immigration application response subsets 942.1-942.R can render the full set of responses 525.1-525.Q for the given user's immigration application response data 524, and the immigration application question subsets 941.1-941.R can render a full set of questions included in application requirement question data 910. However, based on supplying different answers to questions, different users' different user's response data 524 can have different numbers of responses Q and/or can include responses to different questions of different application requirement question data 910.

For example, a first user is asked an age and/or birthdate question in a first immigration application question subset 941, and is later asked whether they are living with a parent or legal guardian in a subsequent immigration application question subset 941 based on a response to age and/or birthdate question in the immigration application response subsets 942 corresponding to the first immigration application question subset 941 indicating the first user is under the age of 17, for example, to determine whether the user's required material set 521 should include a custodian declaration form. A second user is also asked the age and/or birthdate question in a first immigration application question subset 941, but is never asked whether they are living with a parent or legal guardian in any subsequent immigration application question subset 941 based on a response to age and/or birthdate question in the immigration application response subsets 942 corresponding to the first immigration application question subset 941 indicating the second user is over the age of 17. The second user's required material set 521 will not include the custodian declaration form, despite never answering whether they are living with a parent or legal guardian, based on the custodian declaration form being deemed unapplicable due to the second user being over the age of 17.

FIGS. 9G-9H illustrate an embodiment of client device 130 that locally implements some or all functionality of the immigration application requirement identification system 104, for example, based on storing and/or executing corresponding subsystem application data 318. In such embodiments, the immigration application question selection module 940 can be implemented via client processing module 320 and/or client memory module 310.

FIG. 9I illustrates an embodiment of an immigration assistance system 100 that utilizes required material set 521 and recommended material set 522 for a given user to implement the immigration application materials guided completion system 106 for the given user. In particular, the immigration application materials guided completion system 106 can facilitate completion of all application materials in the required material set 521 for the user, and/or one or more application materials in the recommended material set 522 for the user. The immigration application materials guided completion system 106 can thus facilitate completion of different sets of materials for different users based on different users having different required material sets 521 and/or different recommended material sets 522.

For example, sending the plurality of required material sets 521.1-521.N and/or plurality of recommended material sets 522.1-522.N to corresponding client devices 130 for display via interactive user interface 375 can include sending corresponding prompts and/or instructions that facilitate completion of all required application materials and optionally some or all recommended application materials for users 1-N, as discussed in further detail in conjunction with FIGS. 10A-10F. Alternatively or in addition, users can simply view the required material sets 521 and/or recommended material sets 522 via interactive user interface 375, and can use this information do determine which application materials they should complete and submit in their independent completion and submission of an immigration application.

In various embodiments, an immigration application requirement identification system includes at least one processor and at least one memory that stores executable instructions. The executable instructions, when executed by the at least one processor, can cause the immigration application requirement identification system to: send first question data indicating a first set of immigration application questions to a first client device for display to a first user via an interactive user interface; receive first response data indicating a first set of responses to the first set of immigration application questions from the first client device, where the first client device generated the first response data based on user input to the first client device in response to at least one first prompt displayed via the interactive user interface to supply responses to the first set of immigration application questions; automatically identify a set of required immigration application materials for the first user as a proper subset of a plurality of possible immigration application materials based on the first set of responses; and/or send required application material prompt data indicating the set of required immigration application materials to the first client device for display to the first user via the interactive user interface. The set of required immigration application materials can be completed based on user input to the first client device in response to the required application material prompt data, and an immigration application can be submitted for the first user based on transmission of the set of required immigration application materials to a government server system.

In various embodiments, a client device includes at least one processor, and at least one memory that stores executable instructions. The executable instructions, when executed by the at least one processor, can cause the client device to: present first question data indicating a first set of immigration application questions to a first user via an interactive user interface displayed via a display device of the client device; generate first response data indicating a first set of responses to the first set of immigration application questions based on user input to the client device in response to at the first question data; automatically identify a set of required immigration application materials for the first user as a proper subset of a plurality of possible immigration application materials based on the first set of responses; and/or present required application material prompt data indicating the set of required immigration application materials via the interactive user interface. An immigration application for the first user can be submitted based on transmission of the set of required immigration application materials to a government server system.

FIG. 9J illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 9J and/or to perform some or all of the functionality discussed in conjunction with FIGS. 9A-9I.

Some or all steps of FIG. 9J can be performed by implementing an immigration application requirement identification system 104. For example, at least one subsystem memory module of the immigration application requirement identification system 104 stores executable instructions that, when executed by at least one subsystem processing module of the immigration application requirement identification system 104, cause the immigration application requirement identification system 104 to execute some or all steps of FIG. 9J and/or to perform some or all of the functionality discussed in conjunction with FIGS. 9A-9I.

Some or all steps of FIG. 9J can be performed by implementing and/or communicating with one or more other subsystems 101. Some or all steps of FIG. 9J can be performed by accessing user account database 162, utilizing some or all data of one or more user accounts 165, and/or generating some or all data of one or more user accounts 165. Some or all steps of FIG. 9J can be performed by accessing function library 172 and/or by performing one or more functions of function library 172. Some or all steps of FIG. 9J can be performed based on communicating with one or more client devices 130.

Step 982 includes sending first question data indicating a first set of immigration application questions to a first client device for display to a first user via an interactive user interface. For example, the first question data is sent in application data that is stored by and/or executed by the first client device. As another example, the first question data is sent based on receiving a request from the first client device and/or based on determining to send the first question data to the first client device. The first set of immigration application questions can include a single question and/or can include multiple questions. The first set of immigration application questions can be displayed via the interactive user interface one at a time, in multiple, sequential views, and/or or all at once in a single view.

Step 984 includes receiving first response data indicating a first set of responses to the first set of immigration application questions from the first client device. For example, the first client device generated the first response data based on user input to the first client device in response to at least one first prompt displayed via the interactive user interface to supply responses to the first set of immigration application questions. The first set of responses can include a single response and/or can include multiple responses. The first response data can be received in multiple, separate transmissions, for example, as each of the first set of responses are separately generated and transmitted by the first client device. The first response data can alternatively be received together in a same transmission, for example, after all of the first set of responses are generated by the first client device.

Step 986 includes automatically identify a set of required immigration application materials for the first user as a proper subset of a plurality of possible immigration application materials based on the first set of responses. For example, automatically identifying the set of required immigration application materials for the first user can include performing an application requirement function.

In various embodiments, the application requirement function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an application requirement function entry 704, of function library 172; and/or otherwise determined by immigration assistance system.

Step 988 includes sending required application material prompt data indicating the set of required immigration application materials to the first client device for display to the first user via the interactive user interface. The set of required immigration application materials can be completed based on user input to the first client device in response to the required application material prompt data, and/or an immigration application can be submitted for the first user based on transmission of the set of required immigration application materials to a government server system.

The method can further include facilitating completion of the set of required immigration application materials via implementing and/or communicating with the immigration application materials guided completion system 106, and/or facilitating submission of the immigration application via implementing and/or communicating with the immigration application materials submission system 108. For example, the method can further include identifying the first user and/or the set of required immigration application materials in data sent to the immigration application materials guided completion system 106, the immigration application materials submission system 108, and/or one or more other subsystems 101.

In various embodiments, the method includes obtaining the set of required immigration application materials and/or submitting the immigration application by sending the set of required immigration application materials to a government server system.

In various embodiments, obtaining of the set of required immigration application materials includes receiving a first one of the set of required immigration application materials from the first client device, where the first client device generated the first one of the set of required immigration application materials based on the user input to the first client device in response to a plurality of questions presented in the required application material prompt data. In various embodiments, obtaining of the set of required immigration application materials includes receiving a second one of the set of required immigration application materials as document upload data from the first client device that includes a document file that includes the second one of the set of required immigration application materials, where the first client device generated the document upload data based on the user input to the first client device in response to a prompt to upload the second one of the set of required immigration application materials presented in the required application material prompt data.

In various embodiments, obtaining of the set of required immigration application materials includes receiving a third one of the set of required immigration application materials as image upload data from the first client device that includes image data capturing the third one of the set of required immigration application materials, where the first client device generated the image upload data based on the user input to the first client device in response to a prompt to upload an image of the third one of the set of required immigration application materials presented in the required application material prompt data.

In various embodiments, obtaining of the set of required immigration application materials includes generating a fourth one of the set of required immigration application materials by populating a plurality of fields of the fourth one of the set of required immigration application materials based on a set of application field responses received from the first client device, where the first client device generated the set of application field responses based on the user input to the first client device in response to a plurality of questions presented in the required application material prompt data.

In various embodiments, obtaining of the set of required immigration application materials includes generating a fifth one of the set of required immigration application materials by populating a plurality of fields of the fifth one of the set of required immigration application materials based on the first set of responses to the first set of immigration application questions received from the first client device.

In various embodiments, obtaining of the set of required immigration application materials includes generating a sixth one of the set of required immigration application materials by populating a plurality of fields of the sixth one of the set of required immigration application materials based on at least one response and/or at least one document file accessed in response log data of a user account associated with the first user, where the response log data includes a plurality of responses received from the first client device in response to one or more previously presented prompts via the interactive user interface.

In various embodiments, the method includes sending the first question data to a plurality of client devices for display to a plurality of users. The plurality of client devices includes the first client device, and the plurality of users includes the first user. The method can further include receiving a plurality of first response data from the plurality of client devices, where each first response data of the plurality of first response data indicates a first set of responses to the first set of immigration application questions from a corresponding one of the plurality of client devices. The method can further include automatically identifying a plurality of sets of required immigration application materials for the plurality of users, where each set of required immigration application materials of the plurality of sets of required immigration application materials is identified for a corresponding user of the plurality of users as a proper subset of the plurality of possible immigration application materials based on one first set of responses of the plurality of first response data corresponding to the corresponding user. The method can further include sending a plurality of required application material prompt data to the plurality of client devices for display. Each required application material prompt data of the plurality of required application material prompt data can indicate one set of required immigration application materials corresponding to a corresponding one of the plurality of users, and can be sent to one of the plurality of client devices corresponding to the corresponding one of the plurality of users.

In various embodiments, a first set difference between a first set of responses corresponding to the first user and another first set of responses corresponding to a second user of the plurality of users is non-null. In various embodiments, a second set difference between the set of required immigration application materials identified for the first user, and another one of the plurality of sets of required immigration application materials identified for a second user of the plurality of users, is non-null based on the first set difference being non-null, In various embodiments, the method includes automatically selecting a second set of immigration application questions for the first user as a proper subset of a plurality of immigration application question options based on the first set of responses. The method can further include sending second question data indicating the second set of immigration application questions to the first client device for display to the first user via the interactive user interface. The method can further include receiving second response data indicating a second set of responses to the second set of immigration application questions from the first client device. For example, the first client device generated the second response data based on user input to the first client device in response to at least one second prompt displayed via the interactive user interface to supply responses to the second set of immigration application questions. The set of required immigration application materials can be automatically identified for the first user based on the first set of responses and further based on the second set of responses.

In various embodiments, automatically selecting the second set of immigration application questions for the first user includes utilizing at least one artificial intelligence technique. In various embodiments, automatically selecting the second set of immigration application questions for the first user includes accessing the immigration application knowledge base.

In various embodiments, the second set of immigration application questions are presented via the interactive user interface sequentially. At least one of the second set of immigration application questions is automatically selected based on a response received from the first client device for a sequentially prior one of the second set of immigration application questions.

In various embodiments, a first set difference between the first set of responses indicated in the first response data received from the first client device corresponding to the first user, and a first other first set of responses indicated in a first other one of the plurality of first response data corresponding to a second user of the plurality of users, is non-null. In various embodiments, a second set difference between the second set of immigration application questions selected for the first user, and a first other one of the plurality of second sets of immigration application questions selected for the second user of the plurality of users, is non-null based on the first set difference being non-null. In various embodiments, a third set difference between the first set of responses indicated in the first response data received from the first client device corresponding to the first user, and a second other first set of responses indicated in a second other one of the plurality of first response data corresponding to a third user of the plurality of users, is null. In various embodiments, a fourth set difference between the second set of immigration application selected for the first user, and a second other one of the plurality of second sets of immigration application questions selected for the third user of the plurality of users, is null based on the third set difference being null.

In various embodiments, automatically identifying the set of required immigration application for the first user as the proper subset of a plurality of possible immigration application materials includes utilizing at least one artificial intelligence technique.

In various embodiments, automatically identifying the set of required immigration application for the first user as the proper subset of a plurality of possible immigration application materials includes accessing the immigration application knowledge base.

In various embodiments, the method includes generating an immigration risk assessment score for the first user by performing a risk assessment function based on the first set of responses. Automatically identifying the set of required immigration application materials for the first user is based on determining the immigration risk assessment score for the first user compares favorably to a risk assessment threshold. In various embodiments, automatically identifying the set of required immigration application materials for the first user is based on receiving data identifying the first user from immigration eligibility risk assessment system 102. For example, sets of required immigration application materials ate not identified for other users with immigration risk assessment scores that compare unfavorably to the risk assessment threshold.

In various embodiments, the method includes: automatically identifying a set of recommended immigration application materials for the first user as a proper subset of the plurality of possible immigration application materials based on the first set of responses, where the set of required immigration application materials and the set of recommended immigration application materials are mutually exclusive. The method can further include sending recommended application material prompt data indicating the set of recommended immigration application materials to the first client device for display to the first user via the interactive user interface.

In various embodiments, a proper subset of the set of recommended immigration application materials are completed based on user input to the first client device in response to the recommended application material prompt data, and the immigration application further includes the proper subset of the set of recommended immigration application materials. In various embodiments, all of the set of recommended immigration application materials are completed based on user input to the first client device in response to the recommended application material prompt data, and the immigration application further includes the full set of recommended immigration application materials. In various embodiments, none the set of recommended immigration application materials are completed, and the immigration application further includes none of the set of recommended immigration application materials.

FIG. 9K illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 9K and/or to perform some or all of the functionality discussed in conjunction with FIGS. 9A-9I.

Some or all of the executable instructions can be included in application data 315 that is generated by, is received from, and/or otherwise corresponds to the immigration assistance system 100. For example, execution of the application data 315 can cause the client device to implement functionality of the immigration application requirement identification system 104 as illustrated in FIG. 9G and/or FIG. 9H.

Some or all steps of FIG. 9K can be performed based on communicating with one or more subsystems 101 of immigration assistance system 100. Some or all steps of FIG. 9K can be performed in a same or similar fashion as some or all steps of FIG. 9J. Some or all steps of FIG. 9K can be performed in conjunction with one or more of the various embodiments discussed in conjunction with FIG. 9J.

Step 981 includes presenting first question data indicating a first set of immigration application questions to a first user via an interactive user interface displayed via a display device of the client device. Step 983 includes generating first response data indicating a first set of responses to the first set of immigration application questions based on user input to the first client device in response to the first question data. Step 985 includes automatically identifying a set of required immigration application materials for the first user as a proper subset of a plurality of possible immigration application materials based on the first set of responses. Step 987 includes presenting required application material prompt data indicating the set of required immigration application materials via the interactive user interface.

FIGS. 9L-9AM present example embodiments of a display by interactive user interface 375 that presents question data 633 and response selection parameter data 634 of example questions of application requirement question data 910. Some or all question data 633 and response selection parameter data 634 of FIGS. 9L-9AN can alternatively be utilized to implement any other prompts discussed herein, such as: questions of risk factor question data 810; questions of application letter prompt data 1415; any other questions of any response processing function entry 607 and/or information processing function entry 609; any prompts utilized to collect any other response data 582 discussed herein discussed herein; and/or any prompts presented to the user in conjunction with one or more other subsystems 101.

While not illustrated in FIGS. 9L-9AM, the interactive user interface 375 can optionally display progress data 843 indicating progress of the user in completing a corresponding set of immigration application questions. The display progress data 843 can optionally be displayed in conjunction with all questions to indicate an ordering of the questions, a number of questions or sections already completed, and/or a number of questions or sections that have yet to be completed. The full set of questions presented to the user can optionally be presented one at a time in an ordering denoted by the display progress data 843.

As discussed previously, some or all question data 633 of FIGS. 9L-9AM can be displayed in conjunction with a response guide prompt 847. When the user clicks on or otherwise indicates a selection to response guide prompt 847, the interactive user interface 375 can display response guide data 849 for the corresponding question indicating instructions, clarifications, or additional information, corresponding to the question. A response guide exit prompt 851 can be clicked on or otherwise selected to hide the response guide data 849, for example, when the user has completed reading the information or otherwise no longer needs this information.

FIG. 9AM presents an example embodiment of one or more displays by interactive user interface 375 that present required material set 521. Names identifying each of the types of application materials in the required material set 521 can be presented to the user as required documents and/or forms for the user's immigration application. Names identifying other types of application materials not included in the required material set 521 are optionally not presented to the user as required documents and/or forms.

FIGS. 9AO and 9AP presents example embodiments of one or more displays by interactive user interface 375 that present recommended material set 522. Names identifying each of the types of application materials in the recommended material set 522 can be presented to the user as recommended documents and/or forms for the user's immigration application. Names identifying other types of application materials not included in the recommended material set 522 are optionally not presented to the user as required documents and/or forms, and/or are neither recommended nor required for the user.

FIGS. 10A-10F present embodiments of an immigration application materials guided completion system 106. The immigration application materials guided completion system 106 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to guided and/or automated completion of some or all of set of immigration application materials for a user's immigration via implementing immigration application materials guided completion system 106. In particular, each of a set of immigration application materials can be completed individually based on responses and/or documents received from the user, and/or based on other information determined for the user. One or more immigration application materials can be automatically populated, generated, checked for adherence to requirements, and/or verified as being issued by an official entity in conjunction with completion of these immigration application materials.

In some embodiments, only the required and/or recommended set of immigration materials previously identified by the immigration application requirement identification system 104 are presented to the applicant with corresponding instructions and/or guidance for completion of a corresponding immigration application. In some embodiments, the set of immigration application materials completed for a user via immigration application materials guided completion system 106 are automatically submitted for the user via immigration application materials submission system 108. In some embodiments, only users with favorable risk assessment scores 541 previously generated via immigration eligibility risk assessment system 102 have immigration application materials completed by immigration application materials guided completion system 106.

Some or all of this functionality of the immigration application materials guided completion system 106 improves the technology of computer-based immigration systems based on improving the efficiency of generating immigration applications for users, for example, based on automatic generation of one or more materials and/or based on step-by-step guidance and instructions for completion of one or more materials. Some or all of this functionality of the immigration application materials guided completion system 106 improves the technology of computer-based immigration systems based on improving the efficiency of processing immigration applications, for example, based on being generated correctly via guidance and/or automatically being generated and/or based on being verified and/or checked for adherence to requirements.

As illustrated in FIG. 10A, the immigration application materials guided completion system 106 can send a plurality of application material prompt data sets 1010.1-1010.N to a plurality of client devices 130.1-130.N. For example, an application material prompt data set 1010 is implemented as some or all of the input prompt instruction data 628 and/or document input instruction data 629 of one or more application material completion function entries 706 utilized to procure the corresponding set of responses and/or documents as discussed in conjunction with FIG. 7D, FIG. 7E, FIG. 7G, FIG. 6F, and/or FIG. 6G. As another example, application material prompt data set 1010 is indicated in application data 318 sent to the client device 130 for execution. As another example, the application material prompt data set 1010 is sent to a corresponding client device based on receiving a request from the client device to create and/or complete an immigration application and/or to receive immigration assistance. Application material prompt data of each application material prompt data set 1010 can be presented to the corresponding user via interactive user interface 375, for example, as one or more individual questions, document upload prompts, or other prompts. Example application material prompt data 1010 presented via interactive user interface 375 is illustrated in FIGS. 10G-10O.

The immigration application materials guided completion system 106 can receive a plurality of application material data sets 1012.1-1012.N. Each application material data sets 1012 can be generated by the corresponding client device 130 based on user input to the client device 130 indicating responses to questions indicated in the application material prompt data set 1010 and/or documents uploaded in response to document upload prompts indicated in the application material prompt data set 1010. An application material data set 1012 can be implemented as the application material data set 1012 of user account 165, and can be stored in user account 165 for the corresponding user by immigration application materials guided completion system 106 based on being received from the corresponding client device 130.

The immigration application materials guided completion system 106 can implement an application completion module 1020, for example, via subsystem processing module 420 and/or subsystem memory module 410. The application completion module 1020 can generate each of a plurality of application material sets 530.1-530.N from a corresponding one of the plurality of application material data sets 1012.1-1012.N. The plurality of application material sets 530.1-530.N can be sent to corresponding client devices 130 for display via interactive user interface 375. The plurality of application material sets 530.1-530.N can alternatively or additionally be sent to a government server system 140, for example, in conjunction with facilitating submission of corresponding immigration applications 1-N and/or by implementing the immigration application materials submission system 108. Each application material sets 530 can alternatively or additionally be stored in user account 165 for a corresponding user.

As used herein, "facilitating submission" of an application material can include at least one of: implementing the immigration application materials submission system 108 to automatically submit the application material 531 as discussed in conjunction with FIGS. 11A-11G; sending the application material to the government server system 140 in conjunction with automatic submission of an immigration application for the user, printing of the application material on paper as a printed copy of the application material at a facility associated with the immigration assistance system 100 for mailing to, delivery to, and/or shipping to the government server system 140 by an employee of the immigration assistance system 100. sending the application material 531 to the client device of a corresponding user, where the corresponding user submits the immigration application via interaction with client device 130 to cause the client device 130 to send the completed application material 531 to the government server system 140 in conjunction with automatic submission of an immigration application for the user; sending the application material 531 to the client device of a corresponding user, where the corresponding user prints the immigration application on paper as a printed copy of the application material via a printer, and where the user further mails, delivers, and/or ships this printed copy of the application material 531 to the government server system 140 in conjunction with submission of an immigration application for the user; sending the application material 531 to the client device of a corresponding user as a draft application material for display via interactive user interface 375, where the corresponding user approves and/or supplies edits to the draft application material via interaction with interactive user interface 375 to cause the client device to generate a final application material, where the client device 130 to sends the final application material 531 to the immigration assistance system 100 for automatic submission of the final application material 531 via the immigration assistance system 100 sending the final application material 531 to the government server system 140; and/or other means of facilitating submission of the immigration application material.

FIG. 10B illustrates an embodiment of an immigration application materials guided completion system 106 that selects and/or generates the application material prompt data set 1010 for each given user based on an identified application material set 1021. The identified application material set 1021 can be predetermined for a type of immigration status and/or corresponding country, and/or can be different for different users, for example, based on implementing the immigration application requirement identification system 104 to generate the identified application material set 1021 for each user. The identified application material set 1021 can indicate a set of application material identifiers 1-X for completion. For example, the identified material set 1021 is implemented as the required material set 521 and/or the recommended material set 522.

The application material prompt data set 1010 can indicate a plurality of application material prompt data 1013.1-1013.X corresponding to the plurality of application material identifiers 535.1-535.X. Each of application material prompt data 1013 can be identified based on an application material completion module 1022, for example, based on accessing a corresponding one of a set of application material completion function entries 706.1-706.X. For example, some or all application material completion function entries can be implemented as discussed in conjunction with FIG. 7D, 7E and/or 7G. For example, each application material prompt data 1013 can be implemented as and/or based on some or all of input prompt instruction data 628 and/or document input instruction data 629 of the corresponding application material completion function entry 706 for the corresponding type of application material denoted by the corresponding application material identifier 535. The application material prompt data 1013.1 1013.X can be sent to and/or displayed by client device 130 one at a time, all at once, and/or based on user selection of which application material to work on from a set of presented options based on user input.

FIG. 10C illustrates an embodiment of an immigration application materials guided completion system 106 that receives application material data set 1012 for each given user as a set of application material data 1015.1-1015.X. For example, each application material data 1015 can include one or more responses and/or one or more documents sent by the client device 130 based on user input and/or document uploads in response to the corresponding application material prompt data 1013 for the corresponding type of application material denoted by the corresponding application material identifier 535. Some application material data 1015 can include only responses, other application material data 1015 can only include one or more documents, and/or other application material data 1015 can include both responses and one or more documents.

The application completion module 1020 can implement a plurality of application material completion modules 1022.1-1022.X to complete application materials 531.1-531.X of completed application material set 530 for the user, based on corresponding application material data 1015.1-1015.X of the application material data set 1012.1. For example, each application materials 531 is completed by a corresponding application material completion module 1022 based on performing an application completion function, for example, corresponding to an application material completion function entry 706 for the corresponding type of application material, by utilizing one or more document and/or response included in application material data 1015 as input. For example, each given application material data 1015 can include a type of data, such as responses, documents, or both, as denoted by the input data type 623 of the corresponding application material function entry 706.

FIG. 10D illustrates an embodiment of an immigration assistance system 100 that implements immigration application materials guided completion system 106 to generate a completed application material set 530, and further implements an immigration application materials submission system 108 to automatically submit the completed application material set 530 to a government server system 140. In other embodiments, the completed application material set 530 is sent to and/or displayed via client device 130, and the user can interact with client device 130 to submit some or all application materials of completed application material set 530 themselves via their client device 130 interfacing with the government server system 140 and/or based on user input supplied to their client device 130 to submit application materials of completed application material set 530 to the government server system 140.

FIGS. 10E-10F illustrate embodiments of client device 130 that locally implements some or all functionality of the immigration application materials guided completion system 106, for example, based on storing and/or executing corresponding subsystem application data 318. In such embodiments, the application completion module 1020 and can be implemented via client processing module 320 and/or client memory module 310. The application completion module 1020 of client device 130 can cause the client device to display application material prompt data 1013.1-1013.X. The client device 130 can generate application material data set 1012 based on accessing files in client memory module and/or user interaction with client input device 350. The application completion module 1020 of client device 130 can complete some or all application materials 531 of completed application material set 530. The client device 130 can transmit some or all application materials 531 of completed application material set 530 to the immigration assistance system 100 and/or the government server system 140 via network 150.

FIGS. 10G-10O present example embodiments of displays by interactive user interface 375 that presents various application material prompt data in conjunction with presenting some or all application material prompt data of application material prompt data set 1010 via one or more views. As illustrated in the examples of 10G-10O, the interactive user interface 375 can present various document upload prompts 636 corresponding to various immigration application materials and/or can present additional instructions and/or information. While not depicted in FIGS. 10G-10O, the interactive user interface 375 can present various questions or other prompts utilized to various response data 582 utilized to complete one or more application materials.

Figure 10G:
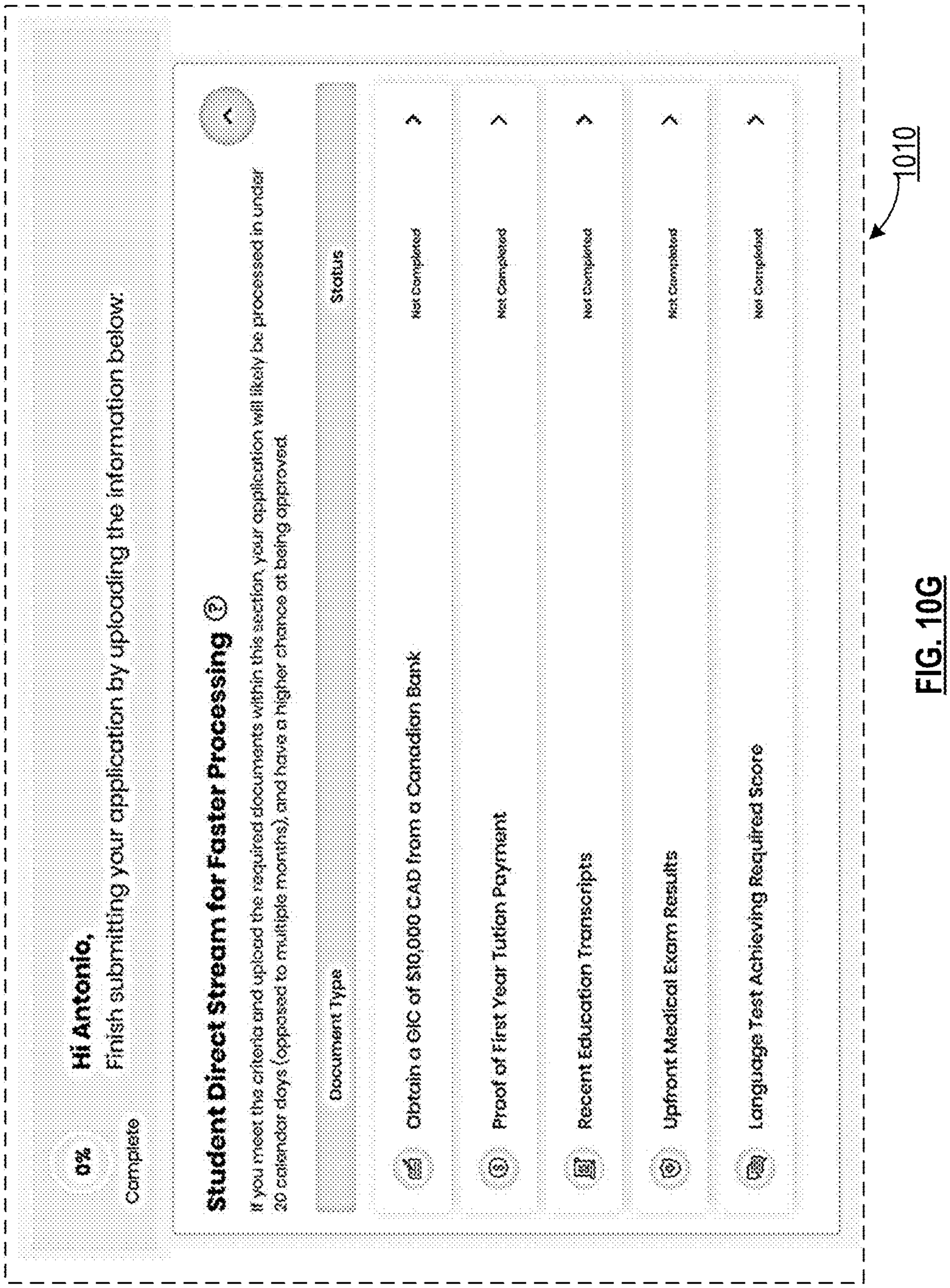
Figure 10H:
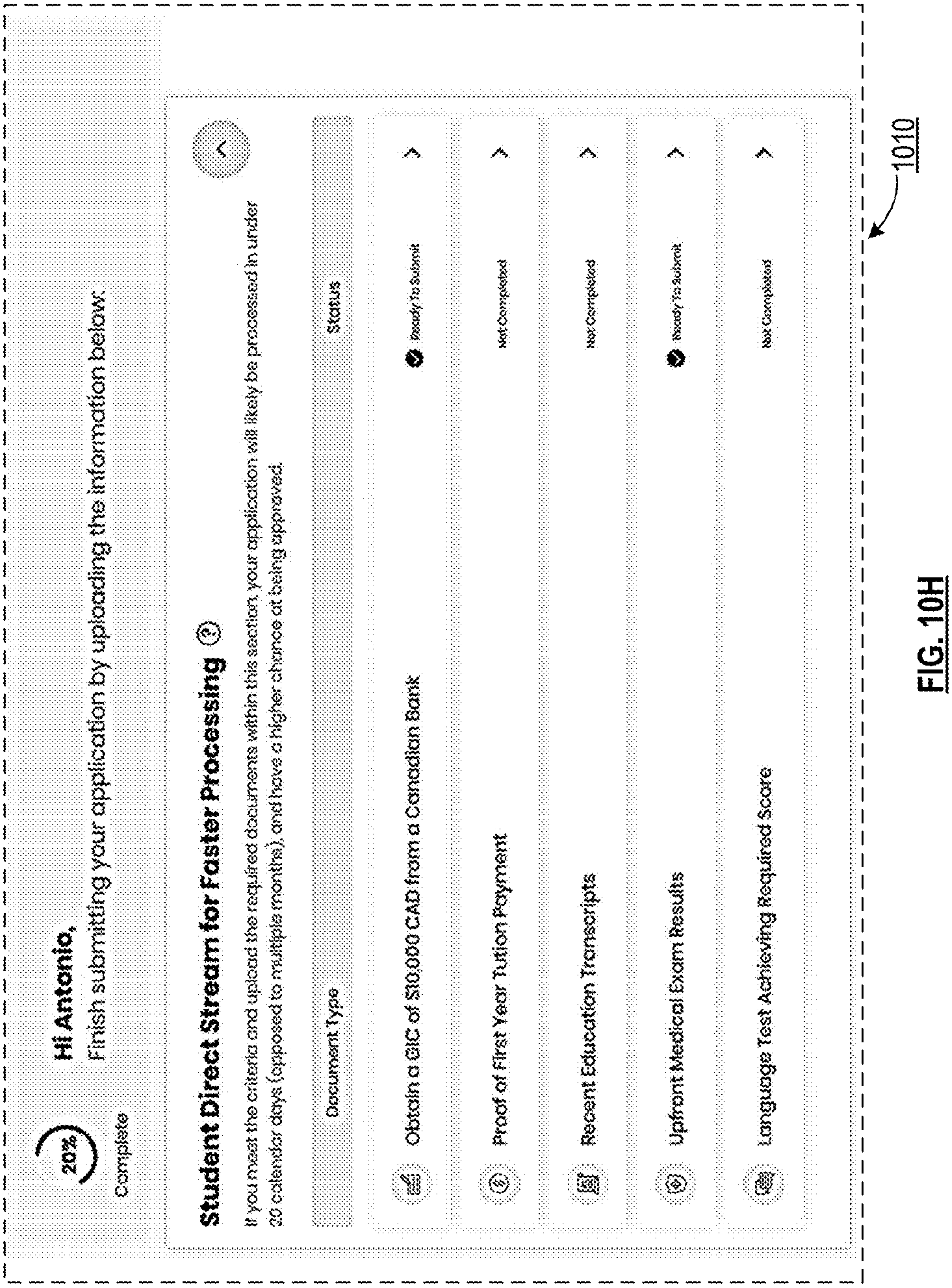

As illustrated in the examples of 10G-10O, different application materials for completion can be indicated as required documents and/or forms, or recommended documents and/or forms, for example, based on displaying required material set 521 and/or recommended material set 522. For example, as illustrated in FIGS. 10G and 10H, a dashboard view of some or all documents to be completed by the user are presented as a dashboard view, where application material prompt data set 1010 is presented to indicate a list of application materials and/or a list of categories that each include one or more application materials. For example some or all of the application material set 1021 are presented. application material prompt data of application material prompt data set 1010 can further indicate whether each of the set of documents have been completed and/or whether any user supplied data to complete the corresponding material has been submitted. In FIG. 10G, none of the listed application material categories have yet been completed and/or user supplied data for all of the listed application material categories is still required. In FIG. 10D, some of the listed application material categories have completed and/or user supplied data for some of the listed application material categories has been supplied by the user.

Figure 10I:
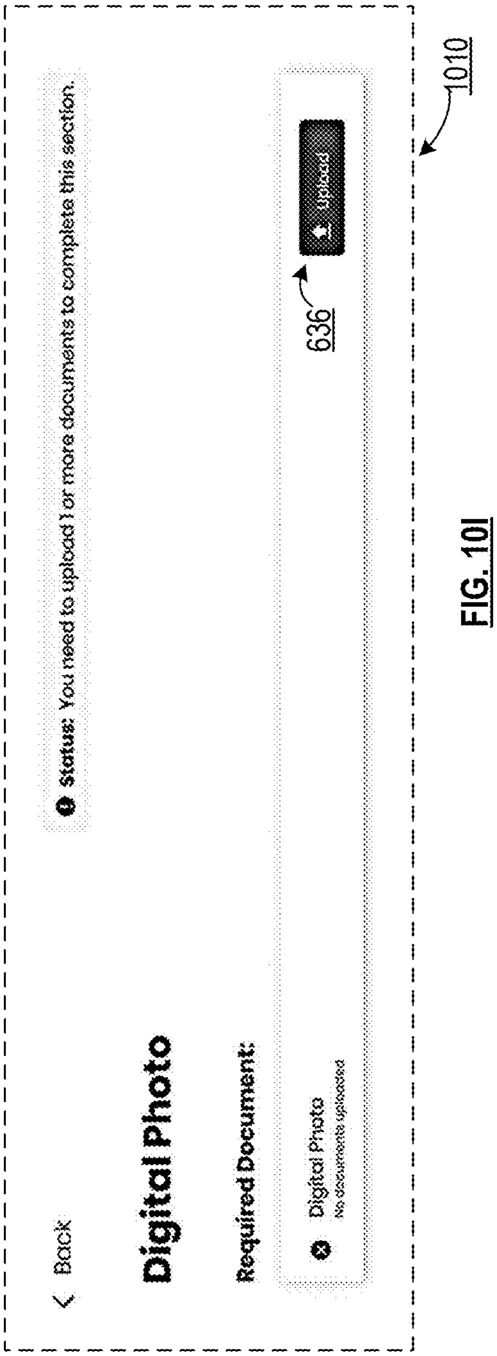

The user can further interact with the dashboard view of FIGS. 10G and 10H to select particular categories, where the applicant is guided to complete one or more individual application materials in the particular category based on the user clicking on and/or otherwise selecting the particular category via interaction with the dashboard view of FIGS. 10G and 10H. Such views of application material prompt data 1010 presented for particular application materials and/or particular categories are displayed in FIGS. 10I-10O. For example, the application material prompt data of application material prompt data set 1010 presented for the digital photo application material of FIG. 10I is presented to the user based on the user clicking on and/or otherwise selecting digital photo in the dashboard view of FIGS. 10G and 10H.

Figure 10J:
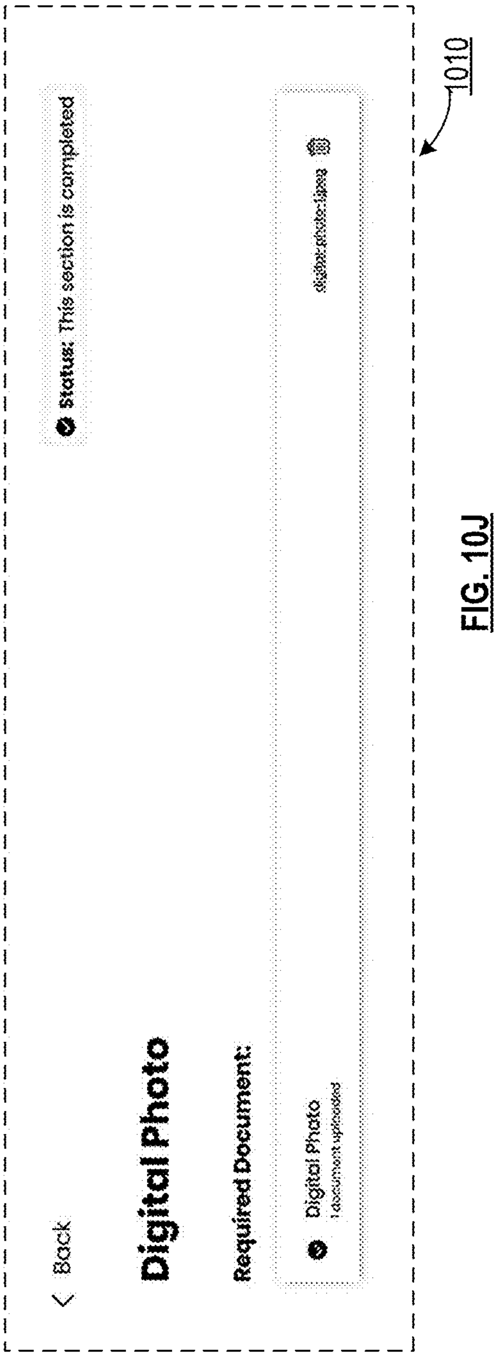
Figure 10K:
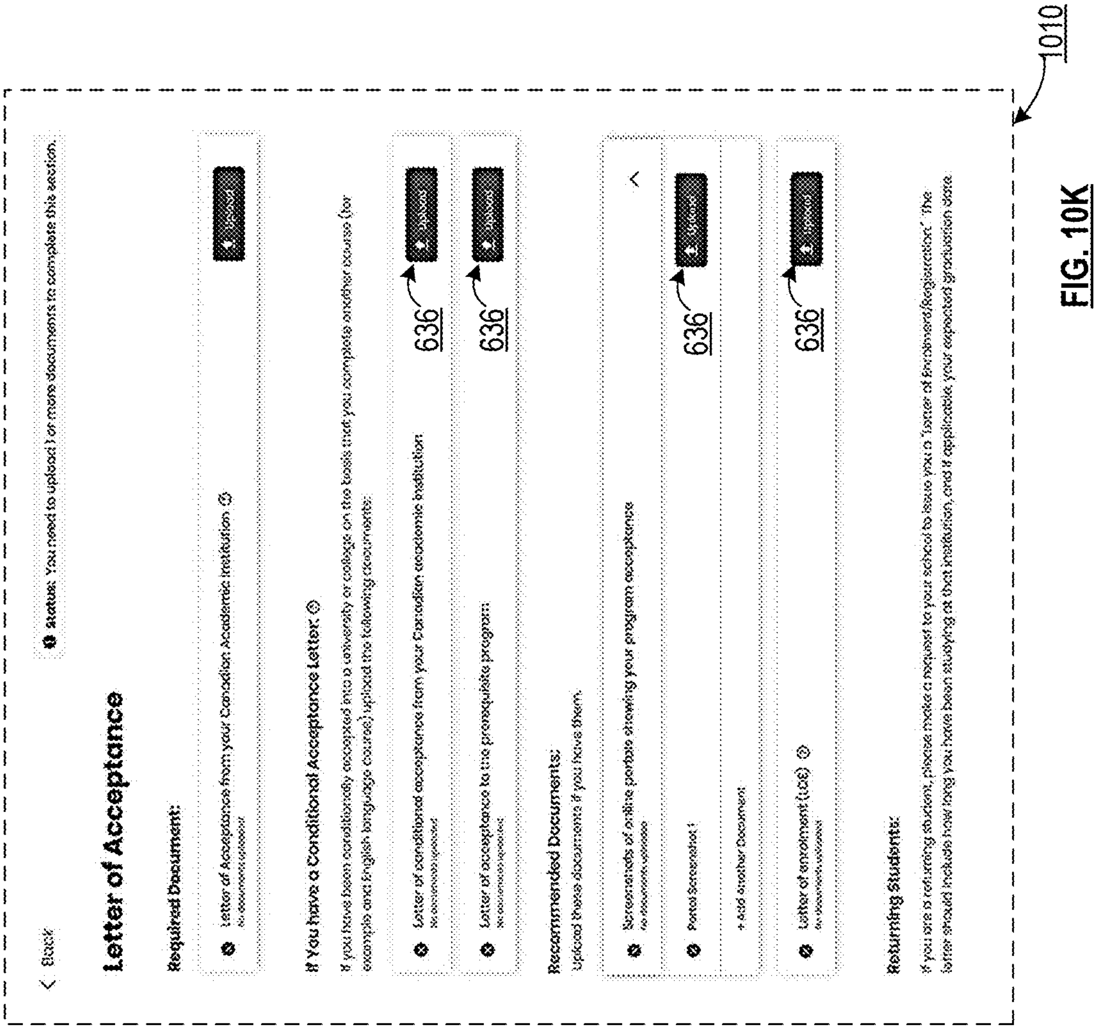
Figure 10L:
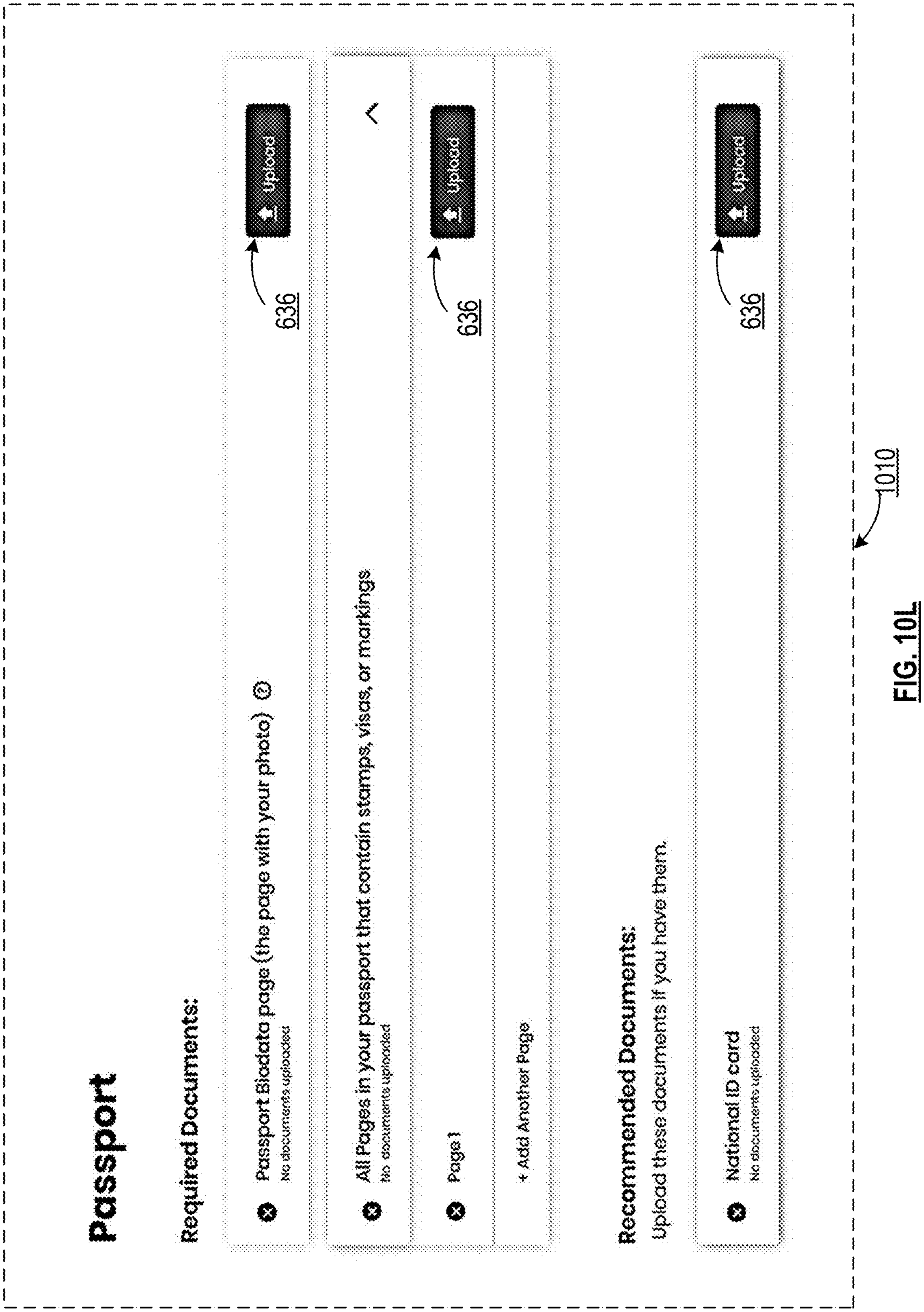
Figure 10M:
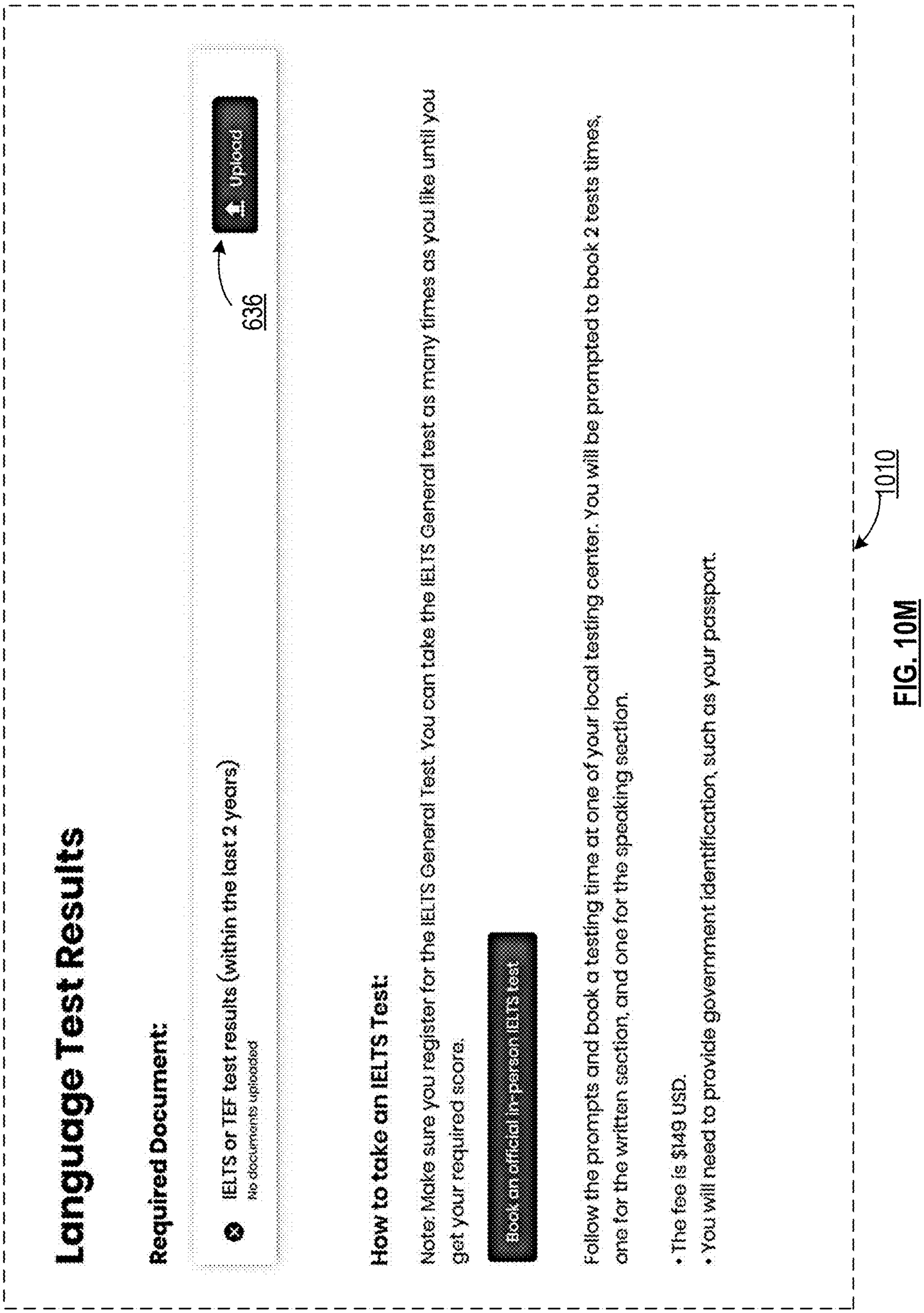
Figure 10N:
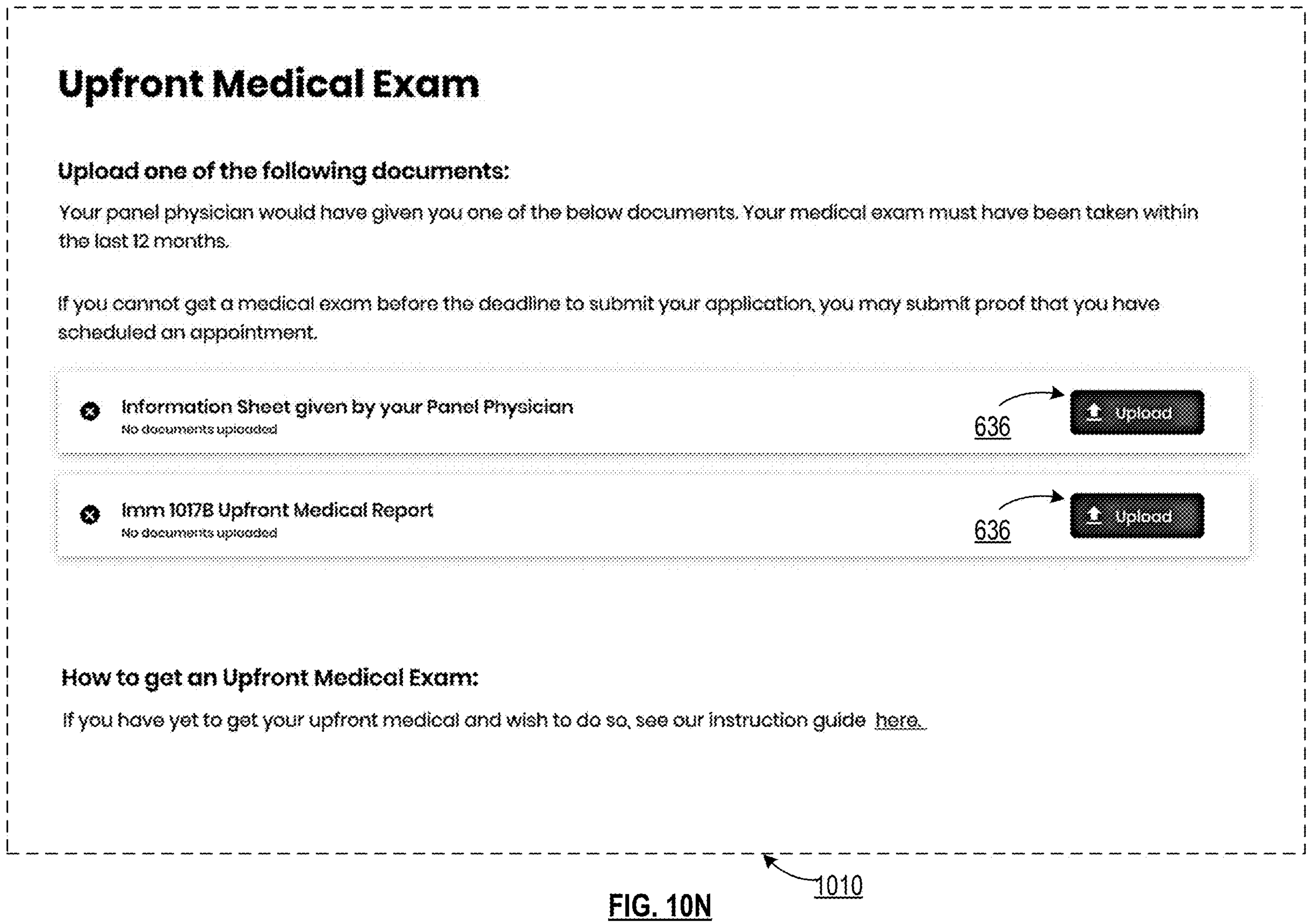
Figure 10O:
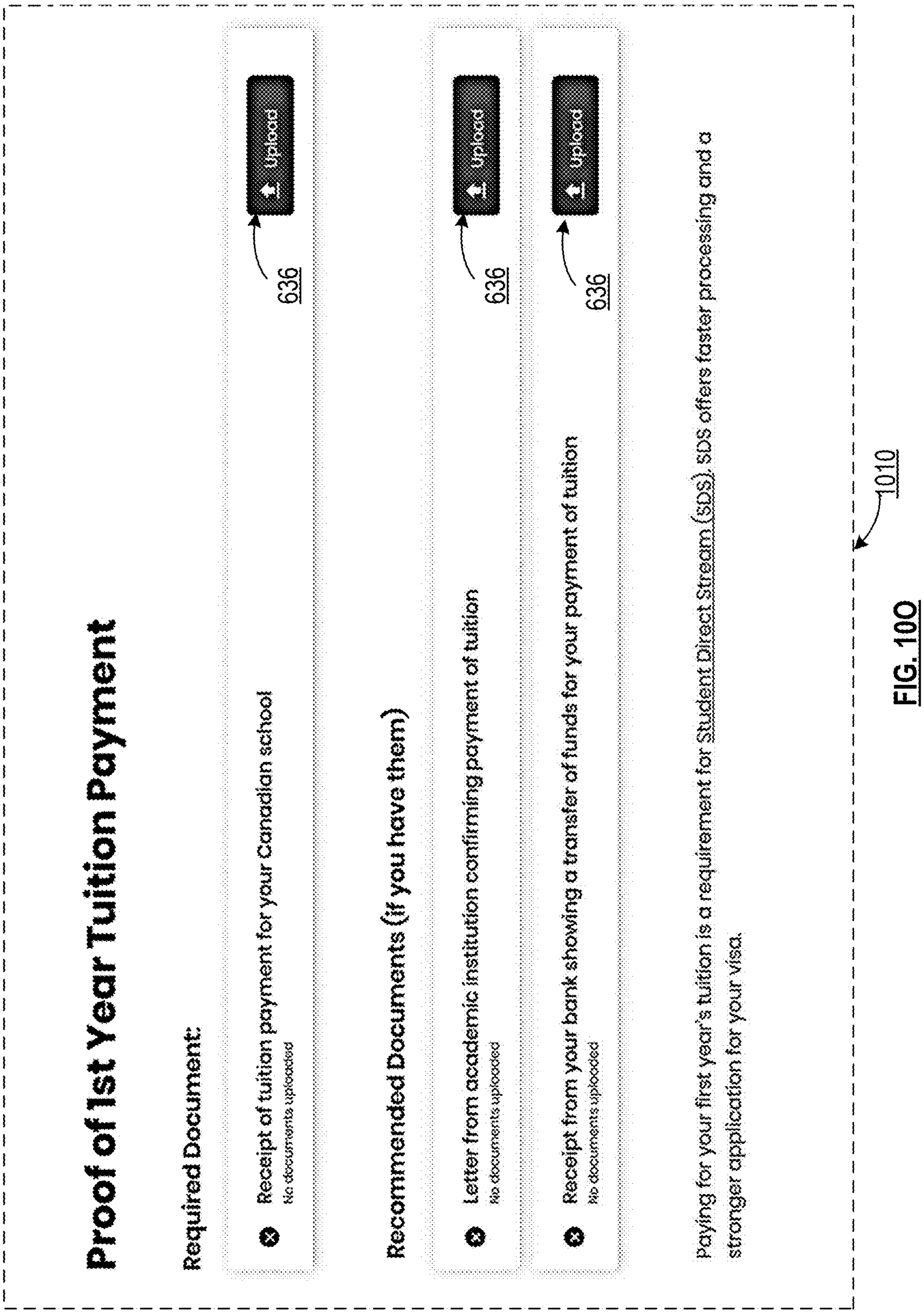

In interacting with application material prompt data of application material prompt data set 1010 for one or more particular application categories, for example, as illustrated in FIGS. 10I-10O, a user can be prompted to upload one or more files, such as files 319 stored in their file system, via corresponding document upload prompts 636. For example, the user selects a particular file 319 from their file system for upload. Once a file is selected and/or uploaded by the user, the user can view the file, delete the file, and/or choose to reupload the file based on selection of a different file 319 from their file system, for example, as illustrated in FIG. 10J. Once all files of a given category is selected and/or uploaded by the user, the dashboard view of FIGS. 10G and 10H can change from indicating the given category is incomplete to indicating the given category is complete.

Some categories and/or types of immigration application materials, such as letter of acceptance, passport, upfront medical exam, and/or proof of first year tuition payment, can have multiple prompts to upload multiple files. In some embodiments, multiple uploaded files can be automatically compiled into a same application material 531 via application completion module 1020. In some embodiments, one uploaded file can be automatically segregated into a multiple different application materials 531 via application completion module 1020.

FIGS. 11A-11E illustrate embodiments of an immigration application materials submission system 108. The immigration application materials submission system 108 can be implemented as a subsystem 101 of the immigration assistance system 100 and/or can be implemented by a client device 130, for example, based on execution of corresponding subsystem application data 318. For example, the immigration assistance system 100 is implemented as discussed in conjunction with FIG. 4A, 4B, and/or 4C to enable the immigration assistance system 100 to communicate with one or more government server systems 140.

Users seeking immigration status can interact with the immigration assistance system 100 to receive various form of assistance discussed herein. In some cases, one form of assistance can correspond to automated submission of some or all of the set of immigration application materials for a user's immigration via implementing the immigration application materials submission system 108. In particular, each of a set of completed immigration application materials received from and/or generated automatically for the user be submitted, in multiple individual transactions or in a single transaction, based on, and/or based on other information determined for the user.

In some embodiments, the set of application materials are obtained for submission by the based on being completed by the immigration application materials guided completion system 106. Alternatively, the user completes some or all immigration application materials independently and sends them to the immigration application materials submission system 108 for completion. In some embodiments, only users with favorable risk assessment scores 541 previously generated via immigration eligibility risk assessment system 102 have immigration application materials submitted by immigration application materials submission system 108.

Some or all of this functionality of the immigration application materials submission system 108 improves the technology of computer-based immigration systems based on improving the efficiency of submitting immigration applications for users, for example, based on automatic submission of one or more materials rather than necessitating that users perform this tedious task on their own. Some or all of this functionality of the immigration application material submission system 108 improves the technology of computer-based immigration systems based on improving the efficiency of processing immigration applications, for example, based on being submitted correctly.

FIG. 11A illustrates an immigration application materials submission system 108. The immigration application materials submission system 108 can send a set of completed application material sets 530.1-530.N to a government server system in accordance with automatically submitting immigration applications for a set of users 1-N. As illustrated in FIG. 11A, the immigration application materials submission system 108 implements a government server system interfacing module 1120 to send the immigration application materials submission system 108 to the government server system. For example, some or all of the government server system interfacing module 1120 is implemented via the subsystem network interface 430 and/or otherwise enables the immigration application materials submission system 108 to communicate bidirectionally with the government server system interfacing module 1120 via network 150 and/or via the Internet. The government server system interfacing module 1120 can optionally be implemented via one or more bots and/or other software applications that run automated tasks to submit application materials 531 to the government server system via interfacing with one or more webpages hosted by the government server system interfacing module 1120 over the Internet. For example, the government server system interfacing module 1120 can be further implemented to perform these automated tasks via subsystem processing module 420 and/or subsystem memory module 410.

The government server system can generate and send each of a set of submission confirmation data 1125.1-1125.N, for example, based on receiving the corresponding one of the set of completed application material sets 530.1-530.N and/or to confirm that the corresponding one of the set of completed application material sets 530.1-530.N was successfully submitted. Immigration application materials submission system 108 can receive the submission confirmation data 1125.1-1125.N from the government server system. The immigration application materials submission system 108 and can store each submission confirmation data 1125 in user account 165 in accordance with tracking the status of the immigration application, and/or can send each submission confirmation data 1125 to a corresponding client device 130 for display via display device 130 to notify the user that the immigration application was successfully submitted. Alternatively or in addition, the government server system 140 sends each submission confirmation data 1125 directly to the client device 130 of the corresponding user for display via display device 130 to notify the user that the immigration application was successfully submitted.

Some or all of the submission by immigration application materials submission system 108 can be performed without user intervention or guidance from a corresponding user. Some or all of the submission by immigration application materials submission system 108 can be performed with limited intervention and/or guidance from a corresponding user.

For example, a user creates and/or logs into an account with the government server system 140 via providing credentials for their account with the government server system 140 to the immigration application materials submission system. As another example, the immigration application materials submission system 108 presents a set of prompts to the user via interactive user interface 375, where responses received by the user populate one or more corresponding prompts and/or fields presented via a webpage hosted by the government server system 140.

As another example, the user confirms that one or more application materials 531 of the completed application material set 530, such as application materials generated by the immigration application materials guided completion system 106, are ready for submission. For example, the immigration assistance system 100 sends one more application materials 531 of the user's completed application material set 530 to the user for review, via display via interactive user interface 375. The user can confirm whether each application materials 531 is approved for submission. The user can optionally resubmit document files for and/or edit text of any application materials 531 as necessary. Once all application materials 531 are approved by the user, the corresponding completed application material set 530 can be sent to the government server system 140, for example, in response to receiving instructions from the client device 130 based on user input to interactive user interface 375 indicating the completed application material set 530 is approved by the user, finalized, and/or that the user requests the completed application material set 530 be submitted by the immigration application materials submission system 108.

In some embodiments, one or more application materials 531 of completed application material set 530 must be submitted physically, for example, based on being shipped to, mailed to, and/or delivered to a mailbox and/or building corresponding to the government entity via a mailing service, shipping service, and/or delivery service. The immigration application materials submission system 108 can facilitate preparation and/or printing of one or more electronically received and/or stored application materials 531 for shipping to the government entity. The immigration application materials submission system 108 can facilitate preparation and/or shipping of one or more physically received application materials 531, for example, that were received from the user based on the user mailing and/or shipping these application materials 531 to the immigration assistance system 100.

Alternatively or in addition, the immigration application materials submission system 108 sends instruction data to the client device for display and/or processing by the client device to enable to submit some or all application materials 531 itself via the client device 130 sending these materials directly to the government server system 140 for submission. For example, the client device 130 implements some or all functionality of the immigration application materials submission system 108, for example, based on storing and/or executing corresponding subsystem application data 318. In such embodiments, the government server system interfacing module 1120 can be implemented via client processing module 320, client memory module 310, and/or client network interface 330.

FIG. 11B illustrates an example embodiment where each user's credentials and/or other identifying information are utilized to submit completed application material sets 530 for each given user. The credentials and/or other identifying information can be implemented as government immigration account accessibility data 599. A given government immigration account accessibility data 599 can be generated by the immigration application materials submission system 108 for the corresponding user based on the immigration application materials submission system 108 automatically establishing an account for the corresponding user with the government server system 140 to submit the immigration application for the user. The government immigration account accessibility data 599 can be received from a client device 130 corresponding to the user based on user input to interactive user interface 375 indicating their credentials and/or identifying information with the government server system 140. The government immigration account accessibility data 599 can be stored in and/or accessed from user account 165.

For example, to submit the completed application materials set 530 for a given user, the immigration application materials submission system 108 sends and/or otherwise utilizes the government immigration account accessibility data 599 of the given user to login to the user's account with the government server system 140 and/or to otherwise identify the user and/or contact information of the user in conjunction with the completed application materials set 530 to ensure the corresponding application materials 531 are each mapped to the given user by the government server system 140.

FIG. 11C illustrates an embodiment of an immigration application materials submission system 108 that is implemented to submit different completed application material sets 530 to different corresponding government server systems 140.1-140.G, based on different ones of the plurality of users 1-N applying to implement to different respective countries 1-G, for example, based on the immigration assistance system 100 being implemented as discussed in conjunction with FIG. 4B. In this example, a first subset of the plurality of completed sets of application materials that includes at least application materials 530.1 and 530.2 are sent to the government server system 140.1 of country 1, while a second subset of the plurality of completed sets of application materials that includes at least application materials 530.N−1 and 530.N are sent to the government server system 140.G of country G.

FIG. 11D illustrates an embodiment of an immigration application materials submission system 108 with a government server system interfacing module 1120 that implements a plurality of material submission modules 1121.1-1121.X. Each material submission module 1121 can utilize corresponding government server system interfacing data 1115 of a set of government server system interfacing data 1115.1-1115.X to submit application materials 531 of a corresponding application material type to the government server system.

For example, the government server system interfacing data 1115.1-1115.X indicates: corresponding web addresses of one or more webpages hosted by government server system 140 corresponding to each type of application material; an ordering in which the set of application materials are submitted; a mapping of form fields and/or prompt upload identifiers of a given webpage for corresponding ones of the set of application materials; a mapping of form fields presented via one or more webpages to corresponding field data 534.1-534.H of given form data 533 of a given type of application material 531 to indicate where each field data 534 for the form be submitted; a mapping of prompt upload identifiers presented via one or more webpages to one or more document files 532 of a given type of application material 531; and/or other information enabling the corresponding material submission modules 1121 to interface with the government server system 140 and/or to submit the corresponding type of application material 531 correctly, to the appropriate location, and/or via appropriate instructions.

While not illustrated in FIG. 11D, the government server system interfacing module 1120 can optionally implements a set of W material submission modules 1121.1-1121.W via a set of W government server system interfacing data 1115.1-1115.W corresponding to a set of possible types of application materials 1-W that can be submitted to the government server system 140. For example, as illustrated in FIG. 11D given user may only have a proper subset of the full set of possible types of application materials, where this proper subset only includes X materials, and where only X corresponding material submission modules 1121 are implemented to submit the application material for the given user. Different given users can have completed application material sets 530 with different subsets of different numbers and/or types of application materials as discussed previously, where different corresponding subsets of material submission modules 1121 and different corresponding government server system interfacing data 1115 are thus utilized to facilitate submission of completed application material sets 530 for different users.

FIG. 11E illustrates an embodiment of an immigration application materials submission system 108 that receives application acceptance data 1145.1-1145.N from the government server system 140. For example, the completed application material set 530 of immigration applications for the users 1-N are processed to ultimately render either granting or rejection of the immigration application, corresponding application acceptance data 1145 can be generated by the government server system 140 and can be sent to the immigration application materials submission system 108, for example, based on the immigration application materials submission system 108 having submitted the corresponding completed application material set 530 and/or based on the immigration application materials submission system 108 indicating it be sent the application acceptance data 1145 in instructions sent to the government server system 140 in conjunction with the completed application material set 530.

The application acceptance data 1145 for each user can be stored in a corresponding user account 165, for example, in conjunction with tracking the status of the immigration application for the user, where a corresponding status is changed from pending to granted, or from pending to rejected, based on whether the immigration application was granted or rejected. The application acceptance data 1145 can be sent by the immigration application materials submission system 108 to the client device 130 once it is received, for example, to notify the user of whether their immigration application was granted or rejected.

Alternatively or in addition, the application acceptance data 1145 is sent by the government server system 140 to a client device 130 for a corresponding user directly, for example, based on contact information for the user being indicated in the completed application material set 530 submitted for the user.

Users can interact with their user accounts 165 after their application has been submitted to view the application status 503 of the application, as this status is tracked by immigration assistance system 100 based on confirming the application was submitted via receipt of submission confirmation data 1125, and/or based on ultimately receiving application acceptance data 1145. For example, a user can login to their user account at any time to view the application status 503 of their immigration application, where the application status 503 can be identified as "pending" based on the submission confirmation data 1125 being received for the user but the application acceptance data 1145 not yet being received; as "granted" based on receipt of application acceptance data 1145 indicating the immigration application was granted; and/or as "refused" based on receipt of application acceptance data 1145 indicating the immigration application was refused, rejected, or otherwise not granted. When submission confirmation data 1125 and/or application acceptance data 1145 is received by immigration assistance system 100, it can be automatically sent to client device 130 as a notification to notify the user of the corresponding change in status 503 as soon as possible.

In some cases, the application status 503 of the application can indicate one or more action items by the user while the immigration application is pending. For example, the user can be notified, via interactive user interface 375, of needing to take one or more medical exams and/or have their fingerprints or biometrics collected after their immigration application is submitted.

In such cases, some application materials 531, such as medical exam results, fingerprints, and/or biometrics can correspond to delayed application materials 531 that can be submitted after the immigration application with all other application materials are submitted. In some cases, these delayed application materials 531 can have a corresponding time window, where the immigration application is dropped and/or rejected if these application materials 531 are not received within the corresponding time window. The immigration application materials guided completion system 106 can facilitate completion of delayed application materials 531 after the immigration application is submitted via instructions and/or notifications presented to the user regarding obtaining these application materials 531 and/or associated deadlines for submission of these application materials 531, for example, in a same or similar fashion as discussed in conjunction with completion of other application materials 531 by the immigration application materials guided completion system 106.

Once the corresponding delayed application materials 531 are completed based on being received and/or generated by the immigration application materials guided completion system 106, the immigration application materials submission system 108 can automatically submit these application materials for the user by sending these delayed application materials 531 to government server system 140, for example, in a same or similar fashion as discussed in conjunction with submission of other application materials 531 by the immigration application materials submission system 108. Alternatively, the user can be instructed to submit these delayed application materials 531 via the client device 130 sending these delayed application materials 531 to the government server system 140.

In some cases, the application status 503 of the application can indicate one or more optional and/or required action items by the user while the immigration application is pending and/or after the application has been accepted. For example, the user can be notified, via interactive user interface 375, of services to be set up prior to the application being granted, for example, as discussed in conjunction with FIGS. 16A-16P. The user can be notified of other information regarding next steps, how to cross the border into the country, and/or information for living, working, and/or studying in the country after arrival in the country, for example, as illustrated in the example interactive user interface of FIG. 11K.

In various embodiments, an immigration assistance system includes at least one processor, and at least one memory that stores executable instructions. The executable instructions, when executed by the at least one processor, can cause the immigration assistance system to: send application material prompt data indicating a set of immigration application materials to a first client device for display to a first user via an interactive user interface; receive a set of application material data from the first client device, where the set of application material data is generated by the first client device based on user input to the first client device in response to the application material prompt data; obtain a set of completed immigration application materials based on the set of application material data; automatically submit an immigration application for the first user by sending the set of immigration application materials to a government server system; send application submission confirmation data to the first client device for display to the first user via the interactive user interface based on submitting the immigration application; receive application acceptance data from the government server system; and/or send an application acceptance notification to the first client device for display to the first user via the interactive user interface based on receiving the application acceptance data.

In various embodiments, a client device includes at least one processor, and at least one memory that stores executable instructions. The executable instructions, when executed by the at least one processor, can cause the client device to: present application material prompt data indicating a set of immigration application materials via an interactive user interface displayed via a display device of the client device; generate a set of application material data based on user input to the client device in response to the application material prompt data; send the set of application material data to an immigration assistance system; receive application submission confirmation data from the immigration assistance system based on submission of an immigration application that includes the set of application material data; display the application submission confirmation data via the interactive user interface; receive an application acceptance notification from the immigration assistance system; and/or display the application acceptance notification via the interactive user interface.

FIG. 11F illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 11F and/or to perform some or all of the functionality discussed in conjunction with FIGS. 10A-11E.

Some or all steps of FIG. 11F can be performed by implementing an immigration application materials guided completion system 106 and/or an immigration application materials submission system 108. For example, at least one subsystem memory module of the immigration application materials guided completion system 106 stores executable instructions that, when executed by at least one subsystem processing module of the immigration application materials guided completion system 106, cause the immigration application materials guided completion system 106 to execute some or all steps of FIG. 11F and/or to perform some or all of the functionality discussed in conjunction with FIGS. 10A-11E. Alternatively or in addition, at least one subsystem memory module of the immigration application materials submission system 108 can store executable instructions that, when executed by at least one subsystem processing module of the immigration application materials submission system 108, cause the immigration application materials submission system 108 to execute some or all steps of FIG. 11F and/or to perform some or all of the functionality discussed in conjunction with FIGS. 10A-11E.

Some or all steps of FIG. 11F can be performed by implementing and/or communicating with one or more other subsystems 101. Some or all steps of FIG. 11F can be performed by accessing user account database 162, utilizing some or all data of one or more user accounts 165, and/or generating some or all data of one or more user accounts 165. Some or all steps of FIG. 11F can be performed by accessing function library 172 and/or by performing one or more functions of function library 172. Some or all steps of FIG. 11F can be performed based on communicating with one or more client devices 130.

Step 1182 includes sending application material prompt data indicating a set of immigration application materials to a first client device for display to a first user via an interactive user interface. The set of immigration application materials can optionally include a set of required immigration application materials and/or a set of recommended immigration application materials. The set of immigration application materials can include all of the plurality of possible immigration application materials and/or can include a proper subset of the plurality of possible immigration application materials.

In various embodiments, the application material prompt data is sent in application data that is stored by and/or executed by the first client device. As another example, the application material prompt data is sent based on receiving a request from the first client device and/or based on determining to send the first question data to the first client device. The application material prompt data can include one or more prompts for each of the set of immigration application materials. The one or more prompts for each application material can be displayed via the interactive user interface one at a time, in multiple, sequential views, and/or or all at once in a single view.

Step 1184 includes receiving a set of application material data from the first client device. For example, the set of application material data is generated by the first client device based on user input to the first client device in response to the required application material prompt data. The set of application material data can be received in multiple, separate transmissions, for example, as each application material data the set of application material data are separately generated and transmitted by the first client device. The set of application material data can alternatively be received together in a same transmission, for example, after all of the set of application material data are generated by the first client device.

Step 1186 includes obtaining a set of completed immigration application materials based on the set of application material data. Step 1188 includes automatically submitting the immigration application by sending the set of immigration application materials to a government server system. Step 1190 includes sending application submission confirmation data to the first client device for display to the first user via the interactive user interface based on submitting the immigration application and/or based on receiving submission confirmation data from the government server system in response to sending the set of required immigration application materials to the government server system.

Step 1192 includes receiving application acceptance data from the government server system. Step 1194 includes sending an application acceptance notification to the first client device for display to the first user via the interactive user interface based on receiving the application acceptance data.

In various embodiments, the set of immigration application materials includes only the set of required immigration application materials and/or the set of required immigration application materials identified via the immigration application requirement identification system 104. In various embodiments, the method includes receiving data identifying the set of required immigration application materials from the immigration application requirement identification system 104. In various embodiments, the method includes automatically identifying the set of required immigration application materials as a proper subset of the plurality of possible immigration application materials, for example, based on implementing the immigration application requirement identification system 104.

In various embodiments, obtaining of the set of immigration application materials includes receiving a first one of the set of immigration application materials in the application material prompt data from the first client device, where the first client device generated the first one of the set of immigration application materials based on the user input to the first client device in response to a plurality of questions presented in the application material prompt data.

In various embodiments, obtaining of the set of immigration application materials includes receiving a second one of the set of immigration application materials in the application material prompt data as document upload data from the first client device that includes a document file that includes the second one of the set of immigration application materials, where the first client device generated the document upload data based on the user input to the first client device in response to a prompt to upload the second one of the set of immigration application materials presented in the application material prompt data.

In various embodiments, obtaining of the set of immigration application materials includes receiving a third one of the set of immigration application materials in the application material prompt data as image upload data from the first client device that includes image data capturing the third one of the set of immigration application materials, where the first client device generated the image upload data based on the user input to the first client device in response to a prompt to upload an image of the third one of the set of immigration application materials presented in the application material prompt data.

In various embodiments, obtaining of the set of immigration application materials includes generating a fourth one of the set of immigration application materials by populating a plurality of fields of the fourth one of the set of immigration application materials based on a set of application field responses received from the first client device in the application material prompt data, where the first client device generated the set of application field responses based on the user input to the first client device in response to a plurality of questions presented in the application material prompt data.

In various embodiments, obtaining of the set of immigration application materials includes generating a fifth one of the set of required immigration application materials by populating a plurality of fields of the fifth one of the set of required immigration application materials based on one of: least one response or at least one document file accessed in response log data of a user account associated with the first user, where the response log data includes a plurality of response data received from the first client device in response to one or more previously presented prompts via the interactive user interface.

In various embodiments, obtaining of the set of immigration application materials includes performing at least one application material completion function. In various embodiments, the application material submission function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more application material completion function entries 706, of function library 172; and/or otherwise determined by immigration assistance system.

In various embodiments obtaining of the set of immigration application materials includes sending data to, receiving data from, and/or implementing functionality of: the immigration information extraction system 110; the immigration digital photograph processing system 112; the immigration application letter generator system 114; and/or the immigration document verification system 116.

In various embodiments, automatically submitting the immigration application includes creating an immigration application account for the first user via access to an immigration application account creation webpage hosted by the government server system.

In various embodiments, automatically submitting the immigration application includes performing at least one application material submission function. In various embodiments, the application material submission function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more application material submission function entries 707, of function library 172; and/or otherwise determined by immigration assistance system.

In various embodiments, one of the set of completed immigration application materials corresponds to a document file received from the first client device. Automatically submitting the immigration application can include automatically uploading the document file to the government server system via access to a document file upload webpage hosted by the government server system.

In various embodiments, one of the set of completed immigration application materials corresponds to a plurality of form field data. Automatically submitting the immigration application can include automatically sending the plurality of form field data to the government server system via access to an immigration form webpage hosted by the government server system. In various embodiments, automatically sending the plurality of form field data to the government server system includes automatically populating a plurality of form fields presented by the immigration form webpage with the plurality of form field data.

In various embodiments, the application submission confirmation data indicates an immigration status associated with the immigration application is pending. In various embodiments, the application acceptance data indicates one of: granting of an immigration status associated with the immigration application, or refusing of the immigration status. In various embodiments, the application acceptance notification indicates granting of an immigration status associated with the immigration application based on the application acceptance data indicating granting of the immigration status. In various embodiments, the application acceptance notification indicates refusing of an immigration status associated with the immigration application based on the application acceptance data indicating refusing of the immigration status.

In various embodiments, the method includes sending, prior to receiving the application acceptance data, next step instruction data to the first client device for display to the first user via the interactive user interface based on submitting the immigration application device. In various embodiments, the method includes sending next step instruction data to the first client device for display to the first user via the interactive user interface based on the application acceptance data.

In various embodiments, the next step instruction data includes a plurality of prompts for display via the interactive user interface. For example, the plurality of prompts next step instruction data can correspond to prompts sent by and/or utilized to collect data for or more of: the immigration applicant service setup system 118; the immigration assistance communication system 120; and/or the immigration status update system 122.

In various embodiments, the method includes sending, prior to receiving the application acceptance data the application submission confirmation data to the immigration applicant service setup system 118; the immigration assistance communication system 120; and/or the immigration status update system 122. For example, the immigration applicant service setup system 118; the immigration assistance communication system 120; and/or the immigration status update system 122 send their corresponding prompts to the first client device for display and/or collect their corresponding responses from the first client device based on the application submission confirmation data indicating the immigration application for the first user was submitted.

In various embodiments, the method includes sending the application acceptance data to the to the immigration applicant service setup system 118; the immigration assistance communication system 120; and/or the immigration status update system 122. For example, the immigration applicant service setup system 118; the immigration assistance communication system 120; and/or the immigration status update system 122 send their corresponding prompts to the first client device for display and/or collect their corresponding responses from the first client device based on the application submission confirmation data indicating the immigration application for the first user was accepted.

FIG. 11G illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 11G and/or to perform some or all of the functionality discussed in conjunction with FIGS. 10A-11E.

Some or all of the executable instructions can be included in application data 315 that is generated by, is received from, and/or otherwise corresponds to the immigration assistance system 100. For example, execution of the application data 315 can cause the client device to implement functionality of the immigration application materials guided completion system 106 as illustrated in FIG. 10E and/or FIG. 10F.

Some or all steps of FIG. 11G can be performed based on communicating with one or more subsystems 101 of immigration assistance system 100. Some or all steps of FIG. 11G can be performed in a same or similar fashion as some or all steps of FIG. 11F. Some or all steps of FIG. 11G can be performed in conjunction with one or more of the various embodiments discussed in conjunction with FIG. 11F.

Step 1181 includes presenting application material prompt data indicating a set of immigration application materials via an interactive user interface displayed via a display device. Step 1183 includes generating a set of application material data based on user input to the first client device in response to the required application material prompt data. Step 1185 includes sending the set of application material data to an immigration assistance system. Step 1187 includes receiving application submission confirmation data from the immigration assistance system based on submission of an immigration application that includes the set of application material data. Step 1189 includes displaying the application submission confirmation data via the interactive user interface. Step 1191 includes receiving an application acceptance notification from the immigration assistance system. Step 1193 includes displaying the application acceptance notification via the interactive user interface.

FIG. 11H-11K presents example embodiments of a display by interactive user interface 375 that presents immigration application status, such as application status 503.

Figure 11H:
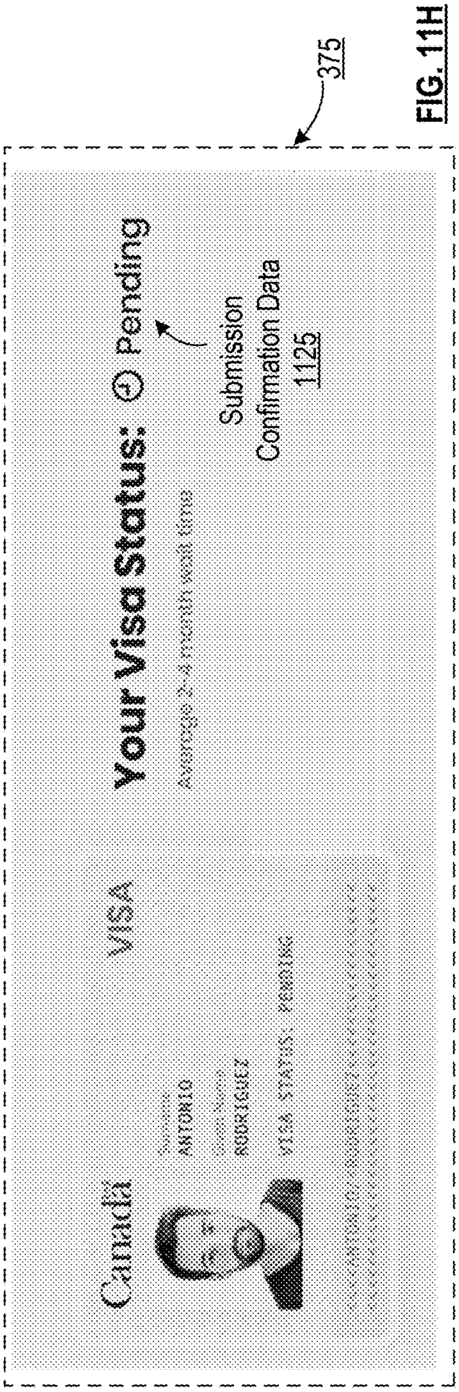

FIG. 11H illustrates an example display of submission confirmation data 1125. As illustrated in FIG. 11H, The interactive user interface 375 can optionally display an estimated wait time, corresponding to an estimated processing time.

This amount of time can be computed automatically by the immigration assistance system 100 based on: a total estimated amount of time, the current date, and/or the date that the immigration application was submitted, for example, where the amount of time is presented countdown until the immigration application is expected to complete processed as time passes. The total estimated amount of time can be computed automatically by the immigration assistance system 100 based on: a predetermined amount of time, an amount of time determined for the corresponding type of immigration application, and/or an estimated processing time indicated by the risk assessment score 541 for the user as discussed previously.

Figure 11I:
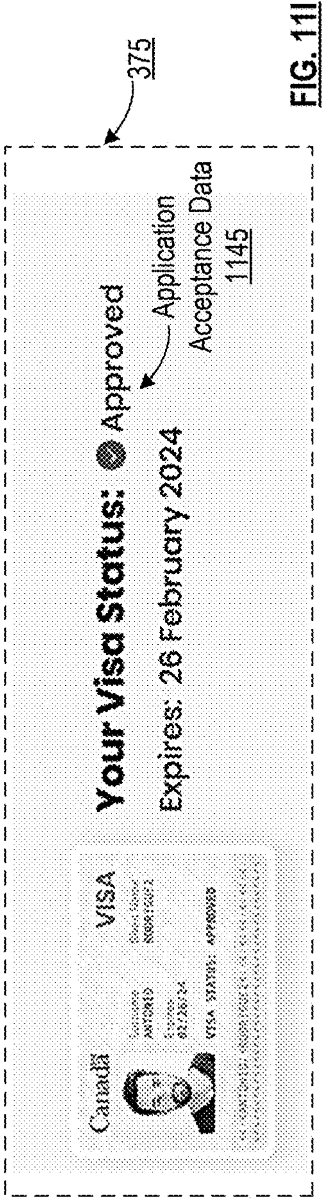
Figure 11J:
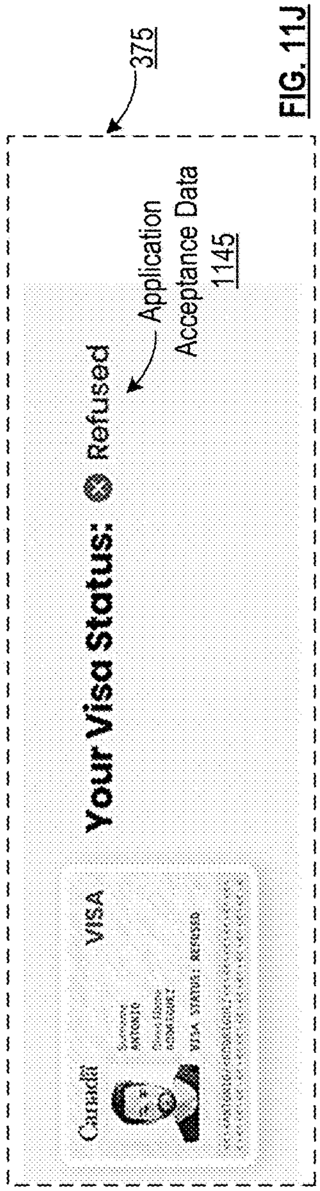

FIGS. 11I and 11J illustrate an example display of application acceptance data 1145. FIG. 11I illustrates an example of presenting application acceptance data 1145 corresponding to granting of the immigration application. As illustrated in FIG. 11I, the interactive user interface 375 can optionally present an expiration date of the immigration application, for example, based on the determined expiration date 509 that is indicated in application acceptance data 1145, received from by the government server system 140, and/or established by the corresponding government entity. FIG. 11I illustrates an example of presenting application acceptance data 1145 corresponding to rejection of the immigration application.

Figure 11K:
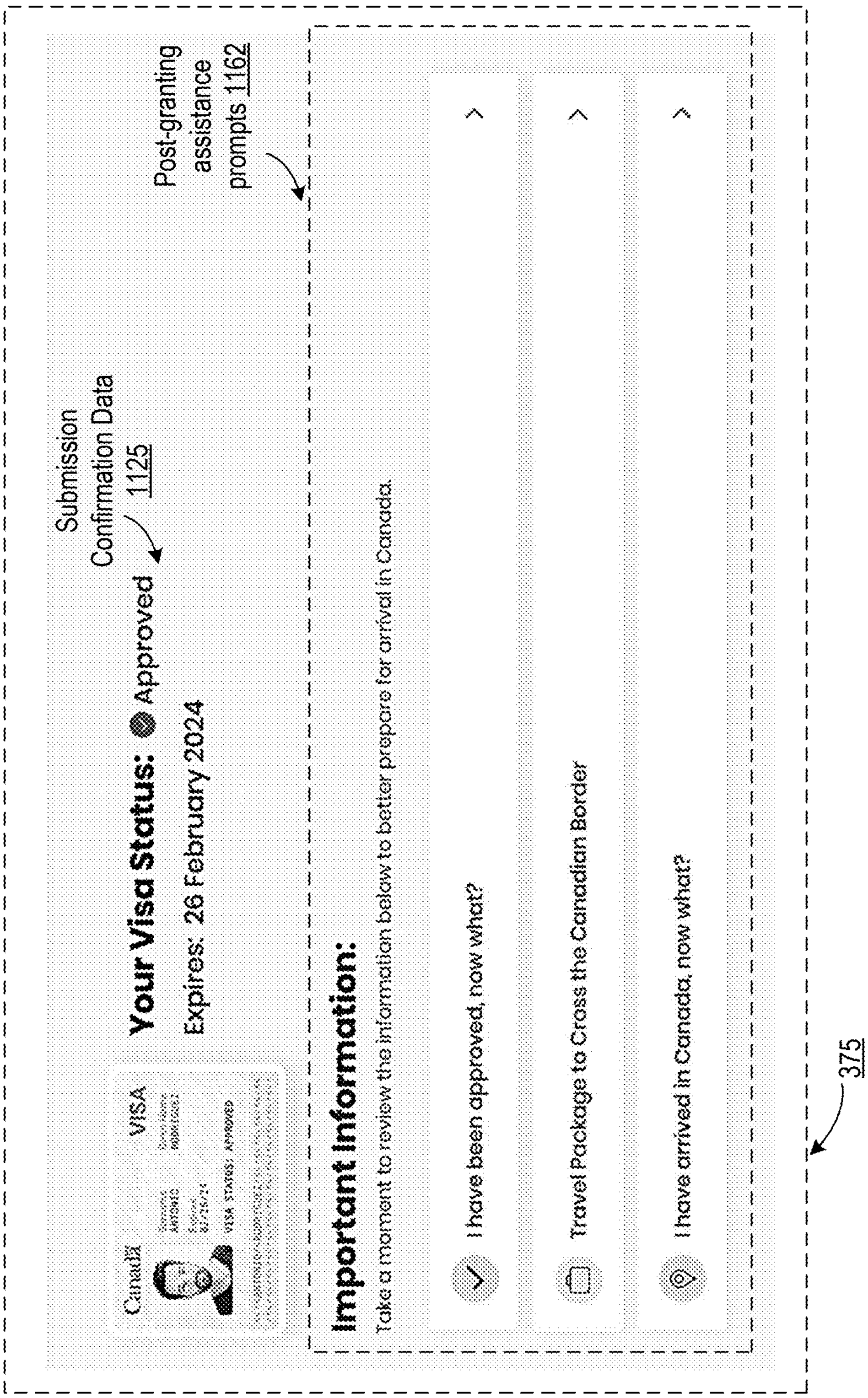

FIG. 11K illustrates another example display of application acceptance data 1145. Based on the application acceptance data 1145 indicating acceptance of the immigration application, the interactive user interface 375 can further display one or more post-granting assistance prompts 1162. For example, as discussed in further detail herein, the immigration assistance system 100 can provide information and/or further assistance in response to user interaction with one or more post-granting assistance prompts 1162 after granting of immigration applications, prior to and/or after these users enter the corresponding country to which they are immigrating.

FIGS. 12B-12E present embodiments of an immigration information extraction system 110. The immigration information extraction system 110 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to automated extraction of information from one or more of a set of document files uploaded by a user. For example, the document files are uploaded in conjunction with completing application materials that include the document files, and the extracted information is utilized to generate one or more other application materials to be included in the user's immigration application automatically.

In some embodiments, the immigration information extraction system 110 can be implemented in conjunction with implementing the immigration application materials guided completion system 106 based on extracting information from some application materials 531, or other uploaded files, to automatically generate other application materials 531. In some embodiments, one or more application materials generated for a user via immigration information extraction system 110 are automatically submitted for the user via immigration application materials submission system 108. In some embodiments, only users with favorable risk assessment scores 541 previously generated via immigration eligibility risk assessment system 102 have immigration information extracted from document files by immigration information extraction system 110 and/or have application materials generated utilizing extracted information by immigration information extraction system 110.

Some or all of this functionality of the immigration information extraction system 110 improves the technology of computer-based immigration systems based on improving the efficiency of generating immigration applications for users, for example, based on automatic generation of one or more materials via automatic extraction of information from other materials. This can be useful in reducing the amount of individual application materials that need to be completed and/or uploaded by a given user. Some or all of this functionality of the immigration information extraction system 110 improves the technology of computer-based immigration systems based on improving the efficiency of processing immigration applications, for example, based on being generated correctly via automatically being generated. Some or all of this functionality of the immigration information extraction system 110 improves the technology of computer-based immigration systems based on gathering extracted data that can be utilized over time as historical data utilized as input to one or more immigration analytical functions utilized determine trends in rate of granting of immigration applications to users and/or length of time in processing of immigration applications as a function of various information and/or characteristics regarding different users as indicated by this extracted data.

FIG. 12B illustrates an embodiment of an immigration assistance system 100 that implements an immigration information extraction system 110. As illustrated in FIG. 12B, the immigration information extraction system 110 can implement a document file processing module 1220, for example, via subsystem processing module 420 and/or subsystem memory module 410. The document file processing module 1220 can generate relevant data 1239 from a corresponding document file 532. For example, the document file processing module 1220 generates the relevant data 1239 based on performing an information extraction function, for example in accordance with a corresponding information extraction function entry 708.

The document file 532 can be received from a client device 130 based on being uploaded by a corresponding user. For example, the document file 532 is uploaded in response to a document upload prompt 636, is accessed via user account 165, and/or is uploaded in conjunction with competing a corresponding application material 531.A that includes the document file 532. Alternatively, the document file 532 is automatically generated by the immigration assistance system 100 based on completing a corresponding application material 531.A. The application material 531.A, when completed, can include the document file 532 and/or be based on the document file 532. The document file 532 can be utilized as input to document file processing module 1220 before or after the corresponding application material 531.A is completed.

The relevant data 1239 can include various extracted data, and can optionally be implemented as extracted data 539. For example, some or all of the relevant data 1239 generated via document file processing module 1220 for the document file 532 corresponding to a particular application material 531.A is stored as, and/or corresponds to, extracted data 539 for that particular application material 531 in the user's user account 165.

An application material completion module 1022.B, for example, corresponding to a type of application material 531.B that is different from the type of application material 531.A, can be implemented to complete the application material 531.B for a given user based on the relevant data 1239 generated from the document file 532 of application material 531.A of the given user. For example, the application material completion module 1022.B performs an application completion function, in conjunction with an application material completion function entry 706.B, that utilizes extracted data 539 as input to generate application material 531.B.

FIG. 12C illustrates an embodiment of an immigration assistance system 100 that implements an immigration application materials guided completion system 106, an immigration information extraction system, and/or an immigration application materials submission system 108. The immigration application materials guided completion system 106 implements an application material completion module 1022.A and an application material completion module 1022.B to facilitate completion of two corresponding application materials 531.A-531.B.

Application material 531.A includes a document file 532 received from client device 130. This document file 532 is processed by document file processing module 1220 to generate relevant data 1239 extracted from this document file 532. The application material completion module 1022.B generates the application material 531.B based on the relevant data 1239. For example, the application material 531.B includes some or all of the relevant data 1239. Completed application materials 531.A and 531.B can be submitted for the corresponding user via the immigration application materials submission system 108 sending application materials 531.A and 531.B to the government server system 140. The completed application materials 531.A and 531.B can alternatively or additionally be stored in user account 165 and/or can be sent to client device 130 for display, review, and/or edits by the user.

For example, the document file processing module 1220 can be implemented by the application material completion module 1022.A to generate the relevant data 1239 of the corresponding application material 531.A. As another example, the document file processing module 1220 can be implemented by the application material completion module 1022.B to generate application material 531.B based on processing an input document file 532.

While not illustrated in FIG. 12C, the document file processing module 1220 can be operable to generate relevant data 1239 from multiple different types of documents, where multiple ones of the set of application materials 531.1-531.X of a user's immigration application have corresponding relevant data 1239 extracted via immigration information extraction system 110. While not illustrated in FIG. 12D, the immigration application materials guided completion system 106 can be operable utilize generate relevant data 1239 from one or more document files to complete multiple different ones of the set of application materials 531.1-531.X of a user's immigration application, for example, via multiple corresponding application material completion modules 1022. In some embodiments, document file 532 does not correspond to an application material 531.A and is not submitted in the immigration application, where the document file 532 is utilized exclusively to generate relevant data 1239 for use in generating one or more application materials 531.

FIG. 12D illustrates an embodiment of an immigration information extraction system 110 that implements a document file processing module 1220 that utilizes a textual data detection module 1230 and a relevant data extraction module.

The textual data detection module 1230 can process an incoming document file 532 to generate textual data 1233 that include some or all textual data detected in the document file 532. For example, the document file 532 includes image data 1232, such as a photograph, scan, or screenshot of a corresponding document. The textual data detection module 1230 can perform an image processing function, for example, of a corresponding image processing function entry 601, to detect and extract the text from the image data. For example, the image processing function was trained upon a training set of documents, for example, of a particular type corresponding to the type of document of the document file 532. The same or different image processing function can be implemented to generate textual data 1233 from different types of documents.

The relevant data extraction module 1240 can process the textual data 1233 detected in the document file 532 to generate the relevant data 1239. For example, the relevant data 1239 includes a set of extracted data 539.1-539.S, such as portions of text extracted from the full text of the document file 532 indicated in the textual data 1233. The relevant data extraction module 1240 can perform a text processing function, for example, of a corresponding text processing function entry 603, to extracted each extracted data 539.1-539.S of relevant data 1239. For example, the text processing function was trained upon a training set of textual data, for example, of a particular type corresponding to the type of document of the document file 532. Alternatively or in addition, the text processing function is configured to be extracted the extracted data 539.1-539.S based on a corresponding set of form fields 1-S to be populated for in form data 533 of a type of application material, as illustrated in FIG. 12E. The same or different text processing function can be implemented to generate relevant data 1239 from different types of documents.

In some embodiments, performing the text processing function includes translating some or all of the textual data 1233 from a first language into a second language that is different from the first language, where the relevant data 1239 includes text in the second language. For example, the second language is a language required for the application material and/or is an official language of the country to which the user is immigrating. In cases where the textual data 1233 is already in the second language or another accepted language for the application material, the textual data 1233 need not be translated into a different language.

FIG. 12E illustrates an embodiment of an immigration assistance system 100 that implements the immigration information extraction system 110 to generate relevant data 1239 that includes extracted data 539.1-539.S for completion of an immigration application material 531.B that includes form data 533 via a corresponding application material completion module 1022.B. In the example of FIG. 12E, extracted data 539.1-539.S of a single document file 532 of one application material type is utilized to generate form data 533 for a given application material. In other embodiments, multiple sets of extracted data 539.1-539.S of a multiple document files 532 of multiple application material types can be utilized to generate form data 533 for a given application material, where some field data 534 includes data extracted from one document file 532, and where other field data 534 includes data extracted from another document file. Alternatively or in addition, a given set of extracted data 539.1-539.S of a given document file 532 can be utilized to generate form data 533 for a multiple different application materials.

FIG. 12E illustrates an embodiment of a client device 130 that locally implements some or all functionality of the immigration information extraction system 110 and/or the immigration application materials system 106, for example, based on storing and/or executing corresponding subsystem application data 318. In such embodiments, the document file processing module 1220 and/or one or more application material completion modules 1022 can be implemented via client processing module 320 and/or client memory module 310.

In various embodiments, an immigration information extraction system includes at least one processor, and at least one memory that stores executable instructions. The executable instructions, when executed by the at least one processor, can cause the immigration information extraction system to: receive image upload data from a first client device that includes image data capturing a first one of a set of immigration application materials, where the first client device generated the image upload data based on user input to the first client device in response to at least one prompt displayed via an interactive user interface to upload the first one of the set of immigration application materials; automatically detect textual data from the image data by utilizing at least one image processing function; automatically extract relevant data from the textual data by utilizing at least one natural language processing function; complete a second one of the set of immigration application materials based on utilizing the relevant data extracted from the textual data; and/or facilitate submission of an immigration application for a first user of the first client device that includes the set of immigration application materials.

In various embodiments, a client device includes at least one processor, and at least one memory that stores executable instructions that, when executed by the at least one processor, can cause the client device to: present image upload prompt indicating a first one of a set of immigration application materials to a first user via an interactive user interface displayed via a display device of the client device; generate image upload data that includes image data capturing the first one of the set of immigration application materials based on user input to a first client device in response to at least one prompt displayed via the interactive user interface to upload the first one of the set of immigration application materials; automatically detect textual data from the image data by utilizing at least one image processing function; automatically extract relevant data from the textual data by utilizing at least one natural language processing function; and/or complete a second one of the set of immigration application materials based on utilizing the relevant data extracted from the textual data. An immigration application can be submitted based on transmission of the set of immigration application materials to a government server system.

FIG. 12F illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 12F and/or to perform some or all of the functionality discussed in conjunction with FIGS. 12B-12E.

Some or all steps of FIG. 12F can be performed by implementing an immigration information extraction system 110. For example, at least one subsystem memory module of the immigration information extraction system 110 stores executable instructions that, when executed by at least one subsystem processing module of the immigration information extraction system 110, cause the immigration information extraction system 110 to execute some or all steps of FIG. 12F and/or to perform some or all of the functionality discussed in conjunction with FIGS. 12B-12E.

Some or all steps of FIG. 12F can be performed by implementing and/or communicating with one or more other subsystems 101. Some or all steps of FIG. 12F can be performed by accessing user account database 162, utilizing some or all data of one or more user accounts 165, and/or generating some or all data of one or more user accounts 165. Some or all steps of FIG. 12F can be performed by accessing function library 172 and/or by performing one or more functions of function library 172. Some or all steps of FIG. 12F can be performed based on communicating with one or more client devices 130.

Step 1282 includes receiving image upload data from the first client device that includes image data capturing a first one of a set of immigration application materials. For example, the first client device generated the image upload data based on user input to the first client device in response to at least one prompt displayed via the interactive user interface to upload the first one of the set of immigration application materials. Step 1284 includes automatically detecting textual data from the image data by utilizing at least one image processing function. Step 1286 includes automatically extracting relevant data from the textual data by utilizing at least one natural language processing function. Step 1288 includes completing a second one of the set of immigration application materials based on utilizing the relevant form field data extracted from the textual data. Step 1290 includes facilitating submission of an immigration application for the first user that includes the set of immigration application materials.

In various embodiments, the at least one image processing function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more image processing function entries 601, of function library 172; and/or otherwise determined by immigration assistance system.

In various embodiments, the at least one natural language processing function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more text processing function entries 603, of function library 172; and/or otherwise determined by immigration assistance system.

In various embodiments, the least one image processing function and at least one natural language processing function are performed based on performing: a document processing function corresponding to a document processing function entry 605; an information extraction function corresponding to an information extraction function entry 708; and/or application material completion function corresponding to an application material completion function entry 706.

In various embodiments, the second one of the set of immigration application materials is a form that includes a set of form fields. Completing the second one of the set of immigration application materials can include automatically populating at least one form field of the set of form fields of the second one of the set of immigration application materials.

In various embodiments, the first one of the set of required application materials is a passport, a national identification card, and/or a driver's license, and the relevant data includes a passport number, a date of birth, a country of origin, an expiration data, and/or a legal name. In various embodiments, the first one of the set of required application materials is a letter of acceptance from a study program, and the relevant data includes a name of the study program, a study program location, tuition fees of the study program, a study program start data start, and/or a study program end date. In various embodiments, the first one of the set of required application materials is a transcript from an academic institution, and the relevant data includes a name of the academic institution, at least one course name, a GPA, a start date at the academic institution, and/or an end date at the academic institution. In various embodiments, the first one of the set of required application materials is a language test results document, and the relevant data includes a test date, a test score, and/or at least one language skill score.

In various embodiments, the image upload data includes additional image data corresponding to the at least one additional one of the set of required immigration application materials. The method can further include automatically detecting additional textual data from the additional image data by utilizing the same or different at least one image processing function, and automatically extracting additional relevant data from the additional textual data by utilizing the same or different at least one natural language processing function. Completing the second one of the set of immigration application materials can be further based on utilizing the additional relevant form field data extracted from the additional textual data.

In various embodiments, the method includes completing a third one of the set of immigration application materials based on utilizing the relevant form field data extracted from the textual data.

In various embodiments, the method includes sending image upload prompt data for display via the interactive user interface. The image upload data can be generated by and received from the first client device based on user input in response to the image upload prompt data.

In various embodiments, the image upload prompt data includes an image capture prompt. User input in response to the image capture prompt causes a camera of the first client device to capture a photograph of the first one of the set of immigration application materials, where the image data corresponds to the photograph.

In various embodiments, the image upload prompt data includes a prompt to capture a screenshot, where the first client device captures a screenshot of image data displayed via a display device of the first client device based on user input in response to the image capture prompt, and where the image data corresponds to the screenshot.

In various embodiments, automatically identifying the relevant data from the textual data by utilizing at least one natural language processing function include generating translated textual data by translating the textual data from a first language into a second language by utilizing at least one first natural language processing function, and identifying the relevant data from the translated textual data by utilizing at least one second natural language processing function.

In various embodiments, automatically extracting the textual data from the image data is based on a standardized layout of the first one of the set of immigration application materials.

In various embodiments, facilitating submission of the immigration application for the first user includes transmitting the immigration application by sending the set of immigration application materials to the government server system. In various embodiments, facilitating submission of the immigration application for the first user includes sending the first one of the set of immigration application materials and/or the second one of the set of immigration application materials to the immigration application materials submission system 108 for submission.

In various embodiments, facilitating submission of the immigration application for the first user includes implementing the immigration application materials guided completion system 106 to complete the set of immigration materials. In various embodiments, facilitating submission of the immigration application for the first user includes implementing the immigration application materials submission system 108 to submit the immigration application.

In various embodiments, facilitating submission of the immigration application for the first user includes sending some or all of the set of immigration application materials to the first client device for: display to the first user, review by the first user, editing by the first user via user input to the first client device, and/or transmission by the first client device to the government server system via user input to the first client device.

FIG. 12G illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 12G and/or to perform some or all of the functionality discussed in conjunction with FIGS. 12B-12E.

Some or all of the executable instructions can be included in application data 315 that is generated by, is received from, and/or otherwise corresponds to the immigration assistance system 100. For example, execution of the application data 315 can cause the client device to implement functionality of the immigration information extraction system 110 as illustrated in FIG. 12E.

Some or all steps of FIG. 12G can be performed based on communicating with one or more subsystems 101 of immigration assistance system 100. Some or all steps of FIG. 12G can be performed in a same or similar fashion as some or all steps of FIG. 12F. Some or all steps of FIG. 12G can be performed in conjunction with one or more of the various embodiments discussed in conjunction with FIG. 12F.

Step 1281 includes presenting image upload prompt indicating a first one of a set of required immigration application materials to a first user via an interactive user interface displayed via a display device of the client device. Step 1283 includes generating image upload data that includes image data capturing the first one of the set of immigration application materials based on user input to the first client device in response to at least one prompt displayed via the interactive user interface to upload the at least one document. Step 1285 includes automatically detecting textual data from the image data by utilizing at least one image processing function. Step 1287 includes automatically extracting relevant data from the textual data by utilizing at least one natural language processing function. Step 1289 includes completing a second one of the set of immigration application materials based on utilizing the relevant form field data extracted from the textual data.

FIGS. 13A-13G present embodiments of an immigration digital photograph processing system 112. The immigration digital photograph processing system 112 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to processing of digital photographs to automatically determine whether the digital photographs adhere to a set of requirements, for example, established by a government entity, such as an immigration entity, of a corresponding country to which users are applying to immigrate. For example, the digital photographs are uploaded in conjunction with completing application materials that include the digital photographs, and the digital photographs are only submitted when they adhere to set of requirements.

In some embodiments, the immigration digital photograph processing system 112 can be implemented in conjunction with implementing the immigration application materials guided completion system 106 based on generating adherence data for digital photographs in conjunction with completing a corresponding application materials 531. In some embodiments, one or more application materials that include digital photographs for a user with adherence data indicating adherence to the set of requirements are automatically submitted for the user via immigration application materials submission system 108. In some embodiments, only users with favorable risk assessment scores 541 previously generated via immigration eligibility risk assessment system 102 have digital photographs processed for adherence by immigration digital photograph processing system 112.

Some or all of this functionality of the immigration digital photograph processing system 112 improves the technology of computer-based immigration systems based on improving the efficiency of processing immigration applications, for example, based on being determined to adhere to corresponding requirements prior to submission, where greater percentages of application materials meet requirements for the immigration application and/or where individual immigration applications are processed more quickly based on being consistent with established requirements. Some or all of this functionality of the immigration digital photograph processing system 112 improves the technology of computer-based immigration systems based on gathering digital photographs for a plurality of users that can be utilized over time as historical data utilized as input to one or more immigration analytical functions utilized determine trends in rate of granting of immigration applications to users and/or length of time in processing of immigration applications as a function of adherence of documents to sets of requirements.

As illustrated in FIG. 13A, the immigration digital photograph processing system 112 can send digital photograph prompt data 1315 to a plurality of client devices 130.1-130.N. For example, the digital photograph prompt data 1315 is included in a prompt data sets 1010 based on a corresponding type of digital photograph being indicated in the set of application materials for completion by each given user of the plurality of client devices 130.1-130.N. As another example, the digital photograph prompt data 1315 is implemented as some or all of the input prompt instruction data 628 and/or document input instruction data 629 of a digital photograph adherence function entry 710 as discussed in conjunction with FIGS. 7I and 7J. As another example, digital photograph prompt data 1315 is indicated in application data 318 sent to the client device 130 for execution. As another example, the digital photograph prompt data 1315 is sent to a corresponding client device based on receiving a request from the client device to create and/or complete an immigration application and/or to receive immigration assistance.

Digital photograph prompt data 1315 can be presented to the corresponding user via interactive user interface 375, for example, as a document upload prompt 636 to upload the digital photograph, or other document file 532 for the corresponding type of application material, for example, as depicted in FIGS. 10I and 10J. The digital photograph prompt data 1315 can optionally be presented as a prompt to capture a screenshot of the corresponding type of application material via the client device 130, and/or as a prompt to utilize a camera of the client device to capture a digital photograph of the corresponding type of application material. The digital photograph prompt data 1315 can further present some or all requirements for the digital photograph that are evaluated for adherence by the digital photograph processing module, for example, as response guide data 849 presented in conjunction with a user selecting a presented response guide prompt 847.

The immigration digital photograph processing system 112 can receive a plurality of digital photographs 1332.1-1332.N. Each digital photograph can be uploaded by the corresponding client device 130 based on user input to the client device 130 indicating the digital photograph, such as a document file 532 corresponding to the digital photograph that is stored as a file 319 in a file system of the client device. In some cases, the digital photograph 1332 is generated by the client device, for example, via a camera of the client device and/or as a screenshot captured by the client device. The digital photograph 1332 can be included in an application material data set 1012 received from a corresponding user, and/or can optionally be stored in user account 165.

The immigration digital photograph processing system 112 can implement a digital photograph adherence data generator module 1340, for example, via subsystem processing module 420 and/or subsystem memory module 410. The digital photograph adherence data generator module 1340 can generate each of a plurality of digital photograph adherence data 1352.1-1352.N from a corresponding one of the plurality of digital photographs 1332.1-1332.N. The digital photograph adherence data 1352 can be generated based on digital photograph adherence data generator module 1340 performing a digital photograph adherence function, for example, of a corresponding digital photograph adherence function entry 710 as discussed in conjunction with FIGS. 7I and 7J. Some or all adherence data 1352 can be stored for the corresponding user in user account 165, for example as requirement adherence data 538.

Each digital photograph adherence data 1352 dan indicate whether or not the corresponding digital photograph adheres to a set of requirements. As used herein, the digital photograph adherence data 1352 can be deemed favorable if it indicates the corresponding digital photograph adhered to all of the set of requirements. As used herein, the digital photograph adherence data 1352 can be deemed unfavorable if it indicates the corresponding digital photograph did not adhere to at least one of the set of requirements.

The immigration digital photograph processing system 112 can implement a digital photograph submission module 1312 that facilitates submission of digital photographs 1332 with favorable adherence data 1352 to a government server system 140, for example, in conjunction with submission of a corresponding immigration application for the user. In this example, the digital photograph 1332.1 is submitted while the digital photograph 1332.N is not submitted based on digital photograph 1332.1 having favorable adherence data 1352.1 and based on digital photograph 1332.N having unfavorable adherence data 1352.N. Submission of these digital photographs 1332 with favorable adherence data 1352 can be performed via implementing the immigration application materials submission system 108. For example, the digital photograph submission module 1312 sends digital photographs 1332 with favorable adherence data 1352 to the government server system 140 directly. Alternatively, the user is notified of the adherence of their uploaded photograph, and the user submits their digital photograph 1332 to government server system 140 themselves via client device 130 sending the digital photograph 1332 to government server system 140.

The immigration digital photograph processing system 112 can implement a non-adherence notification communication module 1314 that sends non-adherence notification 1345 to ones of the client devices 130 that submitted digital photographs 1332 with unfavorable adherence data 1352. In this example, the non-adherence notification 1345 is sent to client device 130.N and not client device 130.1 based on digital photograph 1332.1 having favorable adherence data 1352.1 and based on digital photograph 1332.N having unfavorable adherence data 1352.N. The non-adherence notification 1345 can indicate some or all of the corresponding adherence data, for example, by indicating which ones of the set of requirements were not adhered to. For example, the non-adherence notification 1345 indicates that a pixel size requirement was not adhered to by the digital photograph.

In some cases, the non-adherence notification 1345 is generated to include image data depicting the corresponding digital photograph with regions in the frame of the photograph corresponding to causes of one or more requirements not being adhered to being circled, outlined, or otherwise visually indicated via overlaying of such information upon the digital photograph. For example, the eyes of the user are circled based on the adherence data 1352 indicating non-adherence based on detection of tinted glasses worn by the user in the digital photograph.

In some embodiments, generating the non-adherence notification 1345 includes generating new digital image data as a function of the image data via modifying pixel values of at least some pixels that include, that surround, and/or that are in proximity to a detected set of pixels of the image detected to include features not meeting the one or more requirements (e.g. based on corresponding measurements comparing unfavorably to predetermined measurement values), for example, via executing an image generator function 632.

FIGS. 13B and 13C illustrate an embodiment of an immigration assistance system that prompts users to upload subsequent digital photographs based on their received digital photographs having unfavorable adherence data. As illustrated in FIG. 13B, a digital photograph prompt communication module 1318 sends digital photograph prompt data 1315.*i* corresponding to an ith attempt by a user of client device 130.1 to upload a digital photograph with favorable adherence data. For example, the digital photograph prompt data 1315.*i* is sent to client device 130.1 based on the first i−1 digital photographs received from client device 130 having rendered unfavorable adherence data. Display of digital photograph prompt data 1315.*i* can indicate instructions to upload an ith digital photograph and/or can indicate particular requirements that were not adhered to in a prior digital photograph attempt 1332.1.*i*−1. The client device 130.1 can send a digital photograph 1332.1.*i* in response, denoting the ith digital photograph received from the user of client device 130.1. For example, the client device captures digital photograph 1332.1.*i* via a camera of the client device, via uploading a new file 319 stored by client device, and/or via capturing a screenshot of the display by the display device of the client device 130.

As illustrated in the example of FIG. 13B, the digital photograph adherence data generator module 1340 generates digital photograph adherence data 1352.1.*i* for digital photograph 1332.1.*i*, which indicates non-adherence of digital photograph 1332.1.*i*. This non-adherence of digital photograph 1332.1.*i* causes the digital photograph prompt communication module 1318 to send digital photograph prompt data 1315.*i*+1, as illustrated in FIG. 13C. Display of digital photograph prompt data 1315.*i*+1 can indicate instructions to upload an i+1th digital photograph and/or can indicate particular requirements that were not adhered to in the digital photograph attempt 1332.1.*i* of FIG. 13B. For example, the digital photograph prompt data 1315.*i*+1 indicates a non-adherence notification 1345 generated based on the digital photograph adherence data 1352.1.*i*, and further indicates instructions to upload another digital photograph.

The client device 130.1 can send a new digital photograph 1332.1.*i*+1 in response, denoting the i+1th digital photograph received from the user of client device 130.1. For example, the client device captures digital photograph 1332.1.*i*+1 via a camera of the client device, via uploading a new file 319 stored by client device, and/or via capturing a screenshot of the display by the display device of the client device 130. In this case, the digital photograph adherence data generator module 1340 generates digital photograph adherence data 1352.1.*i*+1 for digital photograph 1332.1.*i*+1, which indicates adherence of digital photograph 1332.1.*i*+1. No further upload prompts need be sent to client device 130, as a digital photograph with favorable adherence data 1352 was obtained. The digital photograph submission module 1312 can facilitate submission of digital photograph 1332.1.*i*+1 for the corresponding user via transmission of digital photograph 1332.1.*i*+1 to government server system 140.

FIG. 13D illustrates an example where the immigration digital photograph processing system 112 is implemented by an application material completion module 1022.A for a corresponding type of application material. The completed application material set 530 includes application material 531.A of the corresponding type as a digital photograph with favorable adherence data, for example, where the corresponding application material is deemed complete and thus included in the completed application material set 530 if the corresponding digital photograph is determined to adhere to all requirements. The immigration application materials submission system 108 can send this digital photograph with favorable adherence data in conjunction with sending the completed application material set 530 to the government server system 140.

For example, the completed application material set 530 includes digital photograph 1332.1.*i*+1 of FIG. 13C based on being the first attempt with corresponding adherence data 1352 indicating the digital photograph adheres to all requirements. One or more prior digital photograph attempts 1332.1.1-1332.1.*i* are not included in the completed application material set 530, and are thus not submitted to government server system 140, based on having unfavorable adherence data, thus not rendering the corresponding application material 531.A as complete.

In some embodiments, the immigration digital photograph processing system 112 is operable to generate adherence data for a type of application material 531.A corresponding to a digital photograph, such as a headshots and/or portraits of the user applying to immigrate, where the application material completion module 1022.A for the headshot and/or portrait application material implements the immigration digital photograph processing system 112.

In other embodiments, the immigration digital photograph processing system 112, or one or more other similar subsystems 101 implemented by the immigration assistance system, is operable to generate adherence data for one or more types of application materials 531 corresponding to: other types of digital photographs, scans, screenshots or other image data, for example, capturing a hard copy or electronically displayed information of a corresponding application material 531; and/or other types of document files 532. In such cases, other corresponding application material completion modules 1022 can be implemented to similarly generate digital photograph adherence data, or other document adherence data, based on corresponding requirements for these types of application materials.

As a particular example, one or more other document adherence functions corresponding to one or more document adherence function entries discussed in conjunction with FIGS. 7I and 7J can optionally be performed by an application material completion modules 1022 of the corresponding type to determine whether the document meet all requirements for the type of application material. In some embodiments, only documents files meeting their requirements for their type of application material render completed application materials 531.

In such embodiments, the other application material completion modules 1022 that apply corresponding document adherence functions to generate adherence data for corresponding uploaded document files 532 can correspond to types application materials 531 such as: application materials corresponding to letters of acceptance to schools or other academic institutions; passports; travel documents; language test results; transcripts and/or mark sheets from academic institutions; medical exam results; GIC application materials; and/or any other types of application materials 531 discussed herein. The corresponding document adherence functions for these other types of application materials 531 can be performed based on some or all of the corresponding requirements for these types of application materials and/or based on some or all of the corresponding examples of processing these types of documents for adherence as discussed previously in conjunction with FIGS. 7I and 7J.

Document files 532 not meeting their requirements for their type of application material can cause the user to be prompted to regenerate and/or reupload a new document file for the application material type via their client device based on indicating the non-adherence as a non-adherence notification based on the adherence data generated for the document file. For example, a user is prompted to retake a medical exam based on their uploaded medical exam having a date that is not as recent as required by the government entity. As another example, a user is prompted to retake a language exam based on their language skill scores in one or more categories not meeting the minimum requirement as required and/or recommended by the government entity.

Alternatively or in addition, as some types of documents may not be editable or regeneratable, the non-adherence notification 1345 can be implemented as a warning notification indicating requirements that were not met. For example, a user is presented with a warning that, due to their low language test scores, their application may take longer to process and/or may not be accepted. In some embodiments, the corresponding adherence data can be utilized as input to a risk assessment function performed by the immigration eligibility risk assessment system 102, where the risk assessment scores 541 generated for one or more users is optionally generated as a function of whether one or more of these other types of documents adhered to all requirements.

FIG. 13E illustrates an embodiment of a digital photograph adherence data generator module 1340 that generates image detection data 1365 for each of a set of digital photograph adherence requirements 1355.1-1355.Z of a digital photograph adherence requirements set 1350, such as the digital photograph adherence requirements set 1350 indicated by a corresponding digital photograph adherence function entry 710 of FIG. 7J. Some or all photograph adherence requirements 1355.1-1355.Z can be determined based on user input by an administrator and/or based on recommendations and/or requirements for the corresponding type of digital photograph established by the government entity.

In particular, the digital photograph adherence requirements set 1350 can optionally include one or more requirements discussed in conjunction with 7J for portraits and/or headshots, such as: the minimum pixel dimension requirement, the minimum file size requirement, the maximum file size requirement, the file format requirement, the color space requirement, the unaltered requirement, the required chin to crown length range, the front-facing orientation requirement, the face-centered framing requirement, the eye visibility requirement, the non-obscured face requirement, the minimal head covering requirement, the neutral facial expression requirement, the background requirement, the paper photo scanning requirement, the maximum photograph age requirement, and/or any other requirements for the digital photograph.

The set of image detection data 1365.1-1365.Z can be generated to indicate whether image data corresponding to each requirement is detected in the digital photograph, indicating whether the corresponding requirement was met or not met based on being detected or not detected in the digital photograph. Generating the image detection data 1365.1-1365.Z can include performing at least one image processing function, for example, as indicated by the corresponding digital photograph adherence function entries 710.

Alternatively or in addition, some or all adherence data for digital photographs or other types of documents described herein are generated based on an image processing technique and/or artificial intelligence technique. For example, the digital photograph adherence data generator module utilizes a computer vision model trained from a training set of digital photographs corresponding to accepted applications, and/or with labeling data indicating whether or not the corresponding immigration application was granted and/or how long it took for corresponding immigration application to be granted, where this model is applied to generate adherence data for incoming digital photographs based on learned requirements and/or detectable features in image data of the digital photographs that renders corresponding immigration applications more likely to be granted and/or to be granted quickly. This can be based on trends relating to requirements of digital photographs and/or detectable features in image data of the digital photographs, and their correlation to a corresponding immigration application being granted and/or being granted within a favorable time period as one or more trends generated by implementing the historical immigration data processing system 124.

FIGS. 13F and 13G illustrate an embodiment of a client device 130 that locally implements some or all functionality of the immigration digital photograph processing system 112, for example, based on storing and/or executing corresponding subsystem application data 318. In such embodiments, the digital photograph adherence data generator module 1340, the non-adherence notification communication module 1314, and/or the digital photograph submission module 1312 can be implemented via client processing module 320 and/or client memory module 310. In some cases, the client device is operable to prompt the corresponding user to upload multiple attempts until adherence is achieved as discussed in conjunction with FIGS. 13B and 13C.

In various embodiments, an immigration digital photograph processing system includes at least one processor and at least one memory that stores executable instructions. The executable instructions, when executed by the at least one processor, can cause the immigration digital photograph processing system to: send digital photograph upload prompt data to a first client device for display to a first user via an interactive user interface; receive first digital photograph upload data from the first client device that includes a first digital photograph of the first user, where the first client device generated the first digital photograph upload data based on user input to the first client device in response to at least one first prompt displayed via the interactive user interface to upload the first digital photograph; perform at least one image processing function upon the first digital photograph to automatically generate first digital photograph adherence data indicating whether the first digital photograph adheres to each of a set of immigration digital photograph requirements; send, based on the first digital photograph adherence data indicating the first digital photograph does not adhere to at least one of the set of immigration digital photograph requirements, first digital photograph reupload prompt data to the first client device for display to a first user via the interactive user interface; receive second digital photograph upload data from the first client device that includes a second digital photograph of the first user, where the first client device generated the second digital photograph upload data based on user input to the first client device in response to at least one second prompt displayed via the interactive user interface to upload the second digital photograph; perform the at least one image processing function upon the second digital photograph to automatically generate second digital photograph adherence data indicating whether the second digital photograph adheres to each of the set of immigration digital photograph requirements; and/or facilitate submission of the second digital photograph in conjunction with submission of an immigration application for the first user based on the second digital photograph adherence data indicating the second digital photograph adheres to at least one of the set of immigration digital photograph requirements.

In various embodiments, a client device includes at least one processor, and at least one memory that stores executable instructions. The executable instructions, when executed by the at least one processor, can cause the client device to: present digital photograph upload prompt data to a first user via an interactive user interface displayed via a display device of the client device; generate first digital photograph upload data that includes a first digital photograph of the first user based on user input to the client device in response to at least one first prompt displayed via the interactive user interface to upload the first digital photograph; perform at least one image processing function upon the first digital photograph to automatically generate first digital photograph adherence data indicating whether the first digital photograph adheres to each of a set of immigration digital photograph requirements; present, based on the first digital photograph adherence data indicating the first digital photograph does not adhere to at least one of the set of immigration digital photograph requirements, first digital photograph reupload prompt data for display to a first user via the interactive user interface; generate second digital photograph upload data that includes a second digital photograph of the first user based on user input to the client device in response to at least one second prompt displayed via the interactive user interface to upload the second digital photograph; perform the at least one image processing function upon the second digital photograph to automatically generate second digital photograph adherence data indicating whether the second digital photograph adheres to each of the set of immigration digital photograph requirements; and/or generate immigration application data that includes the second digital photograph in an immigration application for the first user based on the second digital photograph adherence data indicating the second digital photograph adheres to at least one of the set of immigration digital photograph requirements. An immigration application can be submitted for the first user via transmission of the immigration application data to a government server system.

FIG. 13H illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 13H and/or to perform some or all of the functionality discussed in conjunction with FIGS. 13A-13G.

Some or all steps of FIG. 13H can be performed by implementing an immigration digital photograph processing system 112. For example, at least one subsystem memory module of the immigration digital photograph processing system 112 stores executable instructions that, when executed by at least one subsystem processing module of the immigration digital photograph processing system 112, cause the immigration digital photograph processing system 112 to execute some or all steps of FIG. 13H and/or to perform some or all of the functionality discussed in conjunction with FIGS. 13A-13G.

Some or all steps of FIG. 13H can be performed by implementing and/or communicating with one or more other subsystems 101. Some or all steps of FIG. 13H can be performed by accessing user account database 162, utilizing some or all data of one or more user accounts 165, and/or generating some or all data of one or more user accounts 165. Some or all steps of FIG. 13H can be performed by accessing function library 172 and/or by performing one or more functions of function library 172. Some or all steps of FIG. 13H can be performed based on communicating with one or more client devices 130.

Step 1382 includes send digital photograph upload prompt data to a first client device for display to a first user via an interactive user interface. Step 1384 includes receiving first digital photograph upload data from the first client device that includes a first digital photograph of the first user. For example, the first client device generated the first digital photograph upload data based on user input to the first client device in response to at least one first prompt displayed via the interactive user interface to upload the first digital photograph.

Step 1386 includes performing at least one image processing function upon the first digital photograph to automatically generate first digital photograph adherence data indicating whether the digital photograph adheres to each of a set of immigration digital photograph requirements.

Step 1388 includes sending, based on the first digital photograph adherence data indicating the first digital photograph does not adhere to at least one of the set of immigration digital photograph requirements, first digital photograph reupload prompt data to the first client device for display to a first user via the interactive user interface. Step 1390 includes receiving second digital photograph upload data from the first client device that includes a second digital photograph of the first user. For example, the first client device generated the second digital photograph upload data based on user input to the first client device in response to at least one second prompt displayed via the interactive user interface to upload the second digital photograph;

Step 1392 includes performing the at least one image processing function upon the second digital photograph to automatically generate second digital photograph adherence data indicating whether the second digital photograph adheres to each of the set of immigration digital photograph requirements. Step 1394 includes facilitating submission of the second digital photograph in conjunction with submission of an immigration application for the first user based on the second digital photograph adherence data indicating the second digital photograph adheres to at least one of the set of immigration digital photograph requirements.

In various embodiments, the at least one image processing function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more image processing function entries 601, of function library 172; and/or otherwise determined by immigration assistance system.

In various embodiments, the least one image processing function is performed based on performing: a document processing function corresponding to a document processing function entry 605; a digital photograph adherence function corresponding to a digital photograph adherence entry 710; and/or application material completion function corresponding to an application material completion function entry 706.

In various embodiments, the set of immigration digital photograph requirements can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more image processing function entries 601, of function library 172; and/or otherwise determined by immigration assistance system. In various embodiments, the method includes determining the set of immigration digital photograph requirements based on immigration application guideline data established by the government entity.

In various embodiments, at least one of the set of immigration digital photograph requirements includes a minimum pixel dimension requirement, a minimum file size requirement, a maximum file size requirement, and/or a color space requirement. Performing the at least one image processing function upon the first digital photograph can include detecting pixel dimensions of the first digital photograph; detecting a file size of the first digital photograph; and/or detecting a color space of the first digital photograph. Generating first digital photograph adherence data can be based on the pixel dimensions of the first digital photograph, the file size of the first digital photograph, and/or the color space of the first digital photograph.

In various embodiments, at least one of the set of immigration digital photograph requirements includes a required chin to crown length range. Performing the at least one image processing function upon the first digital photograph can include detecting a chin point in the first digital photograph; detecting a head point in the first digital photograph; measuring a distance from the chin point to the head point in the first digital photograph; generating the first digital photograph adherence data to indicate the chin to crown length range requirement is met when the distance from the chin point to the head point in the photograph falls within the required chin to crown length range; and/or generating the first digital photograph adherence data to indicate the chin to crown length range requirement is not met when the distance from the chin point to the head point in the photograph does not fall within the required chin to crown length range.

In various embodiments, at least one of the set of immigration digital photograph requirements includes a front-facing orientation requirement and/or a face-centered framing requirement. Performing the at least one image processing function upon the first digital photograph can include: detecting a head in the first digital photograph; detecting a frame of the first digital photograph; generating head orientation data indicating orientation of the head; generating head framing data indicating a framing of the head; generating the first digital photograph adherence data to indicate the front-facing orientation requirement is met when the head orientation data indicates the orientation of the head is square to the frame; generating the first digital photograph adherence data to indicate the front-facing orientation requirement is not met when the head orientation data indicates the orientation of the head is not square to the frame; generating the first digital photograph adherence data to indicate the face-centered framing requirement is met when the head framing data indicates the head is centered in the frame; and/or generating the first digital photograph adherence data to indicate the face-centered framing requirement is not met when the head framing data indicates the head is not centered in the frame.

In various embodiments, at least one of the set of immigration digital photograph requirements includes an eye visibility requirement. Performing the at least one image processing function upon the first digital photograph can include: detecting eyeglasses in the first digital photograph; generating an eye visibility score based on at least one of: a level of tinting of the eyeglasses, or a level of reflection of the eyeglasses; generating the first digital photograph adherence data to indicate the eye visibility requirement is met when the eye visibility score compares favorably to an eye visibility score threshold; and/or generating the first digital photograph adherence data to indicate the eye visibility requirement is not met when the eye visibility score compares unfavorably to the eye visibility score threshold.

In various embodiments, at least one of the set of immigration digital photograph requirements includes a non-obscured face requirement. Performing the at least one image processing function upon the first digital photograph can include: detecting a face in the first digital photograph; calculating a visible facial surface area measurement based on the face detected in the first digital photograph; detecting an outline of the head in the first digital photograph; calculating a total facial surface area measurement based on the outline of the head in the first digital photograph; generating a face obstruction score based on calculating a proportion of the visible facial surface area measurement to the total facial surface area measurement; generating the first digital photograph adherence data to indicate the non-obscured face requirement is met when the face obstruction score compares favorably to a face obstruction score threshold; and/or generating the first digital photograph adherence data to indicate the non-obscured face requirement is not met when the face obstruction score compares unfavorably to the face obstruction score threshold.

In various embodiments, at least one of the set of immigration digital photograph requirements includes a minimal head covering requirement. Performing the at least one image processing function upon the first digital photograph can include: detecting a face in the first digital photograph; detecting a head covering in the first digital photograph; generating the first digital photograph adherence data to indicate the minimal head covering requirement is met when the head covering does not obscure any facial features of the face; and/or generating the first digital photograph adherence data to indicate the minimal head covering requirement is not met when the head covering obscures at least one facial feature of the face.

In various embodiments, at least one of the set of immigration digital photograph requirements includes a neutral facial expression requirement. Performing the at least one image processing function upon the first digital photograph can include: detecting a mouth in the first digital photograph; identifying one of a set of facial expressions based on a shape of the mouth; generating the first digital photograph adherence data to indicate the neutral facial expression requirement is met when the one of the set of facial expressions corresponds to a neutral facial expression; and/or generating the first digital photograph adherence data to indicate the neutral facial expression requirement is not met when the one of the set of facial expressions does not correspond to the neutral facial expression.

In various embodiments, at least one of the set of immigration digital photograph requirements includes a maximum photograph age requirement. Performing the at least one image processing function upon the first digital photograph can include: extracting photograph date metadata from the first digital photograph that indicates a date that the photograph was captured; generating the first digital photograph adherence data to indicate the maximum photograph age requirement is met when the photograph date metadata compares favorably to the maximum photograph age requirement; and/or generating the first digital photograph adherence data to indicate indicating the maximum photograph age requirement is not met when the photograph date metadata compares unfavorably to the maximum photograph age requirement.

In various embodiments, facilitating submission of the second digital photograph includes transmitting the second digital photograph to a government server system corresponding to a government entity. In various embodiments, facilitating submission of the immigration application for the first user includes sending second digital photograph to the immigration application materials submission system 108 for submission.

In various embodiments, facilitating submission of the immigration application for the first user includes implementing the immigration application materials guided completion system 106 to complete an immigration application material corresponding to the second digital photograph. In various embodiments, facilitating submission of the second digital photograph includes implementing the immigration application materials submission system 108 to submit the second digital photograph in conjunction with the immigration application.

In various embodiments, facilitating submission of the immigration application for the first user includes sending some or all of the set of immigration application materials to the first client device for: display to the first user, review by the first user, editing by the first user via user input to the first client device, and/or transmission by the first client device to the government server system via user input to the first client device.

FIG. 13I illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 13I and/or to perform some or all of the functionality discussed in conjunction with FIGS. 13A-13G.

Some or all of the executable instructions can be included in application data 315 that is generated by, is received from, and/or otherwise corresponds to the immigration assistance system 100. For example, execution of the application data 315 can cause the client device to implement functionality of the immigration digital photograph processing system 112 as illustrated in FIG. 13F and/or FIG. 13G.

Some or all steps of FIG. 13I can be performed based on communicating with one or more subsystems 101 of immigration assistance system 100. Some or all steps of FIG. 13I can be performed in a same or similar fashion as some or all steps of FIG. 13G. Some or all steps of FIG. 13I can be performed in conjunction with one or more of the various embodiments discussed in conjunction with FIG. 13G.

Step 1381 includes present digital photograph upload prompt data to a first user via an interactive user interface displayed via a display device of the client device. Step 1383 includes performing at least one image processing function upon the first digital photograph to automatically generate first digital photograph adherence data indicating whether the digital photograph adheres to each of a set of immigration digital photograph requirements. Step 1385 includes presenting, based on the first digital photograph adherence data indicating the first digital photograph does not adhere to at least one of the set of immigration digital photograph requirements, first digital photograph reupload prompt data for display to a first user via the interactive user interface.

Step 1387 includes generating second digital photograph upload data from the first client device that includes a second digital photograph of the first user based on user input to the first client device in response to at least one second prompt displayed via the interactive user interface to upload the second digital photograph. Step 1389 includes performing the at least one image processing function upon the second digital photograph to automatically generate second digital photograph adherence data indicating whether the second digital photograph adheres to each of the set of immigration digital photograph requirements. Step 1391 includes generating immigration application data that includes the second digital photograph in an immigration application for the first user based on the second digital photograph adherence data indicating the second digital photograph adheres to at least one of the set of immigration digital photograph requirements.

FIGS. 14A-14D present embodiments of an immigration application letter generator system 114. The immigration application letter generator system 114 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to automated generation of application letters, such as study plans, letters from family members or people providing financial assistance, or other letters, essays, and/or statements to be included in immigration applications. These application letters can be generated based on responses to prompts, such as a set of questions presented to the user and/or based on a template for the corresponding type of application letter. The application letters can optionally be generated based on other information, such as extracted data 539 from a document file 532 uploaded by the user, other response data 582 to previously presented prompts, such as responses to one or more questions presented in risk factor question data 810 and/or responses to one or more questions presented in application requirement question data 910.

In some embodiments, the immigration application letter generator system 114 can be implemented in conjunction with implementing the immigration application materials guided completion system 106 based on generating a corresponding immigration application letter as a completed application materials 531. In some embodiments, one or more application materials that include automatically generated application letters for a user are automatically submitted for the user via immigration application materials submission system 108. In some embodiments, only users with favorable risk assessment scores 541 previously generated via immigration eligibility risk assessment system 102 have application letters automatically generated by immigration digital photograph processing system 112.

Some or all of this functionality of the immigration application letter generator system 114 improves the technology of computer-based immigration systems based on improving the efficiency of processing immigration applications, for example, based on being generated in accordance with suggestions and/or requirements established by a corresponding government entity, where immigration applications are processed more quickly based on having immigration application letters that are consistent with established suggestions and/or requirements. Some or all of this functionality of the immigration application letter generator system 114 improves the technology of computer-based immigration systems based on generating a plurality of application letters that can be utilized over time as historical data utilized as input to one or more immigration analytical functions utilized determine trends in rate of granting of immigration applications to users and/or length of time in processing of immigration applications as a function of information included in and/or formatting of immigration application letters.

As illustrated in FIG. 14A, the immigration application letter generator system 114 can send application letter prompt data 1415 to a plurality of client devices 130.1-130.N. application letter prompt data 1415 can be presented to the corresponding user via interactive user interface 375, for example, as a plurality of questions, or other one or more prompts.

This plurality of questions can include multiple choice and/or other questions for selecting a short or simple response from a discrete set of options. Some questions can have continuous sets of options, but can correspond to simple response types, such as a monetary value indicated in response to "how much money do you make or currently hold in assets?" or "what is the name of the academic institution for your study program?". Some questions can encourage lengthier responses that include multiple sentences or paragraphs, such as "why do you wish to study in Canada vs. your home country?" Examples of questions presented in prompt data 1415 are illustrated in FIGS. 14G-14AB.

The application letter prompt data 1415 can be included in a prompt data sets 1010 based on the application letter being indicated in the set of application materials for completion by each given user of the plurality of client devices 130.1-130.N. As another example, the application letter prompt data 1415 is implemented as some or all of the input prompt instruction data 628 and/or document input instruction data 629 of an application letter generator function entry 712 as discussed in conjunction with FIGS. 6F and 6G, and/or FIGS. 7K and 7L. As another example, application letter prompt data 1415 is indicated in application data 318 sent to the client device 130 for execution. As another example, the application letter prompt data 1415 is sent to a corresponding client device based on receiving a request from the client device to create and/or complete an immigration application and/or to receive immigration assistance.

The immigration application letter generator system 114 can receive a plurality of response data 1425.1-1424.N. Each response data 1425 can be generated by the corresponding client device 130 based on user input to the client device 130 indicating responses to questions and/or other prompts indicated in the application letter prompt data 1415. Response data 1425 can be implemented as the set of responses 1-Q utilized as input to an application letter generator function of a corresponding application letter generator function entry 712. The response data 1425 can be included in an application material data set 1012 received from a corresponding user for an application material corresponding to an immigration application letter. Response data 1425 can alternatively or additionally be implemented as any other response data of user account 165, and can be stored in user account 165 for the corresponding user by immigration application letter generator system 114 based on being received from the corresponding client device 130.

The immigration application letter generator system 114 can implement an application letter generator module 1440, for example, via subsystem processing module 420 and/or subsystem memory module 410. The application letter generator module 1440 can generate each of a plurality of application letters 1430.1-1430.N from a corresponding one of the plurality of response data 1425.1-1425.N. For example, each application letter 1430 is generated by performing the application letter generator function in accordance with application letter generator function entry 712 by utilizing responses 1-Q indicated in the corresponding response data 1425 as input, for example, as discussed in conjunction with FIGS. 7K and 7L. Each application letter 1430 can be stored for the corresponding user in user account 165, for example as a corresponding application material 531.

The immigration application letter generator system 114 can implement an application letter submission module 1412 that facilitates submission of application letters 1430 to a government server system 140, for example, in conjunction with submission of a corresponding immigration application for the user. Submission of these application letters 1430 can be performed via implementing the immigration application materials submission system 108.

In some embodiments, the application letters 1430 are first sent to a corresponding client devices for review as draft immigration application letters. A given user can interact with interactive user interface 375 to read and/or otherwise review their draft immigration application letter, to approve draft for submission as a final immigration application letter with no changes, and/or to provide one or more edits to the draft to render a final immigration application letter that is different from the draft immigration application letter. The user can optionally submit the received and/or edited immigration application letter themselves via the client device 130 sending the immigration application letter to the government server system 140.

FIG. 14B illustrates an example where the immigration application letter generator system 114 is implemented by an application material completion module 1022.A for a corresponding type of application material, such as a study plan, a letter or explanation, a letter from a person providing funding to the user, and/or another type of letter, essay, and/or statement. The completed application material set 530 includes application material 531.A of the corresponding type as an application letter 1430 generated by the immigration application letter generator system 114. The immigration application materials submission system 108 can send the application letter 1430 in conjunction with sending the completed application material set 530 to the government server system 140.

FIG. 14C illustrates an embodiment of an application letter generator module 1440 that implements a plurality of response-based text generator modules 1455.1-1455.Q. Each response-based text generator modules 1455 can generate response-based text 1465 based on a corresponding one of a plurality of responses 1445.1-1445.Q of application letter response data 1425.

For example, the response-based text 1465 for a given response includes raw and/or edited text entered by the user as the corresponding response 1445. As another example, the response-based text 1465 is generated based on a mapping of each of a discrete set of selection options for the response to a corresponding set of text. One or more response-based text generator modules 1445 can be implemented based on performing a corresponding one of a set of response-based text generator functions 1456.1-1456.Q as discussed in conjunction with FIG. 7K, and/or based on accessing letter text mapping data 1455 to select text data 1457 mapped to a corresponding response selection option selected by the user and indicated in the corresponding response 1445.

An application letter 1430 can be generated to include the response-based text 1465.1-1465.Q. The application letter 1430 can be generated to further include template-based text 1475.1-1475.T, which can include fixed and/or predetermined text that is included in some or all application letters regardless of the responses in accordance with application letter template data 1450. For example, the response-based text 1465.1-1465.Q can fill in various portions of the application letter, where other portions of the application letter are populated with template-based text 1475.1-1475.T. The template-based text 1475.1-1475.T and/or other formatting of the application letter 1430 can be determined based on user input by an administrator and/or based on recommendations and/or requirements for the application letter established by the government entity.

Alternatively or in addition, some or all application letters 1430 are generated based on a natural language processing technique and/or artificial intelligence technique. For example, the application letter generator module utilizes a model trained from a training set of application letters corresponding to accepted applications, and/or with labeling data indicating whether or not the corresponding immigration application was granted and/or how long it took for corresponding immigration application to be granted, where this model is applied to generate the text of all application letters 1430 based on responses 1445.1-1445.Q and/or based on learned application letter template data that renders corresponding immigration applications more likely to be granted and/or to be granted quickly. This can be based on trends relating to text and/or formatting of application letters, and their correlation to a corresponding immigration application being granted and/or being granted within a favorable time period as one or more trends generated by implementing the historical immigration data processing system 124.

In some cases, some response-based text 1465 can alternatively or additionally generated based on extracted data 539 from one or more document files 532 uploaded by the user and/or prior response data 582 received from the user in response to previously presented prompts. For example, rather than re-asking a redundant question, at least one of the plurality of responses 1445 is auto-populated for the user based on: determining the corresponding question was previously asked and populating the response 1445 based on corresponding response data 582; and/or based on determining that the corresponding information is supplied in and/or was extracted from in a document file uploaded by the user.

As a particular example, one or more responses 1445 utilized to generate a study plan for the user can be automatically populated based on extracted data 539 extracted from a letter of acceptance from an academic institution, such as a start or end date of a study program, a field of study, a name of the academic institution, a tuition of the study program, or other information. Some or all response-based text 1465 included in the automatically generated application letter 1430 can indicate the start or end date of a study program, a field of study, a name of the academic institution, a tuition of the study program, or other information extracted from the letter of acceptance from the academic institution.

FIG. 14D illustrates an embodiment of a client device 130 that locally implements some or all functionality of the immigration application letter generator system 114, for example, based on storing and/or executing corresponding subsystem application data 318. In such embodiments, the application letter generator module 1440 and/or the application letter submission module 1412 can be implemented via client processing module 320 and/or client memory module 310.

In various embodiments, an immigration application letter generator system includes at least one processor, and at least one memory that stores executable instructions. The executable instructions, when executed by the at least one processor, can cause the immigration assistance system to: send first question data indicating a first set of immigration application letter questions to a first client device for display to a first user via an interactive user interface; receive first response data indicating a first set of responses to the first set of immigration application letter questions from the first client device, where the first client device generated the first response data based on user input to the first client device in response to at least one first prompt displayed via the interactive user interface to supply responses to the first set of immigration application letter questions; generate an immigration application letter by automatically generating natural language text data for inclusion in the immigration application letter based on the first set of responses; and facilitate submission of the immigration application letter in conjunction with submission of an immigration application for the first user.

In various embodiments, a client device includes at least one processor, and at least one memory that stores executable instructions. The executable instructions, when executed by the at least one processor, can cause the client device to: present first question data indicating a first set of immigration application letter questions to a first user via an interactive user interface displayed via a display device of the client device; generate first response data indicating a first set of responses to the first set of immigration application letter questions based on user input to the client device in response to at least one first prompt displayed via the interactive user interface to supply responses to the first set of immigration application letter questions; and generate an immigration application letter by automatically generating natural language text data for inclusion in the immigration application letter based on the first set of responses. An immigration application that includes the immigration application letter can be submitted for the first user based on transmission of the immigration application letter to a government server system.

FIG. 14E illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 14E and/or to perform some or all of the functionality discussed in conjunction with FIGS. 14A-14D.

Some or all steps of FIG. 14E can be performed by implementing an immigration application letter generator system 114. For example, at least one subsystem memory module of the immigration application letter generator system 114 stores executable instructions that, when executed by at least one subsystem processing module of the immigration application letter generator system 114, cause the immigration application letter generator system 114 to execute some or all steps of FIG. 14E and/or to perform some or all of the functionality discussed in conjunction with FIGS. 14A-14D.

Some or all steps of FIG. 14E can be performed by implementing and/or communicating with one or more other subsystems 101. Some or all steps of FIG. 14E can be performed by accessing user account database 162, utilizing some or all data of one or more user accounts 165, and/or generating some or all data of one or more user accounts 165. Some or all steps of FIG. 14E can be performed by accessing function library 172 and/or by performing one or more functions of function library 172. Some or all steps of FIG. 14E can be performed based on communicating with one or more client devices 130.

Step 1482 includes sending first question data indicating a first set of immigration application letter questions to a first client device for display to a first user via an interactive user interface. For example, the first question data is sent in application data that is stored by and/or executed by the first client device. As another example, the first question data is sent based on receiving a request from the first client device and/or based on determining to send the first question data to the first client device. The first set of immigration application letter questions can include a single question and/or can include multiple questions. The first set of immigration application letter questions can be displayed via the interactive user interface one at a time, in multiple, sequential views, and/or or all at once in a single view.

Step 1484 includes receiving first response data indicating a first set of responses to the first set of immigration application letter questions from the first client device. For example, the first client device generated the first response data based on user input to the first client device in response to at least one first prompt displayed via the interactive user interface to supply responses to the first set of immigration application letter questions. The first set of responses can include a single response and/or can include multiple responses. The first response data can be received in multiple, separate transmissions, for example, as each of the first set of responses are separately generated and transmitted by the first client device. The first response data can alternatively be received together in a same transmission, for example, after all of the first set of responses are generated by the first client device.

Step 1486 includes generating an immigration application letter by automatically generating natural language text data for inclusion in the immigration application letter based on the first set of responses. In various embodiments, the immigration application letter corresponds to a letter of explanation, such as a study plan, or a letter from a person providing funding.

Step 1488 includes facilitating submission of the immigration application letter in conjunction with submission of an immigration application for the first user. In various embodiments, facilitating submission of the immigration application letter includes transmitting the immigration application letter to a government server system. In various embodiments, facilitating submission of the immigration application for the first user includes sending the immigration application letter to the immigration application materials submission system 108 for submission.

In various embodiments, facilitating submission of the immigration application letter includes implementing the immigration application materials guided completion system 106 to complete an immigration application material corresponding to the immigration application letter. In various embodiments, facilitating submission of the immigration application letter includes implementing the immigration application materials submission system 108 to submit the immigration application letter in conjunction with an immigration application.

In various embodiments, facilitating submission of the immigration application letter for the first user includes sending the immigration application letter to the first client device for: display to the first user, review by the first user, editing by the first user via user input to the first client device, and/or transmission by the first client device to the government server system via user input to the first client device.

In various embodiments, generating the immigration application letter includes performing an application letter generator function. The application letter generator function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an application letter generator function entry 712, of function library 172; and/or otherwise determined by immigration assistance system.

In various embodiments, the method includes determining application letter template data. Generating the immigration application letter can be based on the application letter template data. In various embodiments, the application letter template data can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an application letter generator function entry 712, of function library 172; and/or otherwise determined by immigration assistance system.

In various embodiments, the method includes identifying a first application letter type from a plurality of application letter types. The method can further include selecting the first set of immigration application letter questions from a plurality of sets of immigration application letter questions based on the first application letter type. The method can further include identifying the application letter template data from a plurality of application letter template data based on the application letter type. The immigration application letter can be in accordance with the first application letter type. In various embodiments, the plurality of application letter types includes a letter of explanation type, and where a corresponding one of the plurality of application letter template data is in accordance with the letter of explanation type, for example, based on being a study plan.

In various embodiments, identifying the application letter type can be based on determining a set of required application materials, where the application letter type is indicated in the set of required application materials. For example, the set of required application materials is determined by implementing and/or communicating with the immigration application requirement identification system 104.

In various embodiments, identifying the application letter type can be based on accessing response log data of a user account for the user. For example, the response log data includes a set of responses generated by and received from the client device based on user input to one or more prior prompts.

In various embodiments, the method includes sending second question data indicating a set of immigration application questions to the first client device for display to a first user via an interactive user interface. The method can further include receiving second response data indicating a set of responses to the set of immigration application questions from the first client device. For example, the first client device generated the second response data based on user input to the first client device in response to at least one second prompt displayed via the interactive user interface to supply responses to the first set of immigration application letter questions. Identifying the application letter type from the plurality of application letter types is based on the second response data.

In various embodiments, the application letter type corresponds to a letter of explanation type. In various embodiments, the letter of explanation type is identified based on the second response data indicating the first user requires a study permit and/or the first user seeks participation in an educational program in a country corresponding to the government server system.

In various embodiments, automatically generating the natural language text data for inclusion in the immigration application letter is further based on at least one of the set of responses of the second response data.

In various embodiments, the method includes identifying a second application letter type from the plurality of application letter types. The method can further include selecting a second set of immigration application letter questions from the plurality of sets of immigration application letter questions based on the second application letter type and sending second question data indicating a second set of immigration application letter questions to the first client device for display to a first user via an interactive user interface. The method can further include receiving second response data indicating a second set of responses to the first set of immigration application letter questions from the first client device, where the first client device generated the second response data based on user input to the first client device in response to at least one second prompt displayed via the interactive user interface to supply responses to the second set of immigration application letter questions. The method can further include identifying second application letter template data from the plurality of application letter template data based on the second application letter type. The method can further include generating a second immigration application letter by automatically generating natural language text data for inclusion in the second immigration application letter based on the second set of responses. The immigration application can further include the second immigration application letter. Submission of the immigration application for the first user can be further based on transmission of the second immigration application letter to the government server system.

In various embodiments, the method includes sending document upload prompt data indicating at least one document to a first client device for display to a first user via an interactive user interface. The method can further include receiving document upload data from the first client device that includes at least one document file corresponding to the at least one document. For example, the first client device generated the document upload data based on user input to the first client device in response to at least one third prompt displayed via the interactive user interface to upload the at least one document file. The method can further include automatically extracting textual data from the at least one document file, for example, by performing at least one immigration extraction function. Automatically generating the natural language text data for inclusion in the immigration application letter can be further based on the textual data extracted from the at least one document file. In various embodiments, the at least one document file corresponds to at least one image file with image data capturing an image of the at least one document. Automatically extracting textual data from the at least one document file can include detecting textual data in the image data based on performing at least one image processing function.

In various embodiments, the method further includes sending a draft immigration application letter that includes the automatically generated natural language text data to the client device for display via the interactive user interface. The method can further include receiving a final immigration application letter from the client device based on user input to the first client device in response to at least one first prompt displayed via the interactive user interface to review the immigration application letter, where the final immigration application letter is transmitted to the government server system.

In various embodiments, the final immigration application letter includes at least one edit to the natural language text data based on user input to the first client device in response to at least one first prompt displayed via the interactive user interface to provide edits to the draft immigration application letter. In various embodiments, the final immigration application letter includes no edits to the natural language text data based on user input to the first client device in response to at least one first prompt displayed via the interactive user interface to approve the draft immigration application letter. In various embodiments, the final immigration application letter includes signature data for the first user based on user input to the first client device in response to at least one first prompt displayed via the interactive user interface to sign the draft immigration application letter.

FIG. 14F illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 14F and/or to perform some or all of the functionality discussed in conjunction with FIGS. 14A-14D.

Some or all of the executable instructions can be included in application data 315 that is generated by, is received from, and/or otherwise corresponds to the immigration assistance system 100. For example, execution of the application data 315 can cause the client device to implement functionality of the immigration application letter generator system 114 as illustrated in FIG. 14D.

Some or all steps of FIG. 14F can be performed based on communicating with one or more subsystems 101 of immigration assistance system 100. Some or all steps of FIG. 14F can be performed in a same or similar fashion as some or all steps of FIG. 14E. Some or all steps of FIG. 14F can be performed in conjunction with one or more of the various embodiments discussed in conjunction with FIG. 14E.

Step 1481 includes presenting first question data indicating a first set of immigration application letter questions to a first user via an interactive user interface displayed via a display device of the client device. Step 1483 includes generating first response data indicating a first set of responses to the first set of immigration application letter questions based on user input to the first client device in response to at least one first prompt displayed via the interactive user interface to supply responses to the first set of immigration application letter questions. Step 1485 includes generating an immigration application letter by automatically generating natural language text data for inclusion in the immigration application letter based on the first set of responses.

FIGS. 14G-14AB present example embodiments of a display by interactive user interface 375 that presents question data 633 and response selection parameter data 634 of example questions of application letter prompt data 1415. Some or all question data 633 and response selection parameter data 634 of FIGS. 14G-14AB can alternatively be utilized to implement any other prompts discussed herein, such as: questions of risk factor question data 810; questions of application requirement question data 910; any other questions of any response processing function entry 607 and/or information processing function entry 609; any prompts utilized to collect any other response data 582 discussed herein discussed herein; and/or any prompts presented to the user in conjunction with one or more other subsystems 101.

While not depicted in FIGS. 14G-14AB, the interactive user interface 375 can optionally display progress data 843 indicating progress of the user in completing a set of questions of the application letter prompt data 1415. The display progress data 843 can optionally be displayed in conjunction with all questions to indicate an ordering of the questions, a number of questions or sections already completed, and/or a number of questions or sections that have yet to be completed. The full set of questions presented to the user can optionally be presented one at a time in an ordering denoted by the display progress data 843.

While not depicted in FIGS. 14G-14AB, some or all question data 633 of application letter prompt data 1415 can be displayed in conjunction with a response guide prompt 847. When the user clicks on or otherwise indicates a selection to response guide prompt 847, the interactive user interface 375 can display response guide data 849 for the corresponding question indicating instructions, clarifications, or additional information, corresponding to the question. A response guide exit prompt 851 can be clicked on or otherwise selected to hide the response guide data 849, for example, when the user has completed reading the information or otherwise no longer needs this information.

FIGS. 15A-15G present embodiments of an immigration document verification system 116. The immigration document verification system 116 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to processing of uploaded document files to automatically determine whether the document files are verified, for example, to indicate whether or not the document files are believed and/or verified to be authentic, are believed and/or verified to have been generated by an official source, are believed and/or verified to have no issues that would render verification problems when reviewed by the government entity processing a corresponding immigration application, and/or whether a new document should be reuploaded to rectify verification problems with a given document. For example, the document files are uploaded in conjunction with completing application materials that include these document files. In some embodiments, the document files are only submitted when they are verified. In some embodiments, a user is dismissed from the immigration assistance system, where no further immigration assistance is provided to the user and/or where a corresponding user account is deactivated, based on verification data for an uploaded document indicating the user attempted to maliciously fabricate an official document for submission in their immigration application.

In some embodiments, the immigration document verification system 116 can be implemented in conjunction with implementing the immigration application materials guided completion system 106 based on generating verification data for documents in conjunction with completing a corresponding application materials 531. In some embodiments, one or more application materials that include documents for a user with verification data indicating verification of these documents are automatically submitted for the user via immigration application materials submission system 108. In some embodiments, only users with favorable risk assessment scores 541 previously generated via immigration eligibility risk assessment system 102 have document processed for verification by immigration document verification system 116.

Some or all of this functionality of the immigration document verification system 116 improves the technology of computer-based immigration systems based on improving the efficiency of processing immigration applications, for example, based on being determined to be verified to corresponding requirements prior to submission, where greater percentages of application materials are verified in the immigration applications and/or where individual immigration applications are processed more quickly based on having easily verifiable documents. Some or all of this functionality of the immigration document verification system 116 improves the technology of computer-based immigration systems based on gathering documents for a plurality of users that can be utilized over time as historical data utilized as input to one or more immigration analytical functions utilized determine trends in rate of granting of immigration applications to users and/or length of time in processing of immigration applications as a function of how authentic these documents are believed to be and/or whether or not these document are able to be verified.

As illustrated in FIG. 15A, the immigration digital photograph processing system 112 can send document upload prompt data 1515 to a plurality of client devices 130.1-130.N. For example, the document upload prompt data 1515 is included in a prompt data sets 1010 based on one or more corresponding type of documents being indicated in the set of application materials for completion by each given user of the plurality of client devices 130.1-130.N. As another example, the document upload prompt data 1515 is implemented as some or all of the input prompt instruction data 628 and/or document input instruction data 629 of a document verification function entry 714 as discussed in conjunction with FIGS. 7M-7O. As another example, document upload prompt data 1515 is indicated in application data 318 sent to the client device 130 for execution. As another example, the document upload prompt data 1515 is sent to a corresponding client device based on receiving a request from the client device to create and/or complete an immigration application and/or to receive immigration assistance.

Document upload prompt data 1515 can be presented to the corresponding user via interactive user interface 375, for example, as a document upload prompt 636 to upload a corresponding document file 532 for the corresponding type of application material, for example, as presented in FIGS. 10I-10O. The document upload prompt data 1515 can optionally be presented as a prompt to capture a screenshot of the corresponding type of application material via the client device 130, and/or as a prompt to utilize a camera of the client device to capture image data of the corresponding type of application material. The document upload prompt data 1515 can further present some or all requirements for the digital photograph that are required for verification, for example, as response guide data 849 presented in conjunction with a user selecting a presented response guide prompt 847.

The immigration document verification system 116 can receive a plurality of document files 532.1-532.N from the set of client devices 130.1-130.N. Each document files 532 can be uploaded by the corresponding client device 130 based on user input to the client device 130 indicating the digital photograph, such as a document file 532 corresponding to the digital photograph that is stored as a file 319 in a file system of the client device. In some cases, the document files 532 is generated by the client device, for example, via a camera of the client device and/or as a screenshot captured by the client device. The document files 532 can be included in an application material data set 1012 received from a corresponding user, and/or can optionally be stored in user account 165.

The immigration document verification system 116 can implement a document file verification data generator module 1540, for example, via subsystem processing module 420 and/or subsystem memory module 410. The document file verification data generator module 1540 can generate each of a plurality of verification data 537.1-537.N from a corresponding one of the plurality of document files 532.1-532.N. The verification data 537 can be generated based on document file verification data generator module 1540 performing a document verification function, for example, of a corresponding document verification function entry 714 as discussed in conjunction with FIGS. 7M-7O. Some or all verification data 537 can be stored for the corresponding user in user account 165, for example, as verification data 537 of a corresponding application material 531.

Each verification data 537 can indicate whether or not the corresponding document file is verified to have been generated by a claimed official entity, such as a government entity, banking entity, academic institution, testing entity, medical entity, insurance entity, housing entity, and/or other entity that is claimed to have generated one or more documents corresponding to a given types of application materials, such as any of the possible types of application materials described herein. Verification data 537 can indicate whether or not the document file is believed to contain true information. Verification data 537 can indicate whether or not the document file includes enough information for a corresponding application material and/or category of application material, such as proof of finances, proof of first year tuition, or other application materials relating to proof described herein. Verification data 537 can indicate whether or not the document file is believed to be verifiable by the government entity when the immigration application is processed.

Verification data 537 can alternatively or additionally indicate a verification score such as a percentage, probability value, or other numeric value. For example, the verification score indicating a level of confidence that the corresponding document file is authentic and/or a level of confidence that the corresponding document file will be able to be verified by the government entity. The verification score can alternatively or additionally indicate an estimated amount of processing time the corresponding document file will induce upon the immigration application being processed, for example, where lower and/or less favorable verification scores indicate greater estimated amount of processing time due to the corresponding document file requiring a longer time to inspect and/or verify by the government entity.

The immigration document verification system 116 can implement a document file submission module 1512 that facilitates submission of document file 532 with favorable verification data 537 to a government server system 140, for example, in conjunction with submission of a corresponding immigration application for the user. In this example, the document file 532.1 is submitted while the document file 532.N is not submitted based on document file 532.1 having favorable verification data 537.1 and based on document file 532.N having unfavorable verification data 537.N. Submission of these document file 532 with favorable verification data 537 can be performed via implementing the immigration application materials submission system 108. For example, the immigration document verification system 116 sends document files 532 with favorable verification data 537 to the government server system 140 directly. Alternatively, the user is notified of the verification of their uploaded document file, and the user submits their document file 532 to government server system 140 themselves via client device 130 sending the document file 532 to government server system 140.

The immigration digital photograph processing system 112 can implement a verification failure notification communication module 1514 that sends verification failure notification 1545 to ones of the client devices 130 that submitted digital photographs 1332 with unfavorable verification data 537. In this example, the verification failure notification 1545 is sent to client device 130.N and not client device 130.1 based on document file 532.1 having favorable verification data 537.1 and based on document file 532.N having unfavorable verification data 537.N. The verification failure notification 1545 can indicate reasons for and/or proposed corrections to the unfavorable verification data, such as instructions to supply additional supporting documentation and/or instructions to retake a photo of or rescan the document file to render an image file with better quality that could render favorable verification data.

FIG. 15B illustrates an example that generates verification data 537.1.1-537.1.R for various document files 532.1.1-532.1.R for various application materials 531 uploaded by a particular user 1 via client device 130.1. Ones of the user's document files 532 with favorable verification data 537 can be submitted via document file submission module 1512. In this example, document file 532.1.1 is submitted for the user and document file 532.R is not submitted for the user in this example based on document file 532.1.1 having favorable verification data 537.1.1 and based on document file 532.1.1 having unfavorable verification data 537.1.R. One or more verification failure notifications 1545 can be generated and sent to the user via verification failure notification communication module 1514 to indicate ones of the user's document files 532 with unfavorable verification data 537.

As used herein, the verification data 537 can be deemed favorable if it indicates the corresponding document file is verified, and/or if it indicates a verification score that meets, exceeds, or otherwise compares favorably to, a verification score threshold. As used herein, the verification data 537 can be deemed unfavorable if it indicates the corresponding document file was not verified, or has a verification score that falls below, or otherwise compares unfavorably to the verification score threshold. The verification score threshold can be configured by an administrator and/or can be generated automatically by the immigration assistance system. As a particular example, higher verification scores can correspond to more favorable verification scores and/or can indicate that a corresponding document file has a higher level of confidence that the corresponding document file is authentic and/or will be able to be verified by the government entity than document files with lower verification scores.

For example, first verification data 537 is favorable based on indicating indicates first user's document file is verified based on the document file being: confirmed and/or believed to be generated by an official entity, and/or being confirmed and/or believed to be authentic. Second verification data 537 is unfavorable based on indicating a second user's document file is not verified based on the document file not being confirmed nor believed to be generated by an official entity, and/or being confirmed nor believed to be authentic.

In some cases, the second verification being unfavorable can be due to the corresponding document file having poor resolution quality and/or not including enough information to render verification. For example, the second document file is not necessarily believed to be fraudulent, but is not sufficient to be confidently deemed authentic. This can be problematic in submitting the immigration application for the second user, as this could cause delay in processing of their immigration application or could cause their immigration application to be rejected, even though the second user did not maliciously attempt to submit fraudulent documents. Rectifying this problem, for example, via supplemental documentation and/or better picture quality capturing the document, can be ideal, and can be facilitated for the second user by the immigration document verification system.

As a particular example, a user is prompted to submit a screenshot indicating their acceptance to a study program via verification failure notification 1545 based on their uploaded letter of acceptance having an unfavorable verification score. As another particular example, a user is prompted to submit further documentation via verification failure notification 1545 corresponding to the proof of finances category based on their uploaded documentation for the proof of finances category having an unfavorable verification score. In such embodiments, the verification data 537 can be utilized to automatically regenerate the required material set 521 and/or the recommended material set 522 to indicate these supplemental materials that could induce favorable verification data.

In other embodiments, as some types of documents may not be editable or regeneratable, the verification failure notification 1545 can be implemented as a warning notification indicating the document could not be verified, and could cause the user's application to take longer to process and/or may cause the user's application to not be accepted.

In some embodiments, the risk assessment score 541 can be generated as a function of verification data of one or more document files 532 uploaded by the user for inclusion as application materials 531 of their immigration application. For example, a first user has a more favorable risk assessment score 541 than a second user based on the first having uploaded a document file 532 for a type of application material with a more favorable verification score than the verification score for a document file 532 uploaded for the type of application material by the second user. As another example, a first user has a more favorable risk assessment score 541 than a second user based on a greater proportion of their document files 532 having favorable verification scores than the second user.

In some cases, the second verification being unfavorable can be due to the corresponding document file having clear signs of being doctored and/or being fraudulently generated, such as language exam results with language skill scores that were clearly edited and/or language exam results clearly not generated by a testing entity. This can cause the immigration assistance system to flag the second user as a malicious user, where the second user is dismissed from further assistance by the immigration assistance system 100 and/or has their user account deactivated.

FIGS. 15C and 15D illustrate an embodiment of an immigration assistance system that prompts users to upload subsequent digital photographs based on their received digital photographs having unfavorable verification data 537, for example, in a same or similar fashion of prompting multiple digital photograph attempts based on prior attempts having unfavorable adherence data as described in conjunction with FIGS. 13B and 13C.

As illustrated in FIG. 15C, a document upload prompt communication module 1518 sends document upload prompt data 1515.1.*i* corresponding to an ith attempt by a user of client device 130.1 to upload a document file for a given type of application material 531.1 to render favorable verification data. For example, the document upload prompt data 1515.*i* is sent to client device 130.1 based on the first i−1 document files for the corresponding type of application material received from client device 130 having rendered unfavorable verification data. Display of document upload prompt data 1515.*i* can indicate instructions to upload an ith document file and/or can indicate particular instructions and/or suggestions for rectifying the verification failure of prior document file attempt 1510.1.1.*i*−1. The client device 130.1 can send a document file 1510.1.*i* in response, denoting the ith document file received from the user of client device 130.1 for the corresponding type of document file. For example, the client device captures document file 1510.1.*i* via a camera of the client device, via uploading a new file 319 stored by client device, and/or via capturing a screenshot of the display by the display device of the client device 130.

As illustrated in the example of FIG. 15C, the document file verification data generator module 1540 generates verification data 537.1.1.*i* for document file 532.1.1.*i*, which indicates verification failure of document file 532.1.1.*i*. This verification failure of document file 532.1.1.*i* causes the document upload prompt communication module 1518 to send document upload prompt data 1515.*i*+1, as illustrated in FIG. 15D. Display of document upload prompt data 1515.*i*+1 can indicate instructions to upload an i+1th document file of the corresponding document type and/or can indicate particular issues for the document file attempt 537.1.1.*i* of FIG. 13B. For example, the document upload prompt data 1515.*i*+1 indicates a verification failure notification 1545 generated based on the verification data 537.1.1.*i*, and further indicates instructions to upload another version of the same document file and/or supplemental document files.

The client device 130.1 can send a new digital photograph document file 532.1.1.*i*+1 in response, denoting the i+1th document file received from the user of client device 130.1 for the corresponding type of application material. For example, the client device captures document file 532.1.1.*i*+1 via a camera of the client device, via uploading a new file 319 stored by client device, and/or via capturing a screenshot of the display by the display device of the client device 130. In this case, the document file verification data generator module 1540 generates verification data 537.1.1.*i*+1 for document file 532.1.1.*i*+1, which indicates verification of document file 532.1.1.*i*+1. No further upload prompts need be sent to client device 130, as a document file with favorable verification data 537 was obtained. The document file submission module 1512 can facilitate submission of document file 532.1.1.*i*+1 for the corresponding user via transmission of document file 532.1.1.*i*+1 to government server system 140.

FIG. 15E illustrates an example where the immigration document verification system 116 is implemented by an application material completion module 1022.A for a corresponding type of application material. The completed application material set 530 includes application material 531.A of the corresponding type as a document file with favorable verification data, for example, where the corresponding application material is deemed complete and thus included in the completed application material set 530 if the corresponding document file 532 is determined to be verified. The immigration application materials submission system 108 can send this document file with favorable verification data in conjunction with sending the completed application material set 530 to the government server system 140.

For example, the completed application material set 530 includes document file 1510.1.1.*i*+1 of FIG. 15D based on being the first attempt with corresponding verification data 537 indicating the document file of the corresponding application material is verified. One or more prior document file attempts 1510.1.1.1-1510.1.1.*i* are not included in the completed application material set 530, and are thus not submitted to government server system 140, based on having unfavorable verification data, thus not rendering the corresponding application material 531.A as complete.

In some embodiments, verification data can be generated for any types of document files discussed herein, application material completion modules 1022 that apply corresponding document verification functions to generate verification data for corresponding uploaded document files 532 can correspond to types application materials 531 such as: application materials corresponding to letters of acceptance to schools or other academic institutions; passports; travel documents; language test results; transcripts and/or mark sheets from academic institutions; medical exam results; GIC application materials; bank statements; purchase receipts; and/or any other types of application materials 531 discussed herein.

FIG. 15F illustrates an embodiment of a document file verification data generator module 1540 that generates image detection data 1365 for each of a set of verification requirements 1555.1-1555.Z of a document verification adherence requirements set 1550, such as the document verification requirement set 1550 indicated by a corresponding document verification function entry 714 of FIG. 7O. Some or all verification requirements 1555.1-1555.Z can be determined based on user input by an administrator and/or based on recommendations and/or requirements for the corresponding type of digital photograph established by the government entity. Some or all verification requirements 1555.1-1555.Z can be implemented as any digital photograph requirements 1355 and/or document requirements 1355 discussed herein, for example, in conjunction with FIG. 7J. Alternatively, the verification requirements 1555.1-1555.Z are distinct from these digital photograph requirements 1355 and/or other document requirements based on the verification requirements 1555 being utilized to verify authenticity and/or thoroughness of a given documents, while the digital photograph requirements 1355 and/or other document requirements are utilized to ensure documents adhere to requirements established by the government entity, such as recency of the documents, information required in the documents, or other requirements.

In particular, the document verification requirements set 1550 can optionally include one or more requirements discussed in conjunction with 7O, such as verification requirements regarding: required seals, required watermarks, required signatures, required document format, required logos and/or other image data, requirements regarding textual data, and/or other requirements.

The set of image detection data 1365.1-1365.Z can be generated to indicate whether image data corresponding to each requirement is detected in the document file, indicating whether the corresponding requirement was met or not met based on being detected or not detected in the document file. Generating the image detection data 1365.1-1365.Z can include performing at least one image processing function, for example, as indicated by the corresponding document verification function entry 714. Some image detection data 1365.1-1365.Z can correspond to text and can include performing at least one text processing function, for example, as indicated by the corresponding document verification function entry 714.

Alternatively or in addition, some or all verification data for one or more types of document files described herein are generated based on an image processing technique, natural language processing technique, and/or artificial intelligence technique. For example, the document file verification data generator module utilizes a computer vision model trained from a training set of documents corresponding to accepted applications, and/or with labeling data indicating whether or not the corresponding immigration application was granted and/or how long it took for corresponding immigration application to be granted, where this model is applied to generate adherence data for incoming documents based on learned requirements and/or detectable features in image data of the document files that renders corresponding immigration applications more likely to be granted and/or to be granted. As another example, the document file verification data generator module utilizes a natural language processing model trained from a training set of documents corresponding to accepted applications, and/or with labeling data indicating whether or not the corresponding immigration application was granted and/or how long it took for corresponding immigration application to be granted, where this model is applied to generate adherence data for incoming documents based on learned requirements and/or detectable features in textual data of the document files that renders corresponding immigration applications more likely to be granted and/or to be granted quickly based on verification of these documents by the government entity. This can be based on trends relating to verification of document files and/or detectable features in image and/or textual data of the document photographs, and their correlation to a corresponding immigration application being granted and/or being granted within a favorable time period as one or more trends generated by implementing the historical immigration data processing system 124.

FIGS. 15G and 15H illustrate an embodiment of a client device 130 that locally implements some or all functionality of the immigration document verification system 116, for example, based on storing and/or executing corresponding subsystem application data 318. In such embodiments, the document file verification data generator module 1540, the verification failure notification communication module 1514, and/or the document file submission module 1512 can be implemented via client processing module 320 and/or client memory module 310. In some cases, the client device is operable to prompt the corresponding user to upload multiple attempts of document files until verification is achieved as discussed in conjunction with FIGS. 15C and 15D.

In various embodiments, an immigration document verification system includes at least one processor, and at least one memory that stores executable instructions. The executable instructions, when executed by the at least one processor, can cause the immigration document verification system to: send a document upload prompt indicating a set of immigration application materials to a first client device for display to a first user via an interactive user interface; receive first document upload data from the first client device that includes a first set of document files corresponding to the set of immigration application materials for the first user, where the first client device generated the first document upload data based on user input to the first client device in response to at least one prompt displayed via the interactive user interface to upload document files for the set of immigration application materials; generate a first set of document verification data by performing at least one document verification function upon the first set of document files; facilitate submission the first set of document files, based on each of the first set document verification data indicating a corresponding one of the first set of document files was verified successfully, in conjunction submission of an immigration application for the first user; send the document upload prompt indicating the set of immigration application materials to a second client device for display to a second user via an interactive user interface; receive second document upload data from the first client device that includes a second set of document files corresponding to the set of immigration application materials for the second user, where the second client device generated the second document upload data based on user input to the second client device in response to at least one prompt displayed via the interactive user interface to upload document files for the set of immigration application materials; generate a second set of document verification data by performing the at least one document verification function upon the second set of document files; and/or send, to the second client device for display to the second user via an interactive user interface, a verification failure notification indicating the verification failure for one of the second set of document files based on at least one of the second set of document verification data indicating document verification failure for the one of the first set of document files.

In various embodiments, a client device includes at least one processor, and at least one memory that stores executable instructions. The executable instructions, when executed by the at least one processor, can cause the client device to: present a document upload prompt indicating a set of immigration application materials to a first user via an interactive user interface displayed via a display device of the client device; generate first document upload data that includes a first set of document files corresponding to the set of immigration application materials for the first user based on user input to the client device in response to the document upload prompt; generate a first set of document verification data by performing at least one document verification function upon the first set of document files; and/or display a failure notification indicating the verification failure for one of the first set of document files is displayed based on one of the first set of document verification data indicating document verification failure for the one of the first set of document files.

FIG. 15I illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 15I and/or to perform some or all of the functionality discussed in conjunction with FIGS. 15A-15H.

Some or all steps of FIG. 15I can be performed by implementing an immigration document verification system 116. For example, at least one subsystem memory module of the immigration document verification system 116 stores executable instructions that, when executed by at least one subsystem processing module of the immigration document verification system 116, cause the immigration document verification system 116 to execute some or all steps of FIG. 15I and/or to perform some or all of the functionality discussed in conjunction with FIGS. 15A-15H.

Some or all steps of FIG. 15I can be performed by implementing and/or communicating with one or more other subsystems 101. Some or all steps of FIG. 15I can be performed by accessing user account database 162, utilizing some or all data of one or more user accounts 165, and/or generating some or all data of one or more user accounts 165. Some or all steps of FIG. 15I can be performed by accessing function library 172 and/or by performing one or more functions of function library 172. Some or all steps of FIG. 15I can be performed based on communicating with one or more client devices 130.

Step 1582 includes sending a document upload prompt indicating a set of immigration application materials to a first client device for display to a first user via an interactive user interface. Step 1584 includes receiving first document upload data from the first client device that includes a first set of document files corresponding to the set of immigration application materials for the first user. For example, the first client device generated the first document upload data based on user input to the first client device in response to at least one prompt displayed via the interactive user interface to upload document files for the set of immigration application materials.

Step 1586 includes generating a first set of document verification data by performing at least one document verification function upon the first set of document files. Step 1588 includes facilitating submission the first set of document files, based on each of the first set document verification data indicating a corresponding one of the first set of document files was verified successfully, in conjunction submission of an immigration application for the first user.

Step 1590 includes sending the document upload prompt indicating the set of immigration application materials to a second client device for display to a second user via an interactive user interface. Step 1592 includes receiving second document upload data from the first client device that includes a second set of document files corresponding to the set of immigration application materials for the second user. For example, the second client device generated the second document upload data based on user input to the second client device in response to the at least one prompt displayed via the interactive user interface to upload document files for the set of immigration application materials.

Step 1594 includes generating a second set of document verification data by performing the at least one document verification function upon the second set of document files. Step 1596 includes sending, to the second client device for display to the second user via an interactive user interface, a verification failure notification indicating the verification failure for one of the second set of document files based on at least one of the second set of document verification data indicating document verification failure for the one of the set of document files.

In various embodiments, the at least one document verification function be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more document verification function entries 714, of function library 172; and/or otherwise determined by immigration assistance system.

In various embodiments, a subset of the first set of document files each includes image data capturing a corresponding one of a subset of the set of immigration application materials. Performing the at least one document verification function upon the first set of document files includes performing at least one image processing function upon the image data of the subset of the first set of document files to generate a corresponding subset of the set of document verification data. In various embodiments, the at least one image processing function be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as one or more image processing entries 601, of function library 172; and/or otherwise determined by immigration assistance system.

In various embodiments, performing the at least one image processing function upon one document of the subset of the first set of document files includes detecting a portion of the corresponding image data corresponding to an embossment upon the one document, a watermark upon the one document, and/or a seal upon the one document.

In various embodiments, one of the subset of the set of immigration application materials corresponds to a document generated by an academic institution. Performing the at least one image processing function upon the image data of a corresponding one of the subset of the first set of document files can include detecting: a logo of the academic institution in the image data, and/or a letterhead corresponding to the academic institution in the image data.

In various embodiments, one of the subset of the set of immigration application materials corresponds to a document generated by a language testing institution. Performing the at least one image processing function upon the image data of a corresponding one of the subset of the first set of document files includes detecting a logo of the language testing institution in the image data, and/or a letterhead corresponding to the language testing institution in the image data.

In various embodiments, one of the subset of the set of immigration application materials corresponds to a document generated by a government entity. Performing at least one image processing function upon the image data of a corresponding one of the subset of the first set of document files can include detecting: a logo of the government entity in the image data and/or a letterhead corresponding to the government entity in the image data.

In various embodiments, one of the subset of the set of immigration application materials corresponds to a document generated by a government entity. Performing the at least one image processing function upon the image data of a corresponding one of the subset of the first set of document files can includes detecting: a logo of the government entity in the image data, and/or a letterhead corresponding to the government entity in the image data.

In various embodiments, performing the at least one document verification function upon one of the subset of the first set of document files includes extracting text from the image data of the one of the one of the subset of the first set of document files by performing the at least one image processing function upon the image data of the one of the subset of the first set of document files, and performing at least one natural language processing function upon the extracted text to generate text discrepancy data for the one of the subset of the first set of document files. The document verification data for the one of the subset of the set of immigration application materials can be generated based on the text discrepancy data.

In various embodiments, the method includes determining a set of requirements for some or all of the set of immigration materials. Performing the at least one document verification function upon each of first set of document files can include determining whether each of the set of requirements for the corresponding one of the set of immigration materials is met. In various embodiments, the verification failure notification indicates the one of the second set of document files and further indicates a proper subset of the set of requirements that failed for the one of the second set of document files based on the second set of document verification data indicating document verification failure for the one of the set of document files.

In various embodiments, the second set of document verification data indicates the document verification success for a second proper subset of the second set of document files, for example, based on each of the second proper subset of the second set of document files meeting all of the corresponding set of requirements for the corresponding one of the set of immigration materials. The second proper subset of the second set of document files can correspond to a set difference between the second set of document files and the one of the second set of document files, for example, based on only the of the second set of document files failing to meet its corresponding set of requirements.

In various embodiment the verification failure notification includes document reupload prompt data indicating one of the set of application materials corresponding to the one of the second set of document files the second user for display via the interactive user interface. The method can further include receiving third document upload data from the second client device that includes a new document file corresponding to the one of the set of application materials, where the first client device generated the third document upload data based on user input to the second client device in response to the document reupload prompt data displayed via the interactive user interface, generating new document verification data for the second user by performing at least one document verification function upon the new document file, and facilitating submission the new document file and the second proper subset of the second set of document files, based on the new document verification data indicating the new document file was verified successfully, in conjunction submission of an immigration application for the second user.

In various embodiments, facilitating submission of the first set of document files includes transmitting the first set of documents files to a government server system corresponding to a government entity. In various embodiments, facilitating submission of the immigration application for the first user includes sending the first set of document files to the immigration application materials submission system 108 for submission.

In various embodiments, facilitating submission of the first set of document files includes implementing the immigration application materials guided completion system 106 to complete a set of immigration application materials corresponding to the first set of document files. In various embodiments, facilitating submission of the second digital photograph includes implementing the immigration application materials submission system 108 to submit the first set of document files in conjunction with an immigration application.

In various embodiments, facilitating submission of the first set of document files for the first user includes sending some or all of the set of the first set of document files to the first client device for: display to the first user, review by the first user, editing by the first user via user input to the first client device, and/or transmission by the first client device to the government server system via user input to the first client device.

FIG. 15J illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 15J and/or to perform some or all of the functionality discussed in conjunction with FIGS. 15A-15H.

Some or all of the executable instructions can be included in application data 315 that is generated by, is received from, and/or otherwise corresponds to the immigration assistance system 100. For example, execution of the application data 315 can cause the client device to implement functionality of the immigration document verification system 116 as illustrated in FIGS. 15G and/or 15H.

Some or all steps of FIG. 15J can be performed based on communicating with one or more subsystems 101 of immigration assistance system 100. Some or all steps of FIG. 15J can be performed in a same or similar fashion as some or all steps of FIG. 15I. Some or all steps of FIG. 15J can be performed in conjunction with one or more of the various embodiments discussed in conjunction with FIG. 15I.

Step 1581 includes presenting a document upload prompt indicating a set of immigration application materials to a first user via an interactive user interface displayed via a display device. Step 1583 includes generating first document upload data from the first client device that includes a first set of document files corresponding to the set of immigration application materials for the first user based on user input to the first client device in response to the document upload prompt. Step 1585 includes generating a first set of document verification data by performing at least one document verification function upon the first set of document files. Step 1587 includes displaying a failure notification indicating the verification failure for one of the first set of document files is displayed based on one of the first set of document verification data indicating document verification failure for the one of the set of document files.

FIGS. 16A-16N illustrate embodiments of an immigration applicant service setup system 118. The immigration application materials submission system 108 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to automated setup of one or more services in the country to which the user is immigrating. For example, the immigration assistance system can assist the user in acquiring a bank account, credit card, debit card, housing, cellular plan, health plan, social insurance number, tax preparation services, legal services, cultural information, and/or other types of services. The immigration assistance system can aid the user in acquiring these services before they enter the country to which they are immigrating, for example, based on providing this assistance once the user's immigration application is submitted, and/or once acceptance data indicating the user's immigration application is granted is received. Receiving this assistance from the immigration assistance system can be ideal, as the immigration assistance system can leverage various information and/or documents already determined and gathered for the user and/or stored in user account 165 as required to set up the user's immigration application.

In some embodiments, a corresponding immigration application is first prepared and/or submitted for the user, for example, via immigration application material completion system 106 and/or via immigration application materials submission system 108. In some embodiments, only users with immigration application materials completed and/or submitted by the immigration assistance system are provided this assistance in setting up services via the immigration applicant service setup system 118. In some embodiments, if only users with favorable risk assessment scores 541 previously generated via immigration eligibility risk assessment system 102 have immigration application materials completed and submitted by immigration assistance system, only users with favorable risk assessment scores 541 previously generated via immigration eligibility risk assessment system 102 are provided this assistance in setting up services via the immigration applicant service setup system 118. Alternatively, in other embodiments, the user completes and/or submits some or all immigration application materials independently, and receives assistance in acquiring services based on sending a request for immigration services to the immigration assistance system 100 after preparing and/or submitting their immigration application. In some embodiments, only users with favorable risk assessment scores 541 previously generated via immigration eligibility risk assessment system 102 have immigration application materials submitted by immigration application materials submission system 108.

Some or all of this functionality of the immigration applicant service setup system 118 improves the technology of computer-based immigration systems based on improving the efficiency of setting up services for immigration applicants who will be immigrating, for example, based on automatic submission of one or more materials rather than necessitating that users perform this tedious task on their own, and/or based on automatically selecting and/or catering services for the user based on information automatically received from and/or determined for the user from their immigration application. Some or all of this functionality of the immigration applicant service setup system 118 improves the technology of computer-based service setup systems with service providers based on improving the efficiency and/or effectiveness of setting up these services for immigrants to a country, for example, based on some or all of this setup being based on their immigration application.

As illustrated in FIG. 16A, the immigration applicant service setup system 118 can send service option data 1610 to a given client device 130.1 corresponding to a user of the immigration assistance system 100. The service option data 1610 can be presented to the corresponding user via interactive user interface 375, for example, as a plurality of questions, or other one or more prompts. As a particular example, the service option data 1610 can indicate a set of different types of services, enabling the user to select which of the different types of services they wish to acquire in the country to which they are immigrating.

The service option data 1610 can implemented as some or all of the input prompt instruction data 628 and/or document input instruction data 629 of one or more service initiation function entries 716 for one or more types of services presented to the user as options in service option data 1610, as discussed in conjunction with FIGS. 6F and 6G, and/or FIGS. 7P-7S. As another example, service option data 1610 is indicated in application data 318 sent to the client device 130 for execution. As another example, the service option data 1610 is sent to a corresponding client device based on receiving a request from the client device to obtain services in a country to which they are immigrating and/or to receive immigration assistance.

The immigration applicant service setup system 118 can receive service selection data_set 1615 from the client device 130.1. The service selection data set 1615 can be generated by the corresponding client device 130.1 based on user input to the client device 130.1 indicating responses to questions and/or other prompts indicated in the service option data 1610, and/or other selection of the user selecting one or more services from the set of service options in the service option data 1610. In particular, the service selection data_set 1615 can include a set of service selection data 1655.1-1655.C.

Each service selection data 1655 can correspond to data regarding a particular type of service and/or particular service provider, and can indicate that the user selected to set up a service of the corresponding type and/or with the corresponding provider. For example, the service option data 1610 indicated at least C possible options, and the user selected a set of C options for setup as a subset of the presented set of options based on interaction with interactive user interface 375.

One or more service selection data 1655 can further indicate additional information for the given service, such as a set of responses 1-Q and/or a set of document files 1-R utilized as input to a service initiation function of a corresponding service initiation function entry 716. Service selection data 1655 can alternatively or additionally be implemented as any other response data of user account 165, and can be stored in user account 165 for the corresponding user by immigration application letter generator system 114 based on being received from the corresponding client device 130.

The immigration applicant service setup system 118 can implement a service setup initiation data generator module 1620, for example, via subsystem processing module 420 and/or subsystem memory module 410. The service setup initiation data generator module 1620 can generate each of a plurality of service setup initiation data 1612.1-1612.C for the user based on a corresponding one of the set of service selection data 1612.1-1612.C. For example, each service setup initiation data 1612 is generated by performing a service initiation function in accordance with a corresponding service initiation function entry 716 by utilizing service selection data 1655 as input, for example, as discussed in conjunction with FIGS. 7P-7S. Each service setup initiation data 1612 can optionally be stored for the corresponding user in user account 165 for the user.

The immigration applicant service setup system 118 can implement a service setup initiation data transmission module 1630 that facilitates submission of each of the set of service setup initiation data 1612.1-1612.C to a corresponding one of a set of service provider entities 1640.1-1640.C. This can include sending each service setup initiation data 1612 to a server system associated with the corresponding service provider entity 1640 or otherwise communicating the service setup initiation data 1612 with a person and/or automated system associated with the corresponding service provider entity 1640.

For example, each service setup initiation data 1612 indicates a name and/or contact information for the user, a desired start date and/or end date of the service for the user, payment information regarding payment of the service, other configuration of the service for the user, and/or other information that enables and/or instructs the service provider entity 1640 to initiate and/or complete setup of the corresponding service for the user. For example, the service provider entity contacts the user via contact information indicated in the service setup initiation data 1612 to complete the setup of the corresponding service. As another example, the service provider entity completes setup of the service for the user without additional information from the user based on all required information being included in service setup initiation data 1612. The The service provider entity can provide set up assistance, for example, in conjunction with submission of a corresponding immigration application for the user. Submission of these application letters 1430 can be performed via implementing the immigration application materials submission system 108.

In some embodiments, the application letters 1430 are first sent to a corresponding client devices for review as draft immigration application letters. A given user can interact with interactive user interface 375 to read and/or otherwise review their draft immigration application letter, to approve draft for submission as a final immigration application letter with no changes, and/or to provide one or more edits to the draft to render a final immigration application letter that is different from the draft immigration application letter. The user can optionally submit the received and/or edited immigration application letter themselves via the client device 130 sending the immigration application letter to the government server system 140.

FIG. 16B illustrates an embodiment of an immigration applicant service setup system 118 that implements the service setup initiation data generator module 1620 via a plurality of service type setup modules 1622.1-1622.C, where each service type setup modules 1622 corresponds to one of a set of service types. One or more service type setup module 1622 can optionally correspond to a particular one of a set of service providers of a set of service types selected to provide a given service type for the user. Each service type setup module 1622 can generate service setup initiation data 1612 for the corresponding service type and/or service provider based on the corresponding service selection data 1655 based on performing a corresponding service initiation function, as indicated by a corresponding one of a set of service initiation function entries 716.1-716.C, for example, based on the corresponding service initiation function entry 716 having a corresponding service provider 551.A that corresponds to the service type and/or service provider of the given service type setup module 1622.

As illustrated in FIG. 16C, a given service type setup module 1622.1 for a given service type and/or service provider can utilize a set of one or more responses 556.1-556.Q of service selection data 1655 to generate the corresponding service setup initiation data 1612. For example, each response is utilized to populate one of a plurality of form fields implemented as service setup initiation data 1612 for a form to be sent to and/or populated via a website presented by the corresponding service provider that is accessed by the immigration assistance system. The plurality of responses 556.1-556.Q can not only indicate the user's selection to set up the corresponding service, but can correspond to answers to other questions regarding setup the user, such as configuration of the service by the user. This can include responses to questions regarding when the service should initiation, which of a plurality of service packages offered by the service provider the user wishes to select, payment details indicating how the user will pay for the service, and/or other configuration of the service by the user. In some embodiments, the responses 556.1-556.Q are optionally utilized to automatically select a particular service provider for a selected type of service from a plurality of service provider options, where the service is initiated for the user with the selected particular service provider and not other ones of the plurality of service provider options for the given type of service.

Alternatively or in addition, as illustrated in FIG. 16D, a given service type setup module 1622.1 for a given service type and/or service provider can utilize a set of one or more document files 532.1-532.Q of service selection data 1655 to generate the corresponding service setup initiation data 1612. For example, the service setup initiation data 1612 can be generated to include one or more document files 532, based on these document files 532 being required for and/or aiding in the setup of the service for the user. As another example, the service setup initiation data 1612 can be generated to include data extracted from one or more document files 532, for example, by performing an information extraction function and/or by utilizing the immigration information extraction system 110. For example, corresponding extracted data 539 extracted from one or more document files 532 is utilized to populate one of a plurality of form fields implemented as service setup initiation data 1612 for a form to be sent to and/or populated via a website presented by the corresponding service provider that is accessed by the immigration assistance system.

These document files may correspond to can types of documents that were not required for the user's immigration application but are necessary for setting up of the corresponding service. Alternatively one or more of these document files may correspond to a document that was also utilized for and/or included in the user's immigration application. In such cases, the immigration applicant service setup system 118 can optionally retrieve these document files 532 from the user's account and/or from the completed application material set 530 submitted for the user, rather than necessitating that this document is reuploaded by the user.

FIG. 16E illustrates such an example where prior information received from and/or generated for the user is utilized as input to a given service type setup module alternatively or in addition to the service selection data 1655. For example, the service selection data 1655 can simply indicate the user selected to setup the corresponding type of service, and some or all necessary details for obtaining this service with the service provider can be extracted from the wealth of information already collected for the user in conjunction with the prior preparation of the user's immigration application. One or more documents 532 included in an immigration application material 531 can be included in the service setup initiation data 1612, and/or can have their extracted data 539 included in the service setup initiation data 1612, where these documents need not be re-uploaded by the user. Some or all of the extracted data 539 may have been already extracted and stored in user account 165, for example, based on a corresponding document file 532 being processed by immigration information extraction system 110 to generate one or more other application materials 531 of the immigration application. One or more responses to previously presented prompts can be included in and/or utilized to generate the service setup initiation data 1612, where these questions need not be re-asked to the user.

For example, a start date and/or end date for the service, such as a housing for the user or a cellular phone plan, can be determined automatically by the immigration applicant service setup system 118 based on: accessing country entry date 504 in user account, accessing expiration date 509 in user account, extracting study program start and end dates from an application material 531 corresponding to an acceptance letter from a study program, extracting immigration start and/or expiration dates from application acceptance data 1145, travel schedule data 571 for the user, such as flight data received from the client device 130 and/or determined for the user, and/or otherwise determining the start and end date.

As another example, an address or location, such as a neighborhood, region, or town for housing for the user and indicated to a housing provider, such as a rental company and/or real estate agent can, and/or utilizes to filter a plurality of possible housing providers by their location within the country, can be determined automatically by the immigration applicant service setup system 118 based on: an address of a study program the user is attending extracted from an acceptance letter of the study program or other responses and/or materials associated with the study program; an address of a place of work for the user extracted from an offer letter of a corresponding employer program or other responses and/or materials associated with the employment; or other materials regarding where the user will be living within the country. In some embodiments, if the user indicated in prior responses and/or documents for the immigration application that they already have housing, will be living in student housing of the study program, and/or will be living with a relative or other person, such as person financially supporting the user in the country, the service option data 1610 optionally does not indicate housing, as the user has already secured their housing.

As another example, a social security number, birthdate, legal name, or other identifying information and/or sensitive information may be required to set up a bank account, credit card, and/or debit card with a banking entity. The social security number, birthdate, legal name, or other identifying information and/or sensitive information can be extracted from a passport of the user, proof of finances supplied by the user, one or more responses received by the user, and/or other documents and/or responses received from the user and utilized to complete the immigration application.

While not depicted, the submission confirmation data 1125 and/or application acceptance data 1145 received from the government server system 140 can optionally be utilized and/or have data extracted for inclusion in the included in the service setup initiation data 1612, In some embodiments, if multiple services are setup for a user one at a time, the service selection data 1655, service setup initiation data 1612, and/or confirmation of setup of the corresponding service received from the corresponding service provider can be utilized as input to a given service type setup module alternatively or in addition to the service selection data 1655.

For example, after the user acquires housing via a housing provider based on the immigration applicant service setup system 118 generating and sending first service setup initiation data 1612 sent to a housing provider, the address of their housing while staying in the county can be determined based on an address for their housing service, such as an address extracted from a corresponding lease and/or otherwise established by the housing provider. A corresponding mailing address and/or residential address can be utilized for other service setup initiation data 1612 of other types of services, for example, where a banking provider requires a physical address for the user in the country to setup banking services for the user, and where the address established for the user in the country via the housing provider is thus included in the service setup initiation data 1612 for the banking provider.

In some cases, other suggested services can be automatically presented to the user as additional service options via service option data 1610 after one service is set up for the user, based on what the service provides. As a particular example, after securing housing via the immigration applicant service setup system 118 generating and sending first service setup initiation data 1612 sent to a housing provider, the immigration applicant service setup system 118 can send service option data 1610 regarding a mailbox for the user, such as a post office box or other location for delivery of mail and/or packages, based on the housing not having its own mailbox and requiring mail be sent to another location.

As another example, after securing housing, the immigration applicant service setup system 118 can send service option data 1610 regarding: internet service at the established housing; trash and/or recycling service at the established housing; gas, electric, water, and/or other utilities at the established housing; or other services. As another example, after securing housing, the immigration applicant service setup system 118 can send service option data 1610 regarding tickets and/or passes with a public transportation service based on the established housing being near the public transportation service. As another example, after securing housing, the immigration applicant service setup system 118 can send service option data 1610 regarding rental, leasing, and/or purchase of a car, a bike, a motorcycle, or other vehicle based on the established housing not being near a public transportation service and/or based on the established housing not being within walking distance of the user's place of work or study.

FIG. 16F illustrates an embodiment of an immigration applicant service setup system 118 where the service setup initiation data transmission module 1630 is implemented as a plurality of service server system interfacing modules 1613, where each of a set of service server system interfacing modules 1613.1-1613.C correspond to one or the set of service providers 1640.1-1640.C. The immigration applicant service setup system 118 can facilitate sending of some or all of service setup immigration data 1612.1-1612.C to a corresponding one of a set of service sever systems 1645.1-1645.C of a corresponding service provider entity via a corresponding one of the set of service server system interfacing modules 1612.1-1612.C.

A given service server system interfacing modules 1613 can be implemented via the subsystem network interface 430 and/or can otherwise enables the immigration applicant service setup system 118 to communicate bidirectionally with a corresponding service provider entity 1640 via network 150 and/or via the Internet. A given service server system interfacing modules 1613 can optionally be implemented via one or more bots and/or other software applications that run automated tasks to send service setup initiation data 1612 of one or more users to this service server system via interfacing with one or more webpages hosted by the government server system interfacing module 1120 over the Internet. For example, a given service server system interfacing modules 1613 can be further implemented to perform these automated tasks via subsystem processing module 420 and/or subsystem memory module 410.

For example, a given service server system interfacing modules 1613 is operable to send service setup initiation data 1612 to a corresponding service server system 1645 based on accessing, receiving, and/or determining interfacing indicating: web addresses of one or more webpages hosted by service server system 1645 corresponding to one or more document file 532 service setup initiation data 1612 and/or one or more form fields to be populated via service setup initiation data 1612; an ordering in which various information in service setup initiation data 1612 is submitted; a mapping of form fields and/or prompt upload identifiers of a given webpage for corresponding documents and/or text in in the service setup initiation data 1612; a mapping of form fields presented via one or more webpages to corresponding field data 534.1-534.H of given form data 533 of service setup initiation data 1612 to indicate where each field data 534 for the form be submitted; a mapping of prompt upload identifiers presented via one or more webpages to one or more document files 532 of a given type; and/or other information enabling the corresponding service server system interfacing modules 1613 to interface with the corresponding service server system 1645 and/or to submit the service setup initiation data 1612 correctly, to the appropriate location, and/or via appropriate instructions.

Some or all of the sending of service setup initiation data 1612 by immigration applicant service setup system 118 can be performed without user intervention or guidance from a corresponding user. Some or all of the sending of service setup initiation data 1612 by immigration applicant service setup system 118 can be performed with limited intervention and/or guidance from a corresponding user.

For example, a user creates and/or logs into an account with a service server system via providing credentials for their account with the service server system to the immigration applicant service setup system 118. Alternatively, the immigration applicant service setup system 118 automatically creates an account with a service server system for the user, where the user can optionally change their password at a later date. As another example, the immigration applicant service setup system 118 presents a set of prompts to the user via interactive user interface 375, where responses received by the user populate one or more corresponding prompts and/or fields presented via a webpage hosted by the service server system 1645.

As another example, the user confirms that service setup initiation data 1612 is correct and/or is ready for submission to establish the corresponding service. For example, the immigration assistance system 100 sends service setup initiation data 1612 to the user for review, via display via interactive user interface 375. The user can confirm whether service setup initiation data 1612 is approved for submission to the corresponding service provider. The user can optionally resubmit document files for and/or edit text of service setup initiation data 1612 as necessary. Once service setup initiation data 1612 is approved by the user, the corresponding completed service setup initiation data 1612 can be sent to the service server system 1645, for example, in response to receiving instructions from the client device 130 based on user input to interactive user interface 375 indicating the service setup initiation data 1612 is approved by the user, finalized, and/or that the user requests the service setup initiation data 1612 be submitted by the immigration applicant service setup system 118.

FIG. 16C illustrates an example embodiment of an immigration application service setup system 118 that implements a banking setup initiation data generator module 1622.1; a cellular setup initiation data generator module 1622.2; a health setup initiation data generator module 1622.3; and/or a housing setup initiation data generator module 1622.4. For example, the service selection data set 1615 indicates service selection data 1655.1-1655.4 indicating selection to setup banking services, housing, cellular service, and a health plan.

The banking setup initiation data generator module 1622.1 can generate banking service setup initiation data 1612.1 based on the service selection data 1655.1 for the service type 552.1 corresponding to banking. The cellular setup initiation data generator module 1622.2 can generate cellular service setup initiation data 1612.2 based on the service selection data 1655.2 for the service type 552.2 corresponding to cellular service. The health setup initiation data generator module 1622.3 can generate health service setup initiation data 1612.3 based on the service selection data 1655.3 for the service type 552.3 corresponding to a health plan. The housing setup initiation data generator module 1622.4 can generate health service setup initiation data 1612.4 based on the service selection data 1655.4 for the service type 552.4 corresponding to housing.

The immigration application service setup system 118 can send banking service setup initiation data 1612.1 to banking provider entity 1651, such as a server system of the banking provider. This can cause the banking provider entity 1651 to establish a bank account, a credit card, a debit card, or other financial and/or banking services for the user.

The immigration application service setup system 118 can send cellular service setup initiation data 1612.2 to cellular provider entity 1652, such as a server system of the cellular provider. This can cause the cellular provider entity 1652 to establish a phone number, a SIM card, a cellular service plan, or cellular services for the user.

The immigration application service setup system 118 can send health service setup initiation data 1612.2 to health provider entity 1653, such as a server system of the health provider. This can cause the health provider entity 1653 to establish a health care plan, health insurance, services with a selected doctor, hospital, and/or medical institution located near the user, and/or other health services.

The immigration application service setup system 118 can send housing service setup initiation data 1612.2 to housing provider entity 1654, such as a server system of one or more housing providers. This can cause the housing provider entity 1654 to establish a lease, a residential address, a property deed, connect with a real estate agent, establish utilities for the housing, establish internet services for the housing, establish renter's insurance and/or property insurance, and/or establish other housing services.

While not illustrated, the immigration application service setup system 118 can generate and send service setup initiation data 1612 for other types of services to be established for a given user, for example, based on the service selection data set 1615 indicating selection of these other types of services by the given user and/or based on automatically selecting these types of services based on information in user account regarding the given user.

For example, based on the service selection data set 1615 indicating selection of a type of service corresponding to obtaining a social insurance number, the immigration application service setup system 118 can generate and send social insurance number service setup initiation data 1612 to a social insurance number provider entity, such as a corresponding server system of the social insurance number provider entity. This can cause the social insurance number provider entity to establish a social insurance number for the given user.

As another example, based on the service selection data set 1615 indicating selection of a type of service corresponding to cultural services, such as a selection of a "concierge service" option, the immigration application service setup system 118 can generate and send cultural service setup initiation data 1612 to a cultural service provider entity, such as a corresponding server system of the cultural service provider entity. This can cause the social insurance number provider entity to establish a cultural services for the given user, for example, by providing information regarding living in the country and/or answering user inquiries regarding living in the country, such as recommended clothing and/or items to pack for arrival in the country, language assistance in learning a language of the country, recommended types of cuisine and/or particular restaurants in the country, recommended outdoor activities, parks, museums, and/or other places of interest to visit and/or explore while in the country, and/or other cultural information regarding life in the country. In some embodiments, the cultural service provider entity is implemented as an assistance entity as discussed in conjunction with FIGS. 17A-17O.

As another example, based on the service selection data set 1615 indicating selection of a type of service corresponding to transportation services, the immigration application service setup system 118 can generate and send transportation service setup initiation data 1612 to one or more transportation provider entities, such as a corresponding server system of the transportation provider entity. This can cause the transportation provider entity to establish a public transportation account, card, and/or pass for the user, to lease a vehicle to the user, to sell a vehicle to the user, to establish vehicle insurance for the user, to establish an account with a bike sharing program for the user, and/or to setup other transportation services for the user.

As another example, based on the service selection data set 1615 indicating selection of a type of service corresponding to tax preparation services, the immigration application service setup system 118 can generate and send tax preparation service setup initiation data 1612 to a tax provider entity, such as a corresponding server system of the tax provider entity. This can cause the tax provider entity to prepare and/or file tax return document for the user in their home country and/or in the country to which they immigrated, and/or to or provide other tax and/or financial assistance to the user.

FIG. 16H illustrates an embodiment of an immigration applicant service setup system 118 that implements a service setup communication module 1631 that receives service setup confirmation data 1617.1-1617.C for the user from each service provider entity 1640.1-1640.C based on each service provider entity 1640 processing the received service setup initiation data 1612 for the user. For example, the service setup confirmation data 1617 indicates setup of the service is initiated and/or is completed for the user. Each of the set of received service setup confirmation data 1617 can be sent by the service setup communication module 1631 to the client device 130 of the corresponding user to communicate the initiation and/or completion of the of setup of the service to the user. The service setup confirmation data 1617 can optionally be stored in user account 165 for the user.

Alternatively or in addition, the service provider entity sends service setup confirmation data 1617 directly to the corresponding user, for example, based on the service setup initiation data 1612 indicating an email address of the user, a phone number of the user, and/or other contact information for the user. For example, service setup confirmation data 1617 is sent from service provider entity 1640 to client device 130 via network 150.

In some cases, additional communication between the client device 130 and service provider entity, directly via network 150 and/or facilitated via immigration applicant service setup system 118, is necessary to complete the setup of the corresponding service. For example, the service setup communication module 1631 can indicate user account credentials and/or login information established for an account setup for the user with the service provider entity 1640. The user can login to their account with the service provider entity 1640 based on the user account credentials and/or login information indicated in the setup confirmation data, and can complete and/or configure setup of the service based on interacting with their account with the service provider.

The service setup confirmation data 1617 can alternatively or additionally indicate information regarding the service provided by the service provider entity during or after completion of setup of the corresponding service for the user by the service provider, such as: a bank account number and/or details regarding access to or use of the bank account; a credit card number and/or details regarding access to or use of the credit card; a debit card number and/or details regarding access to or use of the debit card; a cellular phone number and/or details regarding access to or use of a corresponding cellular service; a health care plan number, health care provider information, and/or details regarding access to or use of a corresponding health care service; a residential address, lease data, or other information regarding access to or use of a corresponding housing service; a social insurance number established for the user; and/or any other information regarding access to or use of any other types of services setup for the user via service providers as described herein.

As illustrated in FIGS. 16I, the immigration applicant service setup system 118 can receive service selection data sets 1615.1-1615.N from a plurality of client devices 130.1-130.N. Each service selection data set 1615 can be utilized by service setup initiation data generator module 1620 to generate a service setup initiation data set 1625, which can include one or more service setup initiation data 1612 for one or more service providers. The service setup initiation data transmission module 1630 can facilitate sending of the one or more service setup initiation data 1612 included in each of the service setup initiation data sets 1625.1-1625.N to corresponding service provider entities 1640 as discussed previously.

Different service selection data sets 1615 for different users can indicate the same and/or different types of services and/or service providers, and service setup initiation data for different types of services can be generated accordingly for the different users For example, one service selection data set 1615 for one user indicates selection of banking services and cellular services, but not housing services while another service selection data set 1615 for another user indicates selection of housing services and cellular services but not banking services.

This selection of different services by different users is illustrated in FIG. 16J. The service option data can include service type option prompt data 1611.1-1611.O corresponding to each of a set of possible service types 1-O and/or each of a set of possible service providers 1-O. Service selection data sets 1615 can each indicate a subset that indicates some, all, or none of the service types 1-O, where different users can select some or all of the same or different service types to be set up.

Each service type option prompt data 1611 can further indicate one or more questions, document upload prompts, or other prompts to be presented to the user if the user selects to set up a particular service. For example, these questions and/or document upload prompts are only presented to collect corresponding service selection data 1655 for the corresponding service type and/or provider if the user select that corresponding service type and/or provider. For example, after selecting to initiate setting up of a banking service, a first user is presented with additional questions and/or document upload prompts via interactive user interface to collect information required to setup a bank account, credit card, and/or debit card to be included in service selection data 1655 for the banking service. However, a second user that does not select to initiate the setting up of the banking service is not presented with these additional questions and/or document upload prompts, as they do not wish to set up banking services.

FIGS. 16K and 16L illustrate examples of an immigration applicant service setup system 118 that implements a service setup prompt communication module 1614. In particular, users can be prompted with the service option data 1610 in conjunction with the immigration applicant service setup system 118 facilitating setup of services for the user in the country to which they are immigrating only under particular conditions. For example, users are presented with this information strictly after having submitted an immigration application, and/or strictly after being granted immigration status. However, it can further be ideal to set up the immigration status as soon as possible for the user, for example, so that services are set up prior to the user entering the country and/or with enough time for all service setup processing required by service provider entities to be performed.

As illustrated in FIG. 16K, the service setup prompt communication module 1614 sends service option data 1610 to client device 130 for display, and/or instructions to present service option data 1610 to the user if the service option data 1610 is already stored by client device 130, based on the immigration applicant service setup system 118 receiving submission confirmation data 1125 for the user and/or otherwise determining that the corresponding user's immigration application is submitted. For example, this type of assistance becomes available to the user via access by the user to their user account and/or via menu options displayed via interactive user interface 375 only once the user's immigration application is submitted. As a particular example, once the application status 503 of a user's user account 165 indicates the immigration application is pending, the service option data 1610 can be presented and/or made available to the user via interactive user interface 375. Facilitating setting up as soon as an application is submitted can be ideal in providing sufficient time to set up services before entering the country. In some embodiments, all necessary information to generate service setup initiation data 1612 is collected and the service setup initiation data 1612 is generated, but is not sent to the corresponding service providers until the user's immigration application is granted, for example, to confirm the user will be able to enter the country and use these services prior to paying for and/or completing setup of these services.

Alternatively, as illustrated in FIG. 16K, the service setup prompt communication module 1614 sends service option data 1610 to client device 130 for display, and/or instructions to present service option data 1610 to the user if the service option data 1610 is already stored by client device 130, based on the immigration applicant service setup system 118 receiving application acceptance data 1145 for the user and/or otherwise determining that the corresponding user's immigration status has been granted. For example, the option prompt data 1610 is presented as post-granting assistance prompts 1162 discussed in conjunction with FIG. 11K. As another example, this type of assistance becomes available to the user via access by the user to their user account and/or via menu options displayed via interactive user interface 375 only once the user's immigration application has been granted. As a particular example, once the application status 503 of a user's user account 165 indicates the immigration application is granted, the service option data 1610 can be presented and/or made available to the user via interactive user interface 375. Facilitating setup only once an application is granted can be ideal in confirming the user will be able to enter the country and use selected services prior to paying for and/or completing the setup of these services.

FIG. 16M illustrates an embodiment of an immigration assistance system 100 that implements an immigration application materials submission system 108 to submit an immigration application for a given user. The immigration application materials submission system 108 can receive submission confirmation data 1125, which can cause the immigration assistance system 100 to implement the immigration application service setup system 118 for the given user, for example, as illustrated in FIG. 16K. Alternatively or in addition, the immigration application materials submission system 108, after submitting the user's immigration application, can receive application acceptance data 1145 indicating the user's immigration application is granted, which can cause the immigration assistance system 100 to implement the immigration application service setup system 118 for the given user, for example, as illustrated in FIG. 16L.

FIG. 16N illustrates an embodiment of client device 130 that locally implements some or all functionality of the immigration applicant service setup system 118, for example, based on storing and/or executing corresponding subsystem application data 318. In such embodiments, the service setup initiation data generator module 1620 and/or the service setup initiation data transmission module 1630 can be implemented via client processing module 320 and/or client memory module 310.

In various embodiments, an immigration applicant service setup system includes at least one processor, and at least one memory that stores executable instructions. The executable instructions, when executed by the at least one processor, can cause the immigration applicant service setup system to: facilitate submission of an immigration application for a first user for immigration to a first country; send service option data to a first client device indicating a set of service options for display to the first user via an interactive user interface based on the submission of the immigration application for the first user; receive service selection data indicating a selected subset of the set of service options from the first client device, where the first client device generated the service selection data based on user input to the first client device in response to the service option data presented via the interactive user interface; automatically generate a set of service setup initiation data for the first user based on the service selection data, where each of the set of service setup initiation data corresponds to one service option of the selected subset of the set of service options; and/or transmit each of the set of service setup initiation data to a corresponding one of a set of service entities located in the first country. The first client device can receive, from at least one of the set of service entities, service setup confirmation data for the first user based on at least one of the set of service entities processing a corresponding one of the set of service setup initiation data for the first user.

In various embodiments, a client device includes at least one processor, and at least one memory that stores executable instructions. The executable instructions, when executed by the at least one processor, can cause the client device to: present service option data indicating a set of service options via an interactive user interface displayed by a display device of the client device based on submission of an immigration application for a first user and for a first country; generate service selection data indicating a selected subset of the set of service options from the client device based on user input to the client device in response to the service option data presented via the interactive user interface; automatically generate a set of service setup initiation data for the first user based on the service selection data, where each of the set of service setup initiation data corresponds to one service option of the selected subset of the set of service options; transmit each of the set of service setup initiation data to a corresponding one of a set of service entities located in the first country; and/or receive, from at least one of the set of service entities, service setup confirmation data for the first user based on at least one of the set of service entities processing a corresponding one of the set of service setup initiation data for the first user.

FIG. 16O illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 16O and/or to perform some or all of the functionality discussed in conjunction with FIGS. 16A-16N.

Some or all steps of FIG. 16O can be performed by implementing an immigration applicant service setup system 118. For example, at least one subsystem memory module of the immigration applicant service setup system 118 stores executable instructions that, when executed by at least one subsystem processing module of the immigration applicant service setup system 118, cause the immigration applicant service setup system 118 to execute some or all steps of FIG. 16O and/or to perform some or all of the functionality discussed in conjunction with FIGS. 16A-16N.

Some or all steps of FIG. 16O can be performed by implementing and/or communicating with one or more other subsystems 101. Some or all steps of FIG. 16O can be performed by accessing user account database 162, utilizing some or all data of one or more user accounts 165, and/or generating some or all data of one or more user accounts 165. Some or all steps of FIG. 16O can be performed by accessing function library 172 and/or by performing one or more functions of function library 172. Some or all steps of FIG. 16O can be performed based on communicating with one or more client devices 130.

Step 1682 includes facilitating submission of an immigration application for a first user for immigration to a first country. In various embodiments, facilitating submission of the immigration application for the first user includes transmitting the immigration application by sending a set of completed immigration application materials to a government server system corresponding to the first country. In various embodiments, facilitating submission of the immigration application for the first user includes sending a set of immigration application materials to the immigration application materials submission system 108 for submission. In various embodiments, facilitating submission of the immigration application for the first user includes implementing the immigration application materials guided completion system 106 to complete the set of immigration materials. In various embodiments, facilitating submission of the immigration application for the first user includes implementing the immigration application materials submission system 108 to submit the immigration application. In various embodiments, facilitating submission of the immigration application for the first user includes sending some or all of a completed set of immigration application materials to the first client device for: display to the first user, review by the first user, editing by the first user via user input to the first client device, and/or transmission by the first client device to the government server system via user input to the first client device.

Step 1684 includes sending service option data indicating a set of service options for display to the first user via the interactive user interface based on the submission of the immigration application for the first user. For example, the service option data is sent in application data that is stored by and/or executed by the first client device. As another example, the service option data is sent based on receiving a request from the first client device and/or based on determining to send the service option data to the first client device. Some or all of the set of service options can be displayed in accordance with a set of questions. The set of questions for a given service option can include a single question and/or can include multiple questions. The set of questions for a given service option can be displayed via the interactive user interface one at a time, in multiple, sequential views, and/or or all at once in a single view.

Step 1686 includes receiving service selection data indicating a selected subset of the set of service options from the first client device. For example, the first client device generated the service selection data based on the user input to the first client device in response to the service option data presented via the interactive user interface. The selected subset of the set of service options can indicate one or more of the set of service options. The selected subset of the set of service options can indicate a proper subset of the set of service options, or can indicate all of the set of service options.

In various embodiments, the service selection data can include a set of responses for each service option in the selected subset of the set of service options, for example, each corresponding to the set of responses to the set of questions for the given service option. Each set of responses can include a single response and/or can include multiple responses for the given service option. Each set of responses can be received in multiple, separate transmissions, for example, as each of the first set of responses are separately generated and transmitted by the first client device. Each set of responses can alternatively be received together in a same transmission, for example, after all of the first set of responses are generated by the first client device.

Step 1688 includes automatically generating a set of service setup initiation data for the first user based on the service selection data. Each of the set of service selection data can correspond to one service option of the selected subset of the set of service options. One or more of the set of service setup initiation data can be generated based on a corresponding set of responses received in the service selection data.

In various embodiments, automatically generating the set of service setup initiation data for the first user based on the service selection data includes performing at least one service initiation function. In various embodiments, the at least one service initiation function can be: configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as at least one service initiation function entry 716, of function library 172; and/or otherwise determined by immigration assistance system.

Step 1690 includes transmitting each of the set of service setup initiation data to a corresponding one of a set of service entities located in the first country. In various embodiments, the first client device receives service setup confirmation data for the first user based on the at least one of the set of service server systems processing a corresponding one of the set of service setup initiation data for the first user. The service setup confirmation data can be generated by at least one of the set of service server systems. The service setup confirmation data can be received by the first client device from at least one of the set of service server systems and/or from the immigration assistance system. In various embodiments, the service setup confirmation data is received by the first client device prior to a country entry date of the first user and/or prior to the first user entering the first country.

In various embodiments, the set of service options includes: a cellular service option, a banking option, a health plan option, and/or a housing option. The set of service entities can include one or more cellular service providers, one or more financial institutions, one or more health plan providers, and/or one or more housing providers. In various embodiments, the set of service options includes a social insurance number option.

In various embodiments, the service setup confirmation data indicates a phone number established for the first user in the first country based on the service selection data indicating the cellular service option. In various embodiments, the service setup confirmation data indicates a bank account established for the first user in the first country based on the service selection data indicating the banking option. In various embodiments, the service setup confirmation data indicates a credit card assigned for the first user and/or a debit card assigned for the first user based on the service selection data indicating the banking option. In various embodiments, the service setup confirmation data indicates a residential address in the first country established for housing for the first user based on the on the service selection data indicating the housing option. In various embodiments, the service setup confirmation data indicates a health insurance identification number assigned for the first user and/or an address for a medical institution established for health care for the first user based on the based on the on the service selection data indicating health plan option.

In various embodiments, the set of service options indicates: a plurality of cellular service providers; a plurality of financial institutions; a plurality of health plan providers; and/or a plurality of housing providers. The selected subset of the set of service options can indicate: a selected cellular service provider from the plurality of cellular service providers; a selected financial institution from the plurality of financial institutions; a selected health plan provider from the plurality of health plan providers; and/or a selected housing provider from the plurality of housing providers. At least on one of the set of service setup initiation data can be generated by and/or sent to the at least one client device by the selected cellular service provider; the selected financial institution; the selected health plan provider; and/or the selected housing provider.

In various embodiments, the set of service options includes a cultural information service option. One of the set of service setup initiation data can correspond to a query for cultural information regarding the first country. Corresponding service setup confirmation data can indicate the cultural information regarding the first country.

In various embodiments, the set of service setup initiation data can include a set of identifying information of the first user and a set of identifying information, demographic information, and/or contact information of the first user. In various embodiments, the set of service setup initiation data includes payment data to facilitate payment for the selected subset of the set of service options. In various embodiments, the set of service setup initiation data includes a country entry date corresponding to a start date for the selected subset of the set of service options. The of identifying information, demographic information, and/or contact information, payment data, and/or country entry date can be determined based on being indicated in a set of responses received from the first client device and/or based on being accessed in a user account corresponding to the first user.

In various embodiments, the method includes sending immigration application status data to the first client device indicating a status of the immigration application for the first user, where the interactive user interface presents the service option data in conjunction with presenting the immigration application status data to the first user. The immigration application status can correspond to: a pending of the immigration status based on the immigration application pending processing by a government entity corresponding to the first country; a granting of the immigration status based on a granting of the immigration application by the government entity corresponding to the first country, or refusing of the immigration status based on a refusing of the immigration application by the government entity corresponding to the first country.

In various embodiments, the method includes sending question data indicating a set of questions for display to the first user via the interactive user interface and receiving response data indicating a set of responses to the set of identification questions from the first client device. For example, the first client device generated the response data based on the user input to the first client device in response to the set of identification questions presented via the interactive user interface. The method can further include automatically generating at least one of a set of immigration application forms by populating at least one form field of the at least one immigration application form based on the response data, where the immigration application includes the at least one immigration application form. Automatically generating the set of service setup initiation data includes populating at least one form field of set of service setup initiation data based on the response data. In various embodiments, at least one of the set of questions corresponds to one or more identification questions to identify the user.

In various embodiments, the executable instructions, when executed by the at least one processor, further cause the immigration applicant service setup system to extract textual data from at least one of a set of immigration application materials included in the immigration application for the first user by performing at least one document processing function. Automatically generating the set of service setup initiation data can include populating at least one form field of set of service setup initiation data based on the textual data. In various embodiments, the at least one document processing function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as at least one document processing function entry 605 and/or at least one immigration information extraction function entry 708, of function library 172; and/or otherwise determined by immigration assistance system.

In various embodiments, the method includes sending service setup initiation confirmation data to the client device indicating initiation of the selected subset of the set of service options based on transmitting the set of service setup initiation data to the set of service entities. The service setup initiation confirmation data can be received from the selected subset of the set of service entities and/or can be generated by the immigration assistance system.

FIG. 16P illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 16P and/or to perform some or all of the functionality discussed in conjunction with FIGS. 16A-16N.

Some or all of the executable instructions can be included in application data 315 that is generated by, is received from, and/or otherwise corresponds to the immigration assistance system 100. For example, execution of the application data 315 can cause the client device to implement functionality of the immigration applicant service setup system 118 as illustrated in FIG. 16N.

Some or all steps of FIG. 16P can be performed based on communicating with one or more subsystems 101 of immigration assistance system 100. Some or all steps of FIG. 16P can be performed in a same or similar fashion as some or all steps of FIG. 16O. Some or all steps of FIG. 16P can be performed in conjunction with one or more of the various embodiments discussed in conjunction with FIG. 16O.

Step 1681 includes presenting service option data indicating a set of service options via an interactive user interface displayed by a display device of the client device based on the submission of an immigration application for the first user and for a first country. Step 1683 includes generating service selection data indicating a selected subset of the set of service options from the first client device based on the user input to the first client device in response to the service option data presented via the interactive user interface. Step 1685 includes automatically generating a set of service setup initiation data for the first user based on the service selection data, where each of the set of service selection data corresponds to one service option of the selected subset of the set of service options. Step 1687 includes transmitting each of the set of service setup initiation data to a corresponding one of a set of service entities located in the first country. Step 1689 includes receiving, from at least one of the set of service entities, service setup confirmation data for the first user based on the at least one of the set of service server systems processing a corresponding one of the set of service setup initiation data for the first user.

FIGS. 16Q-16S present example embodiments of a display by interactive user interface 375 that presents service option data 1610.

As illustrated in FIG. 16Q, the service option data 1610 can be presented as a set of service type option prompt data 1611 for a set of different types of services, including a social insurance number service type, a banking service type, a health plan service type, a housing service type, a cellular service type, and a cultural service type. For example, the service option data 1610 is presented as a dashboard view, where users can select particular types of services one at a time, and can interact with additional prompts for the selected type of service.

As illustrated in FIG. 16R, the service option data 1610 for a particular type of service, such as acquisition of a social insurance number, can be presented as a plurality of prompts of the service type option prompt data 1611 for the corresponding type of service. This can include a plurality of document upload prompts 636 and/or, while not depicted, questions to be responded to by the user. In some embodiments, the documentation corresponding to proof of Canadian address can be based on and/or can be automatically populated based on having already acquired housing via housing provider via immigration applicant service setup system 118, for example, based on service setup confirmation data 1617 received from a housing provider. Some or all of the documents indicated by service type option prompt data 1611, such as the user's passport, can optionally be automatically identified as immigration application materials 531 included in the user's immigration application and/or can have been previously uploaded by the user in conjunction with completing their immigration application.

As illustrated in FIG. 16S, the service option data 1610 for a particular type of service, such as banking services, can be presented as a plurality of prompts of the service type option prompt data 1611 for the corresponding type of service. In this example, the user can elect which particular services they wish to receive from a given service provider, such as whether they wish to obtain a bank card, a credit card, or both.

FIGS. 17A-17M illustrate embodiments of an immigration assistance communication system 120. The immigration assistance communication system 120 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to initiating and/or facilitating communications between users and immigration assistance entities supplying legal, cultural, or other assistance regarding the user's immigration via chat, voice, and/or communications. This can correspond to assistance provided after a user's immigration has been granted, and optionally after the user has entered and is living in the country.

For example, users can inquire about how to enter the country and/or can have a lawyer or legal professional on-call when they are entering the country in case of any problems the user encounters in attempting to enter the country. As another example, users can inquire about rules and/or guidelines for exiting the country for leisure, work, and/or study after having entered the country based on communicating with a lawyer or legal professional. As a particular example, a user can inquire, during their study program and while living in the country to which they immigrated, whether they can leave the country for spring break via communication with a legal professional.

As another example, users can inquire about items they should pack and/or purchase prior to entering the country to prepare for living in the country with a cultural representative. As a particular example, a user can inquire as to what type of warm jacket they should purchase for their immigration into Canada based on currently living in a country with much warmer climates and/or not owning winter attire. The assistance entity can reply with information aiding the user in selecting and/or purchasing appropriate warm clothing.

Legal, cultural, or other assistance can be supplied via one or more legal professionals, cultural professionals, or other processionals hired by and/or partnered with an entity corresponding to the immigration assistance system. In some embodiments, legal, cultural, or other assistance can be supplied via one or more other users of the to the immigration assistance system. In some embodiments, legal, cultural, or other assistance can optionally be supplied in response to user inquiries via an automated inquiry response system that automatically supplies information and/or responses to user inquiries.

In some cases, different users of the immigration assistance system are connected with one another based on immigrating to the same country, living in a same city or neighborhood within the country, and/or attending the same study program. For example, an older user or user living in a given country for a longer period of time acts as an immigration assistance entity to mentor another user that is a younger user or user living in a given country for a shorter period.

The immigration assistance system can further aid assistance entities in providing information catered to the particular user based on leveraging various information and/or documents already determined and gathered for the user and/or stored in user account 165 as required to set up the user's immigration application. For example, lawyers can be provided with application materials 531 of a user's immigration application and/or can be provided with official documentation corresponding to the granting of the user's immigration status to best resolve the user's inquiries and provide legal assistance.

In some embodiments, a corresponding immigration application is first prepared and/or submitted for the user, for example, via immigration application material completion system 106 and/or via immigration application materials submission system 108. In some embodiments, only users with immigration application materials completed and/or submitted by immigration assistance system are provided this assistance in setting up services via the immigration assistance communication system 120. In some embodiments, if only users with favorable risk assessment scores 541 previously generated via immigration eligibility risk assessment system 102 have immigration application materials completed and submitted by immigration assistance system, only users with favorable risk assessment scores 541 previously generated via immigration eligibility risk assessment system 102 are provided this assistance in setting up services via the immigration assistance communication system 120. Alternatively, in other embodiments, the user completes and/or submits some or all immigration application materials independently, and receives assistance in acquiring services based on sending a request for immigration services to the immigration assistance system 100 after preparing and/or submitting their immigration application.

Some or all of this functionality of the immigration assistance communication system 120 improves the technology of computer-based immigration systems based on improving the efficiency of communicating with immigrants, for example, based on automatic selection of assistance entities and/or automatic prioritization of users based on their travel dates. Some or all of this functionality of the immigration assistance communication system 120 improves the technology of computer-based immigration systems based on improving the efficiency and/or effectiveness of setting up these services for immigrants to a country, for example, based on some or all of this setup being based on their immigration application.

As illustrated in FIG. 17A, the immigration assistance communication system 120 can send communication initiation prompt data 1710 to a given client device 130.1 corresponding to a user of the immigration assistance system 100. The communication initiation prompt data 1710 can be presented to the corresponding user via interactive user interface 375, for example, as a plurality of questions, or other one or more prompts. As a particular example, the communication initiation prompt data 1710 can indicate a set of different types of assistance entities, enabling the user to select which of the different types of assistance entities they wish to communicate with. As another example, the communication initiation prompt data 1710 can indicate scheduling prompt data to enable the user to schedule a time and/or date to facilitate the communication. As another example, the communication initiation prompt data 1710 can indicate communication medium preference prompts enabling the user to select chat, voice, and/or video communications, and/or to supply contact information for the user to be contacted via a corresponding communication medium. Alternatively, the communication initiation prompt data 1710 simply presents a prompt to initiate communication that can be selected by the user, such as "chat with a legal representative".

The communication initiation prompt data 1710 can implemented as some or all of the input prompt instruction data 628 and/or document input instruction data 629 of one or more communication initiation function entries 718, as discussed in conjunction with FIGS. 6F and 6G, and/or FIGS. 7T-7U. As another example, communication initiation prompt data 1710 is indicated in application data 318 sent to the client device 130 for execution. As another example, the communication initiation prompt data 1710 is sent to a corresponding client device based on receiving a request from the client device to communicate with a requesting entity and/or to receive immigration assistance.

The immigration assistance communication system 120 can receive a communication initiation request 1715 indicating a request to initiate communications from the client device 130.1. The communication initiation request 1715 can be generated by the corresponding client device 130.1 based on user input to the client device 130.1 indicating responses to questions and/or other prompts indicated in the communication initiation prompt data 1710.

The immigration assistance communication system 120 can implement a communication facilitation module 1720, for example, via subsystem processing module 420 and/or subsystem memory module 410. The communication facilitation module 1720 can generate communication initiation data 1725 for the user based on the communication initiation request 1715. For example, the communication initiation data 1725 can be generated by the communication facilitation module 1720 based on the communication facilitation module 1720 performing a communication initiation function of a corresponding communication initiation function entry 718, for example, as discussed in conjunction with FIG. 7T and/or FIG. 7U.

The immigration assistance communication system 120 can send the communication initiation data 1725 to an immigration assistance entity 1740, such as client device 130 or a computer, laptop, mobile device, telephone, cellular phone, smart phone, and/or communication device of a person, such as a lawyer or other professional, that corresponds to the immigration assistance entity 1740, The communication initiation data 1725, when received by the immigration assistance entity 1740 can cause the immigration assistance entity to communicate with the user by responding to one or more inquiries received from the user, where these responses by the immigration assistance entity are delivered to client device 130 and/or another communication device of the user to convey the responses to the user.

In some embodiments, the immigration assistance communication system 120 can further access and send immigration application materials 531 of the user's immigration application, or other information of the user's user account 165 for display and review by the immigration assistance entity 1740, for example, to aid the immigration assistance entity 1740 in understanding the user's unique immigration circumstances to best provide assistance to the user.

In some embodiments, after a conversation between the user and the immigration assistance entity 1740 is complete, the user can be prompted, via one or more feedback prompts sent by the immigration assistance communication system 120, to provide communication feedback response data 567 as one or more responses to one or more questions regarding quality and/or helpfulness of the communication and/or the immigration assistance entity 1740. The client device can generate and send this communication feedback response data 567, which can be stored in the user's user account 165 and/or can be sent to the corresponding immigration assistance entity 1740 for display via a display device, for example as anonymous and/or in aggregated feedback from several users to aid the immigration assistance entity 1740 in future assistance provided in future communications.

FIG. 17B illustrates an embodiment where the communication facilitation module 1720 is operable to host a conversation between the user and the immigration assistance entity 1740, such as a legal professional. In particular, text, audio, and/or video communication data generated and transmitted by a client device 130.1 of the user as communications A are received by the immigration assistance communication system 120, where immigration assistance entity 1740 relays these communications A to the immigration assistance entity 1740 as relayed communications A. Text, audio, and/or video communication data generated and transmitted by an immigration assistance entity 1740 as communications B are received by the immigration assistance communication system 120, where immigration assistance entity 1740 relays these communications B to the client device 130.1 as relayed communications B. Over time, some communications B can correspond to responses to particular inquiries of communications A. Some communications A can correspond to responses to particular inquiries of communications B.

Alternatively, as illustrated in FIG. 17C, a conversation between the user and the immigration assistance entity 1740 can be facilitated via a different communication service and/or medium. For example, once the immigration assistance entity 1740 receives the communication initiation data 1725, a person corresponding immigration assistance entity 1740 calls, texts, emails, or communicates with the user via other communications with client device 130 via a different communication medium 1745, such as a cellular network, telephone network, and/or the Internet. The communication medium 1745 can optionally be implemented by utilizing network 150.

FIGS. 17D-17G illustrate embodiments of an immigration assistance communication system 120 that implements a communication initiation determination module 1711 that is operable to generate communication initiation determination data 1712 indicating whether to send communication initiation prompt data 1710 to a given user or otherwise initiate communications for a given user based on determining if and/or when to send a communication initiation request 1715 to each given user of the immigration assistance communication system 120 and/or whether to automatically generate and send communication initiation data 1725 to an immigration assistance entity 1740 for automatic initiation of communications between the immigration assistance entity 1740 and the user without having received a communication initiation request. For example, the communication initiation determination module 1711 can generate communication initiation determination data 1712 based on performing a communication initiation determination function of a corresponding communication initiation determination function entry 719.

As illustrated in FIG. 17D, the communication initiation determination module 1711 generates communication initiation determination data 1712 based on submission confirmation data 1125. For example, once submission confirmation data 1125 is received for a given user, or once an immigration application status 503 of the user indicates an immigration application has been submitted, the communication initiation determination data 1712 is automatically generated for the given user to indicate the communication initiation prompt data 1710 be sent and/or presented to the given user. For example, users are presented with communication initiation prompt data 1710 strictly after having submitted an immigration application, where other users who have not submitted immigration applications are optionally not presented the option to initiate communication with an immigration assistance entity 1740.

For example, based on generating communication initiation determination data 1712 indicating communication initiation prompt data 1710 be sent and/or presented to the given user, the immigration assistance communication system 120 sends the communication initiation prompt data 1710 to client device 130 for display via interactive user interface 375. As another example, based on generating communication initiation determination data 1712 indicating communication initiation prompt data 1710 be sent and/or presented to the given user, the immigration assistance communication system 120 sends instructions to present the communication initiation prompt data 1710 via interactive user interface 375, for example, if the communication initiation prompt data 1710 is already stored by client device 130 in application data 318.

Alternatively or in addition, as illustrated in FIG. 17E, the communication initiation determination module 1711 generates communication initiation determination data 1712 based on application acceptance data 1145. For example, once application acceptance data 1145 is received for a given user indicating the user's immigration has been granted, or once an immigration application status 503 of the user indicates an immigration application has been granted, the communication initiation determination data 1712 is automatically generated for the given user to indicate the communication initiation prompt data 1710 be sent and/or presented to the given user. For example, users are presented with communication initiation prompt data 1710 strictly after having been granted immigration status, where other users who have not yet been granted immigration status are optionally not presented the option to initiate communication with an immigration assistance entity 1740.

In some embodiments, the communication initiation determination module 1711 generates communication initiation determination data 1712 once application acceptance data 1145 is received for a given user indicating the user's immigration has been rejected, or once an immigration application status 503 of the user indicates an immigration application has been rejected, the communication initiation determination data 1712 is automatically generated for the given user to indicate the communication initiation prompt data 1710 be sent and/or presented to the user. For example, a user can communicate with a legal professional regarding next steps and/or if any reversal of the decision is possible.

In some embodiments, while not illustrated, the communication initiation determination module 1711 generates communication initiation determination data 1712 based on risk assessment score 541. For example, once a favorable risk assessment score 541 is generated for a given user via immigration eligibility risk assessment system 102, the communication initiation determination data 1712 is automatically generated for the given user to indicate the communication initiation prompt data 1710 be sent and/or presented to the given user. For example, users are presented with communication initiation prompt data 1710 to book a consultation regarding whether to apply for a study permit, as illustrated in FIG. 8U, where communication initiation prompt 764 is implemented as communication initiation prompt data 1710.

Alternatively or in addition, once an unfavorable risk assessment score 541 is generated for a given user via immigration eligibility risk assessment system 102, the communication initiation determination data 1712 is automatically generated for the given user to indicate the communication initiation prompt data 1710 be sent and/or presented to the given user. For example, users are presented with communication initiation prompt data 1710 to book a legal consultation regarding whether and/or how to apply for a study permit, as illustrated in FIG. 8V, where communication initiation prompt 764 is implemented as communication initiation prompt data 1710.

In some embodiments, as illustrated in FIG. 17F, the communication initiation determination module 1711 can generate communication initiation determination data 1712 based on upcoming travel data 1730. The upcoming travel data can be received from client device 130 and/or can be determined for the corresponding user. The upcoming travel data 1730 can correspond to first entry into the country to which the user has immigrated, exit from the country to which the user has immigrated, subsequent entry into the country to which the user has immigrated, and/or other travel. The upcoming travel data 1730 can be accessed in and/or implemented as travel schedule data 571 of travel log data 516. The upcoming travel data 1730 can be determine based on a start and/or end date of the user's study program, employment and/or immigration status.

The communication initiation determination data 1712 can be generated based on a date of the travel, such as a date of entry into or exit from the country to which the user has immigrated to indicate the communication initiation prompt data 1710 be sent and/or presented to the given user when a time period between a current date and the date of the travel is at, within, or other compares favorably to a predetermined time window, such as within a week from the current date, within 48 hours of the current date, and/or within another predetermined time window. For example, the communication initiation prompt data 1710 is presented to the user based on the user having upcoming travel data 1730 indicating a travel date that is within the predetermined time window. In such cases, this communication initiation prompt data 1710 can include a notification, suggestion, and/or reminder to consult a legal professional prior to the travel and/or to supply any inquiries regarding the upcoming travel. Other users who are not traveling within the time window are optionally not presented the option to initiate communication with an immigration assistance entity 1740.

As illustrated in FIG. 17G, the communication facilitation module 1720 can implement the communication initiation determination module 1711, for example, based on performing a corresponding communication initiation determination function of a corresponding communication initiation determination function entry 719. For example, rather than wait for a user to initiate communication via communication initiation request 1715 received in response to the communication initiation prompt data, the communication facilitation module 1720 generates and sends communication initiation data 1725 to an immigration assistance entity 1740 to initiate communication between the immigration assistance entity 1740 and a given user based on upcoming travel data 1730, submission confirmation data 1125, and/or application acceptance data 1145 for the given user, or other information in the given user's user account.

For example, communication initiation data 1725 is generated and sent to immigration assistance entity 1740 of a lawyer to initiate communication between the lawyer and a given user based on the user having upcoming travel data 1730 indicating the user has a travel date within a predetermined time window, such as 48 hours or a short time window. As another example, the communication initiation data 1725 is generated and sent to immigration assistance entity 1740 of a lawyer based on determining the destination country and/or dates of the upcoming travel data 1730 are not permitted by the user's immigration status and/or could render unfavorable legal consequences. The communication initiation data 1725 can be automatically generated and sent to immigration assistance entity 1740 based on other information for the determined for user by immigration assistance system 100, for example, based on accessing and processing data of user account 165 or other information supplied by or generated for the user to determine the information indicates an urgent matter and/or indicates a potential scenario that could render serious legal consequences if left unaddressed.

FIG. 17H illustrates an embodiment of an immigration assistance system 100 that implements an immigration application materials submission system 108 to submit an immigration application for a given user. The immigration application materials submission system 108 can receive submission confirmation data 1125, which can cause the immigration assistance system 100 to implement the immigration assistance communication system 120 for the given user, for example, as illustrated in FIG. 17D. Alternatively or in addition, the immigration application materials submission system 108, after submitting the user's immigration application, can receive application acceptance data 1145 indicating the user's immigration application is granted, which can cause the immigration assistance system 100 to implement the immigration assistance communication system 120 for the given user, for example, as illustrated in FIG. 17E.

FIG. 17I illustrates an embodiment of an immigration assistance communication system 120 that implements communication facilitation module 1720 to generate communication initiation data by implementing an assistance entity selection module 1760 to generate assistance entity selection data 1765 from a plurality of assistance entities in an assistance entity set 1762. The assistance entity set can be stored in a communication initiation function entry 718 and/or can be otherwise stored, accessed, received, and/or determined by the immigration assistance communication system 120.

The assistance entity selection data 1765 can be generated based on performing a communication initiation function of a corresponding communication initiation function entry 718, for example, as discussed in conjunction with FIG. 7U. The communication initiation data 1725 can be generated and/or sent to the assistance entity based on utilizing the assistance entity identifier 1766 and/or the assistance entity contact data 1768 of the selected assistance entity. The assistance entity selection data 1765 can be indicated in the corresponding communication initiation data 1725.

For example, a given assistance entity is selected for communication with a particular user based on: the communication initiation request 1715 received from the client device indicating a assistance entity type 1767, such as a legal assistance entity or a cultural assistance entity; the location of the assistance entity being near and/or comparing favorably to a location of the user; a time zone of the assistance entity being the same as, close to and/or comparing favorably to a time zone of the user; a country of specialty and/or residence of the assistance entity being the same as the country to which the user immigrated; the assistance entity being currently available and/or being available at a time scheduled by the user; the assistance entity charging rates within a rate range configured by the user; the assistance entity being capable of communicating via a communication medium selected by the user; the user being assigned to an assistance entity based on having previously communicated with the assistance entity and/or based on the user having favorable communication feedback response data 567 for the assistance entity; the user being assigned to an assistance entity that is different from another assistance entity with which the user previously communicated, based on the user having unfavorable communication feedback response data 567 for this other assistance entity; a turn based, priority based, and/or randomized approach to assigning multiple users requesting communications to assistance entities available to provide communications, and/or other information utilized to select the assistance entity.

In some embodiments, one or more users of the immigration assistance system 100 can be assigned as assistance entities for other users of the immigration assistance system 100. For example, a first user that has already immigrated to a given country and/or has been living in the country for at least a threshold amount of time, such as more than one year, can be automatically selected as an immigration assistance entity 1740 corresponding to a mentor for a second user that has not yet arrived in the country and/or that has been living in the country for less than a threshold amount of time, such as less than one month. For example, the first user with more experience living in the country provides tips and/or suggestions as a cultural assistance entity to help the newly established user find their way. In some cases, the first user has already left the country, but can still provide valuable insights to the second user based on having lived there recently and/or based on having previously attended a same academic institution that the given user is attending.

Alternatively or in addition, two users that are immigrating to a country within similar time frames, such as within a same threshold time window, and/or are immigrating with study permits to a same academic institution and/or for a same field of study at the academic institution are connected, for example, as immigration assistance entities 1740 assigned to each other as peers, enabling these users to become friends and/or be points of contact when first arriving and getting settled in the country, due to their proximity and/or study at the same institution.

In such embodiments, one or more assistance entity identifiers 1766 can correspond to users of immigration assistance system 100, such as users that completed and/or submitted immigration applications via immigration assistance system 100 and/or that otherwise obtained immigration status and/or received immigration assistance based on interaction with immigration assistance system 100 and/or based on having a user account 165 with immigration assistance system 100.

The assistance entity selection module 1760 can optionally select a given second user as an immigration assistance entity 1740 for a given first user based on the given first user and the given second user: having immigration status for a same country; having a same type of immigration status; having country entry dates within a threshold time range; having ages within a threshold age range; having same native languages; being citizens of and/or immigrating from a same country; attending a same academic institution; having study program start dates within a threshold time range; having a same field of study at the academic institution; having a same employer or place of work in the country; living in a same neighborhood and/or addresses within a threshold distance; indicating similar hobbies and/or interests in response data 582; and/or any other information, for example, accessed in user accounts 165, indicating the two users may be suitable peers and/or that one user may be a suitable mentor for the other user.

In some embodiments, the assistance entity selection module 1760 can optionally select a given second user as an immigration assistance entity 1740 for a given first user based on the given first user and the given second user having a similarity score that compares favorably to a predefined similarity score threshold, and/or that is more favorable than similarity scores between the first user and some or all other possible users and/or possible immigration assistance entities 1740. For example, the similarity score between two users is generated based on a number of fields of the user accounts that are similar and/or matching, where two users with more matching fields of their user accounts have a more favorable similarity score than the similarity score of two other users with less matching fields of their user accounts. The similarity score can be computed as a Euclidean distance between a feature vector of the first user and a feature vector of the second user, where each feature vector is populated with quantitative and/or categorical values corresponding to information in corresponding fields of their user accounts 165.

In some embodiments, the communication initiation function utilized to generate the assistance entity selection data 1765 is trained and/or updated over time via at least one artificial intelligence technique and/or at least one machine learning technique, for example, based on a training set of prior assistance entity selection data 1765, corresponding communication feedback response data 567, and/or other information of user accounts 165. For example, the historical immigration data processing system generates trend data indicating successful means of pairing users with assistance entities that renders favorable communication feedback response data 567, such as particular information in a user's user account 165 that utilized to select an assistance entity, and this trend data is utilized to automatically update the communication initiation function utilized to generate the assistance entity selection data 1765.

FIG. 17J illustrates an embodiment where communications are initiated between each of a plurality of client devices 130.1-130.N with a corresponding one of a set of immigration assistance entities 1740.1-1740.W via sending of communication initiation data 1725 for each user to one of the set of immigration assistance entities 1740.1-1740.W. For example, a given immigration assistance entity 1740 is selected for a given user based on the communication facilitation module 1720 implementing the assistance entity selection module 1760 of FIG. 17I and/or based on performing communication initiation function entry 718, for example, of FIG. 7U.

FIG. 17K illustrates an embodiment where priority data 1724 is assigned to users requesting communication via a priority data generator 1722 of the communication facilitation module 1720. Communication can be initiated for the plurality of users based on their corresponding priorities, where higher priority users are serviced first. In this example, priority data 1724.7 for the user of client device 130.7 is more favorable than priority data 1724.4 for the user of client device 130.4, which is more favorable than priority data 1724.5 for the user of client device 130.5. Based on communication initiation data 1725.7 being more favorable than priority data 1724.5, communication is serviced for the user of client device 130.7 before the user of client device 130.5 via sending of communication initiation data 1725.7 before sending of communication initiation data 1725.5 to a corresponding immigration assistance entity 1740.1 selected to communicate with both users. For example, the person associated with immigration assistance entity 1740.1 communicates with the user of client device 130.5 after completing a conversation with the user of client device 130.7 based on receiving communication initiation data 1725.7 before communication initiation data 1725.5. Alternatively, the person associated with immigration assistance entity 1740.1 communicates with the user of client device 130.5 while also communicating with the user of client device 130.7 via two different text-based chat conversations.

Priority data 1724 can be automatically generated based on an ordering that communication initiation requests are received. For example, 1725.7 is more favorable than priority data 1724.5 based on the communication initiation request 1715.7 being received from client device 130.7 prior to the communication initiation request 1715.5 being received from client device 130.5.

Priority data 1724 can alternatively or additionally be automatically generated based on an urgency or severity of the type of assistance, and/or a particular inquiry or status for the given user. For example, a first user is assigned a more favorable priority than a second user based on the first user having upcoming travel data 1730 that is closer to the current date than the upcoming travel data 1730 of the second user. As a particular example, a given user whose communication initiation request is received after a set of other communication initiation requests is prioritized above all the other corresponding users of the set of other communication initiation requests based on the user currently being held at the border of the country and/or based on the date of entry into the country corresponding to the current date.

As another example, a first user is assigned a more favorable priority than a second user, based on the first user's communication initiation request 1715 indicating a current location of the client device of the first user indicating the user is currently at an airport and/or within a threshold radius of a border crossing station. For example, the client device 130 can generate the communication initiation request to indicate a current location of the client device based on geolocation data generated by the client device. In some embodiments, the geolocation data is implemented as input to the communication initiation determination module 1711, where communications are automatically initiated and/or the prompt data is automatically presented based on the user's client device's geolocation data indicating the client device is currently at an airport and/or within a threshold radius of a border crossing station.

FIG. 17L illustrates an embodiment of immigration assistance communication system 120 that implements an immigration assistance entity 1740 as a virtual immigration assistance entity via execution of an automated immigration inquiry response function, for example, of a corresponding automated immigration inquiry response function entry 720, and/or via other natural language processing techniques and/or via other artificial intelligence and/or machine learning techniques.

This virtual immigration assistance entity 1740 can generate a plurality of automated response data 1742.1-1742.L as communications B sent to the user, where each of the plurality of automated response data 1742.*i* is generated as text and/or audio data based on processing one or more previously received inquiry data 1741.1-1741.*i* as communications A received from the user, where each of L response data 1742.1-1742.L is generated and sent to the client device in response to receiving each of L inquiry data 1741.1-1741.L. This can include extraction of textual data from audio data received in inquiry data 1741.1-1741.L and/or translation of a language of textual data indicated in inquiry data 1741.1-1741.L. This can include automatically identifying a category of the inquiry and/or generating information corresponding to the inquiry data 1741 as a response to the inquiry data, for example, based on accessing a knowledge-based system and/or ontology of legal information and/or cultural information mapped to various categories and/or subcategories, and/or based on performing utilizing natural language processing model trained on a training set that includes a plurality of prior communication log data 560 for a plurality of conversations between users and human or virtual entities.

As a particular example, the virtual immigration assistance entity 1740 sends automated response data 1742 indicating a set of warm clothing, such as snow boots and a parka jacket, are recommended for immigration into Canada based on identifying corresponding inquiry data 1741 as relating to clothing, weather in Canada, and/or what to pack. The virtual immigration assistance entity 1740 can further identify particular brands of clothing, such as Canada Goose, for example, based on the brand being mentioned in prior communication log data 560 for a plurality of conversations and/or based on the corresponding conversations having favorable communication feedback response data 567. The virtual immigration assistance entity 1740 can further send links to websites for purchase of the recommended clothing and/or can send information regarding a retail store that carries the recommended clothing, such as a retail store that is closest to a residential address or and/or a current location of the user.

FIG. 17M illustrates an embodiment of client device 130 that locally implements some or all functionality of the immigration assistance communication system 120, for example, based on storing and/or executing corresponding subsystem application data 318. In such embodiments, the communication facilitation module 1720 can be implemented via client processing module 320 and/or client memory module 310.

In various embodiments, immigration assistance communication system includes at least one processor, and at least one memory that stores executable instructions. The executable instructions, when executed by the at least one processor, can cause the immigration assistance communication system to: determine an immigration application for a first user was granted for a first user; send communication initiation prompt data to a first client device for display to a first user via an interactive user interface based on determining the immigration application was granted for the first user; receive communication initiation request from the first client device, where the first client device generated the communication initiation request based on user input to the first client device in response to the communication initiation prompt data via the interactive user interface; and/or establish communications between the first user and an immigration assistance entity based on receiving the communication initiation request.

In various embodiments, a client device includes at least one processor, and at least one memory that stores executable instructions. The executable instructions, when executed by the at least one processor, can cause the client device to: present communication initiation prompt data via an interactive user interface displayed via a display device of the client device based on determining an immigration application for a user of the client device was granted; generate a communication initiation request based on user input to the client device in response to the communication initiation prompt data via the interactive user interface; send the communication initiation request to an immigration assistance communication system; and/or receive communications from an immigration assistance entity based on sending the communication initiation request to the immigration assistance communication system.

FIG. 17N illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 16O and/or to perform some or all of the functionality discussed in conjunction with FIGS. 17A-17M.

Some or all steps of FIG. 17N can be performed by implementing an immigration assistance communication system 120. For example, at least one subsystem memory module of the immigration assistance communication system 120. stores executable instructions that, when executed by at least one subsystem processing module of the immigration assistance communication system 120, cause the immigration assistance communication system 120 to execute some or all steps of FIG. 17N and/or to perform some or all of the functionality discussed in conjunction with FIGS. 17A-17M.

Some or all steps of FIG. 17N can be performed by implementing and/or communicating with one or more other subsystems 101. Some or all steps of FIG. 17N can be performed by accessing user account database 162, utilizing some or all data of one or more user accounts 165, and/or generating some or all data of one or more user accounts 165. Some or all steps of FIG. 17N can be performed by accessing function library 172 and/or by performing one or more functions of function library 172. Some or all steps of FIG. 17N can be performed based on communicating with one or more client devices 130.

Step 1782 includes determining an immigration application for a first user was granted for a first user. Step 1784 includes send communication initiation prompt data to a first client device for display to a first user via an interactive user interface based on determining the immigration application was granted for the first user. Step 1786 includes receiving communication initiation request from the first client device, where the first client device generated the communication initiation request based on user input to the first client device in response to the communication initiation prompt data via the interactive user interface. Step 1788 includes establishing communications between the first user and an immigration assistance entity based on receiving the communication initiation request.

In various embodiments, the method can further include facilitating submission of the immigration application for the first user and/or receiving immigration application acceptance data indicating the immigration application is accepted based on facilitating submission of the immigration application.

In various embodiments, facilitating submission of the immigration application for the first user includes transmitting the immigration application by sending a set of immigration application materials to the government server system. In various embodiments, facilitating submission of the immigration application for the first user includes sending a set of immigration application materials to the immigration application materials submission system 108 for submission.

In various embodiments, facilitating submission of the immigration application for the first user includes implementing the immigration application materials guided completion system 106 to complete the set of immigration materials. In various embodiments, facilitating submission of the immigration application for the first user includes implementing the immigration application materials submission system 108 to submit the immigration application.

In various embodiments, facilitating submission of the immigration application for the first user includes sending some or all of a set of immigration application materials to the first client device for: display to the first user, review by the first user, editing by the first user via user input to the first client device, and/or transmission by the first client device to the government server system via user input to the first client device.

In various embodiments, determining the immigration application for a first user was granted for the first user can be based on receiving the immigration application acceptance data. For example, the immigration application acceptance data is received from the government server system and/or from the immigration application materials submission system 108. In various embodiments, determining the immigration application was granted can include accessing an immigration status in a user account associated with the first user and/or can include receiving immigration acceptance data from immigration application materials submission system 108.

In various embodiments, establishing communications between the first user and the immigration assistance entity can include performing a communication initiation function. In various embodiments, the communication initiation function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an communication initiation function entry 718, of function library 172; and/or otherwise determined by immigration assistance system.

In various embodiments, sending the communication initiation prompt data to a first client device for display to a first user can be further based on determining whether communication prompt condition data is met. In various embodiments, the communication prompt condition data can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an communication initiation function entry 718, of function library 172; and/or otherwise determined by immigration assistance system.

In various embodiments, the method includes determining a country entry date for the first user corresponding to entry to first country, where the first country corresponds to the country for which the immigration status was granted for the first user. Sending the communication initiation prompt data to a first client device for display to a first user can be further based on the country entry date. For example, the communication initiation prompt data is sent to the first user based on a time period between a current date and the country entry date falling within or otherwise comparing favorably to a predetermined time window. In various embodiments, the country entry date is determined based on being indicated in a set of responses received from the first client device and/or based on being accessed in a user account corresponding to the first user. In various embodiments, determining the country entry date for the first user includes extracting travel date data and/or study program start date data, from the at least one immigration application material of the immigration application.

In various embodiments, the method includes determining a country exit date for the first user corresponding to exit from the first country, where the first country corresponds to the country for which the immigration status was granted for the first user. Sending the communication initiation prompt data to the first client device for display to the first user can be further based on the country exit date. For example, the communication initiation prompt data is sent to the first user based on a time period between a current date and the country exit date falling within or otherwise comparing favorably to a predetermined time window. The country exit date can be determined based upon upcoming travel data determined for the first user. In various embodiments, the upcoming travel data is determined based on being indicated in a set of responses received from the first client device and/or based on being accessed in a user account corresponding to the first user. In various embodiments, determining the upcoming travel data for the first user includes extracting travel date data, study program end date data, and/or study program break date data, from the at least one immigration application material of the immigration application.

In various embodiments, the communication initiation prompt data further indicates country entry instruction data for display to the first user via the interactive user interface. In various embodiments, the immigration assistance entity corresponds to a lawyer, such as an immigration lawyer, and/or a legal advisor.

In various embodiments, the communication initiation prompt data indicates a plurality of assistance types. The communication initiation request can indicate a selected assistance type selected from the plurality of assistance types. The method can further include selecting the immigration assistance entity from a plurality of immigration assistance entities based on the selected assistance type. In various embodiments, the plurality of assistance types includes: a legal assistance type and a country adaptation assistance type.

In various embodiments, establishing communications between the first user and an immigration assistance entity includes initiating: text-based communication between the first user and the immigration assistance entity, voice-based communication between the first user and the immigration assistance entity, and/or video-based communication between the first user and the immigration assistance entity.

In various embodiments, establishing communications between the first user and an immigration assistance entity includes facilitating communication between a first client device of the first user and a second client device of the immigration assistance entity via a communications platform of the immigration assistance communication system. A second user of the second client device can correspond to the immigration assistance entity.

In various embodiments, establishing communications between the first user and an immigration assistance entity includes receiving a first plurality of communication data from the first client device, sending the first plurality of communication data to the second client device, receiving a second plurality of communication data from the second client device, and/or sending the second plurality of communication data to the first client device. The first plurality of communication data and/or the second plurality of communication data can correspond to: text data corresponding to chat-based communications; audio data corresponding to voice-based communications; and/or video data corresponding to video-based communications.

In various embodiments, the method includes facilitating submission of a plurality of immigration applications for a plurality of users that includes the first user and that further includes a second user, for example, based implementing or communicating with the immigration application materials submission system 108. The method can further include selecting the second user from the plurality of users based on receiving communication initiation request from the first client device, where the immigration assistance entity corresponds to the second user, and where communications are established between the first user and the second user. In various embodiments, the second user is selected from the plurality of users based on a country entry date determined for the second user being prior to a current date and/or based on a country entry date determined for the first user being after to a current date. In various embodiments, the second user is selected from the plurality of users based on a country entry date determined for the second user being prior to a country entry date determined for the first user by at least a predetermined threshold timeframe.

In various embodiments, the method further includes determining a study institution for the first user based on the immigration application and/or a user account for the first user and determine a study institution for the second user based on another one of the plurality of immigration applications and/or another user account corresponding to the second user. Selecting the second user from the plurality of users can be based on the study institution for the first user being the same as the study institution for the second user.

In various embodiments, the method further includes sending immigration application data of the immigration application of the first user to a second client device associated with a second user corresponding to the immigration assistance entity for display via a display device of the second client device based receiving the communication initiation request from the first client device.

In various embodiments, the method further includes receiving communication initiation request from a plurality of client devices corresponding to a plurality of users, determining a plurality of country entry dates for the plurality of users, generating communication initiation priority data indicating an ordering the plurality of users based on an ordering of the plurality of country entry dates, and/or establishing communications between the plurality of users and the immigration assistance entity in accordance with the communication initiation priority data.

In various embodiments, the immigration assistance entity is implemented via artificial intelligence, and the immigration assistance entity automatically generates at least one response to communications received from the at least one user based on performing at least one automated immigration inquiry response function. In various embodiments, the immigration inquiry response function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an automated inquiry response function entry 720, of function library 172; and/or otherwise determined by immigration assistance system.

FIG. 17O illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 17O and/or to perform some or all of the functionality discussed in conjunction with FIGS. 17A-17M.

Some or all of the executable instructions can be included in application data 315 that is generated by, is received from, and/or otherwise corresponds to the immigration assistance system 100. For example, execution of the application data 315 can cause the client device to implement functionality of the immigration assistance communication system 120 as illustrated in FIG. 17M.

Some or all steps of FIG. 17O can be performed based on communicating with one or more subsystems 101 of immigration assistance system 100. Some or all steps of FIG. 17O can be performed in a same or similar fashion as some or all steps of FIG. 17N. Some or all steps of FIG. 17O can be performed in conjunction with one or more of the various embodiments discussed in conjunction with FIG. 17N.

Step 1781 includes presenting communication initiation prompt data via an interactive user interface displayed via a display device of the client device based on determining an immigration application for a user of the client device was granted. Step 1783 includes generating a communication initiation request based on user input to the first client device in response to the communication initiation prompt data via the interactive user interface. Step 1785 includes sending the communication initiation request to an immigration assistance communication system. Step 1787 includes receiving communications from an immigration assistance entity based on sending the communication initiation request to the immigration assistance communication system.

FIGS. 18A-18F present embodiments of an immigration status update system 122. The immigration status update system 122 can be implemented as a subsystem 101 of the immigration assistance system 100 and/or can be implemented by a client device 130, for example, based on execution of corresponding subsystem application data 318.

Users seeking immigration status can interact with the immigration assistance system 100 to receive various form of assistance discussed herein. In some cases, one form of assistance can correspond to determination of immigration status update date, such as whether a given user is eligible to and/or is recommended to: extend their immigration status, acquire a new type of immigration status in the same country, acquire immigration status in a different country, and/or otherwise change their immigration status. This determination can be made based on detected changes in the user's employment, student, or living status, based on detecting upcoming deadlines to the current immigration status, and/or other information determined for the user. The assistance can further include communicating recommendations and/or eligibility for these changes in immigration status, and/or facilitating completion and/or submission of application materials as required to facilitate the change immigration status.

For example, a new immigration application is completed for a given user based on automatically generating and/or completing at least one immigration application based accessing a previously completed and/or previously submitted immigration application for the given user, for example, that was utilized to acquire the current and/or a prior immigration status for the user. For example, the new immigration application includes application materials 531 of this prior immigration application, and/or includes extracted data 539 extracted from completed application materials set 530.

Some or all of this functionality of the immigration status update system 122 improves the technology of computer-based immigration systems based on improving the efficiency of generating immigration applications for users, for example, based on identification of and completion of only materials by leveraging previously completed immigration applications rather than completing an immigration application for users starting from scratch. Some or all of this functionality of the immigration status update system 122 improves the technology of computer-based immigration systems based on gathering information and computing corresponding quantitative data regarding immigration application requirements that can be utilized over time as historical data utilized as input to one or more immigration analytical functions utilized determine trends in rate of granting of immigration applications to users and/or length of time in processing of immigration applications that correspond to extensions of and/or changes of immigration status as a function of various information collected from users that undergo multiple immigration statuses in one or more countries.

As illustrated in FIG. 18A, the immigration status update system 122 can send immigration status update prompt data 1810 a given client device 130.1, and/or a plurality of client devices 130.1-130.N. For example, the immigration status update prompt data 1810 can be implemented as some or all of the input prompt instruction data 628 of application requirement function entry 704 utilized to procure the corresponding set of responses 1-Q as discussed in conjunction with FIG. 7Y, FIG. 6F, and/or FIG. 6G. As another example, the immigration status update prompt data 1810 is indicated in application data 318 sent to the client device 130 for execution. As another example, the immigration status update prompt data 1810 is sent to a corresponding client device based on receiving a request from the client device to update their user account with new information, to update their current work, student, marital, or residential status, and/or explore other immigration status options and/or to receive immigration assistance. Each immigration status update prompt data 1810 can be presented to the corresponding user via interactive user interface 375, for example, as one or more individual questions or other prompts.

In some embodiments, the immigration status update prompt data 1810 is only sent to and/or presented via a given client device 130 based on determining: the corresponding user is determined to have already submitted an application, for example, based on submission confirmation data 1125 received and/or accessed for the user; the corresponding user is determined to have already been granted immigration status, for example, based on application acceptance data 1145 received and/or accessed for the user; the corresponding user is determined to have already arrived in the country, for example, based on country entry date and/or a start date of their immigration status being prior to a current date; and/or the corresponding user is determined to still be residing in the country, for example, based on country exit date and/or an expiration date of their immigration status being after a current date.

In some embodiments, the immigration status update prompt data 1810 is only sent to and/or presented via the given client device based on the immigration status update system 122 automatically detecting a life change that requires attention, and/or detecting pending expiration of current status, for example, to seek information regarding what the user wishes to do next and/or if new application materials should be prepared and submitted.

In some embodiments, the immigration status update prompt data 1810 is sent to and/or presented via the given client device based on a status change date determined for the user. For example, the status change date can correspond to the date of a determined status change and/or status update. The status change date can be determined automatically, for example, as and/or based on an expiration date of the user's current immigration status, an expiration of the user's passport or other application material 531 included in the user's prior immigration application utilized to obtain the user's current immigration status, an end date of the user's current study program and/or employment extracted from a corresponding letter of acceptance and/or offer letter, and/or date of another change in immigration status and/or life change of the user. The status change date can optionally be detected and/or extracted the application acceptance data 1145. The status change date can optionally be determined based on one or more of the user's response data 582 in response to prior prompts. The status change date can be after the date when the user's current immigration status was granted and can be before and/or on the date that the user's current immigration status expires. The status change date can be prior to a current date, based on the corresponding status change already occurring, and/or can be upcoming, for example, based on being predetermined and/or scheduled. The status change date can alternatively be received in the status change data 1815 and/or generated in the immigration status update data 1825.

For example, the immigration status update prompt data 1810 is presented to the user based on detecting expiration date of the user's current immigration application being within a threshold time window, such as one or more months, where the immigration status update prompt data 1810 indicates a notification of the pending expiration, and prompts the user with options regarding continuing their stay in the given country via obtaining a new type of immigration status and/or current immigration status.

As another example, the immigration status update prompt data 1810 is presented to the user based on automatically detecting other life changes for the user, such as the user moving, starting a new job, getting married, having a baby, traveling out of the country briefly or permanently, or other life changes, for example, based on other information received from family members of the user that are themselves users of the immigration assistance system 100, based on information extracted from one or more documents, and/or based on user account 165.

As another example, the immigration status update prompt data 1810 is presented to the user based on the user having been issued a study permit based on the length of one or more prerequisite courses being completed by in the country, such as the length of a prerequisite course plus one year, for example, based on the user having had only a conditional letter of acceptance when submitting their prior immigration application that was contingent on their completion of the prerequisite course. The user's immigration status can indicate that their immigration status will and/or may expire prior to completion of their full study program, for example, based on the user being accepted to the academic institution after completion of the prerequisite course. The immigration status update prompt data 1810 can be presented based on: determining the user completed their prerequisite course, based on determining a time period for completion of the prerequisite course has elapsed, based on determining the user's current study permit will expire soon and/or will expire prior to the completion of their study program at the academic institution, and/or based on flagging the corresponding immigration application for possible preemptive expiration due to including an immigration application material 531 corresponding to a letter of conditional acceptance and/or not including an immigration application material 531 corresponding to a letter of acceptance. For example, the user is alerted via immigration status update prompt data 1810 that if and/or when they are accepted into a full length program due to completion of the prerequisite course, they must submit the letter of acceptance and/or proof of completion of the prerequisite course and/or otherwise apply to extend their study permit to be able to complete the full length program while staying in the country.

The immigration status update system 122 can receive status change data 1815 for the given client device, and/or a plurality of other client devices. Each status change data 1815 can be generated by the corresponding client device 130 based on user input to the client device 130 indicating responses to questions indicated in the immigration status update prompt data 1810. Status change data 1815 can be implemented as the set of responses 1-Q utilized as input to a status update function of a corresponding status update function entry 722.

For example, the status change data 1815 can indicate one or more life changes reported by the user during their immigration, such as the user moving, starting a new job, getting married, having a baby, traveling out of the country briefly or permanently, or other life changes, as another example, the status change data can indicate that the user desires to remain in the country past their current expiration and/or otherwise wishes to extend and/or change the type of immigration status. Status change data 1815 can alternatively or additionally be implemented as any other response data 582 of user account 165, and can be stored in user account 165 for the corresponding user by immigration status update system 122 based on being received from the corresponding client device 130. The status change data 1815 can optionally indicate a status change date, corresponding to when the status change will occur and/or corresponding to a date when the status change already occurred, such as a date corresponding to the one or more life changes.

The immigration status update system 122 can implement an immigration status update initiation module 1820, for example, via subsystem processing module 420 and/or subsystem memory module 410. The immigration status update initiation module 1820 can generate immigration status update data 1825 for each given status change data 1815 received a given client devices, where multiple immigration status update data 1825 is generated for multiple status change data 1815 received from multiple client devices 130.

For example, a given immigration status update data 1825 is generated by performing the application requirement function in accordance with status update function entry 722 by utilizing responses 1-Q indicated in the corresponding application requirement response data 524 as input, for example, as discussed in conjunction with FIG. 7Y. The immigration status update data 1825 can be sent to the corresponding client devices 130 for display via interactive user interface 375. The immigration status update data 1825 can alternatively or additionally be stored in a corresponding user account 165 for the corresponding user. The immigration status update data 1825 can alternatively or additionally be utilized by the immigration status update system 122 and/or one or more other subsystems to complete a new immigration application for the given user.

The immigration status update data 1825 can indicate a particular new type of immigration status and/or change to current immigration status. For example, the immigration status update data 1825 indicates the immigration status be changed from a student permit to a work permit based on the user indicating they are seeking and/or obtained employment in the country in status change data 1815. As another example, the immigration status update data 1825 indicates the immigration status be extended, renewed, and/or new status be acquired based on the user indicating they plan to stay in the country longer. As another example, the immigration status update data 1825 indicates the immigration status be changed to a permanent resident status based on the user indicating they plan to remain in the country indefinitely. As another example, the immigration status update data 1825 indicates the user must report their corresponding life changes, such as getting married or moving, to the government entity in accordance with reporting requirements to maintain their current status.

The immigration status update data 1825 can indicate whether the user is eligible to extend their immigration status and/or obtain one or more new types of immigration status. This eligibility can be based on generating a risk assessment score 541 for the user and/or based on implementing the immigration eligibility risk assessment system 102. The user's new risk assessment score 541 can be different from a prior risk assessment score generated in conjunction with obtaining their current immigration status and/or that indicates the level of risk and/or estimated processing time for the user's extension of their immigration status and/or obtain one or more new types of immigration status. The new risk assessment score 541 can be generated based on some or all of the same risk factors, such as prior responses to generate the prior risk assessment score 541, and/or based on one or more new risk factors identified for the user since the prior risk factor score was generated based on changes of the user since the prior risk factor score was generated. The new risk assessment score 541 can optionally be favorable based on, and/or have a favorable contributing risk factor corresponding to, the user having previously being granted immigration status in the country, for example where the new risk assessment score 541 is more favorable than the prior risk assessment score 541 for this reason.

The immigration status update data 1825 can indicate application requirements for a corresponding immigration application, or other required documentation, for the user to extend their immigration status and/or obtain one or more new types of immigration status. These application requirements can be based on generating a required material set 521 and/or recommended material set 522 for the user and/or based on implementing the immigration application material requirement system, for example, that are different from a prior required material set 521 and/or a prior recommended material set 522 for the user that was generated in conjunction with obtaining their current immigration status and/or that indicates the level of risk and/or estimated processing time for the user's extension of their immigration status and/or obtain one or more new types of immigration status. Some or all application materials of the new required material set 521 and/or a new recommended material set 522 for the user can be identified based on whether they were included in the prior required material set 521 and/or the prior recommended material set 522 for the user. Some or all new required material set 521 and/or a new recommended material set 522 for the user can correspond to new application materials not previously submitted based on: changes of the user's life status or other changes since the prior required material set 521 and/or the prior recommended material set 522 were determined; corresponding to a different type of immigration status with different requirements; and/or based on indicating that documentation indicating the user's previously granted immigration status in the country is required and/or recommended.

The immigration status update data 1825 can indicate and/or include one or more application materials 531 to be included in a new immigration application, such as the new application for the given user, and/or an immigration application for a user's family member. Some application materials 531 to be included in a new immigration application of the same user can be identified and/or generated based on immigration application materials of the user's prior immigration application. Some application materials 531 to be included in an immigration application of a user's family member can be identified and/or generated based on immigration application materials of the user's immigration application that was generated previously, and/or that is being generated concurrently.

For example, consider the case where the status change data 1815 is based on the user having completed one or more prerequisite courses to be accepted into a full length academic program, but having a current immigration status that will expire prior to the completion of the full length academic program due to having been issued based on the user's letter of conditional acceptance, where acceptance was contingent on the user's completion of the one or more prerequisite courses. The previous completed application material set 530 indicated the user's letter of conditional acceptance, for example, based on the letter of conditional acceptance being in the user's required material set 521 and/or the recommended material set 522 for the prior immigration application, for example, due to the user indicating in one or more responses that they did not have a letter of acceptance, and only had a conditional letter of acceptance. The immigration status update data 1825 can indicate the letter of acceptance and/or proof of having completed the prerequisite coursework is recommended and/or required in the required material set 521 and/or the recommended material set 522 accordingly, and the completed application material set 530 for the new immigration application can be generated to include the letter of acceptance and/or proof of having completed the prerequisite coursework accordingly, for example, based on presentation of corresponding document upload prompts for these application materials 531 due to being indicated in the user's required material set 521 and/or the recommended material set 522, and/or based on receiving application materials 531 from the user. The new immigration application can be submitted for the user, for example, prior to expiration of their current immigration status, to extend their study permit to expire once their full length academic program is complete.

One or more of these application materials 531 to be included in this new immigration application corresponds to a type of immigration application material not included in the user's prior application, and can be generated for and/or received from the user and/or the user's family member for the first time by immigration assistance system 100 for inclusion in the new immigration application, for example, based on not being required or recommended application material of the user's prior immigration application, but being required and/or recommended for inclusion in this new immigration application. For example, one or more of these new application materials 531 are generated via corresponding application material completion modules 1022 of immigration application materials guided completion system 106. As a particular example, one or more of these new application materials 531 is generated to include and/or is generated based on: information, such as responses and/or documents, received in status change data 1815, and/or extracted data 539 extracted from one or more application materials 531 of the prior immigration application of the user.

Alternatively or in addition, one or more of these application materials 531 for inclusion in the new immigration application corresponds to a type of immigration application material that was included in the user's prior application, but is modified from and/or otherwise is different from this application included in the user's prior application. For example, these new versions of application materials can be generated for and/or received from the user for inclusion in the new immigration application. For example, one or more of these updated application materials 531 are generated via corresponding application material completion modules 1022 of immigration application materials guided completion system 106. As a particular example, one or more of these new application materials 531 of a same type is generated to include and/or is generated based on: information, such as responses and/or documents, received in status change data 1815, and/or extracted data 539 extracted from one or more application materials 531 of the prior immigration application. For example, an uploaded document corresponds to a more recent and/or non-expired version of a prior document for the application material in the prior application that is now expired, such as a renewed passport for the user, more recent medical exam results for the user, and/or a more recent digital photograph of the user. Users can automatically be prompted to supply information and/or new documents for required application materials that were included in the prior immigration application, but are detected to be expired and/or older than a date range required for the corresponding immigration application material.

Alternatively or in addition, one or more of these application materials 531 for inclusion in the new immigration application corresponds to an identical immigration application material included in the user's prior immigration application. For example, this application material can correspond to a static application material and/or application material that is not expired and/or still in an acceptable date range such as a social security card, birth certificate, and/or non-expired passport. In such embodiments, rather than being regenerated and/or reuploaded these application materials can be retrieved directly from the completed application materials set 530 of the user's prior immigration application, for example, in immigration application history 512. These application materials can be deemed complete, for example, where they optionally do not need to undergo processing for adherence or verification, for example, based on already having favorable requirement adherence data 538 and/or favorable verification data 537.

The immigration status update data 1825 can indicate immigration status be acquired for another person, such as a spouse due, child, relative, or other family member of the user. For example, the immigration status update data 1825 can indicate immigration status based on this family member also moving to the country and/or based on the user getting married and their spouse requiring immigration status. New user accounts 165 can be created for these new users and/or can be updated if these family members are existing users. The immigration status update data 1825 can indicate, for a given family member of the user: the eligibility data such as a risk assessment score 541 for this family member; application requirements such as a required material set 521 and/or a recommended material set 522 for this family members; and/or one or more application materials 531 completed for this family member to be included in their immigration application.

As illustrated in FIG. 18B, the immigration assistance system 100 can implement immigration status update system 122 to generate this immigration status update data 1825 for a given user, indicating immigration application status be acquired and/or changed for the user and/or that immigration application status be acquired for one or more of the user's family members. Based on generating this immigration status update data 1825, the immigration application materials guided completion system 106 can be implemented to generate a completed application material set 530 for the given user and/or for one or more of the user's family members. The immigration application materials submission system 108 can be implemented to submit the completed application materials set 530 to the government server system 140.

This new completed application material set 530 can include one or more application materials 531 that are different types of immigration application materials from and/or include different information from a set of application materials 531 of a previously submitted immigration application for the user, corresponding to the user's current status. This new completed application material set 530 can be submitted to a same or different government server system 140 of a same or different country from previously submitted immigration application for the user, for example where the government server system 140 is different based on the immigration status being different and/or where the where the government server system 140 is different based on the country being different.

Alternatively or in addition, a completed application material set 530 for a user's family member is optionally generated after and/or in conjunction with the given user's completed application material set 530, for example, where the given user's own status is not necessarily updated, but immigration status is acquired for a family member after the immigration status is acquired for the user and/or in tandem with acquiring the immigration status for the user via immigration assistance system 100. This completed application material sets 530 for a set of related family members generated in tandem and/or at different times can be submitted to a same or different government server system 140, for example where the government server system 140 is different based on the immigration status for different family members being different.

As illustrated in FIG. 18C, the immigration status update data 1825 can be generated by immigration status update initiation module 1820 based on a set of responses 1856.1-1856.Q of the status update response data 1855, such as responses 1856.1-1856.R to a set of questions presented in immigration status update prompt data 1810.

As illustrated in FIG. 18D, the immigration status update data 1825 can alternatively or additionally be generated by immigration status update initiation module 1820 based on document files 532.1-532.R included in status update material data 1857, for example, where the immigration status update data 1825 includes and/or indicates these document files, is generated by performing at least one document processing function, and/or includes extracted data 539 extracted from one or more of these document files.

As illustrated in FIG. 18E, the immigration status update data 1825 can alternatively or additionally be generated by immigration status update initiation module 1820 based on immigration application history 512 of the user and/or a user's family member, such as application materials 531 and/or corresponding extracted data 539. The immigration status update data 1825 can alternatively or additionally be generated by immigration status update initiation module 1820 based on one or more response data 582 of response log data 517 of the user and/or the user's family member, such as responses received in conjunction with completing the prior application and/or responses received after the prior application was granted. The immigration status update data 1825 can alternatively or additionally be generated by immigration status update initiation module 1820 based on any other information of the user's user account. The immigration status update data 1825 can alternatively or additionally be generated by immigration status update initiation module 1820 based on any other information of a family member's user account.

FIG. 18F illustrates an embodiment of client device 130 that locally implements some or all functionality of the immigration status update system 122, for example, based on storing and/or executing corresponding subsystem application data 318. In such embodiments, the immigration status update initiation module 1820 can be implemented via client processing module 320 and/or client memory module 310.

In various embodiments, an immigration status update system includes at least one processor, and at least one memory that stores executable instructions. The executable instructions, when executed by the at least one processor, can cause the immigration status update system to: facilitate submission of a first immigration application for a first user to a government entity; determine an immigration status was granted for the first user based on the first immigration application; determine a status change date for a status change of the first user, where the status change date is after a date that the first immigration application was granted for the first user; send immigration status update prompt data to a first client device for display to the first user via an interactive user interface based on the status change date; receive immigration status update data from the first client device, where the first client device generated the immigration status update data based on user input to the first client device in response to at least one prompt displayed via the interactive user interface based on the immigration status update prompt data; and/or facilitate submission of a second immigration application for the first user to a government entity based on the immigration status update data.

In various embodiments, a client device includes at least one processor, and at least one memory that stores executable instructions. The executable instructions when executed by the at least one processor, can cause the client device to: facilitate submission of a first immigration application for a first user to a government entity; determine an immigration status was granted for the first user based on the first immigration application; determine a status change date for a status change of the first user, where the status change date is after a date that the first immigration application was granted for the first user; present immigration status update prompt data to a first client device via an interactive user interface of a display device of the client device based on the status change date; generate immigration status update data based on user input to the client device in response to at least one prompt displayed via the interactive user interface based on the immigration status update prompt data; and/or facilitate submission of a second immigration application for the first user to a government entity based on the immigration status update data.

FIG. 18G illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 18G and/or to perform some or all of the functionality discussed in conjunction with FIGS. 18A-18F.

Some or all steps of FIG. 18G can be performed by implementing an immigration status update system 122. For example, at least one subsystem memory module of the immigration status update system 122 stores executable instructions that, when executed by at least one subsystem processing module of the immigration status update system 122, cause the immigration status update system 122 to execute some or all steps of FIG. 18G and/or to perform some or all of the functionality discussed in conjunction with FIGS. 18A-18F.

Some or all steps of FIG. 18G can be performed by implementing and/or communicating with one or more other subsystems 101. Some or all steps of FIG. 18G can be performed by accessing user account database 162, utilizing some or all data of one or more user accounts 165, and/or generating some or all data of one or more user accounts 165. Some or all steps of FIG. 18G can be performed by accessing function library 172 and/or by performing one or more functions of function library 172. Some or all steps of FIG. 18G can be performed based on communicating with one or more client devices 130.

Step 1882 includes facilitate submission of a first immigration application for a first user to a government entity. Step 1884 includes determining an immigration status was granted for the first user based on the first immigration application. Step 1886 includes determining a status change date for a status change of the first user, where the status change date is after a date that the immigration application was granted for the first user. Step 1888 includes sending immigration status update prompt data to a first client device for display to the first user via an interactive user interface based on the status change date.

Step 1890 includes receiving immigration status update data from the first client device. For example, the first client device generated the communication initiation request based on user input to the first client device in response to at least one prompt displayed via the interactive user interface based on the immigration status change prompt data. Step 1892 includes facilitating submission of a second immigration application for the first user to a government entity based on the immigration status update data.

In various embodiments, facilitating submission of the first immigration application includes sending a first set of required immigration application materials for the first user to a government server system, and/or facilitating submission of the second immigration application includes sending a second set of required immigration application materials for the first user to the same or different government server system of the same or different country.

In various embodiments, facilitating submission of the first immigration application for the first user includes sending a first set of immigration application materials to the immigration application materials submission system 108 for submission, and/or facilitating submission of the second immigration application for the first user includes sending a second set of immigration application materials to the immigration application materials submission system 108 for submission.

In various embodiments, facilitating submission of the first immigration application for the first user includes implementing the immigration application materials guided completion system 106 to complete the first set of immigration materials. In various embodiments, facilitating submission of the immigration application for the first user includes implementing the immigration application materials guided completion system 106 to complete the second set of immigration materials. In various embodiments, facilitating submission of the first immigration application and/or the second immigration application for the first user includes implementing the immigration application materials submission system 108 to submit the first immigration application and/or the second immigration application.

In various embodiments, facilitating submission of the first immigration application and/or the second immigration application for the first user includes sending some or all of the first set of immigration application materials and/or the second set of immigration application materials to the first client device for: display to the first user, review by the first user, editing by the first user via user input to the first client device, and/or transmission by the first client device to the government server system via user input to the first client device.

In various embodiments, the first set of required immigration application materials and the second set of required immigration application materials can be mutually exclusive. In various embodiments, a set intersection of the first set of required immigration application materials and the second set of required immigration application materials is non-null.

In various embodiments, facilitating submission of the second immigration application further includes automatically identifying one of the first set of required immigration application materials for inclusion in the second set of required immigration application materials. For example, the one of the first set of required immigration application materials is identified for inclusion in the second set of required immigration application materials based on performing an application requirement function to identify an application material type corresponding to the one of the first set of required immigration application materials. In various embodiments, the application requirement function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry of function library 172, such as application requirement function entry 704, of function library 172; and/or otherwise determined by immigration assistance system.

In various embodiments, facilitating submission of the second immigration application further includes automatically generating a first one of the second set of required immigration application materials based on relevant information extracted from at least one of the first set of required immigration application materials. For example, the relevant information is extracted from the at least one of the first set of required immigration application materials to generate a first one of the second set of required immigration application materials based on performing an immigration information extraction function and/or an application material completion function. In various embodiments, the immigration information extraction function and/or an application material completion function can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry of function library 172, such as information extraction function entry 708 and/or an application material completion function entry 706, of function library 172; and/or otherwise determined by immigration assistance system.

In various embodiments, the method includes receiving immigration application acceptance data from the government server system and/or the immigration application materials submission system 108 indicating the immigration application is accepted, where determining the immigration status was granted for the first user is based on receiving the immigration application acceptance data.

In various embodiments, determining the status change date for the status change of the first user and/or sending the immigration status update prompt data to a first client device includes performing a status update function. In various embodiments, the predetermined time window can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as a status update function entry 722, of function library 172; and/or otherwise determined by immigration assistance system.

In various embodiments, sending the immigration status change prompt data to the first client device is based on determining a timespan between a current data and the status change date compares favorably to a predetermined time window. In various embodiments, the predetermined time window can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as a status update function entry 722, of function library 172; and/or otherwise determined by immigration assistance system.

In various embodiments, the status change of the first user corresponds to a change from studying to working. The first immigration application can correspond to a study permit, and the second immigration application can correspond to a work permit. In various embodiments, the status change date corresponds to an expiration date of the immigration status. The second immigration application can correspond to an extension of the immigration status and/or a new immigration status. In various embodiments, the method includes determining visa data for the first user, where the immigration status is determined based on the visa data. Determining the expiration date can include extracting the expiration date from the visa data. In various embodiments, the visa data can be received from the first client device, can be received from the government server system in accordance with granting of the first immigration application, and/or can be accessed in a user account associated with the first user.

FIG. 18H illustrates a method for execution by at least one processor, such as at least one processor of client processing module 320 of a client device 130. For example, at least one memory, such as at least one memory of client memory module 310, stores executable instructions that, when executed by the at least one processor, cause the client device to execute some or all steps of FIG. 18H and/or to perform some or all of the functionality discussed in conjunction with FIGS. 18A-18F.

Some or all of the executable instructions can be included in application data 315 that is generated by, is received from, and/or otherwise corresponds to the immigration assistance system 100. For example, execution of the application data 315 can cause the client device to implement functionality of the immigration assistance communication system 120 as illustrated in FIG. 18F.

Some or all steps of FIG. 18H can be performed based on communicating with one or more subsystems 101 of immigration assistance system 100. Some or all steps of FIG. 18H can be performed in a same or similar fashion as some or all steps of FIG. 18G. Some or all steps of FIG. 18H can be performed in conjunction with one or more of the various embodiments discussed in conjunction with FIG. 18G.

Step 1881 includes facilitating submission of a first immigration application for a first user to a government entity. Step 1883 includes determining an immigration status was granted for the first user based on the first immigration application. Step 1885 includes determining a status change date for a status change of the first user, where the status change date is after a date that the immigration application was granted for the first user. Step 1887 includes presenting immigration status update prompt data to a first client device via an interactive user interface of a display device of the client device based on the status change date. Step 1889 includes generating immigration status update data based on user input to the first client device in response to at least one prompt displayed via the interactive user interface based on the immigration status change prompt data. Step 1891 includes facilitating submission of a second immigration application for the first user to a government entity based on the immigration status update data.

FIGS. 19A-19D illustrate embodiments of a historical immigration data processing system 124. The historical immigration data processing system 124 can be implemented as a subsystem 101 of the immigration assistance system 100 and/or can be implemented by a client device 130, for example, based on execution of corresponding subsystem application data 318.

After a plurality of users seeking immigration status interact with the immigration assistance system 100 over time to receive various form of assistance discussed herein, information of user accounts 165 or other data received and/or generated for various users can be collected over time for the plurality of users. This information can be leveraged as a utilized as a central directory of past and present applicants, and can be utilized to search and/or maintain communications with and/or between current and/or prior users over time, where particular subsets of users can be contacted with notifications and/or can be put in contact with each other as a group of users.

Alternatively or in addition, this information can be leveraged to generate various statistical information regarding immigration applicants to identify trend data, such as: correlation data or other statistical information regarding success rate of applications being granted and/or the length of time to process and grant application as a function of various risk factors or other user information; the proportion of students with student permits that applied for and/or were granted work permits post-graduation as a function of various risk factors or other user information; distribution of applicants by country and/or by immigration status as a function of their country of origin and/or other information; and/or other trends indicated by the historical information of past users that applied for immigration status and/or received other assistance. The statistical information and/or trend data can be utilized to improve performance of various aspects of the immigration assistance system for future users. This can include updating one or more function entries 175 of one or more functions performed by the immigration assistance system 100, for example, based on automatically updating weights or other parameters, based on automatically updating a set of prompt identifiers for prompts presented to generate input, and/or based on automatically training an updated model to update a function via a set of training data that includes historical information collected for prior users. For example, one or more risk factor assessment functions can be improved based on trends relating to granting rate and/or estimated length of time of time, for example, to render a more accurate risk factor assessment function that better assesses whether a user will be granted status and/or how long processing is expected to take.

Some or all of this functionality of the historical immigration data processing system 124 improves the technology of computer-based immigration systems based on gathering information and computing corresponding quantitative data regarding immigration application requirements that can be utilized over time as historical data utilized as input to one or more immigration analytical functions utilized determine trends in rate of granting of immigration applications to users and/or length of time in processing of immigration applications that correspond to extensions of and/or changes of immigration status as a function of various information collected from users over time. Some or all of this functionality of the historical immigration data processing system 124 improves the technology of computer-based immigration systems based on improving the efficiency of assessing risk for, generating immigration applications for, and/or providing other assistance for users, for example, based on evaluation of past performance for automatic identification of improvements and/or automatic corresponding updates to functionality of the system.

Some or all features and/or functionality of historical immigration data processing system 124 can be implemented to processes immigration data for multiple users via processing a corresponding plurality of multi-dimensional points 680 of a corresponding dataset 682 to generate and/or update function definition data 620 for at least one function 690 (e.g. via configuring weights and/or biases of at least one corresponding graph structure 665), for example, as discussed in conjunction with FIGS. 6M-6P.

As illustrated in FIG. 19A, historical immigration data processing system 124 can implement an immigration analytics generator module 1910, for example, via subsystem processing module 420 and/or via subsystem memory module 410. The immigration analytics generator module 1910 can generate immigration analytics data 1915 as a function of various data included in some or all user accounts 165 for some or all users, such as various categorical and/or quantitative data of one or more fields of user accounts corresponding to any information stored in user accounts 165 and/or any other information generated for and/or collected for users of the immigration assistance system 100 described herein. The immigration analytics data 1915 can be sent to one or more administrator devices 1930, such as a client device 130 or other computing device of an administrator of the immigration analytics system and/or of a government employee, for display via a display device of the administrator device 1930. The immigration analytics data 1915 can optionally be displayed as one or more graphical representations and/or visualization data.

The immigration analytics data 1915 can indicate at least one trend, such as a plurality of trend data indicating correlations between various categorical and/or quantitative data of one or more fields of user accounts. The immigration analytics data 1915 can indicate other statistical data for one or more categories of users, such as the percentage of immigration applications that are granted for users that meet one or more criteria and/or the average length of time to process immigration applications for users that meet one or more criteria.

For example, a feature vector that includes a plurality of quantitative and/or categorial data fields can be determined for each user account utilized as input to the immigration analytics generator. A feature vector for a given user can include a set of fields corresponding to one or more of: an identifier of country to which the user applied to immigrate as categorical data; an identifier of the country from which the user applied to immigrate as categorical data; an identifier of a type of immigration status to which the user applied as categorical data; a processing time of a corresponding immigration application, such as a quantitative value based on a time difference between the submission date 506 and approval date 507 of the user's immigration application; and/or a binary value or other categorical data indicating whether or not the corresponding immigration was granted. For example, the immigration analytics data 1915 can indicate averages, distribution data, correlation data, or other statistical information generated to indicate trends in granting of immigration applications and/or processing time required to process immigration applications and/or to yield granting of immigration applications by country of the immigration, country of origin, and/or type of immigration status.

This can optionally be further utilized to determining success rates and/or processing time different types of people, for example, as a function of particular criteria of corresponding users as indicated in their user accounts 165.

This can optionally be further utilized to track attempts in acquisition of new immigration status over time, for example, based on immigration application history 512 of various users that include multiple immigration applications. This can be utilized to track how long different types of people tend to remain in a given country, for example, where the immigration analytics data 1915 can indicate a percentage of users that were granted student permits in a given country and that later elected to apply for a work permit or other immigration status in the given country to remain in the given country after graduating.

As illustrated in FIG. 19B, the immigration assistance system 100 can implement historical immigration data processing system 124 to generate function entries 175 as new function entries, such as updated versions of corresponding types of functions, for performance by immigration assistance system 100 for future users. The historical immigration data processing system 124 can implement an immigration function update module 1920, for example, via subsystem processing module 420 and/or via subsystem memory module 410, that generates function entries 175, for example, based on performing a function update function indicated by a function update function entry 1924 included in function library 172. This can include accessing and/or modifying an existing function. This can include generating and/or modifying function definition data 620, such as the model data 621, the input data type 623, the output data type 625, the function calls 627, and/or other structure, parameters, or performance of the function. This can optionally include modifying function input procurance data 622, for example, if the input data type 623 changes. The version identifier can be incrementally increased or can otherwise indicate the new function is updated from the prior version of the function. The immigration function update module 1920 can be implemented via implementing graph data update module 386 to update graph data 660 of one or more function definitions 620 for one or more functions.

In some embodiments, the function update function entry 1924 indicates a training function, and/or performing the function update function includes performing a training function in accordance with a supervised learning, unsupervised learning, or other machine learning technique, to automatically generate the model data 621. The training function can be performed upon a training set that includes a plurality of feature vectors corresponding to the plurality of user accounts. Alternatively or in addition, instructions received from administrator device 1930 can be received that indicate updates to one or more functions entries 175, for example, based on their review of the immigration analytics data 1915.

In some embodiments, the feature vector for a given user can alternatively or additionally include one or more sets of fields corresponding to sets of responses received from the user, such as a set of fields corresponding to a set of possible prompts, where each field for a given user is populated with a categorical and/or quantitative value indicating and/or based on the user's response to the given prompt, such as one response selection option of a set of possible response selection options, and/or indicating whether or not the prompt was presented to the user, for example, where this set of fields is populated for each user based on response data 582 of their response log data 517. For example, the immigration analytics data 1915 can indicate averages, distribution data, correlation data, or other statistical information generated to indicate trends in granting of immigration applications and/or processing time required to process immigration applications as a function of user response data 582, for example, to identify particular types and/or sets of response data 582 with statistically significant correlation with granting of immigration applications and/or with statistically significant correlation with the processing time required to process immigration applications.

As a particular example, the feature vector for a given user can include a set of fields corresponding to a set of responses received in response to a set of questions included in risk factor question data 810 and/or a field corresponding to risk assessment score 541. For example, the immigration analytics data 1915 can indicate averages, distribution data, correlation data, or other statistical information generated to indicate trends in granting of immigration applications and/or processing time required to process immigration applications as a function of various responses 545 included in risk factor response data 544, for example, to identify particular types and/or sets of responses 545 with statistically significant correlation with granting of immigration applications and/or with statistically significant correlation with the processing time required to process immigration applications.

This can be utilized to automatically update the risk assessment function entry 702 to improve performance of the risk assessment function, for example, of a corresponding country and/or immigration status type, based on automatically identifying as changes to: the risk assessment score threshold utilized to identify whether users receive assistance and/or to generate a binary risk assessment score; one or more response weights 632, for example, based on the statistical significance between the corresponding response and the granting of and/or processing time for the application; one or more response scoring functions 832, and/or other parameters or functionality of risk assessment function to generate risk assessment scores 541 for future users that more accurately indicate: the probability of being granted immigration status; whether or not the user is expected to be granted immigration status; and/or the estimated processing time for the immigration application.

In some cases, if other response data 582 or other information are identified to have significant correlation with granting of immigration applications and/or with statistically significant correlation with the processing time required to process immigration applications, the risk assessment function can be updated to indicate question data be presented with new prompts corresponding to collection of these response data 582 or other information, and/or can otherwise be updated to indicate these response data 582 or other information be utilized as input, for example, with a corresponding response weight 632 and/or corresponding response scoring function 832.

Alternatively or in addition, the feature vector for a given user can include a set of fields corresponding to the possible set of application materials, and can indicate a categorial value indicating whether each application material was included in the user's completed immigration application material set 530, or neither recommended nor required. For example, the immigration analytics data 1915 can indicate averages, distribution data, correlation data, or other statistical information generated to indicate trends in granting of immigration applications and/or processing time required to process immigration applications as a function of whether immigration materials were included in the immigration application, for example, to identify particular types and/or sets of application materials with statistically significant correlation with granting of immigration applications and/or with statistically significant correlation with the processing time required to process immigration applications.

This can be utilized to automatically update the application requirement function entry 704 to improve performance of the application requirement function. For example, application materials with statistically significant correlation with granting of immigration applications and/or with statistically significant correlation with the processing time required to process immigration applications can have conditional requirement data 735 updated to be included in more required material sets 521 and/or more recommended material sets 522. The conditional requirement data 735 can be set based on the feature vector further including a set of fields indicating responses 525 of application requirement response data 524 to dictate how conditional requirement data 735 be updated.

In some cases, the feature vector can further include information, for example, indicated in the application acceptance data 1145, indicating particular missing and/or insufficient application materials as a reason for rejection of corresponding immigration applications. For example, the application requirement function entry 704 can be improved to ensure the corresponding type of application materials is included in one or more required material sets 521 and/or more recommended material sets 522 for other users meeting one or more same or similar criteria as denoted in their user accounts 165. Alternatively or in addition, a digital photograph adherence function entry 710 or other document adherence function entries can be improved and/or retrained based on feedback included in application acceptance data 1145 for application materials that didn't meet established requirements, such as requirements for a portrait photograph of the user. Alternatively or in addition, a document verification function entry 714 can be improved and/or re-trained based on feedback included in application acceptance data 1145 for application materials that could not be verified or did not demonstrate sufficient proof. Alternatively or in addition, an application letter generator function entry 712 can be improved and/or re-trained based on feedback included in application acceptance data 1145 for application letters that were not sufficient.

In some cases, the feature vector can further include one or more fields corresponding to image data, form field data, and/or textual data of a corresponding type of application material 531. For example, image processing functions, text processing functions, and/or document processing functions performed upon particular types of document files 532 can be automatically retrained based on a training set of training data, where each training data includes a feature vector that includes one or more fields corresponding to image data, form field data, and/or textual data of a corresponding type of application material. These feature vectors can further indicate whether or not the corresponding immigration application was accepted, a processing time of the corresponding immigration application, and/or whether the particular type of document was identified as not meeting requirements, not being verifiable, and/or otherwise being insufficient. For example, this labeling data can be utilized to automatically detect trends in image data or textual data for documents that are likely to render immigration application rejection and/or to be declared insufficient themselves. The corresponding document processing function, for example, of a digital photograph adherence function entry 710, other document adherence function entry, and/or document verification function entry, can be updated to detect these particular types of features in the image data and/or textual data, and/or can include additional requirements regarding indicating these particular types of features in the image data and/or textual data be included or not included.

In some cases, a plurality of feature vectors can each be generated to include information regarding communication log data 560 of a given conversation, for example, indicating the immigration assistance entity identifier 561, assistance type 562, and/or communication feedback response data 567. For example, this can be utilized to generate trends regarding whether pairings between users and particular immigration assistance entities are unfavorable, and can be utilized to update and/or retrain the communication initiation function entry 718, for example, to render improved selection of immigration assistance entities for users based on various criteria of the users, such as other quantitative or categorical information regarding the user from user profile that is included in feature vectors.

In some cases, a plurality of feature vectors can each be generated to include information regarding communication log data 560 of a given conversation, for example, indicating the assistance type 562, extracted textual data 563, and/or communication feedback response data 567. For example, this can be utilized to generate in text data supplied by assistance entities that rendered favorable communication feedback response data 567, which can be utilized to update and/or retrain the automated immigration inquiry response function entry. For example, the automated immigration inquiry response function entry of a given assistance type is trained based on a training set of extracted textual data 563 for a plurality of prior conversations of the given assistance type with prior users with favorable communication feedback response data 567.

As illustrated in FIG. 19C, the historical immigration data processing system 124 can implement a user subgroup selection module 1940, for example, via subsystem processing module 420 and/or via subsystem memory module 410, that receives, determines, accesses, and/or automatically generates one or more user subgroup parameter data 1945.1-1945.F indicating a particular category of users utilized to identify a corresponding subset of user accounts 165 in user account database 162 as a corresponding one of a set of user subgroups 1947.1-1947.F. For example, some or all user subgroup parameter data 1945 is configured by the administrator via user input to administrator device 1930 and/or is otherwise determined by the historical immigration data processing system 124.

The information for each user included in a given subgroups 1947 can be further bounded to include only particular information from the user accounts 165 for its users, such as only the information to be included in feature vectors and/or that is utilized as input to the immigration analytics generator module 1910.

The immigration analytics generator module 1910 can generate immigration analytics data to include subgroup-based trend data 1948 indicating trends for users meeting the corresponding user subgroup parameter data 1945 based on processing each user subgroup 1947. Each subgroup-based trend data 1948 can be utilized as input to the immigration function update module and/or can be displayed to the corresponding administrator, government employee, or other person via administrator device 1930.

For example, a given subgroup parameter data 1945 can indicate a parameters and/or criteria for inclusion of user accounts 165, such as: a particular country to which the user applied to immigrate; a particular country from which the user applied to immigrate; particular immigration status to which the user applied, the birthdate of the user or age range, other particular demographic data of the user, the academic institution to which the user attended, the field of study studies by the user, an employer of the user, the field of work of the user, one or more particular response data 582 to one or more given questions identified by a corresponding prompt identifiers 581, a risk assessment score 541 and/or risk assessment score range, whether or not the user was granted immigration status, a set of multiple particular immigration statuses obtained by the user, a number of failed application attempts made by the user, one or more particular types of application materials 531 included in the user's required material set 521, recommended material set 522, and/or completed application material set 530; particular verification data 537, requirement adherence data 538, and/or extracted data 539 from one or more documents, particular services setup for the user, particular communications with particular assistance entities, and/or any other particular category and/or quantitative bound of any other information generated for and/or collected for users as described herein.

As a particular example, a given user subgroups 1947 can be generated to include application acceptance data 1145 and/or the application processing time length for users immigrating from a particular country that were in a particular age range at the time of the application. The corresponding subgroup-based trend data 1948 can indicate averages, distribution data, correlation data, or other statistical information generated to indicate trends in granting of immigration applications and/or processing time required to process immigration applications and/or to yield granting of immigration applications for users from the corresponding country in the corresponding age group. Different user subgroups 1947 corresponding to different age ranges and/or countries of origins can be utilized to generate different subgroup-based trend data 1948 that can indicate difference in processing time and/or rate of granting for users in different age ranged and/or from different countries.

As another particular example, a given user subgroups 1947 can be generated to include application acceptance data 1145 and/or the application processing time length for users with particular responses 545 to one or more particular risk factor questions. The corresponding subgroup-based trend data 1948 can indicate averages, distribution data, correlation data, or other statistical information generated to indicate trends in granting of immigration applications and/or processing time required to process immigration applications and/or to yield granting of immigration applications for users with the particular responses 545. Different user subgroups 1947 corresponding to different response data to one or more different immigration risk factor questions to generate different subgroup-based trend data 1948 that can indicate difference in processing time and/or rate of granting for users with different responses to these questions.

As another particular example, a given user subgroups 1947 can be generated to include application acceptance data 1145 and/or the application processing time length for users that applied for an immigration application within a particular time period, such as within a particular year. The corresponding subgroup-based trend data 1948 can indicate averages, distribution data, correlation data, or other statistical information generated to indicate trends in granting of immigration applications and/or processing time required to process immigration applications and/or to yield granting of immigration applications for users that applied in the given time period. Different user subgroups 1947 corresponding to different response data to one or more different immigration risk factor questions to generate different subgroup-based trend data 1948 that can indicate difference in processing time and/or rate of granting for users over time, such as differences in one or more countries and/or for one or more immigration status types from year to year.

FIG. 19D illustrates an embodiment of a historical immigration data processing system 124 that is implemented to facilitate communication of notifications to particular groups of users based on their user contact data 593. The historical immigration data processing system 124 can implement a notification communication module 1950, for example, via subsystem processing module 420 and/or via subsystem memory module 410, that facilitates transmission of user notifications 1955 to particular subsets of users meeting corresponding user subgroup parameter data 1945. For example, user subgroup parameter data 1945 and/or corresponding user notification 1955 to be communicated to these users is configured by the administrator via user input to administrator device 1930 and/or is otherwise received, accessed, automatically generated, and/or determined by the historical immigration data processing system 124.

For example, a given user subgroup 1947 can be generated to include contact data 593 for users that applied for a study permit in a given country and that graduated from their respective academic institution within the last 5 years, or another time frame. The given user subgroup 1947 can be generated to include only users that graduated from a particular academic institution and/or with a particular degree corresponding to a particular field of study. The user notification can correspond to a newsletter and/or prompts to stay connected, for example, with other users such as current users. As a particular example, the user notification 1955 can correspond to a prompt to volunteer as a mentor, such as an immigration assistance entity 1740, for other users that are currently applying to immigrate to the country, and/or that are soon starting and/or have recently begun a study program in the country, for example, in the same field and/or at the same academic institution. In some embodiments, the assistance entity selection module 1760 can be operable to select users from user database 165 as assistance entities based on their user account indicating they have responded favorable to the prompt to volunteer as a mentor and/or otherwise agree to provide assistance to other users and/or connect with other users.

In various embodiments, a historical immigration data processing system include at least one processor, and at least one memory that stores executable instructions. The executable instructions, when executed by the at least one processor, can cause the immigration assistance system to: receive a plurality of sets of immigration application data from a plurality of client devices corresponding to a plurality of users, where each one of the plurality of sets of immigration application data is generated by one of the plurality of client devices based on user input to one of the plurality of client devices in response to at least one prompt displayed via an interactive user interface; facilitate submission of a plurality of immigration applications to at least one government entity based on the plurality of sets of application material data, where each of the plurality of immigration applications corresponds to one of the plurality of users based on a corresponding one of the plurality of sets of application material data; determine a plurality of application acceptance data for the plurality of immigration applications; generate immigration analytics data based on performing at least one analytics function upon the plurality of sets of application material data and the plurality of application acceptance data; and/or send the immigration analytics data to a client device for display via a display device.

FIG. 19E illustrates a method for execution by at least one processor, such as at least one processor of processing module 220 of an immigration assistance system 100. For example, at least one memory, such as at least one memory of memory module 210, stores executable instructions that, when executed by the at least one processor, cause the immigration assistance system to execute some or all steps of FIG. 19E and/or to perform some or all of the functionality discussed in conjunction with FIGS. 19A-19D.

Some or all steps of FIG. 19E can be performed by implementing an historical immigration data processing system 124. For example, at least one subsystem memory module of the historical immigration data processing system 124 stores executable instructions that, when executed by at least one subsystem processing module of the historical immigration data processing system 124, cause the historical immigration data processing system 124 to execute some or all steps of FIG. 19E and/or to perform some or all of the functionality discussed in conjunction with FIGS. 19A-19D.

Some or all steps of FIG. 19E can be performed by implementing and/or communicating with one or more other subsystems 101. Some or all steps of FIG. 19E can be performed by accessing user account database 162, utilizing some or all data of one or more user accounts 165, and/or generating some or all data of one or more user accounts 165. Some or all steps of FIG. 19E can be performed by accessing function library 172 and/or by performing one or more functions of function library 172. Some or all steps of FIG. 19E can be performed based on communicating with one or more client devices 130.

Step 1982 includes receiving a plurality of sets of immigration application data from a plurality of client devices corresponding to a plurality of users. For example, each one of the set of immigration application data is generated by one of the plurality of client devices based on user input to one of the plurality of client devices in response to at least one prompt displayed via an interactive user interface. Step 1984 includes facilitating submission of a plurality of immigration applications to at least one government entity based on the plurality of sets of application material data.

Step 1986 includes determining a plurality of application acceptance data for the plurality of immigration applications. In various embodiments, each of the plurality of application acceptance data indicates that a corresponding one of the plurality of immigration applications was one of: granted or refused.

Step 1988 includes generating immigration analytics data based on performing at least one analytics function upon the plurality of sets of application material data and the plurality of application acceptance data. Step 1990 includes sending the immigration analytics data to a client device for display via a display device.

In various embodiments, facilitating submission of the plurality of immigration applications includes transmitting the plurality of immigration applications to the at least one government server system. In various embodiments, facilitating submission of the plurality of immigration applications includes sending a set of immigration application materials to the immigration application materials submission system 108 for submission. In various embodiments, facilitating submission of the plurality of immigration applications includes implementing the immigration application materials submission system 108 to submit the immigration application.

In various embodiments, facilitating submission of the plurality of immigration applications includes sending some or all of a set of immigration application materials to the plurality of client devices for: display to corresponding users, review by the corresponding users, editing by the corresponding users via user input to the first client device, and/or transmission by the plurality of client devices to the at least one government server system via user input to the plurality of client devices.

In various embodiments, the method includes completing a plurality of sets of immigration application materials based on the plurality of sets of immigration application data. Each set of immigration application data can correspond to a user and can be utilized to complete a corresponding set of immigration application materials. For example, the plurality of sets of immigration application materials are completed implementing the immigration application materials guided completion system 106. Each of the plurality of immigration applications can include a corresponding set of immigration application materials in the plurality of sets of immigration application materials.

In various embodiments, generating the immigration analytics data includes performing at least one immigration analytics function. The at least one immigration analytics function can be: can be: predetermined; configured via user input by an administrator of the immigration assistance system; stored in and retrieved from memory accessible by the immigration assistance system; received by the immigration assistance system; automatically generated, trained, and/or updated by the immigration assistance system, for example, by implementing the historical immigration data processing system; accessed via a corresponding function entry, such as an immigration analytics function entry 724, of function library 172; and/or otherwise determined by immigration assistance system.

In various embodiments, the plurality of sets of application material data indicates a country of residence data, and where generating the immigration analytics data includes identifying at least one trend based on the country of residence data. In various embodiments, the plurality of sets of application material data indicates study program institution data, and generating the immigration analytics data includes identifying at least one trend based on the study program institution data. In various embodiments, generating the immigration analytics data includes identifying at least one trend based on any other type of data included in user accounts 165 of user account database 162.

In various embodiments, each of the plurality of immigration applications has a corresponding submission date. Each of the plurality of application acceptance data can further have a corresponding decision date. Generating the immigration analytics data can include identifying at least one trend based on a length of time between the submission date and the decision date.

In various embodiments, the plurality of sets of application material data indicates risk factor data. Generating the immigration analytics data can include identifying at least one trend based on the risk factor data. For example, the risk factor data for each set of application material data can include: a risk assessment score 541 and/or a set of response scores generated for each of a set of responses. The risk factor data for each set of application material data can be generated based on performing a risk assessment function. The risk factor data for each set of application material data can be generated by the immigration eligibility risk assessment system 102. In various embodiments, the method includes implementing the immigration eligibility risk assessment system 102 to generate the risk factor data.

In various embodiments, the method includes receive a plurality of risk factor response data from a second plurality of client devices, where each of the plurality of risk factor response data indicates a set of responses to a set of immigration risk factor questions. The method can further include generating a plurality of immigration risk assessment scores for a second plurality of users corresponding to the second plurality of devices by performing a risk assessment function based on each of the plurality of risk factor response data. The method can further include selecting the first plurality of users as a proper subset of the second plurality of users based on identifying ones of the plurality of immigration risk assessment scores that compare favorably to a risk assessment threshold. The method can further include facilitate submission of the plurality of immigration applications for the first plurality of users based on selecting the first plurality of users. Generating the immigration analytics data can includes identifying at least one trend based on: the immigration risk assessment scores, and/or the plurality of risk factor response data.

In various embodiments, the method includes generating and/or determining an updated risk assessment function based on the immigration analytics data and/or receiving a second plurality of risk factor response data from a third plurality of client devices. Each of the second plurality of risk factor response data can indicate a set of responses to the set of immigration risk factor questions. The method can further include generating a second plurality of immigration risk assessment scores for a third plurality of users corresponding to the third plurality of devices by performing the updated risk assessment function based on each of the second plurality of risk factor response data. The method can further include selecting a proper subset of the third plurality of users based on identifying ones of the second plurality of immigration risk assessment scores that compare favorably to a risk assessment threshold. The method can further include facilitating submission of a second plurality of immigration applications for the proper subset of the third plurality of users based on selecting the third plurality of users.

In various embodiments, the method can further include generating and/or determining an updated set of immigration risk factor questions based on the immigration analytics data. The method can further include receiving a second plurality of risk factor response data from a third plurality of client devices, where each of the second plurality of risk factor response data indicates a set of responses to the updated set of immigration risk factor questions. The method can further include generating a second plurality of immigration risk assessment scores for a third plurality of users corresponding to the third plurality of devices by performing a risk assessment function based on each of the second plurality of risk factor response data. The method can further include select a proper subset of the third plurality of users based on identifying ones of the second plurality of immigration risk assessment scores that compare favorably to a risk assessment threshold. The method can further include facilitating submission of a second plurality of immigration applications for the proper subset of the third plurality of users based on selecting the third plurality of users.

In various embodiments, the method can further include populating a user directory with a plurality of entries corresponding to the plurality of users based on: the plurality of sets of immigration application data and/or or the plurality of sets of immigration application data. The method can further include generating a notification to be sent to users corresponding to a selected user grouping criteria of a plurality of user grouping criteria. The method can further include identifying a proper subset of the plurality of users based on selecting ones of the plurality of users with entries in the user directory that compare favorably to the user grouping criteria. The method can further include sending the notification to only ones of the plurality of users included in the proper subset of the plurality of users. The plurality of entries corresponding to the plurality of users can be implemented as and/or can be generated based on the plurality of user accounts 165 of user account database 162.

In various embodiments, the user grouping criteria corresponds to: a country of origin, a country corresponding to the immigration application; a current immigration status; a previous immigration status; a current country of residence; a current study program institution; a past study program institution; a date of entry to a country corresponding to the immigration application; a duration of stay in the country corresponding to the immigration application; a date of exit from the country corresponding to the immigration application; geographical region of residence within the country corresponding to the immigration application; and/or a city of residence within the country corresponding to the immigration application. In various embodiments, the user grouping criteria corresponds to any other type of data included in user accounts 165 of user account database 162.

As described previously, any of the functions performed by one or more subsystems 101 and/or any of the functions with corresponding function entries 175 of the function library 172 such as functions that correspond to and/or utilize image processing function entries 601, text processing function entries 603, document processing function entries 605, response processing function entries 607, information processing function entries 609, application letter generator function entries 712, automated inquiry response function entries 720, immigration analytics function entries 724, and/or any other functions described herein can utilize, correspond to, and/or be based on artificial intelligence algorithms and/or techniques, and/or machine learning algorithms and/or techniques.

Some or all of these functions discussed herein cannot be practically trained by the human mind. Instead, such functions and/or corresponding models can be trained based on applying artificial intelligence algorithms and/or techniques, and/or machine learning algorithms and/or techniques, to a training set of feature vectors and/or document files. Alternatively or in addition, training some or all medical scan analysis functions cannot be practically be trained by the human mind based upon: a great complexity of the resulting function and/or corresponding model; a large size of the training set utilized to train the function and/or model; the model taking an infeasibly long amount of time to train utilizing only pen and paper; and/or other reasons.

Some or all of these functions discussed herein cannot be practically performed by the human mind. Instead, such functions can be performed utilizing artificial intelligence algorithms and/or techniques, and/or machine learning algorithms and/or techniques. Alternatively or in addition, such functions can be performed utilizing a model trained utilizing artificial intelligence algorithms and/or techniques, and/or machine learning algorithms and/or techniques. Alternatively or in addition, performing some or all functions cannot be practically be performed by the human mind based upon: a great complexity of these function; an accuracy rate and/or consistency of generating output being more favorable than that of a human; a speed of generating output being more favorable than that of a human; these functions taking an infeasibly long amount of time to perform utilizing only pen and paper; and/or other reasons.

As described previously, the immigration assistance system 100 is operable to generate various data for a given user in conjunction with performing functionality of one or more subsystem 101, such as: generating a risk assessment score for the given user; generating a required material set and/or recommended material set for the given user; generating and/or processing an immigration application material included in an immigration application for the given user, for example, by generating extracted data, verification data, adherence data, and/or otherwise completing the application material; submitting an immigration application for the given user; generating service setup initiation data for the given user, generating communication initiation data for the given user, and/or generating immigration status update data for the given user.

Some or all of this data can be generated for a given user, and/or some or all functions of function library can be performed, within a short time frame, such as within a single minute, single second, single millisecond, and/or single microsecond. For example, the immigration assistance system 100 generates one or more of the various data described herein for a given user within the short time. As another example, the immigration assistance system 100 performs one or more given functions of function library 172 within the short time frame.

Generating one or more of the various types of data described herein for a given users within a short time frame, and/or performing one or more of the various functions of function library within the short time frame, cannot feasibly be performed by the human mind, for example based upon: the human mind not being able to feasibly perform one or more given functions of function library within the short time frame with an accuracy of output and/or consistency of output attained by the immigration assistance system 100; the human mind not being able to feasibly perform one or more given functions of function library within the short time frame due to the computational complexity of performing these functions; the human mind not being able to feasibly perform one or more given functions of function library within the short time frame due to processing complexity of processing a large required amount of input data to each function, such as a large number of responses and/or large amount of text and/or image data in a corresponding document; the human mind not being able to feasibly perform one or more given functions of function library within the short time frame due to searching for and/or retrieval of the appropriate input data from a large amount data, such as hundreds, thousands, and/or millions of different user accounts; the human mind not being able one or more given functions within the short time frame utilizing only pen and paper; the human mind not being able to feasibly generate one or more of the various data described herein within the same short time frame utilizing only pen and paper; and/or other reasons.

Furthermore, as described previously, the immigration assistance system 100 is operable to generate some or all of this various data for multiple different users. In some cases, the immigration assistance system 100 receives requests from and/or otherwise determines to generate data for multiple different users, such as dozens, hundreds, and/or thousands of users within a same, short time frame, such as a same second, a same minute, or other short time frame.

The immigration assistance system 100 can optionally implement its various processing resources of processing module 220, and/or of a given subsystem processing module 420, to generate data for multiple different users within the same time frame in a parallelized fashion, and/or to perform other functionality described herein for multiple different users within the same time frame in a parallelized fashion. For example, the immigration assistance system 100 generates data for multiple different users within the same time frame as multiple processes being performed in parallel via distinct and/or shared processing resources within the same time frame. As another example, the immigration assistance system 100 performs functions of function library 172 for multiple different users within the same time frame as multiple processes being performed in parallel via distinct and/or shared processing resources within the same time frame. As a particular example, within a given microsecond, millisecond, second, minute or other short time frame, the immigration assistance system 100 can perform multiple different functions of function library and/or can generate multiple different data for multiple different users in parallel as dozens, hundreds, and/or thousands of parallel processes.

The immigration assistance system 100 can alternatively or additionally implement processing resources of processing module 220, and/or a given subsystem processing module 420, to generate data for multiple different users within the short time frame in a serialized fashion, and/or to perform other functionality described herein for multiple different users within the short time frame in a serialized fashion. For example, the immigration assistance system 100 generates data for multiple different users within the short time frame as multiple processes being performed in serially within a short time frame. As another example, the immigration assistance system 100 performs functions of function library 172 for multiple different users within the short time frame as multiple processes being performed serially within the short time frame. As a particular example, within a given microsecond, millisecond, second, minute, or other short time frame, the immigration assistance system 100 can perform multiple different functions of function library and/or can generate multiple different data for multiple different users serially as dozens, hundreds, and/or thousands of processes performed one at a time.

Generating data for multiple different users within the same time frame in a parallelized fashion or a serialized fashion, and/or performing functions for multiple different users within the same time frame as multiple processes being performed in parallel and/or serially, cannot feasibly be performed by the human mind, for example based upon: the human mind not being able to feasibly perform multiple functions of function library in parallel and/or within the short time frame with an accuracy of output and/or consistency of output attained by the immigration assistance system 100; the human mind not being able to feasibly perform multiple functions of function library in parallel due to the computational complexity of performing these functions; the human mind not being able to feasibly perform multiple functions of function library in parallel due to processing complexity of processing a large required amount of input data to each function, such as a large number of responses and/or large amount of text and/or image data in a corresponding document; the human mind not being able to feasibly perform dozens, hundreds, and/or thousands of the functions of function library in parallel; the human mind not being able to feasibly generate dozens, hundreds, and/or thousands of one or more types of the various data described herein in parallel; the human mind not being able to feasibly perform dozens, hundreds, and/or thousands of these functions within a same microsecond, same millisecond, same second, same minute, or other short time frame; the human mind not being able to feasibly generate dozens, hundreds, and/or thousands of the one or more types of the various data described herein within a same microsecond, same millisecond, same second, a same minute, or other short time frame; the human mind not being able to feasibly perform dozens, hundreds, and/or thousands of these functions within the same short time frame utilizing only pen and paper; the human mind not being able to feasibly generate dozens, hundreds, and/or thousands of the various data described herein within the same short time frame utilizing only pen and paper; and/or other reasons.

Figure 20A:
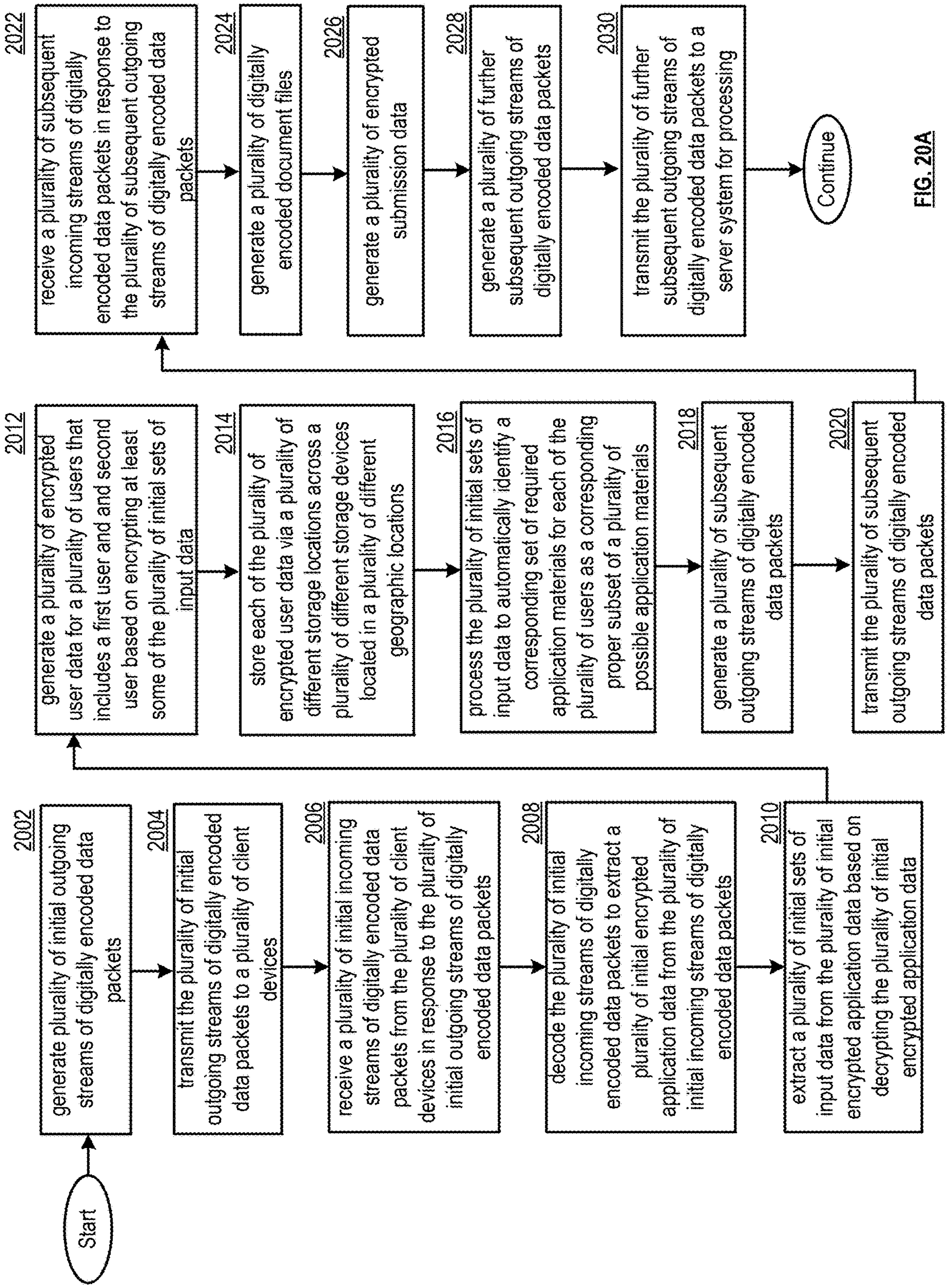

FIG. 20A illustrates a method for execution by at least one processor, such as at least one processor 22 of a computing system 10 and/or at least one processor of processing module 220 of an immigration assistance system 100. For example, at least one memory, such as at least one memory of memory module 210 and/or at least one memory 21, stores executable instructions that, when executed by the at least one processor, cause the computing system to execute some or all steps of FIG. 20A and/or to perform some or all of the functionality discussed in conjunction with any of the Figures described herein.

In some embodiments, a computing system 10 performs all steps of FIG. 20A. In other embodiments, computing system 10 performs some steps of FIG. 20A, while at least one computing device 13 communicating with computing system 10 performs some or all other steps of FIG. 20A.

Step 2002 includes generating plurality of initial outgoing streams of digitally encoded data packets. In various examples, each initial outgoing stream of digitally encoded data packets of the plurality of initial outgoing streams of digitally encoded data packets indicates initial machine executable instructions for execution.

Step 2004 includes transmitting the plurality of initial outgoing streams of digitally encoded data packets to a plurality of client devices. In various examples, a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user;

Step 2006 includes receiving a plurality of initial incoming streams of digitally encoded data packets from the plurality of client devices in response to the plurality of initial outgoing streams of digitally encoded data packets. In various examples, a first initial incoming stream of digitally encoded data packets of the plurality of initial incoming streams of digitally encoded data packets is received from the first client device based on the first client device automatically generating the first initial incoming stream of digitally encoded data packets via encoding a first initial set of input data automatically generated based on processing first measurement values collected via at least one sensor device of the first client device contemporaneously with displaying first digital display data via a display device of the first client device in response to the first client device automatically extracting the initial machine executable instructions from the first initial outgoing stream of digitally encoded data packets and executing the initial machine executable instructions to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels. In various examples, a second initial incoming stream of digitally encoded data packets of the plurality of initial incoming streams of digitally encoded data packets is received from the second client device.

Step 2008 includes decode the plurality of initial incoming streams of digitally encoded data packets to extract a plurality of initial encrypted application data from the plurality of initial incoming streams of digitally encoded data packets. In various examples, first initial encrypted application data of the plurality of initial encrypted application data is extracted from the first initial incoming stream of digitally encoded data packets, and/or second initial encrypted application data of the plurality of initial encrypted application data is extracted from the second initial incoming stream of digitally encoded data packets.

Step 2010 includes extract a plurality of initial sets of input data from the plurality of initial encrypted application data based on decrypting the plurality of initial encrypted application data. In various examples, a first initial set of input data of the plurality of initial sets of input data is extracted from the first initial encrypted application data via decrypting the first initial encrypted application data and/or a second initial set of input data of the plurality of initial sets of input data is extracted from the second initial encrypted application data via decrypting the second initial encrypted application data.

Step 2012 includes generating a plurality of encrypted user data for a plurality of users that includes the first user and the second user based on encrypting at least some of the plurality of initial sets of input data. In various examples, each encrypted user data of the plurality of encrypted user data is generated based on generating a first corresponding plurality of subkeys from a first corresponding initial key and/or, in each of a first corresponding plurality of iterations, applying a corresponding one of the first corresponding plurality of subkeys to generate a corresponding one of a corresponding plurality of encrypted user data versions. In various examples, the each encrypted user data is generated from a final encrypted user data version of the corresponding plurality of encrypted user data versions generated after completing all of the first corresponding plurality of iterations. In various examples, first encrypted user data is generated for the first user based on encrypting at least some of the first initial set of input data, and/or second encrypted user data is generated for the second user based on encrypting at least some of the second initial set of input data.

Step 2014 includes storing each of the plurality of encrypted user data via a plurality of different storage locations across a plurality of different storage devices located in a plurality of different geographic locations. In various examples, the first encrypted user data is stored via a first set of storage locations of the plurality of different storage locations. In various examples, the second encrypted user data is stored via a second set of storage locations of the plurality of different storage locations different from the first set of storage locations.

Step 2016 includes processing the plurality of initial sets of input data to automatically identify a corresponding set of required application materials for each of the plurality of users as a corresponding proper subset of a plurality of possible application materials. In various examples, a first set of required application materials is identified for the first user as a first proper subset of the plurality of possible application materials via processing the first initial set of input data and/or a second set of required application materials is identified for the second user as a second proper subset of the plurality of possible application materials via processing the second initial set of input data. In various examples, a set difference between the first set of required application materials and the second set of required application materials is non-null based on at least one of the first initial set of input data being different from at least one of the second initial set of input data.

Step 2018 includes generating a plurality of subsequent outgoing streams of digitally encoded data packets. In various examples, a first subsequent outgoing stream of digitally encoded data packets of the plurality of subsequent outgoing streams of digitally encoded data packets indicates first subsequent machine executable instructions generated based on the first set of required application materials identified for the first user and/or a second subsequent outgoing stream of digitally encoded data packets of the plurality of subsequent outgoing streams of digitally encoded data packets indicates second subsequent machine executable instructions generated based on the second set of required application materials identified for the second user. In various examples, the first subsequent machine executable instructions are different from the second subsequent machine executable instructions based on the first set of required application materials being different from the second set of required application materials.

Step 2020 includes transmitting the plurality of subsequent outgoing streams of digitally encoded data packets. In various examples, the first subsequent outgoing stream of digitally encoded data packets is transmitted to the first client device and/or the second subsequent outgoing stream of digitally encoded data packets is transmitted to the second client device.

Step 2022 includes receiving a plurality of subsequent incoming streams of digitally encoded data packets in response to the plurality of subsequent outgoing streams of digitally encoded data packets. In various examples, a first subsequent incoming stream of digitally encoded data packets of the plurality of subsequent incoming streams of digitally encoded data packets is received from the first client device based on the first client device automatically generating the first subsequent incoming stream of digitally encoded data packets via encoding a first subsequent set of input data automatically generated based on processing second measurement values collected via the at least one sensor device of the first client device contemporaneously with displaying second digital display data via the display device of the first client device in response to the first client device automatically extracting the first subsequent machine executable instructions from the first subsequent outgoing stream of digitally encoded data packets to automatically generate at least one second two-dimensional array of pixels corresponding to the second digital display data and displaying the second digital display data via the display device of the first client device based on automatically configuring each of the plurality of lighting devices of the display device to a corresponding configured light setting indicated by a corresponding pixel value of the at least one second two-dimensional array of pixels. In various examples, a second subsequent incoming stream of digitally encoded data packets of the plurality of subsequent incoming streams of digitally encoded data packets is received from the second client device.

Step 2024 includes generating a plurality of digitally encoded document files. In various examples, at least one first digitally encoded document file of the plurality of digitally encoded document files corresponds to at least one of the first set of required application materials. In various examples, the at least one first digitally encoded document file is generated based on: (1) processing at least one of the at least some of the first initial set of input data in response to accessing the first encrypted user data in a first at least one of the plurality of different geographic locations and decrypting the first encrypted user data to extract at least one of the at least some of the first initial set of input data; and/or (2) processing the first subsequent set of input data in response to decoding the first subsequent incoming stream of digitally encoded data packets to extract other first encrypted application data from the first subsequent incoming stream of digitally encoded data packets and extracting the first subsequent set of input data based on decrypting the other first encrypted application data. In various example, where at least one second digitally encoded document file of the plurality of digitally encoded document files corresponds to at least one of the second set of required application materials. In various examples, the at least one of the second set of required application materials is generated based on: (1) processing at least one of the at least some of the second initial set of input data in response to accessing the second encrypted user data in a second at least one of the plurality of different geographic locations and decrypting the second encrypted user data to extract at least one of the at least some of the second initial set of input data; and/or (2) processing the second subsequent set of input data in response to decoding the second subsequent incoming stream of digitally encoded data packets to extract other second encrypted application data from the second subsequent incoming stream of digitally encoded data packets and extracting the second subsequent set of input data based on decrypting the other second encrypted application data. In various examples, the at least one first digitally encoded document file is different from the at least one second digitally encoded document file based on the at least one first digitally encoded document file containing different information from the at least one second digitally encoded document file as a result of the first initial set of input data being different from the second initial set of input data, and/or as a further result of the first subsequent set of input data being different from the second subsequent set of input data. In various examples, where the at least one first digitally encoded document file is different from the at least one second digitally encoded document file further based on the at least one first digitally encoded document file and the at least one second digitally encoded document file corresponding to different types of application materials of the plurality of possible application materials as a result of the set difference between the first set of required application materials and the second set of required application materials being non-null.

Step 2026 includes generating a plurality of encrypted submission data. In various examples, each encrypted submission data of the plurality of encrypted submission data is generated based on generating a second corresponding plurality of subkeys from a second corresponding initial key and/or, in each of a second corresponding plurality of iterations, applying a corresponding one of the second corresponding plurality of subkeys to generate a corresponding one of a corresponding plurality of encrypted submission data versions. In various examples, the each encrypted submission data is generated from a final encrypted submission data version of the corresponding plurality of encrypted submission data versions generated after completing all of the first corresponding plurality of iterations. In various examples, first encrypted submission data of the plurality of encrypted submission data is generated for the first user via encrypting the first at least one digitally encoded document file, and/or second encrypted submission data of the plurality of encrypted submission data is generated for the second user via encrypting the second at least one digitally encoded document file.

Step 2028 includes generating a plurality of further subsequent outgoing streams of digitally encoded data packets via processing the plurality of encrypted submission data.

Step 2030 includes transmit the plurality of further subsequent outgoing streams of digitally encoded data packets to a server system (e.g. a computing system, a government server system, and/or other server system) for processing.

In various examples, generating the at least one first digitally encoded document file includes encoding first corresponding digital application data via applying at least one first encoding function associated with at least one first digital file type of the first at least one digitally encoded document file.

In various examples, generating the at least one second digitally encoded document file includes encoding second corresponding digital application data via applying at least one second encoding function associated with at least one second digital file type of the second at least one digitally encoded document file. In various examples, the first digital file type is different from the second digital file type based on the least one first digitally encoded document file and the at least one second digitally encoded document file corresponding to different types of application materials. In various examples, the first encoding function is different from the second encoding function based on the first digital file type being different from the second digital file type.

In various examples, generating the at least one first digitally encoded document file further includes generating the corresponding first digital application data to include information extracted from the at least one of the at least some of the first initial set of input data and further information extracted from the at least one of the first subsequent set of input data.

In various examples, the method further includes generating first additional encrypted user data for the first user from at least one of the first subsequent set of input data based on generating a third corresponding plurality of subkeys from a third corresponding initial key and, in each of another first corresponding plurality of iterations, applying a corresponding one of the third corresponding plurality of subkeys to generate a corresponding one of a first corresponding plurality of additional encrypted user data versions. In various examples, the first additional encrypted user data is generated from a first final encrypted user data version of the first corresponding plurality of additional encrypted user data versions generated after completing all of the another first corresponding plurality of iterations.

In various examples, the method further includes generating second additional encrypted user data for the second user from at least one of the second subsequent set of input data based on generating a fourth corresponding plurality of subkeys from a fourth corresponding initial key and, in each of another second corresponding plurality of iterations, applying a corresponding one of the fourth corresponding plurality of subkeys to generate a corresponding one of a second corresponding plurality of additional encrypted user data versions. In various examples, the second additional encrypted user data is generated from a second final encrypted user data version of the second corresponding plurality of additional encrypted user data versions generated after completing all of the another second corresponding plurality of iterations. In various examples, each of the first additional encrypted user data is stored via another first set of storage locations of the plurality of different storage locations, and store each of the second additional encrypted user data via another second set of storage locations of the plurality of different storage locations.

In various examples, the at least one of the first subsequent set of input data is in response to at least one first corresponding application prompt included in a subsequent set of application material prompts visually conveyed via the at least one second two-dimensional array of pixels based on execution of the first subsequent machine executable instructions by the second client device. In various examples, the at least one of the second subsequent set of input data is in response to at least one second corresponding application prompt included in a second subsequent set of application material prompts included in visually conveyed via another at least one second two-dimensional array of pixels generated via the second client device based on execution of the first subsequent machine executable instructions by the second client device. In various examples, the at least one second corresponding application prompt included in the second subsequent set of application material prompts is different from the at least one first corresponding application material prompt based on the first set of required application materials being different from the second set of required application materials.

In various examples, the first encrypted user data is stored as at least one first encrypted value for at least one first field for a first user account stored for the first user. In various examples, the second encrypted user data is stored as at least one second encrypted value for the at least one first field for a second user account stored for the second user. In various examples, the first additional encrypted user data is stored as at least one third encrypted value for at least one second field for the first user account. In various examples, the second additional encrypted user data is stored as at least one fourth encrypted value for at least one third field for the second user account, where the at least one second field is different from the at least one first field. In various examples, the at least one third field is different from the at least one first field. In various examples, the at least one third field is different from the at least one third field based on the at least one second corresponding application prompt included in the second subsequent set of application material prompts is different from the at least one first corresponding application material prompt.

In various examples, the first initial set of input data includes another at least one digitally encoded document file uploaded by the first client device. In various examples, the method further includes training at least one document processing function by processing a training set that includes a plurality of digitally encoded document files of at least one document type based on: training at least one first computer vision model via processing a first plurality of digital image data of the plurality of digitally encoded document files; and/or training at least one second natural language model via processing a plurality of textual data extracted from the plurality of digitally encoded document files. In various examples, the method further includes processing each corresponding one of the plurality of first initial set of input data based on performing the at least one document processing function upon the another at least one digitally encoded document file uploaded by first client device via applying the at least one first computer vision model upon digital image data of the another at least one digitally encoded document file to generate first extracted data and via further applying the at least one second natural language model upon the first extracted data to generate document processing function output data. In various examples, the set of required application materials for the first user is identified as a function of the document processing function output data.

In various examples, generating the first encrypted user data for the first user includes encrypting the document processing function output data.

In various examples, the digital image data includes a plurality of pixel data generated via a camera of the first client device based on the first client device activating the camera to capture the digital image data based on processing the first measurement values collected via at least one sensor device of the first client device.

In various examples, the first set of required application materials is identified for the first user based on: generating a first input vector to include a first ordered set of values extracted from the first initial set of input data corresponding to an ordered set of fields; processing the first input vector based on applying a plurality of configured weights to the first ordered set of values to the first ordered set of values to generate a first output vector; and/or automatically selecting the first set of required application materials for the first user as the first proper subset of the plurality of possible application materials based on processing the first output vector. In various examples, the second set of required application materials is identified for the second user based on: generating a second input vector to include a second ordered set of values extracted from the first initial set of input data corresponding to the ordered set of fields; processing the second input vector based on applying the plurality of configured weights to the second ordered set of values to the second ordered set of values to generate a second output vector; and/or automatically selecting the second set of required application materials for the second user as the second proper subset of the plurality of possible application materials based on processing the second output vector.

In various examples, the first set of required application materials is identified for the first user based on: generating a first plurality of sub-tasks for processing the first initial set of input data; and/or executing the first plurality of sub-tasks in parallel as a first plurality of parallelized processes. In various examples, the second set of required application materials is identified for the second user based on: generating a second plurality of sub-tasks for processing the second initial set of input data; and/or executing the second plurality of sub-tasks in parallel as a second plurality of parallelized processes.

In various examples, generating the first subsequent outgoing stream of digitally encoded data packets is based on automatically selecting a first subsequent set of application prompts from a plurality of application prompt options as a function of the first initial set of input data, where generating the second subsequent outgoing stream of digitally encoded data packets is based on automatically selecting a second subsequent set of application prompts from the plurality of application prompt options as a function of the second initial set of input data.

In various examples, a first prompt of the plurality of application prompt options has a first corresponding plurality of possible responses. In various examples, the first initial set of input data includes a first response of the first corresponding plurality of possible responses for the first prompt. In various examples, the second initial set of input data includes a second response of the first corresponding plurality of possible responses for the first prompt different from the first response for the first prompt. In various examples, the first subsequent set of application prompts includes a first at least one subsequent prompt of the plurality of application prompt options in response to the first at least one subsequent prompt being mapped to the first response in a subsequent prompt selection data structure stored via the computing system. In various examples, the first subsequent set of application prompts includes a second at least one subsequent prompt of the plurality of application prompt options in response to the second at least one subsequent prompt being mapped to the second response in a subsequent prompt selection data structure stored via the computing system.

In various examples, the subsequent prompt selection data structure is stored as a hierarchical tree structure that includes a plurality of hierarchical nodes corresponding to different ones of the plurality of possible prompts and that further includes a plurality of sets of branches. In various examples, each set of branches of the plurality of sets of branches extends from a corresponding one of the plurality of possible prompts and corresponds to a set of possible responses to the corresponding one of the plurality of possible prompts. In various examples, each branch of the each set of branches extends to at least one further prompt of the plurality of possible prompts in at least one other hierarchical level of the hierarchical tree structure. In various examples, automatically selecting the first subsequent set of application prompts includes performing a first traversal of the hierarchical tree structure based on the first initial set of input data, and where automatically selecting the second subsequent set of application prompts includes performing a second traversal of the hierarchical tree structure based on the second initial set of input data.

In various examples, automatically selecting the first subsequent set of application prompts is based on: generating a first input vector to include a first ordered set of values extracted from the first initial set of input data corresponding to an ordered set of fields; and/or processing the first input vector based on applying a plurality of configured weights to the ordered set of values to the first ordered set of values to generate a first output vector, where the first subsequent set of application prompts are selected based on processing the first output vector. In various examples, automatically selecting the second subsequent set of application prompts is based on: generating a second input vector to include a second ordered set of values extracted from the second initial set of input data corresponding to the ordered set of fields; processing the second input vector based on applying the plurality of configured weights to the ordered set of values to the second ordered set of values to generate a second output vector, where the first subsequent set of application prompts are selected based on processing the second output vector.

In various examples, automatically selecting the first subsequent set of application prompts is based on: generating a first plurality of sub-tasks for processing the first initial set of input data; and/or executing the first plurality of sub-tasks in parallel as a first plurality of parallelized processes. In various examples, automatically selecting the second subsequent set of application prompts is based on: generating a second plurality of sub-tasks for processing the second initial set of input data; and/or executing the second plurality of sub-tasks in parallel as a second plurality of parallelized processes.

In various examples, the method further includes automatically identifying a set of recommended application materials for the first user as a proper subset of the plurality of possible application materials based on the first initial set of input data. In various examples, the set of required application materials and the set of recommended application materials are mutually exclusive. In various examples, the method further includes sending recommended application material prompt data indicating the set of recommended application materials to the first client device for display to the first user. In various examples, a proper subset of the set of recommended application materials are completed for the first user based on user input to the first client device in response to the recommended application material prompt data.

In various embodiments, any one or more of the various examples listed above are implemented in conjunction with performing some or all steps of FIG. 20A. In various embodiments, any set of the various examples listed above can be implemented in tandem, for example, in conjunction with performing some or all steps of FIG. 20A, and/or in conjunction with performing some or all steps of any other method described herein.

In various embodiments, performing some or all steps of FIG. 20A is based on performing some or all steps of FIG. 9K and/or performing some or all functionality of FIGS. 9A-9J.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20A described above, for example, in conjunction with further implementing any one or more of the various examples described above.

In various embodiments, a computing system includes at least one processor and at least one memory that stores executable instructions. In various embodiments, the executable instructions, when executed by the at least one processor, cause the computing system to perform some or all steps of FIG. 20A, for example, in conjunction with further implementing any one or more of the various examples described above.

In various embodiments, the executable instructions, when executed by the at least one processor, cause the computing system to: generate plurality of initial outgoing streams of digitally encoded data packets, where each initial outgoing stream of digitally encoded data packets of the plurality of initial outgoing streams of digitally encoded data packets indicates initial machine executable instructions for execution; transmit the plurality of initial outgoing streams of digitally encoded data packets to a plurality of client devices, where a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user; receive a plurality of initial incoming streams of digitally encoded data packets from the plurality of client devices in response to the plurality of initial outgoing streams of digitally encoded data packets, where a first initial incoming stream of digitally encoded data packets of the plurality of initial incoming streams of digitally encoded data packets is received from the first client device based on the first client device automatically generating the first initial incoming stream of digitally encoded data packets via encoding a first initial set of input data automatically generated based on processing first measurement values collected via at least one sensor device of the first client device contemporaneously with displaying first digital display data via a display device of the first client device in response to the first client device automatically extracting the initial machine executable instructions from the first initial outgoing stream of digitally encoded data packets and executing the initial machine executable instructions to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels, and/or where a second initial incoming stream of digitally encoded data packets of the plurality of initial incoming streams of digitally encoded data packets is received from the second client device; decode the plurality of initial incoming streams of digitally encoded data packets to extract a plurality of initial encrypted application data from the plurality of initial incoming streams of digitally encoded data packets, where first initial encrypted application data of the plurality of initial encrypted application data is extracted from the first initial incoming stream of digitally encoded data packets, and/or where second initial encrypted application data of the plurality of initial encrypted application data is extracted from the second initial incoming stream of digitally encoded data packets; extract a plurality of initial sets of input data from the plurality of initial encrypted application data based on decrypting the plurality of initial encrypted application data, where a first initial set of input data of the plurality of initial sets of input data is extracted from the first initial encrypted application data via decrypting the first initial encrypted application data, and/or where a second initial set of input data of the plurality of initial sets of input data is extracted from the second initial encrypted application data via decrypting the second initial encrypted application data; generate a plurality of encrypted user data for a plurality of users that includes the first user and the second user based on encrypting at least some of the plurality of initial sets of input data, where each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions, where the each encrypted user data is generated from a final encrypted user data version of the corresponding plurality of encrypted user data versions generated after completing all of the first corresponding plurality of iterations, where first encrypted user data is generated for the first user based on encrypting at least some of the first initial set of input data, and/or where second encrypted user data is generated for the second user based on encrypting at least some of the second initial set of input data; store each of the plurality of encrypted user data via a plurality of different storage locations across a plurality of different storage devices located in a plurality of different geographic locations, where the first encrypted user data is stored via a first set of storage locations of the plurality of different storage locations, and/or where the second encrypted user data is stored via a second set of storage locations of the plurality of different storage locations different from the first set of storage locations; process the plurality of initial sets of input data to automatically identify a corresponding set of required application materials for each of the plurality of users as a corresponding proper subset of a plurality of possible application materials, where a first set of required application materials is identified for the first user as a first proper subset of the plurality of possible application materials via processing the first initial set of input data, where a second set of required application materials is identified for the second user as a second proper subset of the plurality of possible application materials via processing the second initial set of input data, and/or where a set difference between the first set of required application materials and the second set of required application materials is non-null based on at least one of the first initial set of input data being different from at least one of the second initial set of input data; generate a plurality of subsequent outgoing streams of digitally encoded data packets, where a first subsequent outgoing stream of digitally encoded data packets of the plurality of subsequent outgoing streams of digitally encoded data packets indicates first subsequent machine executable instructions generated based on the first set of required application materials identified for the first user, where a second subsequent outgoing stream of digitally encoded data packets of the plurality of subsequent outgoing streams of digitally encoded data packets indicates second subsequent machine executable instructions generated based on the second set of required application materials identified for the second user, and/or where the first subsequent machine executable instructions are different from the second subsequent machine executable instructions based on the first set of required application materials being different from the second set of required application materials; transmit the plurality of subsequent outgoing streams of digitally encoded data packets, where the first subsequent outgoing stream of digitally encoded data packets is transmitted to the first client device and where the second subsequent outgoing stream of digitally encoded data packets is transmitted to the second client device; receive a plurality of subsequent incoming streams of digitally encoded data packets in response to the plurality of subsequent outgoing streams of digitally encoded data packets, where a first subsequent incoming stream of digitally encoded data packets of the plurality of subsequent incoming streams of digitally encoded data packets is received from the first client device based on the first client device automatically generating the first subsequent incoming stream of digitally encoded data packets via encoding a first subsequent set of input data automatically generated based on processing second measurement values collected via the at least one sensor device of the first client device contemporaneously with displaying second digital display data via the display device of the first client device in response to the first client device automatically extracting the first subsequent machine executable instructions from the first subsequent outgoing stream of digitally encoded data packets to automatically generate at least one second two-dimensional array of pixels corresponding to the second digital display data and displaying the second digital display data via the display device of the first client device based on automatically configuring each of the plurality of lighting devices of the display device to a corresponding configured light setting indicated by a corresponding pixel value of the at least one second two-dimensional array of pixels, and/or where a second subsequent incoming stream of digitally encoded data packets of the plurality of subsequent incoming streams of digitally encoded data packets is received from the second client device; generate a plurality of digitally encoded document files, where at least one first digitally encoded document file of the plurality of digitally encoded document files corresponds to at least one of the first set of required application materials and is generated based on both processing at least one of the at least some of the first initial set of input data in response to accessing the first encrypted user data in a first at least one of the plurality of different geographic locations and decrypting the first encrypted user data to extract at least one of the at least some of the first initial set of input data and also processing the first subsequent set of input data in response to decoding the first subsequent incoming stream of digitally encoded data packets to extract other first encrypted application data from the first subsequent incoming stream of digitally encoded data packets and extracting the first subsequent set of input data based on decrypting the other first encrypted application data, where at least one second digitally encoded document file of the plurality of digitally encoded document files corresponds to at least one of the second set of required application materials and is generated based on both processing at least one of the at least some of the second initial set of input data in response to accessing the second encrypted user data in a second at least one of the plurality of different geographic locations and decrypting the second encrypted user data to extract at least one of the at least some of the second initial set of input data and also processing the second subsequent set of input data in response to decoding the second subsequent incoming stream of digitally encoded data packets to extract other second encrypted application data from the second subsequent incoming stream of digitally encoded data packets and extracting the second subsequent set of input data based on decrypting the other second encrypted application data, where the at least one first digitally encoded document file is different from the at least one second digitally encoded document file based on the at least one first digitally encoded document file containing different information from the at least one second digitally encoded document file as a result of the first initial set of input data being different from the second initial set of input data and as a further result of the first subsequent set of input data being different from the second subsequent set of input data, and/or where the at least one first digitally encoded document file is different from the at least one second digitally encoded document file further based on the at least one first digitally encoded document file and the at least one second digitally encoded document file corresponding to different types of application materials of the plurality of possible application materials as a result of the set difference between the first set of required application materials and the second set of required application materials being non-null; generate a plurality of encrypted submission data, where each encrypted submission data of the plurality of encrypted submission data is generated based on generating a second corresponding plurality of subkeys from a second corresponding initial key and, in each of a second corresponding plurality of iterations, applying a corresponding one of the second corresponding plurality of subkeys to generate a corresponding one of a corresponding plurality of encrypted submission data versions, where the each encrypted submission data is generated from a final encrypted submission data version of the corresponding plurality of encrypted submission data versions generated after completing all of the first corresponding plurality of iterations, where first encrypted submission data of the plurality of encrypted submission data is generated for the first user via encrypting the first at least one digitally encoded document file, and/or where second encrypted submission data of the plurality of encrypted submission data is generated for the second user via encrypting the second at least one digitally encoded document file; generate a plurality of further subsequent outgoing streams of digitally encoded data packets via processing the plurality of encrypted submission data; and/or transmit the plurality of further subsequent outgoing streams of digitally encoded data packets to a server system (e.g. a computing system, a government server system, and/or other server system) for processing.

Figure 20B:
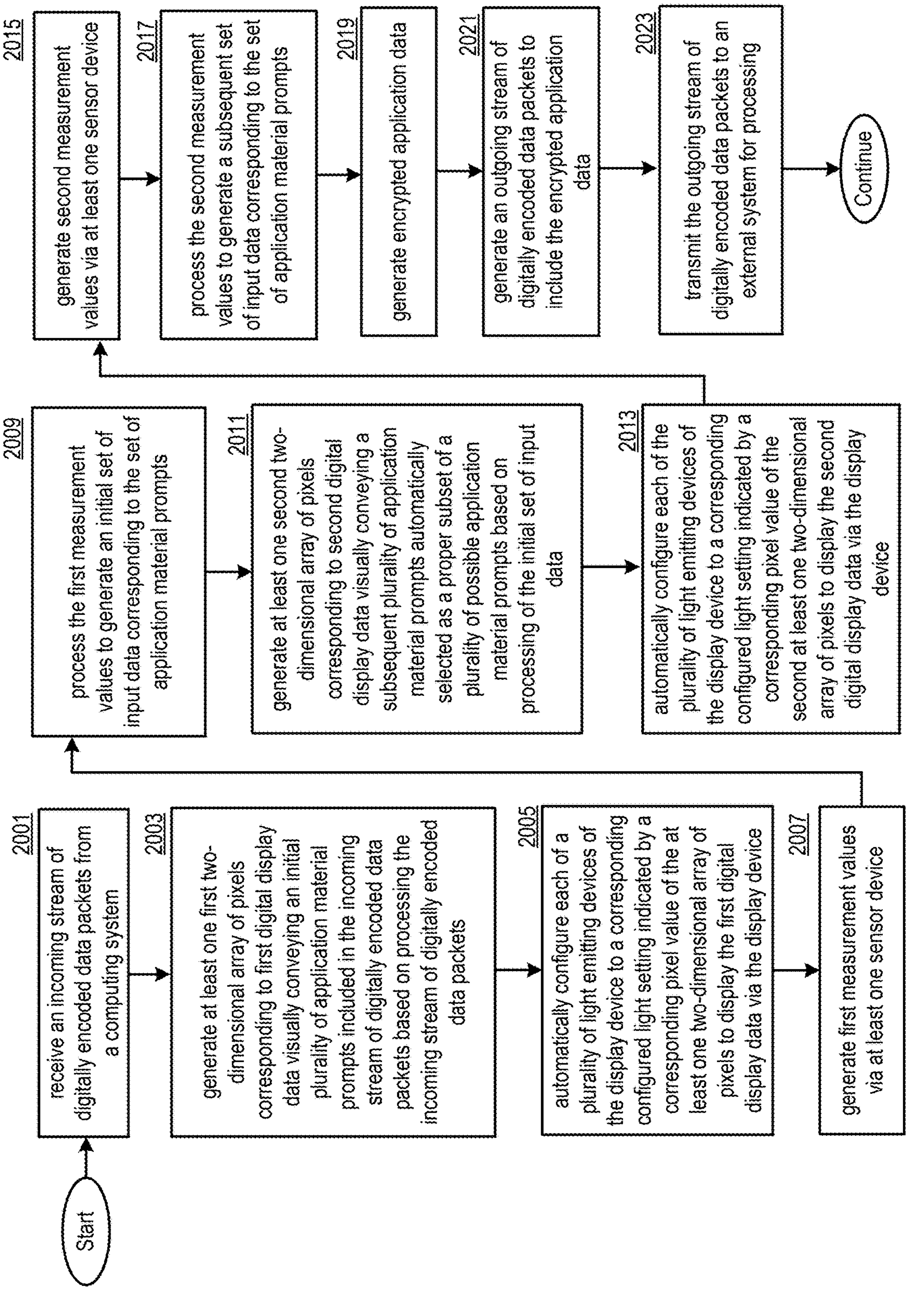

FIG. 20B illustrates a method for execution by at least one processor, such as at least one processor 22 of a computing device 13 and/or at least one processor of client processing module 320 of a client device 130. For example, at least one memory, such as at least one memory of memory module 230 and/or at least one memory 31, stores executable instructions that, when executed by the at least one processor, cause the computing device to execute some or all steps of FIG. 20B and/or to perform some or all of the functionality discussed in conjunction with any of the Figures described herein.

In some embodiments, a computing device 13 performs all steps of FIG. 20B. In other embodiments, computing device 13 performs some steps of FIG. 20B, while at least one computing system 10 communicating with computing device 13 performs some or all other steps of FIG. 20B.

Step 2001 includes receive an incoming stream of digitally encoded data packets from a computing system.

Step 2003 includes generating at least one first two-dimensional array of pixels corresponding to first digital display data visually conveying an initial plurality of application material prompts included in the incoming stream of digitally encoded data packets based on processing the incoming stream of digitally encoded data packets.

Step 2005 includes automatically configuring each of a plurality of lighting devices of the display device to a corresponding configured light setting indicated by a corresponding pixel value of the at least one two-dimensional array of pixels to display the first digital display data via the display device.

Step 2007 includes generating first measurement values via at least one sensor device. Step 2009 includes processing the first measurement values to generate an initial set of input data corresponding to the set of application material prompts. In various examples, some or all of step 2007 and/or some or all of step 2009 are performed contemporaneously with performing step 2005 to display the first digital display data via the display device.

Step 2011 includes generating at least one second two-dimensional array of pixels corresponding to second digital display data visually conveying a subsequent plurality of application material prompts automatically selected as a proper subset of a plurality of possible application material prompts based on processing of the initial set of input data.

Step 2013 includes automatically configuring each of the plurality of lighting devices of the display device to a corresponding configured light setting indicated by a corresponding pixel value of the second at least one two-dimensional array of pixels to display the second digital display data via the display device.

Step 2015 includes generating second measurement values via at least one sensor device. Step 2017 includes processing the second measurement values to generate a subsequent set of input data corresponding to the set of application material prompts. In various examples, some or all of step 2015 and/or some or all of step 2017 are performed contemporaneously with performing step 2013 to display the second digital display data via the display device.

Step 2019 includes generating encrypted application data. In various examples, generating the encrypted application data is based on generating a first corresponding plurality of subkeys from a first corresponding initial key and, in each of a corresponding plurality of iterations, applying a corresponding one of the corresponding plurality of subkeys to generate a corresponding one of a corresponding plurality of encrypted application data versions. In various examples, a first corresponding one of the corresponding plurality of subkeys is applied to application data generated based on processing a set of digital application data generated from at least some of the subsequent set of input data to generate first corresponding one of the corresponding plurality of encrypted application data versions in a first one of the corresponding plurality of iterations. In various examples, a final corresponding one of the corresponding plurality of subkeys is applied to a penultimate corresponding one of the corresponding plurality of encrypted application data versions to generate a final corresponding one of the corresponding plurality of encrypted application data versions. In various examples, the encrypted application data is generated from the final application data version after completing all of the corresponding plurality of iterations.

Step 2021 includes generating an outgoing stream of digitally encoded data packets to include the encrypted application data. Step 2023 includes transmitting the outgoing stream of digitally encoded data packets to an external system for processing.

In various examples, the method further includes generating at least one digitally encoded document file. In various examples, the digital application data includes the at least one digitally encoded document file. In various examples, the at least one digitally encoded document file is generated via processing the at least some of the set of digital application data. In various examples, the encrypted application data is generated to include the at least one digitally encoded document file based on encrypting the at least one digitally encoded document file.

In various examples, the at least one digitally encoded document file includes a first digitally encoded document file. In various examples, generating the first digitally encoded document file includes encoding first corresponding digital application data of the set of digital application data via applying an encoding function associated with a first digital file type of the first digitally encoded document file.

In various examples, the at least one digitally encoded document file further includes a second digitally encoded document file. In various examples, generating the second digitally encoded document file includes encoding second corresponding digital application data of the set of encoded application data via applying an encoding function associated with a second digital file type of the second digitally encoded document file. In various examples, the first digital file type is different from the second digital file type based on the first digitally encoded document file and the second digitally encoded document file corresponding to different types of application materials. In various examples, the first encoding function is different from the second encoding function based on the first digital file type being different from the second digital file type.

In various examples, generating the first digitally encoded document file further includes generating the corresponding first digital application data to include information extracted from the at least one of the at least some of the initial set of input data and further information extracted from the at least one of the subsequent set of input data.

In various examples, the external system stores first encrypted user data for a first user of the computing device based on: extracting the encrypted application data from the outgoing stream of digitally encoded data packets; decrypting the encrypted application data to extract the set of digital application material data from the encrypted application data; generating the encrypted user data based on encrypting at least some of the digital application material data; and/or storing the encrypted user data via a plurality of different storage locations across a plurality of different storage devices located in a plurality of different geographic locations.

In various examples, the method further includes activating a camera to capture digital image data based on processing the second measurement values collected via the at least one sensor device. In various examples, at least some of the digital application data is generated based on the digital image data.

In various examples, generating the at least some of the digital application data based on the digital image data includes applying a computer vision model to the digital image data to extract values for a plurality of different fields of the digital application data from the digital image data.

In various examples, the at least some of the digital application data is generated to include the digital image data. In various examples, the outgoing stream of digitally encoded data packets is generated to indicate the digital image data based on the digital image data being encrypted as part of the encrypted application data.

In various embodiments, any one or more of the various examples listed above are implemented in conjunction with performing some or all steps of FIG. 20B. In various embodiments, any set of the various examples listed above can be implemented in tandem, for example, in conjunction with performing some or all steps of FIG. 20B, and/or in conjunction with performing some or all steps of any other method described herein.

In various embodiments, performing some or all steps of FIG. 20B is based on performing some or all steps of FIG. 9K and/or performing some or all functionality of FIGS. 9A-9J.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20B described above, for example, in conjunction with further implementing any one or more of the various examples described above.

In various embodiments, a computing device includes at least one processor and at least one memory that stores executable instructions. In various embodiments, the executable instructions, when executed by the at least one processor, cause the computing device to perform some or all steps of FIG. 20B, for example, in conjunction with further implementing any one or more of the various examples described above. In various examples, some or all of the executable instructions are stored by the at least one memory based on being included in corresponding machine executable instructions received from a computing system (e.g. at least some of the executable instructions executed by the computing device are included in corresponding machine executable instructions extracted from a stream of encoded data packets received from the computing system), where some or all steps of FIG. 20B are executed by the computing device based on being indicated in the corresponding machine executable instructions received from the computing system.

In various embodiments, the executable instructions, when executed by the at least one processor, cause the computing device to: receive an incoming stream of digitally encoded data packets from a computing system; generate at least one first two-dimensional array of pixels corresponding to first digital display data visually conveying an initial plurality of application material prompts included in the incoming stream of digitally encoded data packets based on processing the incoming stream of digitally encoded data packets; automatically control each of the plurality of lighting devices of the display device to a corresponding configured light setting indicated by a corresponding pixel value of the at least one two-dimensional array of pixels to display the first digital display data via the display device; contemporaneously with displaying the first digital display data via the display device, generate first measurement values via the at least one sensor device and/or process the first measurement values to generate an initial set of input data corresponding to the set of application material prompts; generate at least one second two-dimensional array of pixels corresponding to second digital display data visually conveying a subsequent plurality of application material prompts automatically selected as a proper subset of a plurality of possible application material prompts based on processing of the initial set of input data; automatically control each of the plurality of lighting devices of the display device to a corresponding configured light setting indicated by a corresponding pixel value of the second at least one two-dimensional array of pixels to display the second digital display data via the display device; contemporaneously with displaying the second digital display data via the display device, generate second measurement values via the at least one sensor device and/or process the second measurement values to generate a subsequent set of input data corresponding to the set of application material prompts; generate encrypted application data based on generating a first corresponding plurality of subkeys from a first corresponding initial key and, in each of a corresponding plurality of iterations, applying a corresponding one of the corresponding plurality of subkeys to generate a corresponding one of a corresponding plurality of encrypted application data versions, where a first corresponding one of the corresponding plurality of subkeys is applied to application data generated based on processing a set of digital application data generated from at least some of the subsequent set of input data to generate first corresponding one of the corresponding plurality of encrypted application data versions in a first one of the corresponding plurality of iterations, where a final corresponding one of the corresponding plurality of subkeys is applied to a penultimate corresponding one of the corresponding plurality of encrypted application data versions to generate a final corresponding one of the corresponding plurality of encrypted application data versions, and/or where the encrypted application data is generated from the final application data version after completing all of the corresponding plurality of iterations; generate an outgoing stream of digitally encoded data packets to include the encrypted application data; and/or transmit the outgoing stream of digitally encoded data packets to an external system for processing.

Figure 20C:
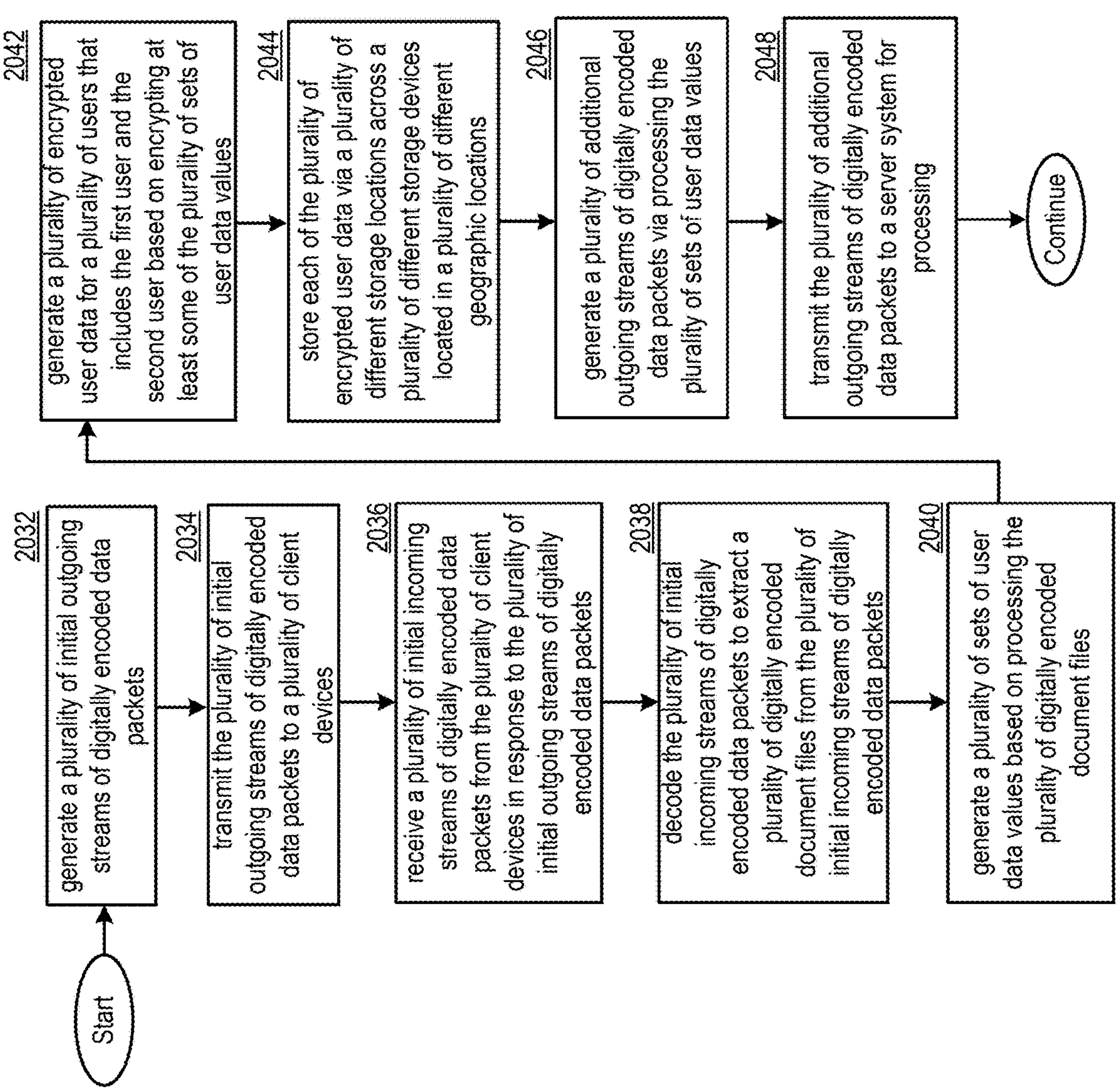

FIG. 20C illustrates a method for execution by at least one processor, such as at least one processor 22 of a computing system 10 and/or at least one processor of processing module 220 of an immigration assistance system 100. For example, at least one memory, such as at least one memory of memory module 210 and/or at least one memory 21, stores executable instructions that, when executed by the at least one processor, cause the computing system to execute some or all steps of FIG. 20C and/or to perform some or all of the functionality discussed in conjunction with any of the Figures described herein.

In some embodiments, a computing system 10 performs all steps of FIG. 20C. In other embodiments, computing system 10 performs some steps of FIG. 20C, while at least one computing device 13 communicating with computing system 10 performs some or all other steps of FIG. 20C.

Step 2032 includes generating a plurality of initial outgoing streams of digitally encoded data packets. In various examples, each initial outgoing stream of digitally encoded data packets of the plurality of initial outgoing streams of digitally encoded data packets is generated to include corresponding machine executable instructions.

Step 2034 includes transmitting the plurality of initial outgoing streams of digitally encoded data packets to a plurality of client devices. In various examples, a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user.

Step 2036 includes receiving a plurality of initial incoming streams of digitally encoded data packets from the plurality of client devices in response to the plurality of initial outgoing streams of digitally encoded data packets. In various examples, a first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets to include a first digitally encoded document file that includes first digital image data visually depicting a first physical document corresponding to the first user. In various examples, a second initial incoming stream of digitally encoded data packets of the plurality of initial incoming streams of digitally encoded data packets is received from the second client device based on the second client device executing the corresponding machine executable instructions to automatically generate the second initial incoming stream of digitally encoded data packets to include a second digitally encoded document file that includes second digital image data of a second physical document corresponding to the second user.

Step 2038 includes decoding the plurality of initial incoming streams of digitally encoded data packets to extract a plurality of digitally encoded document files from the plurality of initial incoming streams of digitally encoded data packets. In various examples, the first digitally encoded document file is extracted from the first initial incoming stream of digitally encoded data packets, and/or the second digitally encoded document file is extracted from the second initial incoming stream of digitally encoded data packets.

Step 2040 includes generating a plurality of sets of user data values based on processing the plurality of digitally encoded document files. In various examples, a first set of user data values of the plurality of sets of user data values is extracted from the first digitally encoded document file via applying an image processing function to the first digital image data, and/or a second set of user data values of the plurality of sets of user data values is extracted from the second digitally encoded document file based on applying the image processing function to the second digital image data.

Step 2042 includes generating a plurality of encrypted user data for a plurality of users that includes the first user and the second user based on encrypting at least some of the plurality of sets of user data values. In various examples, each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions. In various examples, the each encrypted user data is generated from a final encrypted user data version of the corresponding plurality of encrypted user data versions generated after completing all of the first corresponding plurality of iterations. In various examples, first encrypted user data is generated for the first user based on encrypting at least some of the first initial set of input data and/or second encrypted user data is generated for the second user based on encrypting at least some of the second initial set of input data.

Step 2044 includes storing each of the plurality of encrypted user data via a plurality of different storage locations across a plurality of different storage devices located in a plurality of different geographic locations. In various examples, the first encrypted user data is stored via a first set of storage locations of the plurality of different storage locations, and/or the second encrypted user data is stored via a second set of storage locations of the plurality of different storage locations different from the first set of storage locations.

Step 2046 includes generating a plurality of additional outgoing streams of digitally encoded data packets via processing the plurality of sets of user data values.

Step 2048 includes transmitting the plurality of additional outgoing streams of digitally encoded data packets to a server system (e.g. a computing system, a government server system, and/or other server system) for processing.

In various examples, applying the image processing function to the first digital image data to extract the first set of user data values is based on aligning positions of a first plurality of pixels of the first digital image data with predetermined spatial arrangement data to identify a first plurality of proper subsets of adjacent pixels of the first plurality of pixels based on applying the predetermined spatial arrangement data to, for each of a plurality of different user fields, identify a corresponding proper subset of adjacent pixels of the first plurality of proper subsets of adjacent pixels having a position in a two-dimensional arrangement of the first plurality of pixels, relative to positions of other ones of the first plurality of pixels in the two-dimensional arrangement of the first plurality of pixels, that corresponds to the each of the plurality of different user fields. In various examples, applying the image processing function to the first digital image data to extract the first set of user data values is further based on generating each corresponding one of the first set of user data values based on processing ones of the first plurality of pixels included in a corresponding proper subset of adjacent pixels of the first plurality of proper subsets of adjacent pixels.

In various examples, the predetermined spatial arrangement data indicates relative position of a plurality of features (e.g. the plurality of user fields, a border of the document, identifying markers of the document in predetermined positions upon the document, etc.). For example, the predetermined spatial arrangement data indicates a first feature is to the left of a second feature. As another example, the predetermined spatial arrangement data indicates a first feature is to the left of a second feature by a first amount and above the second feature by a second amount, where a ratio of the first amount to the second amount and/or absolute values of the first amount and the second amount are indicated in the predetermined spatial arrangement data. As another example, the predetermined spatial arrangement data indicates relative positions of the plurality of features based on a position of a top left position of the plurality of features. As another example, the predetermined spatial arrangement data indicates absolute and/or relative sizes, shapes, and/or dimensions of different ones of the plurality of features. As another example, the predetermined spatial arrangement data indicates a first feature is larger than a second feature by a vertical factor and by a horizontal factor, where the second feature is detected based on, after detecting the first feature, measuring a vertical and horizontal dimensions of the first feature and applying the vertical factor to the vertical dimension and the horizontal factor to the horizontal dimension to determine an expected size of the second feature and searching for the second feature based on detecting a corresponding feature having the expected size. As another example, the predetermined spatial arrangement data indicates positions, sizes, and/or dimensions of each of the plurality of features relative to an outline of a corresponding document having a corresponding size and/or dimensions. In various examples, aligning positions of the first plurality of pixels of the first digital image data with predetermined spatial arrangement data is based on detecting the outline, detecting at least one other feature relative to the outline, and/or detecting at least one second feature relative to at least one first detected feature after detecting the first detected feature.

In various examples, the first physical document corresponds to a first document type of a plurality of document types. In various examples, the image processing function is configured for processing image data visually depicting physical documents of the first document type. In various examples, based on the image processing function being configured for processing image data visually depicting physical documents of the first document type, the plurality of different user fields is configured based on a standardized set of user fields included in the first document type. In various examples, the predetermined spatial arrangement data is configured based on a standardized spatial layout of the plurality of different user fields in the first document type.

In various examples, the second physical document has the first document type. In various examples, the second set of user data values of the plurality of sets of user data values is extracted from the second digitally encoded document file via applying the image processing function to the second digital image data based on: aligning positions of a second plurality of pixels of the second digital image data with the predetermined spatial arrangement data to identify a second plurality of proper subsets of adjacent pixels of the second plurality of pixels based on applying the predetermined spatial arrangement data to, for each of the plurality of different user fields, identify a corresponding proper subset of adjacent pixels of the second plurality of proper subsets of adjacent pixels having a position in a two-dimensional arrangement of the second plurality of pixels, relative to positions of other ones of the second plurality of pixels in the two-dimensional arrangement of the first plurality of pixels, that corresponds to the each of the plurality of different user fields; and/or generating each corresponding one of the second set of user data values based on processing ones of the second plurality of pixels included in a corresponding proper subset of adjacent pixels of the second plurality of proper subsets of adjacent pixels.

In various examples, the second physical document has a second document type different from the first document type. In various examples, the second set of user data values of the plurality of sets of user data values is extracted from the second digitally encoded document file via applying a second image processing function to the second digital image data. In various examples, the second image processing function is configured for processing image data visually depicting physical documents of the second document type. In various examples, applying the second image processing function to the second digital image data is based on: aligning positions of a second plurality of pixels of the second digital image data with second predetermined spatial arrangement data to identify a second plurality of proper subsets of adjacent pixels of the second plurality of pixels based on applying the second predetermined spatial arrangement data to, for each of a second plurality of different user fields, identify a corresponding proper subset of adjacent pixels of the second plurality of proper subsets of adjacent pixels having a position in a two-dimensional arrangement of the second plurality of pixels, relative to positions of other ones of the second plurality of pixels in the two-dimensional arrangement of the first plurality of pixels, that corresponds to the each of the second plurality of different user fields. In various examples, based on the second image processing function being configured for processing image data visually depicting physical documents of the second document type, the second plurality of different user fields is different from the plurality of different user fields based on the second plurality of different user fields being configured based on a second standardized set of user fields included in the second document type different from the standardized set of user fields included in the first document type, and/or the second predetermined spatial arrangement data is different from the predetermined spatial arrangement data based on the second predetermined spatial arrangement data being configured based on a second standardized spatial layout of the second plurality of different user fields in the second document type different from the standardized spatial layout of the plurality of different user fields in the first document type. In various examples, applying the second image processing function to the second digital image data is further based on generating each corresponding one of the second set of user data values based on processing ones of the second plurality of pixels included in a corresponding proper subset of adjacent pixels of the second plurality of proper subsets of adjacent pixels.

In various examples, the first digitally encoded document file has a first digitally encoded document file type of a plurality of digitally encoded document file types, and/or the second digitally encoded document file also has the first digitally encoded document file type.

In various examples, the image processing function includes a plurality of different image processing sub-functions each corresponding to a different one of the plurality of different user fields. In various examples, each corresponding one of the first set of user data values includes performing a corresponding one of the plurality of different image processing sub-functions upon the corresponding proper subset of adjacent pixels of the first plurality of proper subsets of adjacent pixels.

In various examples, the plurality of different user fields each have a corresponding one of a plurality of different data types. In various examples, a first user field of the plurality of different user fields has a first data type of the plurality of different data types. In various examples, a first data value for the first user field of the first set of user data values is generated via performing the first one of the plurality of different image processing sub-functions upon a first corresponding proper subset of adjacent pixels of the first plurality of proper subsets of adjacent pixels. In various examples, the first data value has the first data type based on the first one of the plurality of different image processing sub-functions being configured to generate data values having the first data type. In various examples, a second user field of the plurality of different user fields has a second data type of the plurality of different data types. In various examples, a second data value for the second user field of the first set of user data values is generated via performing the second one of the plurality of different image processing sub-functions upon a second corresponding proper subset of adjacent pixels of the first plurality of proper subsets of adjacent pixels. In various examples, the second data value has the second data type based on the second one of the plurality of different image processing sub-functions being configured to generate data values having the second data type.

In various examples, the first data type corresponds to at least one of: a text data type or a numeric data type. In various examples, the second data type corresponds to an image data type.

In various examples, generating a first one of the first set of user data values includes processing ones of the first plurality of pixels included in a first corresponding proper subset of adjacent pixels of the first plurality of proper subsets of adjacent pixels based on: extracting raw text from the first corresponding proper subset of adjacent pixels of the first plurality of proper subsets of adjacent pixels; and/or performing a natural language processing function upon the raw text to generate the first one of the second set of user data values having a corresponding value different from the raw text.

In various examples, the predetermined spatial arrangement data indicates: a plurality of relative location data for locations the plurality of different user fields in two-dimensional space; and/or a plurality of relative size data for sizes of the plurality of different user fields in two-dimensional space.

In various examples, aligning the positions of the first plurality of pixels of the first digital image data with the predetermined spatial arrangement data includes generating processed digital image data from the first digital image data based on performing an affine transformation upon the two-dimensional arrangement of the first plurality of pixels.

In various examples, applying the image processing function to the first digital image data is further based on generating visual marker detection data indicating a subset of pixels visually conveying at least one predetermined visual marker in the first digital image data. In various examples, applying the image processing function to the first digital image data is further based on generating at least one of: a size offset value based on a measured size difference between a predetermined size of the predetermined visual marker and a detected size of the subset of pixels in the first digital image data; a horizontal position offset value based on a measured horizontal position difference between a predetermined horizontal position of the predetermined visual marker and a detected horizontal position of the subset of pixels in the first digital image data; a vertical position offset value based on a measured vertical position difference between a predetermined vertical position of the predetermined visual marker and a detected vertical position of the subset of pixels in the first digital image data; an orientation offset based on a measured orientation difference between a predetermined orientation of the predetermined visual marker and a detected orientation of the at least one predetermined visual marker in the subset of pixels; or a color hue offset value based on a measured color difference between predetermined color data of the orientation of the predetermined visual marker and detected color data of the at least one predetermined visual marker in the subset of pixels. In various examples, the affine transformation is performed upon the two-dimensional arrangement of the first plurality of pixels as a function of at least one of: the size offset value, the horizontal position offset value, the vertical position offset value, or the orientation offset value. In various examples, a pixel value modification function is alternatively or additionally performed upon pixel values of the first plurality of pixels to generate the processed digital image data having different pixel values as a function of the color hue offset value. In various examples, the pixel value modification function is a non-linear function of pixel value.

In various examples, the first plurality of proper subsets of adjacent pixels are mutually exclusive sets of pixels. In various examples, a set difference between the first plurality of pixels and a union of the first plurality of proper subsets of adjacent pixels is non-null.

In various examples, the method further includes training a document processing function by processing a training set that includes a plurality of digitally encoded document files of at least one document type based on: training at least one first computer vision model via processing a first plurality of digital image data of the plurality of digitally encoded document files; and training at least one natural language model via processing a plurality of textual data extracted from the plurality of digitally encoded document files. In various examples, performing the image processing function includes applying the document processing function.

In various examples, the first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets generated based on processing first measurement values collected via at least one sensor device of the first client device contemporaneously with displaying digital display data via a display device of the first client device in response to the first client device automatically extracting at least one prompt from the first initial outgoing stream of digitally encoded data packets to automatically generate at least one two-dimensional array of pixels corresponding to the digital display data and displaying the digital display data via the display device of the first client device visually conveying the at least one prompt based on automatically configuring each of a plurality of lighting devices of the display device to a corresponding configured light setting indicated by a corresponding pixel value of the at least one two-dimensional array of pixels.

In various examples, the first initial incoming stream of digitally encoded data packets of the plurality of initial incoming streams of digitally encoded data packets is received from the first client device based on the first client device automatically generating the first digitally encoded document file for inclusion in the first initial incoming stream of digitally encoded data packets generated based on the first client device activating a camera of the first client device to capture the first digital image data based on processing the first measurement values collected via at least one sensor device of the first client device.

In various examples, the first set of user data values is generated based on: generating a first plurality of sub-tasks for generating the first set of user data values; and/or executing the first plurality of sub-tasks in parallel as a first plurality of parallelized processes. In various examples, the first set of user data values is generated based on: generating a second plurality of sub-tasks for generating the second set of user data values; and/or executing the second plurality of sub-tasks in parallel as a second plurality of parallelized processes.

In various examples, the method further includes automatically identifying a corresponding set of required application materials for each of the plurality of users as a corresponding proper subset of a plurality of possible application materials. In various examples, a first set of required application materials is identified for the first user as a first proper subset of the plurality of possible application materials via processing the first set of user data values. In various examples, a second set of required application materials is identified for the second user as a second proper subset of the plurality of possible application materials via processing the second set of data values. In various examples, a set difference between the first set of required application materials and the second set of required application materials is non-null based on at least one of the first initial set of input data being different from at least one of the second initial set of input data.

In various examples, the method further includes automatically generating a plurality of subsequent outgoing streams of digitally encoded data packets. In various examples, a first subsequent outgoing stream of digitally encoded data packets of the plurality of subsequent outgoing streams of digitally encoded data packets indicates a first set of prompts corresponding to the first set of required application materials identified for the first user, and/or a second subsequent outgoing stream of digitally encoded data packets of the plurality of subsequent outgoing streams of digitally encoded data packets indicates a second set of prompts corresponding to the second set of required application materials identified for the second user. In various examples, another set difference between the first set of prompts and the second set of prompts is non-null based on the first set of required application materials being different from the second set of required application materials.

In various examples, the method further includes transmitting the plurality of subsequent outgoing streams of digitally encoded data packets. In various examples, the first subsequent outgoing stream of digitally encoded data packets is transmitted to the first client device and/or the second subsequent outgoing stream of digitally encoded data packets is transmitted to the second client device.

In various examples, the method further includes receiving a plurality of subsequent incoming streams of digitally encoded data packets in response to the plurality of subsequent outgoing streams of digitally encoded data packets. In various examples, a first subsequent incoming stream of digitally encoded data packets of the plurality of subsequent incoming streams of digitally encoded data packets is received from the first client device. In various examples, a second subsequent incoming stream of digitally encoded data packets of the plurality of subsequent incoming streams of digitally encoded data packets is received from the second client device.

In various examples, the method further includes automatically generating a plurality of additional digitally encoded document files. In various examples, at least one first additional digitally encoded document file of the plurality of additional digitally encoded document files corresponds to at least one of the first set of required application materials and is generated based on both processing at least one of the at least some of the first set of user data values in response to accessing the first encrypted user data in at least one of the plurality of different geographic locations and decrypting the first encrypted user data to extract at least one of the at least some of the first initial set of input data and also processing the first subsequent set of input data in response to decoding the first subsequent incoming stream of digitally encoded data packets to extract other first encrypted application data from the first subsequent incoming stream of digitally encoded data packets and extracting the first subsequent set of input data based on decrypting the other first encrypted application data. In various examples, at least one second additional digitally encoded document file of the plurality of additional digitally encoded document files corresponds to at least one of the second set of required application materials and is generated based on both processing at least one of the at least some of the second initial set of input data in response to accessing the second encrypted user data in at least one of the plurality of different geographic locations and decrypting the second encrypted user data to extract at least one of the at least some of the second initial set of input data and also processing the second subsequent set of input data in response to decoding the second subsequent incoming stream of digitally encoded data packets to extract other second encrypted application data from the second subsequent incoming stream of digitally encoded data packets and extracting the second subsequent set of input data based on decrypting the other second encrypted application data.

In various examples, the method further includes automatically generating a plurality of encrypted submission data. In various examples, each encrypted submission data of the plurality of encrypted submission data is generated based on generating a second corresponding plurality of subkeys from a second corresponding initial key and/or, in each of a second corresponding plurality of iterations, applying a corresponding one of the second corresponding plurality of subkeys to generate a corresponding one of a corresponding plurality of encrypted submission data versions. In various examples, the each encrypted submission data is generated from a final encrypted submission data version of the corresponding plurality of encrypted submission data versions generated after completing all of the first corresponding plurality of iterations. In various examples, each of the plurality of additional outgoing streams of digitally encoded data packets includes a corresponding one of the plurality of encrypted submission data.

In various examples, the at least one first additional digitally encoded document file is different from the at least one second additional digitally encoded document file based on the at least one first additional digitally encoded document file containing different information from the at least one second additional digitally encoded document file as a result of the first set of user data values being different from the second set of user data values and as a further result of the first subsequent set of input data being different from the second subsequent set of input data. In various examples, the at least one first additional digitally encoded document file is different from the at least one second additional digitally encoded document file further based on the at least one first additional digitally encoded document file and the at least one additional second digitally encoded document file corresponding to different types of application materials of the plurality of possible application materials as a result of the set difference between the first set of required application materials and the second set of required application materials being non-null.

In various embodiments, any one or more of the various examples listed above are implemented in conjunction with performing some or all steps of FIG. 20C. In various embodiments, any set of the various examples listed above can be implemented in tandem, for example, in conjunction with performing some or all steps of FIG. 20C, and/or in conjunction with performing some or all steps of any other method described herein.

In various embodiments, performing some or all steps of FIG. 20C is based on performing some or all steps of FIG. 12F and/or 12G and/or performing some or all functionality of FIGS. 12A-12E.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20C described above, for example, in conjunction with further implementing any one or more of the various examples described above.

In various embodiments, a computing system includes at least one processor and at least one memory that stores executable instructions. In various embodiments, the executable instructions, when executed by the at least one processor, cause the computing system to perform some or all steps of FIG. 20C, for example, in conjunction with further implementing any one or more of the various examples described above.

In various embodiments, the executable instructions, when executed by the at least one processor, cause the computing system to: generate a plurality of initial outgoing streams of digitally encoded data packets, where each initial outgoing stream of digitally encoded data packets of the plurality of initial outgoing streams of digitally encoded data packets is generated to include corresponding machine executable instructions; transmit the plurality of initial outgoing streams of digitally encoded data packets to a plurality of client devices, where a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user; receive a plurality of initial incoming streams of digitally encoded data packets from the plurality of client devices in response to the plurality of initial outgoing streams of digitally encoded data packets, where a first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets to include a first digitally encoded document file that includes first digital image data visually depicting a first physical document corresponding to the first user, and/or where a second initial incoming stream of digitally encoded data packets of the plurality of initial incoming streams of digitally encoded data packets is received from the second client device based on the second client device executing the corresponding machine executable instructions to automatically generate the second initial incoming stream of digitally encoded data packets to include a second digitally encoded document file that includes second digital image data of a second physical document corresponding to the second user; decode the plurality of initial incoming streams of digitally encoded data packets to extract a plurality of digitally encoded document files from the plurality of initial incoming streams of digitally encoded data packets, where the first digitally encoded document file is extracted from the first initial incoming stream of digitally encoded data packets, and/or where the second digitally encoded document file is extracted from the second initial incoming stream of digitally encoded data packets; generate a plurality of sets of user data values based on processing the plurality of digitally encoded document files, where a first set of user data values of the plurality of sets of user data values is extracted from the first digitally encoded document file via applying an image processing function to the first digital image data, where a second set of user data values of the plurality of sets of user data values is extracted from the second digitally encoded document file based on applying the image processing function to the second digital image data. In various embodiments, applying the image processing function to the first digital image data to extract the first set of user data values is based on: aligning positions of a first plurality of pixels of the first digital image data with predetermined spatial arrangement data to identify a first plurality of proper subsets of adjacent pixels of the first plurality of pixels based on applying the predetermined spatial arrangement data to, for each of a plurality of different user fields, identify a corresponding proper subset of adjacent pixels of the first plurality of proper subsets of adjacent pixels having a position in a two-dimensional arrangement of the first plurality of pixels, relative to positions of other ones of the first plurality of pixels in the two-dimensional arrangement of the first plurality of pixels, that corresponds to the each of the plurality of different user fields; and/or generating each corresponding one of the first set of user data values based on processing ones of the first plurality of pixels included in a corresponding proper subset of adjacent pixels of the first plurality of proper subsets of adjacent pixels. In various embodiments, the executable instructions, when executed by the at least one processor, further cause the computing system to: generate a plurality of encrypted user data for a plurality of users that includes the first user and the second user based on encrypting at least some of the plurality of sets of user data values, where each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions, where the each encrypted user data is generated from a final encrypted user data version of the corresponding plurality of encrypted user data versions generated after completing all of the first corresponding plurality of iterations, where first encrypted user data is generated for the first user based on encrypting at least some of the first initial set of input data, and/or where second encrypted user data is generated for the second user based on encrypting at least some of the second initial set of input data; store each of the plurality of encrypted user data via a plurality of different storage locations across a plurality of different storage devices located in a plurality of different geographic locations, where the first encrypted user data is stored via a first set of storage locations of the plurality of different storage locations, and/or where the second encrypted user data is stored via a second set of storage locations of the plurality of different storage locations different from the first set of storage locations; generate a plurality of additional outgoing streams of digitally encoded data packets via processing the plurality of sets of user data values; and/or transmit the plurality of additional outgoing streams of digitally encoded data packets to a server system (e.g. a computing system, a government server system, and/or other server system) for processing.

Figure 20D:
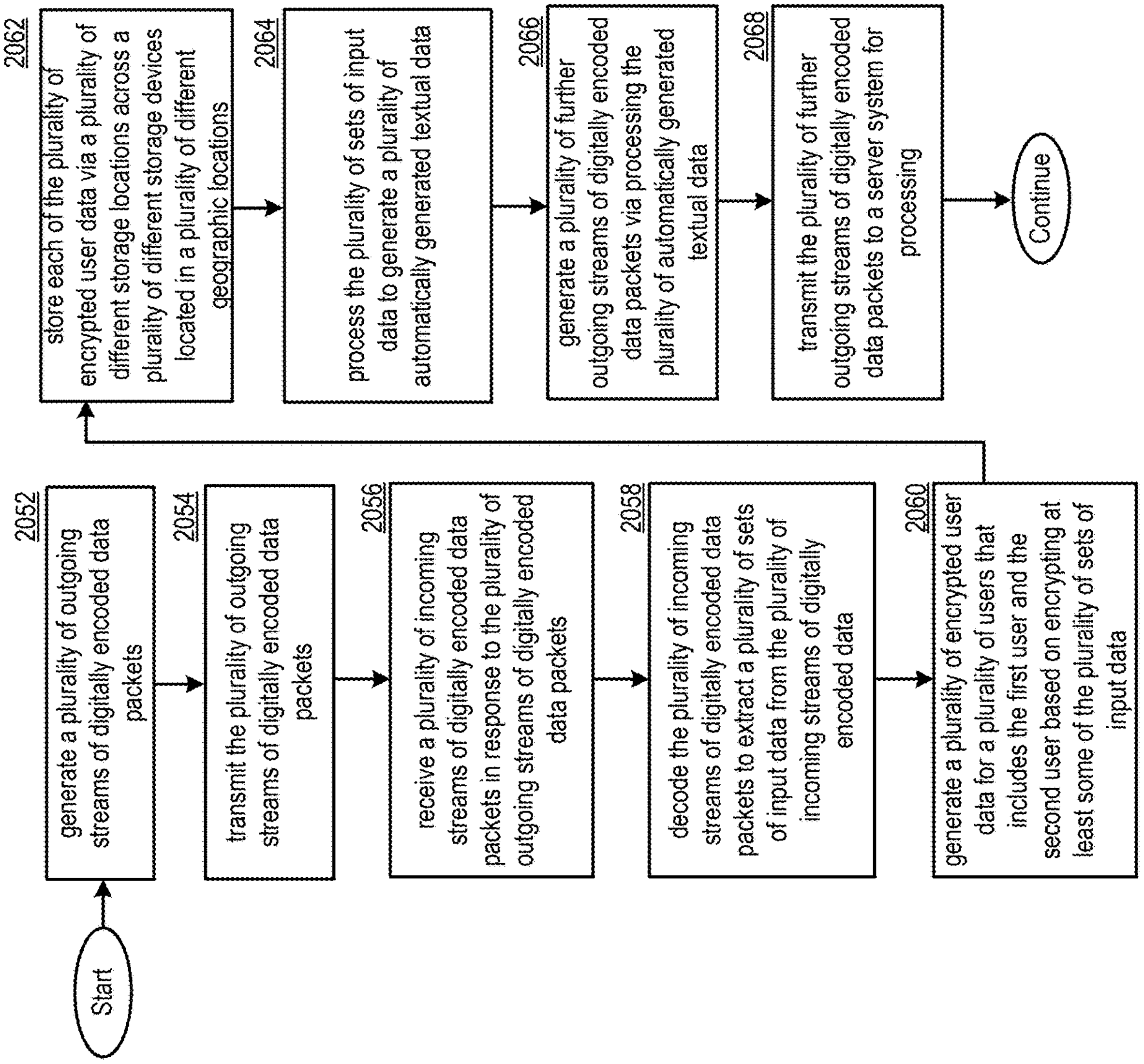

FIG. 20D illustrates a method for execution by at least one processor, such as at least one processor 22 of a computing system 10 and/or at least one processor of processing module 220 of an immigration assistance system 100. For example, at least one memory, such as at least one memory of memory module 210 and/or at least one memory 21, stores executable instructions that, when executed by the at least one processor, cause the computing system to execute some or all steps of FIG. 20D and/or to perform some or all of the functionality discussed in conjunction with any of the Figures described herein.

In some embodiments, a computing system 10 performs all steps of FIG. 20D. In other embodiments, computing system 10 performs some steps of FIG. 20D, while at least one computing device 13 communicating with computing system 10 performs some or all other steps of FIG. 20D.

Step 2052 includes generating a plurality of outgoing streams of digitally encoded data packets. In various examples, the plurality of outgoing streams of digitally encoded data packets are generated for transmission to a plurality of client devices that includes a first client device associated with a first user and a second client device associated with a second user. In various examples, the plurality of outgoing streams of digitally encoded data packets are generated to include corresponding machine executable instructions.

Step 2054 includes transmitting the plurality of outgoing streams of digitally encoded data packets. In various examples, a first outgoing stream of digitally encoded data packet of the plurality of outgoing streams of digitally encoded data packets is transmitted to the first client device contemporaneously with transmission of a second outgoing stream of digitally encoded data packets of the plurality of outgoing streams of digitally encoded data packets to the second client device.

Step 2056 includes receiving a plurality of incoming streams of digitally encoded data packets in response to the plurality of outgoing streams of digitally encoded data packets. In various examples, a first incoming stream of digitally encoded data packets of the plurality of incoming streams of digitally encoded data packets is received from the first client device based on the first client device automatically generating the first incoming stream of digitally encoded data packets via encoding a first set of input data automatically generated based on processing measurement values collected via at least one sensor device of the first client device contemporaneously with displaying digital display data via a display device of the first client device in response to the first client device automatically extracting the corresponding machine executable instructions from the first outgoing stream of digitally encoded data packets and executing the corresponding machine executable instructions to automatically generate at least one two-dimensional array of pixel values corresponding to the digital display data and displaying the digital display data via the display device of the first client device based on automatically configuring each of a plurality of lighting devices of the display device to a corresponding configured light setting indicated by a corresponding pixel value of the at least one two-dimensional array of pixel values. In various examples, a second incoming stream of digitally encoded data packets of the plurality of incoming streams of digitally encoded data packets is received from the second client device.

Step 2058 includes decoding the plurality of incoming streams of digitally encoded data packets to extract a plurality of sets of input data from the plurality of incoming streams of digitally encoded data. In various examples, a first set of input data of the plurality of sets of input data is extracted from the first incoming stream of digitally encoded data packets and/or a second set of input data of the plurality of sets of input data is extracted from the second incoming stream of digitally encoded data packets.

Step 2060 includes generating a plurality of encrypted user data for a plurality of users that includes the first user and the second user based on encrypting at least some of the plurality of sets of input data. In various examples, each encrypted user data of the plurality of encrypted user data is generated based on generating a first corresponding plurality of subkeys from a first corresponding key and, in each of a first corresponding plurality of iterations, applying a corresponding one of the first corresponding plurality of subkeys to generate a corresponding one of a corresponding plurality of encrypted user data versions. In various examples, the each encrypted user data is generated from a final encrypted user data version of the corresponding plurality of encrypted user data versions generated after completing all of the first corresponding plurality of iterations. In various examples, first encrypted user data is generated for the first user based on encrypting at least some of the first set of input data. In various examples, second encrypted user data is generated for the second user based on encrypting at least some of the second set of input data.

Step 2062 includes storing each of the plurality of encrypted user data via a plurality of different storage locations across a plurality of different storage devices located in a plurality of different geographic locations. In various examples, the first encrypted user data is stored via a first set of storage locations of the plurality of different storage locations, and/or the second encrypted user data is stored via a second set of storage locations of the plurality of different storage locations different from the first set of storage locations.

Step 2064 includes processing the plurality of sets of input data to generate a plurality of automatically generated textual data. In various examples, first automatically generated textual data of the plurality of automatically generated textual data is generated based on performing a natural language generator function upon the first set of input data, and/or second automatically generated textual data of the plurality of automatically generated textual data is generated based on performing the natural language generator function upon the second set of input data.

Step 2066 includes generating a plurality of further outgoing streams of digitally encoded data packets via processing the plurality of automatically generated textual data.

Step 2068 includes transmitting the plurality of further outgoing streams of digitally encoded data packets to a server system (e.g. a computing system, a government server system, and/or other server system) for processing.

In various examples, generating the first automatically generated textual data is further based on accessing the first encrypted user data in at least one of the plurality of different geographic locations and decrypting the first encrypted user data to extract at least one of the at least some of the first set of input data and performing the natural language generator function upon the at least one of the at least some of the first set of input data extracted from the first encrypted user data.

In various examples, generating the first automatically generated textual data is further based on generating a first input vector to include a first ordered set of values extracted from the first set of input data corresponding to an ordered set of fields; and/or processing the first input vector based on applying a plurality of configured weights to the first ordered set of values to generate a plurality of sequentially selected textual portions of the first automatically generated textual data over a first plurality of iterative steps via updating state data over the first plurality of iterative steps as a function of prior state data based on generating subsequent intermediate output in a subsequent step of the first plurality of iterative steps via applying at least one of the plurality of configured weights to prior intermediate output generated in a prior step of the plurality of iterative steps via applying the at least one of the plurality of configured weights.

In various examples, generating the second automatically generated textual data is further based on: generating a second input vector to include a second ordered set of values extracted from the second set of input data corresponding to the ordered set of fields; and/or processing the second input vector based on applying the plurality of configured weights to the second ordered set of values to generate a second plurality of sequentially selected textual portions of the first automatically generated textual data over a second plurality of iterative steps.

In various examples, the first set of input data includes a first set of text portions, each text portion of the first set of text portions is included in a corresponding one of the first set of input data. In various examples, the first automatically generated textual data includes a plurality of sequentially arranged textual portions. In various examples, a set difference between text portions included in the first set of text portions and the plurality of sequentially arranged textual portions is non-null based on the plurality of sequentially arranged textual portions of the first automatically generated textual data including at least one text portion not included in the first set of text portions.

In various examples, a first number of characters included in the plurality of sequentially arranged textual portions is at least one order of magnitude greater than a second number of characters included in the first set of text portions.

In various examples, the set difference between text portions included in the first set of text portions and the plurality of sequentially arranged textual portions is non-null further based on the first set of text portions including at least one other text portion not included in the plurality of sequentially arranged textual portions of the first automatically generated textual data based on a subset of text portions in the sequentially arranged textual portions of the first automatically generated textual data being semantically derived from the at least one other text portion via applying the natural language generator function.

In various examples, the first automatically generated textual data and the second automatically generated textual data are generated in accordance with predetermined structuring data based on the natural language generator function being configured to generate automatically generated textual data adhering to the predetermined structuring data.

In various examples, the predetermined structuring data indicates a plurality of ordered sections. In various examples, generating the automatically generated textual data includes: generating a plurality of automatically generated text sections based on performing each of a plurality of natural language generator sub-functions upon a corresponding portion of the first set of input data to generate textual data included in one of the plurality of ordered sections; and/or concatenating the plurality of automatically generated text sections in accordance with an ordering of the plurality of ordered sections.

In various examples, the predetermined structuring data is configured based on one of a plurality of document types, and/or the automatically generated textual data is generated in conjunction with generating a document file having the one of the plurality of document types.

In various examples, the first set of input data includes at least one digitally encoded document file uploaded by the first client device. In various examples, the method further includes: training at least one document processing function by processing a training set that includes a plurality of digitally encoded document files of at least one document type based on: training at least one first computer vision model via processing a first plurality of digital image data of the plurality of digitally encoded document files; and/or training at least one natural language model via processing a plurality of textual data extracted from the plurality of digitally encoded document files.

process each corresponding one of the plurality of first set of input data based on performing the at least one document processing function upon the at least one digitally encoded document file uploaded by first client device via applying the at least one first computer vision model upon digital image data of the at least one digitally encoded document file to generate first extracted data and via further applying the at least one natural language model upon the first extracted data to generate document processing function output data. In various examples, the natural language generator function is performed upon the document processing function output data.

In various examples, the automatically generated textual data is generated in conjunction with generating a document file having one of a plurality of document types. In various examples, the method further includes training the natural language generator function via configuring a plurality of configured weights of a natural language generator model via processing a plurality of other textual data of a plurality of other document files having the one of the plurality of document types. In various examples, generating the first automatically generated textual data is based on applying the plurality of configured weights to a set of values derived from the first set of input data.

In various examples, the method further includes generating a plurality of vectors corresponding to the plurality of other document files. In various examples, at least one value included in each of the plurality of vectors corresponds to a binary label assigned to each of the plurality of other document files based on truth data corresponding to acceptance data mapped to the plurality of other document files.

In various examples, the method further includes generating a first digitally encoded document file that includes the first automatically generated textual data and to further generate a second digitally encoded document file that includes the second automatically generated textual data. In various examples, a first further outgoing stream of digitally encoded data packets of the plurality of further outgoing streams of digitally encoded data packets is generated to include the first digitally encoded document file, and/or a second further outgoing stream of digitally encoded data packets of the plurality of further outgoing streams of digitally encoded data packets is generated to include the second digitally encoded document file.

In various examples, the first digitally encoded document file and the second digitally encoded document file correspond to a first document type of a plurality of document types. In various examples, the method further includes generating a first at least one additional digitally encoded document file having at least one other type of the plurality of document types based on further processing the first set of input data. In various examples, the first further outgoing stream of digitally encoded data packets of the plurality of further outgoing streams of digitally encoded data packets is generated to further include the first at least one additional digitally encoded document file. In various examples, the method further includes generating a second at least one additional digitally encoded document file having the at least one other type of the plurality of document types based on further processing the second set of input data. In various examples, the second further outgoing stream of digitally encoded data packets of the plurality of further outgoing streams of digitally encoded data packets is generated to further include the second at least one additional digitally encoded document file.

In various examples, the first digitally encoded document file and the second digitally encoded document file are generated in accordance with a first digital file type. In various examples, generating the first digitally encoded document file includes encoding the first automatically generated textual data via applying a corresponding encoding function associated with the first digital file type. In various examples, generating the second digitally encoded document file includes encoding the second automatically generated textual data via applying the corresponding encoding function.

In various examples, the first digitally encoded document file corresponds to a first document type of a plurality of document types and the second digitally encoded document file corresponds to a second document type of the plurality of document types different from the first document type.

In various examples, the first digitally encoded document file is generated in accordance with a first digital file type and the second digitally encoded document file is generated in accordance with a second digital file type different from the first digital file type. In various examples, generating the first digitally encoded document file includes encoding the first automatically generated textual data via applying a first corresponding encoding function associated with the first digital file type. In various examples, generating the second digitally encoded document file includes encoding the second automatically generated textual data via applying a second corresponding encoding function associated with the second digital file type.

In various examples, the first automatically generated textual data is generated based on: generating a first plurality of sub-tasks for processing the first set of input data; and/or executing the first plurality of sub-tasks in parallel as a first plurality of parallelized processes. In various examples, the second automatically generated textual data is generated based on: generating a second plurality of sub-tasks for processing the second set of input data; and/or executing the second plurality of sub-tasks in parallel as a second plurality of parallelized processes.

In various embodiments, any one or more of the various examples listed above are implemented in conjunction with performing some or all steps of FIG. 20D. In various embodiments, any set of the various examples listed above can be implemented in tandem, for example, in conjunction with performing some or all steps of FIG. 20D, and/or in conjunction with performing some or all steps of any other method described herein.

In various embodiments, performing some or all steps of FIG. 20D is based on performing some or all steps of FIG. 14E and/or 14F and/or performing some or all functionality of FIGS. 14A-14D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20D described above, for example, in conjunction with further implementing any one or more of the various examples described above.

In various embodiments, a computing system includes at least one processor and at least one memory that stores executable instructions. In various embodiments, the executable instructions, when executed by the at least one processor, cause the computing system to perform some or all steps of FIG. 20D, for example, in conjunction with further implementing any one or more of the various examples described above.

In various embodiments, the executable instructions, when executed by the at least one processor, cause the computing system to: generate a plurality of outgoing streams of digitally encoded data packets for transmission to a plurality of client devices that includes a first client device associated with a first user and a second client device associated with a second user, where the plurality of outgoing streams of digitally encoded data packets are generated to include corresponding machine executable instructions; transmit the plurality of outgoing streams of digitally encoded data packets, where a first outgoing stream of digitally encoded data packet of the plurality of outgoing streams of digitally encoded data packets is transmitted to the first client device contemporaneously with transmission of a second outgoing stream of digitally encoded data packets of the plurality of outgoing streams of digitally encoded data packets to the second client device; receive a plurality of incoming streams of digitally encoded data packets in response to the plurality of outgoing streams of digitally encoded data packets, where a first incoming stream of digitally encoded data packets of the plurality of incoming streams of digitally encoded data packets is received from the first client device based on the first client device automatically generating the first incoming stream of digitally encoded data packets via encoding a first set of input data automatically generated based on processing measurement values collected via at least one sensor device of the first client device contemporaneously with displaying digital display data via a display device of the first client device in response to the first client device automatically extracting the corresponding machine executable instructions from the first outgoing stream of digitally encoded data packets and executing the corresponding machine executable instructions to automatically generate at least one two-dimensional array of pixel values corresponding to the digital display data and displaying the digital display data via the display device of the first client device based on automatically configuring each of a plurality of lighting devices of the display device to a corresponding configured light setting indicated by a corresponding pixel value of the at least one two-dimensional array of pixel values, and/or where a second incoming stream of digitally encoded data packets of the plurality of incoming streams of digitally encoded data packets is received from the second client device; decode the plurality of incoming streams of digitally encoded data packets to extract a plurality of sets of input data from the plurality of incoming streams of digitally encoded data, where a first set of input data of the plurality of sets of input data is extracted from the first incoming stream of digitally encoded data packets and/or where a second set of input data of the plurality of sets of input data is extracted from the second incoming stream of digitally encoded data packets; generate a plurality of encrypted user data for a plurality of users that includes the first user and the second user based on encrypting at least some of the plurality of sets of input data, where each encrypted user data of the plurality of encrypted user data is generated based on generating a first corresponding plurality of subkeys from a first corresponding key and, in each of a first corresponding plurality of iterations, applying a corresponding one of the first corresponding plurality of subkeys to generate a corresponding one of a corresponding plurality of encrypted user data versions, where the each encrypted user data is generated from a final encrypted user data version of the corresponding plurality of encrypted user data versions generated after completing all of the first corresponding plurality of iterations, where first encrypted user data is generated for the first user based on encrypting at least some of the first set of input data, and/or where second encrypted user data is generated for the second user based on encrypting at least some of the second set of input data; store each of the plurality of encrypted user data via a plurality of different storage locations across a plurality of different storage devices located in a plurality of different geographic locations, where the first encrypted user data is stored via a first set of storage locations of the plurality of different storage locations, and/or where the second encrypted user data is stored via a second set of storage locations of the plurality of different storage locations different from the first set of storage locations; process the plurality of sets of input data to generate a plurality of automatically generated textual data, where first automatically generated textual data of the plurality of automatically generated textual data is generated based on performing a natural language generator function upon the first set of input data, and/or where second automatically generated textual data of the plurality of automatically generated textual data is generated based on performing the natural language generator function upon the second set of input data; generate a plurality of further outgoing streams of digitally encoded data packets via processing the plurality of automatically generated textual data; and/or transmit the plurality of further outgoing streams of digitally encoded data packets to a server system (e.g. a computing system, a government server system, and/or other server system) for processing.

Figure 20E:
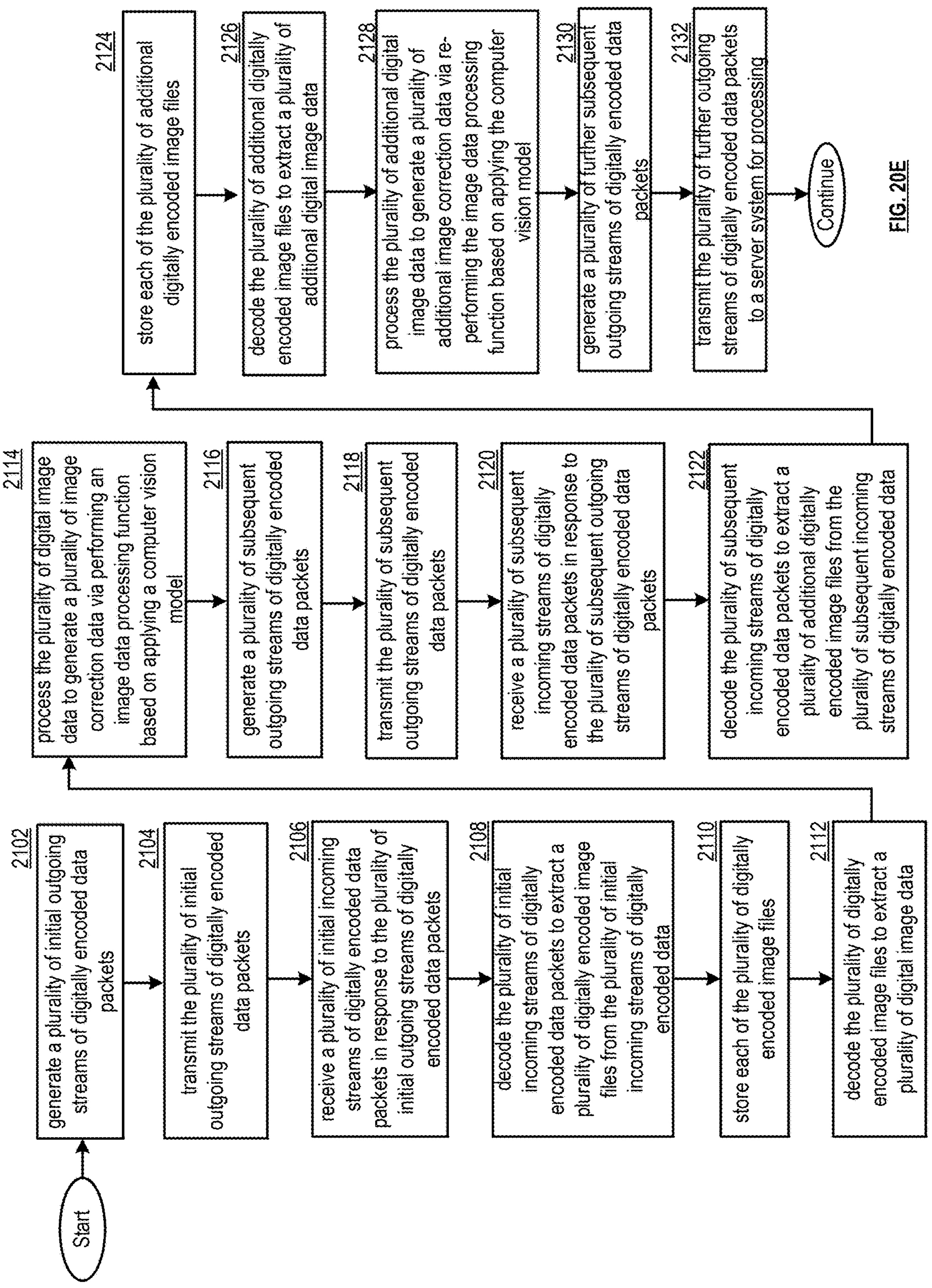

FIG. 20E illustrates a method for execution by at least one processor, such as at least one processor 22 of a computing system 10 and/or at least one processor of processing module 220 of an immigration assistance system 100. For example, at least one memory, such as at least one memory of memory module 210 and/or at least one memory 21, stores executable instructions that, when executed by the at least one processor, cause the computing system to execute some or all steps of FIG. 20E and/or to perform some or all of the functionality discussed in conjunction with any of the Figures described herein.

In some embodiments, a computing system 10 performs all steps of FIG. 20E. In other embodiments, computing system 10 performs some steps of FIG. 20E, while at least one computing device 13 communicating with computing system 10 performs some or all other steps of FIG. 20E.

Step 2102 includes generating a plurality of initial outgoing streams of digitally encoded data packets. In various examples, the plurality of initial outgoing streams of digitally encoded data packets ae generated for transmission to a plurality of client devices that includes a first client device associated with a first user and a second client device associated with a second user. In various examples, the plurality of initial outgoing streams of digitally encoded data packets are generated to include corresponding machine executable instructions.

Step 2104 includes transmitting the plurality of initial outgoing streams of digitally encoded data packets. In various examples, a first initial outgoing stream of digitally encoded data packet of the plurality of initial outgoing streams of digitally encoded data packets is transmitted to the first client device contemporaneously with transmission of a second initial outgoing stream of digitally encoded data packets of the plurality of initial outgoing streams of digitally encoded data packets to the second client device.

Step 2106 includes receiving a plurality of initial incoming streams of digitally encoded data packets in response to the plurality of initial outgoing streams of digitally encoded data packets. In various examples, a first initial incoming stream of digitally encoded data packets of the plurality of initial incoming streams of digitally encoded data packets is received from the first client device based on the first client device automatically generating the first initial incoming stream of digitally encoded data packets via encoding a first digitally encoded image file based on processing measurement values collected via at least one sensor device of the first client device contemporaneously with displaying first digital display data via a display device of the first client device in response to the first client device automatically extracting the corresponding machine executable instructions from the first initial outgoing stream of digitally encoded data packets and executing the corresponding machine executable instructions to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels. In various examples, a second initial incoming stream of digitally encoded data packets of the plurality of initial incoming streams of digitally encoded data packets is received from the second client device Step 2108 includes decoding the plurality of initial incoming streams of digitally encoded data packets to extract a plurality of digitally encoded image files from the plurality of initial incoming streams of digitally encoded data. In various examples, the first digitally encoded image file of the plurality of digitally encoded image files is extracted from the first initial incoming stream of digitally encoded data packets. In various examples, a second digitally encoded image file of the plurality of digitally encoded image files is extracted from the second initial incoming stream of digitally encoded data packets Step 2110 includes storing each of the plurality of digitally encoded image files. In various examples, the first digitally encoded image file is stored via a first set of storage locations of the plurality of different storage locations. In various examples, the second digitally encoded image file is stored via a second set of storage locations of the plurality of different storage locations different from the first set of storage locations.

Step 2112 includes decoding the plurality of digitally encoded image files to extract a plurality of digital image data. In various examples, first digital image data indicating a first at least one corresponding two-dimensional array of pixels is extracted via decoding the first digitally encoded image file, and/or second digital image data indicating a second at least one corresponding two-dimensional array of pixels is extracted via decoding the second digitally encoded image file.

Step 2114 includes processing the plurality of digital image data to generate a plurality of image correction data (e.g. included in and/or generated in response to generating digital photograph adherence data) via performing an image data processing function based on applying a computer vision model. In various examples, first image correction data of the plurality of image correction data is generated based on automatically detecting at least one subset of pixels of the first at least one corresponding two-dimensional array of pixels failing to meet and/or otherwise comparing unfavorably to predetermined image requirement data (e.g. digital photograph requirements such as the set of immigration digital photograph requirements) based on executing the image data processing function upon the first at least one corresponding two-dimensional array of pixels of the first digital image data. In various examples, second image correction data of the of the plurality of image correction data is generated based on executing the image data processing function upon the second at least one corresponding two-dimensional array of pixels of the second digital image data. In various examples, generating the plurality of image correction data includes and/or is based on sending and/or displaying digital photograph reupload prompt data.

Step 2116 includes generating a plurality of subsequent outgoing streams of digitally encoded data packets. In various examples, a first subsequent outgoing stream of digitally encoded data packets of the plurality of subsequent outgoing streams of digitally encoded data packets is generated based on encoding the first image correction data, and/or a second subsequent outgoing stream of digitally encoded data packets of the plurality of subsequent outgoing streams of digitally encoded data packets is generated based on encoding the second image correction data.

Step 2118 includes transmitting the plurality of subsequent outgoing streams of digitally encoded data packets. In various examples, the first subsequent outgoing stream of digitally encoded data packet of the plurality of subsequent outgoing streams of digitally encoded data packets is transmitted to the first client device, and/or the second subsequent outgoing stream of digitally encoded data packets of the plurality of initial outgoing streams of digitally encoded data packets is transmitted to the second client device.

Step 2120 includes receiving a plurality of subsequent incoming streams of digitally encoded data packets in response to the plurality of subsequent outgoing streams of digitally encoded data packets. In various examples, a first subsequent incoming stream of digitally encoded data packets of the plurality of subsequent incoming streams of digitally encoded data packets is received from the first client device based on the first client device automatically generating the first subsequent incoming stream of digitally encoded data packets via encoding a first additional digitally encoded image file based on processing further measurement values collected via the at least one sensor device of the first client device in response to the first client device automatically extracting the first image correction data from the first subsequent outgoing stream of digitally encoded data packets. In various examples, the display device of the first client device visually conveys the first image correction data based on automatically further configuring each of the plurality of lighting devices of the display device to another corresponding configured light setting indicated by a corresponding pixel value of at least one additional two-dimensional array of pixels of second digital display data generated to indicate the first image correction data. In various examples, a second subsequent incoming stream of digitally encoded data packets of the plurality of initial incoming streams of digitally encoded data packets is received from the second client device.

Step 2122 includes decoding the plurality of subsequent incoming streams of digitally encoded data packets to extract a plurality of additional digitally encoded image files from the plurality of subsequent incoming streams of digitally encoded data. In various examples, the first additional digitally encoded image file of the plurality of digitally encoded image files is extracted from the first subsequent incoming stream of digitally encoded data packets. In various examples, a second additional digitally encoded image file of the plurality of digitally encoded image files is extracted from the second subsequent incoming stream of digitally encoded data packets Step 2124 includes storing each of the plurality of additional digitally encoded image files. In various examples, the first additional digitally encoded image file is stored via another first set of storage locations of the plurality of different storage locations. In various examples, the first additional digitally encoded image file is stored via another first set of storage locations of the plurality of different storage locations, and/or the second digitally encoded image file is stored via another second set of storage locations of the plurality of different storage locations different from the first another set of storage locations.

Step 2126 includes decoding the plurality of additional digitally encoded image files to extract a plurality of additional digital image data. In various examples, first additional digital image data indicating a first additional at least one corresponding two-dimensional array of pixels is extracted via decoding the first additional digitally encoded image file, and/or second additional digital image data indicating a second additional at least one corresponding two-dimensional array of pixels is extracted via decoding the second additional digitally encoded image file.

Step 2128 includes processing the plurality of additional digital image data to generate a plurality of additional image correction data via re-performing the image data processing function based on applying the computer vision model. In various examples, first additional image correction data of the plurality of image correction data is generated based on automatically detecting the first additional at least one corresponding two-dimensional array of pixels meets and/or otherwise compares favorably to predetermined image requirement data based on executing the image data processing function upon the first additional at least one corresponding two-dimensional array of pixels of the first additional digital image data. In various examples, second additional image correction data of the of the plurality of image correction data is generated based on executing the image data processing function upon the second additional at least one corresponding two-dimensional array of pixels of the second additional digital image data.

Step 2130 includes generating a plurality of further subsequent outgoing streams of digitally encoded data packets. In various examples, the plurality of further subsequent outgoing streams of digitally encoded data packets is generated to include, based on the first additional image correction data indicating the first additional at least one corresponding two-dimensional array of pixels meeting and/or otherwise comparing favorably to the predetermined image requirement data, a first further subsequent outgoing stream of digitally encoded data packets that includes the first additional digitally encoded image file.

Step 2132 includes transmitting the plurality of further outgoing streams of digitally encoded data packets to a server system (e.g. a computing system, a government server system, and/or other server system) for processing.

In various examples, generating the first image correction data includes generating updated image data that includes generating a first updated at least one corresponding two-dimensional array of pixels generated via automatically modifying the first at least one corresponding two-dimensional array of pixels. In various examples, the display device of the first client device visually conveys the first image correction data based on displaying the updated image data.

In various examples, modifying the first at least one corresponding two-dimensional array includes modifying a proper subset of pixels of the first at least one corresponding two-dimensional array of pixels. In various examples, indexes of the proper subset of pixels of the first at least one corresponding two-dimensional array of pixels are based on indexes of the at least one subset of pixels of the first at least one corresponding two-dimensional array of pixels detected via executing the image data processing function.

In various examples, the proper subset of pixels of the first at least one corresponding two-dimensional array of pixels and the at least one subset of pixels of the first at least one corresponding two-dimensional array of pixels detected via executing the image data processing function have a non-null intersection.

In various examples, each of a plurality of indexes for a plurality of pixels included in the first at least one corresponding two-dimensional array of pixels have a corresponding pair of numeric index values that includes an array row index value and an array column index value. In various examples, the proper subset of pixels of the first at least one corresponding two-dimensional array of pixels have a first corresponding proper subset of indexes of the plurality of indexes. In various examples, the at least one subset of pixels of the first at least one corresponding two-dimensional array of pixels detected via executing the image data processing function have a second corresponding proper subset of indexes of the plurality of indexes. In various examples, the first updated at least one corresponding two-dimensional array of pixels is generated via modifying the proper subset of pixels of the first at least one corresponding two-dimensional array of pixels based on configuring the first corresponding proper subset of indexes of the plurality of indexes, for example, based on: a first maximum array row index value across all array row index values included in the first corresponding proper subset of indexes being configured to be greater than a second maximum array row index value across all array row index values included in the second corresponding proper subset of indexes; a first minimum array row index value across all array column index values included in the first corresponding proper subset of indexes being configured to be less than a second minimum array row index value across all array row index values included in the second corresponding proper subset of indexes, a first maximum array column index value across all array column index values included in the first corresponding proper subset of indexes being configured to be greater than a second maximum array column index value across all array column index values included in the second corresponding proper subset of indexes; and/or a first minimum array column index value across all array column index values included in the first corresponding proper subset of indexes being configured to be greater than a second minimum array column index value across all array column index values included in the second corresponding proper subset of indexes.

In various examples, a set difference between the proper subset of pixels of the first at least one corresponding two-dimensional array of pixels and the at least one subset of pixels of the first at least one corresponding two-dimensional array of pixels detected via executing the image data processing function is non-null based on at least one pixel of the first at least one corresponding two-dimensional array of pixels not being included in the proper subset of pixels of the first at least one corresponding two-dimensional array of pixels.

In various examples, the first at least one corresponding two-dimensional array of pixels includes a first plurality of two-dimensional arrays of pixels aligned via the first plurality of indexes. In various examples, the first updated at least one corresponding two-dimensional array of pixels is generated via modifying the proper subset of pixels of the first at least one corresponding two-dimensional array of pixels based on modifying, for each of the proper subset of pixels of the first at least one corresponding two-dimensional array of pixels, corresponding pixel values in each of the first plurality of two-dimensional arrays of pixels.

In various examples, each of a plurality of indexes for a plurality of pixels included in the first at least one corresponding two-dimensional array of pixels have a corresponding pair of numeric index values that includes an array row index value and an array column index value. In various examples, the at least one subset of pixels of the first at least one corresponding two-dimensional array of pixels detected via executing the image data processing function have a corresponding proper subset of indexes of the plurality of indexes. In various examples, executing the image data processing function upon the first at least one corresponding two-dimensional array of pixels includes generating at least one measurement value as a function of at least two of: a maximum array row index value across all array column index values included in the corresponding proper subset of indexes; a maximum array column index value across all array column index values included in the corresponding proper subset of indexes; a minimum array row index value across all array column index values included in the corresponding proper subset of indexes; and/or a maximum array column index value across all array column index values included in the corresponding proper subset of indexes.

In various examples, the first digitally encoded image file corresponds to first static image data generated via a first image capture device. In various examples, the second digitally encoded image file corresponds to second static image data generated via a second image capture device.

In various examples, the first digital image data visually depicts a first physical document corresponding to the first user based on the first image capture device being activated in physical proximity to the first physical document. In various examples, the second digital image data visually depicting a second physical document corresponding to the second user based on the second image capture device being activated in physical proximity to the second physical document.

In various examples, the first digital image data visually depicts at least one first anatomical feature of the first user based on the first image capture device being activated in physical proximity to first user, and/or the second digital image data visually depicts at least one first anatomical feature of the first user based on the second image capture device being activated in physical proximity to the second user.

In various examples, the method further includes training at least one document processing function by processing a training set that includes a plurality of digitally encoded image files, for example, based on: training at least one first computer vision model via processing a first plurality of digital image data of the plurality of digitally encoded image files; and/or training at least one natural language model via processing a plurality of textual data extracted from the plurality of digitally encoded image files. In various examples, the method further includes performing the at least one document processing function upon plurality of digital image data via applying the at least one first computer vision model upon digital image data of the at least one digitally encoded document file to generate first extracted data and via further applying the at least one natural language model upon the first extracted data to generate document processing function output data. In various examples, generating the image correction data is based on processing the document processing function output data.

In various examples, the first image capture device corresponds to a camera of the first client device. In various examples, the first initial incoming stream of digitally encoded data packets of the plurality of initial incoming streams of digitally encoded data packets is received from the first client device based on the first client device automatically generating the first digitally encoded image file for inclusion in the first initial incoming stream of digitally encoded data packets generated based on the first client device activating the camera of the first client device to capture a first photograph corresponding to the first digital image data based on processing the measurement values collected via the at least one sensor device of the first client device.

In various examples, executing the image data processing function upon the first at least one corresponding two-dimensional array of pixels includes performing a feature detection function configured to localize a set of features in the first at least one corresponding two-dimensional array of pixels. In various examples, the at least one subset of pixels of the first at least one corresponding two-dimensional array of pixels is identified as output of the feature detection function based on localizing the at least one feature of the set of features in the first at least one corresponding two-dimensional array of pixels. In various examples, executing the image data processing function upon the first at least one corresponding two-dimensional array of pixels further includes performing a feature characterization function based on further processing the at least one subset of pixels of the first at least one corresponding two-dimensional array of pixels to generate a set of output values corresponding to the predetermined image requirement data. In various examples, detecting the at least one subset of pixels of the first at least one corresponding two-dimensional array of pixels failing to meet and/or otherwise comparing unfavorably to the predetermined image requirement data is based on at least one value of the set of output values not meeting (e.g. falling below, exceeding, and/or otherwise comparing unfavorably to) a corresponding predetermined output value threshold.

In various examples, executing the image data processing function upon the first at least one corresponding two-dimensional array of pixels includes: generating a first input vector to include a first ordered set of values based on pixel values of the first at least one corresponding two-dimensional array of pixels; processing the first input vector based on applying a plurality of configured weights to the first ordered set of values to the first ordered set of values to generate a first output vector; and/or generating the first image correction data based on processing the first output vector. In various examples, executing the image data processing function upon the second at least one corresponding two-dimensional array of pixels includes: generating a second input vector to include a second ordered set of values based on pixel values of the second at least one corresponding two-dimensional array of pixels; processing the second input vector based on applying the plurality of configured weights to the second ordered set of values to the second ordered set of values to generate a second output vector; and/or generating the second image correction data based on processing the first output vector.

In various examples, the method further includes generating and/or storing at least one graph structure via processing a plurality of other digitally encoded image files based on: generating the plurality of configured weights based on processing a plurality of other input vectors each generated based on pixel values of a corresponding at least one two-dimensional array of pixels of a corresponding digitally encoded image file of the plurality of other digitally encoded image files to update values of plurality of configured weights from a plurality of initial values a plurality of updates based on minimizing at least one other value over the plurality of updates. In various examples, the plurality of configured weights are generated via a final update of the plurality of updates. In various examples, executing the image data processing function includes accessing the plurality of configured weights of the at least one graph structure.

In various examples, the first image correction data is generated based on: generating a first plurality of sub-tasks for processing the first digital image data; and/or executing the first plurality of sub-tasks in parallel as a first plurality of parallelized processes. In various examples, the second image correction data is generated based on: generating a second plurality of sub-tasks for processing the second digital image data; and/or executing the second plurality of sub-tasks in parallel as a second plurality of parallelized processes.

In various examples, processing the plurality of digital image data further includes generating a plurality of user data for a plurality of users that includes the first user and the second user based on processing the plurality of additional digital image data. In various examples, first user data of the plurality of user data corresponds to the first user and is generated via processing the first additional digital image data, and/or second user data of the plurality of user data corresponds to the second user and is generated via processing the second additional digital image data.

In various examples, processing the plurality of digital image data further includes generating a plurality of encrypted user data for the plurality of users based on encrypting the plurality of user data. In various examples, each encrypted user data of the plurality of encrypted user data is generated based on generating a first corresponding plurality of subkeys from a first corresponding initial key and/or, in each of a first corresponding plurality of iterations, applying a corresponding one of the first corresponding plurality of subkeys to generate a corresponding one of a corresponding plurality of encrypted user data versions. In various examples, the each encrypted user data is generated from a final encrypted user data version of the corresponding plurality of encrypted user data versions generated after completing all of the first corresponding plurality of iterations. In various examples, first encrypted user data is generated for the first user based on encrypting at least some of the first user data. In various examples, second encrypted user data is generated for the second user based on encrypting at least some of the second user data.

In various examples, processing the plurality of digital image data further includes storing each of the plurality of encrypted user data via the plurality of different storage locations. In various examples, the first encrypted user data is stored via an additional other first set of storage locations of the plurality of different storage locations. In various examples, the second encrypted user data is stored via an additional other second set of storage locations of the plurality of different storage locations different from the additional other first set of storage locations.

In various embodiments, any one or more of the various examples listed above are implemented in conjunction with performing some or all steps of FIG. 20E. In various embodiments, any set of the various examples listed above can be implemented in tandem, for example, in conjunction with performing some or all steps of FIG. 20E, and/or in conjunction with performing some or all steps of any other method described herein.

In various embodiments, performing some or all steps of FIG. 20E is based on performing some or all steps of FIG. 13H and/or 13I and/or performing some or all functionality of FIGS. 13A-13G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20E described above, for example, in conjunction with further implementing any one or more of the various examples described above.

In various embodiments, a computing system includes at least one processor and at least one memory that stores executable instructions. In various embodiments, the executable instructions, when executed by the at least one processor, cause the computing system to perform some or all steps of FIG. 20E, for example, in conjunction with further implementing any one or more of the various examples described above.

In various embodiments, the executable instructions, when executed by the at least one processor, cause the computing system to: generate a plurality of initial outgoing streams of digitally encoded data packets for transmission to a plurality of client devices that includes a first client device associated with a first user and a second client device associated with a second user, where the plurality of initial outgoing streams of digitally encoded data packets are generated to include corresponding machine executable instructions; transmit the plurality of initial outgoing streams of digitally encoded data packets, where a first initial outgoing stream of digitally encoded data packet of the plurality of initial outgoing streams of digitally encoded data packets is transmitted to the first client device contemporaneously with transmission of a second initial outgoing stream of digitally encoded data packets of the plurality of initial outgoing streams of digitally encoded data packets to the second client device; receive a plurality of initial incoming streams of digitally encoded data packets in response to the plurality of initial outgoing streams of digitally encoded data packets, where a first initial incoming stream of digitally encoded data packets of the plurality of initial incoming streams of digitally encoded data packets is received from the first client device based on the first client device automatically generating the first initial incoming stream of digitally encoded data packets via encoding a first digitally encoded image file based on processing measurement values collected via at least one sensor device of the first client device contemporaneously with displaying first digital display data via a display device of the first client device in response to the first client device automatically extracting the corresponding machine executable instructions from the first initial outgoing stream of digitally encoded data packets and executing the corresponding machine executable instructions to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels, and/or where a second initial incoming stream of digitally encoded data packets of the plurality of initial incoming streams of digitally encoded data packets is received from the second client device; decode the plurality of initial incoming streams of digitally encoded data packets to extract a plurality of digitally encoded image files from the plurality of initial incoming streams of digitally encoded data, where the first digitally encoded image file of the plurality of digitally encoded image files is extracted from the first initial incoming stream of digitally encoded data packets, and/or where a second digitally encoded image file of the plurality of digitally encoded image files is extracted from the second initial incoming stream of digitally encoded data packets; store each of the plurality of digitally encoded image files via a plurality of different storage locations across a plurality of different storage devices located in a plurality of different geographic locations, where the first digitally encoded image file is stored via a first set of storage locations of the plurality of different storage locations, and/or where the second digitally encoded image file is stored via a second set of storage locations of the plurality of different storage locations different from the first set of storage locations; decode the plurality of digitally encoded image files to extract a plurality of digital image data, where first digital image data indicating a first at least one corresponding two-dimensional array of pixels is extracted via decoding the first digitally encoded image file, and/or where second digital image data indicating a second at least one corresponding two-dimensional array of pixels is extracted via decoding the second digitally encoded image file; process the plurality of digital image data to generate a plurality of image correction data via performing an image data processing function based on applying a computer vision model, where first image correction data of the plurality of image correction data is generated based on automatically detecting at least one subset of pixels of the first at least one corresponding two-dimensional array of pixels failing to meet and/or otherwise comparing unfavorably to predetermined image requirement data based on executing the image data processing function upon the first at least one corresponding two-dimensional array of pixels of the first digital image data, and/or where second image correction data of the of the plurality of image correction data is generated based on executing the image data processing function upon the second at least one corresponding two-dimensional array of pixels of the second digital image data; generate a plurality of subsequent outgoing streams of digitally encoded data packets, where a first subsequent outgoing stream of digitally encoded data packets of the plurality of subsequent outgoing streams of digitally encoded data packets is generated based on encoding the first image correction data, and/or where a second subsequent outgoing stream of digitally encoded data packets of the plurality of subsequent outgoing streams of digitally encoded data packets is generated based on encoding the second image correction data; transmit the plurality of subsequent outgoing streams of digitally encoded data packets, where the first subsequent outgoing stream of digitally encoded data packet of the plurality of subsequent outgoing streams of digitally encoded data packets is transmitted to the first client device, and/or where the second subsequent outgoing stream of digitally encoded data packets of the plurality of initial outgoing streams of digitally encoded data packets is transmitted to the second client device; receive a plurality of subsequent incoming streams of digitally encoded data packets in response to the plurality of subsequent outgoing streams of digitally encoded data packets, where a first subsequent incoming stream of digitally encoded data packets of the plurality of subsequent incoming streams of digitally encoded data packets is received from the first client device based on the first client device automatically generating the first subsequent incoming stream of digitally encoded data packets via encoding a first additional digitally encoded image file based on processing further measurement values collected via the at least one sensor device of the first client device in response to the first client device automatically extracting the first image correction data from the first subsequent outgoing stream of digitally encoded data packets, where the display device of the first client device visually conveys the first image correction data based on automatically further configuring each of the plurality of lighting devices of the display device to another corresponding configured light setting indicated by a corresponding pixel value of at least one additional two-dimensional array of pixels of second digital display data generated to indicate the first image correction data, and/or where a second subsequent incoming stream of digitally encoded data packets of the plurality of initial incoming streams of digitally encoded data packets is received from the second client device; decode the plurality of subsequent incoming streams of digitally encoded data packets to extract a plurality of additional digitally encoded image files from the plurality of subsequent incoming streams of digitally encoded data, where the first additional digitally encoded image file of the plurality of digitally encoded image files is extracted from the first subsequent incoming stream of digitally encoded data packets, and/or where a second additional digitally encoded image file of the plurality of digitally encoded image files is extracted from the second subsequent incoming stream of digitally encoded data packets; store each of the plurality of additional digitally encoded image files, where the first additional digitally encoded image file is stored via another first set of storage locations of the plurality of different storage locations, and/or where the second digitally encoded image file is stored via another second set of storage locations of the plurality of different storage locations different from the first another set of storage locations; decode the plurality of additional digitally encoded image files to extract a plurality of additional digital image data, where first additional digital image data indicating a first additional at least one corresponding two-dimensional array of pixels is extracted via decoding the first additional digitally encoded image file, and/or where second additional digital image data indicating a second additional at least one corresponding two-dimensional array of pixels is extracted via decoding the second additional digitally encoded image file; process the plurality of additional digital image data to generate a plurality of additional image correction data via re-performing the image data processing function based on applying the computer vision model, where first additional image correction data of the plurality of image correction data is generated based on automatically detecting the first additional at least one corresponding two-dimensional array of pixels meets and/or otherwise compares favorably to predetermined image requirement data based on executing the image data processing function upon the first additional at least one corresponding two-dimensional array of pixels of the first additional digital image data, and/or where second additional image correction data of the of the plurality of image correction data is generated based on executing the image data processing function upon the second additional at least one corresponding two-dimensional array of pixels of the second additional digital image data; generate a plurality of further subsequent outgoing streams of digitally encoded data packets, where the plurality of further subsequent outgoing streams of digitally encoded data packets is generated to include, based on the first additional image correction data indicating the first additional at least one corresponding two-dimensional array of pixels meeting and/or otherwise comparing favorably to the predetermined image requirement data, a first further subsequent outgoing stream of digitally encoded data packets that includes the first additional digitally encoded image file; and/or transmit the plurality of further outgoing streams of digitally encoded data packets to a server system (e.g. a computing system, a government server system, and/or other server system) for processing.

Figure 20F:
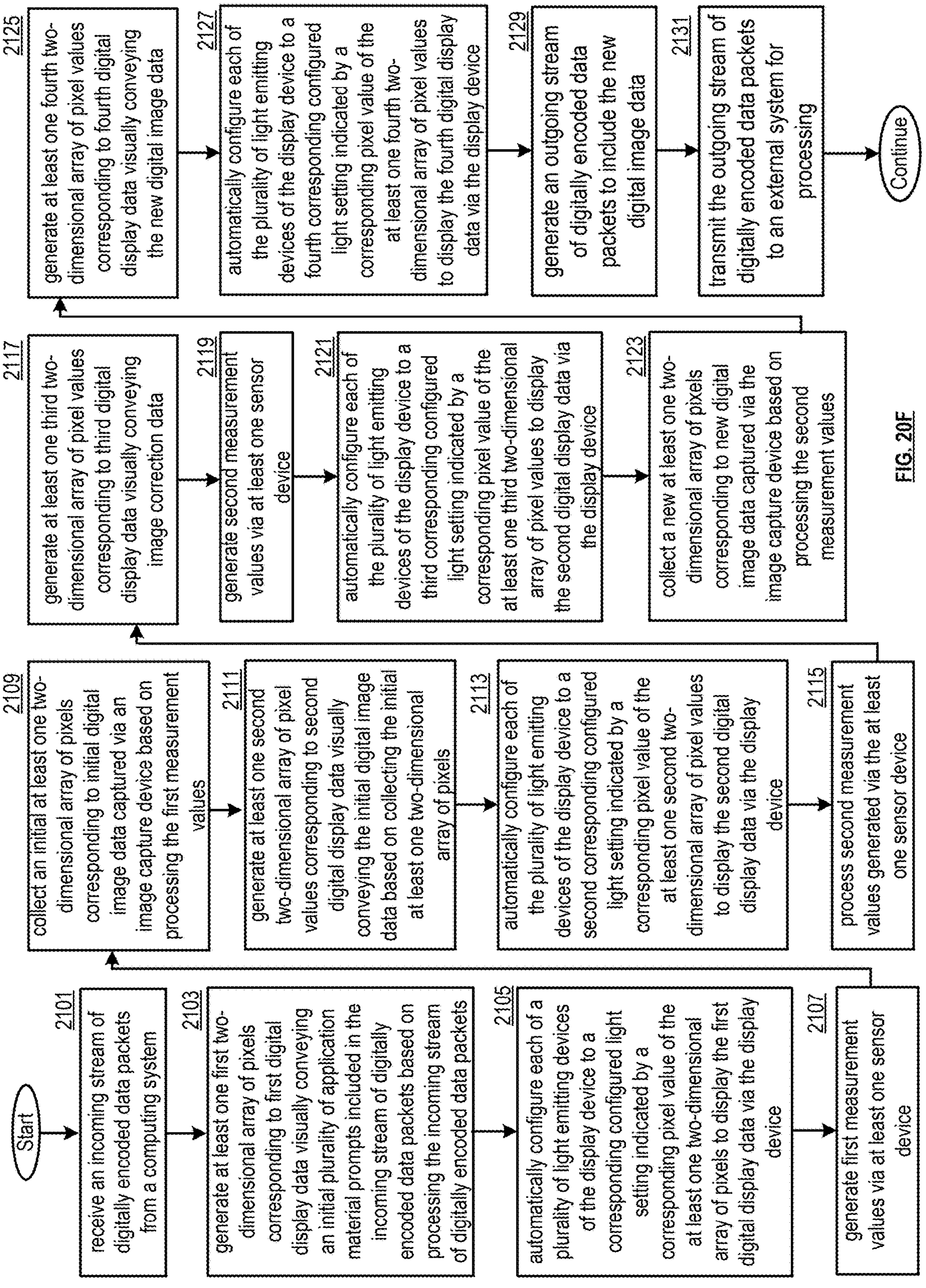

FIG. 20F illustrates a method for execution by at least one processor, such as at least one processor 22 of a computing device 13 and/or at least one processor of client processing module 320 of a client device 130. For example, at least one memory, such as at least one memory of memory module 230 and/or at least one memory 31, stores executable instructions that, when executed by the at least one processor, cause the computing device to execute some or all steps of FIG. 20F and/or to perform some or all of the functionality discussed in conjunction with any of the Figures described herein.

In some embodiments, a computing device 13 performs all steps of FIG. 20F. In other embodiments, computing device 13 performs some steps of FIG. 20F, while at least one computing system 10 communicating with computing device 13 performs some or all other steps of FIG. 20F.

Step 2101 includes receiving an incoming stream of digitally encoded data packets from a computing system.

Step 2103 includes generating at least one first two-dimensional array of pixels corresponding to first digital display data visually conveying an initial plurality of application material prompts included in the incoming stream of digitally encoded data packets based on processing the incoming stream of digitally encoded data packets.

Step 2105 includes automatically configuring each of a plurality of lighting devices of the display device to a corresponding configured light setting indicated by a corresponding pixel value of the at least one two-dimensional array of pixels to display the first digital display data via the display device.

Step 2107 includes generating first measurement values via at least one sensor device. In various examples, step 2107 is performed contemporaneously with displaying the first digital display data via the display device in performing some or all of step 2105.

Step 2109 includes collecting an initial at least one two-dimensional array of pixels corresponding to initial digital image data captured via an image capture device based on processing the first measurement values.

Step 2111 includes generating at least one second two-dimensional array of pixel values corresponding to second digital display data visually conveying the initial digital image data based on collecting the initial at least one two-dimensional array of pixels.

Step 2113 includes automatically configuring each of the plurality of lighting devices of the display device to a second corresponding configured light setting indicated by a corresponding pixel value of the at least one second two-dimensional array of pixel values to display the second digital display data via the display device.

Step 2115 includes processing second measurement values generated via the at least one sensor device. In various examples, image correction data is automatically generated based on processing the second measurement values via performance of an image data processing function upon the initial at least one two-dimensional array of pixels based on applying a computer vision model. In various examples, automatically generating the image correction data includes automatically detecting at least one subset of pixels of the initial at least one corresponding two-dimensional array of pixels failing to meet and/or otherwise comparing unfavorably to predetermined image requirement data based on execution of the image data processing function upon the initial at least one corresponding two-dimensional array of pixels of the initial digital image data Step 2117 includes generating at least one third two-dimensional array of pixel values corresponding to third digital display data visually conveying image correction data.

Step 2119 includes generating second measurement values via at least one sensor device.

Step 2121 includes automatically configuring each of the plurality of lighting devices of the display device to a third corresponding configured light setting indicated by a corresponding pixel value of the at least one third two-dimensional array of pixel values to display the second digital display data via the display device.

Step 2123 includes collecting a new at least one two-dimensional array of pixels corresponding to new digital image data captured via the image capture device based on processing the second measurement values.

Step 2125 includes generating at least one fourth two-dimensional array of pixel values corresponding to fourth digital display data visually conveying the new digital image data.

Step 2127 includes automatically configuring each of the plurality of lighting devices of the display device to a fourth corresponding configured light setting indicated by a corresponding pixel value of the at least one fourth two-dimensional array of pixel values to display the fourth digital display data via the display device.

Step 2129 includes generating an outgoing stream of digitally encoded data packets to include the new digital image data.

Step 2131 includes transmitting the outgoing stream of digitally encoded data packets to an external system for processing.

In various examples, generating the image correction data includes generating updated image data that includes an updated at least one corresponding two-dimensional array of pixels generated via automatically modifying the at least one corresponding two-dimensional array of pixels. In various examples, at least one third two-dimensional array of pixel values corresponding to third digital display data visually conveys the image correction data based on including the updated at least one corresponding two-dimensional array of pixels.

In various examples, modifying the first at least one corresponding two-dimensional array includes modifying a proper subset of pixels of the initial at least one corresponding two-dimensional array of pixels. In various examples, indexes of the proper subset of pixels of the initial at least one corresponding two-dimensional array of pixels are based on indexes of the at least one subset of pixels of the initial at least one corresponding two-dimensional array of pixels detected via executing the image data processing function.

In various examples, the proper subset of pixels of the initial at least one corresponding two-dimensional array of pixels and the at least one subset of pixels of the initial at least one corresponding two-dimensional array of pixels detected via executing the image data processing function have a non-null intersection.

In various examples, each of a plurality of indexes for a plurality of pixels included in the initial at least one corresponding two-dimensional array of pixels have a corresponding pair of numeric index values that includes an array row index value and an array column index value. In various examples, the proper subset of pixels of the initial at least one corresponding two-dimensional array of pixels have a first corresponding proper subset of indexes of the plurality of indexes. In various examples, the at least one subset of pixels of the initial at least one corresponding two-dimensional array of pixels detected via executing the image data processing function have a second corresponding proper subset of indexes of the plurality of indexes. In various examples, the updated at least one corresponding two-dimensional array of pixels is generated via modifying the proper subset of pixels of the initial at least one corresponding two-dimensional array of pixels based on configuring the first corresponding proper subset of indexes of the plurality of indexes, for example, based on: a first maximum array row index value across all array row index values included in the first corresponding proper subset of indexes being configured to be greater than a second maximum array row index value across all array row index values included in the second corresponding proper subset of indexes; a first minimum array row index value across all array column index values included in the first corresponding proper subset of indexes being configured to be less than a second minimum array row index value across all array row index values included in the second corresponding proper subset of indexes; a first maximum array column index value across all array column index values included in the first corresponding proper subset of indexes being configured to be greater than a second maximum array column index value across all array column index values included in the second corresponding proper subset of indexes; and/or a first minimum array column index value across all array column index values included in the first corresponding proper subset of indexes being configured to be greater than a second minimum array column index value across all array column index values included in the second corresponding proper subset of indexes.

In various examples, a set difference between the proper subset of pixels of the initial at least one corresponding two-dimensional array of pixels and the at least one subset of pixels of the initial at least one corresponding two-dimensional array of pixels detected via executing the image data processing function is non-null based on at least one pixel of the initial at least one corresponding two-dimensional array of pixels not being included in the proper subset of pixels of the initial at least one corresponding two-dimensional array of pixels.

In various examples, the initial at least one corresponding two-dimensional array of pixels includes a plurality of two-dimensional arrays of pixel values aligned via the first plurality of indexes. In various examples, the updated at least one corresponding two-dimensional array of pixels is generated via modifying the proper subset of pixels of the initial at least one corresponding two-dimensional array of pixels based on modifying, for each of the proper subset of pixels of the initial at least one corresponding two-dimensional array of pixels, corresponding pixel values in each of the plurality of two-dimensional arrays of pixel values.

In various examples, each of a plurality of indexes for a plurality of pixels included in the initial at least one corresponding two-dimensional array of pixels have a corresponding pair of numeric index values that includes an array row index value and an array column index value. In various examples, the at least one subset of pixels of the initial at least one corresponding two-dimensional array of pixels detected via executing the image data processing function have a corresponding proper subset of indexes of the plurality of indexes. In various examples, executing the image data processing function upon the initial at least one corresponding two-dimensional array of pixels includes generating at least one measurement value as a function of at least two of: a maximum array row index value across all array column index values included in the corresponding proper subset of indexes; a maximum array column index value across all array column index values included in the corresponding proper subset of indexes; a minimum array row index value across all array column index values included in the corresponding proper subset of indexes; and/or a maximum array column index value across all array column index values included in the corresponding proper subset of indexes.

In various examples, the image capture device is implemented via a camera. In various examples, the method further includes: activating the camera to capture the initial digital image data based on processing the first measurement values collected via the at least one sensor device; generating a first digitally encoded image file based on processing the initial digital image data; activating the camera to capture the new digital image data based on processing the second measurement values collected via the at least one sensor device; and/or generating a second digitally encoded image file based on processing the new digital image data. In various examples, the outgoing stream of digitally encoded data packets is generated to include the second digitally encoded image file.

In various examples, the initial digital image data and the new digital image data both visually depict a first physical document corresponding to a user of the computing device based on the image capture device being activated in physical proximity to the first physical document at a first time to capture the initial digital image data and further being activated in physical proximity to the first physical document at a second time after the first time to capture the new digital image data.

In various examples, the initial digital image data and the new digital image data visually depict at least one anatomical feature of a user of the computing device based on the image capture device being activated in physical proximity to the at least one anatomical feature of the user at a first time to capture the initial digital image data and further being physical proximity to the at least one anatomical feature of the user at a second time after the first time to capture the new digital image data.

In various examples, executing the image data processing function upon the initial at least one corresponding two-dimensional array of pixels includes performing a feature detection function configured to localize a set of features in the initial at least one corresponding two-dimensional array of pixels. In various examples, the at least one subset of pixels of the initial at least one corresponding two-dimensional array of pixels is identified as output of the feature detection function based on localizing the at least one feature of the set of features in the initial at least one corresponding two-dimensional array of pixels. In various examples, executing the image data processing function upon the initial at least one corresponding two-dimensional array of pixels further includes performing a feature characterization function based on further processing the at least one subset of pixels of the initial at least one corresponding two-dimensional array of pixels to generate a set of output values corresponding to the predetermined image requirement data. In various examples, detecting the at least one subset of pixels of the initial at least one corresponding two-dimensional array of pixels fails to meet and/or otherwise compares unfavorably to predetermined image requirement data is based on at least one value of the set of output values failing to meet (e.g. falling below, exceeding, and/or otherwise comparing unfavorably to) a corresponding predetermined output value threshold.

In various examples, executing the image data processing function upon the initial at least one corresponding two-dimensional array of pixels includes: generating a first input vector to include a first ordered set of values based on pixel values of the initial at least one corresponding two-dimensional array of pixels; processing the first input vector based on applying a plurality of configured weights to the first ordered set of values to the first ordered set of values to generate a first output vector; and/or automatically generating the image correction data based on processing the first output vector.

In various examples, the image correction data is generated based on: generating a first plurality of sub-tasks for processing the at least one two-dimensional array of pixels; and/or executing the first plurality of sub-tasks in parallel as a first plurality of parallelized processes.

In various examples, generating the outgoing stream of digitally encoded data packets includes: generating encrypted application data based on generating a first corresponding plurality of subkeys from a first corresponding initial key and, in each of a corresponding plurality of iterations, applying a corresponding one of the corresponding plurality of subkeys to generate a corresponding one of a corresponding plurality of encrypted application data versions. In various examples, a first corresponding one of the corresponding plurality of subkeys is applied to application data generated based on processing the new digital image data to generate first corresponding one of the corresponding plurality of encrypted application data versions in a first one of the corresponding plurality of iterations. In various examples, a final corresponding one of the corresponding plurality of subkeys is applied to a penultimate corresponding one of the corresponding plurality of encrypted application data versions to generate a final corresponding one of the corresponding plurality of encrypted application data versions. In various examples, the encrypted application data is generated from the final application data version after completing all of the corresponding plurality of iterations. In various examples, generating the outgoing stream of digitally encoded data packets includes processing the encrypted application data to generate the outgoing stream of digitally encoded data packets.

In various examples, the computing system includes the external system. In various examples, the method further includes: generating another outgoing stream of digitally encoded data packets to include the initial digital image data; and/or transmitting the another outgoing stream of digitally encoded data packets to the external system for processing; and/or receive another incoming stream of digitally encoded data packets from the external system. In various examples, the image correction data is extracted from the incoming stream of digitally encoded data packets based on processing the incoming stream of digitally encoded data packets.

In various examples, the executable instructions, when executed by the at least one processor, further cause the computing device to generate the image correction data via executing the image data processing function upon the initial at least one two-dimensional array of pixels.

In various examples, new image correction data is automatically generated via performance of the image data processing function upon the new at least one two-dimensional array of pixels based on applying a computer vision model. In various examples, automatically generating the image correction data includes automatically detecting none of the new at least one corresponding two-dimensional array of pixels fail to meet and/or compare unfavorably to predetermined image requirement data (e.g. all of the new at least one corresponding two-dimensional array of pixels compare favorably and/or otherwise meet the predetermined image requirement data) based on execution of the image data processing function upon the new at least one corresponding two-dimensional array of pixels of the initial digital image data.

In various embodiments, any one or more of the various examples listed above are implemented in conjunction with performing some or all steps of FIG. 20F. In various embodiments, any set of the various examples listed above can be implemented in tandem, for example, in conjunction with performing some or all steps of FIG. 20F, and/or in conjunction with performing some or all steps of any other method described herein.

In various embodiments, performing some or all steps of FIG. 20F is based on performing some or all steps of FIG. 13H and/or 13I and/or performing some or all functionality of FIGS. 13A-13G.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20F described above, for example, in conjunction with further implementing any one or more of the various examples described above.

In various embodiments, a computing device includes at least one processor and at least one memory that stores executable instructions. In various embodiments, the executable instructions, when executed by the at least one processor, cause the computing device to perform some or all steps of FIG. 20F, for example, in conjunction with further implementing any one or more of the various examples described above. In various examples, some or all of the executable instructions are stored by the at least one memory based on being included in corresponding machine executable instructions received from a computing system (e.g. at least some of the executable instructions executed by the computing device are included in corresponding machine executable instructions extracted from a stream of encoded data packets received from the computing system), where some or all steps of FIG. 20F are executed by the computing device based on being indicated in the corresponding machine executable instructions received from the computing system.

In various embodiments, the executable instructions, when executed by the at least one processor, cause the computing device to: receive an incoming stream of digitally encoded data packets from a computing system; generate at least one first two-dimensional array of pixel values corresponding to first digital display data based on processing the incoming stream of digitally encoded data packets; automatically configure each of a plurality of lighting devices of the display device to a first corresponding configured light setting indicated by a corresponding pixel value of the at least one first two-dimensional array of pixel values to display the first digital display data via the display device; contemporaneously with displaying the first digital display data via the display device, generate first measurement values via at least one sensor device; collect an initial at least one two-dimensional array of pixels corresponding to initial digital image data captured via an image capture device based on processing the first measurement values; generate at least one second two-dimensional array of pixel values corresponding to second digital display data visually conveying the initial digital image data based on collecting the initial at least one two-dimensional array of pixels; automatically control each of the plurality of lighting devices of the display device to a second corresponding configured light setting indicated by a corresponding pixel value of the at least one second two-dimensional array of pixel values to display the second digital display data via the display device; process second measurement values generated via the at least one sensor device, where image correction data is automatically generated based on processing the second measurement values via performance of an image data processing function upon the initial at least one two-dimensional array of pixels based on applying a computer vision model, where automatically generating the image correction data includes automatically detecting at least one subset of pixels of the initial at least one corresponding two-dimensional array of pixels fail to meet and/or otherwise compare unfavorably to predetermined image requirement data based on execution of the image data processing function upon the initial at least one corresponding two-dimensional array of pixels of the initial digital image data; generate at least one third two-dimensional array of pixel values corresponding to third digital display data visually conveying the image correction data; contemporaneously with displaying the third digital display data via the display device, generate second measurement values via at least one sensor device; automatically control each of the plurality of lighting devices of the display device to a third corresponding configured light setting indicated by a corresponding pixel value of the at least one third two-dimensional array of pixel values to display the second digital display data via the display device; collect a new at least one two-dimensional array of pixels corresponding to new digital image data captured via the image capture device based on processing the second measurement values; generate at least one fourth two-dimensional array of pixel values corresponding to fourth digital display data visually conveying the new digital image data based on collecting the new at least one two-dimensional array of pixels; automatically control each of the plurality of lighting devices of the display device to a fourth corresponding configured light setting indicated by a corresponding pixel value of the at least one fourth two-dimensional array of pixel values to display the fourth digital display data via the display device; generate an outgoing stream of digitally encoded data packets to include the new digital image data; and/or transmit the outgoing stream of digitally encoded data packets to an external system for processing.

Figure 20G:
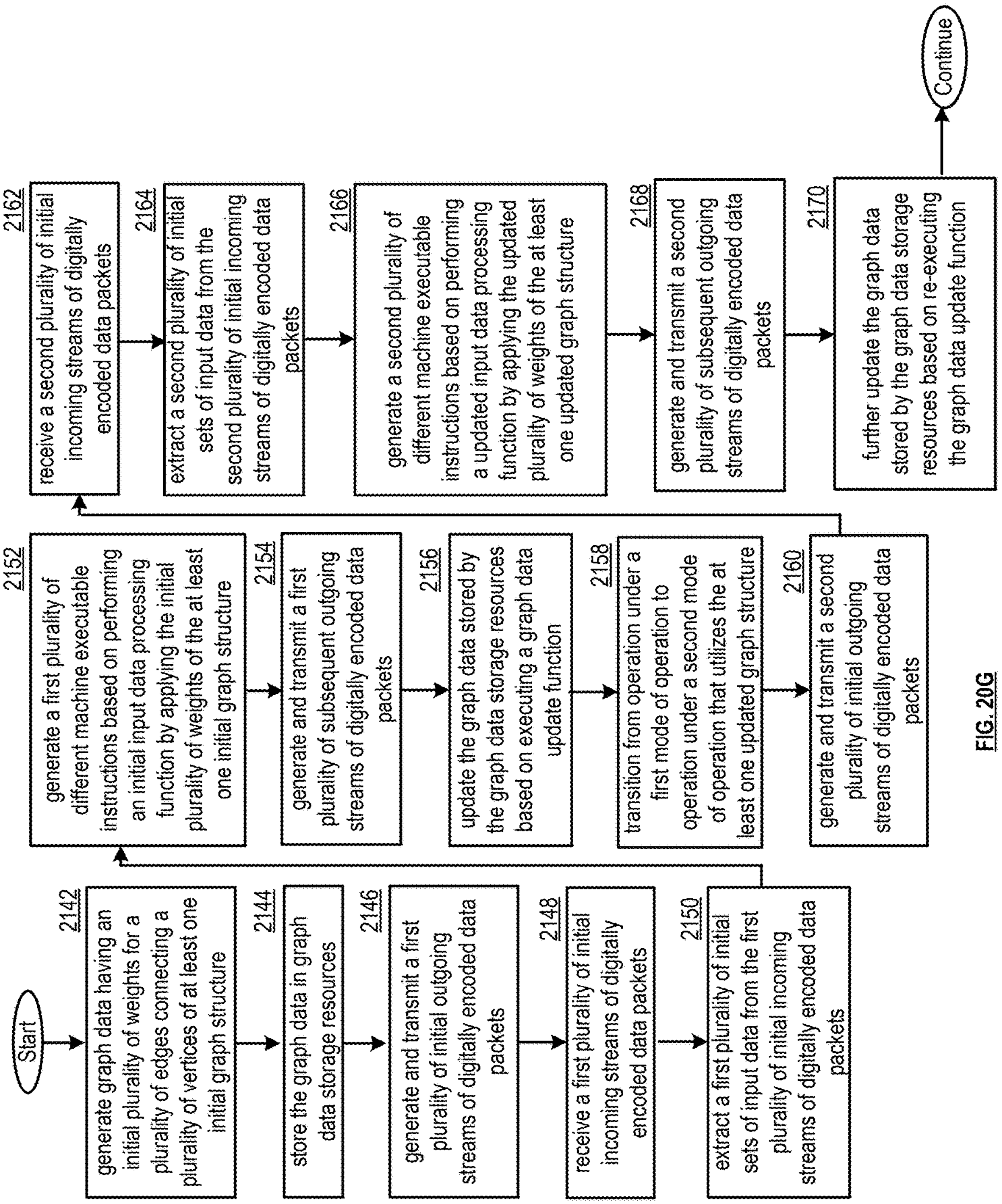

FIG. 20G illustrates a method for execution by at least one processor, such as at least one processor 22 of a computing system 10 and/or at least one processor of processing module 220 of an immigration assistance system 100. For example, at least one memory, such as at least one memory of memory module 210 and/or at least one memory 21, stores executable instructions that, when executed by the at least one processor, cause the computing system to execute some or all steps of FIG. 20G and/or to perform some or all of the functionality discussed in conjunction with any of the Figures described herein.

In some embodiments, a computing system 10 performs all steps of FIG. 20F. In other embodiments, computing system 10 performs some steps of FIG. 20G, while at least one computing device 13 communicating with computing system 10 performs some or all other steps of FIG. 20G.

Step 2142 includes generating graph data having an initial plurality of weights for a plurality of edges connecting a plurality of vertices of at least one initial graph structure.

Step 2144 includes storing the graph data in graph data storage resources.

Step 2146 includes generating and/or transmitting a first plurality of initial outgoing streams of digitally encoded data packets. In various examples, each initial outgoing stream of digitally encoded data packets of the first plurality of initial outgoing streams of digitally encoded data packets indicates corresponding machine executable instructions. In various examples, the first plurality of initial outgoing streams of digitally encoded data packets are transmitted to a first plurality of client devices. In various examples, a first initial outgoing stream of digitally encoded data packets of the first plurality of initial outgoing streams of digitally encoded data packets is transmitted to a first client device of the first plurality of client devices associated with a first user contemporaneously with transmission of a second initial outgoing stream of digitally encoded data packets of the first plurality of initial outgoing streams of digitally encoded data packets to a second client device of the first plurality of client devices associated with a second user.

Step 2148 includes receiving a first plurality of initial incoming streams of digitally encoded data packets. In various examples, the first plurality of initial incoming streams of digitally encoded data packets are received from the first plurality of client devices in response to the first plurality of initial outgoing streams of digitally encoded data packets. In various examples, a first initial incoming stream of digitally encoded data packets of the first plurality of initial incoming streams of digitally encoded data packets is received from the first client device based on the first client device automatically generating the first initial incoming stream of digitally encoded data packets via encoding a first initial set of input data automatically generated based on processing first measurement values collected via at least one sensor device of the first client device contemporaneously with displaying first digital display data via a display device of the first client device in response to the first client device automatically extracting the corresponding machine executable instructions from the first initial outgoing stream of digitally encoded data packets to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels. In various examples, a second initial incoming stream of digitally encoded data packets of the first plurality of initial incoming streams of digitally encoded data packets is received from the second client device based on the second client device processing the second initial outgoing stream of digitally encoded data packets.

Step 2150 includes extracting a first plurality of initial sets of input data from the first plurality of initial incoming streams of digitally encoded data packets. In various examples, the first plurality of initial sets of input data are extracted from the first plurality of initial incoming streams of digitally encoded data packets based on processing the first plurality of initial incoming streams of digitally encoded data packets. In various examples, a first initial set of input data of the first plurality of initial sets of input data is extracted from the first initial incoming stream of digitally encoded data packets via decoding the first initial incoming stream of digitally encoded data packets. In various examples, a second initial set of input data of the first plurality of initial sets of input data is extracted from the second initial incoming stream of digitally encoded data packets via decoding the second initial incoming stream of digitally encoded data packets.

Step 2152 includes generating a first plurality of different machine executable instructions based on performing an initial input data processing function by applying the initial plurality of weights of the at least one initial graph structure, for example, via accessing the graph data in the graph data storage resources. In various examples, first machine executable instructions of the first plurality of different machine executable instructions are generated based on executing the initial input data processing function upon the first initial set of input data based on applying the at least one initial graph structure of the graph data to the first initial set of input data. In various examples, second machine executable instructions of the first plurality of different machine executable instructions are generated based on executing the initial input data processing function upon the second initial set of input data based on applying the at least one initial graph structure of the graph data to the second initial set of input data.

Step 2154 includes generating and/or transmitting a first plurality of subsequent outgoing streams of digitally encoded data packets. In various examples, a first subsequent outgoing stream of digitally encoded data packets of the first plurality of subsequent outgoing streams of digitally encoded data packets is generated to include the first machine executable instructions, and/or a second subsequent outgoing stream of digitally encoded data packets of the first plurality of subsequent outgoing streams of digitally encoded data packets is generated to include the second machine executable instructions. In various examples, the first plurality of subsequent outgoing streams of digitally encoded data packets are transmitted to the first plurality of client devices. In various examples, the first subsequent outgoing stream of digitally encoded data packets of the first plurality of subsequent outgoing streams of digitally encoded data packets is transmitted to the first client device. In various examples, the first client device executes the first machine executable instructions based on extracting the first machine executable instructions from the first subsequent outgoing stream of digitally encoded data packets. In various examples, the second subsequent outgoing stream of digitally encoded data packets of the first plurality of subsequent outgoing streams of digitally encoded data packets is transmitted to the second client device. In various examples, the second client device executes the second machine executable instructions based on extracting the second machine executable instructions from the second subsequent outgoing stream of digitally encoded data packets.

Step 2156 includes updating the graph data stored by the graph data storage resources based on executing a graph data update function, for example, by processing the first plurality of initial sets of input data to generate an updated at least one graph structure replacing the initial at least one graph structure based on generating an updated plurality of weights to replace the initial plurality of weights.

Step 2158 includes transitioning from operation under a first mode of operation to operation under a second mode of operation that utilizes the at least one updated graph structure, for example, in response to updating of the graph data. In various examples, steps 2146, 2148, 2150, 2152, and/or 2154 are performed during a first temporal period corresponding to operation of the computing system under a first mode of operation that utilizes the at least one initial graph structure. In various examples, steps 2160, 2162, 2164, 2166, and/or 2168 are performed during a second temporal period corresponding to operation of the computing system under the second mode of operation that utilizes the at least one updated graph structure, for example based on transitioning from the operation under the first mode of operation to operation under the second mode of operation in step 2158.

Step 2160 includes generating and/or transmitting a second plurality of initial outgoing streams of digitally encoded data packets. In various examples, the second plurality of initial outgoing streams of digitally encoded data packets are transmitted to a second plurality of client devices. In various examples, a third initial outgoing stream of digitally encoded data packets of the second plurality of initial outgoing streams of digitally encoded data packets is transmitted to a third client device of the second plurality of client devices associated with a third user contemporaneously with transmission of a fourth initial outgoing stream of digitally encoded data packets of the second plurality of initial outgoing streams of digitally encoded data packets to a fourth client device of the second plurality of client devices associated with a fourth user.

Step 2162 includes receiving a second plurality of initial incoming streams of digitally encoded data packets, for example, in response to the second plurality of initial outgoing streams of digitally encoded data packets. In various examples, a third initial incoming stream of digitally encoded data packets of the second plurality of initial incoming streams of digitally encoded data packets is received from the third client device based on the third client device processing the third initial outgoing stream of digitally encoded data packets. In various examples, a fourth initial incoming stream of digitally encoded data packets of the second plurality of initial incoming streams of digitally encoded data packets is received from the fourth client device based on the fourth client device processing the fourth initial outgoing stream of digitally encoded data packets.

Step 2164 includes extracting a second plurality of initial sets of input data from the second plurality of initial incoming streams of digitally encoded data packets, for example, based on processing the second plurality of initial incoming streams of digitally encoded data packets. In various examples, a third initial set of input data of the first plurality of initial sets of input data is extracted from the third initial incoming stream of digitally encoded data packets via decoding the third initial incoming stream of digitally encoded data packets. In various examples, a fourth initial set of input data of the first plurality of initial sets of input data is extracted from the fourth initial incoming stream of digitally encoded data packets via decoding the fourth initial incoming stream of digitally encoded data packets.

Step 2166 includes generating a second plurality of different machine executable instructions based on performing an updated input data processing function by applying the updated plurality of weights of the at least one updated graph structure, for example, via accessing the graph data in the graph data storage resources. In various examples, third machine executable instructions of the second plurality of different machine executable instructions are generated based on executing the updated input data processing function upon the third initial set of input data based on applying the at least one updated graph structure of the graph data to the third initial set of input data. In various examples, fourth machine executable instructions of the second plurality of different machine executable instructions are generated based on executing the updated input data processing function upon the fourth initial set of input data based on applying the at least one updated graph structure of the graph data to the fourth initial set of input data.

Step 2168 includes generating and transmitting a second plurality of subsequent outgoing streams of digitally encoded data packets. In various examples, a third subsequent outgoing stream of digitally encoded data packets of the second plurality of subsequent outgoing streams of digitally encoded data packets is generated to include the third machine executable instructions, and/or a fourth subsequent outgoing stream of digitally encoded data packets of the second plurality of subsequent outgoing streams of digitally encoded data packets is generated to include the fourth machine executable instructions. In various examples, the second plurality of subsequent outgoing streams of digitally encoded data packets is transmitted to the second plurality of client devices. In various examples, the third subsequent outgoing stream of digitally encoded data packets of the second plurality of subsequent outgoing streams of digitally encoded data packets is transmitted to the third client device. In various examples, the third client device executes the third machine executable instructions based on extracting the third machine executable instructions from the third subsequent outgoing stream of digitally encoded data packets. In various examples, the fourth subsequent outgoing stream of digitally encoded data packets of the second plurality of subsequent outgoing streams of digitally encoded data packets is transmitted to the fourth client device. In various examples, the fourth client device executes the fourth machine executable instructions based on extracting the fourth machine executable instructions from the fourth subsequent outgoing stream of digitally encoded data packets.

Step 2170 includes further updating the graph data stored by the graph data storage resources based on re-executing the graph data update function, for example, by processing the second plurality of initial sets of input data to generate a further updated at least one graph structure replacing the updated at least one graph structure based on generating a further updated plurality of weights to replace the updated plurality of weights.

In various examples, the first plurality of initial sets of input data includes a plurality of sets of immigration application data and/or a corresponding plurality of application acceptance data. In various examples, the first plurality of initial sets of input data is processed to generate a plurality of sets of immigration application data for processing in updating the graph data.

In various examples, the method further includes generating a first plurality of encrypted user data for a first plurality of users that includes the first user and the second user based on encrypting at least some of the first plurality of initial sets of input data, for example, during the first temporal period corresponding to operation of the computing system under the first mode of operation that utilizes the at least one initial graph structure. In various examples, each encrypted user data of the first plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions. In various examples, the each encrypted user data is generated from a final encrypted user data version of the corresponding plurality of encrypted user data versions generated after completing all of the first corresponding plurality of iterations. In various examples, first encrypted user data is generated for the first user based on encrypting at least some of the first initial set of input data. In various examples, second encrypted user data is generated for the second user based on encrypting at least some of the second initial set of input data.

In various examples, the method further includes storing each of the first plurality of encrypted user data via a plurality of different storage locations across a plurality of different storage devices located in a plurality of different geographic locations, for example, during the first temporal period corresponding to operation of the computing system under the first mode of operation that utilizes the at least one initial graph structure. In various examples, the first encrypted user data is stored via a first set of storage locations of the plurality of different storage locations, and/or the second encrypted user data is stored via a second set of storage locations of the plurality of different storage locations different from the first set of storage locations.

In various examples, the method further includes generating a second plurality of encrypted user data for a second plurality of users that includes the third user and the fourth user based on encrypting at least some of the second plurality of initial sets of input data, for example, during the second temporal period corresponding to operation of the computing system under the second mode of operation that utilizes the at least one updated graph structure. In various examples, third encrypted user data is generated for the third user based on encrypting at least some of the first initial set of input data. In various examples, fourth encrypted user data is generated for the second user based on encrypting at least some of the second initial set of input data.

In various examples, the method further includes storing each of the second plurality of encrypted user data via the plurality of different storage locations across the plurality of different storage devices located in the plurality of different geographic locations, for example, during the second temporal period corresponding to operation of the computing system under the second mode of operation that utilizes the at least one updated graph structure. In various examples, the third encrypted user data is stored via a third set of storage locations of the plurality of different storage locations. In various examples, the fourth encrypted user data is stored via a fourth set of storage locations of the plurality of different storage locations different from the third set of storage locations.

In various examples, generating the first machine executable instructions includes: generating a first ordered set of input values based on processing the first set of input data. In various examples, the first subsequent outgoing stream of digitally encoded data packets and/or generating a first set of output values as output of executing the initial input data processing function upon the first ordered set of input values based on applying the initial plurality of weights of the at least one initial graph structure of the graph data to the first ordered set of input values. In various examples, generating the second machine executable instructions includes: generating a second ordered set of input values based on processing the second set of input data and/or generating a second ordered set of output values as output of executing the initial input data processing function upon the second ordered set of input values based on applying the initial plurality of weights of the at least one initial graph structure of the graph data to the second ordered set of input values. In various examples, generating the third machine executable instructions includes: generating a third ordered set of input values based on processing the third set of input data and/or generating a third ordered set of output values as output of executing the updated input data processing function upon the third ordered set of input values based on applying the updated plurality of weights of the at least one updated graph structure of the graph data to the third ordered set of input values. In various examples, generating the fourth machine executable instructions includes: generating a fourth ordered set of input values based on processing the fourth set of input data; and/or generating a fourth ordered set of output values as output of executing the updated input data processing function upon the fourth ordered set of input values based on applying the updated plurality of weights of the at least one updated graph structure of the graph data to the fourth ordered set of input values.

In various examples, the first machine executable instructions are generated based on: generating a first plurality of sub-tasks for generating the first ordered set of output values; executing the first plurality of sub-tasks in parallel as a first plurality of parallelized processes to generate the first ordered set of output values; and/or generating the first machine executable instructions based on processing the first ordered set of output values. In various examples, the second machine executable instructions are generated based on: generating a second plurality of sub-tasks for generating the second ordered set of output values; executing the second plurality of sub-tasks in parallel as a second plurality of parallelized processes to generate the second ordered set of output values; and/or generating the second machine executable instructions based on processing the second ordered set of output values. In various examples, the third machine executable instructions are generated based on: generating a third plurality of sub-tasks for generating the third ordered set of output values; executing the third plurality of sub-tasks in parallel as a third plurality of parallelized processes to generate the third ordered set of output values; and/or generating the third machine executable instructions based on processing the third ordered set of output values. In various examples, the fourth machine executable instructions are generated based on: generating a fourth plurality of sub-tasks for generating the fourth ordered set of output values; executing the fourth plurality of sub-tasks in parallel as a fourth plurality of parallelized processes to generate the fourth ordered set of output values; and/or generating the fourth machine executable instructions based on processing the fourth ordered set of output values.

In various examples, the method further includes: extracting a first set of digitally encoded document files from the first initial incoming stream of digitally encoded data packets based on the first initial set of input data including the first set of digitally encoded document files; extract the first ordered set of input values from the first set of digitally encoded document files based on processing the first set of digitally encoded document files; extract a second set of digitally encoded document files from the second initial incoming stream of digitally encoded data packets based on the second initial set of input data including the second set of digitally encoded document files; extracting the second ordered set of input values from the second set of digitally encoded document files based on processing the second set of digitally encoded document files; extract a third set of digitally encoded document files from the third initial incoming stream of digitally encoded data packets based on the third initial set of input data including the third set of digitally encoded document files; extracting the third ordered set of input values from the third set of digitally encoded document files based on processing the third set of digitally encoded document files; and/or extracting a fourth set of digitally encoded document files from the fourth initial incoming stream of digitally encoded data packets based on the fourth initial set of input data including the fourth set of digitally encoded document files; and/or extract the fourth ordered set of input values from the fourth set of digitally encoded document files based on processing the fourth set of digitally encoded document files.

In various examples, the first set of digitally encoded document files includes a first at least one digitally encoded image file having first image data. In various examples, the first ordered set of input values is extracted from the first set of digitally encoded document files to include a first plurality of pixels of a first at least one two-dimensional array of pixels of the first image data. In various examples, the second set of digitally encoded document files includes a second at least one digitally encoded image file having second image data. In various examples, the second ordered set of input values is extracted from the second set of digitally encoded document files to include a second plurality of pixels of a second at least one two-dimensional array of pixels of the second image data. In various examples, the third set of digitally encoded document files includes a third at least one digitally encoded image file having third image data. In various examples, the third ordered set of input values is extracted from the third set of digitally encoded document files to include a third plurality of pixels of a third at least one two-dimensional array of pixels of the third image data. In various examples, the fourth set of digitally encoded document files includes a fourth at least one digitally encoded image file having fourth image data. In various examples, the fourth ordered set of input values is extracted from the fourth set of digitally encoded document files to include a fourth plurality of pixels of a fourth at least one two-dimensional array of pixels of the fourth image data.

In various examples, the initial input data processing function is operable to apply initial predetermined image requirement data to image data of digital encoded image files in accordance with operating in the first mode of operation based on applying the initial plurality of weights of the initial at least one graph structure. In various examples, the initial input data processing function is operable to apply updated predetermined image requirement data to image data of digital encoded image files in accordance with operating in the second mode of operation based on applying the updated plurality of weights of the updated at least one graph structure. In various examples, the updated predetermined image requirement data is different from the initial predetermined image requirement data based on the updated plurality of weights of the updated at least one graph structure being different from the initial plurality of weights of the initial at least one graph structure.

In various examples, the method further includes, for example, during the first temporal period corresponding to operation of the computing system under the first mode of operation that utilizes the at least one initial graph structure: generating a first at least one digitally encoded document file based on processing the first set of output values in accordance with the first mode of operation, In various examples, the first subsequent outgoing stream of digitally encoded data packets is generated to further include the first at least one digitally encoded document file. In various examples, execution of the first machine executable instructions includes processing the first at least one digitally encoded document file. In various examples, the method further includes, for example, during the first temporal period corresponding to operation of the computing system under the first mode of operation that utilizes the at least one initial graph structure: generating a second at least one digitally encoded document file based on processing the second set of output values in accordance with the first mode of operation. In various examples, the second subsequent outgoing stream of digitally encoded data packets is generated to further include the second at least one digitally encoded document file. In various examples, execution of the second machine executable instructions includes processing the second at least one digitally encoded document file.

In various examples, the method further includes, for example, during the second temporal period corresponding to operation of the computing system under the second mode of operation that utilizes the at least one updated graph structure: generating a third at least one digitally encoded document file based on processing the third set of output values in accordance with the second mode of operation. In various examples, the third subsequent outgoing stream of digitally encoded data packets is generated to further include the third at least one digitally encoded document file. In various examples, execution of the third machine executable instructions includes processing the third at least one digitally encoded document file. In various examples, the method further includes, for example, during the second temporal period corresponding to operation of the computing system under the second mode of operation that utilizes the at least one updated graph structure: generating a fourth at least one digitally encoded document file based on processing the fourth set of output values in accordance with the second mode of operation. In various examples, the fourth subsequent outgoing stream of digitally encoded data packets is generated to further include the fourth at least one digitally encoded document file. In various examples, execution of the fourth machine executable instructions includes processing the fourth at least one digitally encoded document file.

In various examples, the first set of output values includes a first plurality of text values of first automatically generated textual data. In various examples, execution of the first machine executable instructions includes processing the first automatically generated textual data. In various examples, the second set of output values includes a second plurality of text values of second automatically generated textual data. In various examples, execution of the second machine executable instructions includes processing the second automatically generated textual data. In various examples, the third set of output values includes a third plurality of text values of third automatically generated textual data. In various examples, execution of the third machine executable instructions includes processing the third automatically generated textual data. In various examples, the fourth set of output values includes a fourth plurality of text values of fourth automatically generated textual data. In various examples, execution of the fourth machine executable instructions includes processing the fourth automatically generated textual data.

In various examples, the first set of output values includes a first plurality of pixels of a first at least one two-dimensional array of pixels of first automatically generated image data. In various examples, execution of the first machine executable instructions includes processing the first automatically generated image data. In various examples, the second set of output values includes a second plurality of pixels of a second at least one two-dimensional array of pixels of second automatically generated image data. In various examples, execution of the second machine executable instructions includes processing the second automatically generated image data. In various examples, the third set of output values includes a third plurality of pixels of a third at least one two-dimensional array of pixels of third automatically generated image data. In various examples, execution of the third machine executable instructions includes processing the third automatically generated image data. In various examples, the fourth set of output values includes a fourth plurality of pixels of a fourth at least one two-dimensional array of pixels of fourth automatically generated image data. In various examples, execution of the fourth machine executable instructions includes processing the fourth automatically generated image data.

In various examples, the first ordered set of input values and the second set of input values correspond to sets of input values for an initial input set of output fields. In various examples, the first ordered set of output values and the second set of output values correspond to sets of output values for an initial ordered set of output fields. In various examples, the third ordered set of input values and the fourth set of input values correspond to sets of input values for an updated input set of output fields. In various examples, the third ordered set of output values and the fourth set of output values correspond to sets of output values for an updated ordered set of output fields. In various examples, the updated set of input fields is different from the initial set of input fields based on the at least one updated graph structure being different from the at least one initial graph structure. In various examples, the updated set of output fields is different from the initial set of output fields based on the at least one updated graph structure being different from the at least one initial graph structure.

In various examples, the first initial set of input data and the third initial set of input data have a null set difference due to both having a same set of input data. In various examples, the first machine executable instructions are different from the third machine executable instructions despite the first initial set of input data and the third initial set of input data both having the same set of input data based on the initial input data processing function processing the same set of input data during the first temporal period differently from processing of the same set of input data by the updated input data processing function during the second temporal period set of input data as a result of the updated plurality of weights of the updated at least one graph structure being different from the initial plurality of weights of the initial at least one graph structure.

In various examples, the first initial set of input data and the second initial set of input data also have a null set difference due to the second initial set of input also having the same set of input data. In various examples, the first machine executable instructions are identical to the second machine executable instructions in response to the first initial set of input data and the second initial set of input data both having the same set of input data and further in response to the initial input data processing function processing the first initial set of input data during the first temporal period identically to processing of the second initial set of input data by the initial input data processing function during the first temporal period set of input data as a result both instances of executing the initial input data processing function upon the same set of input data applying the initial plurality of weights of the initial at least one graph structure in accordance with the first mode of operation.

In various examples, the method further includes, for example, during the first temporal period corresponding to operation of the computing system under the first mode of operation that utilizes the at least one initial graph structure: receiving a first plurality of subsequent incoming streams of digitally encoded data packets from the first plurality of client devices in response to the first plurality of subsequent outgoing streams of digitally encoded data packets. In various examples, a first subsequent incoming stream of digitally encoded data packets of the first plurality of subsequent incoming streams of digitally encoded data packets is received from the first client device based on the first client device automatically generating the first subsequent incoming stream of digitally encoded data packets via encoding a first subsequent set of input data automatically generated based on processing additional measurement values collected via the at least one sensor device of the first client device contemporaneously with displaying additional digital display data via the display device of the first client device in response to the first client device automatically extracting the first machine executable instructions from the first subsequent outgoing stream of digitally encoded data packets to automatically generate another at least one two-dimensional array of pixels corresponding to the additional digital display data and displaying the additional digital display data via the display device of the first client device based on automatically configuring each of the plurality of lighting devices of the display device to a corresponding configured light setting indicated by a corresponding pixel value of the another at least one two-dimensional array of pixels. In various examples, a second subsequent incoming stream of digitally encoded data packets of the first plurality of subsequent incoming streams of digitally encoded data packets is received from the second client device based on the second client device processing the second subsequent outgoing stream of digitally encoded data packets.

In various examples, the method further includes, for example, during the first temporal period corresponding to operation of the computing system under the first mode of operation that utilizes the at least one initial graph structure: extracting a first plurality of subsequent sets of input data from the first plurality of subsequent incoming data streams of digitally encoded data packets based on processing the first plurality of subsequent incoming streams of digitally encoded data packets. In various examples, a first subsequent set of input data of the first plurality of subsequent sets of input data is extracted from the first subsequent incoming stream of digitally encoded data packets via decoding the first subsequent incoming stream of digitally encoded data packets. In various examples, a second subsequent set of input data of the first plurality of subsequent sets of input data is extracted from the second subsequent incoming stream of digitally encoded data packets via decoding the second subsequent incoming stream of digitally encoded data packets.

In various examples, the method further includes, for example, during the first temporal period corresponding to operation of the computing system under the first mode of operation that utilizes the at least one initial graph structure: generating a first plurality of additional encrypted user data for the first plurality of users based on encrypting at least some of the first plurality of subsequent sets of input data. In various examples, first additional encrypted user data is generated for the first user based on encrypting at least some of the first subsequent set of input data, and/or second additional encrypted user data is generated for the second user based on encrypting at least some of the second subsequent set of input data.

In various examples, the method further includes, for example, during the first temporal period corresponding to operation of the computing system under the first mode of operation that utilizes the at least one initial graph structure:

storing each of the first plurality of additional encrypted user data via another plurality of different storage locations across the plurality of different storage devices located in the plurality of different geographic locations. In various examples, the first encrypted user data is stored via another first set of storage locations of the plurality of different storage locations. In various examples, the second encrypted user data is stored via another second set of storage locations of the plurality of different storage locations different from the another first set of storage locations.

In various examples, the method further includes, for example, during the second temporal period corresponding to operation of the computing system under the second mode of operation that utilizes the at least one updated graph structure: receiving a second plurality of subsequent incoming streams of digitally encoded data packets from the first plurality of client devices in response to the second plurality of subsequent outgoing streams of digitally encoded data packets. In various examples, a third subsequent incoming stream of digitally encoded data packets of the second plurality of subsequent incoming streams of digitally encoded data packets is received from the third client device based on the third client device processing the third subsequent outgoing stream of digitally encoded data packets. In various examples, a fourth subsequent incoming stream of digitally encoded data packets of the second plurality of subsequent incoming streams of digitally encoded data packets is received from the fourth client device based on the fourth client device processing the fourth subsequent outgoing stream of digitally encoded data packets.

In various examples, the method further includes, for example, during the second temporal period corresponding to operation of the computing system under the second mode of operation that utilizes the at least one updated graph structure: extracting a second plurality of subsequent sets of input data from the second plurality of subsequent incoming data streams of digitally encoded data packets based on processing the second plurality of subsequent incoming streams of digitally encoded data packets. In various examples, a third subsequent set of input data of the second plurality of subsequent sets of input data is extracted from the second subsequent incoming stream of digitally encoded data packets via decoding the third subsequent incoming stream of digitally encoded data packets. In various examples, a fourth subsequent set of input data of the second plurality of subsequent sets of input data is extracted from the fourth subsequent incoming stream of digitally encoded data packets via decoding the fourth subsequent incoming stream of digitally encoded data packets.

In various examples, the method further includes, for example, during the second temporal period corresponding to operation of the computing system under the second mode of operation that utilizes the at least one updated graph structure: generating a second plurality of additional encrypted user data for the second plurality of users based on encrypting at least some of the second plurality of subsequent sets of input data. In various examples, third additional encrypted user data is generated for the third user based on encrypting at least some of the third subsequent set of input data. In various examples, fourth additional encrypted user data is generated for the fourth user based on encrypting at least some of the fourth subsequent set of input data.

In various examples, the method further includes, for example, during the second temporal period corresponding to operation of the computing system under the second mode of operation that utilizes the at least one updated graph structure: storing each of the second plurality of additional encrypted user data via another plurality of different storage locations across the plurality of different storage devices located in the plurality of different geographic locations. In various examples, the third encrypted user data is stored via another third set of storage locations of the plurality of different storage locations. In various examples, the fourth encrypted user data is stored via another fourth set of storage locations of the plurality of different storage locations different from the another third set of storage locations.

In various examples, the first machine executable instructions are generated based on automatically identifying a first set of required application materials for the first user as a first corresponding proper subset of a plurality of possible application materials based on processing first output of executing the initial input data processing function upon the first initial set of input data. In various examples, the second machine executable instructions are generated based on automatically identifying a second set of required application materials for the second user as a second corresponding proper subset of the plurality of possible application materials based on processing second output of executing the initial input data processing function upon the second initial set of input data. In various examples, the third machine executable instructions are generated based on automatically identifying a third set of required application materials for the third user as a third corresponding proper subset of the plurality of possible application materials based on processing third output of executing the updated input data processing function upon the third initial set of input data. In various examples, the fourth machine executable instructions are generated based on automatically identifying a fourth set of required application materials for the fourth user as a fourth corresponding proper subset of the plurality of possible application materials based on processing fourth output of executing the updated input data processing function upon the fourth initial set of input data.

In various examples, the first corresponding proper subset of the plurality of possible application materials and the second corresponding proper subset of the plurality of possible application materials have a non-null set difference based on the first initial set of input data and the second initial set of input data having a non-null set difference. In various examples, the third corresponding proper subset of the plurality of possible application materials and the fourth corresponding proper subset of the plurality of possible application materials have a non-null set difference based on the third initial set of input data and the fourth initial set of input data having a non-null set difference. In various examples, the first corresponding proper subset of the plurality of possible application materials and the third corresponding proper subset of the plurality of possible application materials have a non-null set difference despite the first initial set of input data and the third initial set of input data both having the same set of input data based on the initial input data processing function processing the same set of input data during the first temporal period differently from processing of the same set of input data by the updated input data processing function during the second temporal period set of input data as a result of the updated plurality of weights of the updated at least one graph structure being different from the initial plurality of weights of the initial at least one graph structure.

In various examples, the first machine executable instructions are generated based on automatically selecting a first set of prompts for the first user as a first corresponding proper subset of a plurality of prompts based on processing first output of executing the initial input data processing function upon the first initial set of input data. In various examples, the second machine executable instructions are generated based on automatically identifying a second set of prompts for the second user as a second corresponding proper subset of the plurality of possible prompts based on processing second output of executing the initial input data processing function upon the second initial set of input data. In various examples, the third machine executable instructions are generated based on automatically identifying a third set of prompts for the third user as a third corresponding proper subset of the plurality of possible prompts based on processing third output of executing the updated input data processing function upon the third initial set of input data. In various examples, the fourth machine executable instructions are generated based on automatically identifying a fourth set of prompts for the fourth user as a fourth corresponding proper subset of the plurality of possible prompts based on processing fourth output of executing the updated input data processing function upon the fourth initial set of input data.

In various examples, the first corresponding proper subset of the plurality of possible prompts and the second corresponding proper subset of the plurality of possible prompts have a non-null set difference based on the first initial set of input data and the second initial set of input data having a non-null set difference. In various examples, the third corresponding proper subset of the plurality of possible prompts and the fourth corresponding proper subset of the plurality of possible prompts have a non-null set difference based on the third initial set of input data and the fourth initial set of input data having a non-null set difference. In various examples, the first corresponding proper subset of the plurality of possible prompts and the third corresponding proper subset of the plurality of possible prompts have a non-null set difference despite the first initial set of input data and the third initial set of input data both having the same set of input data based on the initial input data processing function processing the same set of input data during the first temporal period differently from processing of the same set of input data by the updated input data processing function during the second temporal period set of input data as a result of the updated plurality of weights of the updated at least one graph structure being different from the initial plurality of weights of the initial at least one graph structure.

In various examples, generating the first machine executable instructions is further based on: generating a first input vector to include a first ordered set of values extracted from the first set of input data corresponding to an initial ordered set of fields; and/or processing the first input vector based on applying the initial plurality of weights to the first ordered set of values to generate a first plurality of sequentially selected output portions of first automatically generated output over a first plurality of iterative steps via updating first state data over the first plurality of iterative steps as a function of first prior state data based on generating first subsequent intermediate output in a first subsequent step of the first plurality of iterative steps via applying at least one of the initial plurality of weights to first prior intermediate output generated in a first prior step of the first plurality of iterative steps via applying the at least one of the initial plurality of weights. In various examples, generating the second machine executable instructions is based on: generating a second input vector to include a second ordered set of values extracted from the second set of input data corresponding to the initial ordered set of fields; and/or processing the second input vector based on applying the initial plurality of weights to the second ordered set of values to generate a second plurality of sequentially selected output portions of second automatically generated output over a second plurality of iterative steps via updating second state data over the second plurality of iterative steps as a function of second prior state data based on generating second subsequent intermediate output in a second subsequent step of the second plurality of iterative steps via applying at least one of the initial plurality of weights to second prior intermediate output generated in a second prior step of the second plurality of iterative steps via applying the at least one of the initial plurality of weights. In various examples, generating the third machine executable instructions is based on: generating a third input vector to include a third ordered set of values extracted from the third set of input data corresponding to an updated ordered set of fields different from the initial ordered set of fields based on the updated at least one graph structure being different from the initial at least one graph structure; and/or processing the third input vector based on applying the updated plurality of weights to the third ordered set of values to generate a third plurality of sequentially selected output portions of second automatically generated output over a third plurality of iterative steps via updating third state data over the third plurality of iterative steps as a function of third prior state data based on generating third subsequent intermediate output in a third subsequent step of the third plurality of iterative steps via applying at least one of the updated plurality of weights to third prior intermediate output generated in a third prior step of the third plurality of iterative steps via applying the at least one of the updated plurality of weights. In various examples, generating the fourth machine executable instructions is based on: generating a fourth input vector to include a third ordered set of values extracted from the fourth set of input data corresponding to the updated ordered set of fields; and/or processing the fourth input vector based on applying the updated plurality of weights to the fourth ordered set of values to generate a fourth plurality of sequentially selected output portions of second automatically generated output over a fourth plurality of iterative steps via updating fourth state data over the fourth plurality of iterative steps as a function of fourth prior state data based on generating fourth subsequent intermediate output in a fourth subsequent step of the fourth plurality of iterative steps via applying at least one of the updated plurality of weights to fourth prior intermediate output generated in a fourth prior step of the third plurality of iterative steps via applying the at least one of the updated plurality of weights.

In various examples, updating the graph data stored by the graph data storage resources is based on: generating a plurality of vectors based on processing the first plurality of initial sets of input data. In various examples, a first vector of the plurality of vectors is generated from the first initial set of input data. In various examples, a second vector of the plurality of vectors is generated from the second initial set of input data. In various examples, updating the graph data stored by the graph data storage resources is further based on: generating a plurality of initialized weight values for the plurality of updated weights of the at least one updated graph structure, and/or updating the plurality of initialized weight values over a plurality of iterations based on processing the plurality of vectors based on minimizing at least one value, generated as a function of the plurality of updated weights and the plurality of vectors, over the plurality of iterations. In various examples, the plurality of updated weights of the at least one updated graph structure have a plurality of final weight values different from the plurality of initialized weight values based on performance of the plurality of iterations.

In various examples, the graph data storage resources includes a corresponding plurality of different storage devices located in a corresponding plurality of different geographic locations. In various examples, storing the at least one initial graph structure of the graph data via the graph data storage resources is based on storing the initial plurality of weights via a first corresponding plurality of different storage locations across at least some of the corresponding plurality of different storage devices. In various examples, storing the at least one updated graph structure of the graph data via the graph data storage resources is based on storing the updated plurality of weights via a second corresponding plurality of different storage locations across at least some of the corresponding plurality of different storage devices. In various examples, the corresponding plurality of different storage devices and the plurality of different storage devices have a null intersection. In various examples, the corresponding plurality of different storage devices and the plurality of different storage devices have a non-null intersection.

In various embodiments, any one or more of the various examples listed above are implemented in conjunction with performing some or all steps of FIG. 20G. In various embodiments, any set of the various examples listed above can be implemented in tandem, for example, in conjunction with performing some or all steps of FIG. 20G, and/or in conjunction with performing some or all steps of any other method described herein.

In various embodiments, performing some or all steps of FIG. 20G is based on performing some or all steps of FIG. 19E and/or performing some or all functionality of FIGS. 19A-19D.

In various embodiments, at least one memory device, memory section, and/or memory resource (e.g., a non-transitory computer readable storage medium) can store operational instructions that, when executed by one or more processing modules of one or more computing devices of a database system, cause the one or more computing devices to perform any or all of the method steps of FIG. 20G described above, for example, in conjunction with further implementing any one or more of the various examples described above.

In various embodiments, a computing system includes at least one processor and at least one memory that stores executable instructions. In various embodiments, the executable instructions, when executed by the at least one processor, cause the computing system to perform some or all steps of FIG. 20G, for example, in conjunction with further implementing any one or more of the various examples described above.

In various embodiments, the executable instructions, when executed by the at least one processor, cause the computing system to: generate graph data having an initial plurality of weights for a plurality of edges connecting a plurality of vertices of at least one initial graph structure; and/or store the graph data in graph data storage resources. In various embodiments, the executable instructions, when executed by the at least one processor, further cause the computing system to, during a first temporal period corresponding to operation of the computing system under a first mode of operation that utilizes the at least one initial graph structure: generate a first plurality of initial outgoing streams of digitally encoded data packets, where each initial outgoing stream of digitally encoded data packets of the first plurality of initial outgoing streams of digitally encoded data packets indicates corresponding machine executable instructions; transmit the first plurality of initial outgoing streams of digitally encoded data packets to a first plurality of client devices, where a first initial outgoing stream of digitally encoded data packets of the first plurality of initial outgoing streams of digitally encoded data packets is transmitted to a first client device of the first plurality of client devices associated with a first user contemporaneously with transmission of a second initial outgoing stream of digitally encoded data packets of the first plurality of initial outgoing streams of digitally encoded data packets to a second client device of the first plurality of client devices associated with a second user; receive a first plurality of initial incoming streams of digitally encoded data packets from the first plurality of client devices in response to the first plurality of initial outgoing streams of digitally encoded data packets, where a first initial incoming stream of digitally encoded data packets of the first plurality of initial incoming streams of digitally encoded data packets is received from the first client device based on the first client device automatically generating the first initial incoming stream of digitally encoded data packets via encoding a first initial set of input data automatically generated based on processing first measurement values collected via at least one sensor device of the first client device contemporaneously with displaying first digital display data via a display device of the first client device in response to the first client device automatically extracting the corresponding machine executable instructions from the first initial outgoing stream of digitally encoded data packets to automatically generate at least one two-dimensional array of pixels corresponding to the first digital display data and displaying the first digital display data via the display device of the first client device based on automatically configuring each of a plurality of lighting devices of the display device to a corresponding configured light setting indicated by a corresponding pixel value of the at least one two-dimensional array of pixels, and where a second initial incoming stream of digitally encoded data packets of the first plurality of initial incoming streams of digitally encoded data packets is received from the second client device based on the second client device processing the second initial outgoing stream of digitally encoded data packets; extract a first plurality of initial sets of input data from the first plurality of initial incoming streams of digitally encoded data packets based on processing the first plurality of initial incoming streams of digitally encoded data packets, where a first initial set of input data of the first plurality of initial sets of input data is extracted from the first initial incoming stream of digitally encoded data packets via decoding the first initial incoming stream of digitally encoded data packets, and where a second initial set of input data of the first plurality of initial sets of input data is extracted from the second initial incoming stream of digitally encoded data packets via decoding the second initial incoming stream of digitally encoded data packets; generate a first plurality of encrypted user data for a first plurality of users that includes the first user and the second user based on encrypting at least some of the first plurality of initial sets of input data, where each encrypted user data of the first plurality of encrypted user data is generated based on generating a first corresponding plurality of subkeys from a first corresponding initial key and/or, in each of a first corresponding plurality of iterations, applying a corresponding one of the first corresponding plurality of subkeys to generate a corresponding one of a corresponding plurality of encrypted user data versions, where the each encrypted user data is generated from a final encrypted user data version of the corresponding plurality of encrypted user data versions generated after completing all of the first corresponding plurality of iterations, where first encrypted user data is generated for the first user based on encrypting at least some of the first initial set of input data, and/or where second encrypted user data is generated for the second user based on encrypting at least some of the second initial set of input data; store each of the first plurality of encrypted user data via a plurality of different storage locations across a plurality of different storage devices located in a plurality of different geographic locations, where the first encrypted user data is stored via a first set of storage locations of the plurality of different storage locations, and/or where the second encrypted user data is stored via a second set of storage locations of the plurality of different storage locations different from the first set of storage locations; generate a first plurality of different machine executable instructions based on performing an initial input data processing function in conjunction with operating in accordance with the first mode of operation by applying the initial plurality of weights of the at least one initial graph structure via accessing the graph data in the graph data storage resources, where first machine executable instructions of the first plurality of different machine executable instructions are generated based on executing the initial input data processing function upon the first initial set of input data based on applying the at least one initial graph structure of the graph data to the first initial set of input data, and/or where second machine executable instructions of the first plurality of different machine executable instructions are generated based on executing the initial input data processing function upon the second initial set of input data based on applying the at least one initial graph structure of the graph data to the second initial set of input data; generate a first plurality of subsequent outgoing streams of digitally encoded data packets, where a first subsequent outgoing stream of digitally encoded data packets of the first plurality of subsequent outgoing streams of digitally encoded data packets is generated to include the first machine executable instructions, and/or where a second subsequent outgoing stream of digitally encoded data packets of the first plurality of subsequent outgoing streams of digitally encoded data packets is generated to include the second machine executable instructions; and/or transmit the first plurality of subsequent outgoing streams of digitally encoded data packets to the first plurality of client devices, where the first subsequent outgoing stream of digitally encoded data packets of the first plurality of subsequent outgoing streams of digitally encoded data packets is transmitted to the first client device, where the first client device executes the first machine executable instructions based on extracting the first machine executable instructions from the first subsequent outgoing stream of digitally encoded data packets, where the second subsequent outgoing stream of digitally encoded data packets of the first plurality of subsequent outgoing streams of digitally encoded data packets is transmitted to the second client device, and/or where the second client device executes the second machine executable instructions based on extracting the second machine executable instructions from the second subsequent outgoing stream of digitally encoded data packets. In various embodiments, the executable instructions, when executed by the at least one processor, further cause the computing system to: update the graph data stored by the graph data storage resources based on executing a graph data update function by processing the first plurality of initial sets of input data to generate an updated at least one graph structure replacing the initial at least one graph structure based on generating an updated plurality of weights to replace the initial plurality of weights; and/or transition from operation under the first mode of operation to operation under a second mode of operation that utilizes the at least one updated graph structure in response to updating of the graph data. In various embodiments, the executable instructions, when executed by the at least one processor, further cause the computing system to, during a second temporal period corresponding to operation of the computing system under the second mode of operation that utilizes the at least one updated graph structure, for example, based on transitioning from the operation under the first mode of operation to operation under the second mode of operation: generate a second plurality of initial outgoing streams of digitally encoded data packets; transmit the second plurality of initial outgoing streams of digitally encoded data packets to a second plurality of client devices, where a third initial outgoing stream of digitally encoded data packets of the second plurality of initial outgoing streams of digitally encoded data packets is transmitted to a third client device of the second plurality of client devices associated with a third user contemporaneously with transmission of a fourth initial outgoing stream of digitally encoded data packets of the second plurality of initial outgoing streams of digitally encoded data packets to a fourth client device of the second plurality of client devices associated with a fourth user; receive a second plurality of initial incoming streams of digitally encoded data packets from the second plurality of client devices in response to the second plurality of initial outgoing streams of digitally encoded data packets, where a third initial incoming stream of digitally encoded data packets of the second plurality of initial incoming streams of digitally encoded data packets is received from the third client device based on the third client device processing the third initial outgoing stream of digitally encoded data packets, and/or where a fourth initial incoming stream of digitally encoded data packets of the second plurality of initial incoming streams of digitally encoded data packets is received from the fourth client device based on the fourth client device processing the fourth initial outgoing stream of digitally encoded data packets; extract a second plurality of initial sets of input data from the second plurality of initial incoming streams of digitally encoded data packets based on processing the second plurality of initial incoming streams of digitally encoded data packets, where a third initial set of input data of the first plurality of initial sets of input data is extracted from the third initial incoming stream of digitally encoded data packets via decoding the third initial incoming stream of digitally encoded data packets, and/or where a fourth initial set of input data of the first plurality of initial sets of input data is extracted from the fourth initial incoming stream of digitally encoded data packets via decoding the fourth initial incoming stream of digitally encoded data packets; generate a second plurality of encrypted user data for a second plurality of users that includes the third user and the fourth user based on encrypting at least some of the second plurality of initial sets of input data, where third encrypted user data is generated for the third user based on encrypting at least some of the first initial set of input data, and/or where fourth encrypted user data is generated for the second user based on encrypting at least some of the second initial set of input data; store each of the second plurality of encrypted user data via the plurality of different storage locations across the plurality of different storage devices located in the plurality of different geographic locations, where the third encrypted user data is stored via a third set of storage locations of the plurality of different storage locations, and where the fourth encrypted user data is stored via a fourth set of storage locations of the plurality of different storage locations different from the third set of storage locations; generate a second plurality of different machine executable instructions based on performing a updated input data processing function in conjunction with operating in accordance with the second mode of operation by applying the updated plurality of weights of the at least one updated graph structure via accessing the graph data in the graph data storage resources, where third machine executable instructions of the second plurality of different machine executable instructions are generated based on executing the updated input data processing function upon the third initial set of input data based on applying the at least one updated graph structure of the graph data to the third initial set of input data, and/or where fourth machine executable instructions of the second plurality of different machine executable instructions are generated based on executing the updated input data processing function upon the fourth initial set of input data based on applying the at least one updated graph structure of the graph data to the fourth initial set of input data; generate a second plurality of subsequent outgoing streams of digitally encoded data packets, where a third subsequent outgoing stream of digitally encoded data packets of the second plurality of subsequent outgoing streams of digitally encoded data packets is generated to include the third machine executable instructions, and/or where a fourth subsequent outgoing stream of digitally encoded data packets of the second plurality of subsequent outgoing streams of digitally encoded data packets is generated to include the fourth machine executable instructions; and/or transmit the second plurality of subsequent outgoing streams of digitally encoded data packets to the second plurality of client devices, where the third subsequent outgoing stream of digitally encoded data packets of the second plurality of subsequent outgoing streams of digitally encoded data packets is transmitted to the third client device, where the third client device executes the third machine executable instructions based on extracting the third machine executable instructions from the third subsequent outgoing stream of digitally encoded data packets, where the fourth subsequent outgoing stream of digitally encoded data packets of the second plurality of subsequent outgoing streams of digitally encoded data packets is transmitted to the fourth client device, and/or where the fourth client device executes the fourth machine executable instructions based on extracting the fourth machine executable instructions from the fourth subsequent outgoing stream of digitally encoded data packets. In various embodiments, the executable instructions, when executed by the at least one processor, further cause the computing system to further update the graph data stored by the graph data storage resources based on re-executing the graph data update function by processing the second plurality of initial sets of input data to generate a further updated at least one graph structure replacing the updated at least one graph structure based on generating a further updated plurality of weights to replace the updated plurality of weights.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., indicates an advantageous relationship that would be evident to one skilled in the art in light of the present disclosure, and based, for example, on the nature of the signals/items that are being compared. As may be used herein, the term "compares unfavorably", indicates that a comparison between two or more items, signals, etc., fails to provide such an advantageous relationship and/or that provides a disadvantageous relationship. Such an item/signal can correspond to one or more numeric values, one or more measurements, one or more counts and/or proportions, one or more types of data, and/or other information with attributes that can be compared to a threshold, to each other and/or to attributes of other information to determine whether a favorable or unfavorable comparison exists. Examples of such an advantageous relationship can include: one item/signal being greater than (or greater than or equal to) a threshold value, one item/signal being less than (or less than or equal to) a threshold value, one item/signal being greater than (or greater than or equal to) another item/signal, one item/signal being less than (or less than or equal to) another item/signal, one item/signal matching another item/signal, one item/signal substantially matching another item/signal within a predefined or industry accepted tolerance such as 1%, 5%, 10% or some other margin, etc. Furthermore, one skilled in the art will recognize that such a comparison between two items/signals can be performed in different ways. For example, when the advantageous relationship is that signal 1 has a greater magnitude than signal 2, a favorable comparison may be achieved when the magnitude of signal 1 is greater than that of signal 2 or when the magnitude of signal 2 is less than that of signal 1. Similarly, one skilled in the art will recognize that the comparison of the inverse or opposite of items/signals and/or other forms of mathematical or logical equivalence can likewise be used in an equivalent fashion. For example, the comparison to determine if a signal X>5 is equivalent to determining if −X<−5, and the comparison to determine if signal A matches signal B can likewise be performed by determining −A matches −B or not(A) matches not(B). As may be discussed herein, the determination that a particular relationship is present (either favorable or unfavorable) can be utilized to automatically trigger a particular action. Unless expressly stated to the contrary, the absence of that particular condition may be assumed to imply that the particular action will not automatically be triggered. In other examples, the determination that a particular relationship is present (either favorable or unfavorable) can be utilized as a basis or consideration to determine whether to perform one or more actions. Note that such a basis or consideration can be considered alone or in combination with one or more other bases or considerations to determine whether to perform the one or more actions. In one example where multiple bases or considerations are used to determine whether to perform one or more actions, the respective bases or considerations are given equal weight in such determination. In another example where multiple bases or considerations are used to determine whether to perform one or more actions, the respective bases or considerations are given unequal weight in such determination.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified operations and relationships thereof. The boundaries and sequence of these functional building blocks and method steps have been arbitrarily defined herein for convenience of description. Alternate boundaries and sequences can be defined so long as the specified operations and relationships are appropriately performed. Any such alternate boundaries or sequences are thus within the scope and spirit of the claims. Similarly, flow diagram blocks may also have been arbitrarily defined herein to illustrate certain significant functionality.

Any flowchart and/or block diagram in the drawings is intended to illustrate the architecture, functionality, and/or operation of possible implementations of systems, methods, and computer program products according to aspects of the system. In this regard, each block may represent and/or be implemented by one or more processing resources such as a module, segment, one or more executable instructions, one or more discrete components, application specific integrated circuits, processors executing appropriate software and the like or any combination thereof for implementing the specified operation(s).

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown.

Further, while a flow diagram indicates a particular ordering of steps, other orderings are likewise possible provided that the principles of causality are maintained. For example, two blocks shown in an apparent sequence can sometimes be executed in the reverse order, depending upon the functions/operations involved. In another example, two blocks shown in an apparent sequence may, in fact, be executed substantially concurrently via parallelized processing resources. Any such parallelized operations performed by such parallel processing resources can, in various examples, can involve the generation, input, analysis, output, display and/or other processing of data, including data streams and/or other information at speeds that can exceed one million operations per second and can involve megabits, gigabits, terabits or more of data. Furthermore, such parallelized operations can involve the storage and/or retrieval of data at selected storage locations within one or more storage devices, a storage network, cloud storage and/or other parallelized storage media.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The terms "comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

One or more functions steps, and/or operations associated with the methods and/or processes described herein can be implemented via a processing module that operates via the non-human "artificial" intelligence (AI) of a machine. Examples of such AI include machines that operate via anomaly detection techniques, decision trees, association rules, expert systems and other knowledge-based systems, computer vision models, artificial neural networks, convolutional neural networks, support vector machines (SVMs), Bayesian networks, genetic algorithms, feature learning, sparse dictionary learning, preference learning, deep learning and other machine learning techniques that are trained using training data via unsupervised, semi-supervised, supervised and/or reinforcement learning, generative AI, generative adversarial networks, variational autoencoders, autoregressive models, large language models, and/or other AI and/or machine learning models and/or techniques. The human mind is not equipped to perform such AI techniques, not only due to the complexity of these techniques, but also due to the fact that artificial intelligence, by its very definition—requires "artificial" intelligence—i.e. machine/non-human intelligence.

One or more functions steps, and/or operations associated with the methods and/or processes described herein can be implemented as a large-scale system that is operable to receive, transmit and/or process data on a large-scale. As used herein, a large-scale refers to a large number of data, such as one or more kilobytes, megabytes, gigabytes, terabytes or more of data that are received, transmitted and/or processed. Such receiving, transmitting and/or processing of data cannot practically be performed by the human mind on a large-scale within a reasonable period of time, such as within a second, a millisecond, microsecond, a real-time basis or other high speed required by the machines that generate the data, receive the data, convey the data, store the data and/or use the data.

One or more functions steps, and/or operations associated with the methods and/or processes described herein can require data to be manipulated in different ways within overlapping time spans. The human mind is not equipped to perform such different data manipulations independently, contemporaneously, in parallel, and/or on a coordinated basis within a reasonable period of time, such as within a second, a millisecond, microsecond, a real-time basis or other high speed required by the machines that generate the data, receive the data, convey the data, store the data and/or use the data.

One or more functions steps, and/or operations associated with the methods and/or processes described herein can be implemented in a system that is operable to electronically receive digital data via a wired or wireless communication network and/or to electronically transmit digital data via a wired or wireless communication network. Such receiving and transmitting cannot practically be performed by the human mind because the human mind is not equipped to electronically transmit or receive digital data, let alone to transmit and receive digital data via a wired or wireless communication network.

One or more functions steps, and/or operations associated with the methods and/or processes described herein can be implemented in a system that is operable to electronically store digital data in a memory device. Such storage cannot practically be performed by the human mind because the human mind is not equipped to electronically store digital data.

One or more functions, steps, and/or operations associated with the methods and/or processes described herein can be performed in parallel and/or concurrently via a plurality of parallelized processing resources. For example, multiple instances of any given step of one or more methods and/or functions described herein can be performed in parallel and/or concurrently via a plurality of parallelized processing resources, where each parallelized processing resource of the plurality of parallelized processing resources performs the given step in parallel with and/or concurrently with other ones of the plurality of parallelized processing resources also performing the given step. As another example, any given step of one or more methods and/or functions described herein can be performed based on a plurality of parallelized processing resources performing assigned portions of the given step in parallel and/or concurrently, where each parallelized processing resource of the plurality of parallelized processing resources performs their assigned portion of the step in parallel with and/or concurrently with other ones of the plurality of parallelized processing resources also performing their own assigned portions of the given step. Any parallelized and/or concurrently performed steps performed by such parallel processing resources can, in various examples, involve operations that can include the generation, input, analysis, output and/or other processing of data, including data streams and/or other information at speeds that can exceed one million operations per second and furthermore can involve megabits, gigabits, terabits or more of data. Such parallelized processing cannot practically be performed by the human mind because the human mind is not equipped to perform multiple functions, steps, and/or operations simultaneously in parallel. One or more functions, steps, and/or operations associated with the methods and/or processes described herein may operate to cause an action by a processing module directly in response to a triggering event—without any intervening human interaction between the triggering event and the action. Any such actions may be identified as being performed "automatically", "automatically based on" and/or "automatically in response to" such a triggering event. Furthermore, any such actions identified in such a fashion specifically preclude the operation of human activity with respect to these actions—even if the triggering event itself may be causally connected to a human activity of some kind.

One or more functions, steps, and/or operations associated with the methods and/or processes described herein may involve determining data, information, and/or instructions (e.g. regarding subsequent actions to be performed). As used herein, "determining" particular data/information/instructions, for example, by a processing module, can include and/or be based on: receiving the data/information/instructions (e.g. via a wired and/or wireless network and/or other communication resources accessible via the processing module), retrieving the data/information/instructions from storage in memory resources in memory (e.g. that is accessible via the processing module), configuration of the data/information/instructions via user input (e.g. to a corresponding user input device coupled to the process module and/or in an instruction received from another computing device based on being configured via user input to the other computing device), automatically selecting the data/information/instructions from a plurality of options and/or automatically generating the data/information (e.g. via performing a deterministic function, via performing random or pseudorandom function, via performing at least one calculation, via performing at least one optimization algorithm, via performing at least one statistical function and/or applying a statistical model, and/or via applying at least one machine learning and/or AI technique and/or applying a machine learning model), and/or otherwise obtaining the data/information/instructions. While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing system, comprising:

at least one processor; and at least one memory that stores executable instructions that, when executed by the at least one processor, cause the computing system to:

generate a plurality of initial outgoing streams of digitally encoded data packets, wherein each initial outgoing stream of digitally encoded data packets of the plurality of initial outgoing streams of digitally encoded data packets is generated to include corresponding machine executable instructions;

transmit the plurality of initial outgoing streams of digitally encoded data packets to a plurality of client devices, wherein a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user;

receive a plurality of initial incoming streams of digitally encoded data packets from the plurality of client devices in response to the plurality of initial outgoing streams of digitally encoded data packets, wherein a first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets to include a first digitally encoded document file that includes first digital image data visually depicting a first physical document corresponding to the first user, and wherein a second initial incoming stream of digitally encoded data packets of the plurality of initial incoming streams of digitally encoded data packets is received from the second client device based on the second client device executing the corresponding machine executable instructions to automatically generate the second initial incoming stream of digitally encoded data packets to include a second digitally encoded document file that includes second digital image data of a second physical document corresponding to the second user;

decode the plurality of initial incoming streams of digitally encoded data packets to extract a plurality of digitally encoded document files from the plurality of initial incoming streams of digitally encoded data packets, wherein the first digitally encoded document file is extracted from the first initial incoming stream of digitally encoded data packets, and wherein the second digitally encoded document file is extracted from the second initial incoming stream of digitally encoded data packets;

generate a plurality of sets of user data values based on processing the plurality of digitally encoded document files, wherein a first set of user data values of the plurality of sets of user data values is extracted from the first digitally encoded document file via applying an image processing function to the first digital image data, wherein a second set of user data values of the plurality of sets of user data values is extracted from the second digitally encoded document file based on applying the image processing function to the second digital image data, and wherein applying the image processing function to the first digital image data to extract the first set of user data values is based on:

aligning positions of a first plurality of pixels of the first digital image data with predetermined spatial arrangement data to identify a first plurality of proper subsets of adjacent pixels of the first plurality of pixels based on applying the predetermined spatial arrangement data to, for each of a plurality of different user fields, identify a corresponding proper subset of adjacent pixels of the first plurality of proper subsets of adjacent pixels having a position in a two-dimensional arrangement of the first plurality of pixels, relative to positions of other ones of the first plurality of pixels in the two-dimensional arrangement of the first plurality of pixels, that corresponds to the each of the plurality of different user fields; and generating each corresponding one of the first set of user data values based on processing ones of the first plurality of pixels included in a corresponding proper subset of adjacent pixels of the first plurality of proper subsets of adjacent pixels;

generate a plurality of encrypted user data for a plurality of users that includes the first user and the second user based on encrypting at least some of the plurality of sets of user data values, wherein each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions, wherein the each encrypted user data is generated from a final encrypted user data version of the corresponding plurality of encrypted user data versions generated after completing all of the first corresponding plurality of iterations, wherein first encrypted user data is generated for the first user based on encrypting at least some of the first set of user data values, and wherein second encrypted user data is generated for the second user based on encrypting at least some of the second set of user data values;

store each of the plurality of encrypted user data via a plurality of different storage locations across a plurality of different storage devices located in a plurality of different geographic locations, wherein the first encrypted user data is stored via a first set of storage locations of the plurality of different storage locations, and wherein the second encrypted user data is stored via a second set of storage locations of the plurality of different storage locations different from the first set of storage locations;

generate a plurality of additional outgoing streams of digitally encoded data packets via processing the plurality of sets of user data values; and transmit the plurality of additional outgoing streams of digitally encoded data packets to a server system for processing.

2. The computing system of claim 1, wherein the first physical document corresponds to a first document type of a plurality of document types, wherein the image processing function is configured for processing image data visually depicting physical documents of the first document type, and wherein, based on the image processing function being configured for processing image data visually depicting physical documents of the first document type, the plurality of different user fields is configured based on a standardized set of user fields included in the first document type, and the predetermined spatial arrangement data is configured based on a standardized spatial layout of the plurality of different user fields in the first document type.

3. The computing system of claim 2, wherein the second physical document has the first document type, wherein the second set of user data values of the plurality of sets of user data values is extracted from the second digitally encoded document file via applying the image processing function to the second digital image data based on:

aligning positions of a second plurality of pixels of the second digital image data with the predetermined spatial arrangement data to identify a second plurality of proper subsets of adjacent pixels of the second plurality of pixels based on applying the predetermined spatial arrangement data to, for each of the plurality of different user fields, identify a corresponding proper subset of adjacent pixels of the second plurality of proper subsets of adjacent pixels having a position in a two-dimensional arrangement of the second plurality of pixels, relative to positions of other ones of the second plurality of pixels in the two-dimensional arrangement of the first plurality of pixels, that corresponds to the each of the plurality of different user fields; and generating each corresponding one of the second set of user data values based on processing ones of the second plurality of pixels included in a corresponding proper subset of adjacent pixels of the second plurality of proper subsets of adjacent pixels.

4. The computing system of claim 2, wherein the second physical document has a second document type different from the first document type, wherein the second set of user data values of the plurality of sets of user data values is extracted from the second digitally encoded document file via applying a second image processing function to the second digital image data, wherein the second image processing function is configured for processing image data visually depicting physical documents of the second document type, and wherein applying the second image processing function to the second digital image data is based on:

aligning positions of a second plurality of pixels of the second digital image data with second predetermined spatial arrangement data to identify a second plurality of proper subsets of adjacent pixels of the second plurality of pixels based on applying the second predetermined spatial arrangement data to, for each of a second plurality of different user fields, identify a corresponding proper subset of adjacent pixels of the second plurality of proper subsets of adjacent pixels having a position in a two-dimensional arrangement of the second plurality of pixels, relative to positions of other ones of the second plurality of pixels in the two-dimensional arrangement of the first plurality of pixels, that corresponds to the each of the second plurality of different user fields, wherein, based on the second image processing function being configured for processing image data visually depicting physical documents of the second document type, the second plurality of different user fields is different from the plurality of different user fields based on the second plurality of different user fields being configured based on a second standardized set of user fields included in the second document type different from the standardized set of user fields included in the first document type, and the second predetermined spatial arrangement data is different from the predetermined spatial arrangement data based on the second predetermined spatial arrangement data being configured based on a second standardized spatial layout of the second plurality of different user fields in the second document type different from the standardized spatial layout of the plurality of different user fields in the first document type; and generating each corresponding one of the second set of user data values based on processing ones of the second plurality of pixels included in a corresponding proper subset of adjacent pixels of the second plurality of proper subsets of adjacent pixels.

5. The computing system of claim 4, wherein the first digitally encoded document file has a first digitally encoded document file type of a plurality of digitally encoded document file types, and wherein the second digitally encoded document file also has the first digitally encoded document file type.

6. The computing system of claim 1, wherein the image processing function includes a plurality of different image processing sub-functions each corresponding to a different one of the plurality of different user fields, and wherein generating each corresponding one of the first set of user data values includes performing a corresponding one of the plurality of different image processing sub-functions upon the corresponding proper subset of adjacent pixels of the first plurality of proper subsets of adjacent pixels.

7. The computing system of claim 6, wherein the plurality of different user fields each have a corresponding one of a plurality of different data types, wherein a first user field of the plurality of different user fields has a first data type of the plurality of different data types, wherein a first data value for the first user field of the first set of user data values is generated via performing a first one of the plurality of different image processing sub-functions upon a first corresponding proper subset of adjacent pixels of the first plurality of proper subsets of adjacent pixels, wherein the first data value has the first data type based on the first one of the plurality of different image processing sub-functions being configured to generate data values having the first data type, wherein a second user field of the plurality of different user fields has a second data type of the plurality of different data types, wherein a second data value for the second user field of the first set of user data values is generated via performing a second one of the plurality of different image processing sub-functions upon a second corresponding proper subset of adjacent pixels of a second plurality of proper subsets of adjacent pixels of the second digital image data, wherein the second data value has the second data type based on the second one of the plurality of different image processing sub-functions being configured to generate data values having the second data type.

8. The computing system of claim 7, wherein the first data type corresponds to at least one of: a text data type or a numeric data type, and wherein the second data type corresponds to an image data type.

9. The computing system of claim 1, wherein generating a first one of the first set of user data values includes processing ones of the first plurality of pixels included in a first corresponding proper subset of adjacent pixels of the first plurality of proper subsets of adjacent pixels based on:

extracting raw text from the first corresponding proper subset of adjacent pixels of the first plurality of proper subsets of adjacent pixels; and performing a natural language processing function upon the raw text to generate the first one of the second set of user data values having a corresponding value different from the raw text.

10. The computing system of claim 1, wherein the predetermined spatial arrangement data indicates:

a plurality of relative location data for locations the plurality of different user fields in two-dimensional space; and a plurality of relative size data for sizes of the plurality of different user fields in two-dimensional space.

11. The computing system of claim 10, wherein aligning the positions of the first plurality of pixels of the first digital image data with the predetermined spatial arrangement data includes generating processed digital image data from the first digital image data based on performing an affine transformation upon the two-dimensional arrangement of the first plurality of pixels.

12. The computing system of claim 11, wherein applying the image processing function to the first digital image data is further based on:

generating visual marker detection data indicating a subset of pixels visually conveying at least one predetermined visual marker in the first digital image data;

generating at least one of: a size offset value based on a measured size difference between a predetermined size of the predetermined visual marker and a detected size of the subset of pixels in the first digital image data; a horizontal position offset value based on a measured horizontal position difference between a predetermined horizontal position of the predetermined visual marker and a detected horizontal position of the subset of pixels in the first digital image data; a vertical position offset value based on a measured vertical position difference between a predetermined vertical position of the predetermined visual marker and a detected vertical position of the subset of pixels in the first digital image data; an orientation offset value based on a measured orientation difference between a predetermined orientation of the predetermined visual marker and a detected orientation of the at least one predetermined visual marker in the subset of pixels; or a color hue offset value based on a measured color difference between predetermined color data of the predetermined visual marker and detected color data of the at least one predetermined visual marker in the subset of pixels;

wherein the affine transformation is performed upon the two-dimensional arrangement of the first plurality of pixels as a function of at least one of: the size offset value, the horizontal position offset value, the vertical position offset value, or the orientation offset value.

13. The computing system of claim 1, wherein the executable instructions, when executed by the at least one processor, further cause the computing system to:

train a document processing function by processing a training set that includes a plurality of digitally encoded document files of at least one document type based on:

training at least one first computer vision model via processing a first plurality of digital image data of the plurality of digitally encoded document files; and training at least one natural language model via processing a plurality of textual data extracted from the plurality of digitally encoded document files;

wherein performing the image processing function includes applying the document processing function.

14. The computing system of claim 1, wherein the first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets generated based on processing first measurement values collected via at least one sensor device of the first client device contemporaneously with displaying digital display data via a display device of the first client device in response to the first client device automatically extracting at least one prompt from the first initial outgoing stream of digitally encoded data packets to automatically generate at least one two-dimensional array of pixels corresponding to the digital display data and displaying the digital display data via the display device of the first client device visually conveying the at least one prompt based on automatically controlling each of a plurality of lighting devices of the display device to a corresponding configured light setting indicated by a corresponding pixel value of the at least one two-dimensional array of pixels.

15. The computing system of claim 14, wherein the first initial incoming stream of digitally encoded data packets of the plurality of initial incoming streams of digitally encoded data packets is received from the first client device based on the first client device automatically generating the first digitally encoded document file for inclusion in the first initial incoming stream of digitally encoded data packets generated based on the first client device activating a camera of the first client device to capture the first digital image data based on processing the first measurement values collected via at least one sensor device of the first client device.

16. The computing system of claim 1, wherein the first set of user data values is generated based on:

generating a first plurality of sub-tasks for generating the first set of user data values; and executing the first plurality of sub-tasks in parallel as a first plurality of parallelized processes;

wherein the first set of user data values is generated based on:

generating a second plurality of sub-tasks for generating the second set of user data values; and executing the second plurality of sub-tasks in parallel as a second plurality of parallelized processes.

17. The computing system of claim 1, wherein the executable instructions, when executed by the at least one processor, further cause the computing system to:

automatically identify a corresponding set of required application materials for each of the plurality of users as a corresponding proper subset of a plurality of possible application materials, wherein a first set of required application materials is identified for the first user as a first proper subset of the plurality of possible application materials via processing the first set of user data values, wherein a second set of required application materials is identified for the second user as a second proper subset of the plurality of possible application materials via processing the second set of data values, and wherein a set difference between the first set of required application materials and the second set of required application materials is non-null based on at least one of the first set of user data values being different form at least one of the second set of user data values;

generate a plurality of subsequent outgoing streams of digitally encoded data packets, wherein a first subsequent outgoing stream of digitally encoded data packets of the plurality of subsequent outgoing streams of digitally encoded data packets indicates a first set of prompts corresponding to the first set of required application materials identified for the first user, and wherein a second subsequent outgoing stream of digitally encoded data packets of the plurality of subsequent outgoing streams of digitally encoded data packets indicates a second set of prompts corresponding to the second set of required application materials identified for the second user, wherein another set difference between the first set of prompts and the second set of prompts is non-null based on the first set of required application materials being different from the second set of required application materials;

transmit the plurality of subsequent outgoing streams of digitally encoded data packets, wherein the first subsequent outgoing stream of digitally encoded data packets is transmitted to the first client device and wherein the second subsequent outgoing stream of digitally encoded data packets is transmitted to the second client device;

receive a plurality of subsequent incoming streams of digitally encoded data packets in response to the plurality of subsequent outgoing streams of digitally encoded data packets, wherein a first subsequent incoming stream of digitally encoded data packets of the plurality of subsequent incoming streams of digitally encoded data packets is received from the first client device, and wherein a second subsequent incoming stream of digitally encoded data packets of the plurality of subsequent incoming streams of digitally encoded data packets is received from the second client device;

generate a plurality of additional digitally encoded document files, wherein at least one first additional digitally encoded document file of the plurality of additional digitally encoded document files corresponds to at least one of the first set of required application materials and is generated based on both processing at least one of the at least some of the first set of user data values in response to accessing the first encrypted user data in at least one of the plurality of different geographic locations and decrypting the first encrypted user data to extract at least one of the at least some of the first set of user data values and also processing a first subsequent set of data in response to decoding the first subsequent incoming stream of digitally encoded data packets to extract other first encrypted application data from the first subsequent incoming stream of digitally encoded data packets and extracting the first subsequent set of data based on decrypting the other first encrypted application data, wherein at least one second additional digitally encoded document file of the plurality of additional digitally encoded document files corresponds to at least one of the second set of required application materials and is generated based on both processing at least one of the at least some of the second set of user data values in response to accessing the second encrypted user data in at least one of the plurality of different geographic locations and decrypting the second encrypted user data to extract at least one of the at least some of the second set of user data values and also processing a second subsequent set of data in response to decoding the second subsequent incoming stream of digitally encoded data packets to extract other second encrypted application data from the second subsequent incoming stream of digitally encoded data packets and extracting the second subsequent set of input data based on decrypting the other second encrypted application data; and generate a plurality of encrypted submission data, wherein each encrypted submission data of the plurality of encrypted submission data is generated based on generating a second corresponding plurality of subkeys from a second corresponding initial key and, in each of a second corresponding plurality of iterations, applying a corresponding one of the second corresponding plurality of subkeys to generate a corresponding one of a corresponding plurality of encrypted submission data versions, wherein the each encrypted submission data is generated from a final encrypted submission data version of the corresponding plurality of encrypted submission data versions generated after completing all of the first corresponding plurality of iterations, and wherein each of the plurality of additional outgoing streams of digitally encoded data packets includes a corresponding one of the plurality of encrypted submission data.

18. The computing system of claim 17, wherein the at least one first additional digitally encoded document file is different from the at least one second additional digitally encoded document file based on the at least one first additional digitally encoded document file containing different information from the at least one second additional digitally encoded document file as a result of the first set of user data values being different from the second set of user data values and as a further result of the first subsequent set of input data being different from the second subsequent set of input data, and wherein the at least one first additional digitally encoded document file is different from the at least one second additional digitally encoded document file further based on the at least one first additional digitally encoded document file and the at least one additional second digitally encoded document file corresponding to different types of application materials of the plurality of possible application materials as a result of the set difference between the first set of required application materials and the second set of required application materials being non-null.

19. A method comprising:

generating a plurality of initial outgoing streams of digitally encoded data packets, wherein each initial outgoing stream of digitally encoded data packets of the plurality of initial outgoing streams of digitally encoded data packets is generated to include corresponding machine executable instructions;

transmitting the plurality of initial outgoing streams of digitally encoded data packets to a plurality of client devices, wherein a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user;

receiving a plurality of initial incoming streams of digitally encoded data packets from the plurality of client devices in response to the plurality of initial outgoing streams of digitally encoded data packets, wherein a first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets to include a first digitally encoded document file that includes first digital image data visually depicting a first physical document corresponding to the first user, and wherein a second initial incoming stream of digitally encoded data packets of the plurality of initial incoming streams of digitally encoded data packets is received from the second client device based on the second client device executing the corresponding machine executable instructions to automatically generate the second initial incoming stream of digitally encoded data packets to include a second digitally encoded document file that includes second digital image data of a second physical document corresponding to the second user;

decoding the plurality of initial incoming streams of digitally encoded data packets to extract a plurality of digitally encoded document files from the plurality of initial incoming streams of digitally encoded data packets, wherein the first digitally encoded document file is extracted from the first initial incoming stream of digitally encoded data packets, and wherein the second digitally encoded document file is extracted from the second initial incoming stream of digitally encoded data packets;

generating a plurality of sets of user data values based on processing the plurality of digitally encoded document files, wherein a first set of user data values of the plurality of sets of user data values is extracted from the first digitally encoded document file via applying an image processing function to the first digital image data, wherein a second set of user data values of the plurality of sets of user data values is extracted from the second digitally encoded document file based on applying the image processing function to the second digital image data, and wherein applying the image processing function to the first digital image data to extract the first set of user data values is based on:

aligning positions of a first plurality of pixels of the first digital image data with predetermined spatial arrangement data to identify a first plurality of proper subsets of adjacent pixels of the first plurality of pixels based on applying the predetermined spatial arrangement data to, for each of a plurality of different user fields, identify a corresponding proper subset of adjacent pixels of the first plurality of proper subsets of adjacent pixels having a position in a two-dimensional arrangement of the first plurality of pixels, relative to positions of other ones of the first plurality of pixels in the two-dimensional arrangement of the first plurality of pixels, that corresponds to the each of the plurality of different user fields; and generating each corresponding one of the first set of user data values based on processing ones of the first plurality of pixels included in a corresponding proper subset of adjacent pixels of the first plurality of proper subsets of adjacent pixels;

generating a plurality of encrypted user data for a plurality of users that includes the first user and the second user based on encrypting at least some of the plurality of sets of user data values, wherein each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions, wherein the each encrypted user data is generated from a final encrypted user data version of the corresponding plurality of encrypted user data versions generated after completing all of the first corresponding plurality of iterations, wherein first encrypted user data is generated for the first user based on encrypting at least some of the first set of user data values, and wherein second encrypted user data is generated for the second user based on encrypting at least some of the second set of user data values;

storing each of the plurality of encrypted user data via a plurality of different storage locations across a plurality of different storage devices located in a plurality of different geographic locations, wherein the first encrypted user data is stored via a first set of storage locations of the plurality of different storage locations, and wherein the second encrypted user data is stored via a second set of storage locations of the plurality of different storage locations different from the first set of storage locations;

generating a plurality of additional outgoing streams of digitally encoded data packets via processing the plurality of sets of user data values; and transmitting the plurality of additional outgoing streams of digitally encoded data packets to a server system for processing.

20. A non-transitory computer readable storage medium comprises:

at least one memory section that stores operational instructions that, when executed by at least one processing module that includes a processor and a memory, cause the at least one processing module to:

generate a plurality of initial outgoing streams of digitally encoded data packets, wherein each initial outgoing stream of digitally encoded data packets of the plurality of initial outgoing streams of digitally encoded data packets is generated to include corresponding machine executable instructions;

transmit the plurality of initial outgoing streams of digitally encoded data packets to a plurality of client devices, wherein a first initial outgoing stream of digitally encoded data packets of the plurality of initial outgoing streams of digitally encoded data packets is transmitted to a first client device associated with a first user contemporaneously with transmission of a second initial outgoing stream of digitally encoded data packets of the plurality of initial outgoing streams of digitally encoded data packets to a second client device associated with a second user;

receive a plurality of initial incoming streams of digitally encoded data packets from the plurality of client devices in response to the plurality of initial outgoing streams of digitally encoded data packets, wherein a first initial incoming stream of digitally encoded data packets of the plurality of initial incoming streams of digitally encoded data packets is received from the first client device based on the first client device executing the corresponding machine executable instructions to automatically generate the first initial incoming stream of digitally encoded data packets to include a first digitally encoded document file that includes first digital image data visually depicting a first physical document corresponding to the first user, and wherein a second initial incoming stream of digitally encoded data packets of the plurality of initial incoming streams of digitally encoded data packets is received from the second client device based on the second client device executing the corresponding machine executable instructions to automatically generate the second initial incoming stream of digitally encoded data packets to include a second digitally encoded document file that includes second digital image data of a second physical document corresponding to the second user;

decode the plurality of initial incoming streams of digitally encoded data packets to extract a plurality of digitally encoded document files from the plurality of initial incoming streams of digitally encoded data packets, wherein the first digitally encoded document file is extracted from the first initial incoming stream of digitally encoded data packets, and wherein the second digitally encoded document file is extracted from the second initial incoming stream of digitally encoded data packets;

generate a plurality of sets of user data values based on processing the plurality of digitally encoded document files, wherein a first set of user data values of the plurality of sets of user data values is extracted from the first digitally encoded document file via applying an image processing function to the first digital image data, wherein a second set of user data values of the plurality of sets of user data values is extracted from the second digitally encoded document file based on applying the image processing function to the second digital image data, and wherein applying the image processing function to the first digital image data to extract the first set of user data values is based on:

aligning positions of a first plurality of pixels of the first digital image data with predetermined spatial arrangement data to identify a first plurality of proper subsets of adjacent pixels of the first plurality of pixels based on applying the predetermined spatial arrangement data to, for each of a plurality of different user fields, identify a corresponding proper subset of adjacent pixels of the first plurality of proper subsets of adjacent pixels having a position in a two-dimensional arrangement of the first plurality of pixels, relative to positions of other ones of the first plurality of pixels in the two-dimensional arrangement of the first plurality of pixels, that corresponds to the each of the plurality of different user fields; and generating each corresponding one of the first set of user data values based on processing ones of the first plurality of pixels included in a corresponding proper subset of adjacent pixels of the first plurality of proper subsets of adjacent pixels;

generate a plurality of encrypted user data for a plurality of users that includes the first user and the second user based on encrypting at least some of the plurality of sets of user data values, wherein each encrypted user data of the plurality of encrypted user data is generated based on generating a first corresponding plurality of subkeys from a first corresponding initial key and, in each of a first corresponding plurality of iterations, applying a corresponding one of the first corresponding plurality of subkeys to generate a corresponding one of a corresponding plurality of encrypted user data versions, wherein the each encrypted user data is generated from a final encrypted user data version of the corresponding plurality of encrypted user data versions generated after completing all of the first corresponding plurality of iterations, wherein first encrypted user data is generated for the first user based on encrypting at least some of the first set of user data values, and wherein second encrypted user data is generated for the second user based on encrypting at least some of the second set of user data values;

store each of the plurality of encrypted user data via a plurality of different storage locations across a plurality of different storage devices located in a plurality of different geographic locations, wherein the first encrypted user data is stored via a first set of storage locations of the plurality of different storage locations, and wherein the second encrypted user data is stored via a second set of storage locations of the plurality of different storage locations different from the first set of storage locations;

generate a plurality of additional outgoing streams of digitally encoded data packets via processing the plurality of sets of user data values; and transmit the plurality of additional outgoing streams of digitally encoded data packets to a server system for processing.

* * * * *